US005809527A

United States Patent [19]

Cooper et al.

[11] Patent Number: 5,809,527

[45] Date of Patent: Sep. 15, 1998

[54] OUTBOARD FILE CACHE SYSTEM

[75] Inventors: Thomas P. Cooper, New Brighton; Robert E. Swenson, Mendota Heights, both of Minn.

[73] Assignee: Unisys Corporation, Blue Bell, Pa.

[21] Appl. No.: 174,750

[22] Filed: Dec. 23, 1993

[51] Int. Cl.[6] .................................................... G06F 12/02

[52] U.S. Cl. .............................. 711/133; 711/3; 711/113; 711/154; 711/151; 707/200

[58] Field of Search .................................. 395/445, 450, 395/452, 460, 463, 471, 472, 479, 481, 486, 487; 364/DIG. 1

[56] References Cited

U.S. PATENT DOCUMENTS

| | | | |
|---|---|---|---|
| 4,314,331 | 2/1982 | Porter et al. | 395/460 |
| 4,394,733 | 7/1983 | Swenson | 395/403 |
| 4,603,380 | 7/1986 | Easton et al. | 395/440 |
| 4,897,781 | 1/1990 | Chang et al. | 395/600 |
| 4,967,353 | 10/1990 | Brenner et al. | 395/487 |
| 5,043,885 | 8/1991 | Robinson | 395/460 |
| 5,163,131 | 11/1992 | Row et al. | 395/200.01 |
| 5,263,145 | 11/1993 | Brady et al. | 394/441 |
| 5,305,389 | 4/1994 | Palmer | 382/1 |
| 5,309,451 | 5/1994 | Noya et al. | 371/40.4 |
| 5,325,509 | 6/1994 | Lautzenheiser | 395/464 |
| 5,353,425 | 10/1994 | Malamy et al. | 395/471 |
| 5,390,318 | 2/1995 | Ramakrishman et al. | 395/485 |

OTHER PUBLICATIONS

Cohen, et. al. "Storage Hierarchies", IBM Systems Journal, vol. 28, No. 1, 1989 pp. 62–76.

Nelson, et.al. "Caching in the Sprite Network File System", ACM Transactions on Computer Systems, Feb. 1988, pp. 134–154.

Howard, et. al., "Scale and Performance on a Distributed File System", ACM Transactions on Computer System, Feb. 1988, pp. 51–81.

*Primary Examiner*—Tod R. Swann
*Assistant Examiner*—Tuan V. Thai
*Attorney, Agent, or Firm*—Charles A. Johnson; Mark T. Starr

[57] ABSTRACT

A system and method are described for caching files of data in a cache which is beyond the input/output boundary of a host. A host references a file with file access commands containing a logical file-identifier and a logical offset into the file. An outboard file cache coupled to the input/output section of the host receives the file access commands. The outboard file cache is transparent to users who program the host. Generation of input/output channel programs and mapping the data referenced to a physical address in secondary storage are eliminated when the referenced data is present in the cache. A file descriptor table in the outboard file cache identifies the logical portions of the logical files which are present in the cache. If the data referenced by the logical file-identifier and logical offset in a file access command is present in the outboard file cache, the data is transferred from the outboard file cache to the host memory. Otherwise, a miss status is returned to the host, and the host stages data from secondary storage to the outboard file cache. The outboard file cache further includes a lock table for storing file locks which inhibit access to selected files. In an outboard cache, excessive writes to a file are detected, the outboard cache having the first division for storage of selected portions of normal files, and a second division for storage of selected the second division is monitored and automatically converted to the first division when the storage used in the second division of cache memory falls below the periodic minimum.

37 Claims, 198 Drawing Sheets

508

| | | | | |
|---|---|---|---|---|
| 0 | RES. | IXP# | PATH_ID | SEGMENT FLAGS |
| 1–2 | FILE_IDENTIFIER | | | |
| 3 | FILE_RELATIVE_SEGMENT_OFFSET | | | |
| 4 | HASH_LINK/BADPTR/NAIL_LINK | | | |
| 5 | DATA_POINTER | FLAG ANNEX | BPID | |
| 6–7 | BLOCKS_WRITTEN_TEMPLATE | | | |
| 8 | HOST_ID | GROUP_ID | FILE_SESSION | HOST-SESSION |
| 9 | LEG1_DISK_NUMBER | | | |
| 10 | LEG2_DISK_NUMBER | | | |
| 11 | LEG1_DISK_ADDRESS | | | |
| 12 | LEG2_DISK_ADDRESS | | | |
| 13–14 | UNUSED | | | |
| 15 | PROGRAM_ID | | | |

FIG. 21

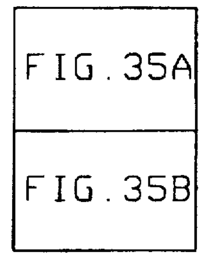
FIG. 35
FIG. 35A
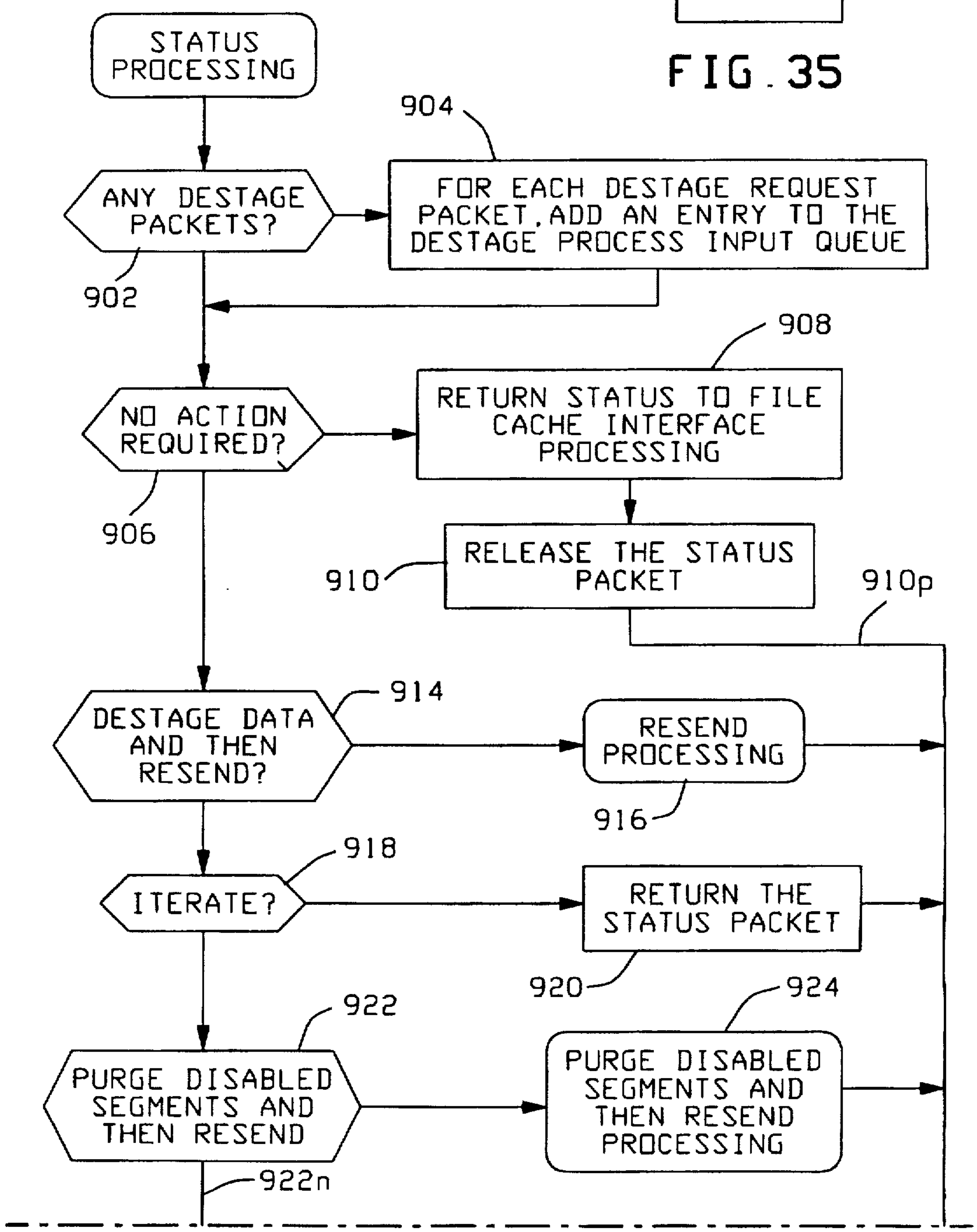

Figure 48:
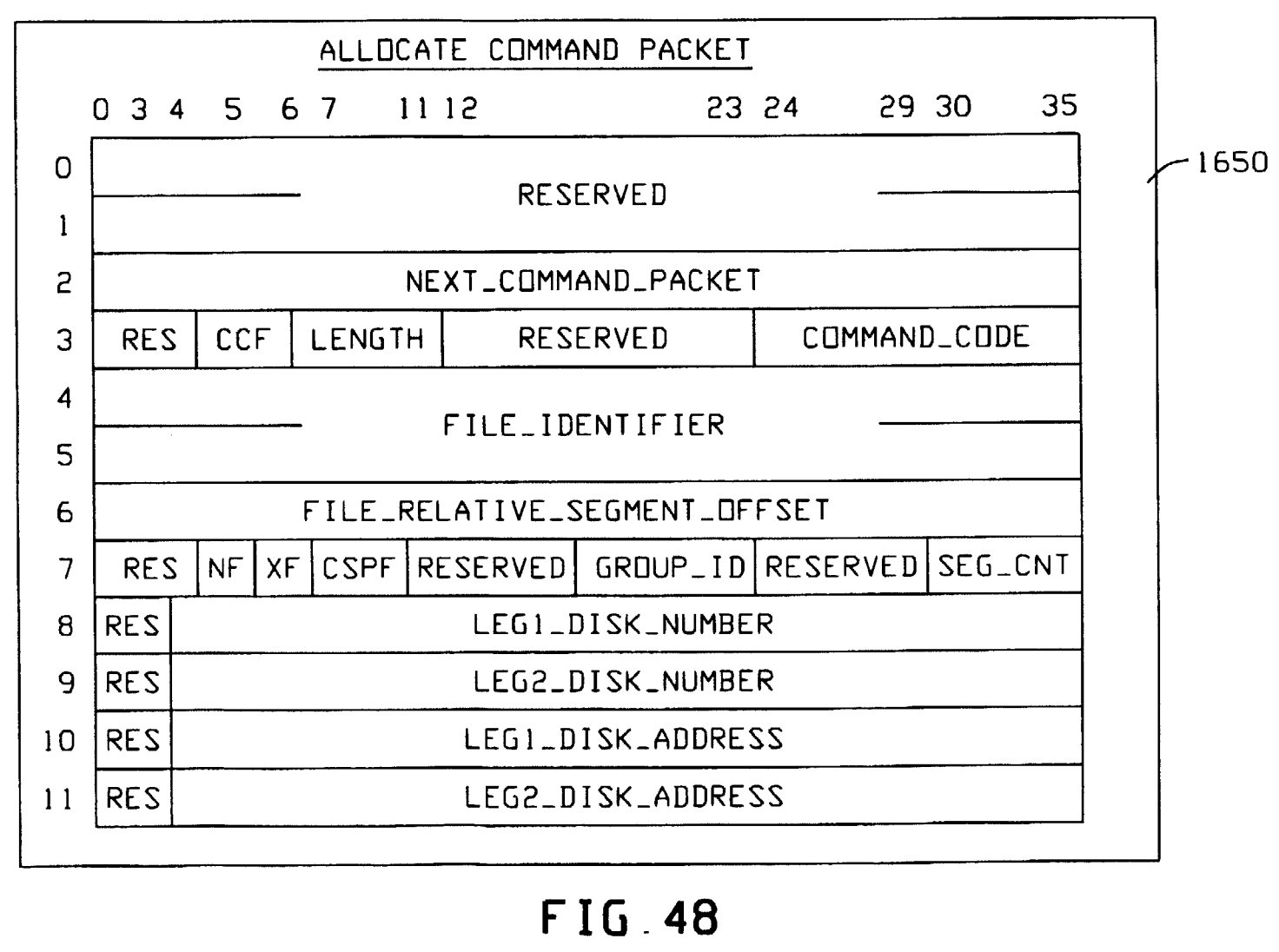

1650

ALLOCATE COMMAND PACKET

Bit positions: 0 3 4 5 6 7 11 12 23 24 29 30 35

| Word | Fields |
| --- | --- |
| 0–1 | RESERVED |
| 2 | NEXT_COMMAND_PACKET |
| 3 | RES \| CCF \| LENGTH \| RESERVED \| COMMAND_CODE |
| 4–5 | FILE_IDENTIFIER |
| 6 | FILE_RELATIVE_SEGMENT_OFFSET |
| 7 | RES \| NF \| XF \| CSPF \| RESERVED \| GROUP_ID \| RESERVED \| SEG_CNT |
| 8 | RES \| LEG1_DISK_NUMBER |
| 9 | RES \| LEG2_DISK_NUMBER |
| 10 | RES \| LEG1_DISK_ADDRESS |
| 11 | RES \| LEG2_DISK_ADDRESS |

DESTAGE STATUS PACKET

| Word | Bits | Field |
|---|---|---|
| 0 | 0–5 | VALID_FLG |
| 0 | 6–17 | RESERVED |
| 0 | 18–35 | UPI_NUMBER |
| 1 | 0–3 | RES |
| 1 | 4–35 | PROGRAM_ID |
| 2 | 0–35 | COMMAND_PACKET_ADDRESS |
| 3 | 0–35 | HARDWARE_DEPENDENT_STATUS_1 |
| 4 | 0–35 | HARDWARE_DEPENDENT_STATUS_2 |
| 5 | 0–11 | RECOMMENDED_ACTION |
| 5 | 12–23 | REASON |
| 5 | 24–29 | COUNT |
| 5 | 30–35 | FLAGS |
| 6 | 0–35 | STATISTICS |
| 7 | 0–17 | RESERVED |
| 7 | 18–35 | DESTAGE_REQUEST_PACKET_COUNT |
| 8 | 0–3 | RES |
| 8 | 4–17 | PACKETS_RETURNED_COUNT |
| 8 | 18–35 | RESERVED |
| 9 | 0–35 | RESERVED |
| 10 | 0–35 | RESERVED |
| 11–34 | 0–35 | DESTAGE REQUEST TABLE |
| 35–114 | 0–35 | SEGMENT INFORMATION TABLE |
| 115 119 120 127 | 0–35 | RESERVED |

DESTAGE AND PURGE DISK STATUS PACKET

1734

| Word | 0–3 | 4–5 | 6–11 | 12–17 | 18–23 | 24–29 | 30–35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8 | RES | PACKETS_RETURNED_COUNT | | | RESERVED | | |
| 9 | RES | RESTART_SEGMENT_POINTER | | | | | |
| 10 | RESERVED | | | | | | |
| 11–34 | DESTAGE REQUEST TABLE | | | | | | |
| 35–114 | SEGMENT INFORMATION TABLE | | | | | | |
| 115–119, 120–127 | RESERVED | | | | | | |

FIG. 63

Figure 71:
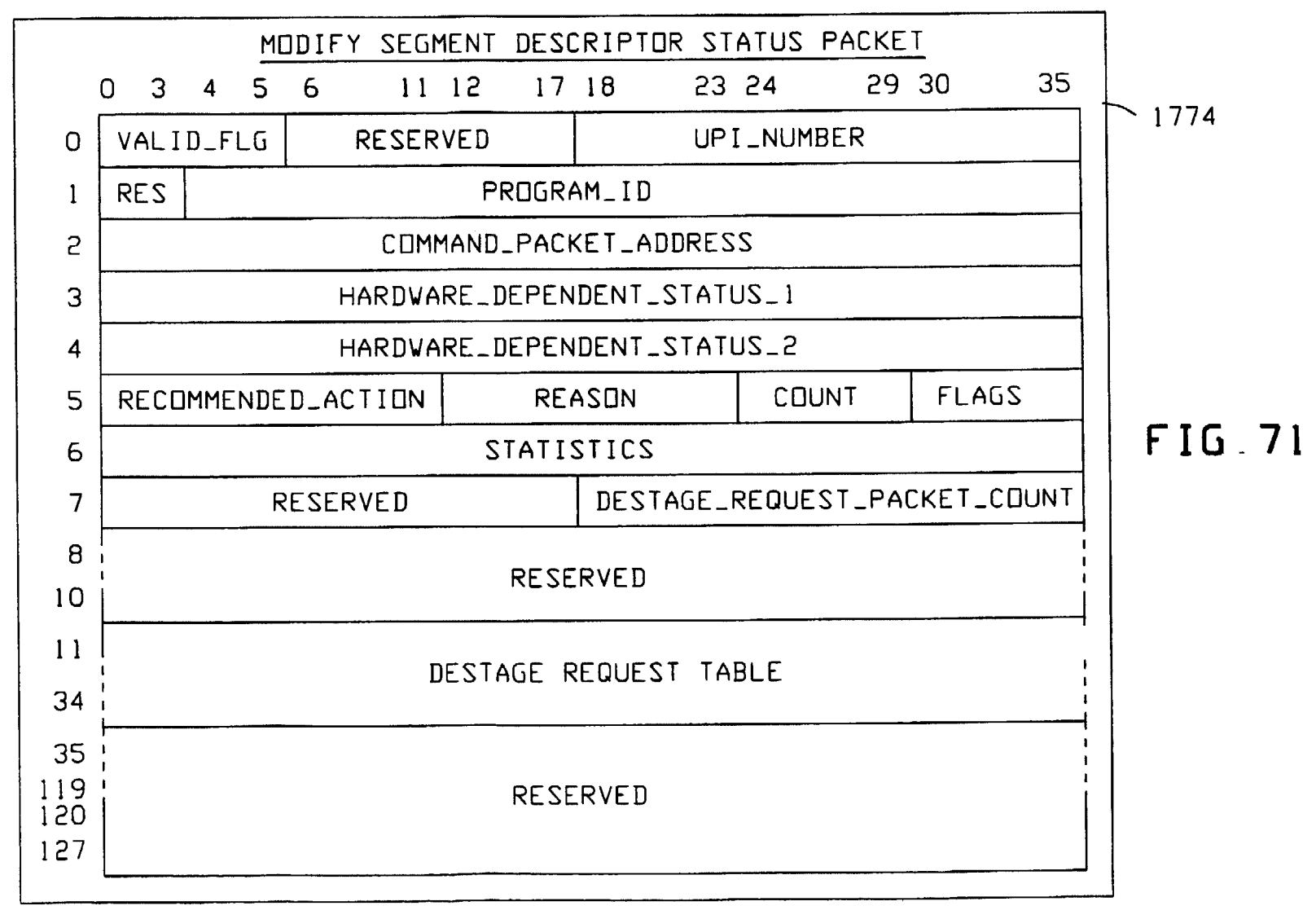

MODIFY SEGMENT DESCRIPTOR STATUS PACKET

1774

| Word | 0–3 | 4–5 | 6–11 | 12–17 | 18–23 | 24–29 | 30–35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8–10 | RESERVED | | | | | | |
| 11–34 | DESTAGE REQUEST TABLE | | | | | | |
| 35, 119, 120, 127 | RESERVED | | | | | | |

PURGE FILES BY ATTRIBUTES STATUS PACKET

| | 0 3 | 4 5 | 6 11 | 12 17 | 18 23 | 24 29 | 30 35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8 | RESERVED | | | | | | |
| 9 | RES | RESTART_SEGMENT_POINTER | | | | | |
| 10 | RESERVED | | | | | | |
| 11 34 | DESTAGE REQUEST TABLE | | | | | | |
| 35 119 | RESERVED | | | | | | |
| 120 127 | RESERVED FOR SOFTWARE | | | | | | |

Figure 85:
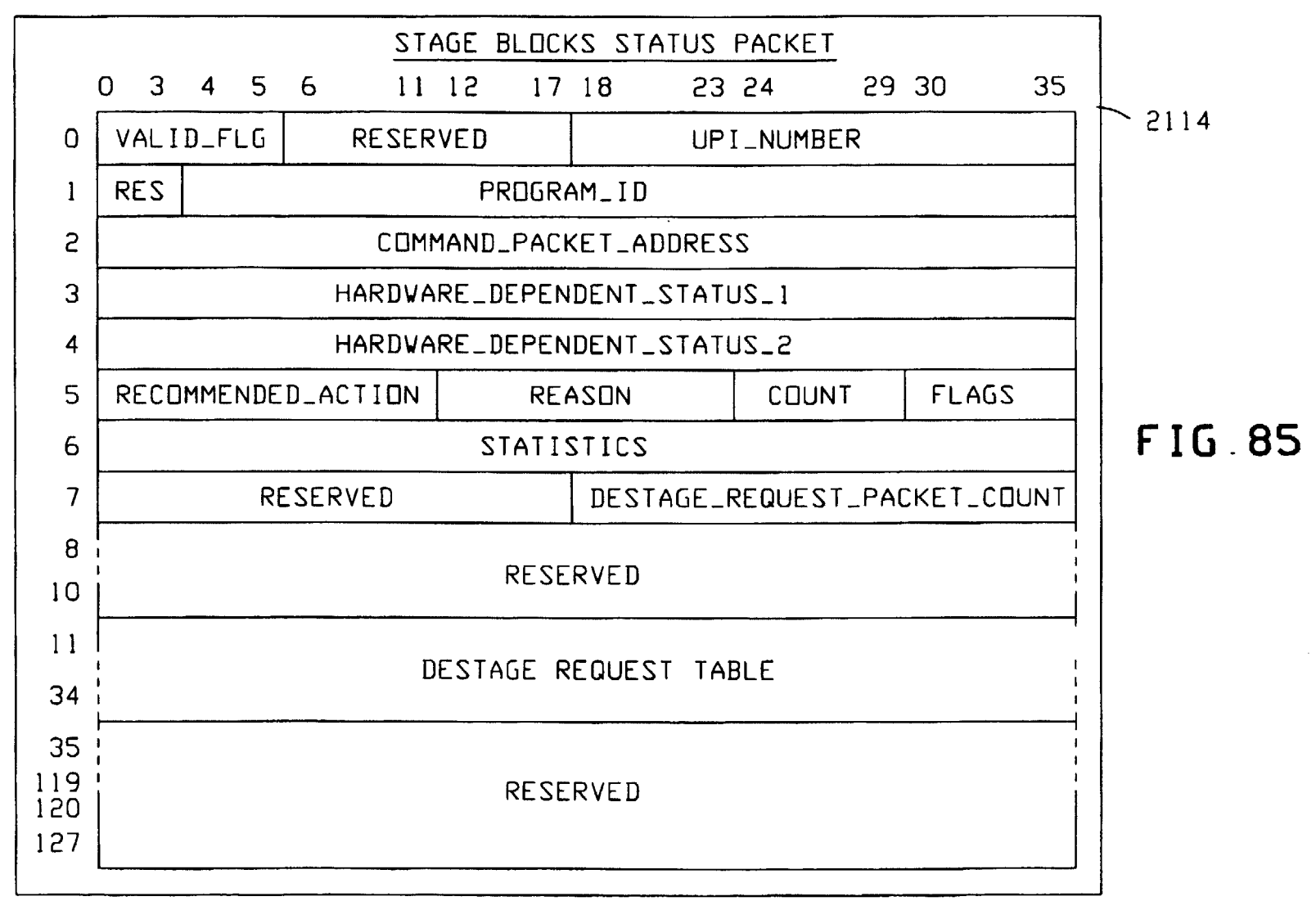

STAGE BLOCKS STATUS PACKET

| Word | Bits | Field |
| --- | --- | --- |
| 0 | 0–5 | VALID_FLG |
| 0 | 6–17 | RESERVED |
| 0 | 18–35 | UPI_NUMBER |
| 1 | 0–3 | RES |
| 1 | 4–35 | PROGRAM_ID |
| 2 | 0–35 | COMMAND_PACKET_ADDRESS |
| 3 | 0–35 | HARDWARE_DEPENDENT_STATUS_1 |
| 4 | 0–35 | HARDWARE_DEPENDENT_STATUS_2 |
| 5 | 0–11 | RECOMMENDED_ACTION |
| 5 | 12–23 | REASON |
| 5 | 24–29 | COUNT |
| 5 | 30–35 | FLAGS |
| 6 | 0–35 | STATISTICS |
| 7 | 0–17 | RESERVED |
| 7 | 18–35 | DESTAGE_REQUEST_PACKET_COUNT |
| 8–10 | 0–35 | RESERVED |
| 11–34 | 0–35 | DESTAGE REQUEST TABLE |
| 35, 119, 120, 127 | 0–35 | RESERVED |

Figure 89:
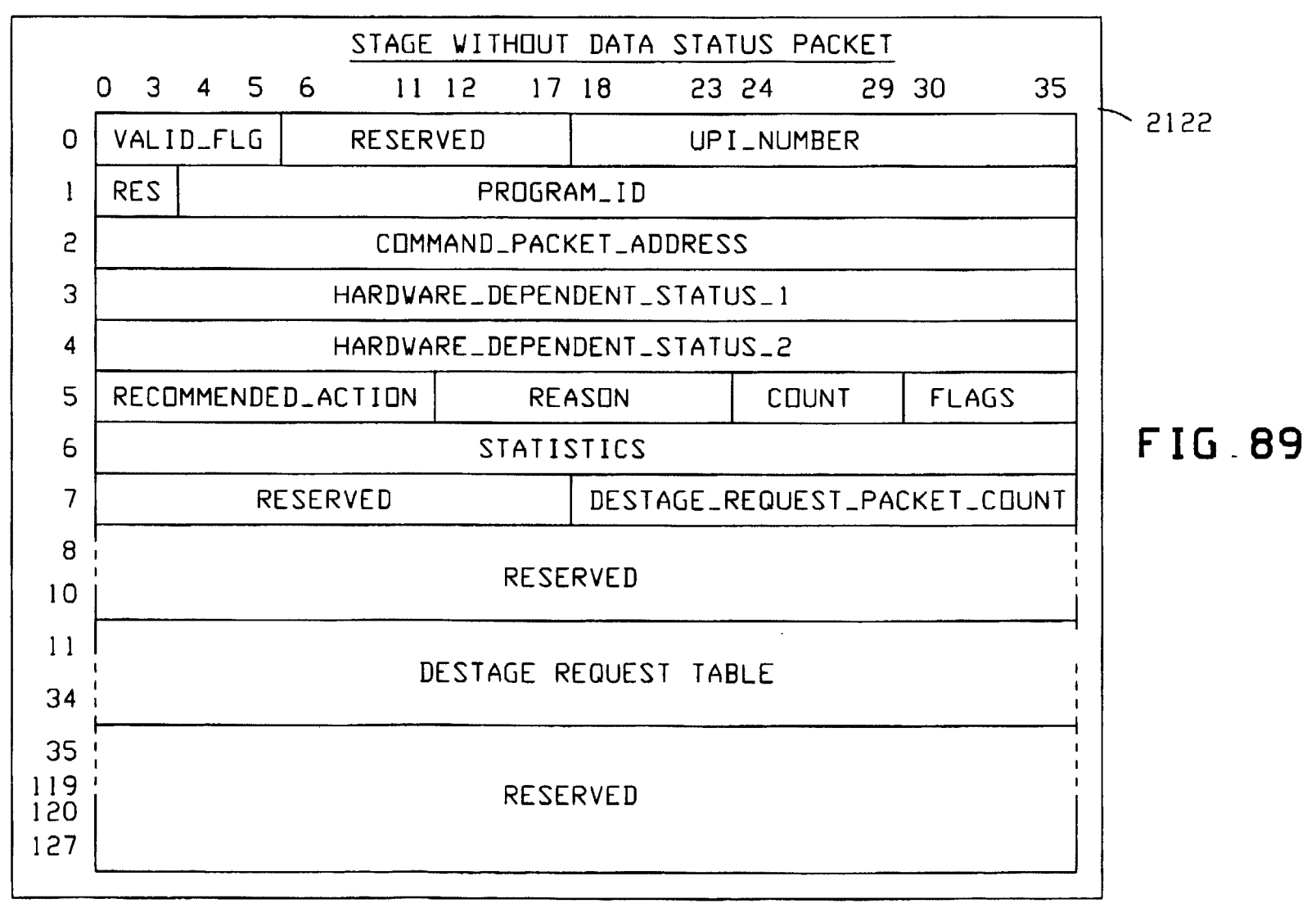

STAGE WITHOUT DATA STATUS PACKET

2122

| Word | 0–3 | 4–5 | 6–11 | 12–17 | 18–23 | 24–29 | 30–35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8–10 | RESERVED | | | | | | |
| 11–34 | DESTAGE REQUEST TABLE | | | | | | |
| 35–119, 120–127 | RESERVED | | | | | | |

WRITE STATUS PACKET

| Word | 0–3 | 4–5 | 6–11 | 12–17 | 18–23 | 24–29 | 30–35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8 | RESERVED | | | | SEGMENT_MISS_TEMPLATE | | |
| 9 | RESERVED | | | | | | |
| 10 | RESERVED | | | | | | |
| 11–34 | DESTAGE REQUEST TABLE | | | | | | |
| 35–119, 120–127 | RESERVED | | | | | | |

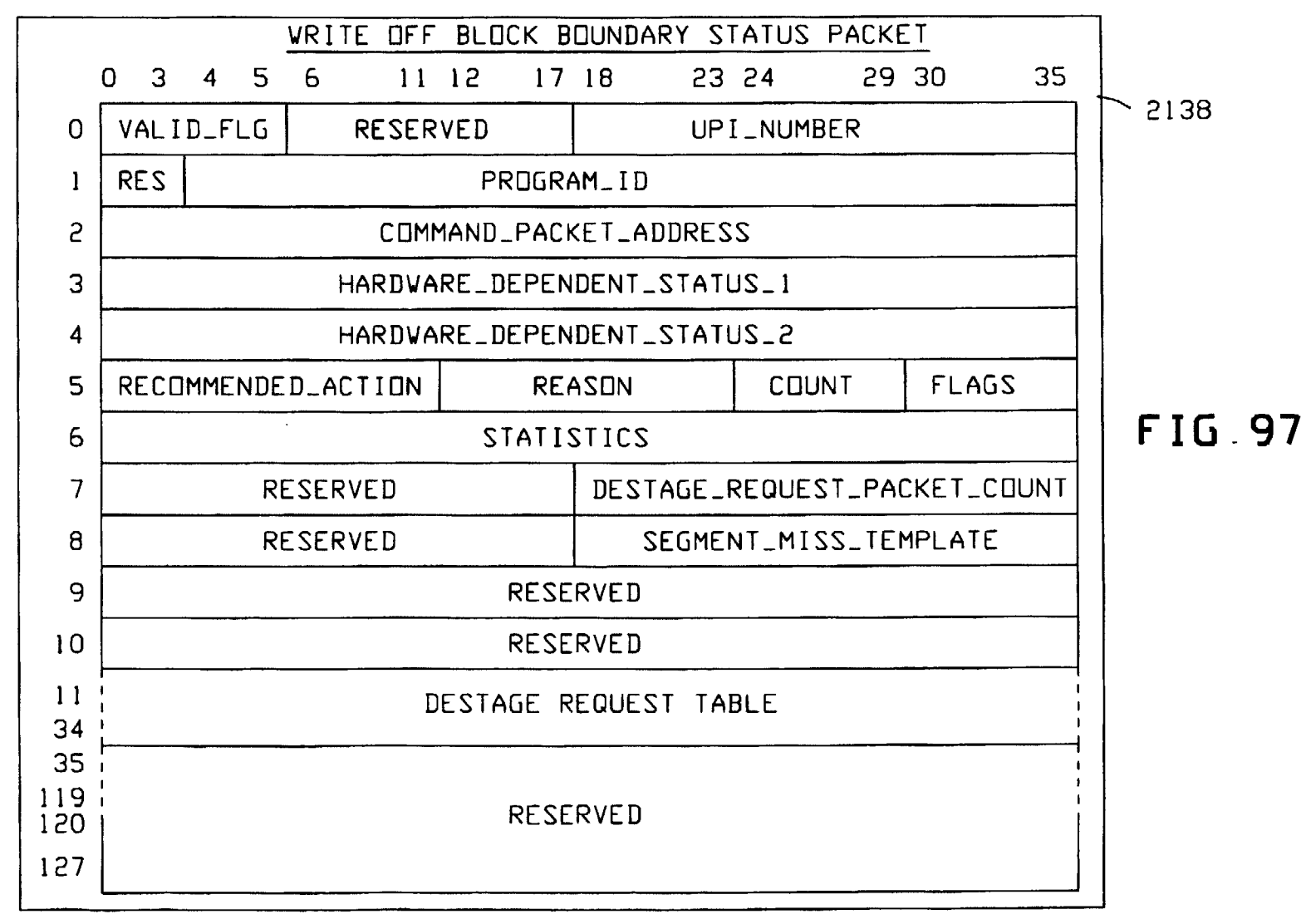

WRITE OFF BLOCK BOUNDARY STATUS PACKET

2138

| Word | 0 3 | 4 5 | 6 11 | 12 17 | 18 23 | 24 29 | 30 35 |
|---|---|---|---|---|---|---|---|
| 0 | VALID_FLG | | RESERVED | | UPI_NUMBER | | |
| 1 | RES | PROGRAM_ID | | | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | | COUNT | FLAGS |
| 6 | STATISTICS | | | | | | |
| 7 | RESERVED | | | | DESTAGE_REQUEST_PACKET_COUNT | | |
| 8 | RESERVED | | | | SEGMENT_MISS_TEMPLATE | | |
| 9 | RESERVED | | | | | | |
| 10 | RESERVED | | | | | | |
| 11 34 | DESTAGE REQUEST TABLE | | | | | | |
| 35 119 120 127 | RESERVED | | | | | | |

FIG. 97

OUTBOARD FILE CACHE SYSTEM

TABLE OF CONTENTS

I. BACKGROUND OF THE INVENTION
- A. Field of the Invention
- B. General Background

II. SUMMARY OF THE INVENTION

III. BRIEF DESCRIPTION OF THE DRAWINGS

IV. DESCRIPTION OF THE PREFERRED EMBODIMENT
- A. Host Data Processing System
- B. Prior Art Data Storage Hierarchy
- C. File Cache System Overview
- 1. Functional Block Diagram
- 2. Data Flow
  - a. Command Packet
  - b. Program Initiation Queue
  - c. Status Packet Queue and Program Status Packet
- 3. File Space Management
- 4. Major Component Overview
  - a. Host Software
    - (1) Input/Output Software
    - (2) File Cache Handler Software
  - b. Data Mover (DM) and Host Interface Adapter (HIA)
  - c. Index Processor (IXP)
  - d. Storage Interface Controller (SICT)
  - e. Non-volatile Storage (NVS)
  - f. Street Interprocessor Network
- 5. Multi-Host Capability
- D. File Cache Handler Software Detailed Description
- 1. Data Transfer
- 2. Host Local Buffers and Outboard File Cache Buffer
- 3. DATA_DESCRIPTOR_WORD and Data Chain
- 4. Status Processing
- 5. Destage Process
- 6. READ Command
  - a. READ Command Packet
  - b. FILE_IDENTIFIER
  - c. READ Status Packet
  - d. Destage Request Packet
- 7. ALLOCATE Command
  - a. ALLOCATE Command Packet
  - b. ALLOCATE Status Packet
- 8. CLEAR PENDING Command
  - a. CLEAR PENDING Command Packet
  - b. CLEAR PENDING Status Packet
- 9. DESTAGE Command
  - a. DESTAGE Command Packet
  - b. DESTAGE Status Packet
  - c. Segment Information Packet
- 10. DESTAGE COMPLETE Command
  - a. DESTAGE COMPLETE Command Packet
  - b. DESTAGE COMPLETE Status Packet
- 11. DESTAGE AND PURGE DISK Command
  - a. DESTAGE AND PURGE DISK Command Packet
  - b. DESTAGE AND PURGE DISK Status Packet
- 12. DESTAGE AND PURGE FILE Command
  - a. DESTAGE AND PURGE FILE Command Packet
  - b. DESTAGE AND PURGE FILE Status Packet
- 13. DESTAGE AND PURGE FILES BY ATTRIBUTES Command
  - a. DESTAGE AND PURGE FILES BY ATTRIBUTES Command Packet
  - b. DESTAGE AND PURGE FILES BY ATTRIBUTES Status Packet
- 14. LOCK CACHE FILE Command
  - a. LOCK CACHE FILE Command Packet
  - b. LOCK CACHE FILE Status Packet
- 15. LOCK CACHE FILES BY ATTRIBUTES Command
  - a. LOCK CACHE FILES BY ATTRIBUTES Command Packet
  - b. LOCK CACHE FILES BY ATTRIBUTES Status Packet
- 16. MODIFY File Descriptor Command
  - a. MODIFY File Descriptor Command Packet
  - b. MODIFY File Descriptor Status Packet
- 17. PURGE DISK Command
  - a. PURGE DISK Command Packet
  - b. PURGE DISK Status Packet
- 18. PURGE FILE Command
  - a. PURGE FILE Command Packet
  - b. PURGE FILE Status Packet
- 19. PURGE FILES BY ATTRIBUTES Command
  - a. PURGE FILES BY ATTRIBUTES Command Packet
  - b. PURGE FILES BY ATTRIBUTES Status Packet
- 20. RETURN SEGMENT STATE Command
  - a. RETURN SEGMENT STATE Command Packet
  - b. RETURN SEGMENT STATE Status Packet
  - c. Segment State Packet
- 21. STAGE BLOCKS Command
  - a. STAGE BLOCKS Command Packet
  - b. STAGE BLOCKS Status Packet
- 22. STAGE SEGMENTS Command
  - a. STAGE SEGMENTS Command Packet
  - b. STAGE SEGMENTS Status Packet
- 23. STAGE WITHOUT DATA Command
  - a. STAGE WITHOUT DATA Command Packet
  - b. STAGE WITHOUT DATA Status Packet
- 24. UNLOCK CACHE FILE Command
  - a. UNLOCK CACHE FILE Command Packet
  - b. UNLOCK CACHE FILE Status Packet
- 25. UNLOCK CACHE FILES BY ATTRIBUTES Command
  - a. UNLOCK CACHE FILES BY ATTRIBUTES Command Packet
  - b. UNLOCK CACHE FILES BY ATTRIBUTES Status Packet
- 26. WRITE Command
  - a. WRITE Command Packet
  - b. WRITE Status Packet
- 27. WRITE OFF BLOCK BOUNDARY Command
  - a. WRITE OFF BLOCK BOUNDARY Command Packet
  - b. WRITE OFF BLOCK BOUNDARY Status Packet
- E. Index Processor (IXP) Detailed Description
- 1. Data Structures
- 2. Index Processor Processing

V. CLAIMS

Appendix
- A. Glossary and Acronyms

I. BACKGROUND OF THE INVENTION

A. Field of the Invention

This invention relates to data storage architectures used by data processing systems, and more particularly to a system for outboard caching of file data.

B. General Background

The performance of data processing systems has improved dramatically through the years. While new technology has brought performance improvements to all functional areas of data processing systems, the advances in some areas have outpaced the advances in other areas. For example, advancements in the rate at which computer instructions can be executed have far exceeded improvements in the rate at which data can be retrieved from storage devices and supplied to the instruction processor. Thus, applications that are input/output intensive, such as transaction processing systems, have been constrained in their performance enhancements by data retrieval and storage performance.

The relationship between the throughput rate of a data processing system, input/output (I/O) intensity, and data storage technology is discussed in "Storage hierarchies" by E. I. Cohen, et al., IBM Systems Journal, 28 No. 1 (1989). The concept of the storage hierarchy, as discussed in the article, is used here in the discussion of the prior art. In general terms, the storage hierarchy consists of data storage components within a data processing system, ranging from the cache of the central processing unit at the highest level of the hierarchy, to direct access storage devices at the lowest level of the hierarchy. I/O operations are required for access to data stored at the lowest level of the storage hierarchy.

Varied attempts have been made to relieve the I/O bottleneck which constrains the performance of I/O intensive applications. Three ways in which the I/O bottleneck has been addressed include solid state disks, cache disks, and file caches.

Solid state disks (SSDs) were invented to address the relatively slow electromechanical speeds at which data stored on magnetic disks is read or written. SSDs are implemented using dynamic random access memory (DRAM) technology. The logical organization of the DRAM corresponds to the particular magnetic disk which the SSD is emulating. This allows software applications to access files stored on the SSD in the same manner they would access files stored on a magnetic disk.

The major advantage SSDs have over magnetic disks is that data can be read or written at electronic speeds rather than the electromechanical speeds of magnetic disks. An application's throughput may be significantly improved if the application makes a substantial number of disk requests to an SSD rather than a magnetic disk.

At least three problems persist with SSDs. First, the data path length for making requests to the SSD remains the same as for magnetic disks; second, the overhead involved in addressing the proper location in SSD storage is still allotted to the instruction processor or central processing unit; and third, a fault tolerant SSD configuration requires two write operations for data security. All three problems result in added processing time and reduced system throughput.

The first disadvantage associated with SSDs remains because a SSD resides at the same level of the data storage hierarchy as a magnetic disk. To access a given file at a particular location within the file (offset), the file and offset must be located in the storage hierarchy: the SSD on which the file is stored must be identified; the disk controller which provides access to the SSD must be identified; the input/output channel to which the disk controller is coupled must be identified; and the input/output processor to which controls the input/output channel must be identified. All this processing is performed by the instruction processor. While the instruction processor is performing these tasks, others must wait, and the result is a reduction in the overall data processing throughput rate. Furthermore, the application seeking access to the file data must wait for the input/output request to travel to the I/O processor, through the I/O channel, through the disk controller, to the desired disk, and back up the data path to the application.

The second disadvantage for SSDs is that the instruction processor is required to map a relative file addresses to a physical disk address and manage allocation of SSD space. While the instruction processor is mapping file requests and managing disk space it cannot perform other tasks and the data processing system throughput rate suffers.

The third disadvantage associated with SSDs remains because two SSDs are required if fault tolerant capabilities are required. Fault tolerance with SSDs involves coupling two SSDs to a data processing system through two different data paths. A backup SSD mirrors the data on the primary SSD and is available in the event of failure of the primary SSD. To keep the backup SSD synchronized with the primary SSD, the instruction processor must perform two write operations when updating a file: the first write operation updates the primary SSD, and the second write operation updates the backup SSD. This method adds additional overhead to the data processing system to the detriment of the system throughput rate.

A cache disk subsystem is a second invention which was made to address the I/O bottleneck. U.S. Pat. No. 4,394,733, issued to Robert Swenson discloses a cache disk subsystem. The cache disk subsystem utilizes DRAM storage for buffering portions of magnetic disks, and resides at the disk controller level of the data storage hierarchy so that portions of a plurality of magnetic disks can be cached.

The chief advantage of the cache disk subsystem is that I/O requests addressing a portion of a disk which is cached can be processed at electronic speeds rather than the electromechanical speed of a disk. While this advantage is substantial, the cache disk subsystem's position in the data storage hierarchy constricts the flow of I/O requests. The I/O performance gained by cache disk subsystems is limited by the data path length and numerous files competing for limited cache storage space. Because the caching of disk storage takes place at the disk controller level of the data storage hierarchy, the operating system must determine the appropriate data path in the same manner as described with the SSD. As described above, a lengthy data path reduces overall system throughput.

Where a large number of files compete for cache disk subsystem cache space, the I/O performance gains may be severely limited due to excess overhead processing. If two or more files have a high I/O request rate and they are stored on the same or different disks under a common disk controller, a substantial amount of the processing performed by the cache disk subsystem may be overhead. The overhead is incurred when most or all of cache storage is in use, and the cache disk subsystem is experiencing a high miss rate. A miss is defined as an I/O request which references a portion of disk which is not currently in cache storage. When a miss occurs, the cache disk subsystem must select a segment of cache storage to allocate to the latest I/O request (the selected segment may currently hold a different portion of different disk), and read the referenced portion of disk and store it in the cache segment. If this processing is required for a large proportion of I/O requests, the benefit of caching disk storage is lost to overhead processing.

One way in which the aforementioned problem is addressed is by separating files with a high access rate by storing them on separate disks under different storage controllers. This solution is expensive in two respects. First, human resources are required to physically separate the files and ensure that the operating system has the correct configuration information. Continual monitoring is required to detect when the location of files is hampering the I/O rate, and then redistributing files as necessary. Second, hardware costs are substantial because additional disks, disk controllers, and cache disk subsystems are required to physically separate the files.

A third strategy for relieving the I/O bottleneck is file caching. File caching differs from cache disk subsystems in that file data is buffered in main DRAM storage of a data processing system, and file management software manages allocation of main storage for file buffers. In "Scale and Performance in a Distributed File System" by John Howard, et al., ACM Transactions on Computer Systems, 6, No. 1, (1988), 51–81; "Caching in the Sprite Network File System", by Michael Nelson, et al., ACM Transactions on Computer Systems, 6, No. 1, (1988), 134–154; and U.S. Pat. No. 5,163,131, entitled, "Parallel I/O Network File Server Architecture", to Edward Row, et al., three different approaches to file caching are discussed.

The file caching described in "Scale and Performance in a Distributed File System" involves files which are distributed across a network of workstations. Each workstation contains server software for providing access to each of the files it manages. File cache software on the workstation seeking access to a selected file locates the server which controls access to the file and requests the file data from the server software. The file cache software stores the file data it receives on the local disk storage of the client workstation. In contrast, the file cache system described in "Caching in the Sprite Network File System" caches file data to the main memory of the client workstation. The disadvantages with each approach are readily apparent.

With the first approach to file caching, the "cached" file data is stored on a disk controlled by the client workstation. This means that the rate at which file data can be accessed is still dependent upon the access rate of the local disk. Furthermore, any updates to the locally cached file must be written to the server's version of the file before other clients are allowed to access the file.

While the second approach provides access to file data at main memory access speed, it is still burdened with the overhead of keeping the server's version of the file consistent with the client's cached version. In addition, file data loss is also possible if main memory on the client workstation fails. In particular, if the cached file is updated and the client workstation crashes before the update is forwarded to the server, the file update may be lost. Therefore, to provide file data integrity for a file update occurring on the client, before the operation is allowed to complete, the file update must be transmitted to the server workstation and stored on its disk.

U.S. Pat. No. 5,163,131 also discusses a file cache architecture applicable to a networked workstation environment. In this patent, the file data is cached in the main memory of the server workstation. For other workstations on the network to access the file data cached on the server, network communication must be initiated for the transfer of file data. Thus, the benefits of file caching are limited by the amount of traffic on the network and the network bandwidth.

The current state of file caching schemes involves the tradeoff between the security of storing file data on disk and an increased access rate by storing the file data stored in main memory. Alternatively, the file data can be stored in electronic memories which are closer to the disk in the storage hierarchy, but the access rate is constrained by the length of the data path from an application to the electronic memory. Therefore, it would be desirable for a file cache to provide a high I/O rate while and still maintain data security which is comparable to disk storage.

II. SUMMARY OF THE INVENTION

It is an object of the invention to increase the rate at which access to file data is provided when the file data is not present in the main memory of a host.

Another object is to cache file data in storage which is non-volatile relative to a host.

A further object of the invention is to eliminate having to map a logical file access command to the physical storage device and storage device address of the backing store for the file where the data referenced in the logical file access command resides when the referenced data is present in the cache.

Still another object of the invention is to minimize the processing required to destage file data from the cache storage to storage device where the file data resides.

Yet another object is to cache file data from a plurality of hosts in shared cache storage.

A further object is to cache file data which is shared between a plurality of hosts.

Another object is to selectively allow files to permanently remain in cache storage, whereby files which are permanently in cache storage are not subject to cache replacement.

Still another object is to allow selected portions of files to permanently remain in cache storage, whereby the portions of files which are permanently in cache storage are not subject to cache replacement.

Another object is to dynamically vary the proportion of cache storage allocated to permanently cached files and files which are subject to cache replacement.

A further object is to selectively vary the level of cache replacement to which selected portions of files are subject.

According to the present invention, the foregoing and other objects and advantages are attained by coupling an outboard file cache to the input/output logic section of a host. The host issues file access commands which include a logical file-identifier and a logical offset. The outboard file cache includes a file descriptor table and cache memory for electronic random access storage of the cached files. The file descriptor table stores the logical file-identifiers and offsets of the portions of the files in the cache storage. Cache detection logic is interfaced with the file descriptor table and receives file access commands from the host. The file descriptor table is used to determine whether the portion of the file referenced by the file access command is present in the cache memory. Cache access control is responsive to the cache detection logic, and if the portion of the file referenced in the cache access command is present in cache memory, the desired access is provided. The outboard file cache is non-volatile relative to the main memory of the host because it is a separately powered storage system. Neither the host nor the outboard file cache is required to map the file data referenced in a file access command to the physical storage device and the physical address of the backing store on which the file data is stored if the referenced data is present in cache storage.

In accordance with yet another aspect of the invention, device identifiers and device addresses are stored in the file descriptor table for cached files. Destage initiation logic determines when it is necessary to destage a portion of a file in cache memory to the backing store on which the file is permanently stored. Destage control is responsive to the destage initiation logic and performs the destaging of file data from the outboard file cache to the backing store when prompted to do so by the destage initiation logic. The destage control is interfaced with the file descriptor table, whereby the device identifier and device address which specify the backing store to which the data is to be destaged are directly attainable. Mapping at destage time is minimized by pre-mapping, that is storing the device identifier and device address in the file descriptor table at the time file data is staged to the outboard file cache.

In an additional aspect of the invention a first and a second of host are coupled to the outboard file cache. The cache memory in the outboard file cache is shared between the files of the first host and the files of the second host The outboard file cache includes dual cache detection logic sections. Each of the cache detection logic sections may process file access commands from either the first host or the second host and each section operates concurrently with the other. The outboard file cache includes a first cache access control section and a second cache access control section. The first cache access control section is dedicated to providing access to the cache storage for the first host and the second cache access control section is dedicated to providing access to the cache storage for the second host.

In carrying out another aspect of the invention, file data in cache memory may be shared between a plurality of hosts. The outboard file cache includes a lock table which indicates the logical file and the portion of the file that is locked. Control is provided which is interfaced with the lock table and responsive to lock commands for locking selected files. The outboard file cache further includes control interfaced with the lock table and responsive to a cache miss condition for rejecting the access specified in a file access command if the referenced portion of the referenced file is locked and is not present in the cache storage.

Still another aspect of the invention involves selectively allowing files to permanently remain in cache memory, whereby files which are permanently in cache memory are not subject to cache replacement. File access commands further include a file data type indicator. The file data type indicator dictates whether the file data, once it is staged to cache storage, is eligible for cache replacement. File data present in cache storage which is not subject to cache replacement is referred to as resident data, and file data present in cache storage which is subject to cache replacement is referred to as replaceable data. Cache replacement control selects a portion of cache memory in which replaceable file data is presently stored for storage of data referenced in a file access command if the referenced data is not present in the cache and the file data type indicates replaceable data. Resident file storage control selects a portion of cache memory, in which neither replaceable nor resident file data is stored, for storage of data referenced in a file access command if the referenced data is not present in the cache and the file data type indicates resident file data.

In accordance with another aspect of the invention, the proportion of cache storage which is allocated to resident file data and the portion of cache storage which is allocated to replaceable file data is dynamically adjusted, thereby ensuring availability of adequate cache storage for each type of file. The cache storage is divided into two divisions, a first division for storing replaceable file data and a second division for storing resident file data. Apportioning control is responsive to the control for managing resident file storage. When all of the storage in the second division has resident file data stored therein, the apportioning control converts a predetermined amount of storage from the first division of storage to the second division of storage whereby additional cache storage is made available for resident file data. In addition, control is provided to monitor the amount of storage in the second division of cache storage in which resident file data is stored. The monitor establishes a periodic minimum usage level for the second division. The periodic minimum usage indicates the minimum amount of storage in which resident file data was stored over the prior predetermined period of time. Further control is provided which converts storage from the second division of cache storage to the first division of cache storage if the current amount of storage in the second division in which resident file data is stored falls below the periodic minimum.

Corresponding to another aspect of the invention, the priority to which file data in cache storage is subject cache replacement may be selectively varied in an incremental fashion, whereby portions of files for which future access is likely are temporarily made unavailable for cache replacement. A replacement level is provided to the cache system in the file data access command. If the data referenced in the command is not present in the cache, a portion of the cache is selected to which the data referenced in the command is staged. The particular portion of cache chosen is portion of cache in which data with the lowest designated replacement level is stored. As each of the other portions of cache are considered for replacement, their associated replacement levels are decremented, whereby each of the other portions of cache storage becomes a higher priority candidate for cache replacement.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

III. BRIEF DESCRIPTION OF THE DRAWINGS

Figures 7, 7A:
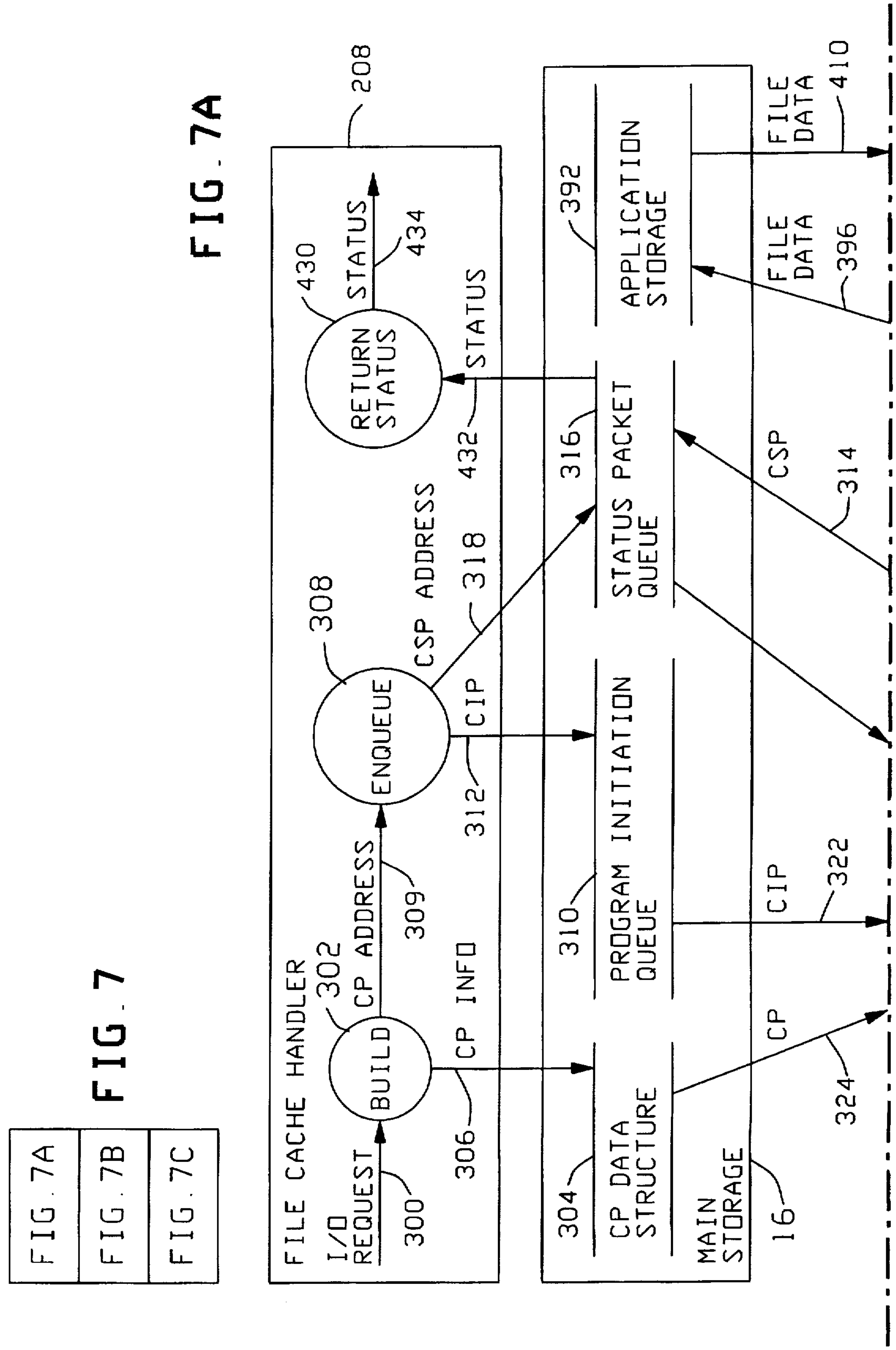
Figure 7B:
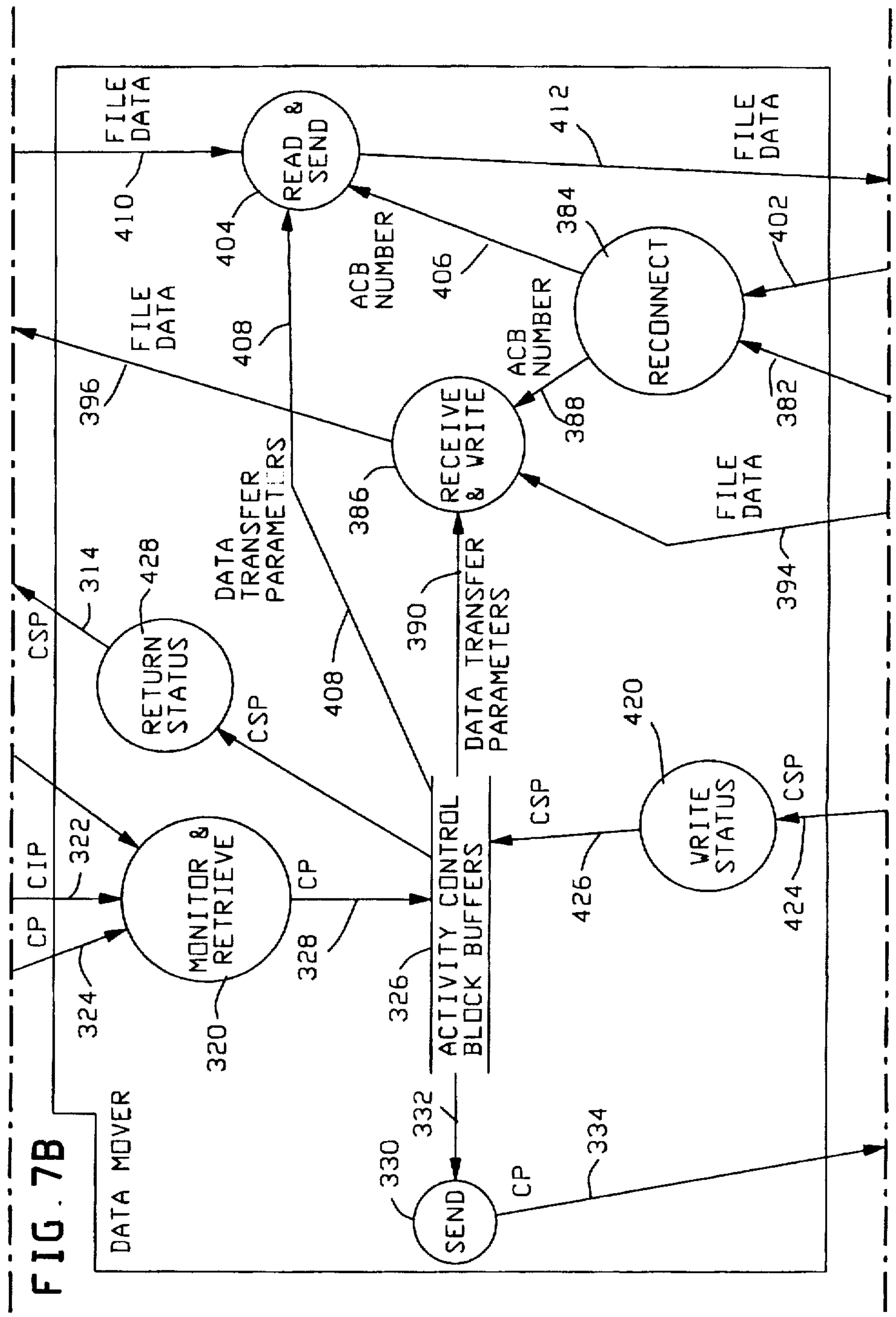
Figure 7C:
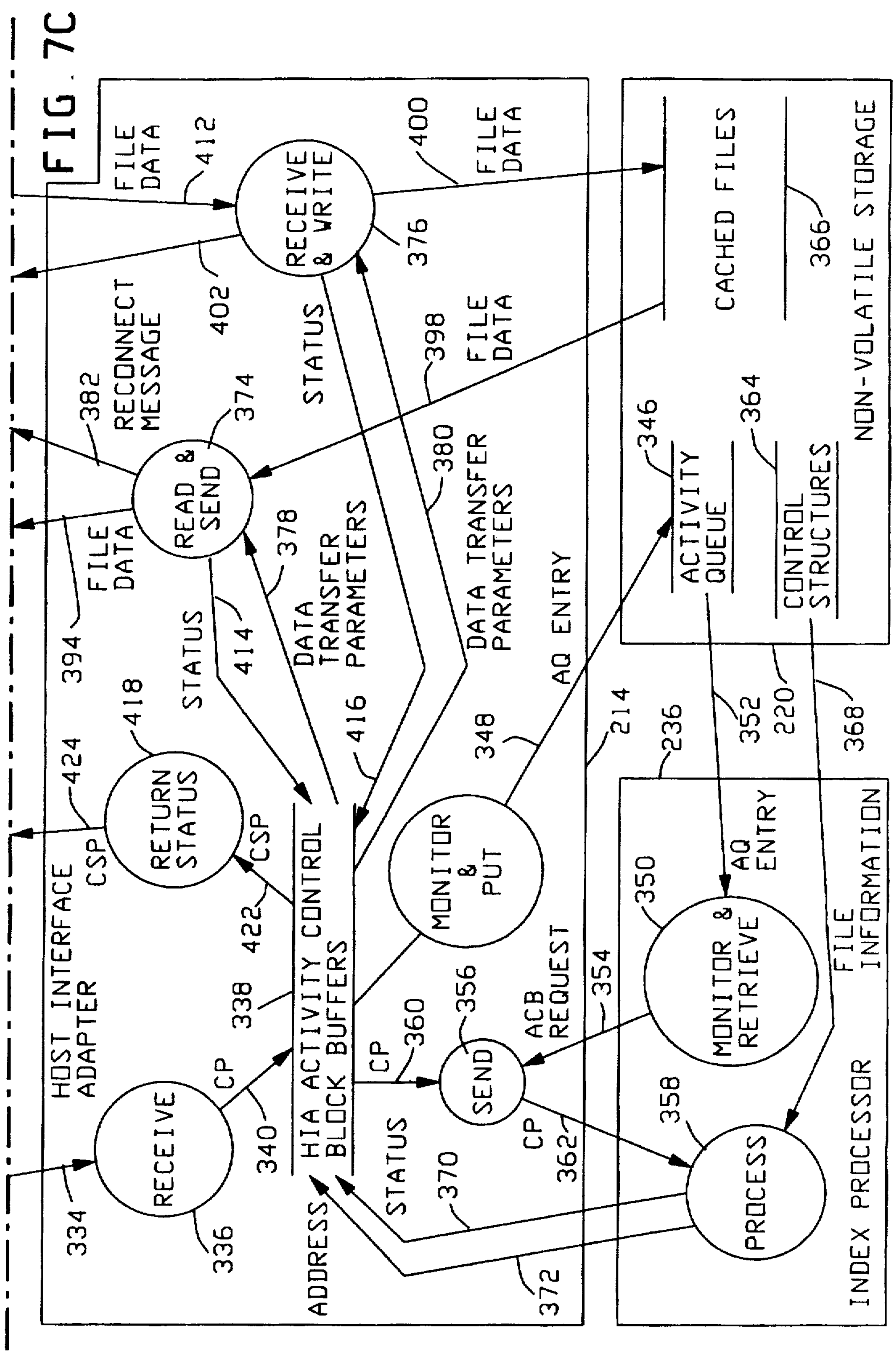
Figure 8:
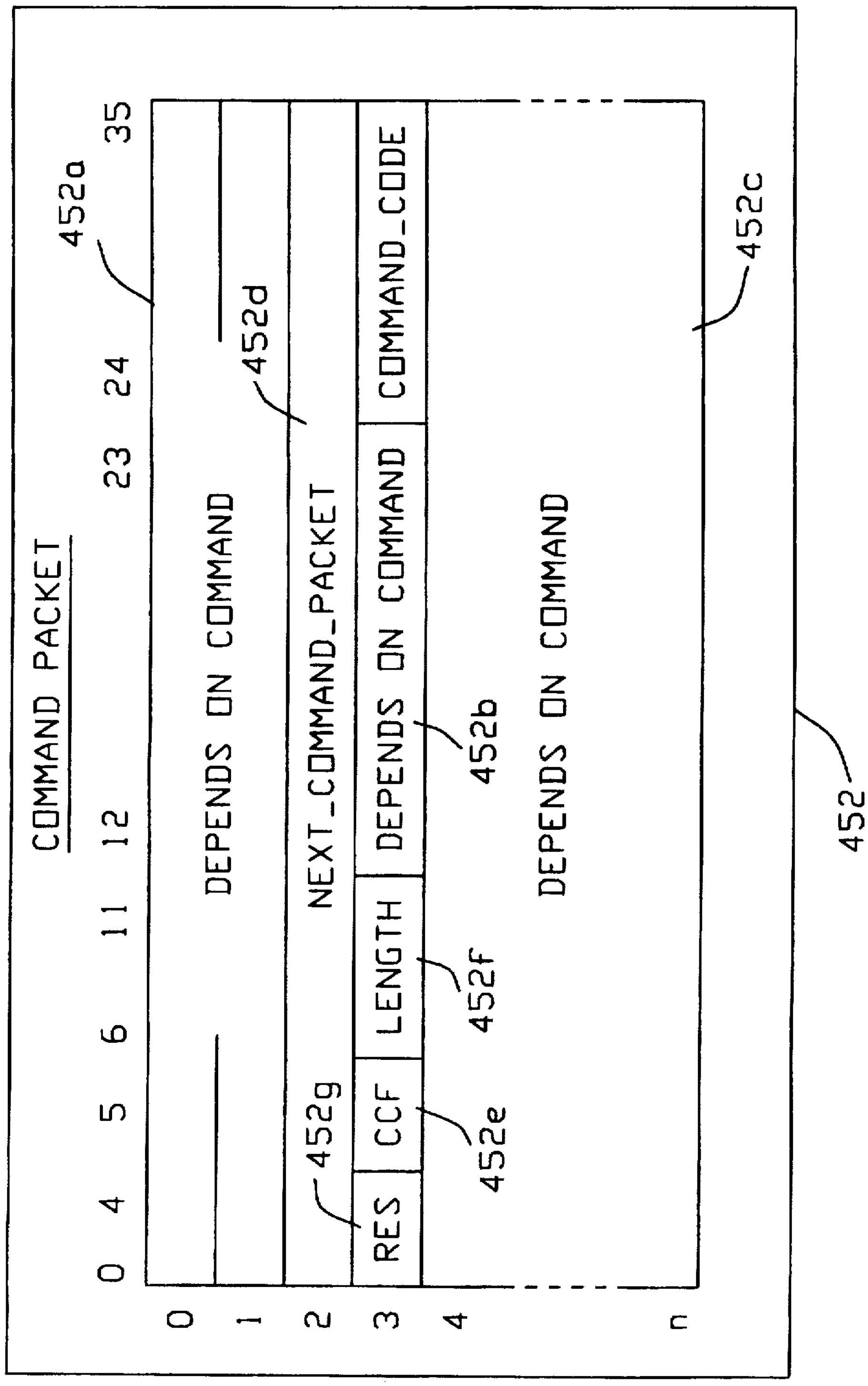
Figure 9:
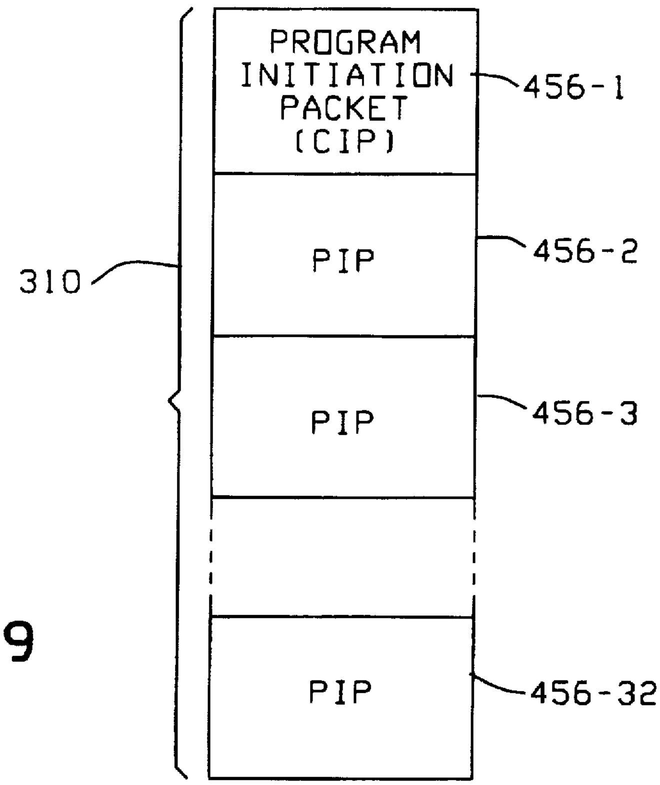
Figure 11:
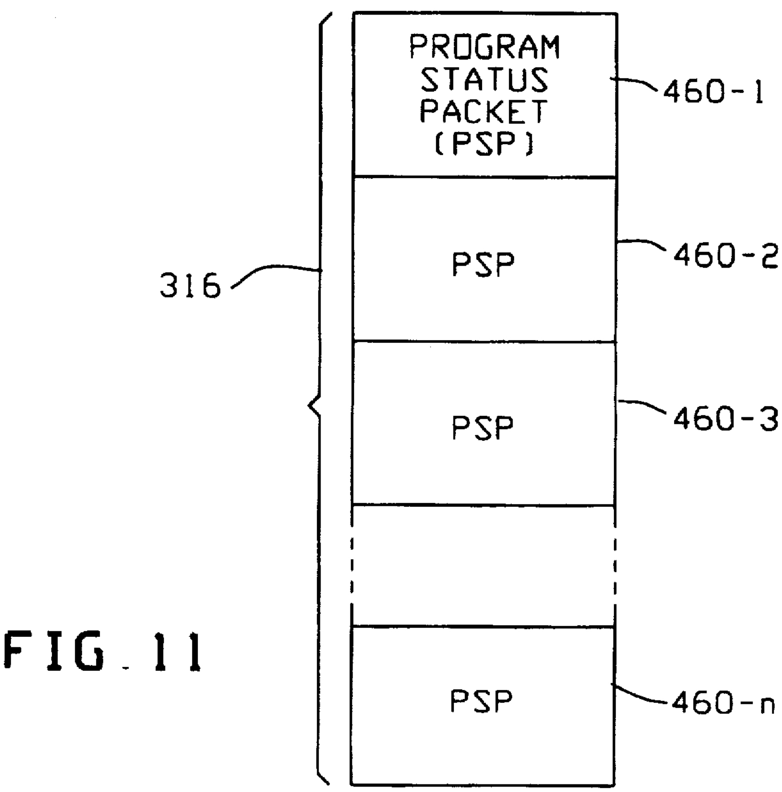
Figure 10:
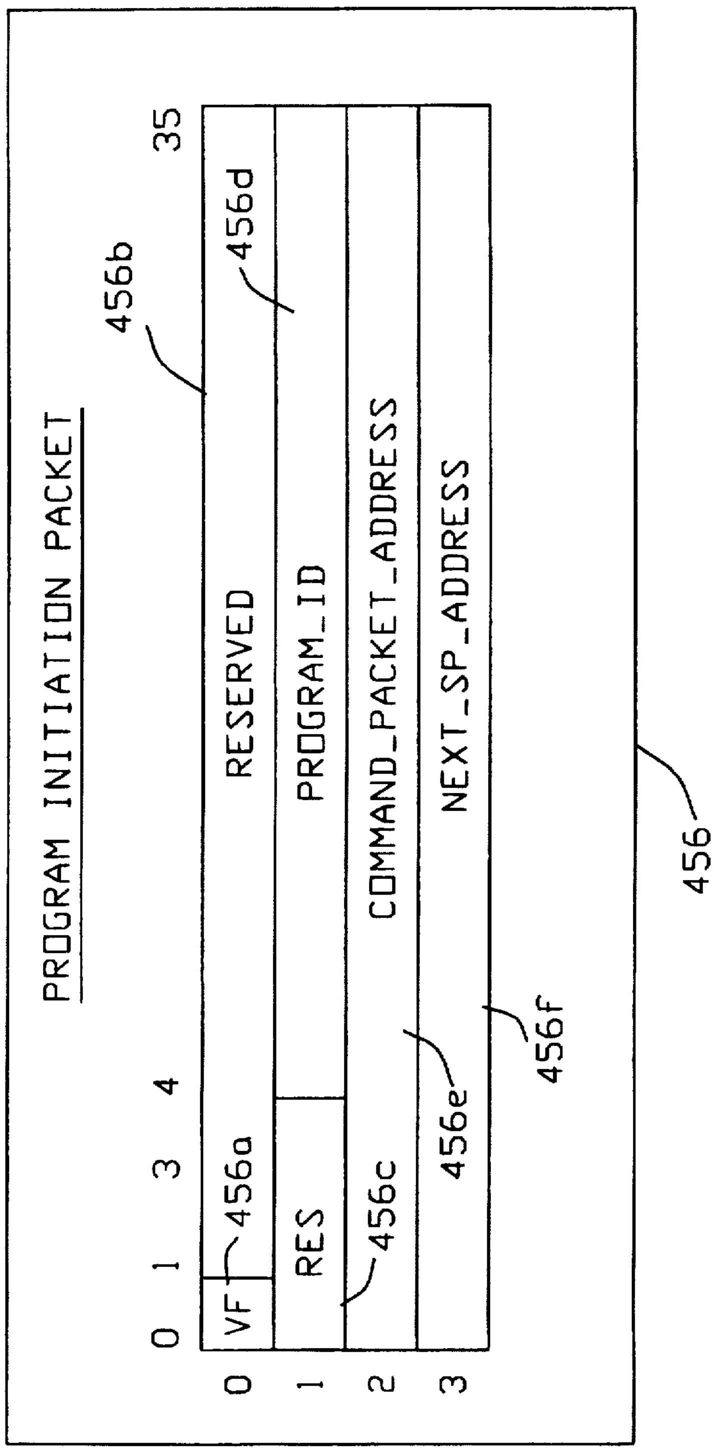
Figure 12:
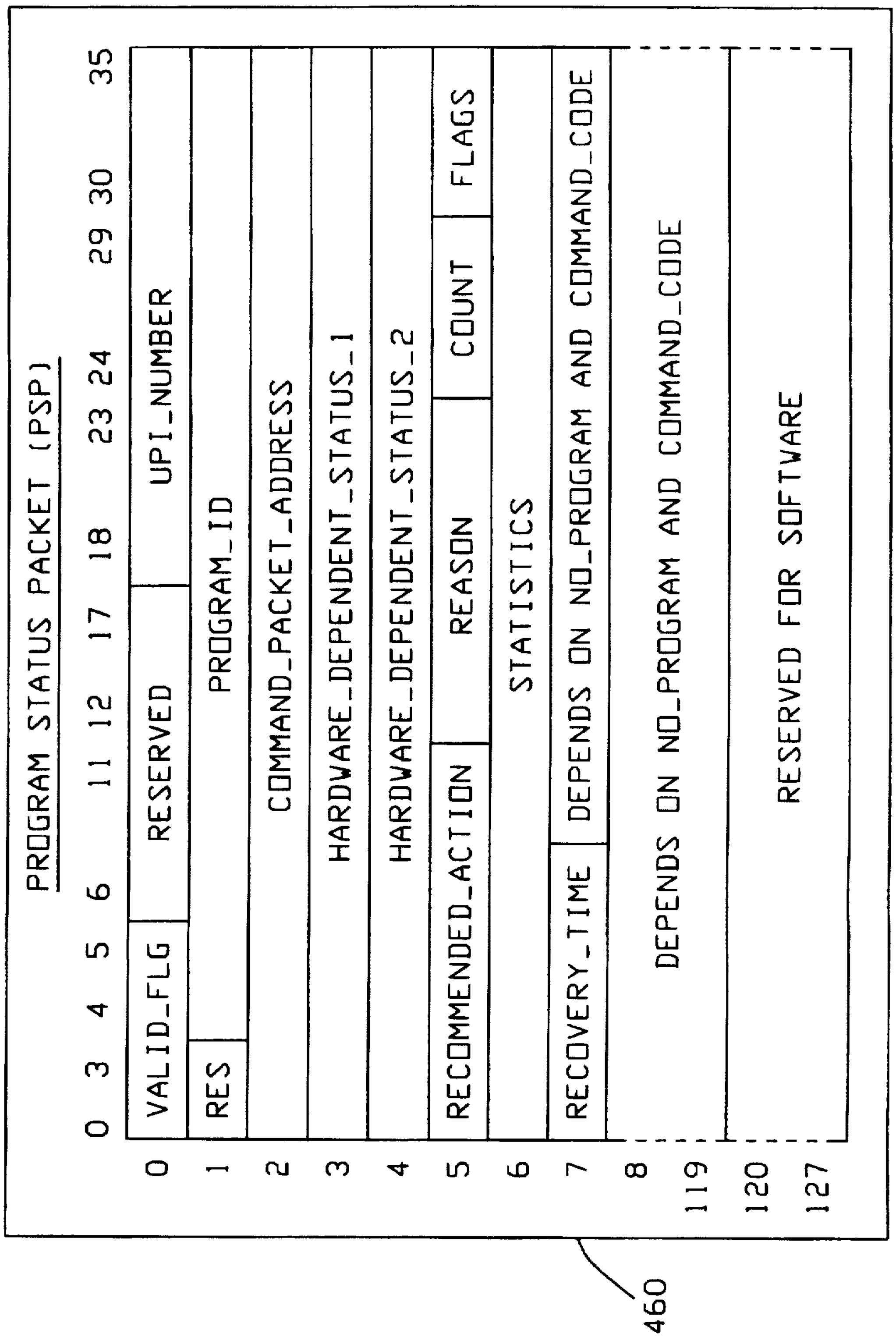
Figure 13:
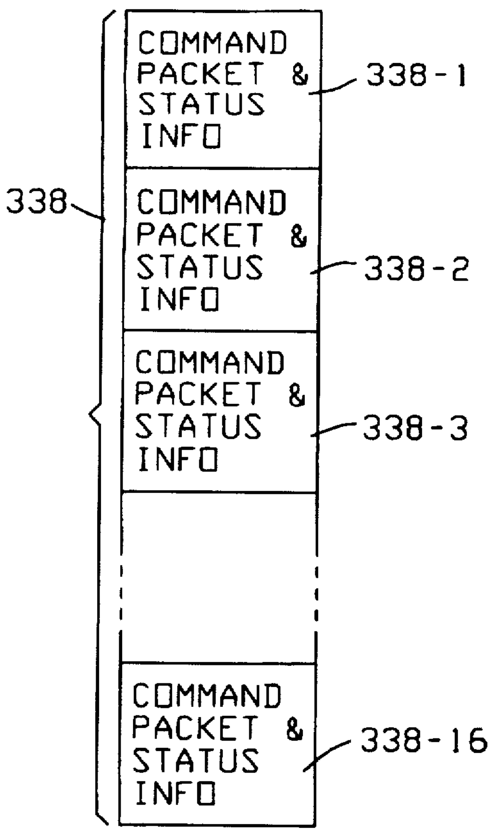
Figure 14:
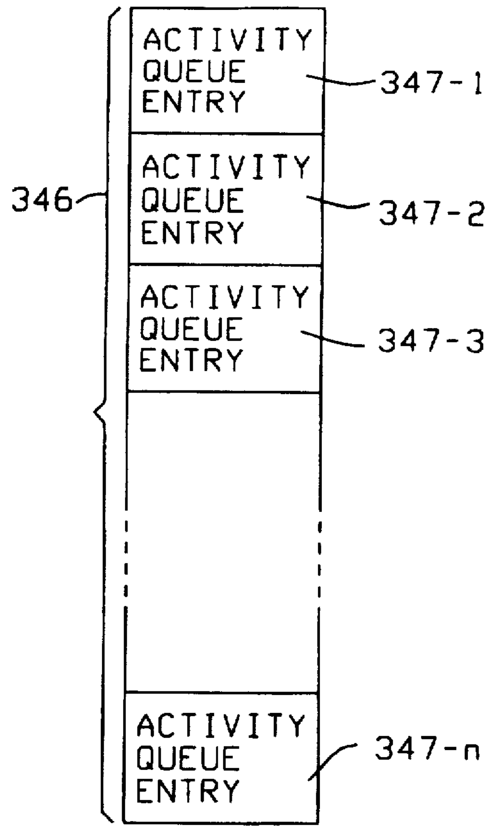
Figure 15:
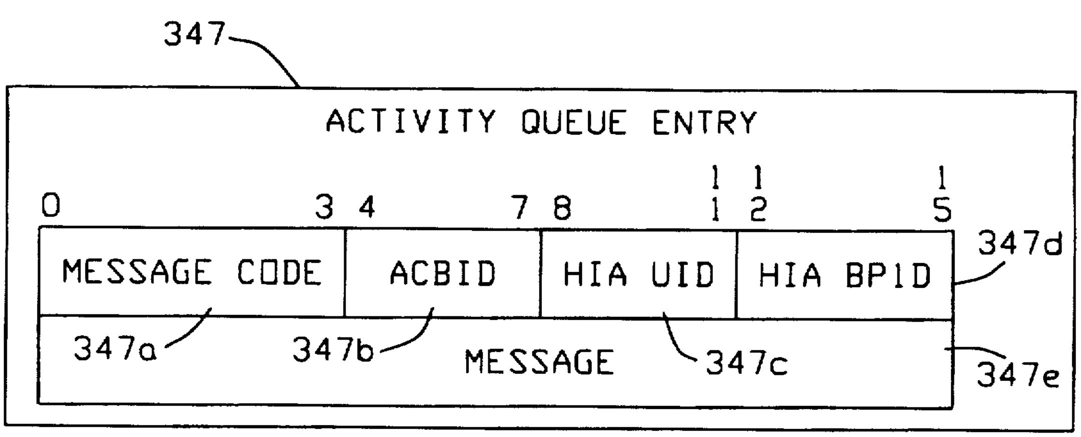
Figure 16:
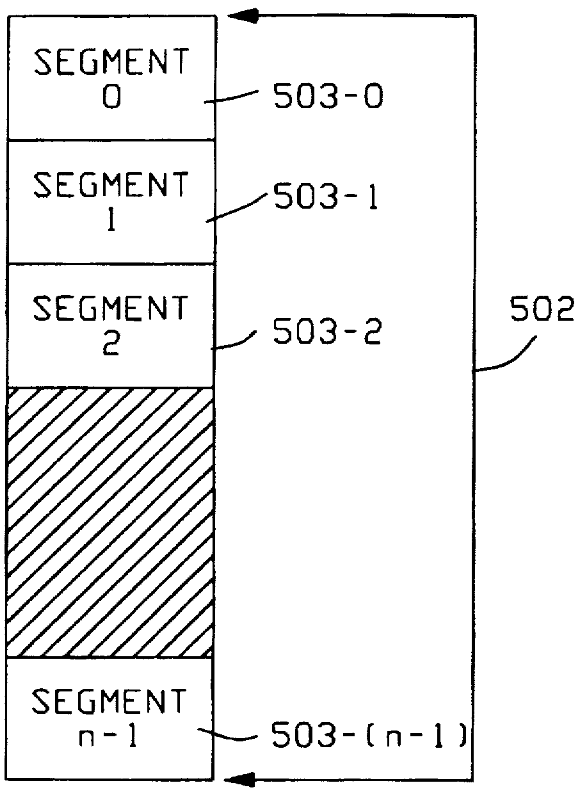
Figure 17:
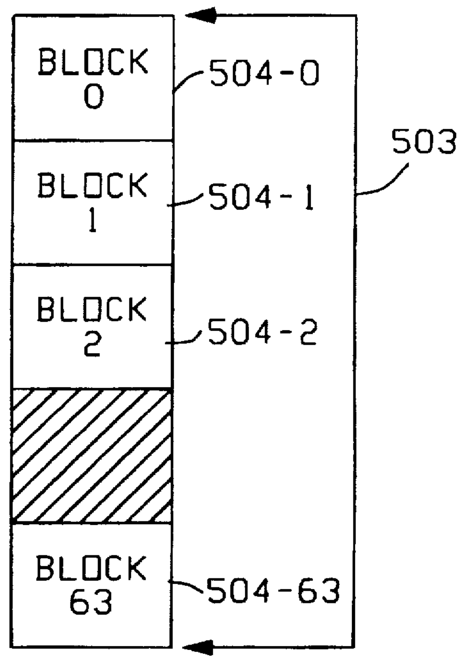
Figure 18:
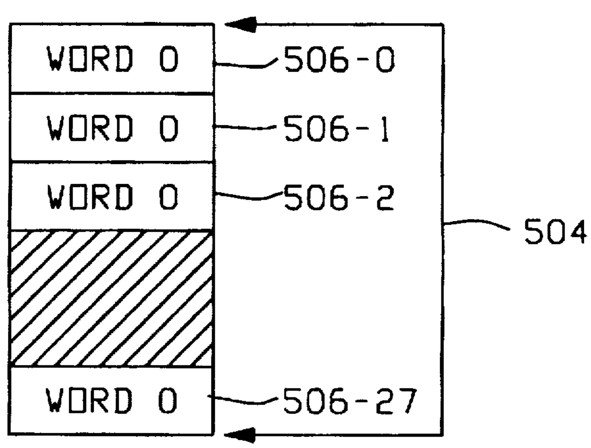
Figure 19:
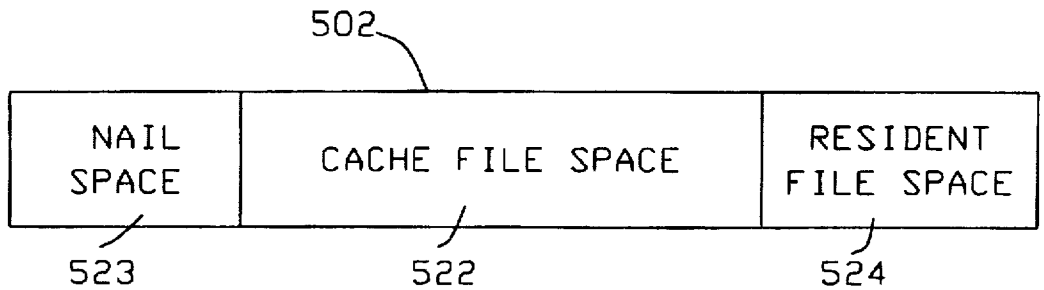
Figure 20:
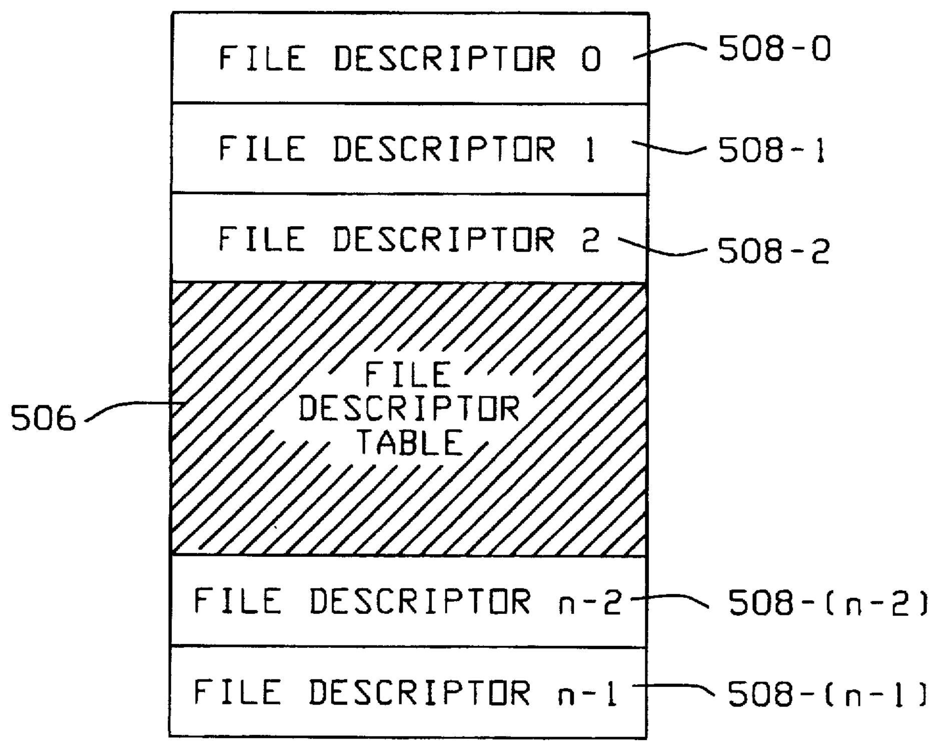
Figure 22:
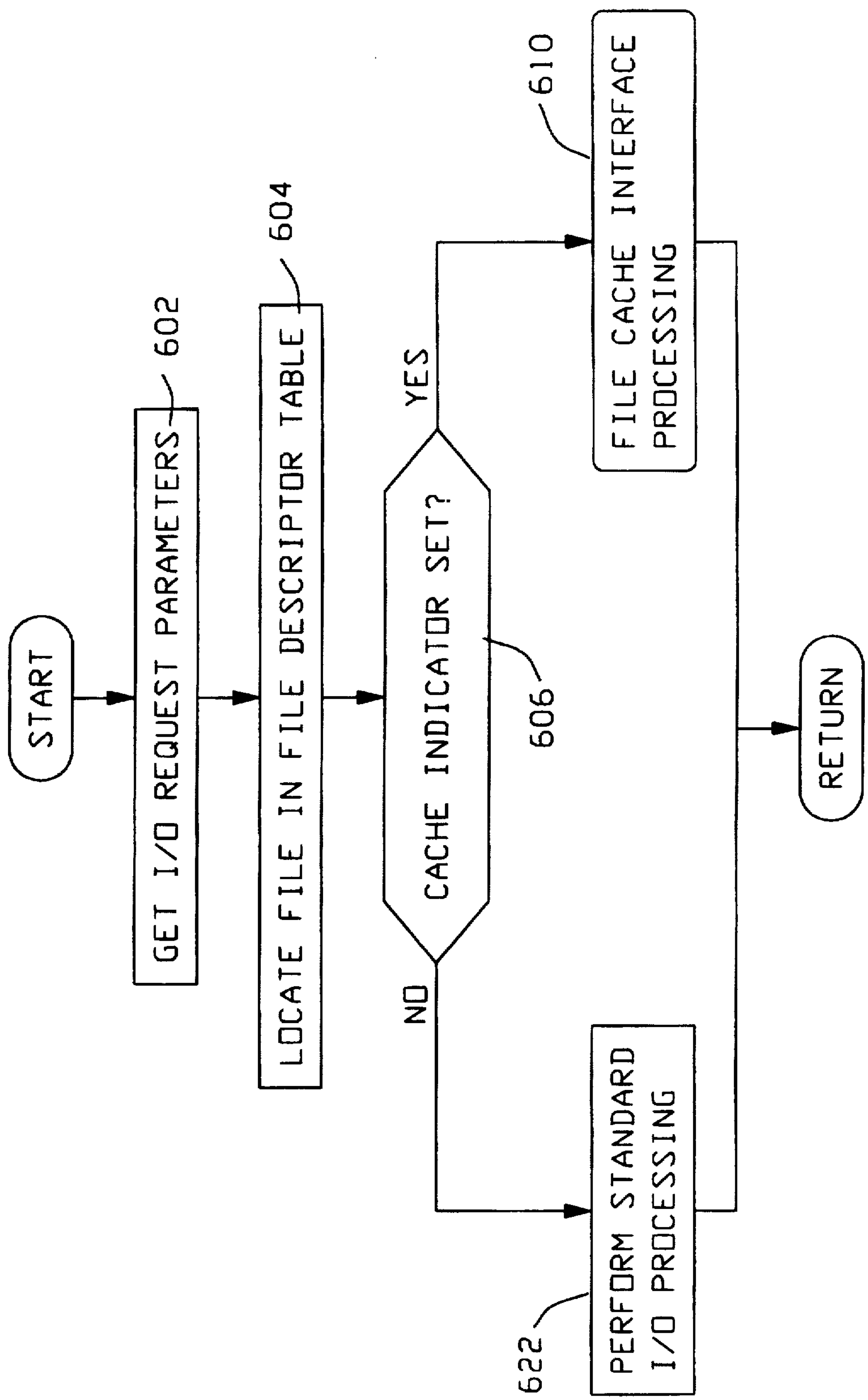
Figure 23:
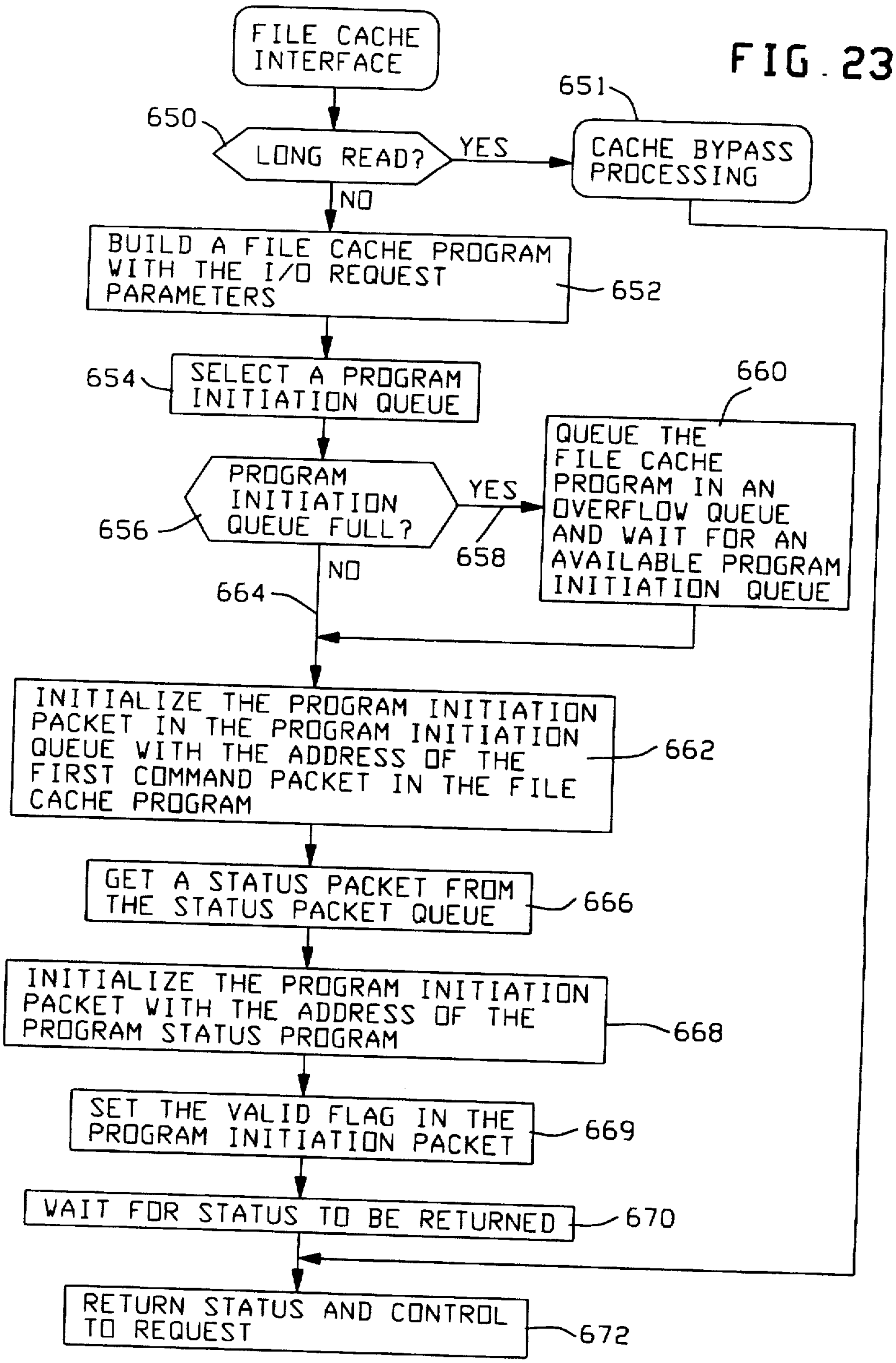
Figure 24:
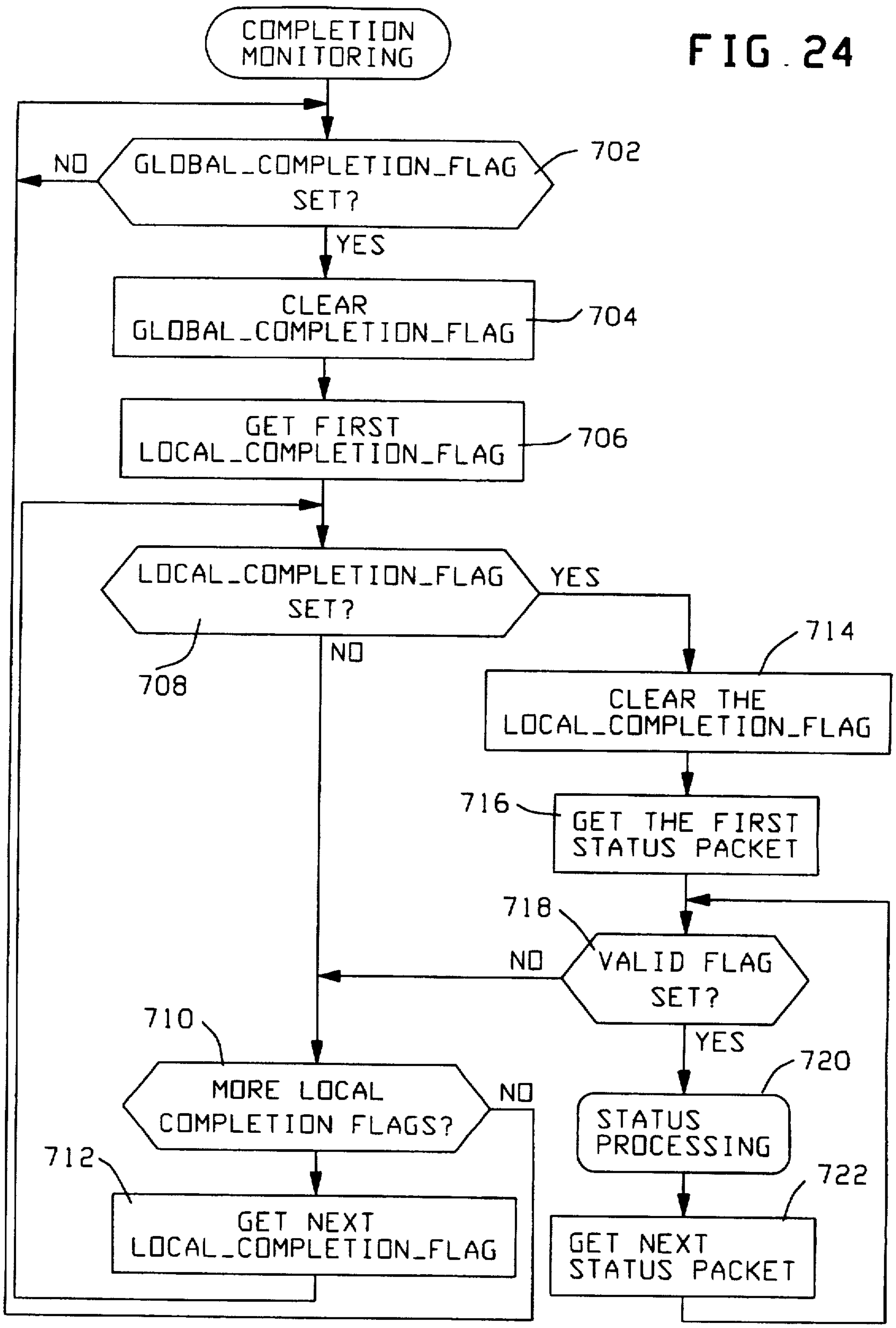
Figures 25, 25A:
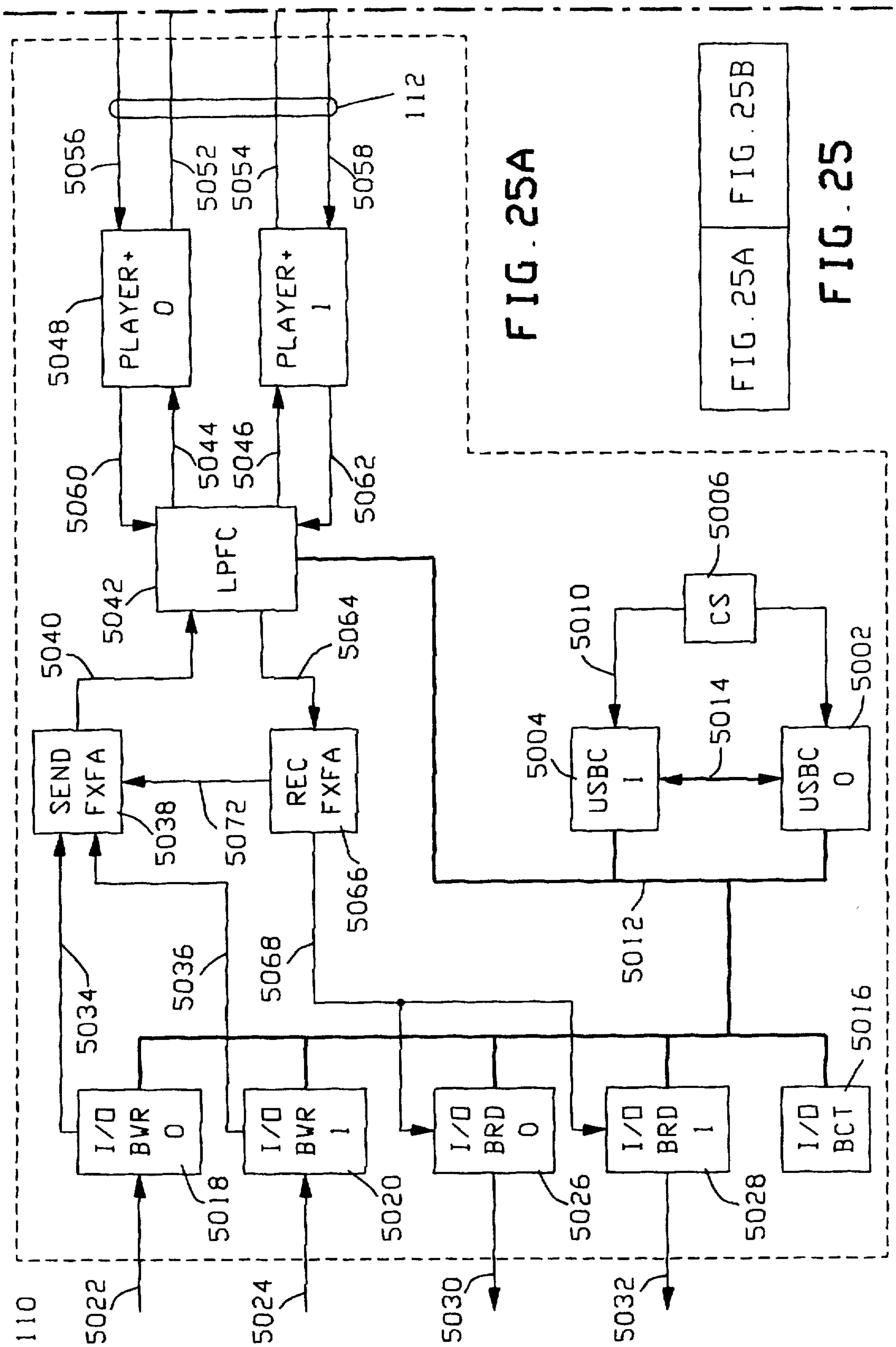
Figure 25B:
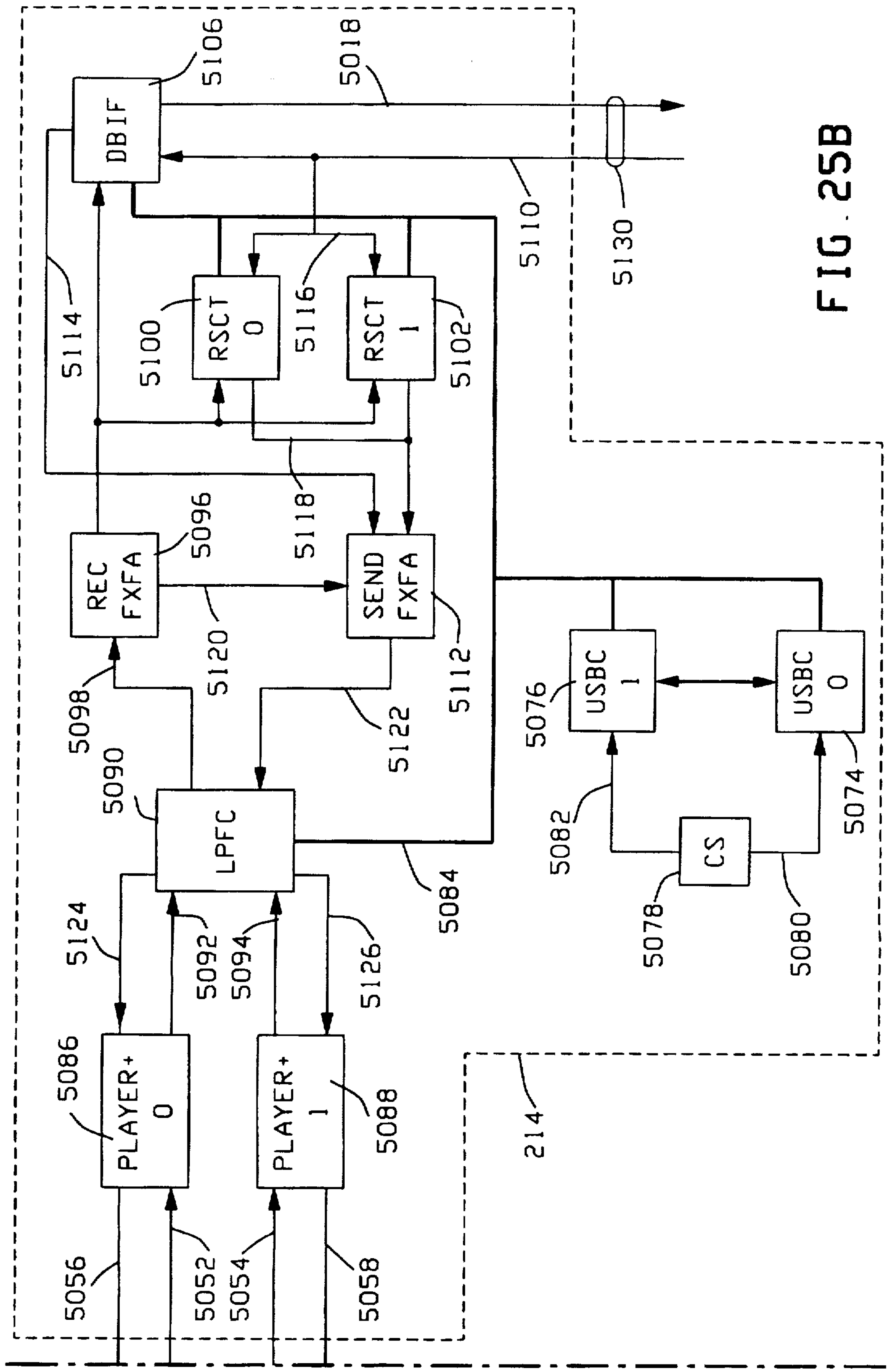
Figure 26:
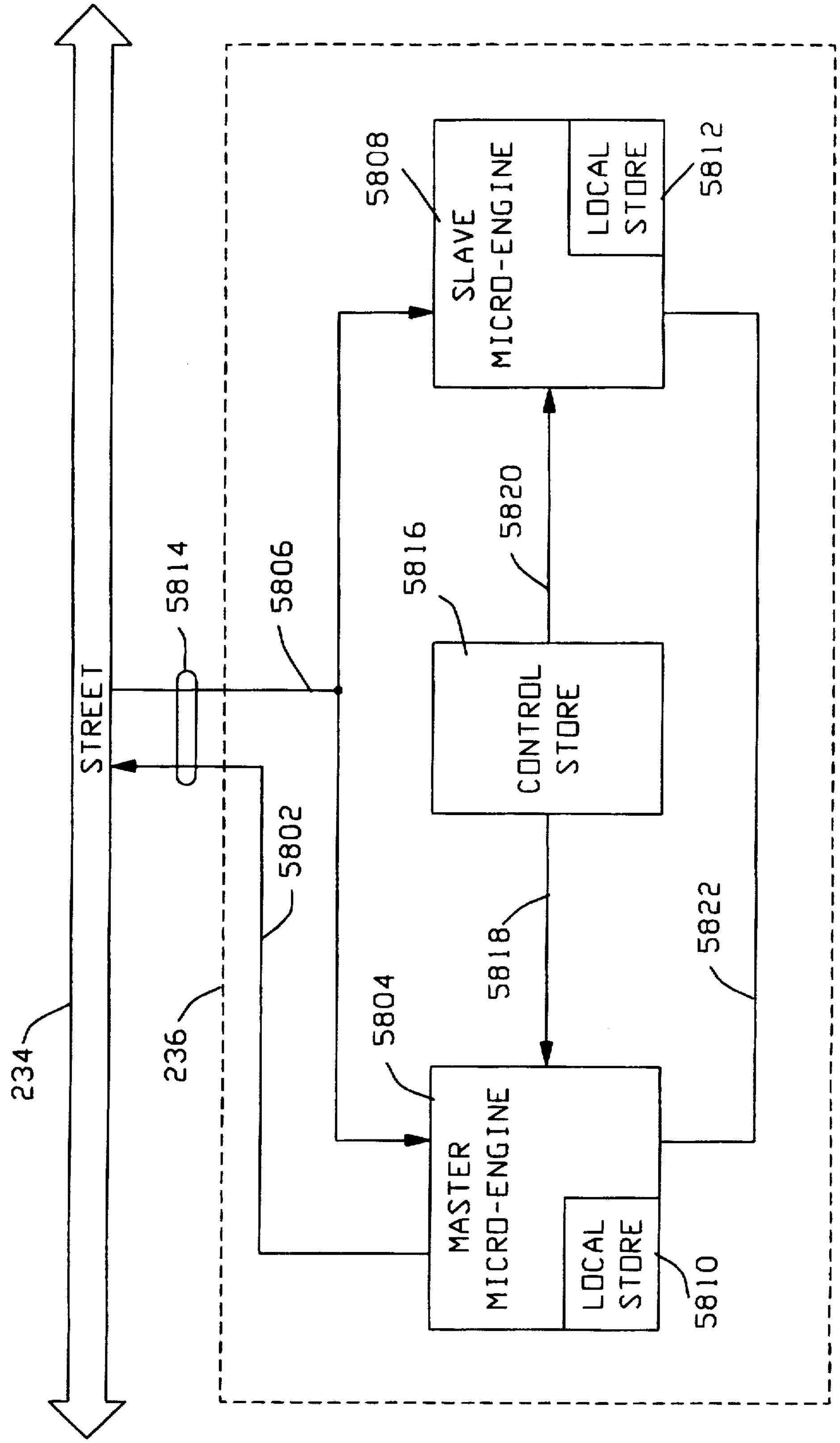
Figure 27:
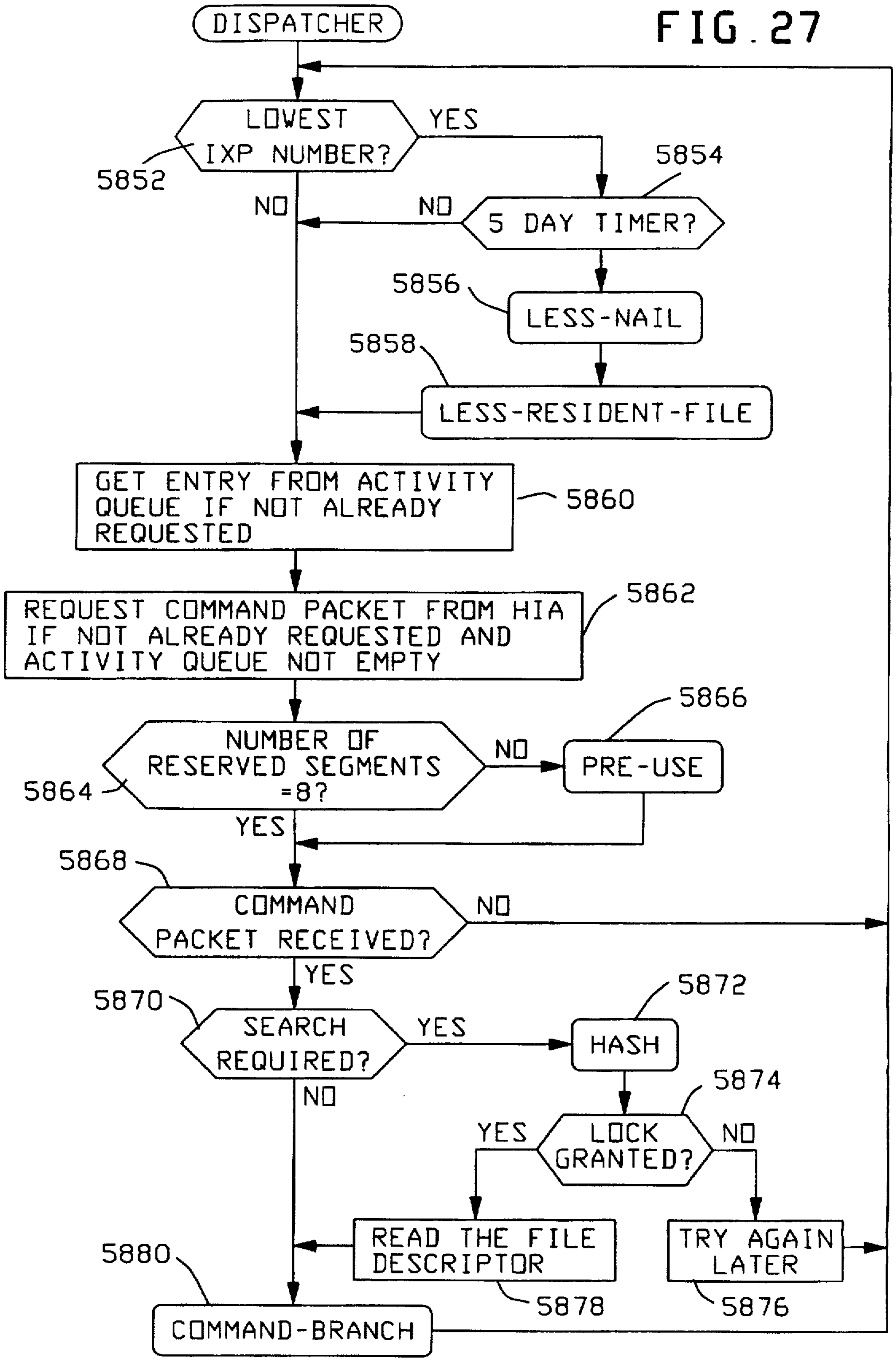
Figure 28:
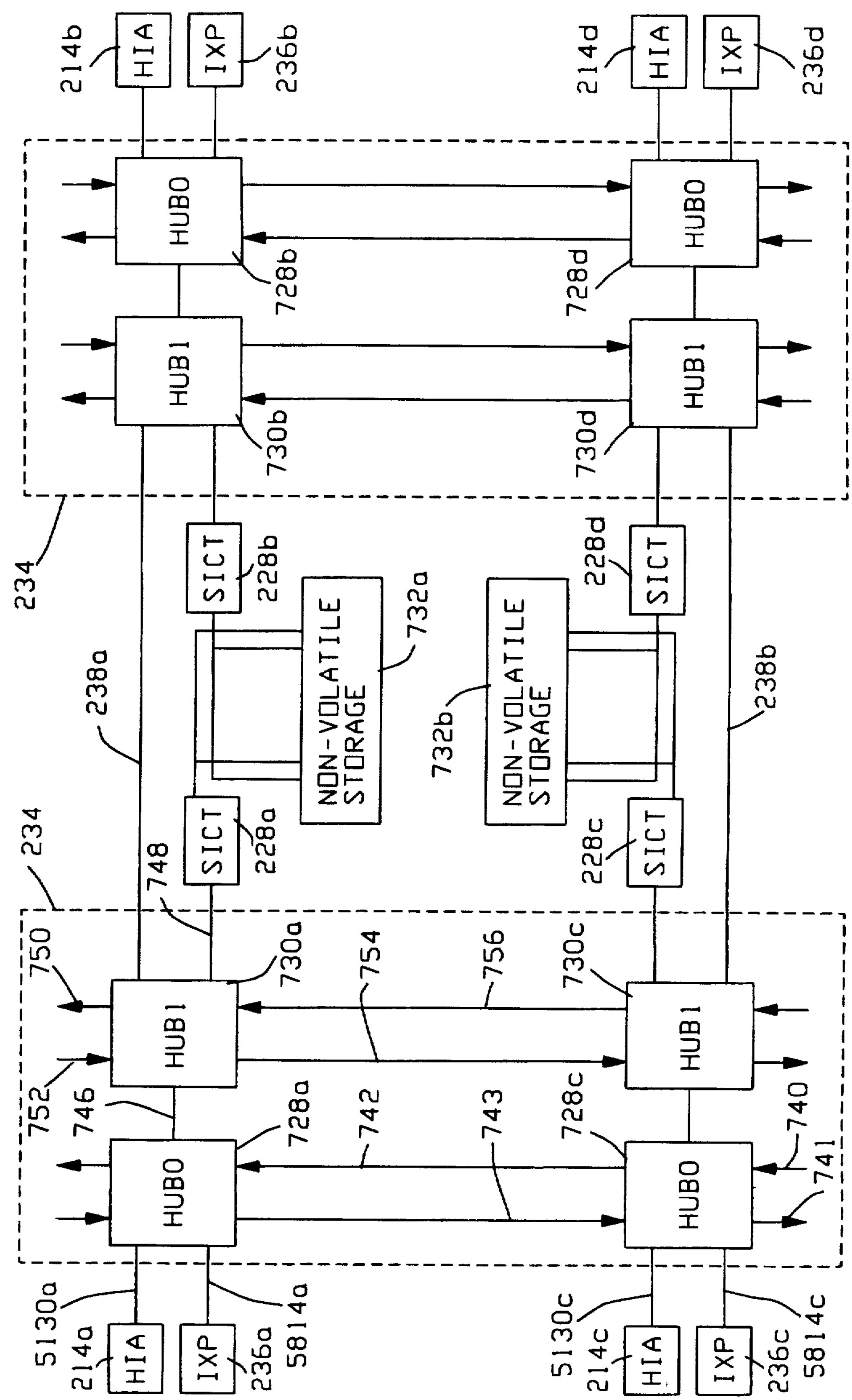
Figure 29:
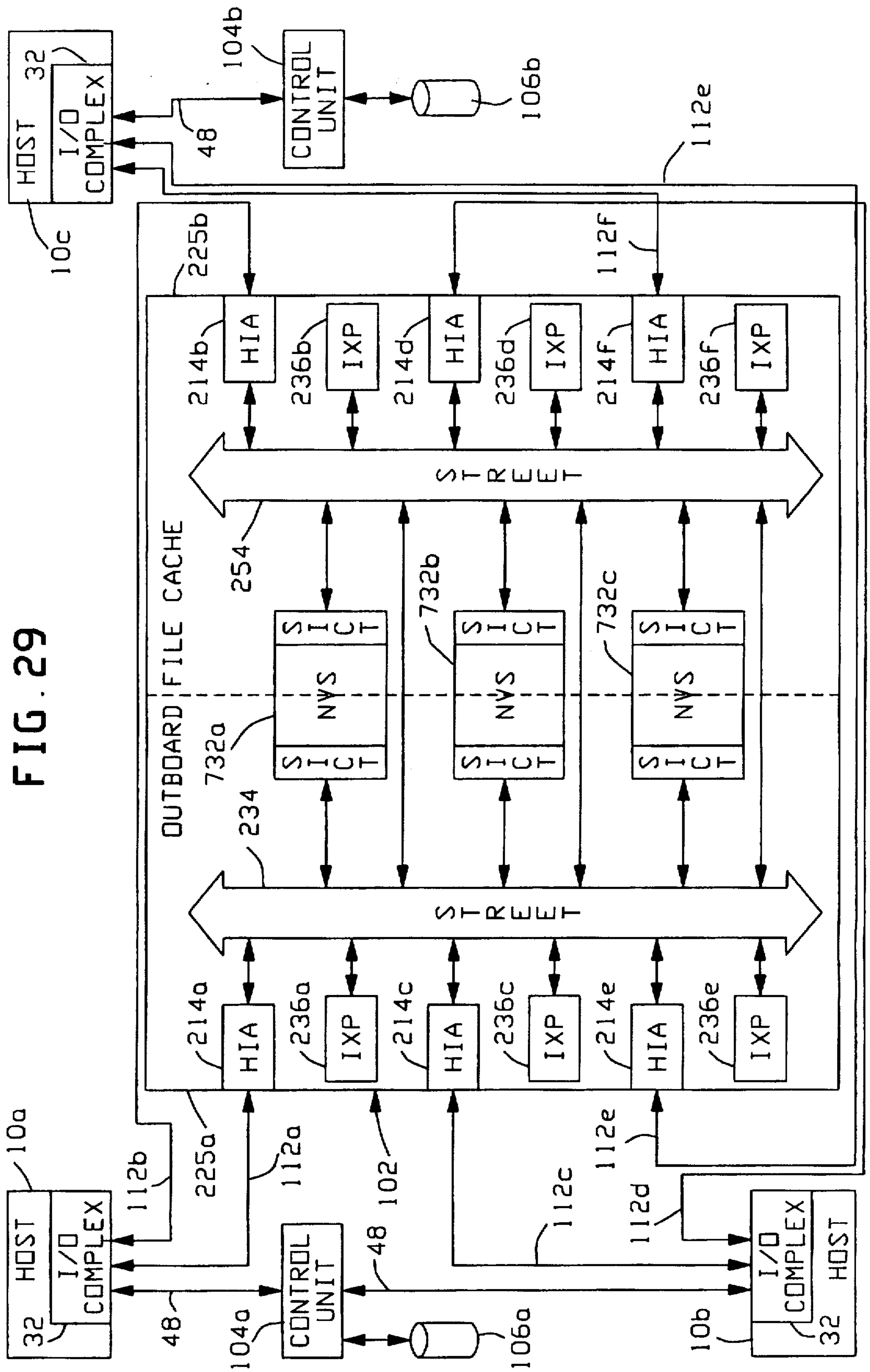
Figure 30:
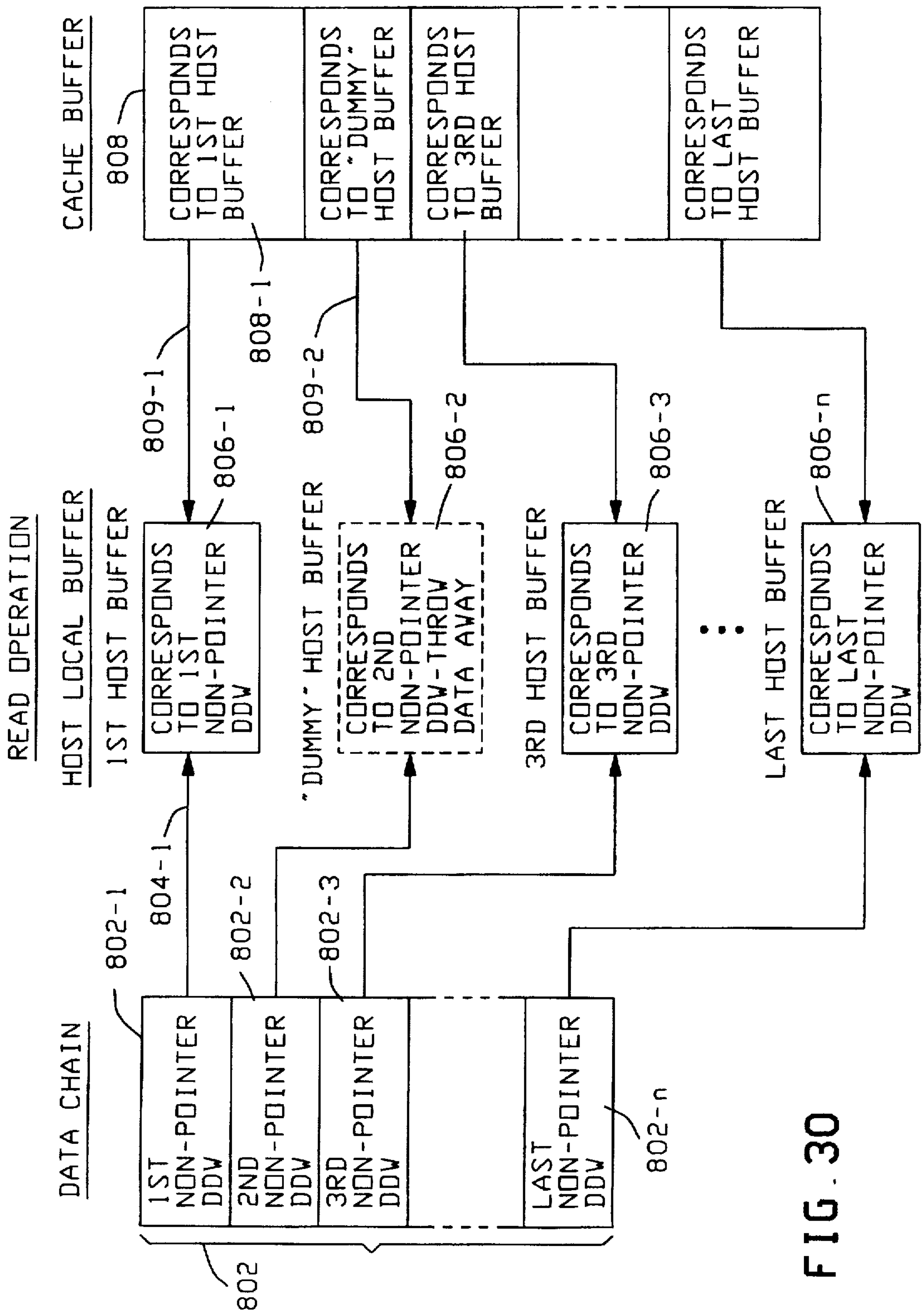
Figure 31:
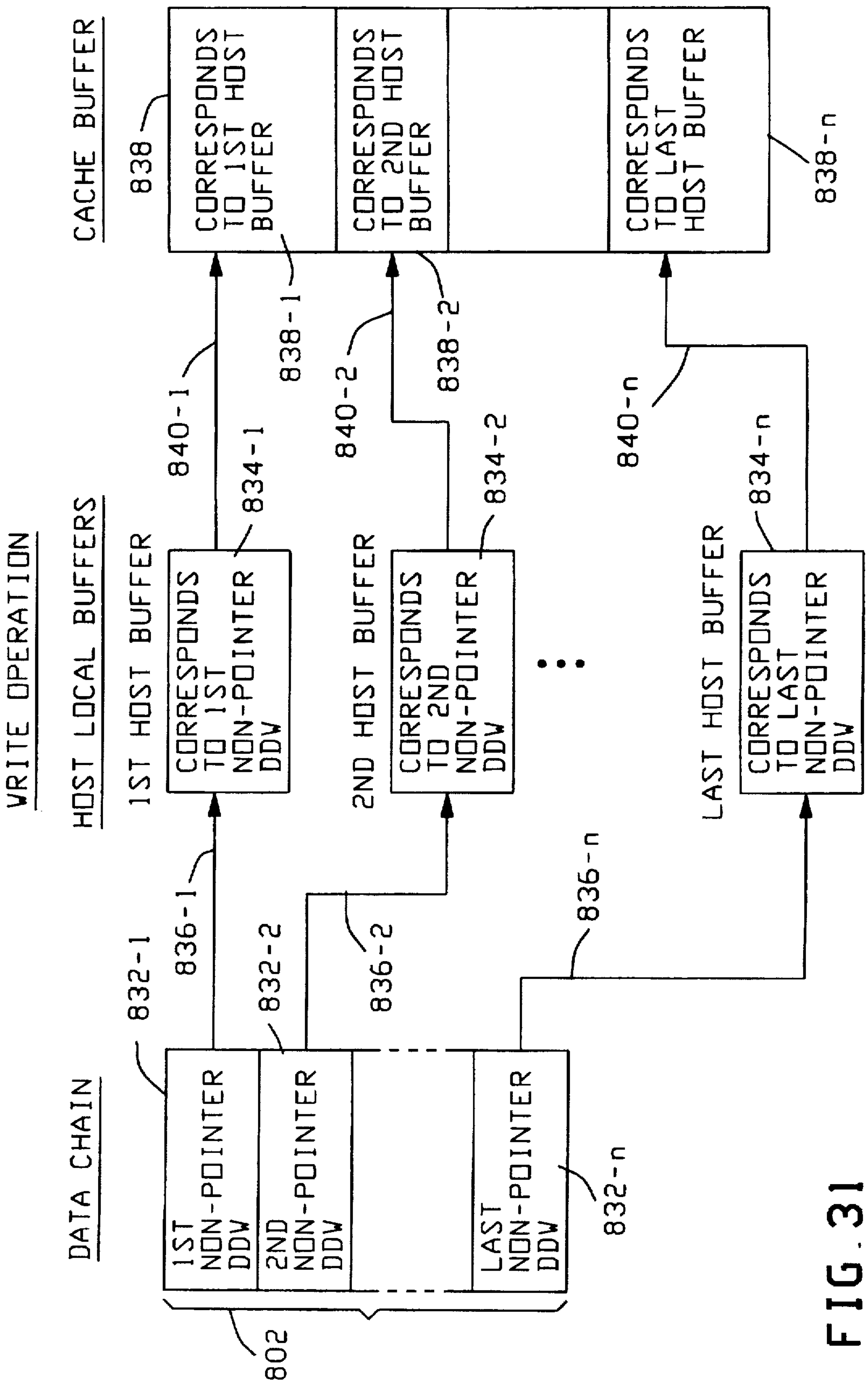
Figure 32:
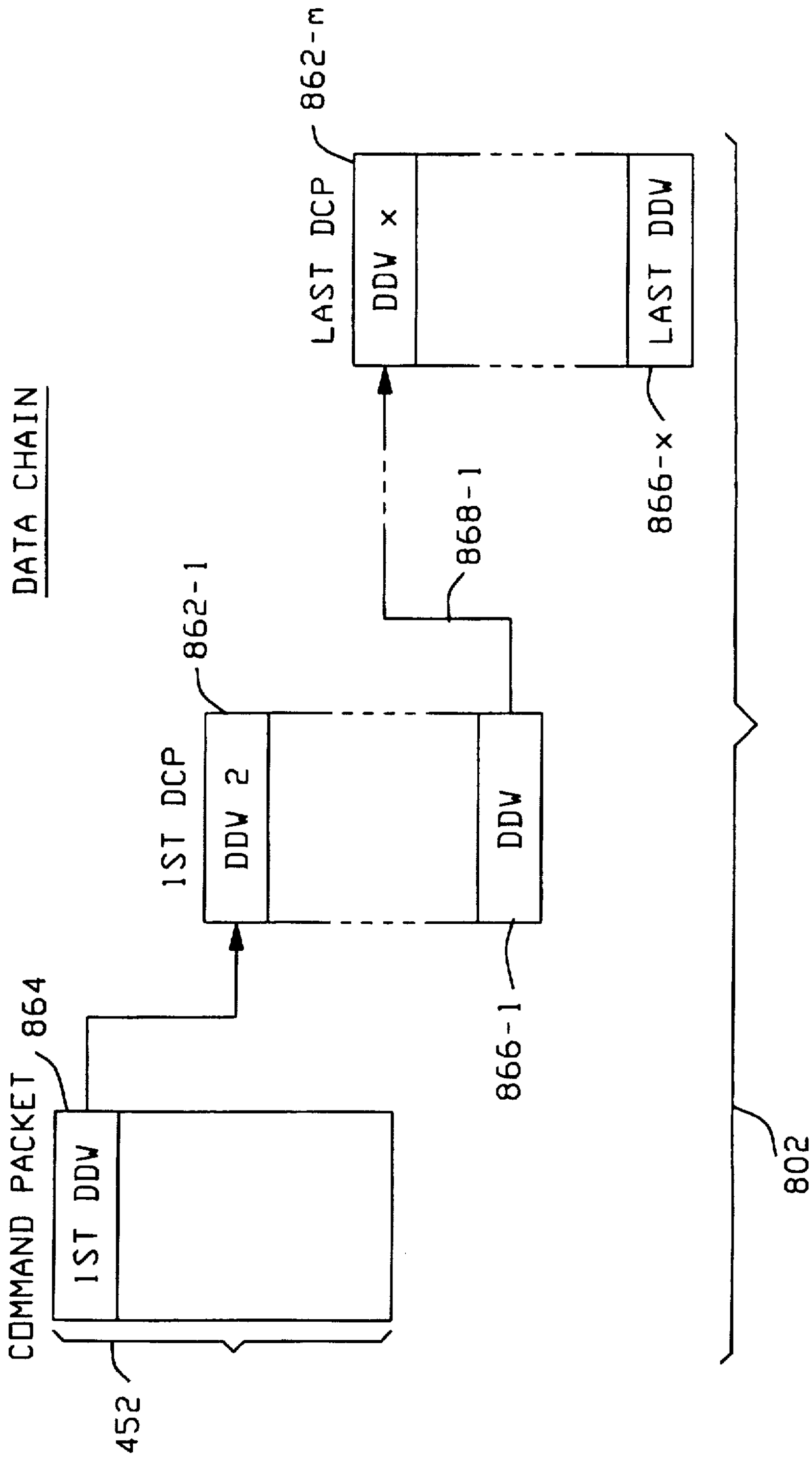
Figure 33:
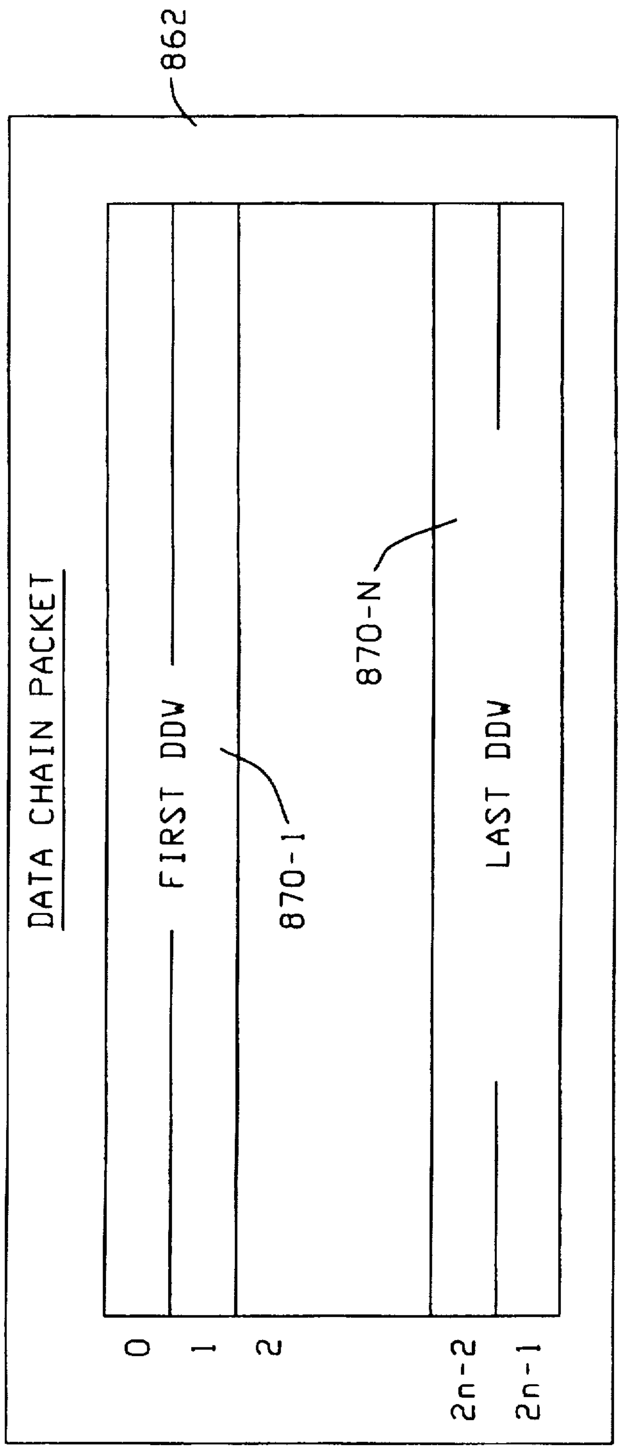
Figure 34:
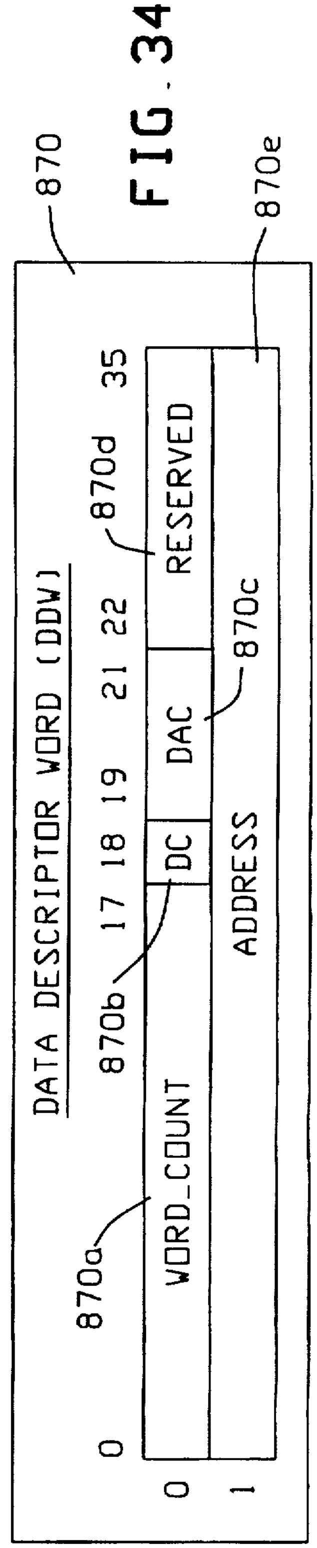
Figure 35B:
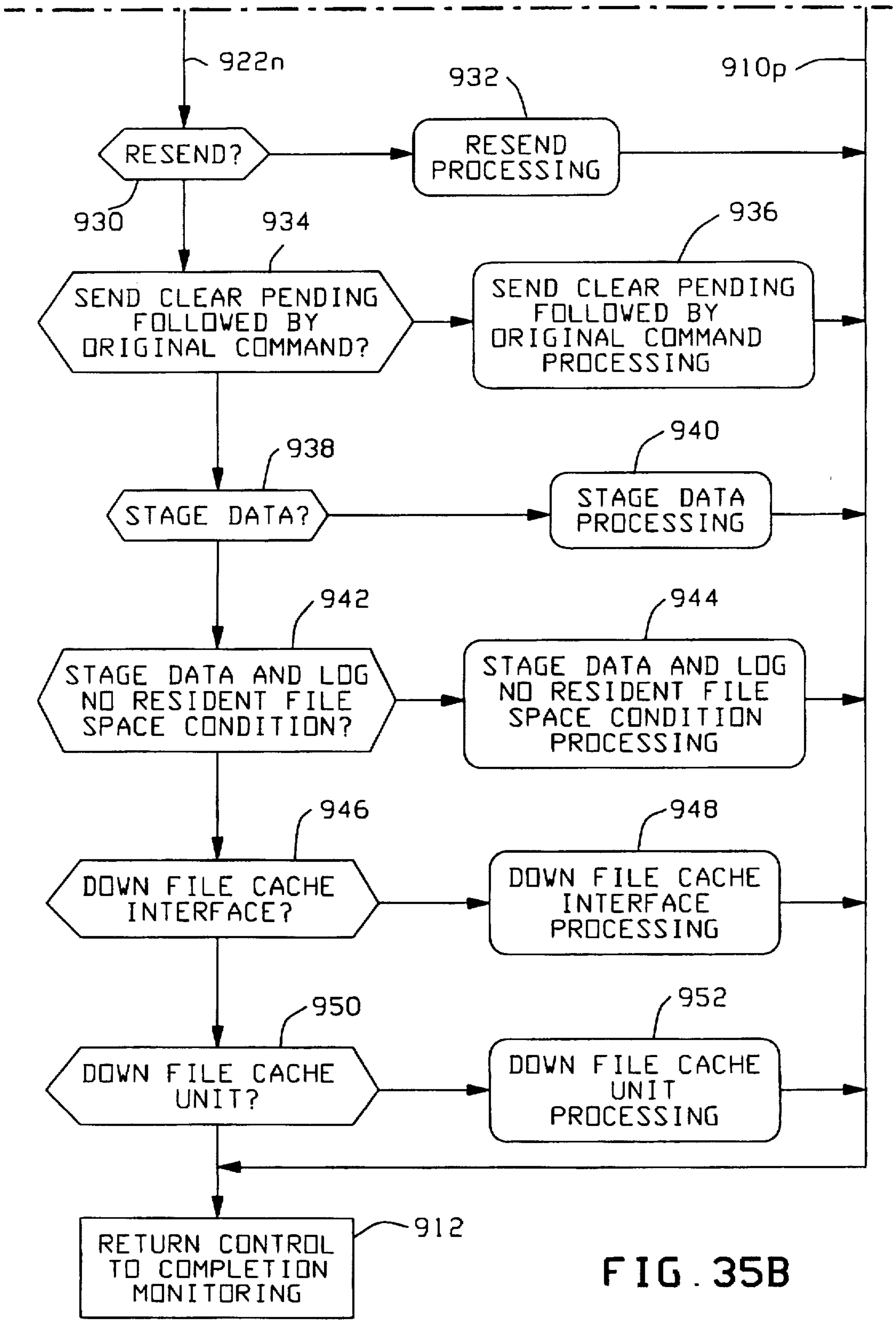
Figure 36:
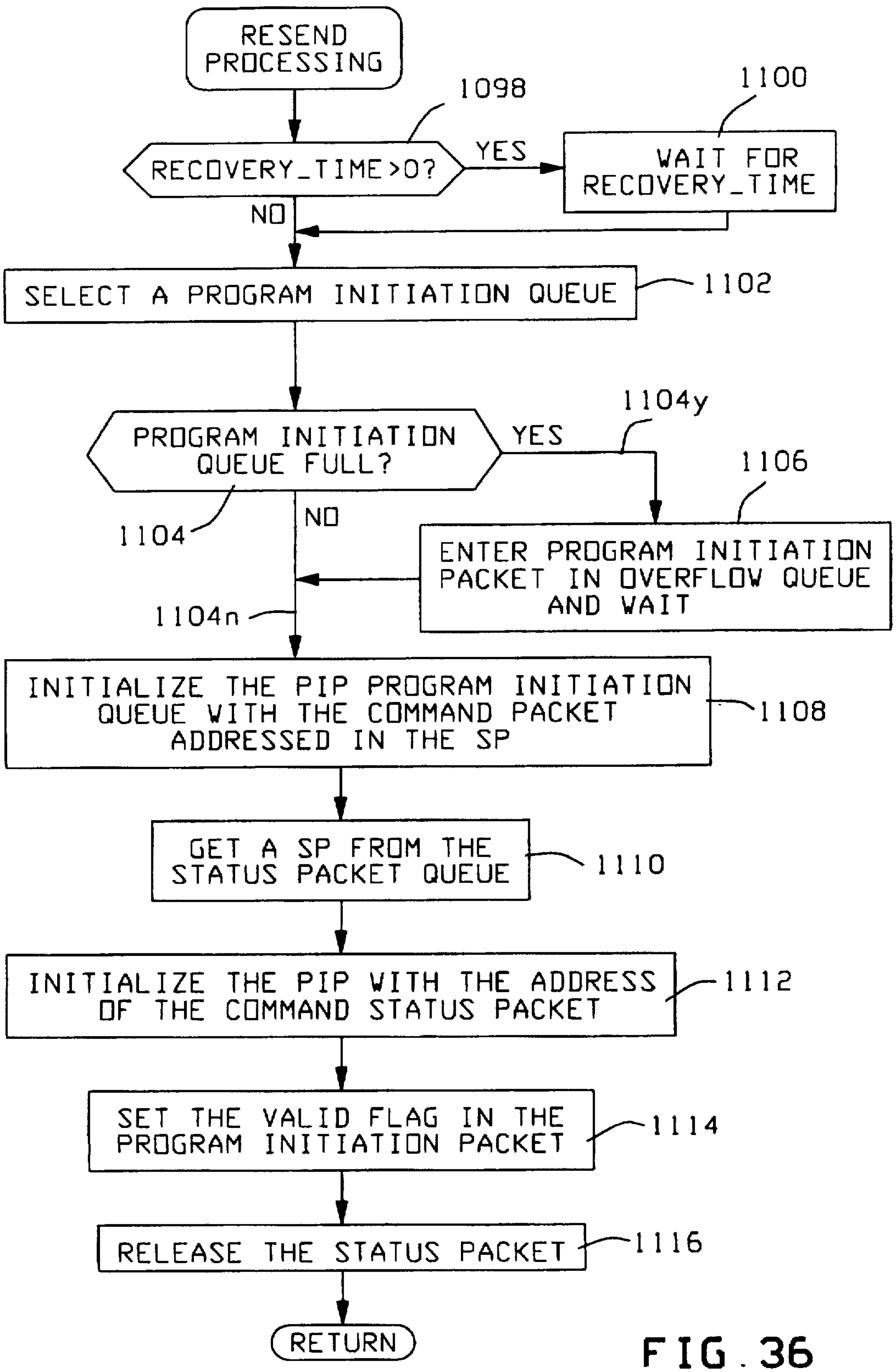
Figure 37:
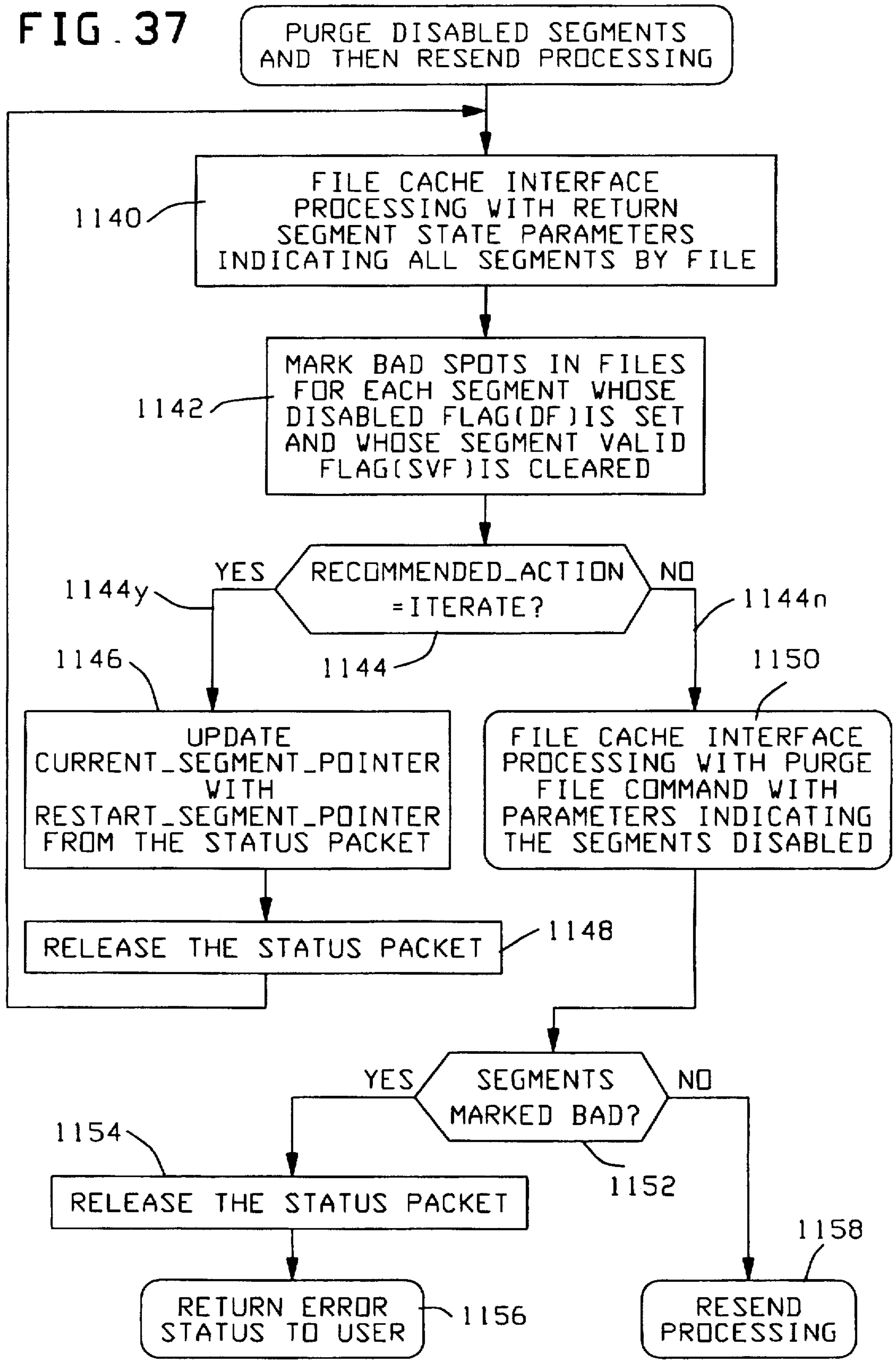
Figure 38:
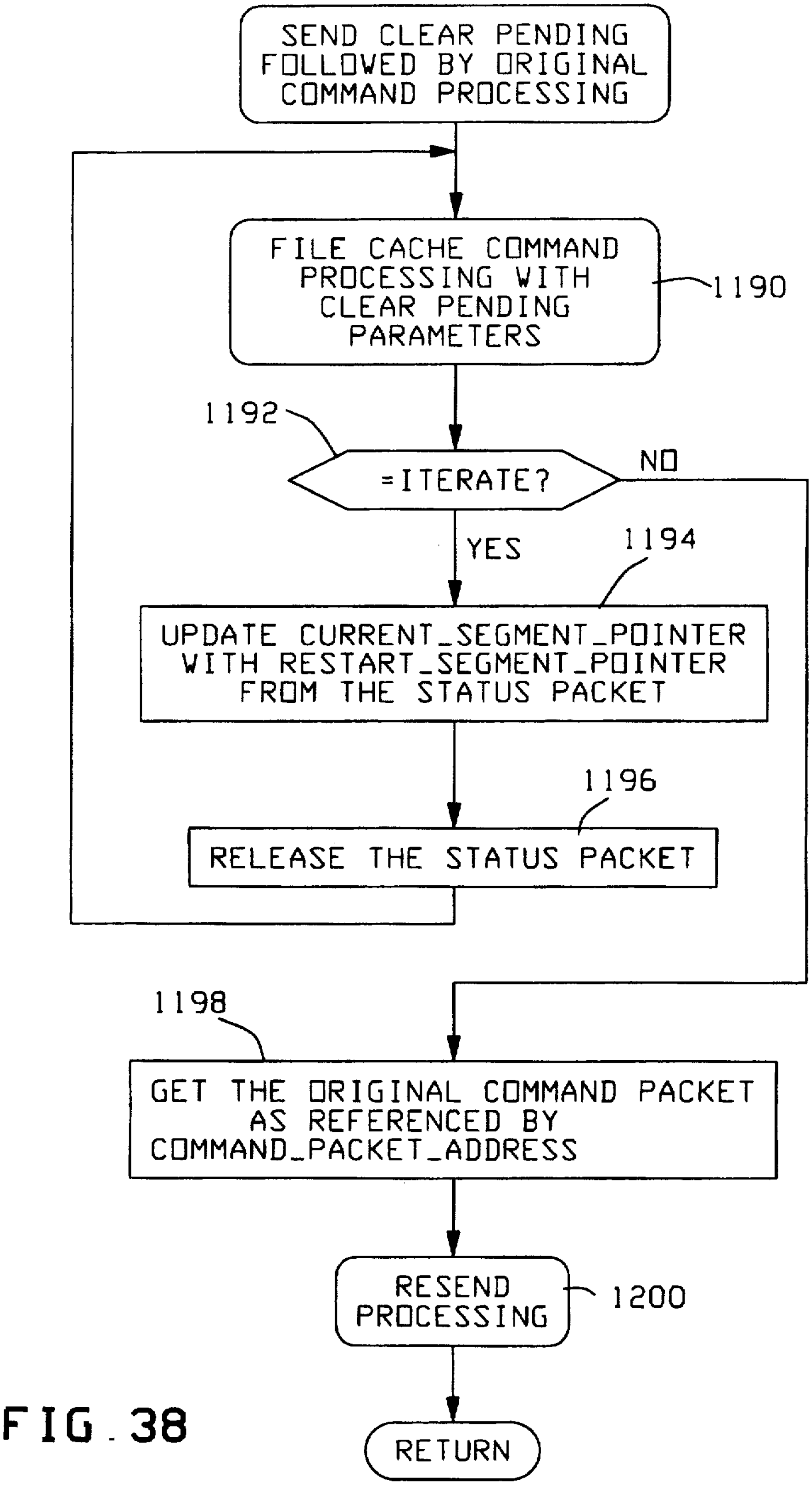
Figure 39:
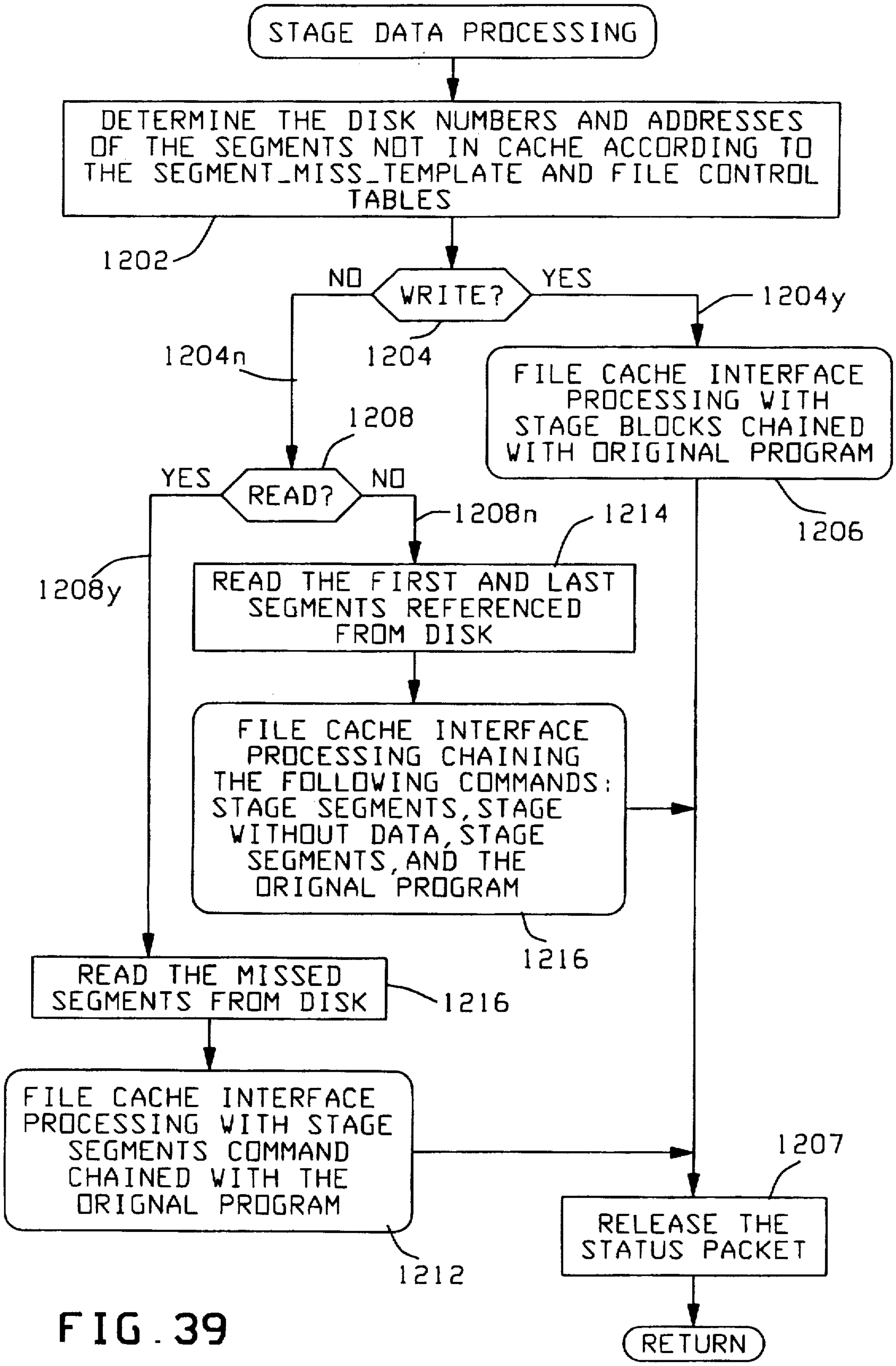
Figure 40:
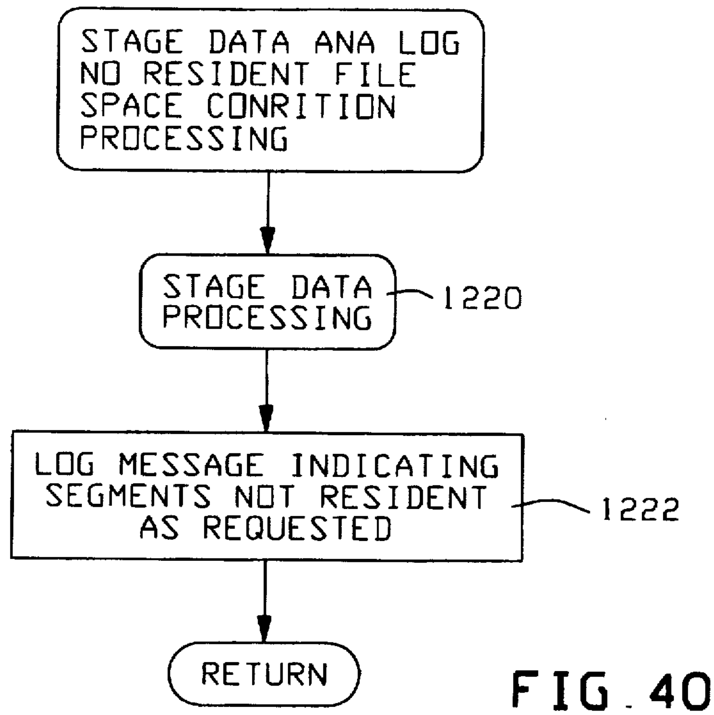
Figure 41:
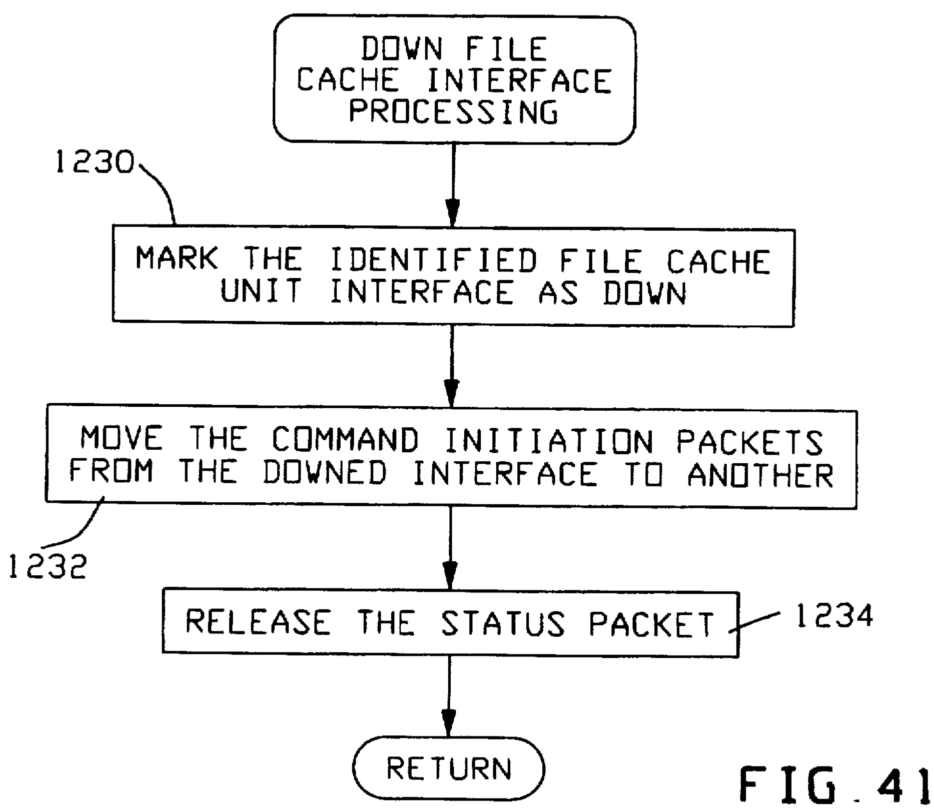
Figure 42:
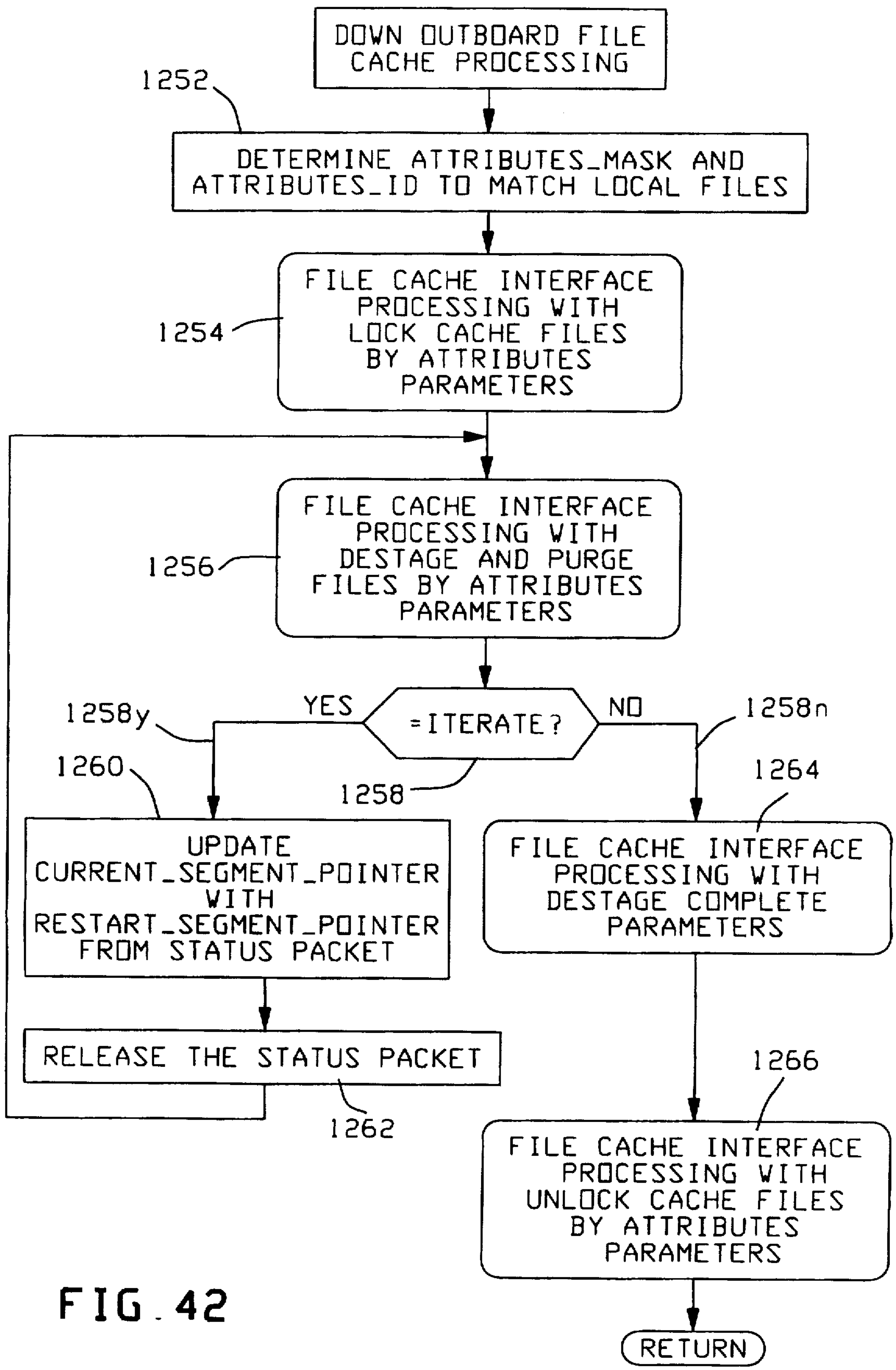
Figures 43, 43A:
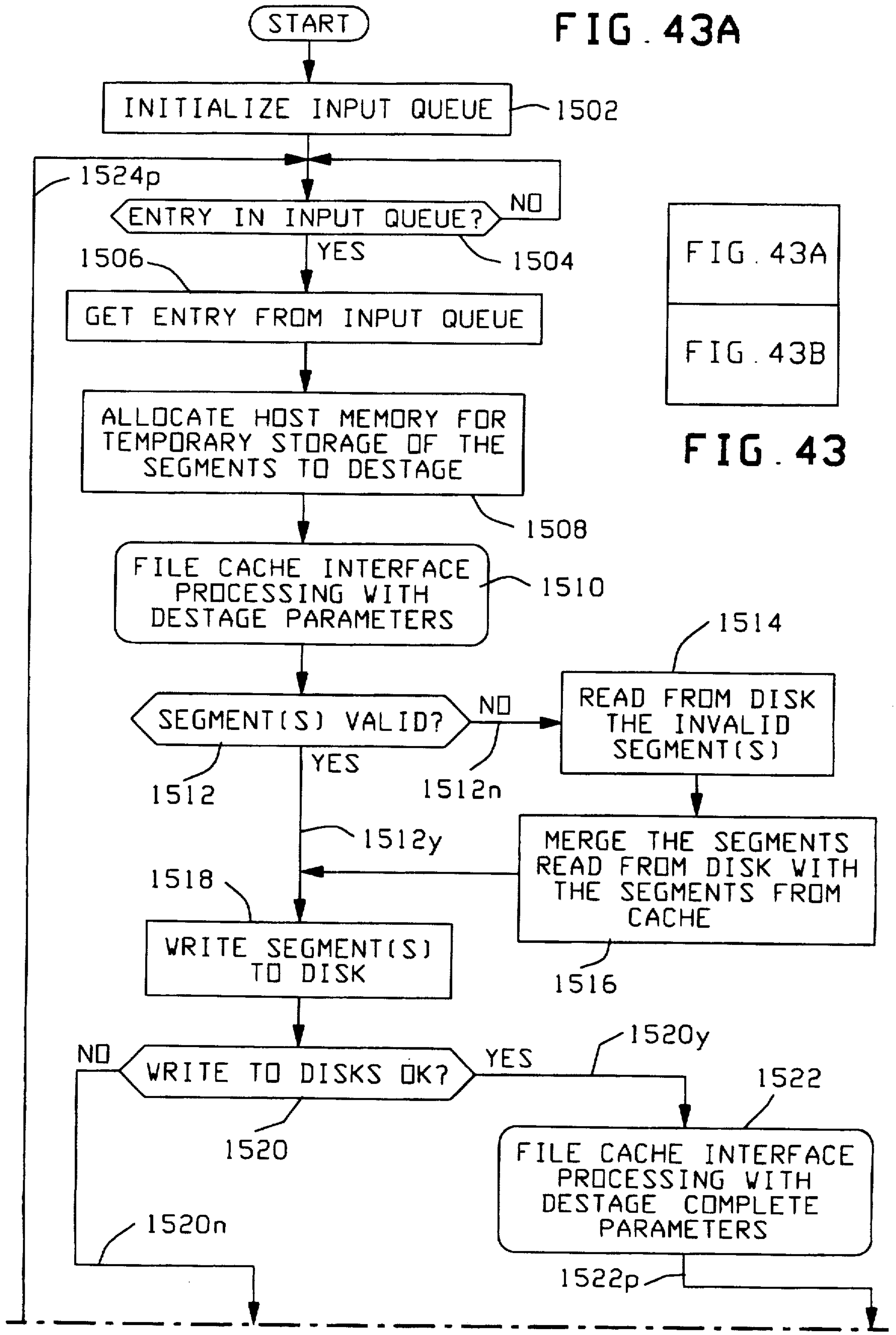
Figure 43B:
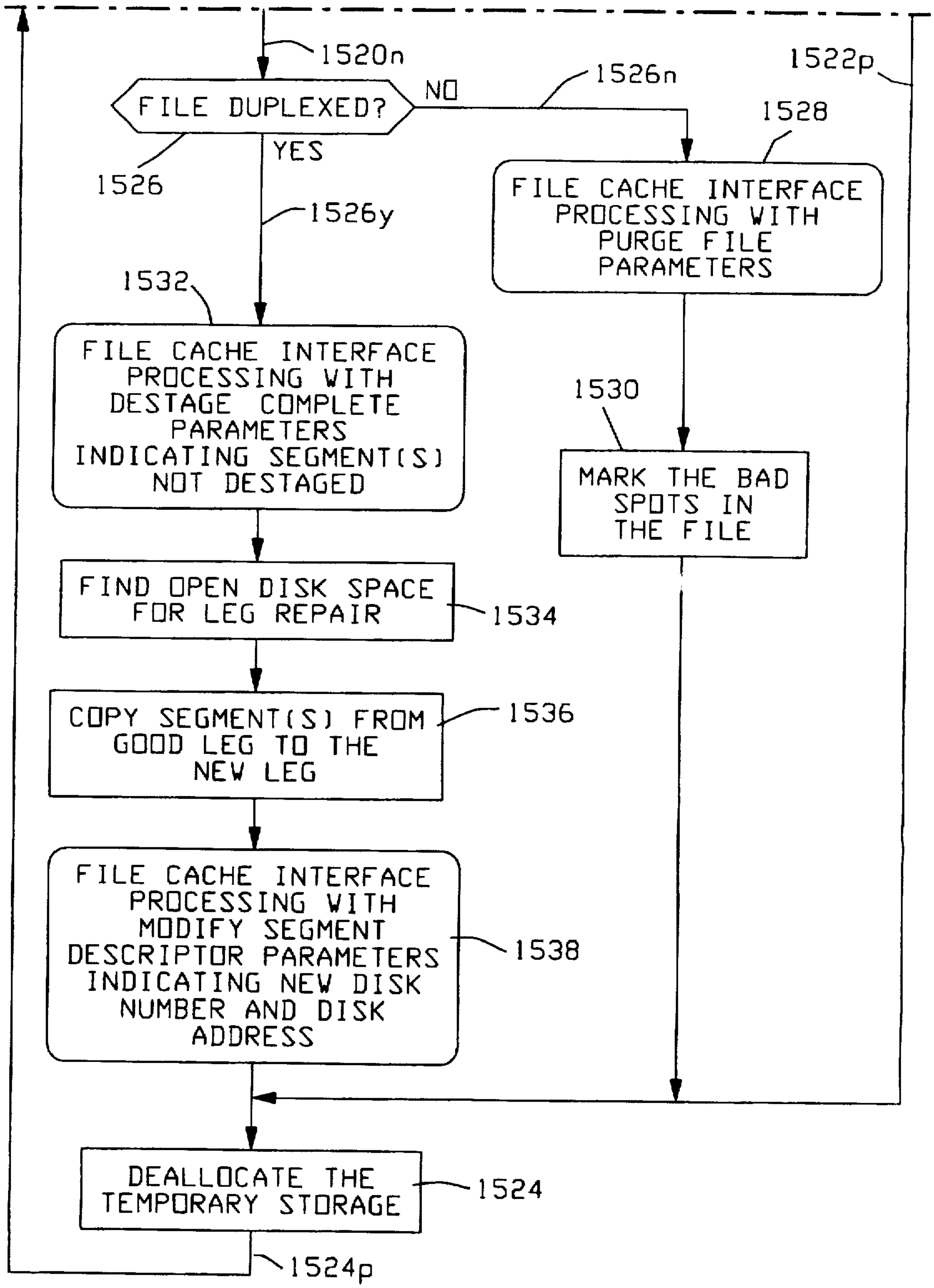
Figure 44:
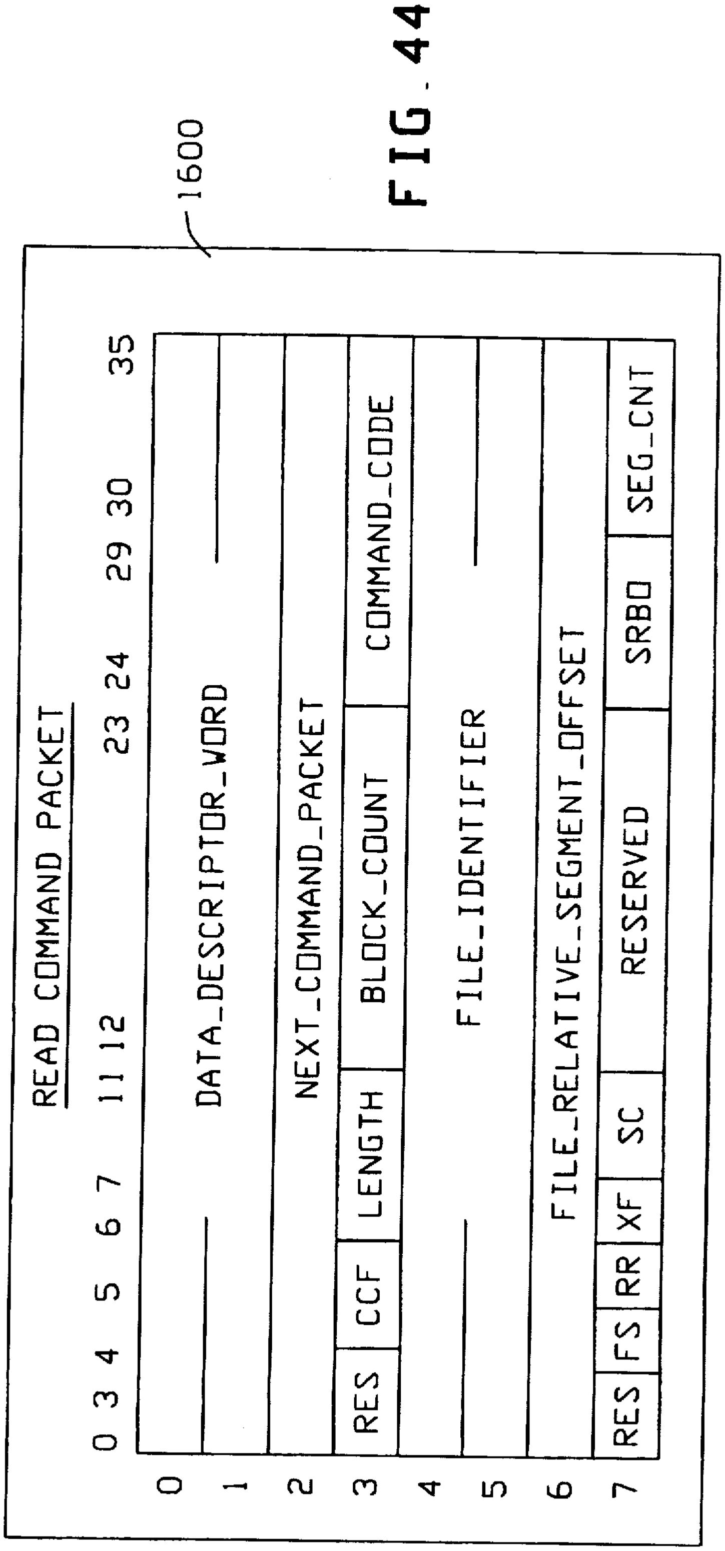
Figure 45:
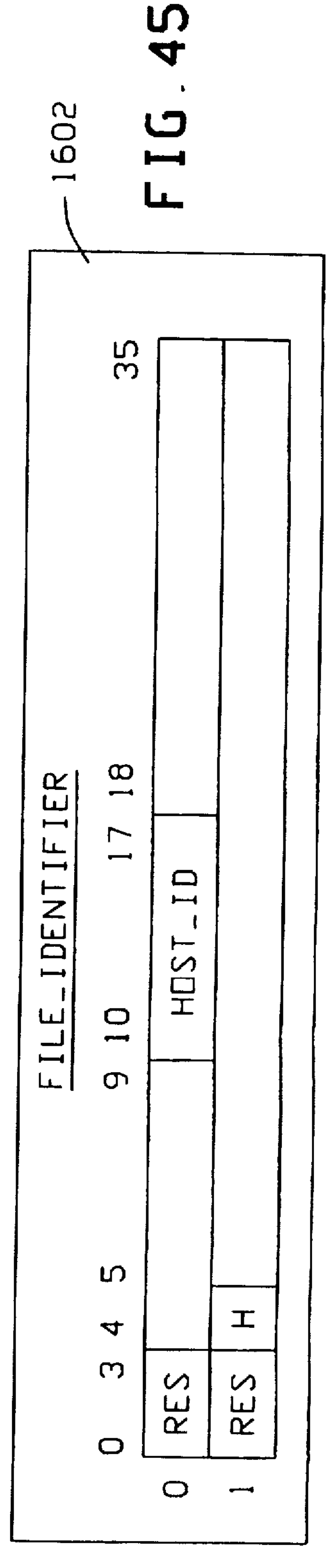
Figure 46:
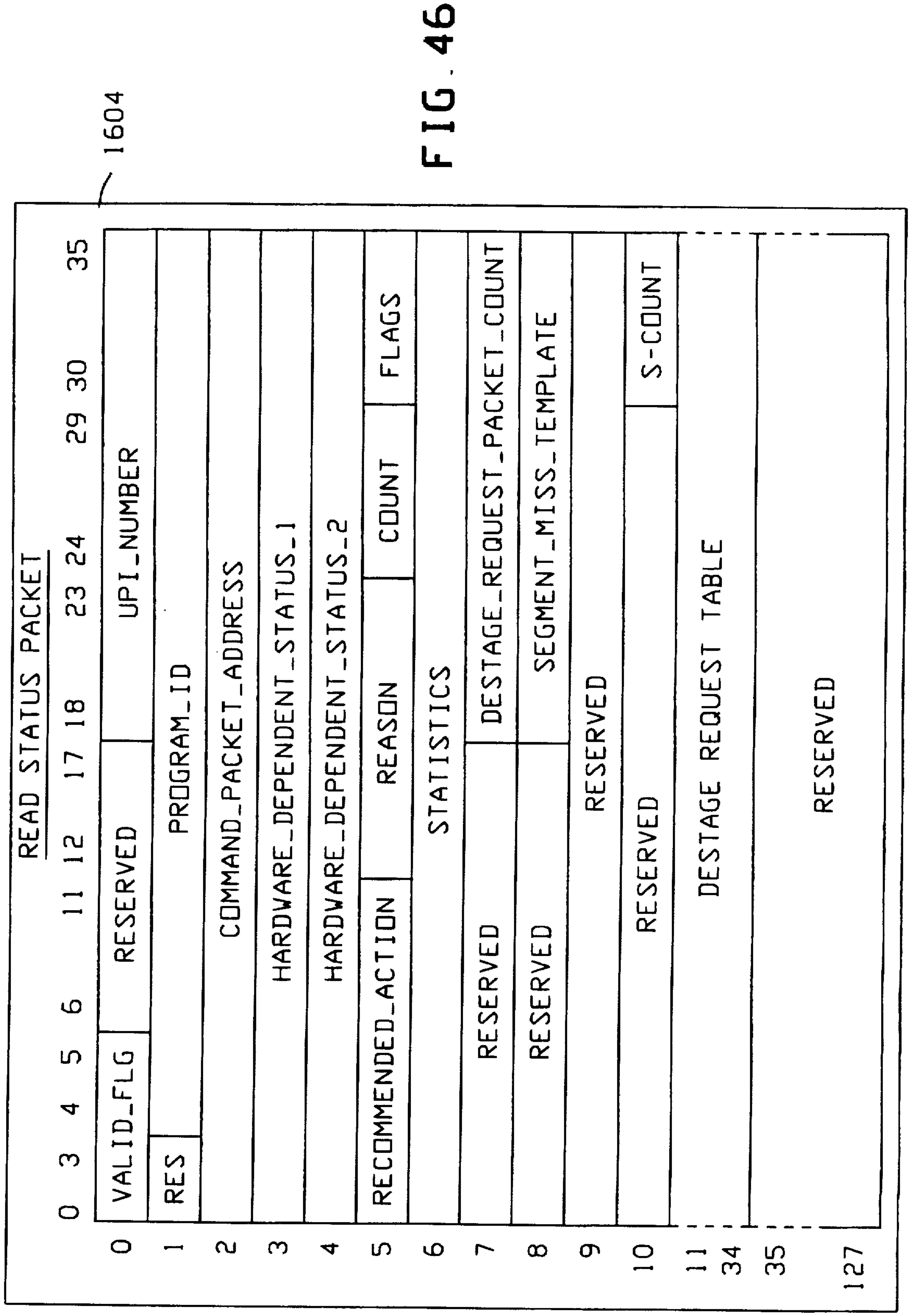
Figure 47:
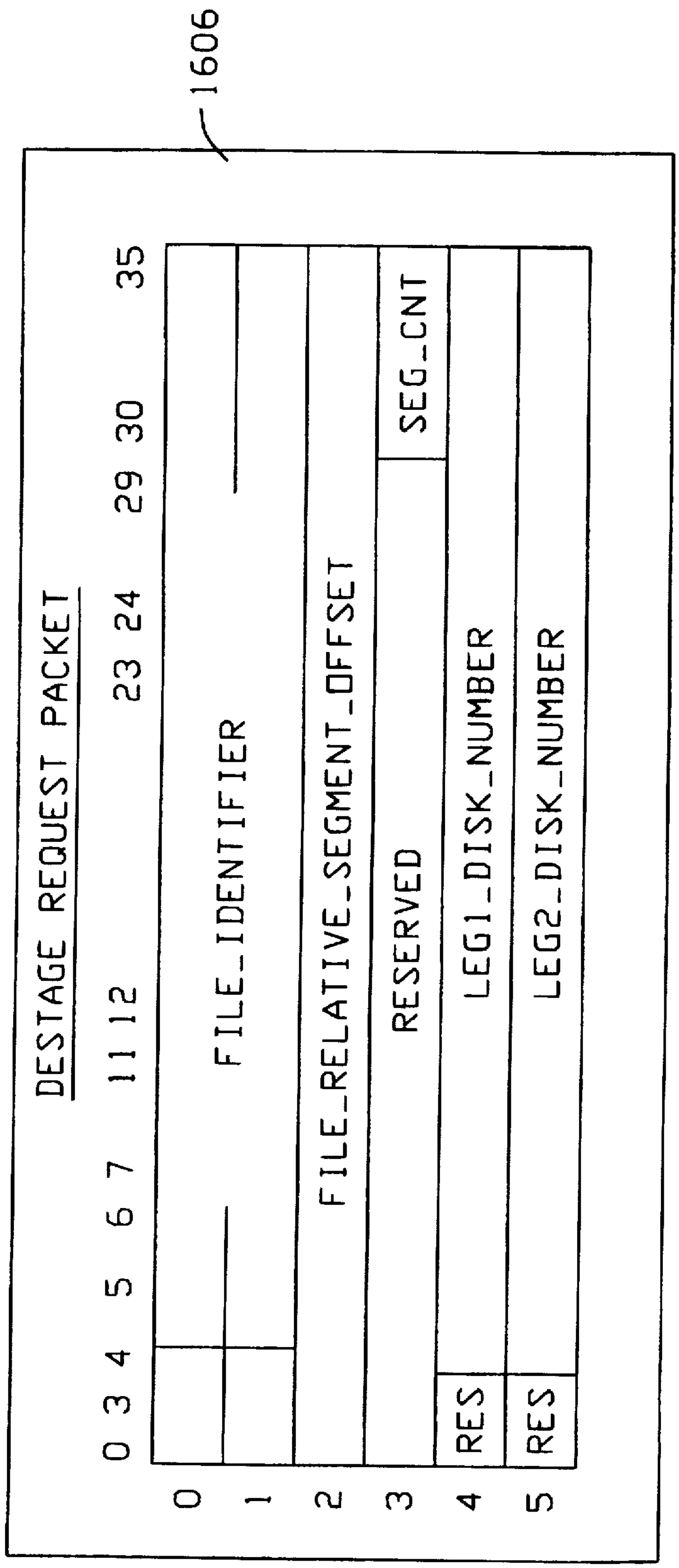
Figure 49:
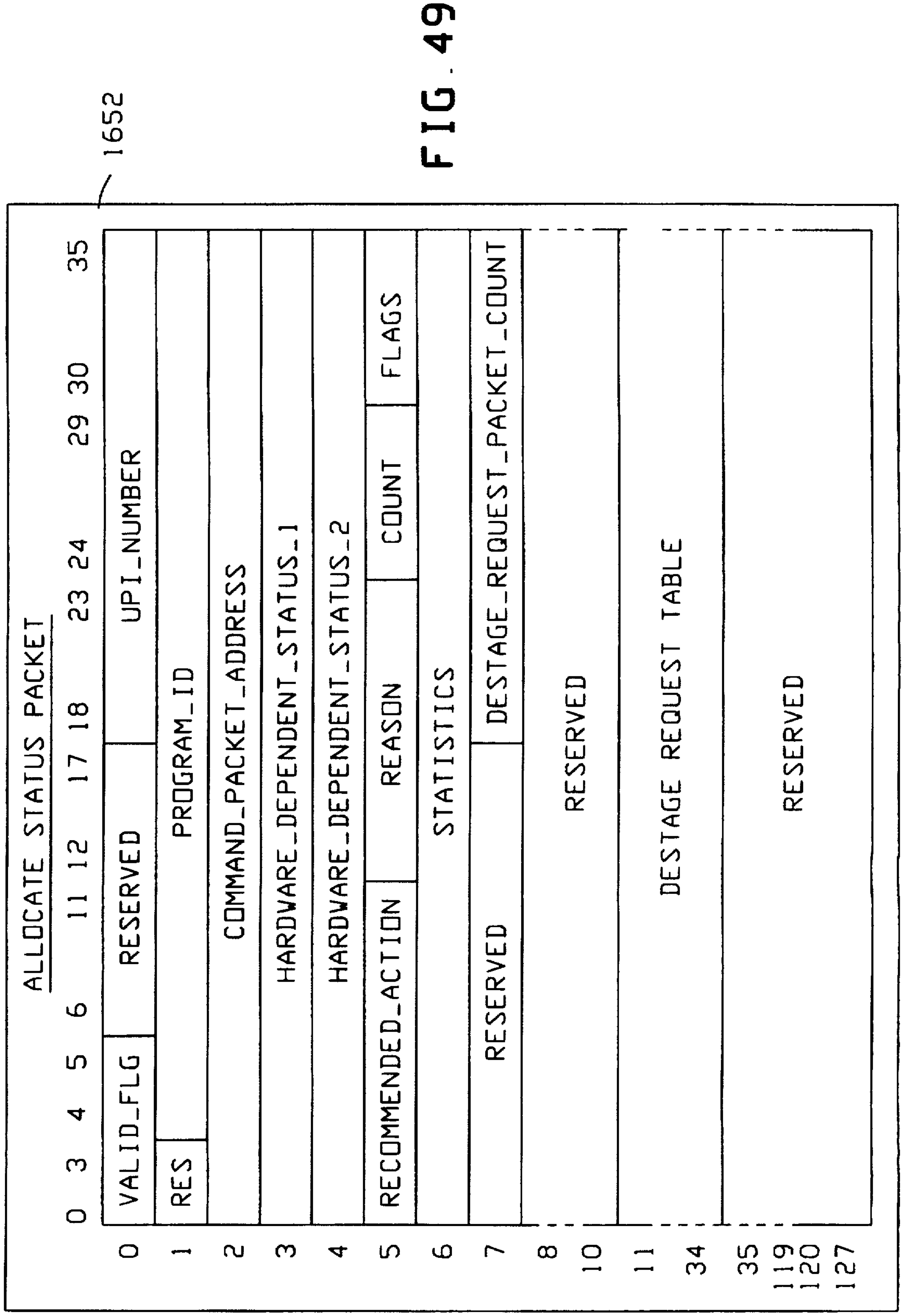
Figure 50:
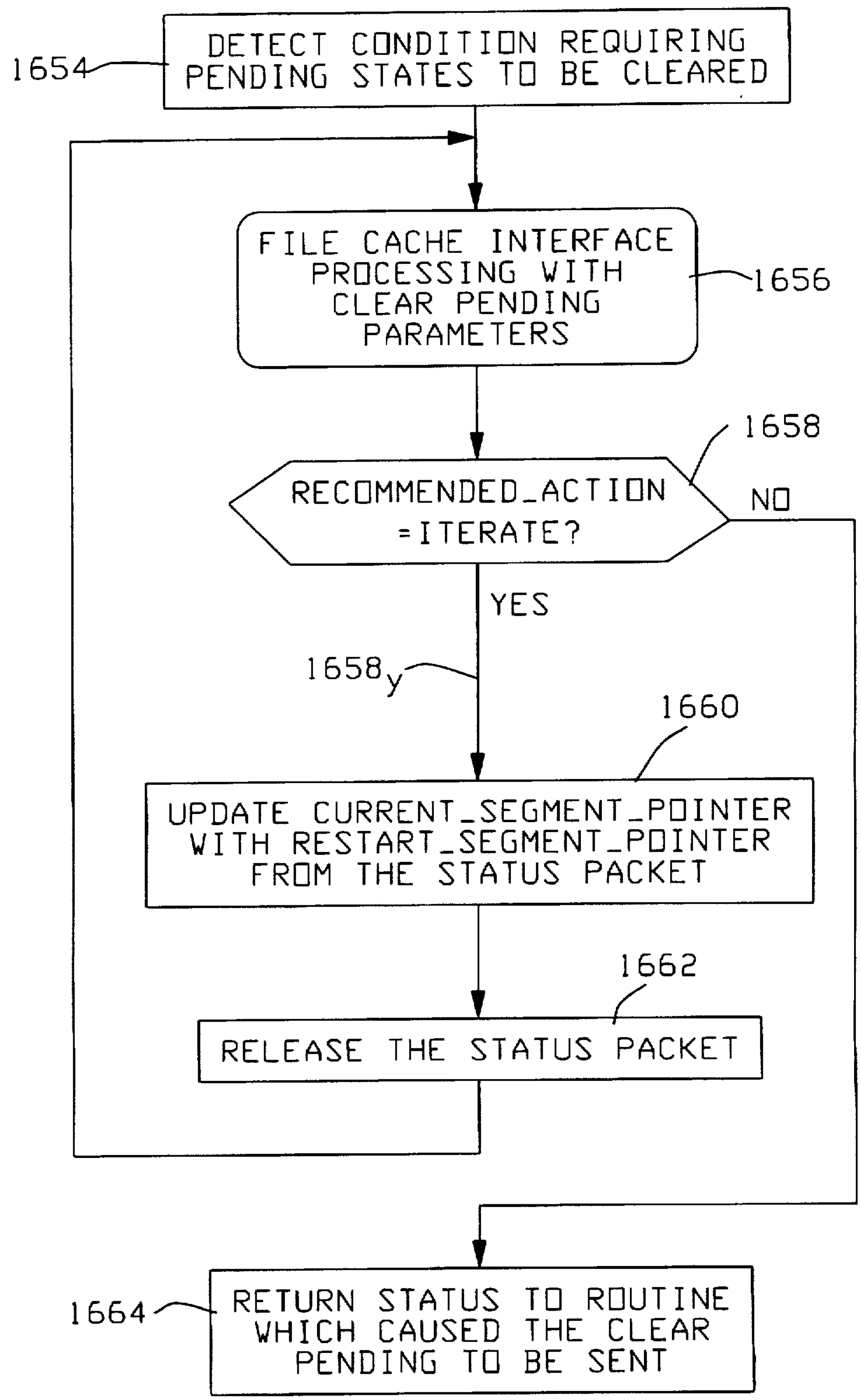
Figure 51:
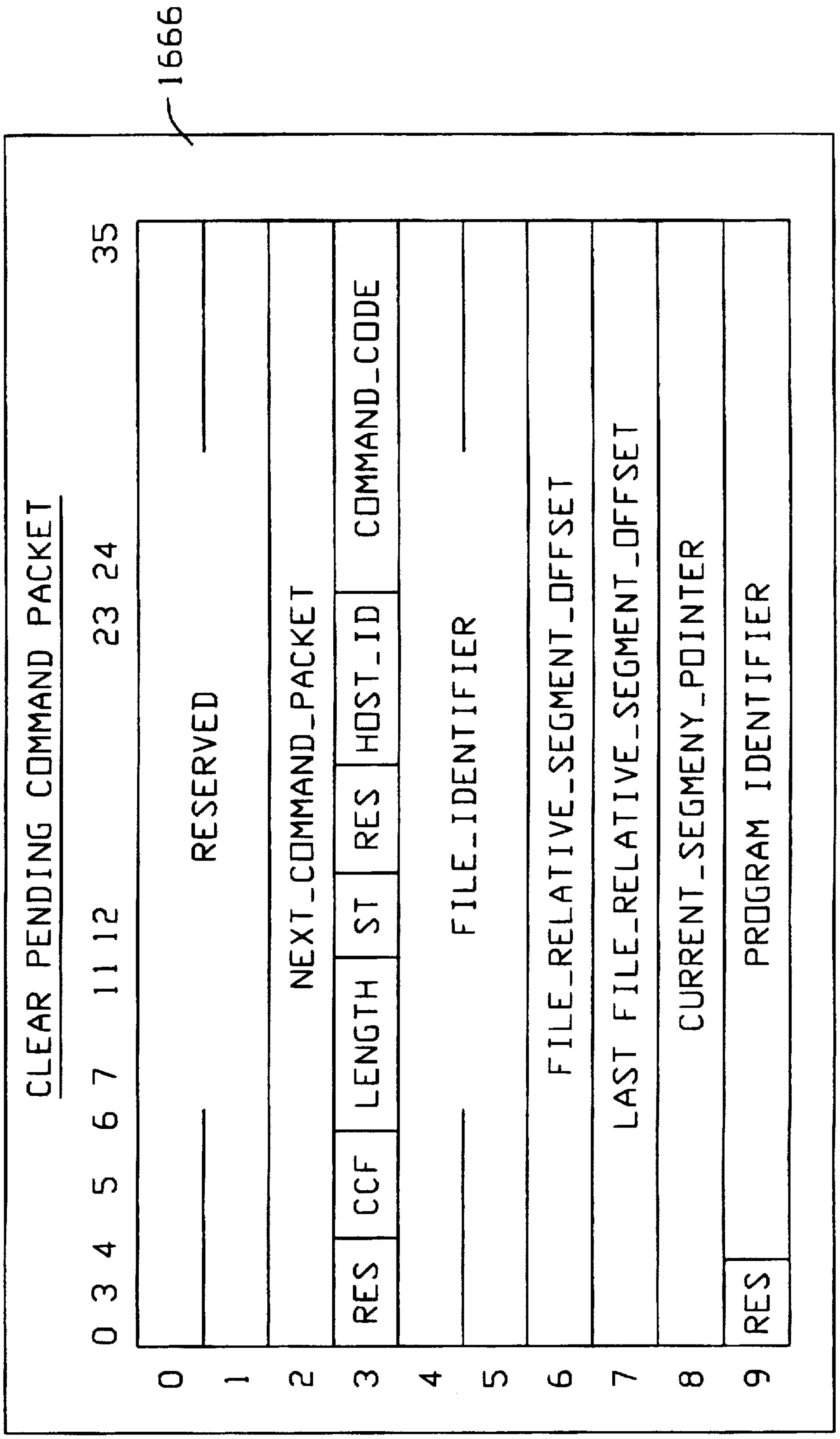
Figure 52:
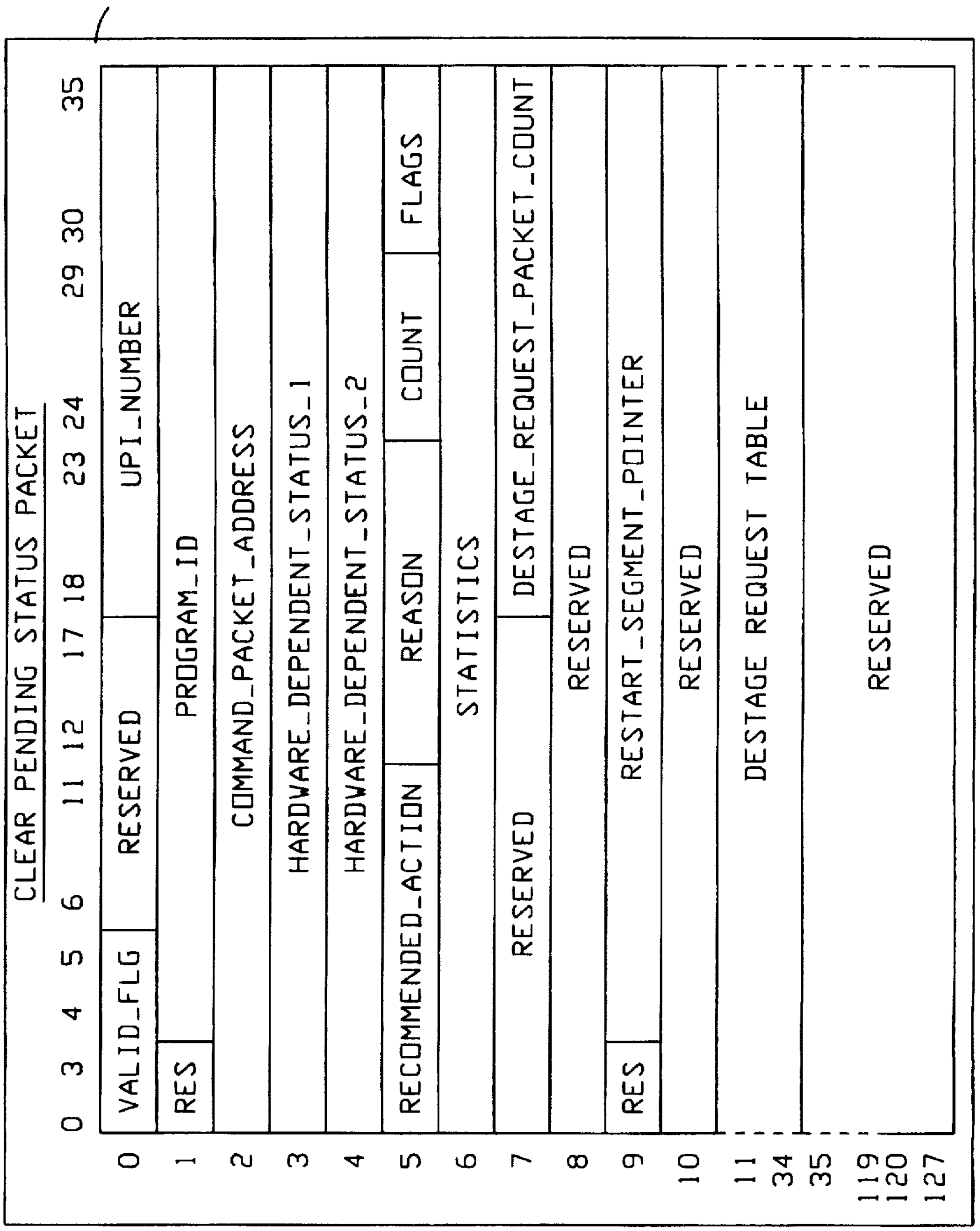
Figure 53:
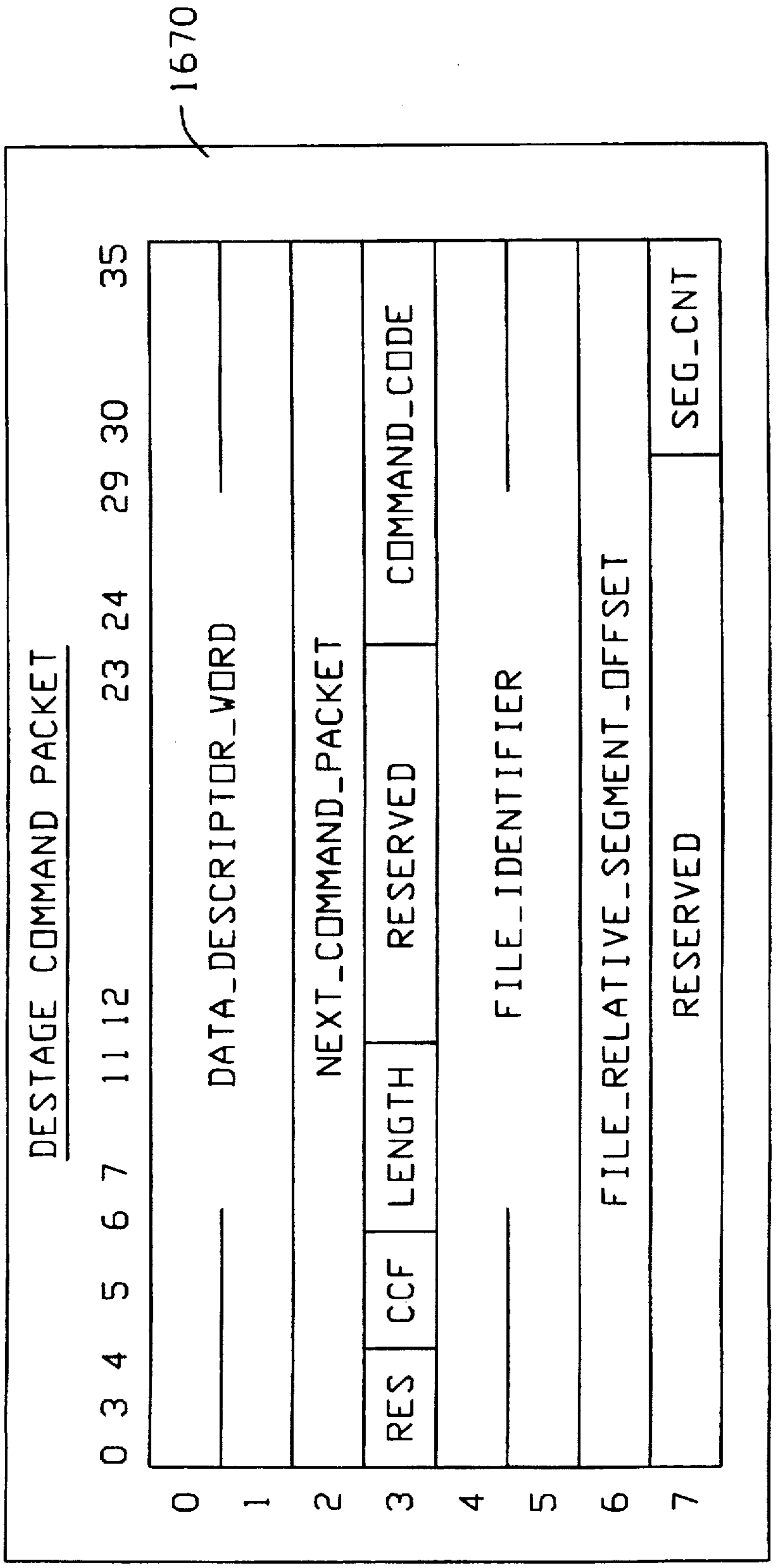
Figure 55:
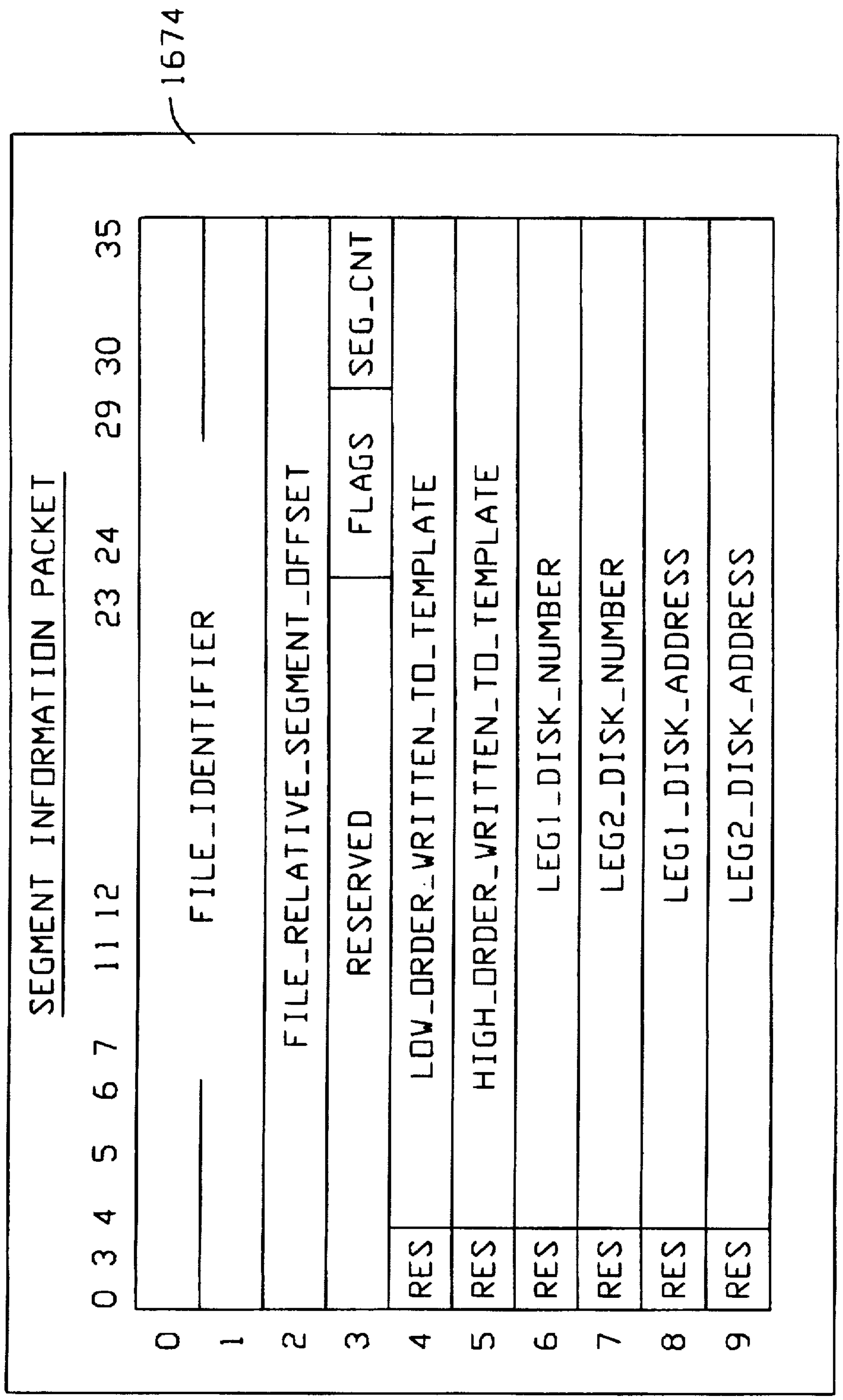
Figure 56:
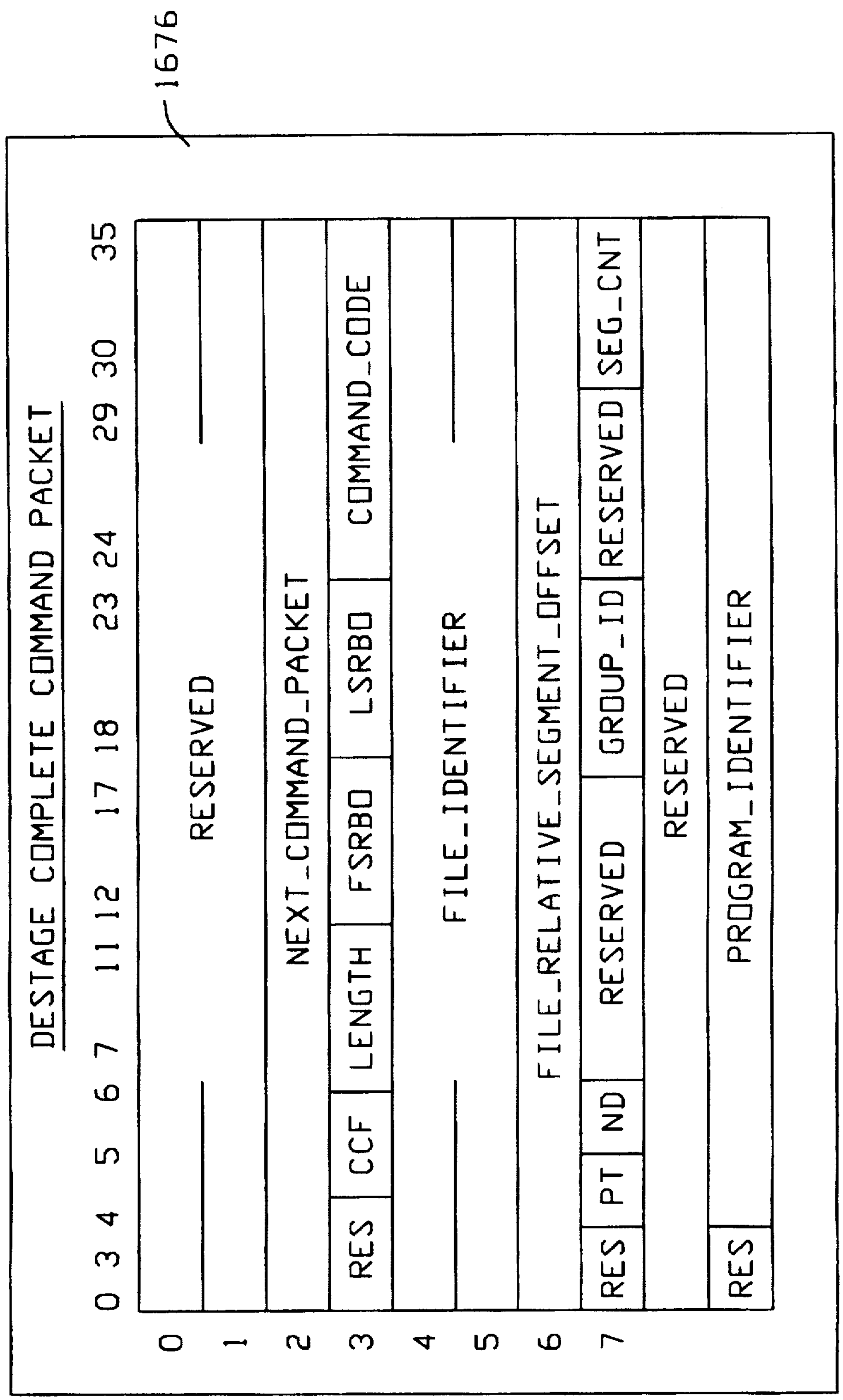
Figure 57:
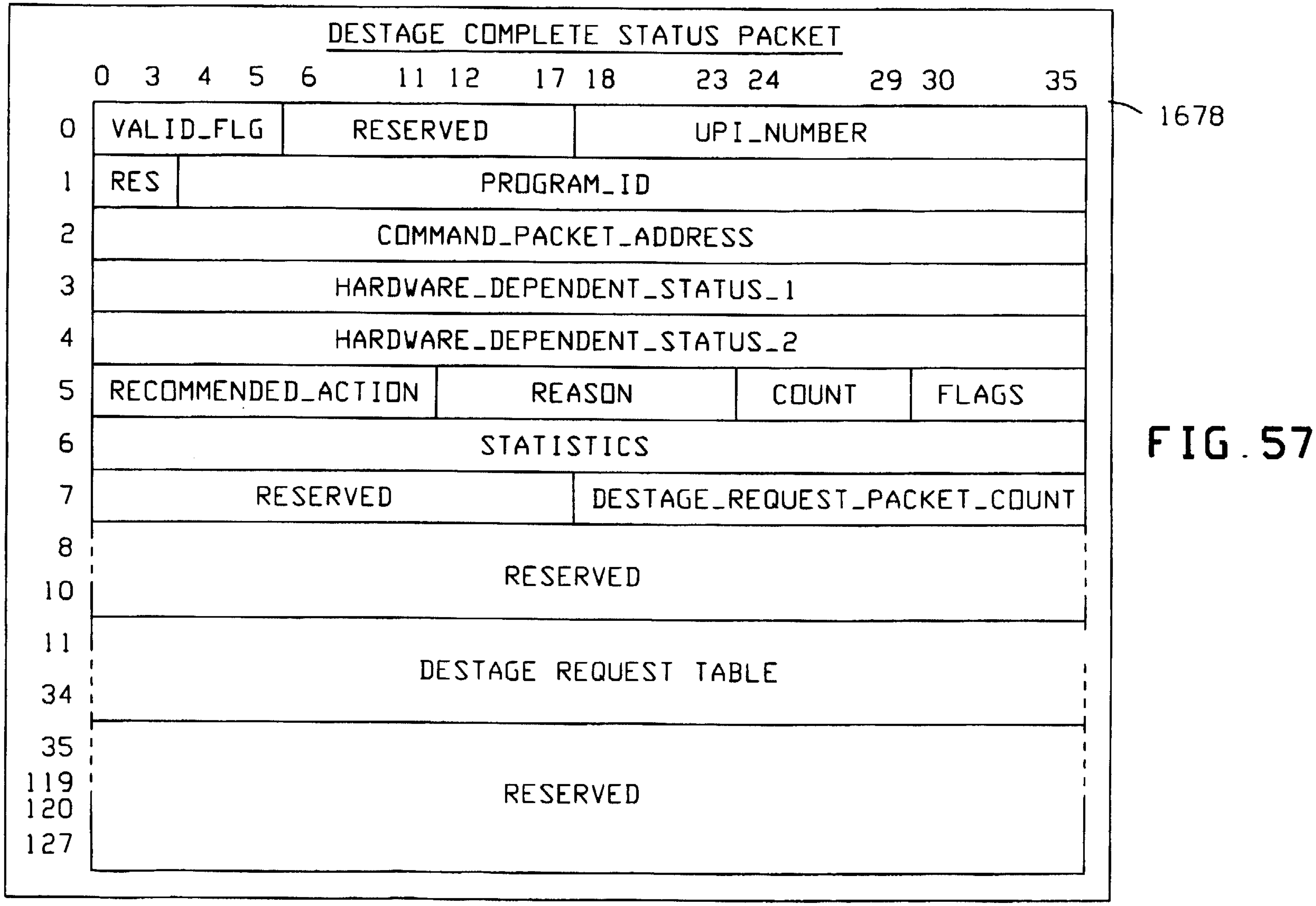
Figure 58:
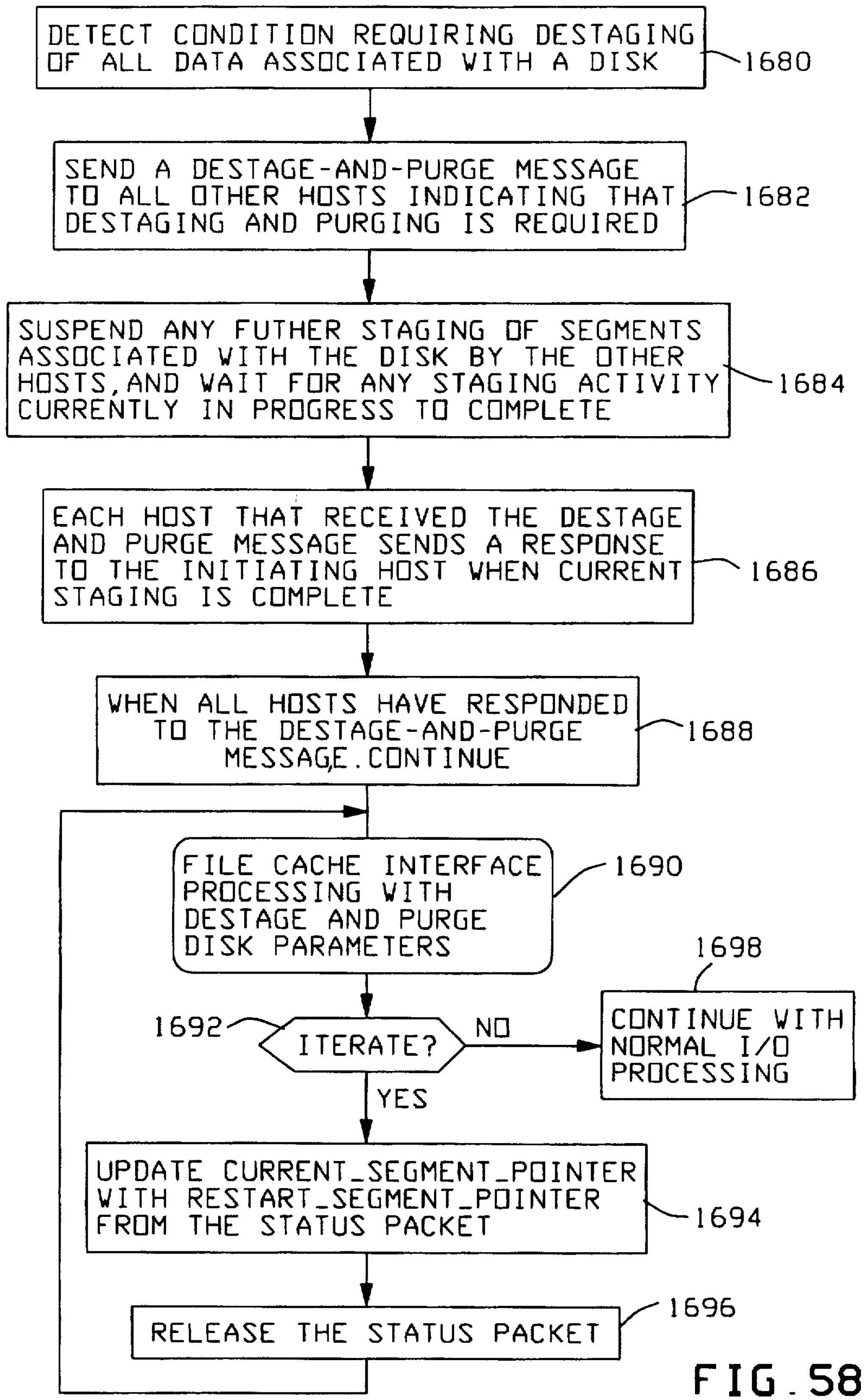
Figure 59:
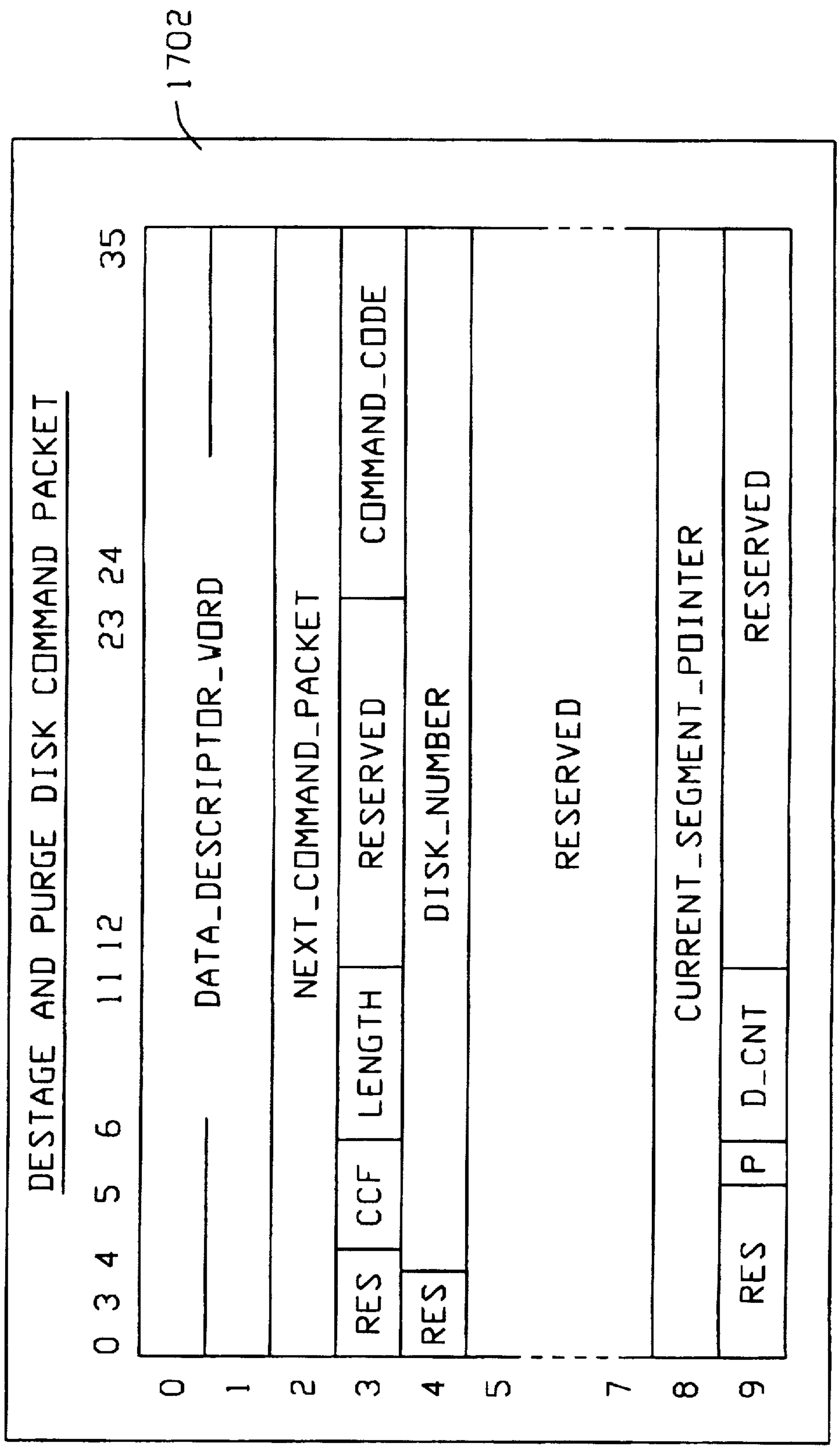
Figure 60:
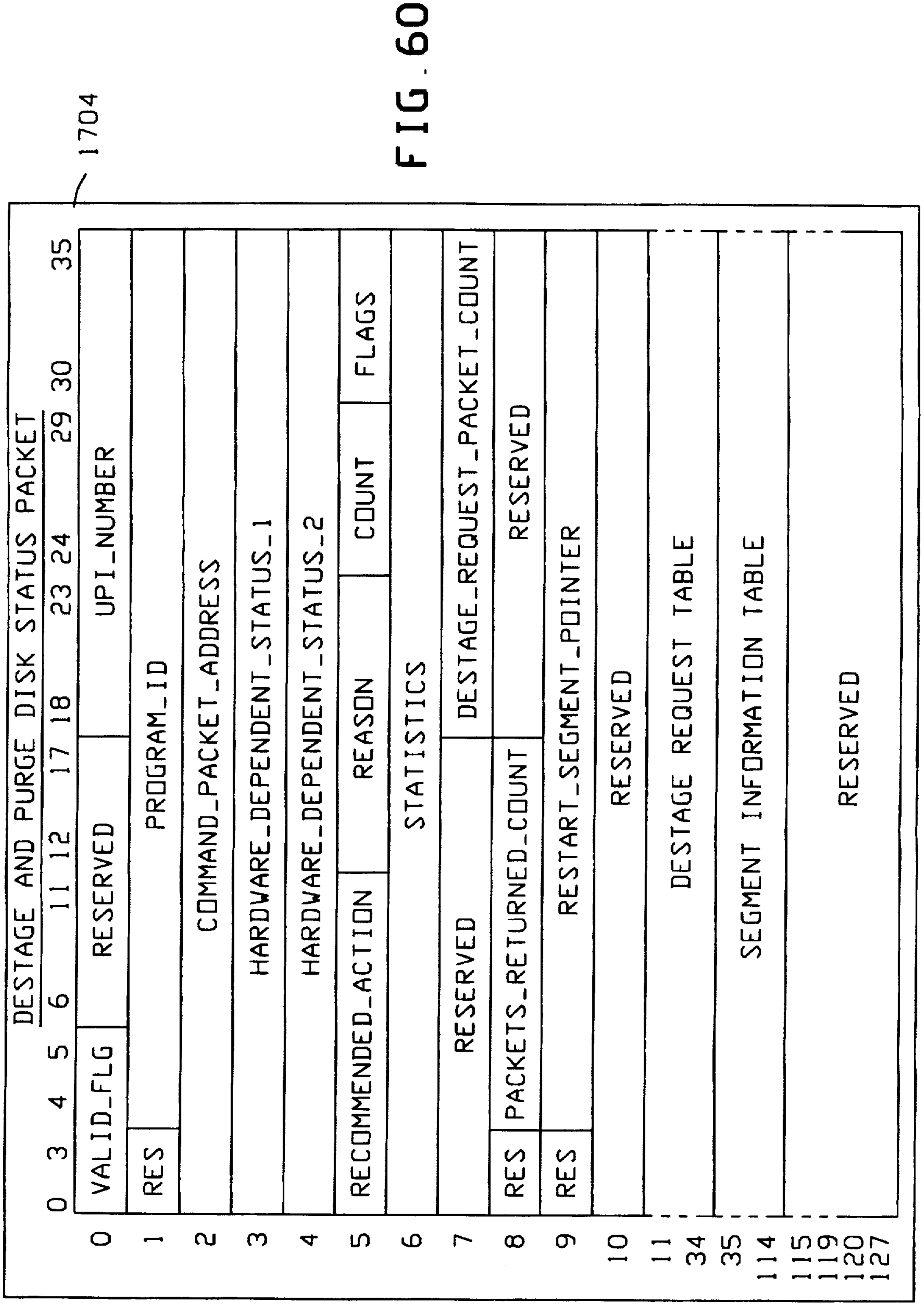
Figure 61:
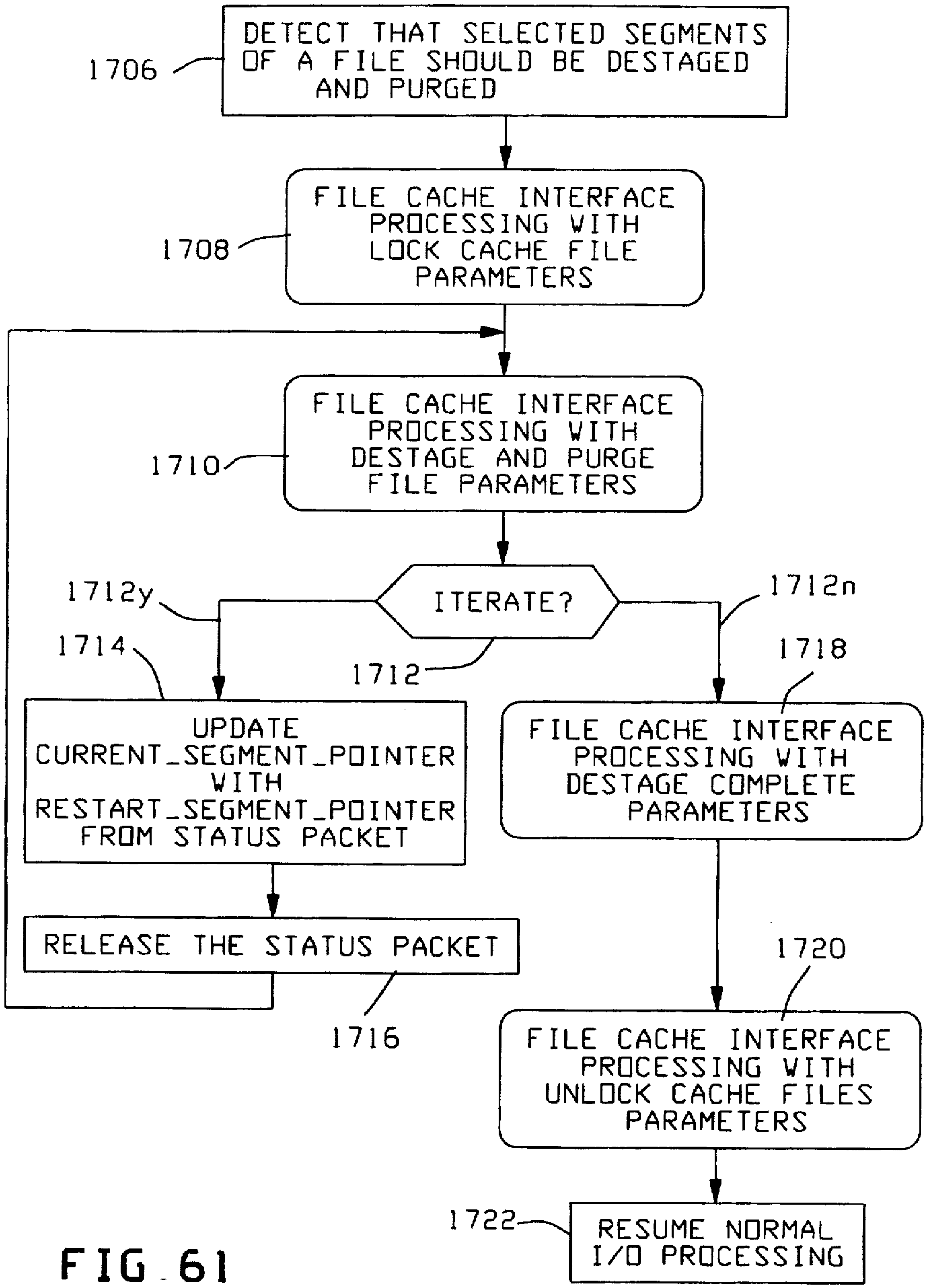
Figure 62:
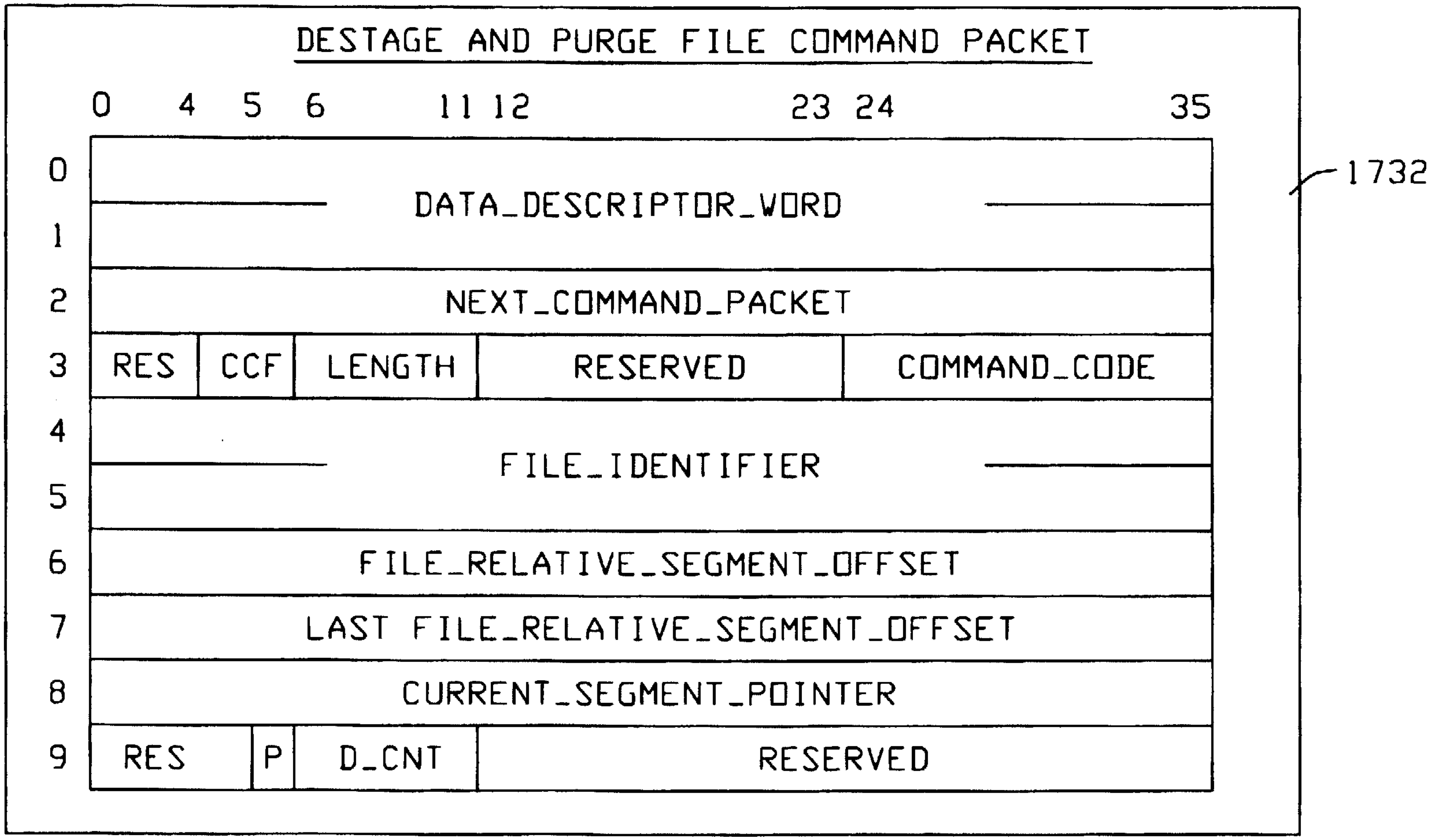
Figure 64:
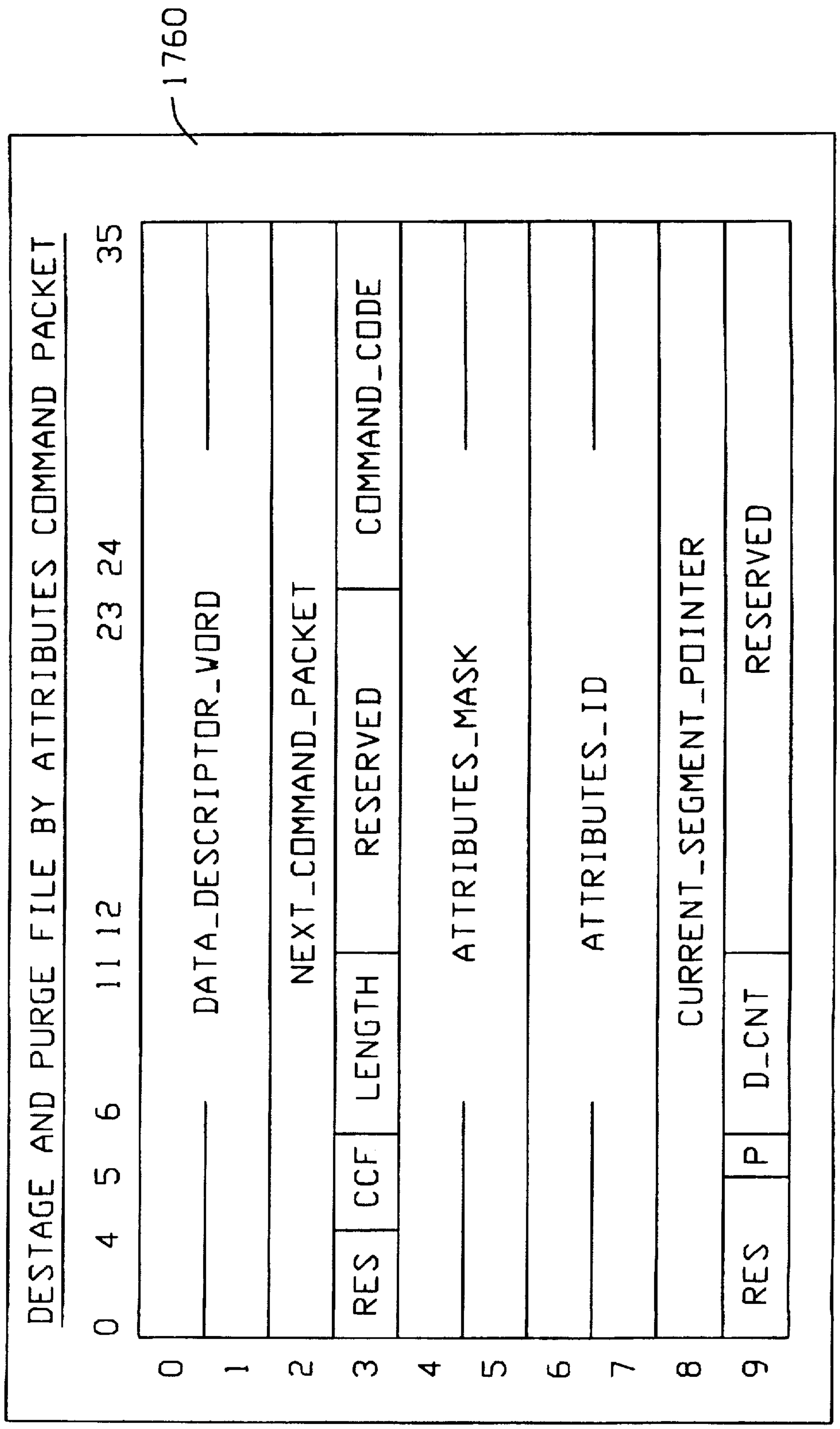
Figure 65:
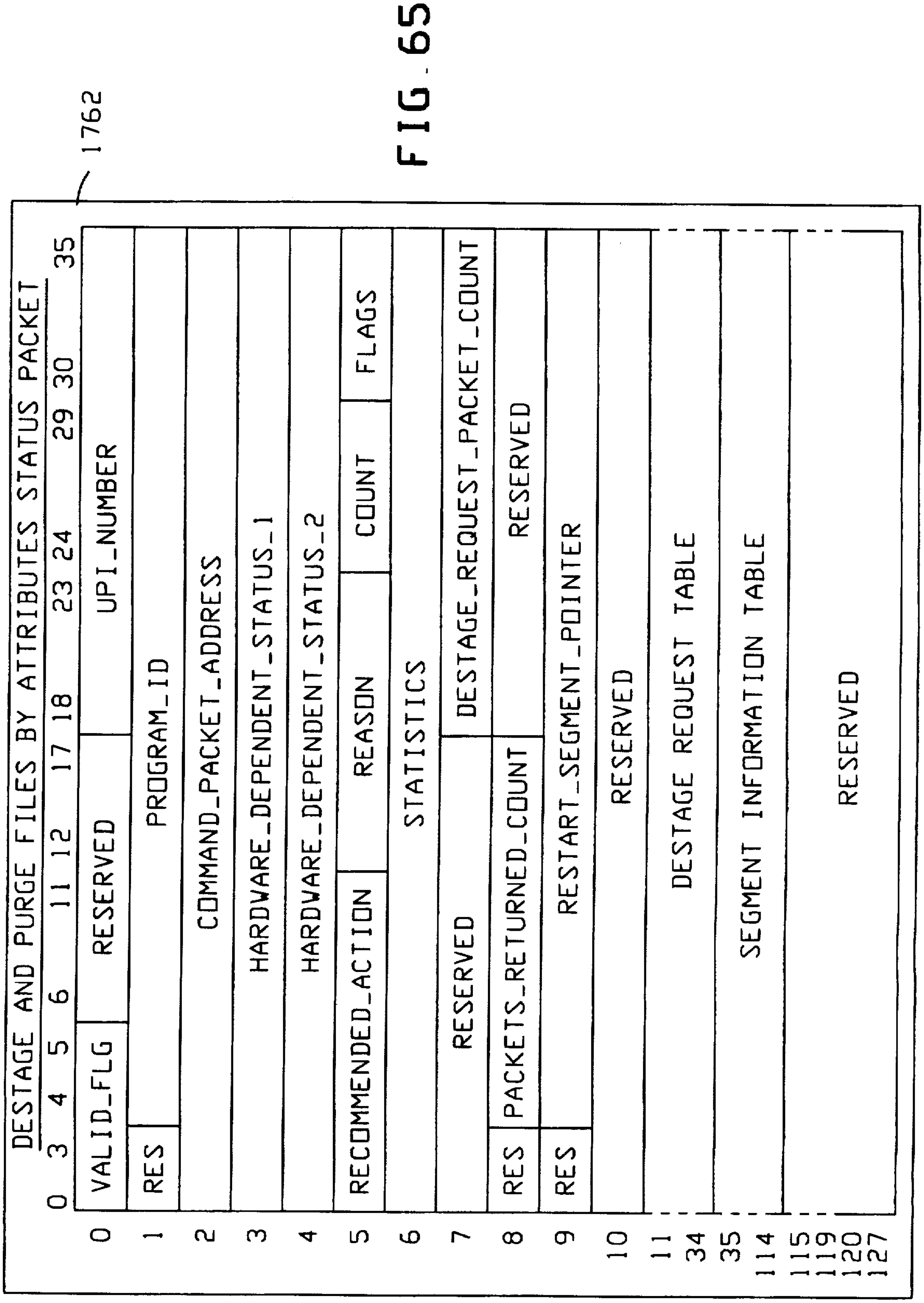
Figure 66:
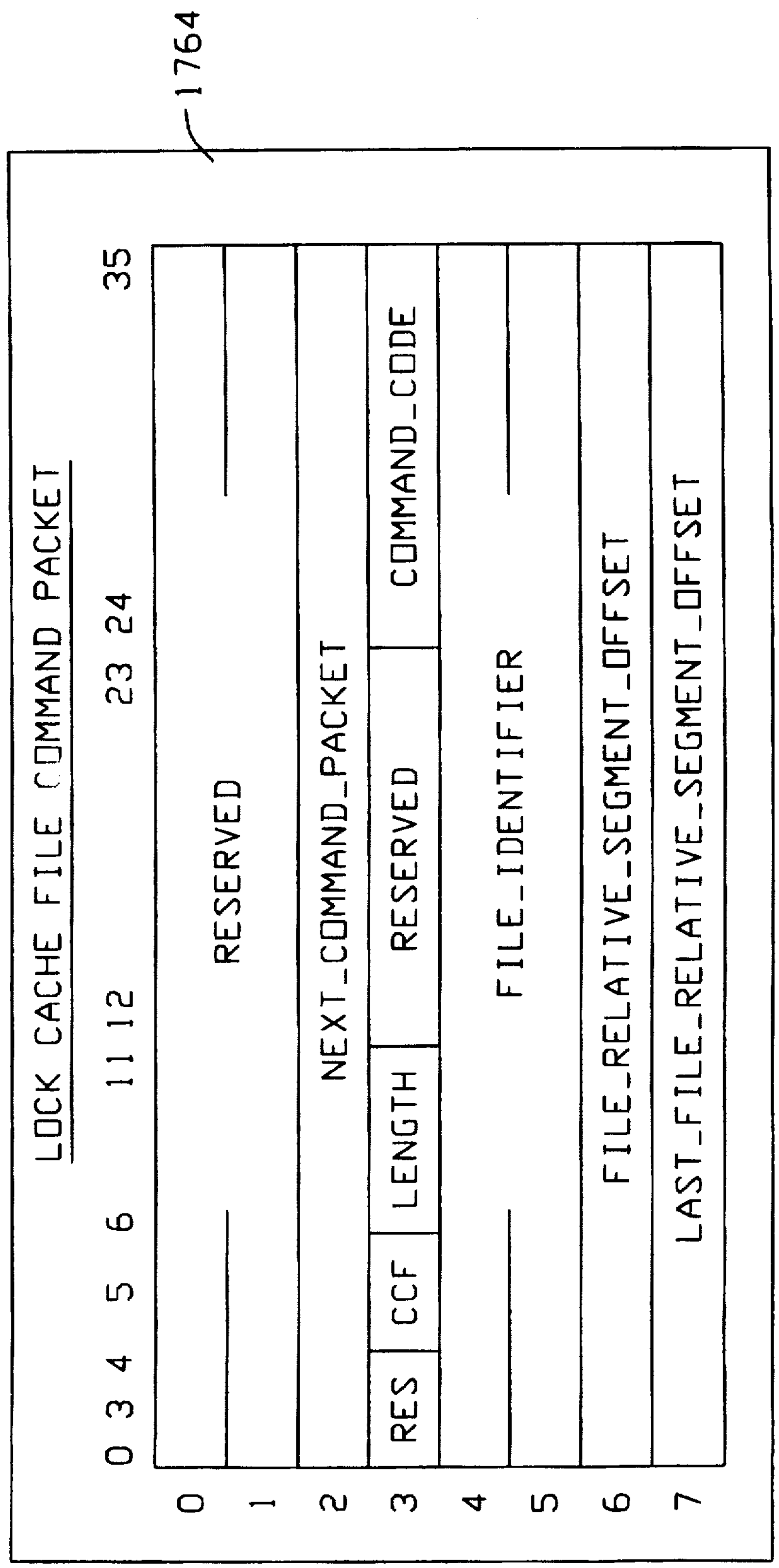
Figure 67:
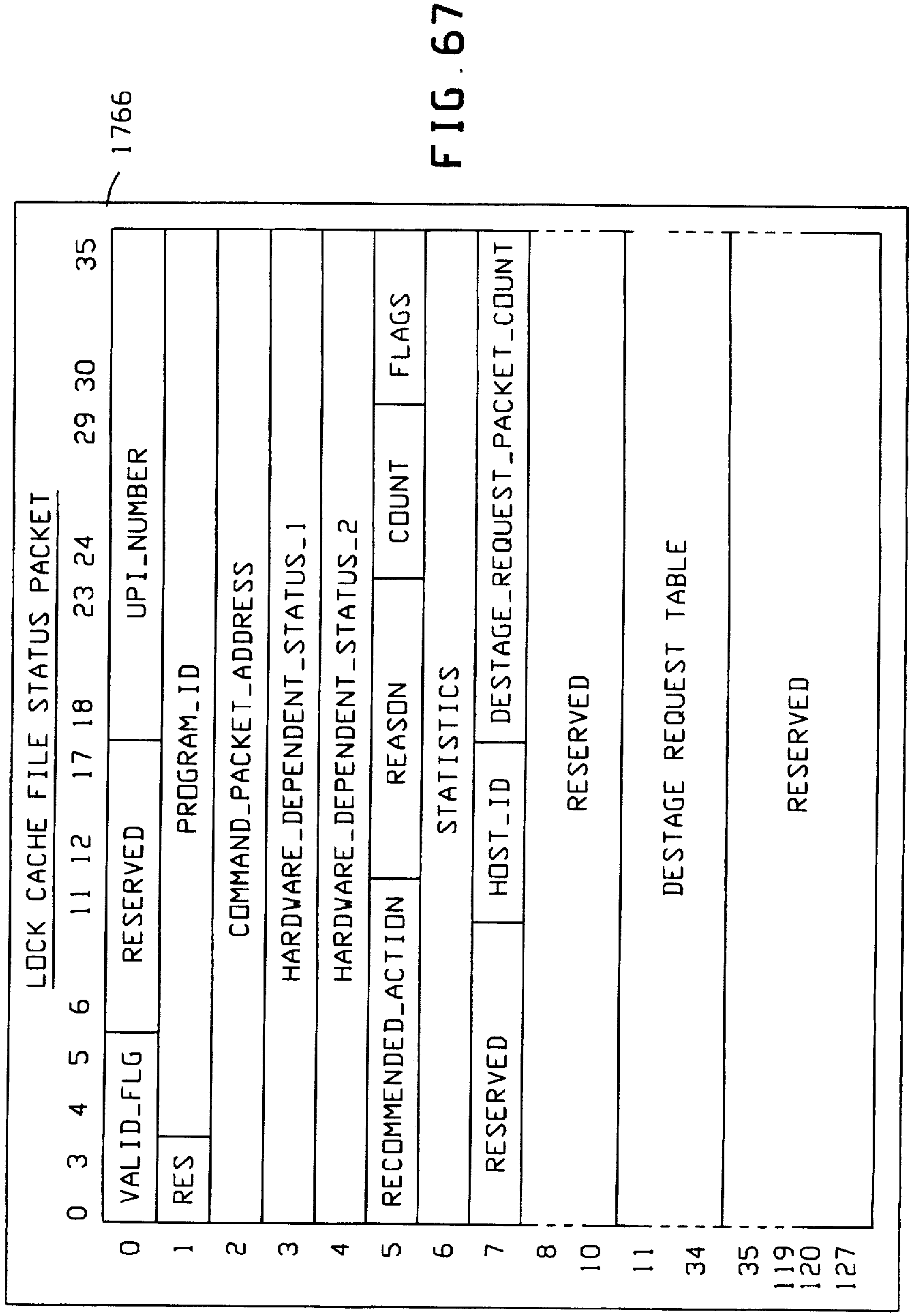
Figure 68:
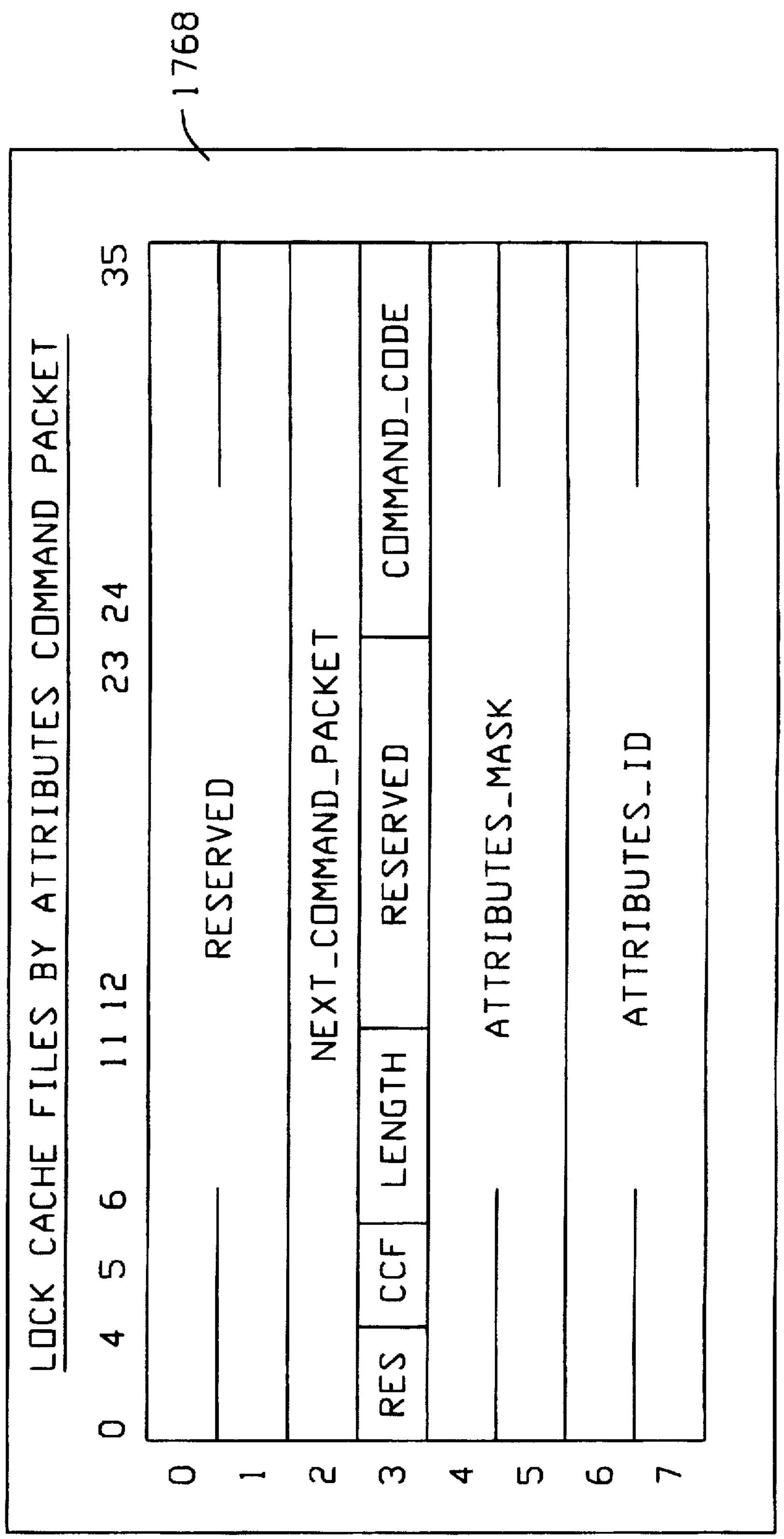
Figure 69:
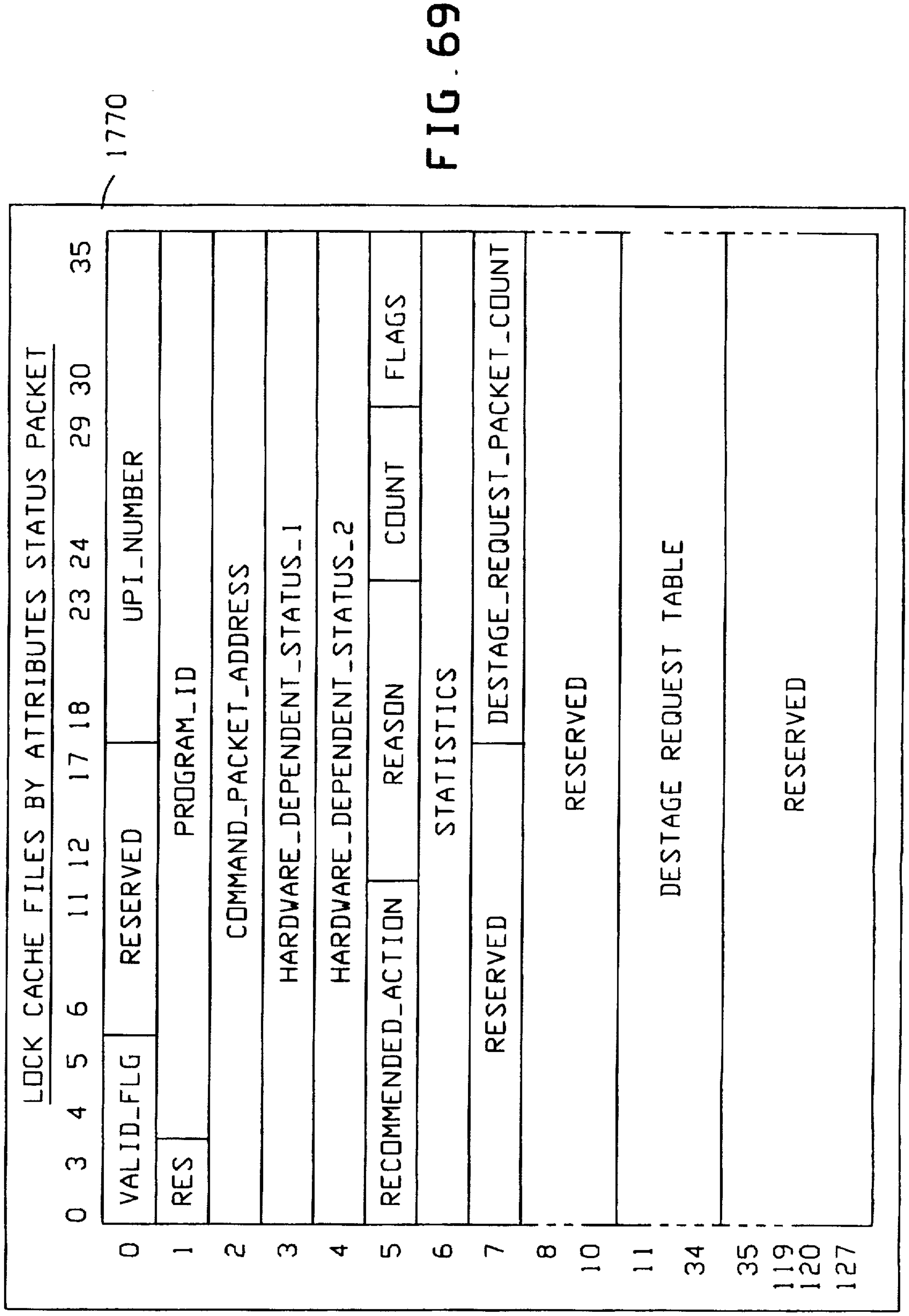
Figure 70:
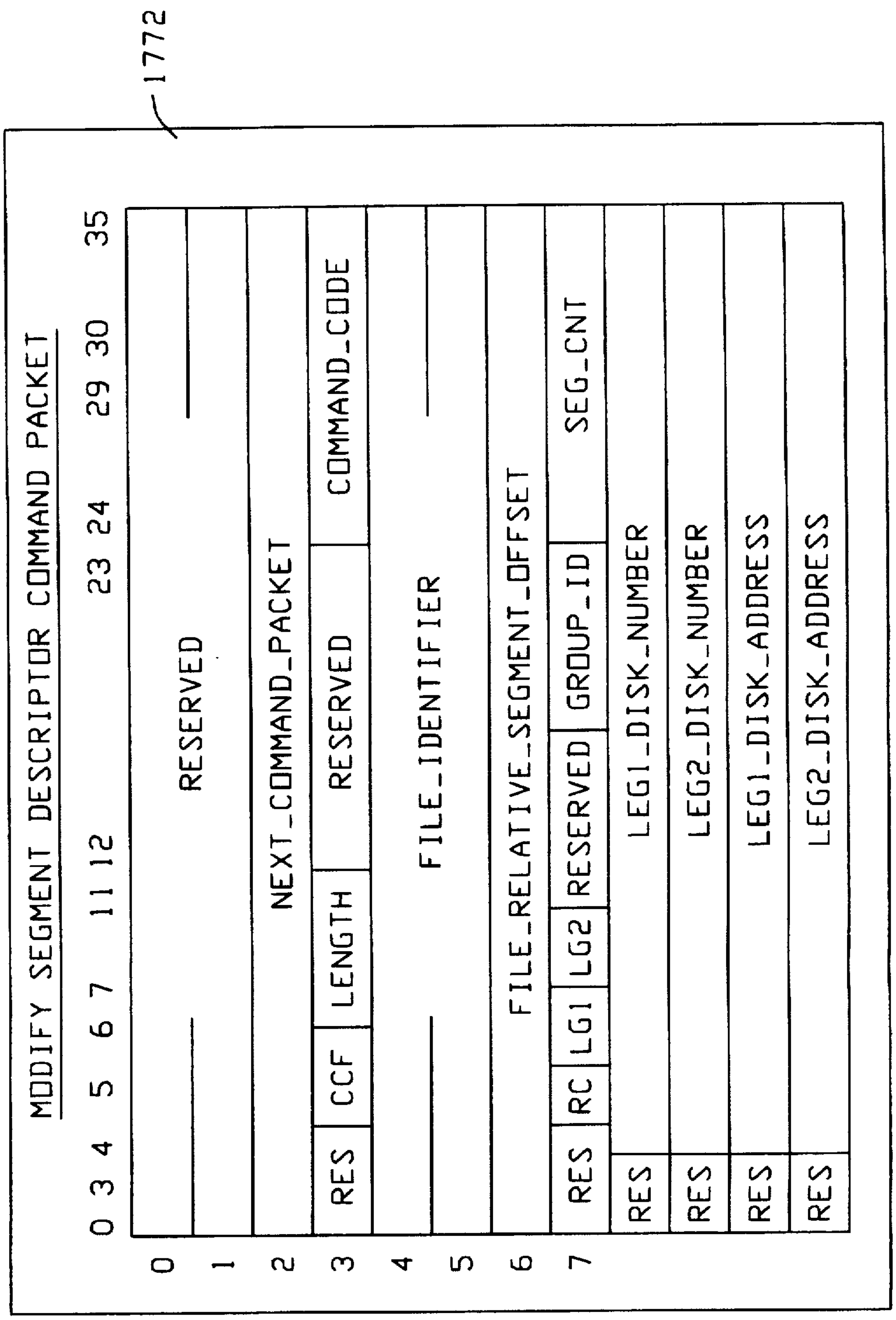
Figure 72:
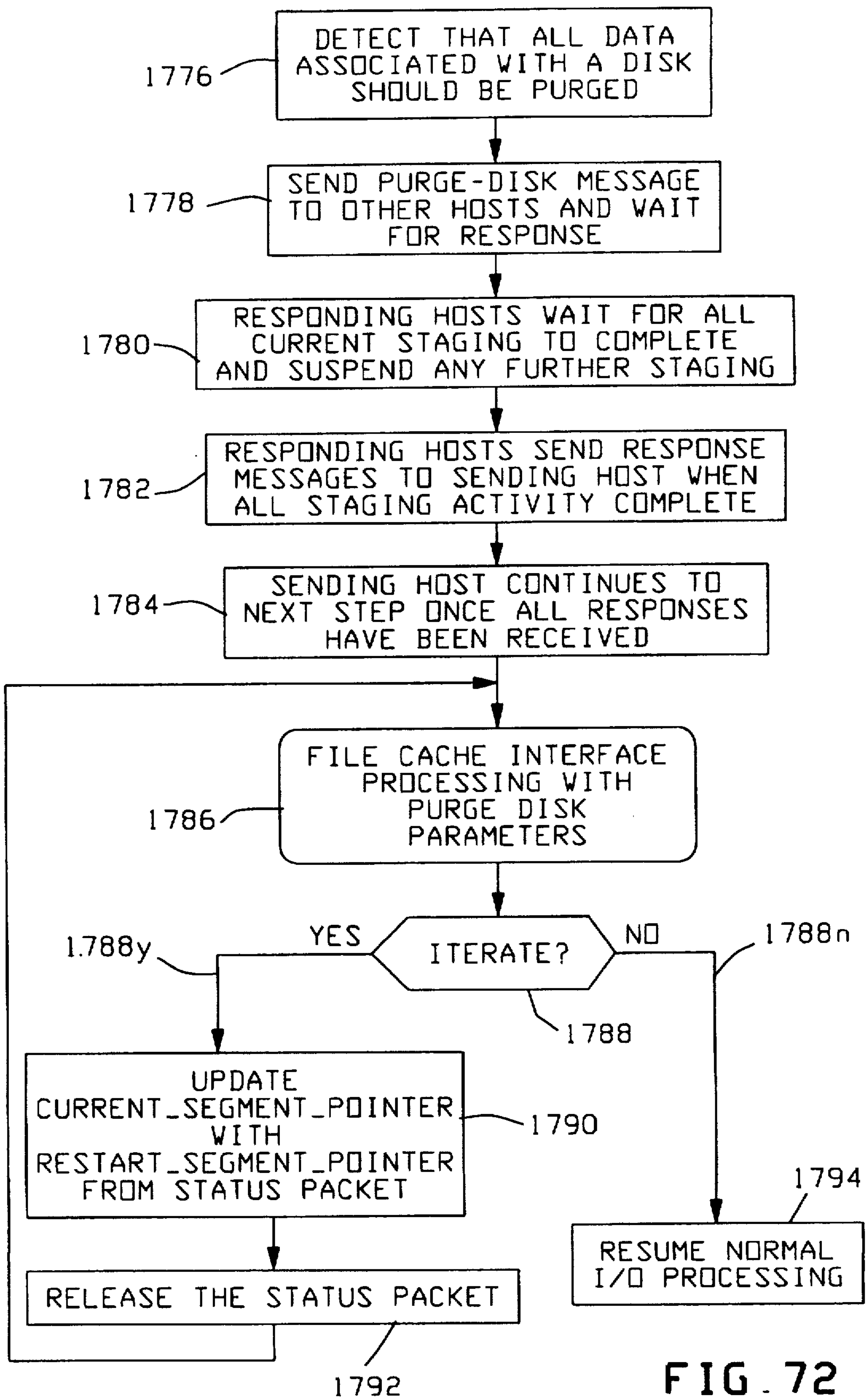
Figure 73:
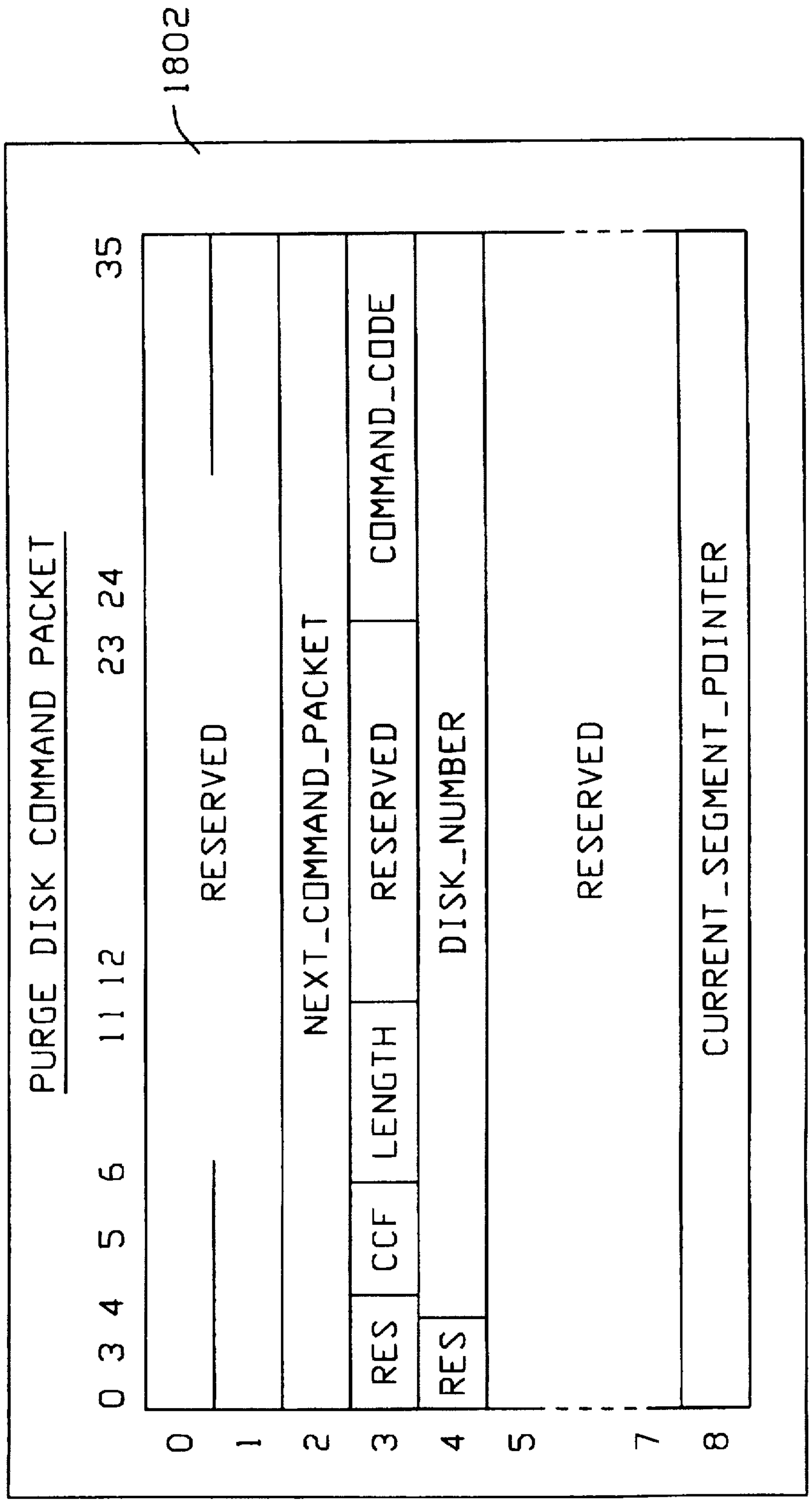
Figure 74:
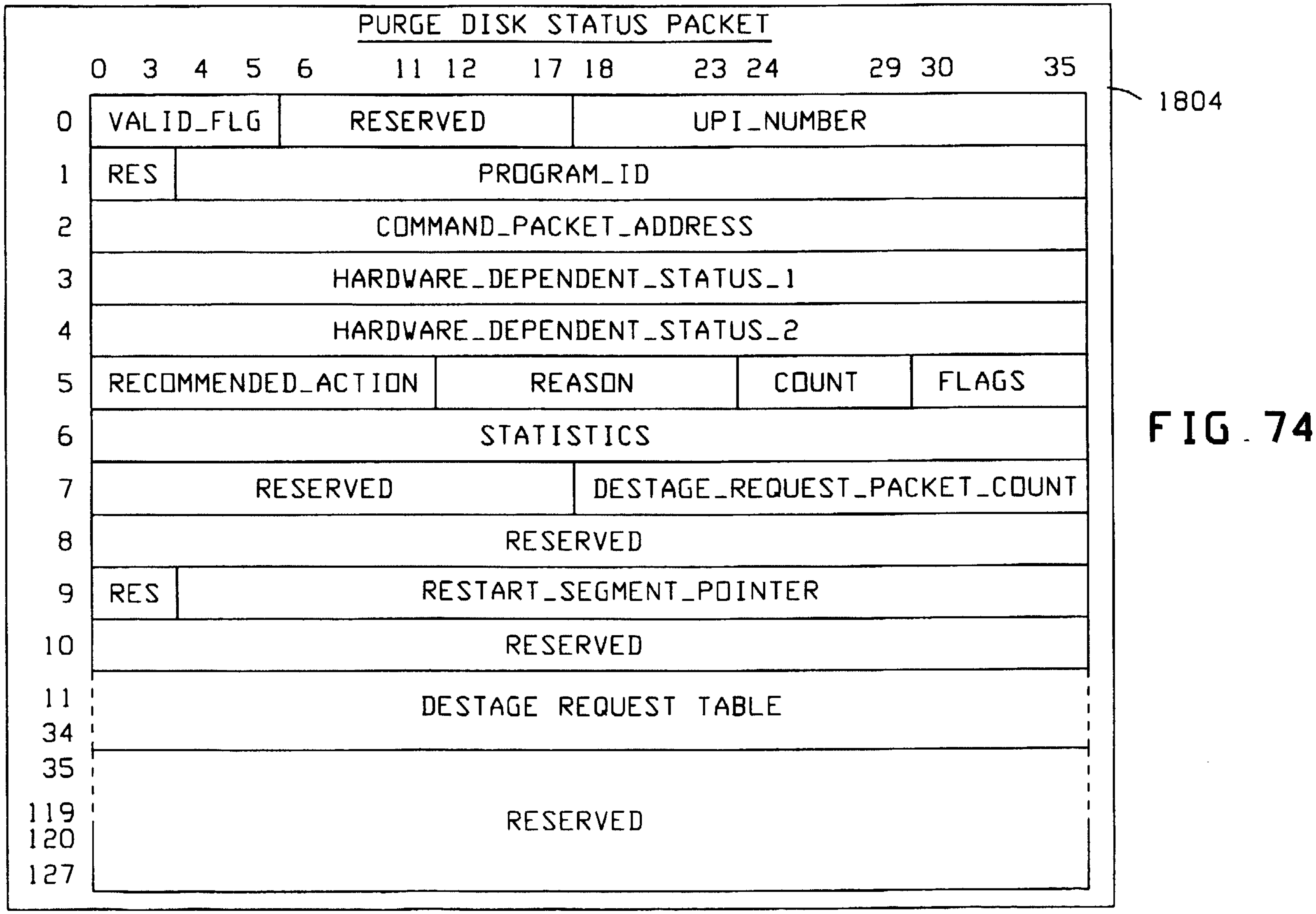
Figure 75:
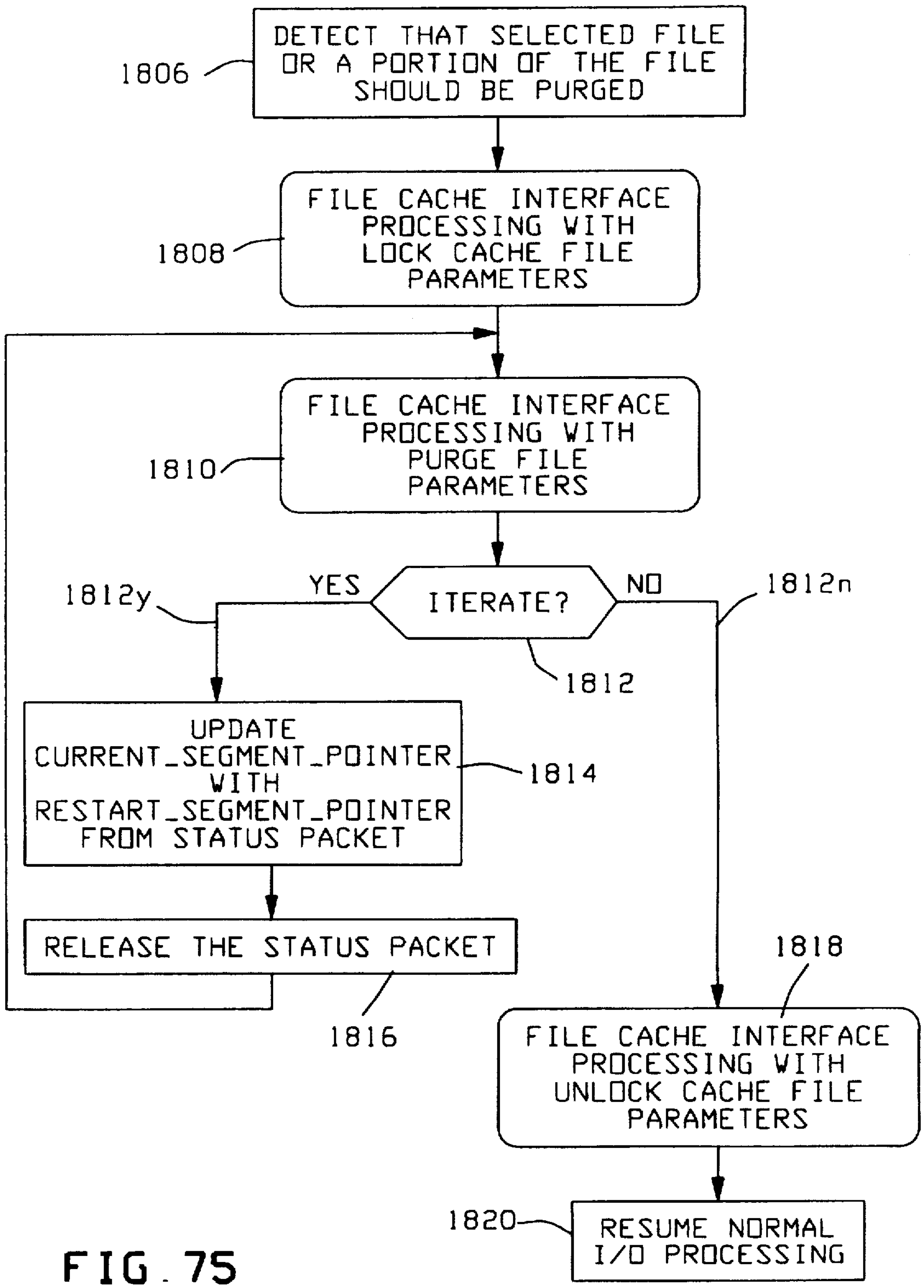
Figure 76:
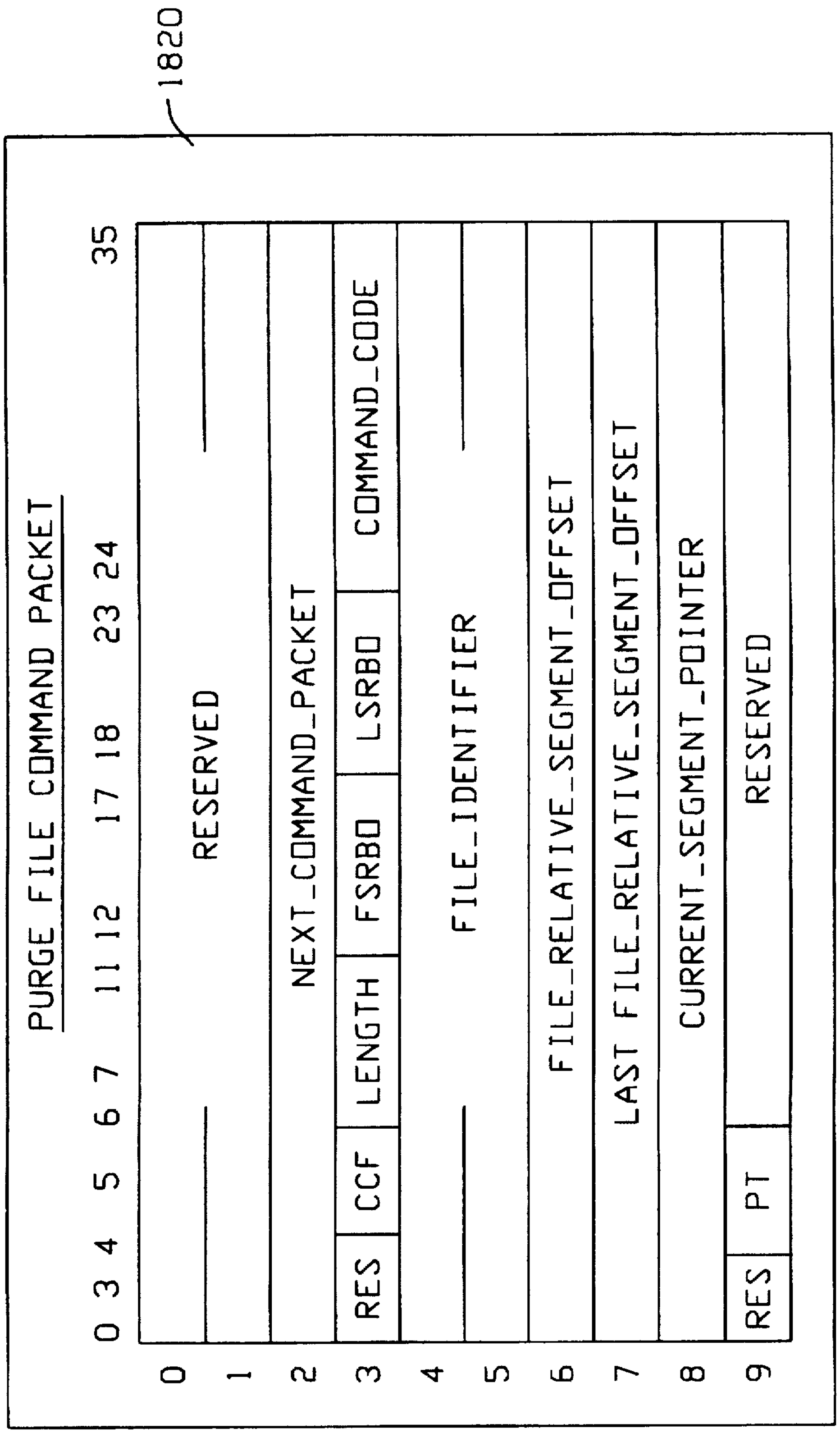
Figure 77:
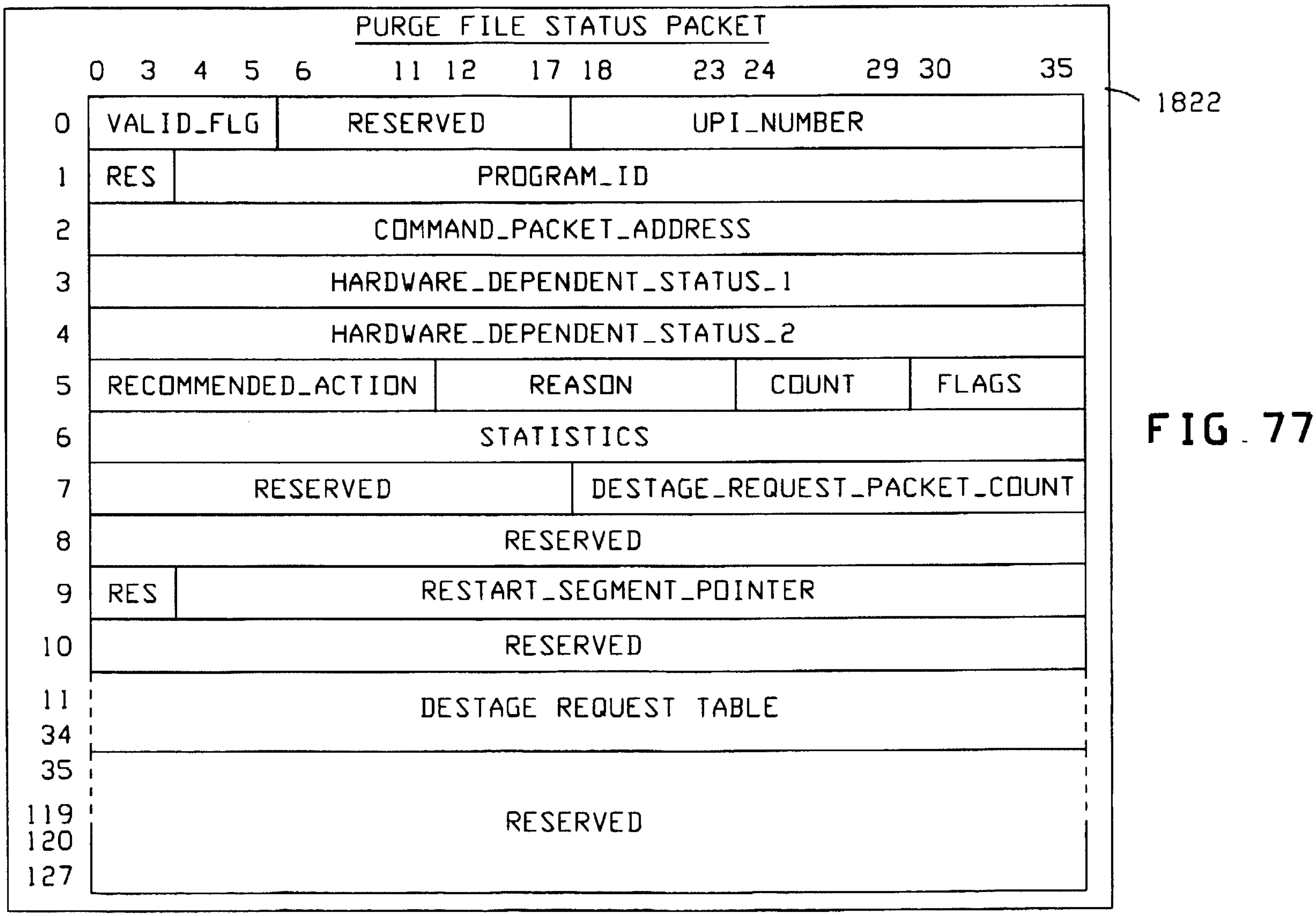
Figure 78:
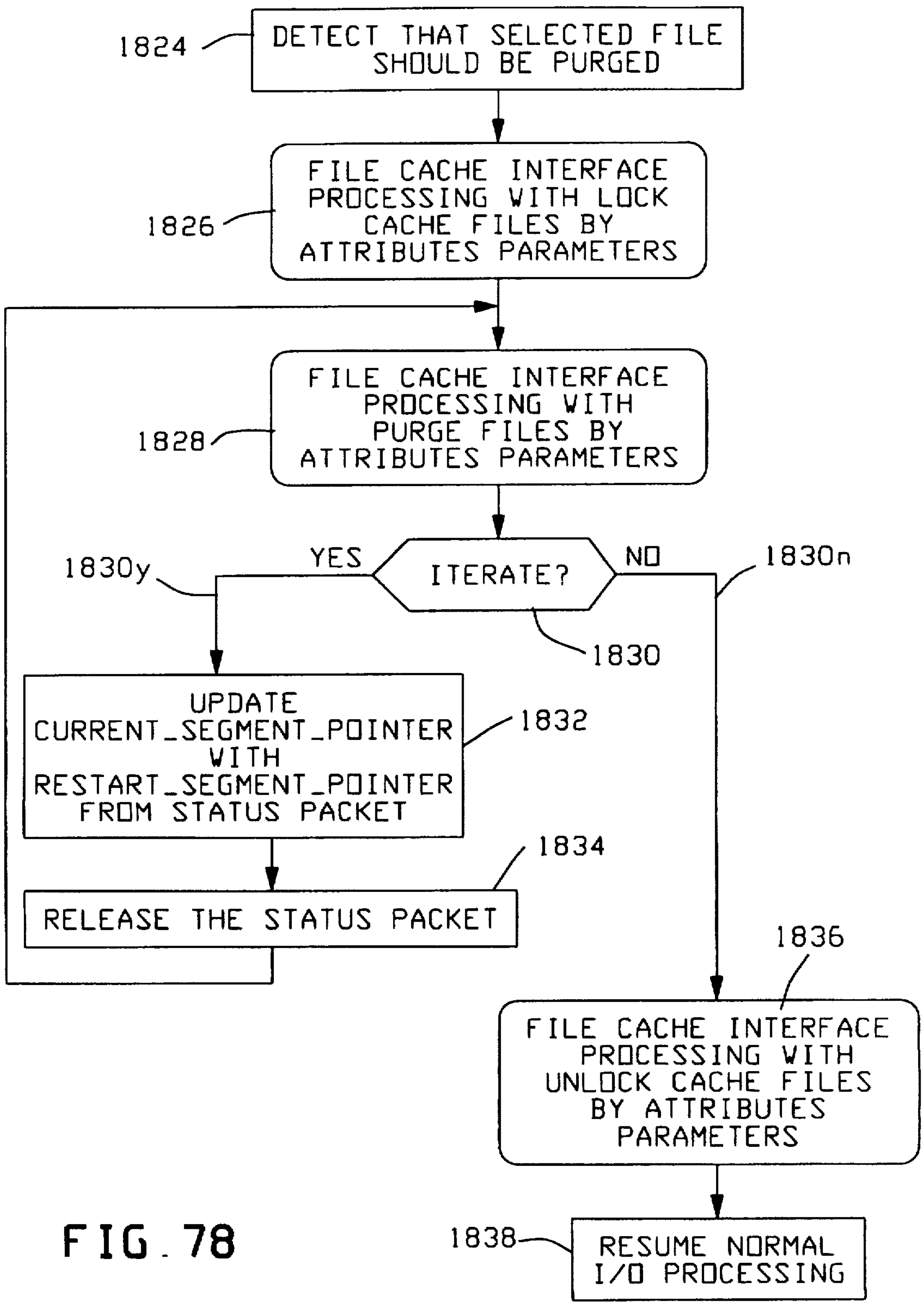
Figure 79:
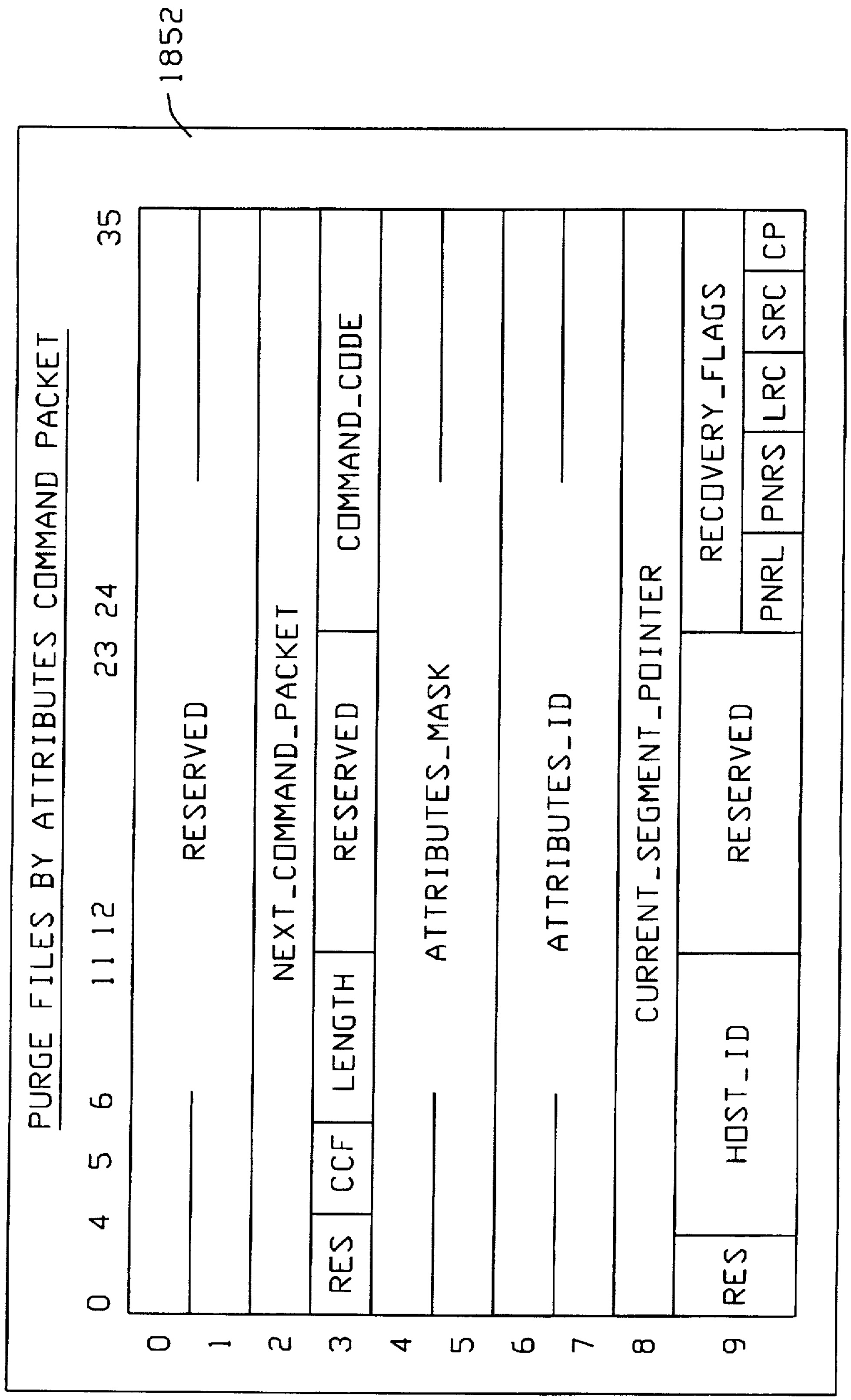
Figure 81:
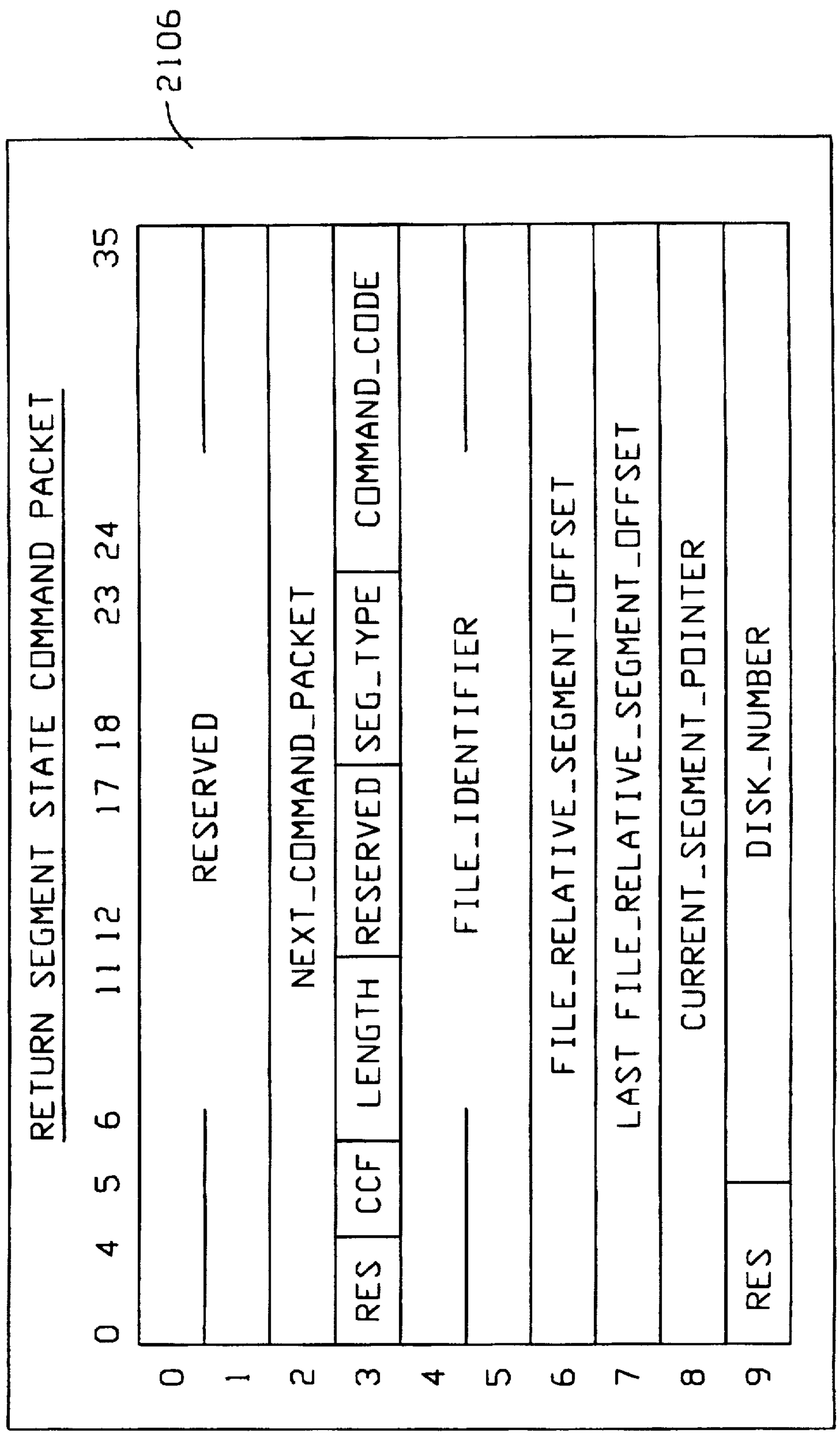
Figure 82:
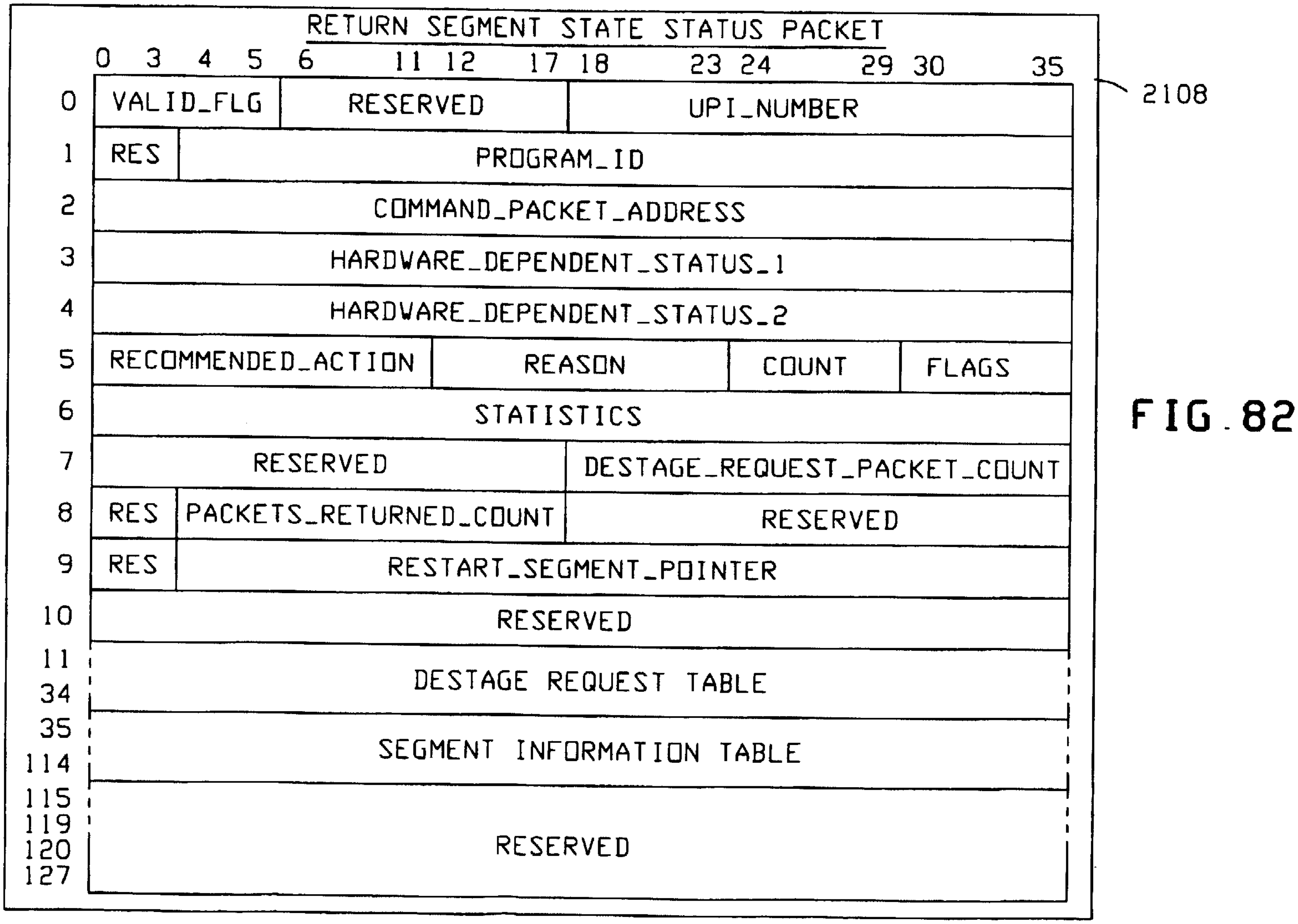
Figure 83:
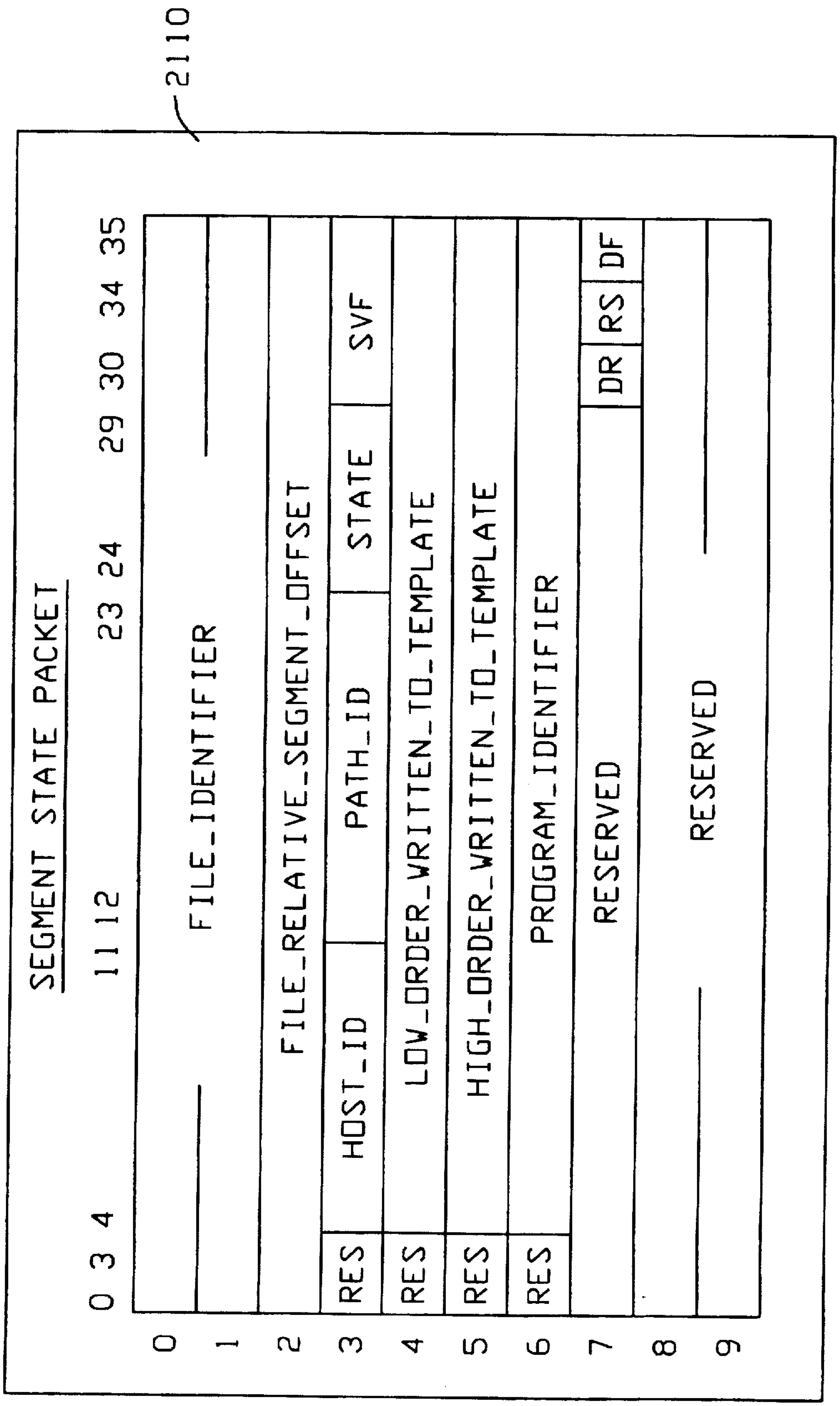
Figure 84:
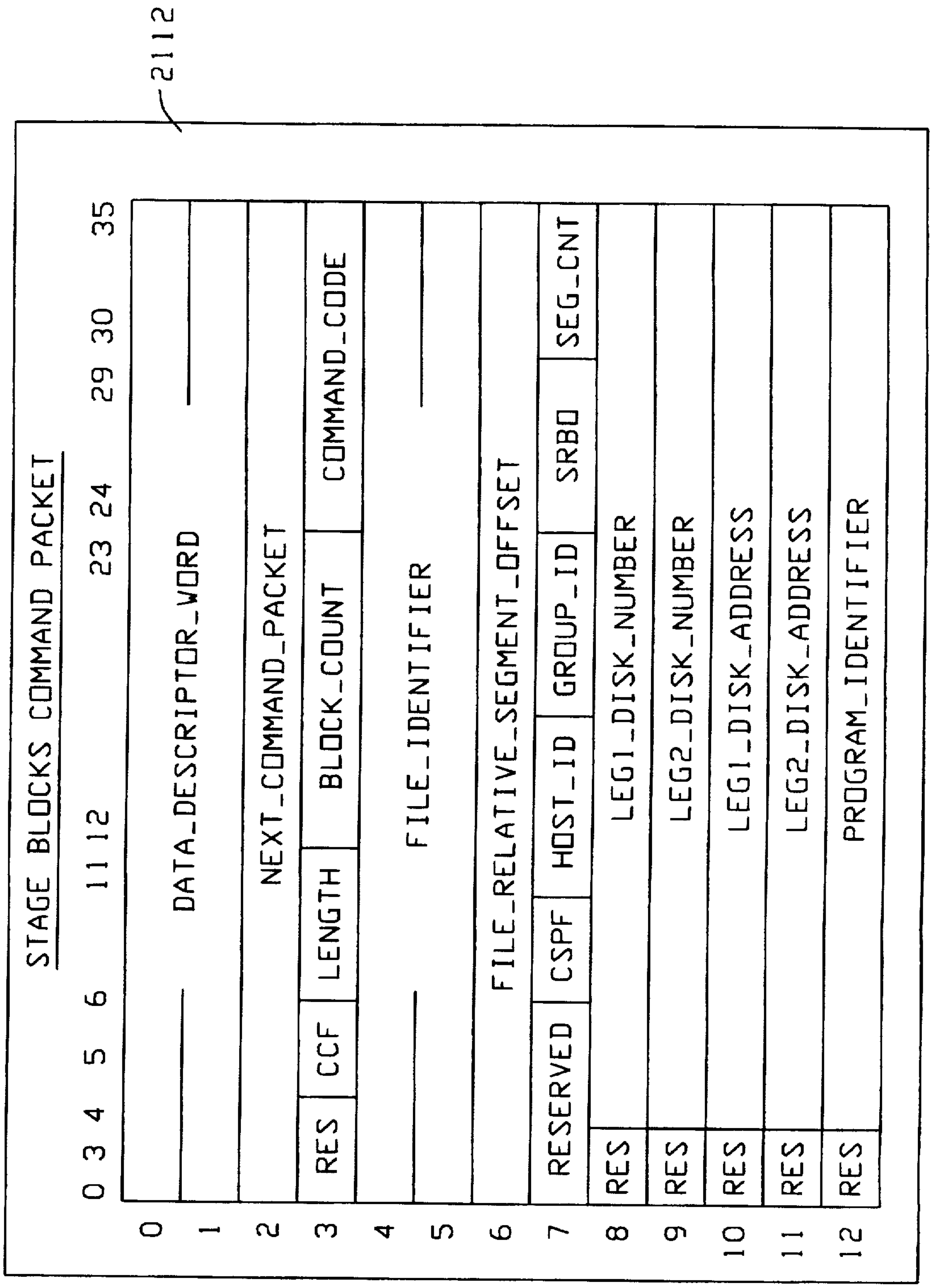
Figure 86:
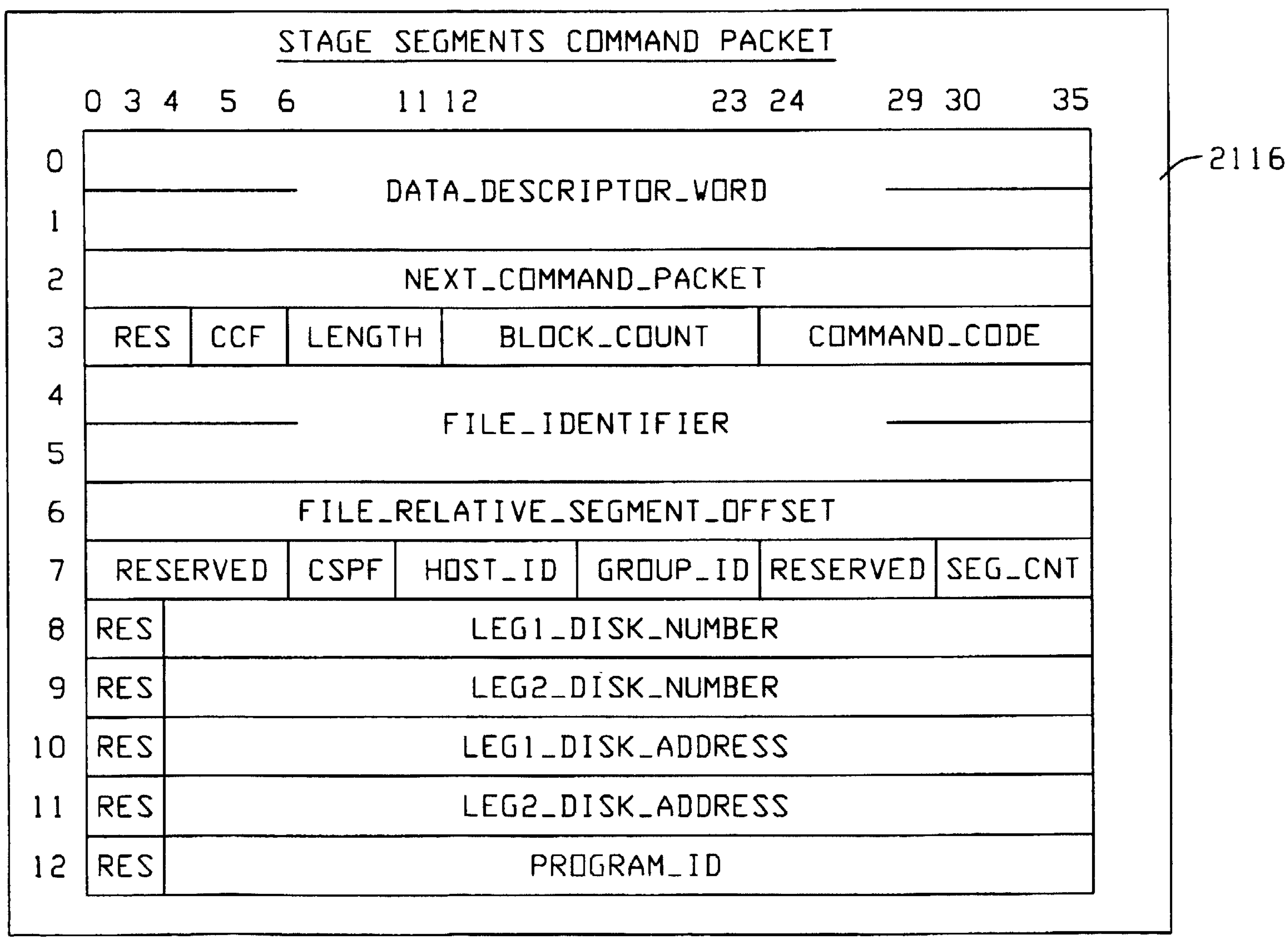
Figure 87:
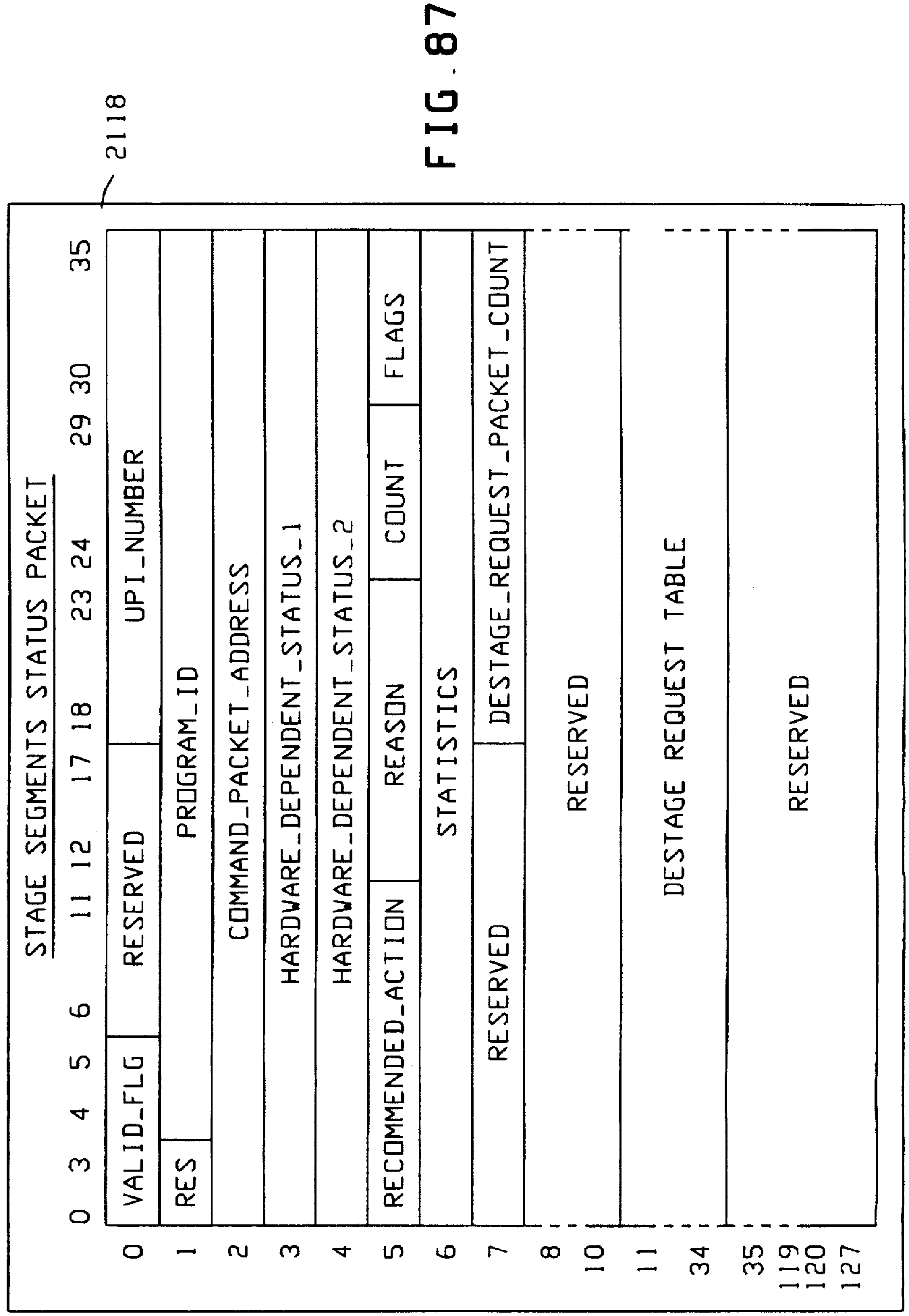
Figure 88:
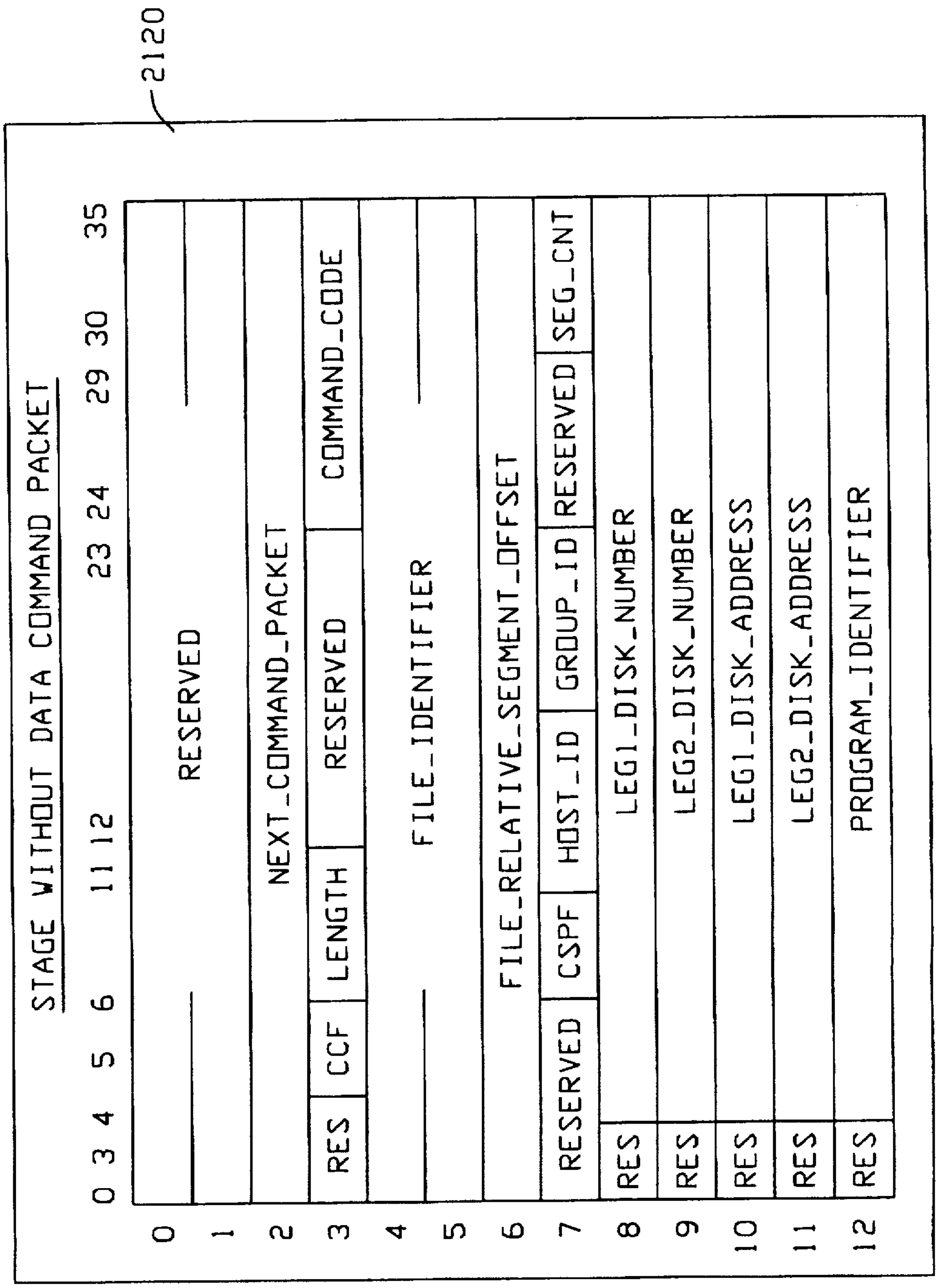
Figure 90:
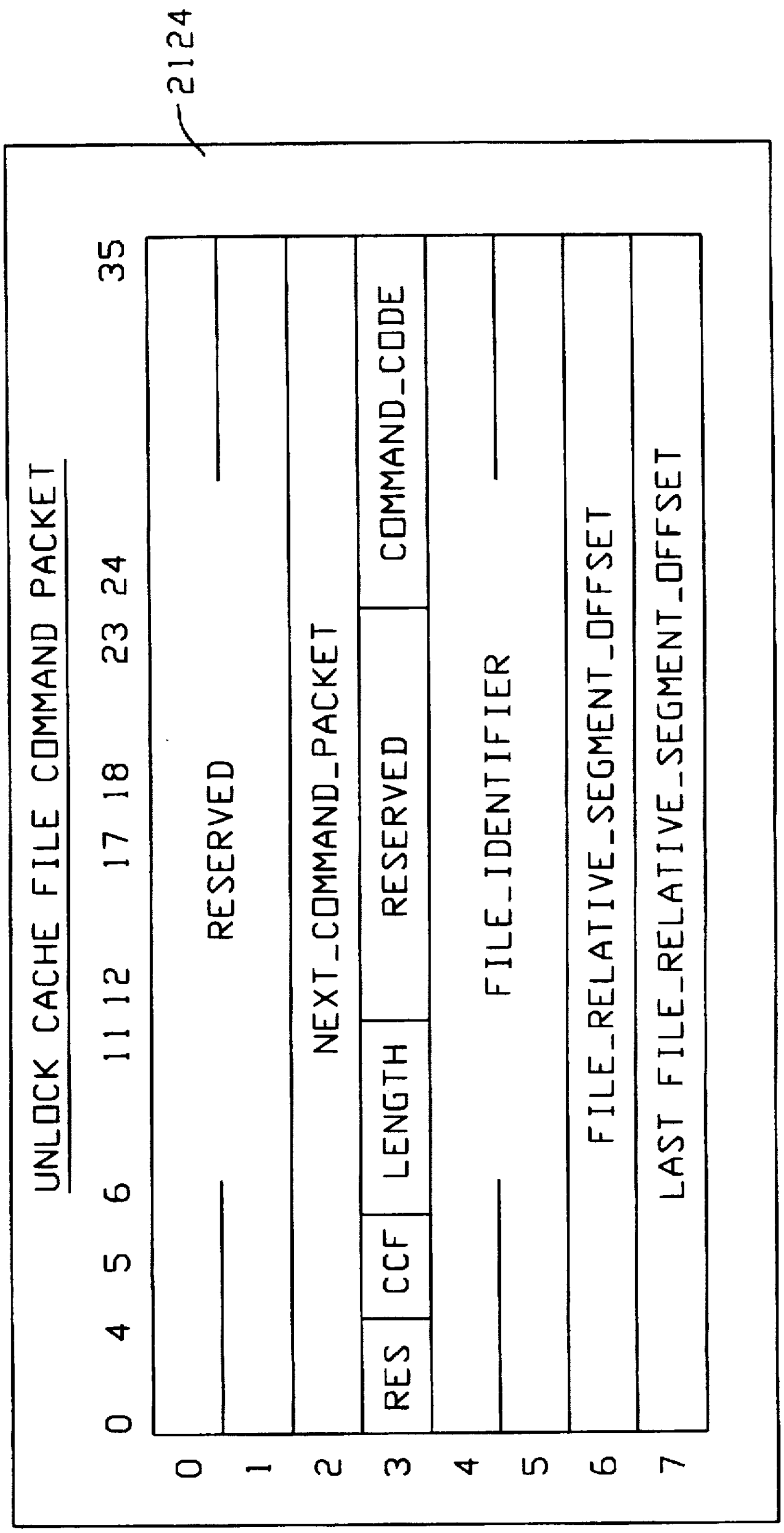
Figure 91:
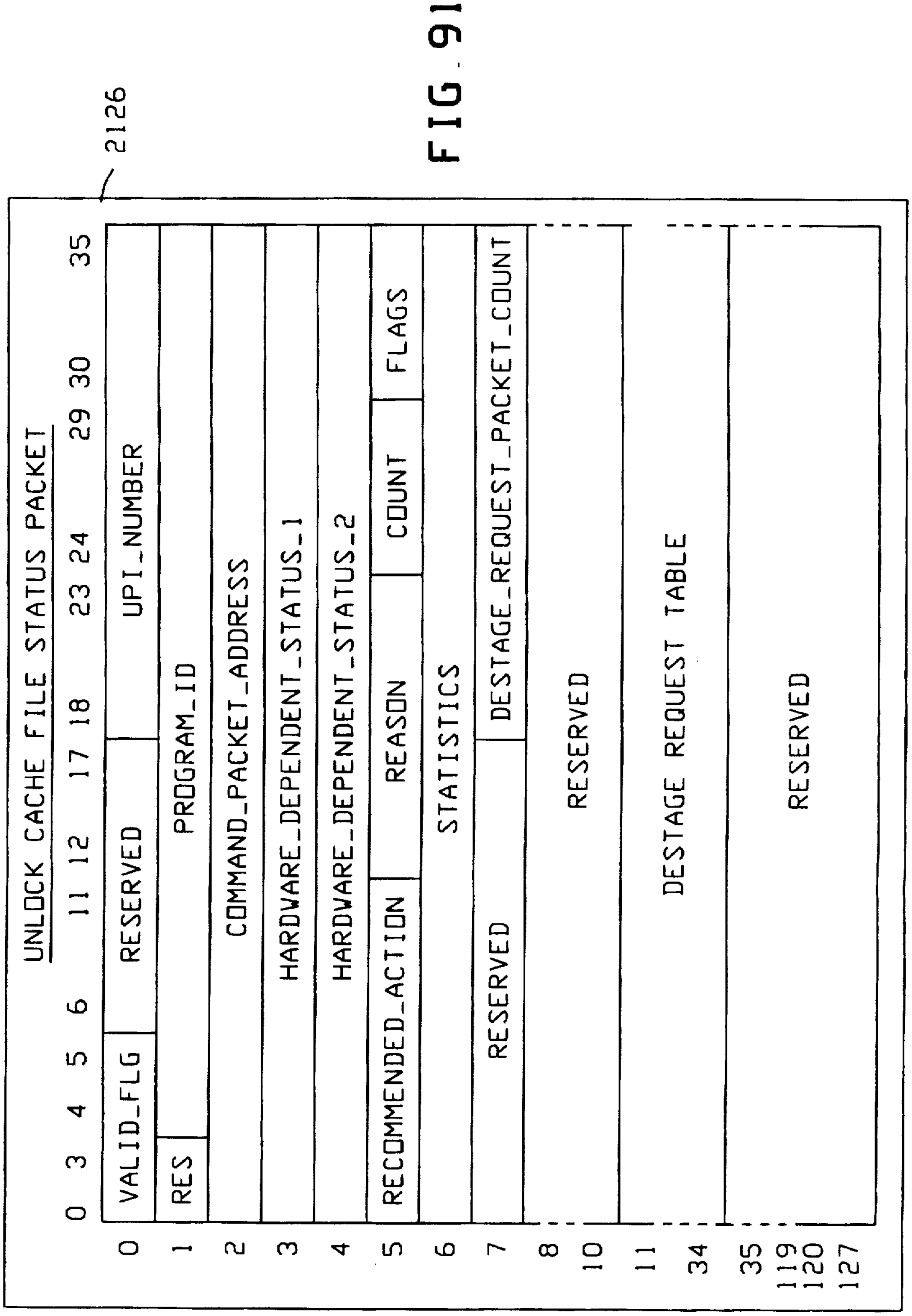
Figure 92:
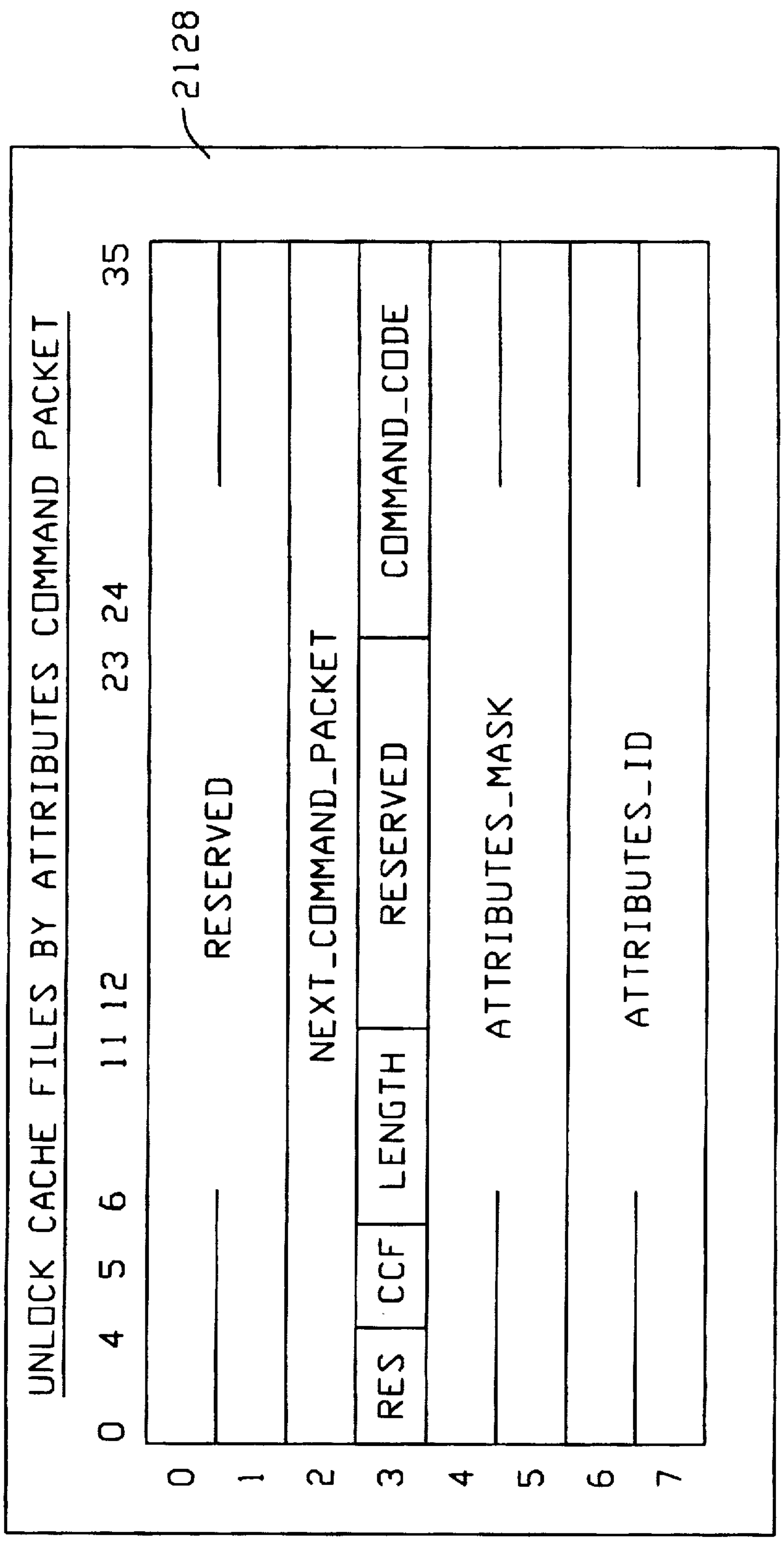
Figure 93:
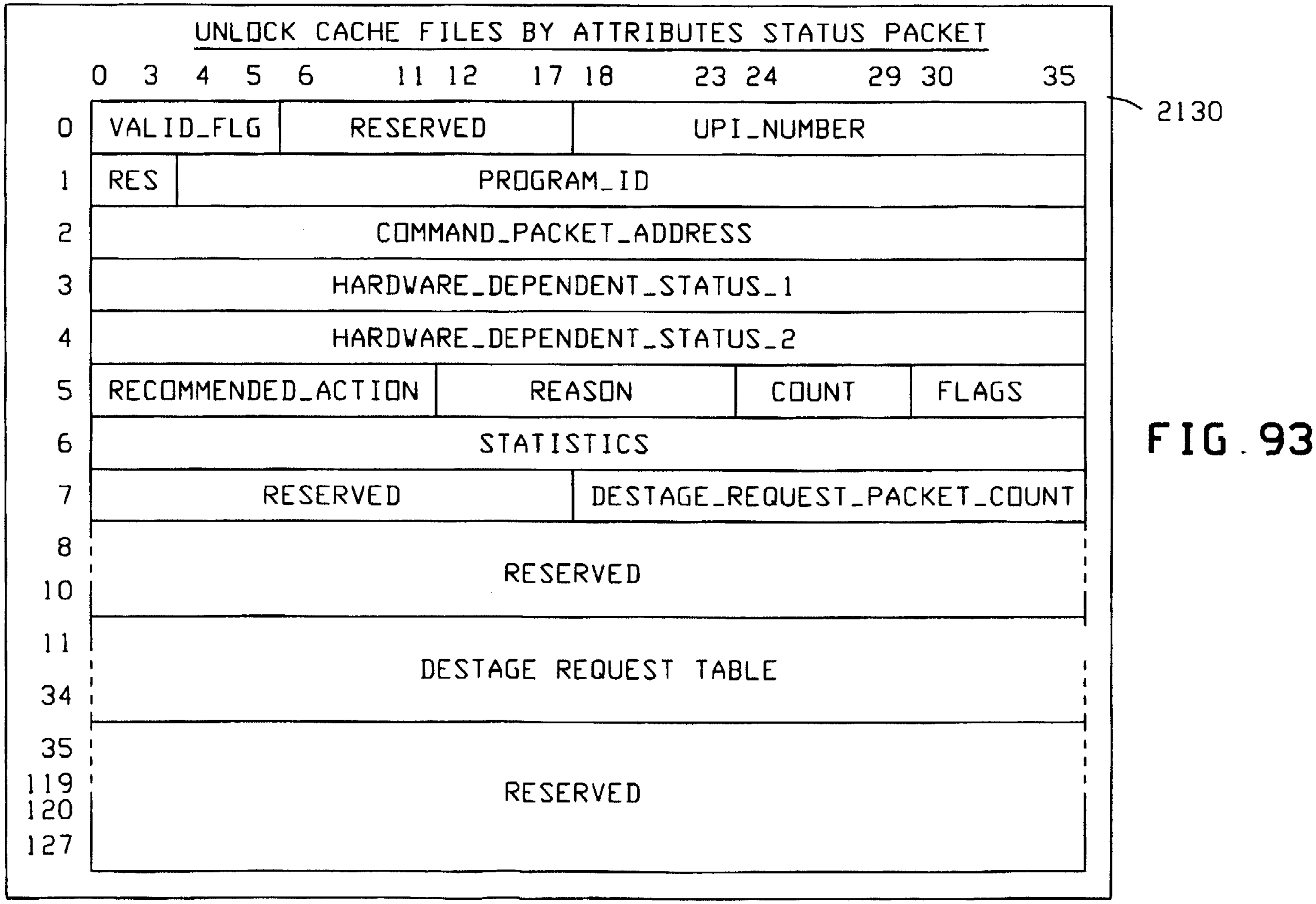
Figure 94:
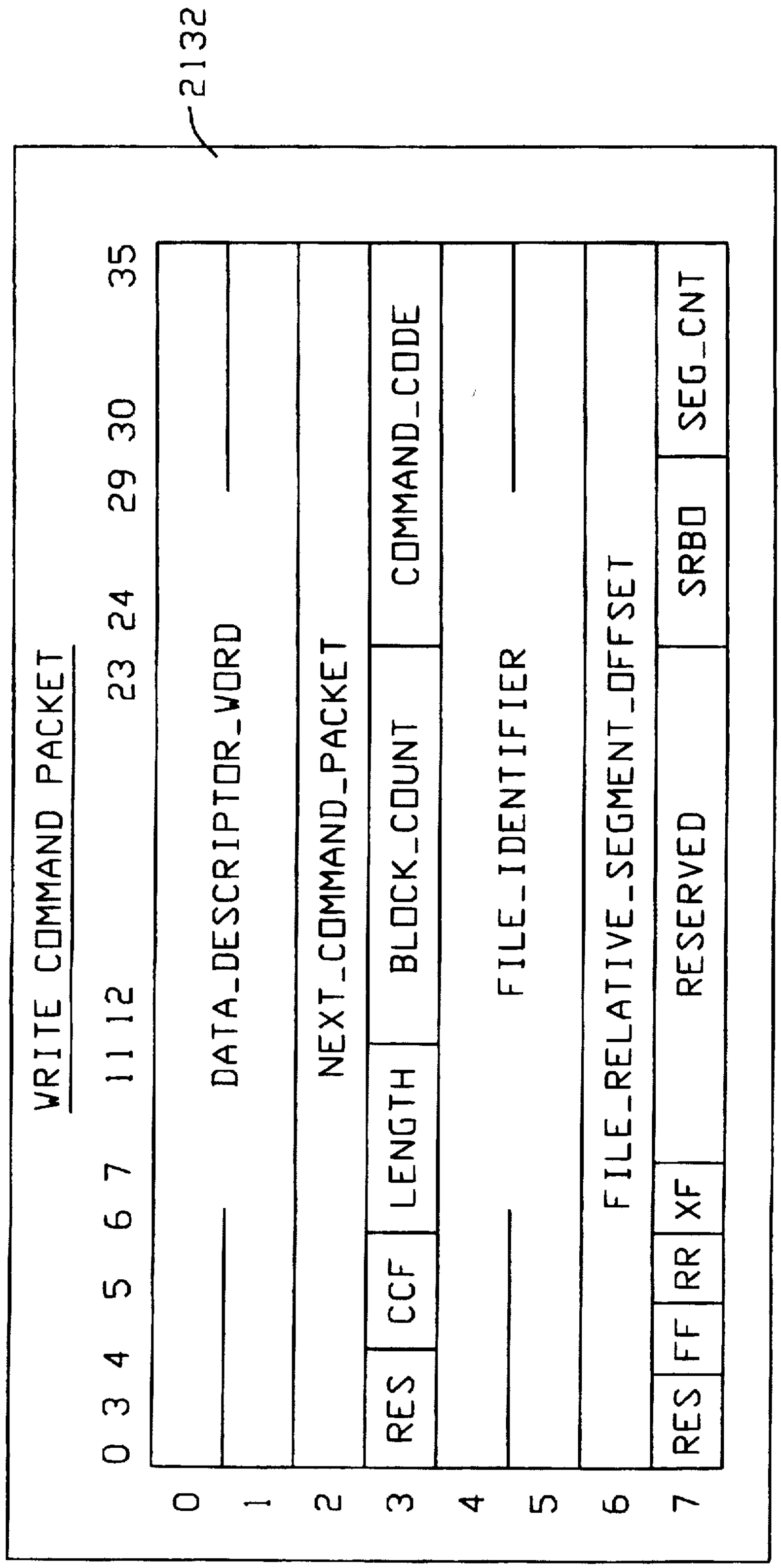
Figure 96:
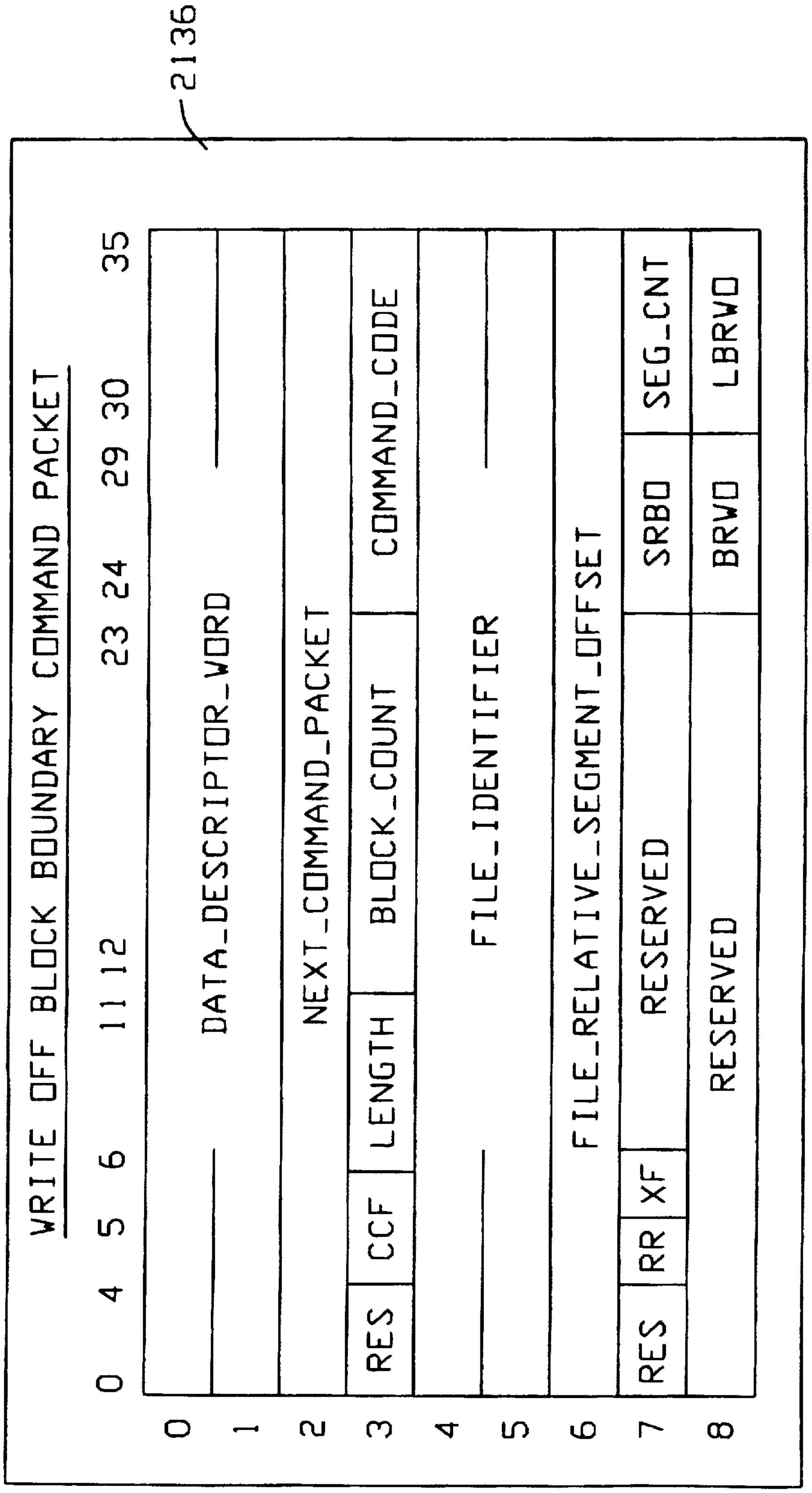
Figure 98:
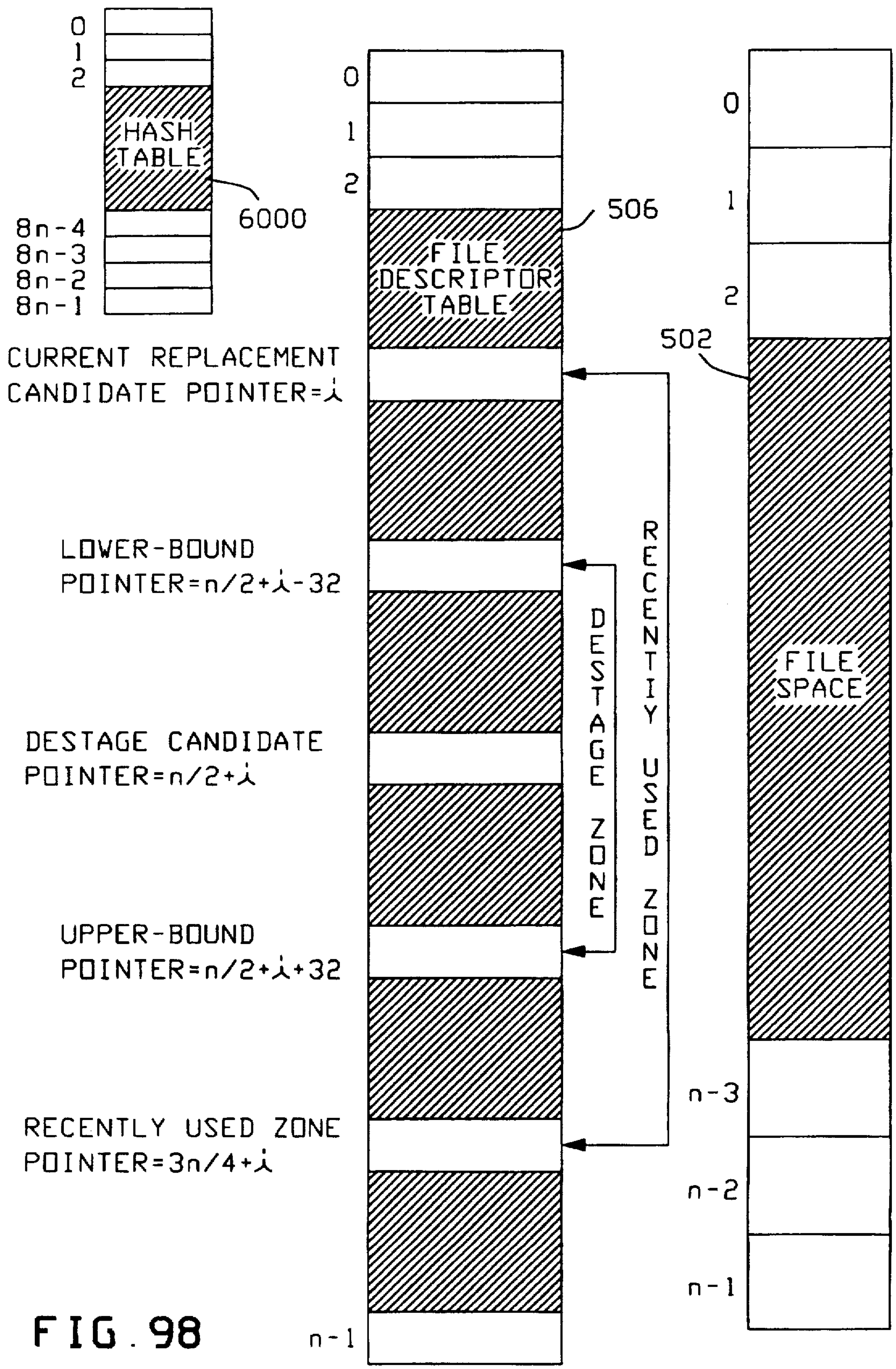
Figure 99:
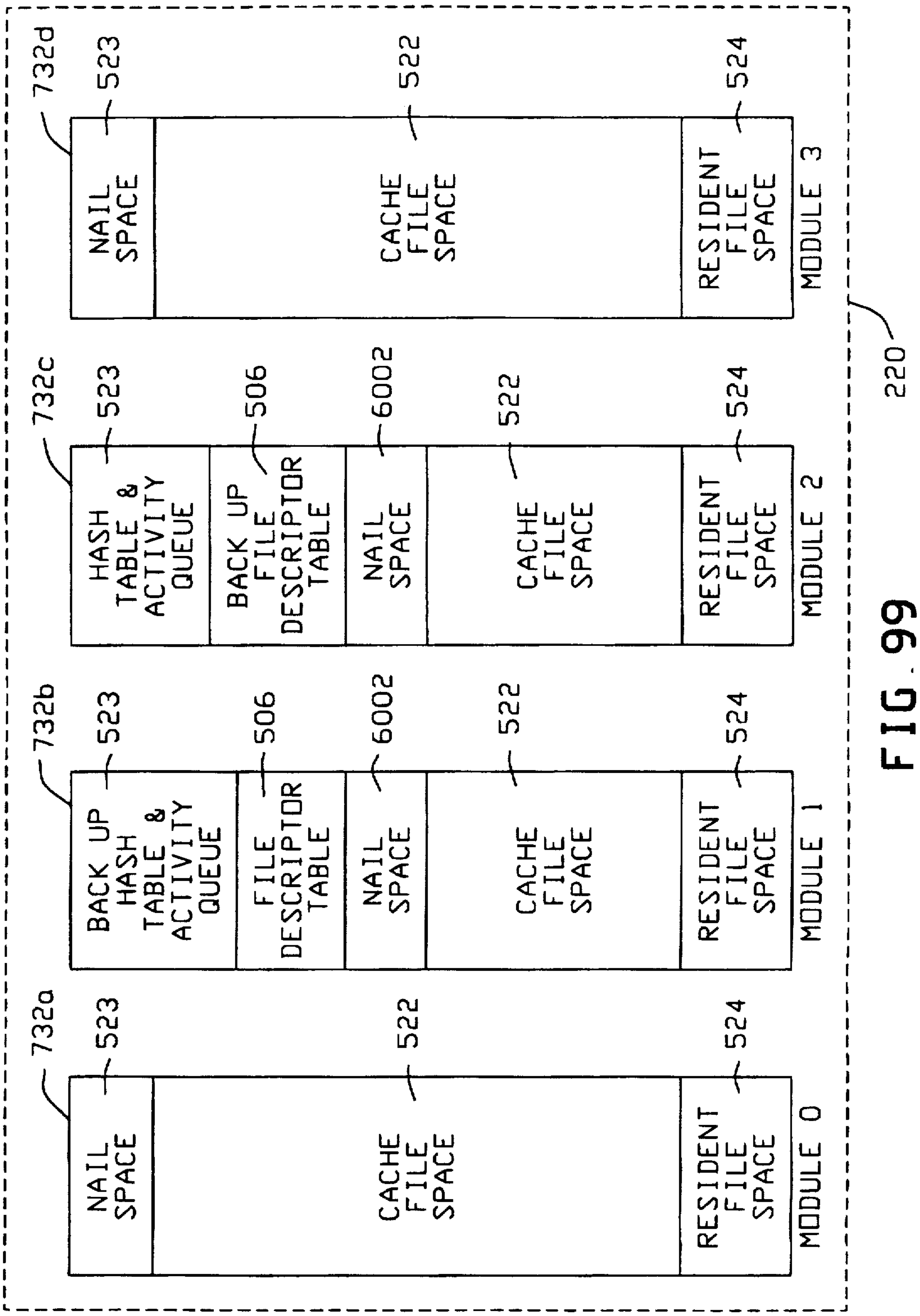
Figure 101:
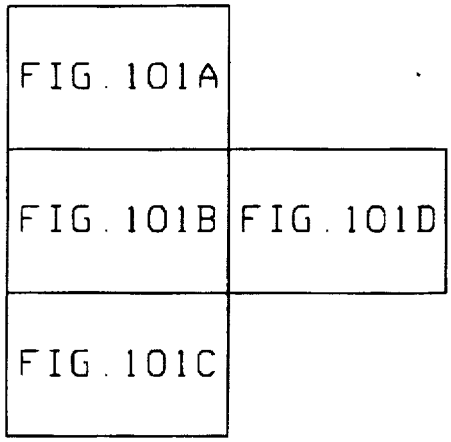
Figure 102:
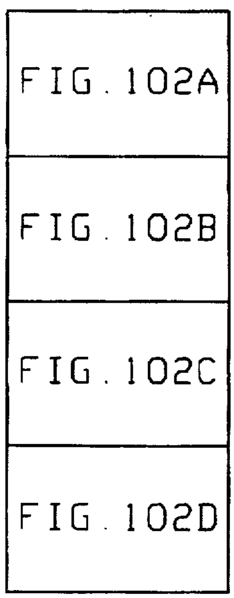
Figure 103:
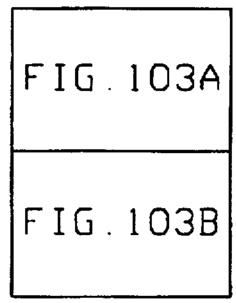
Figure 104:
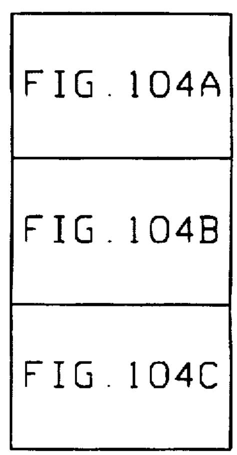

FIGS. 7A, 7B, and 7C contain a data flow diagram illustrating the flow of data between each of the major functional components of the file cache system;

FIG. 8 shows the general layout of a Command Packet and the information contained therein;

FIG. 9 illustrates the Program Initiation Queue;

FIG. 10 shows the information contained in and the format of a Program Initiation Packet;

FIGS. 11 and 12 respectively illustrate the Status Packet Queue and the format and information contained in a Program Status Packet;

FIG. 13 illustrates the HIA ACB Buffer;

FIG. 14 illustrates Activity Queue, and FIG. 15 shows the information contained in each Activity Queue Entry;

FIG. 16 illustrates the file space available in the Outboard File Cache;

FIG. 17 shows the logical organization of a single Segment;

FIG. 18 shows the logical composition of a Block;

FIG. 19 shows the logical division between Cache File Space, Nail Space, and Resident File Space in the File Space of the Outboard File Cache;

FIG. 20 illustrates the File Descriptor Table;

FIG. 21 shows the information contained in a File Descriptor;

FIG. 22 is a flow chart of the general processing the I/O Software performs for file requests from Application Software;

FIG. 23 shows a flow chart of the FILE CACHE INTERFACE processing performed by the File Cache Handler Software;

FIG. 24 shows a flow chart of the general processing for detecting when the processing of a Command Packet (or a chain) is complete;

FIGS. 25A and 25B respectively show the components of a Data Mover (DM) and Host Interface Adapter (HIA);

FIG. 26 is a functional block diagram of the Index Processor (IXP);

FIG. 27 is a flow chart of the main processing loop of the IXP;

FIG. 28 is a block diagram to further illustrate the functional components of the Street interprocessor communication and storage access network within the Outboard File Cache;

FIG. 29 is an block diagram illustrating a data processing configuration including a plurality of Hosts coupled to a Outboard File Cache;

FIGS. 30 and 31 illustrate the relationship between Host Local Buffers, a Cache Buffer, and a Data Chain;

FIGS. 32, 33, and 34 respectively illustrate the implementation of the Data Chain, Data Chain Packet, and Data Descriptor Word;

FIG. 34 shows the format and content of a DATA_DESCRIPTOR_WORD;

FIGS. 35A and 35B illustrate the general status processing which is invoked from the Completion Monitor processing;

FIG. 36 is a flowchart showing the processing which occurs when the "Resend" RECOMMENDED_ACTION is returned from the Outboard File Cache;

FIG. 37 is a flowchart of the Purge Disabled Segments and then Resend processing;

FIG. 38 is a flowchart of the Send CLEAR PENDING Followed by Original Command processing;

FIG. 39 is a flowchart showing the processing which occurs when the "Stage Data" RECOMMENDED_ACTION is returned from the Outboard File Cache;

FIG. 40 shows a flowchart of the processing performed when the Stage Data and Log No Resident File Space Condition RECOMMENDED_ACTION is returned from the Outboard File Cache;

FIG. 41 contains a flowchart of the processing performed for the Down File Cache Interface RECOMMENDED_ACTION;

FIG. 42 contains a flowchart of the processing performed for the Down Outboard File Cache RECOMMENDED_ACTION;

FIGS. 43A and 43B contain a flowchart of the general processing of the Destage Process;

FIG. 44 shows the format of a READ Command Packet;

FIG. 45 shows the content and format of the FILE_IDENTIFIER;

FIG. 46 shows the content and format of the READ Status Packet;

FIG. 47 illustrates the format and content of a Destage Request Packet;

FIG. 48 illustrates the format and content of a ALLOCATE Command Packet;

FIG. 49 illustrates the format and content of a ALLOCATE Status Packet;

FIG. 50 is a flowchart illustrating the processing in which the CLEAR PENDING command may be used;

FIG. 51 illustrates the information and format of the CLEAR PENDING Command Packet;

FIG. 52 illustrates the information and format of the CLEAR PENDING Status Packet;

FIG. 53 shows the format of a DESTAGE Command Packet;

FIG. 54 shows the format of a DESTAGE Status Packet;

FIG. 55 shows the format of a Segment Information Packet;

FIG. 56 shows the format of a DESTAGE COMPLETE Command Packet;

FIG. 57 shows the format of a DESTAGE COMPLETE Status Packet;

FIG. 58 contains a flowchart which describes the process in which the DESTAGE AND PURGE DISK command may be used;

FIG. 59 shows the format of a DESTAGE AND PURGE DISK Command Packet;

FIG. 60 shows the format of a DESTAGE AND PURGE DISK Status Packet;

FIG. 61 contains a flowchart which describes the process in which the DESTAGE AND PURGE FILE command may be used;

FIG. 62 shows the format of a DESTAGE AND PURGE FILE Command Packet;

FIG. 63 shows the format of a DESTAGE AND PURGE FILE Status Packet;

FIG. 64 shows the format of a DESTAGE AND PURGE FILES BY ATTRIBUTES Command Packet;

FIG. 65 shows the format of a DESTAGE AND PURGE FILES BY ATTRIBUTES Status Packet;

FIG. 66 shows the format of a LOCK CACHE FILE Command Packet;

FIG. 67 shows the format of a LOCK CACHE FILE Status Packet;

FIG. 68 shows the format of a LOCK CACHE FILES BY ATTRIBUTES Command Packet;

FIG. 69 shows the format of a LOCK CACHE FILES BY ATTRIBUTES Status Packet;

FIG. 70 shows the format of a MODIFY File Descriptor Command Packet;

FIG. 71 illustrates the format and content of a MODIFY File Descriptor Status Packet;

FIG. 72 contains a flowchart showing the processing in which the PURGE DISK command may be used;

FIG. 73 shows the format of a PURGE DISK Command Packet;

FIG. 74 shows the format of a PURGE DISK Status Packet;

FIG. 75 contains a flowchart which describes the process in which the PURGE FILE command may be used;

FIG. 76 shows the format of a PURGE FILE Command Packet;

FIG. 77 shows the format of a PURGE FILE Status Packet;

FIG. 78 is a flowchart showing the processing in which the PURGE FILES BY ATTRIBUTES command may be used;

FIG. 79 shows the format of a PURGE FILES BY ATTRIBUTES Command Packet;

FIG. 80 shows the format of a PURGE FILES BY ATTRIBUTES Status Packet;

FIG. 81 shows the format of a RETURN SEGMENT STATE Command Packet;

FIG. 82 shows the format of a RETURN SEGMENT STATE Status Packet;

FIG. 83 shows the format of a Segment State Packet;

FIG. 84 illustrates the information and format of the STAGE BLOCKS Command Packet;

FIG. 85 illustrates the information and format of the STAGE BLOCKS Status Packet;

FIG. 86 illustrates the information and format of the STAGE SEGMENTS Command Packet;

FIG. 87 illustrates the information and format of the STAGE SEGMENTS Status Packet;

FIG. 88 illustrates the information and format of the STAGE WITHOUT DATA Command Packet;

FIG. 89 illustrates the information and format of the STAGE WITHOUT DATA Status Packet;

FIG. 90 shows the format of a UNLOCK CACHE FILE Command Packet;

FIG. 91 shows the format of a UNLOCK CACHE FILE Status Packet;

FIG. 92 shows the format of a UNLOCK CACHE FILES BY ATTRIBUTES Command Packet;

FIG. 93 shows the format of a UNLOCK CACHE FILES BY ATTRIBUTES Status Packet;

FIG. 94 shows the format and content of a WRITE Command Packet;

FIG. 95 shows the content and format of a WRITE Status Packet;

FIG. 96 shows the format and content of a WRITE OFF BLOCK BOUNDARY Command Packet;

FIG. 97 shows the content and format of a WRITE OFF BLOCK BOUNDARY Status Packet;

FIG. 98 illustrates logical block diagrams of the Hash Table, the File Descriptor Table, and File Space;

FIG. 99 illustrates the layout data and control structures of the Outboard File Cache in Non-Volatile Storage (NVS).

Figure 100:
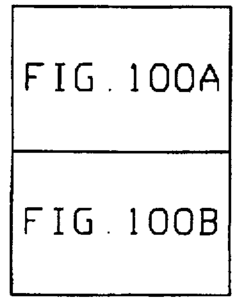
Figure 100A:
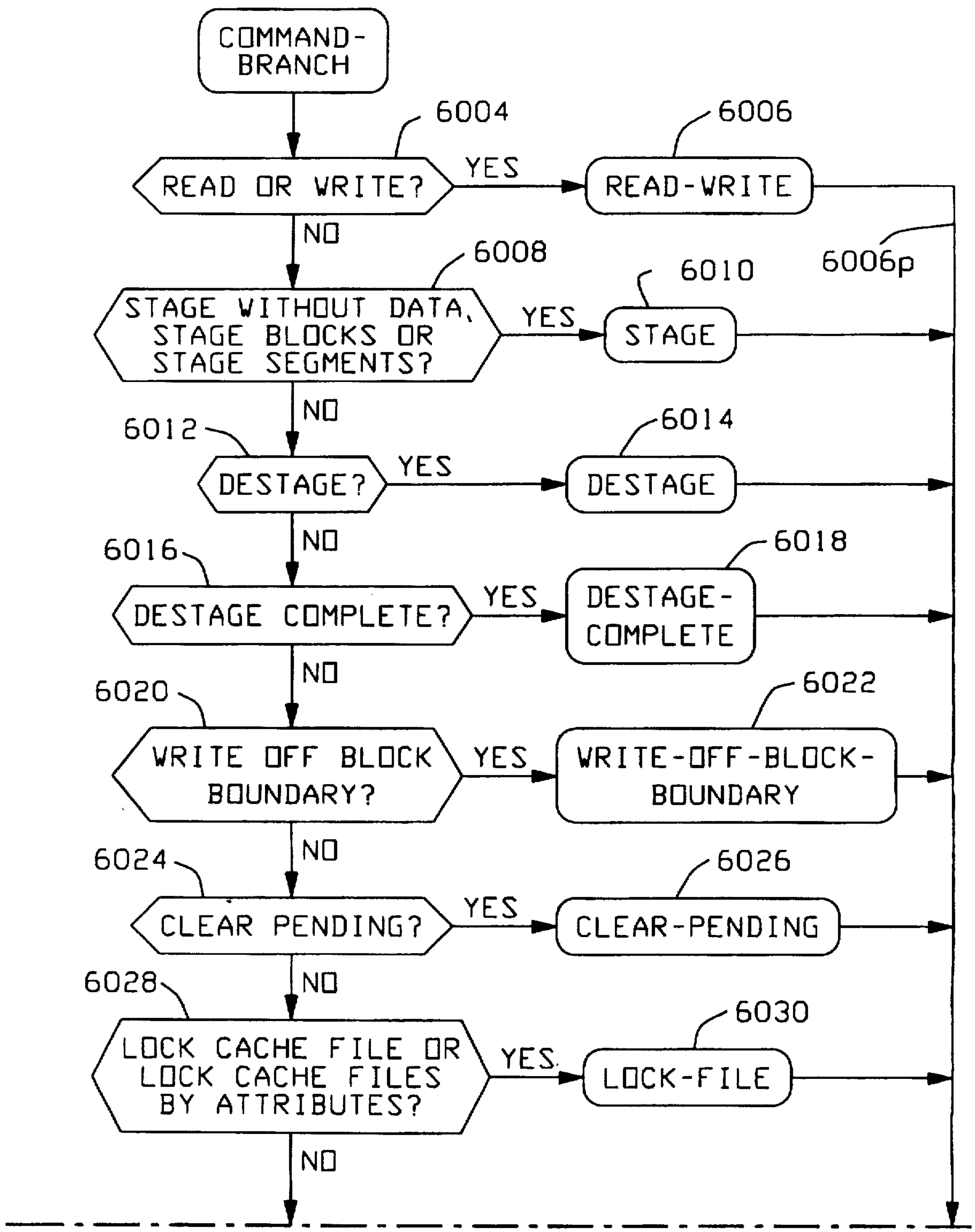
Figure 100B:
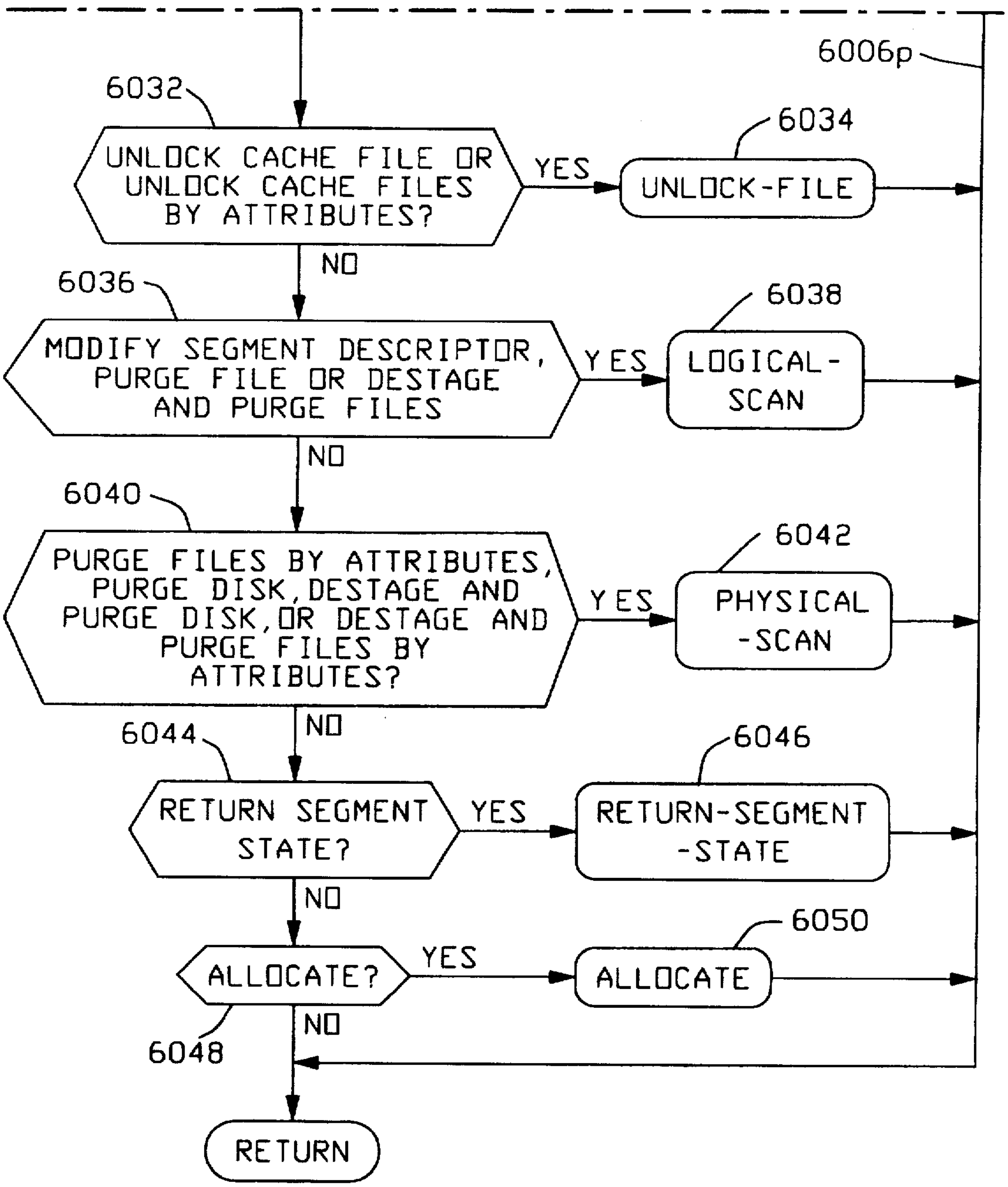
Figure 101A:
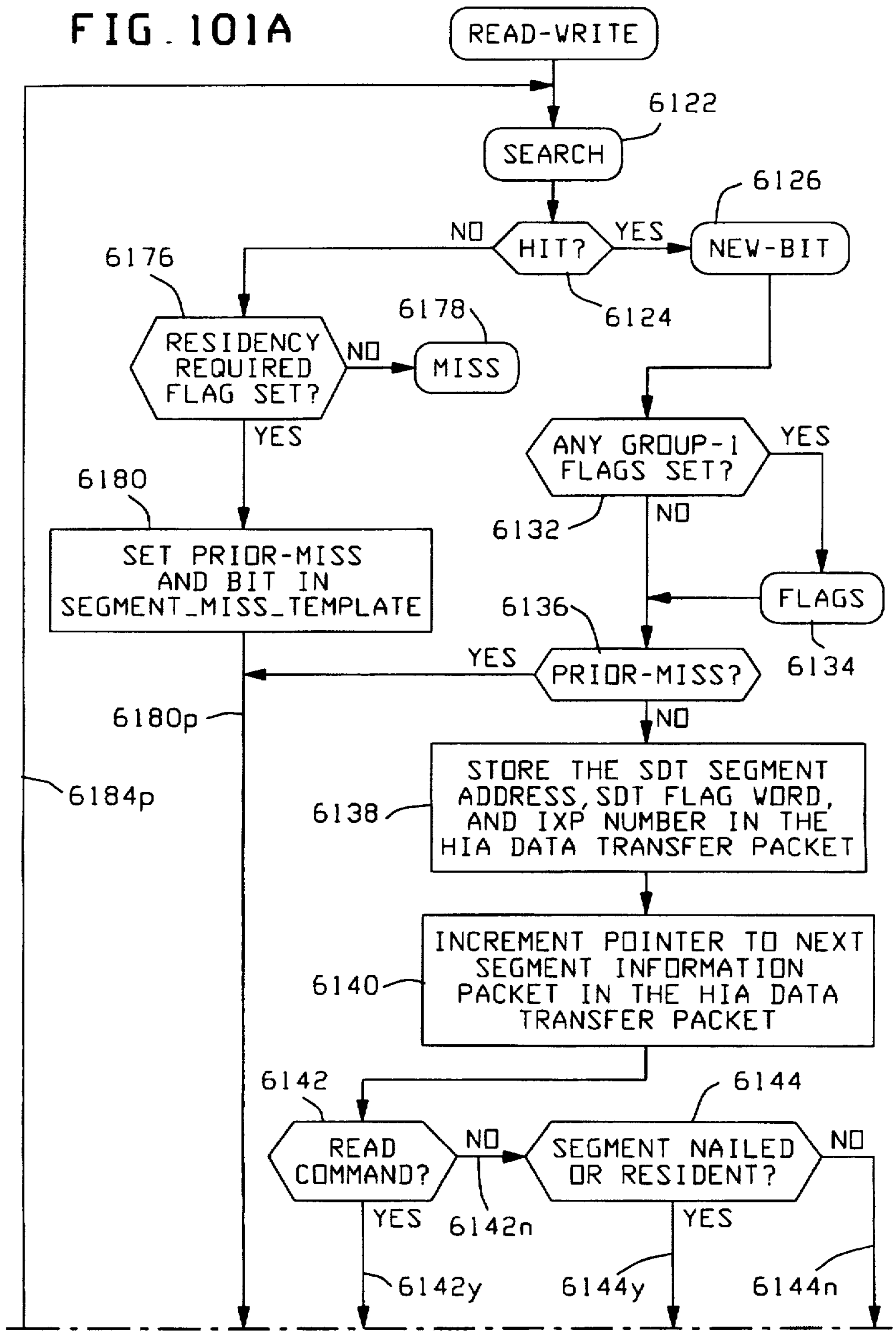
Figure 101B:
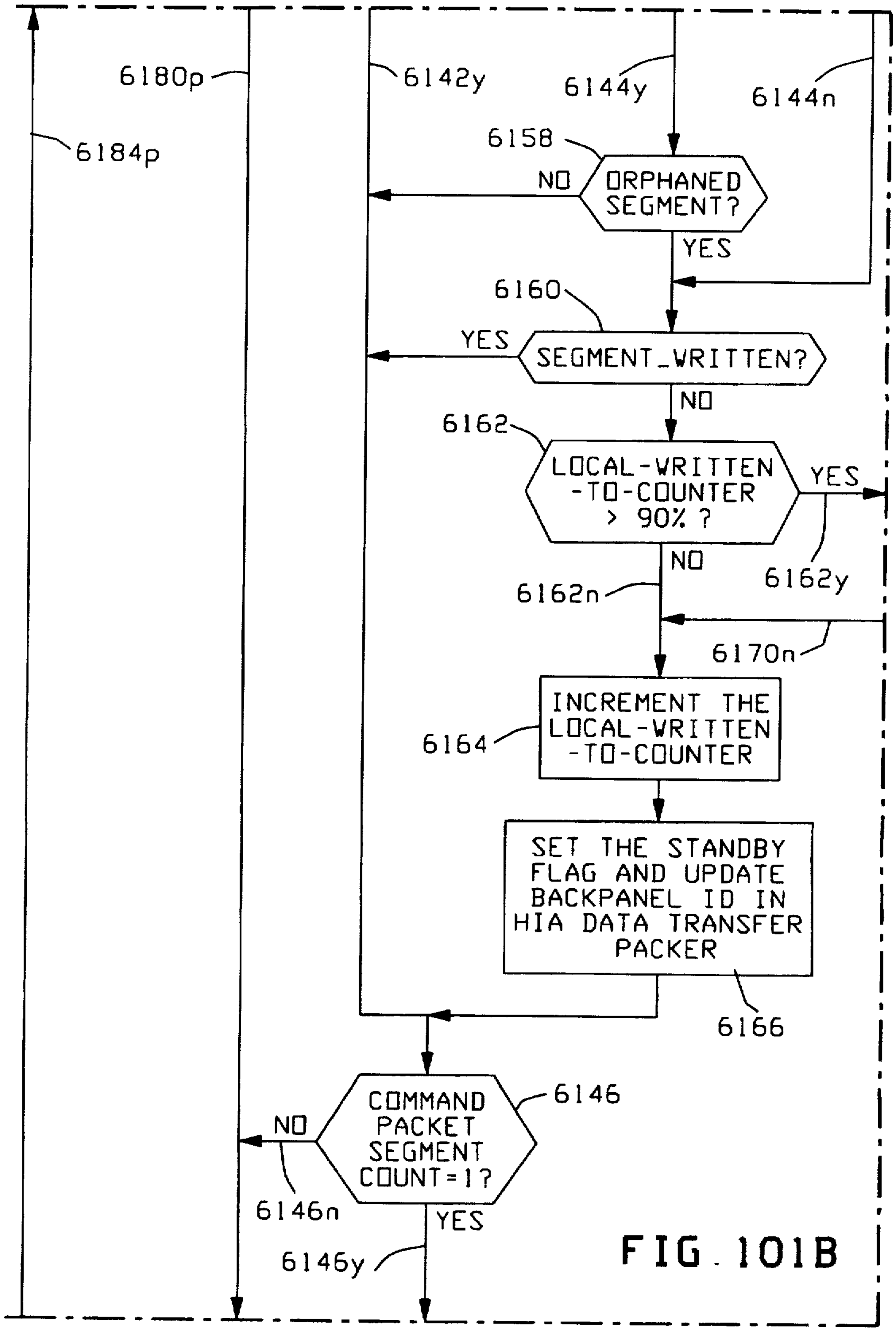
Figure 101C:
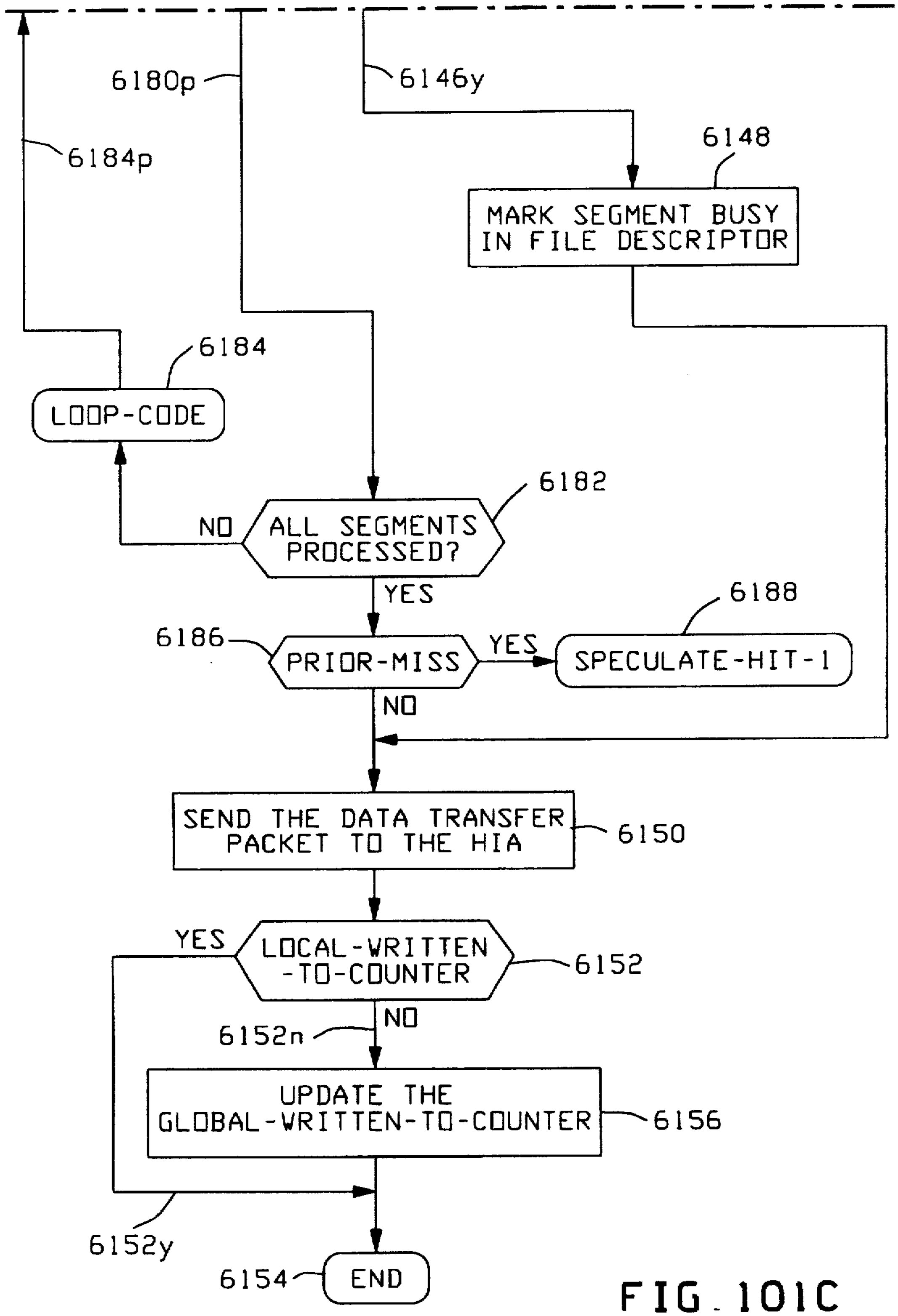
Figure 101D:
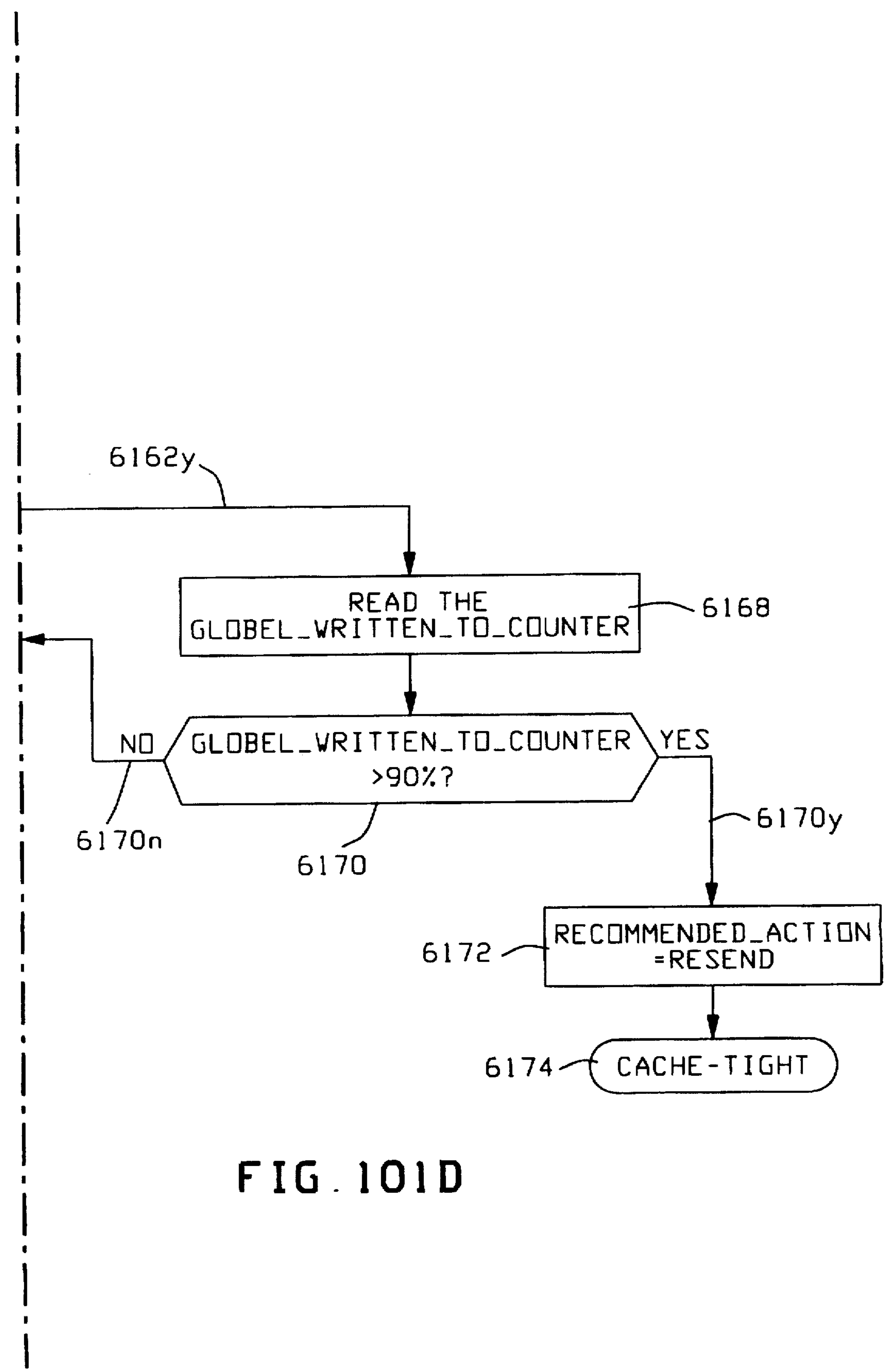
Figure 103A:
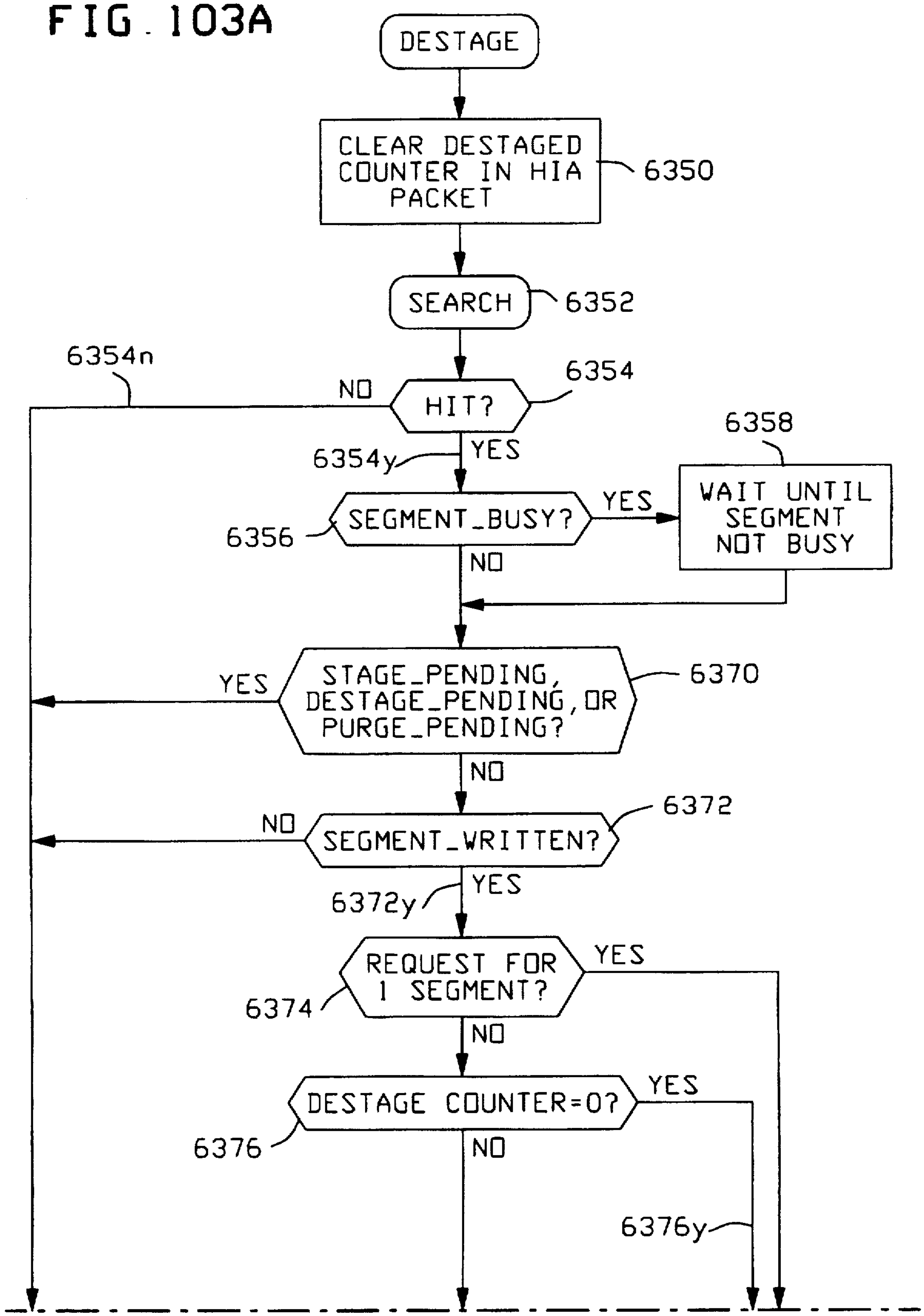
Figure 103B:
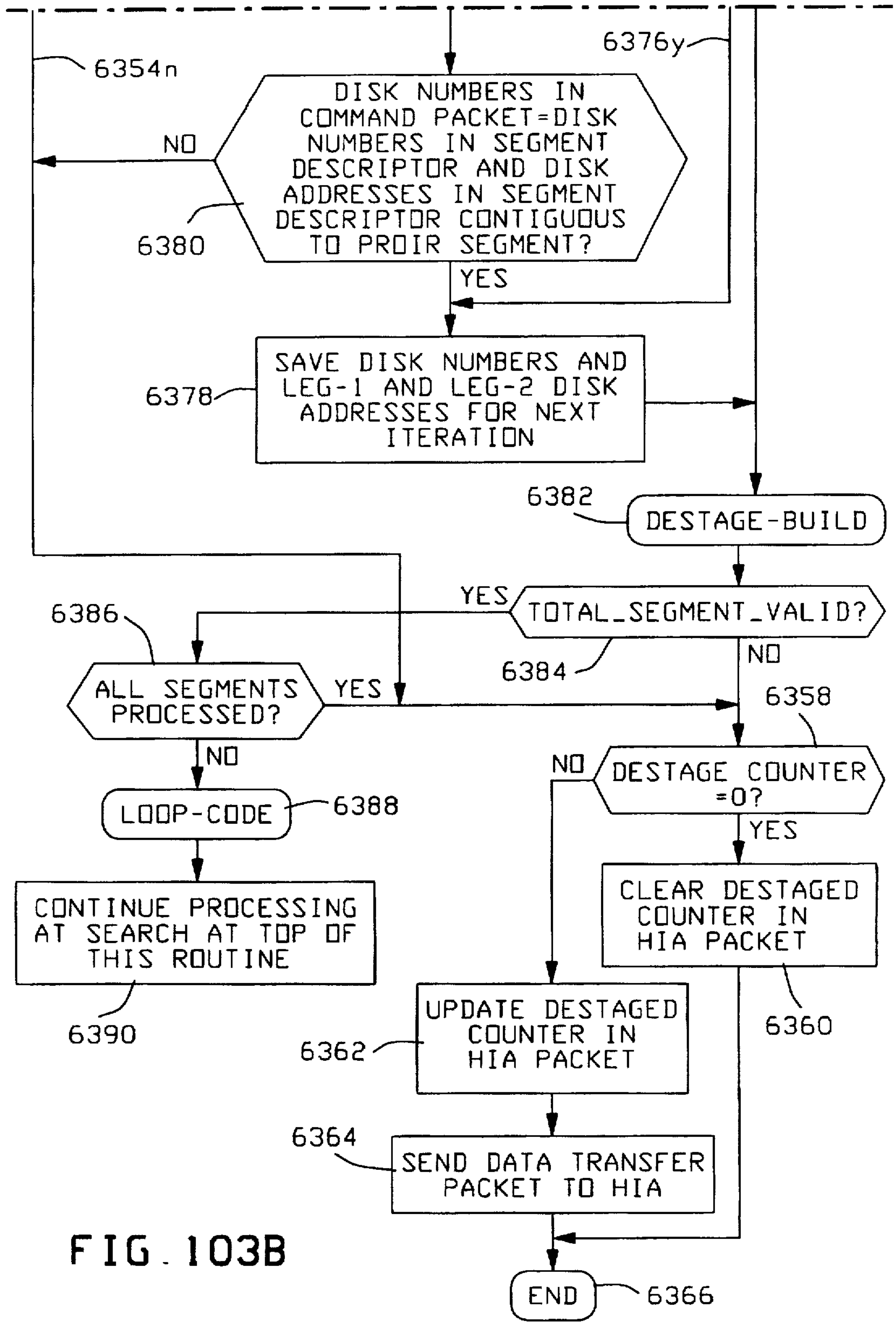
Figure 104A:
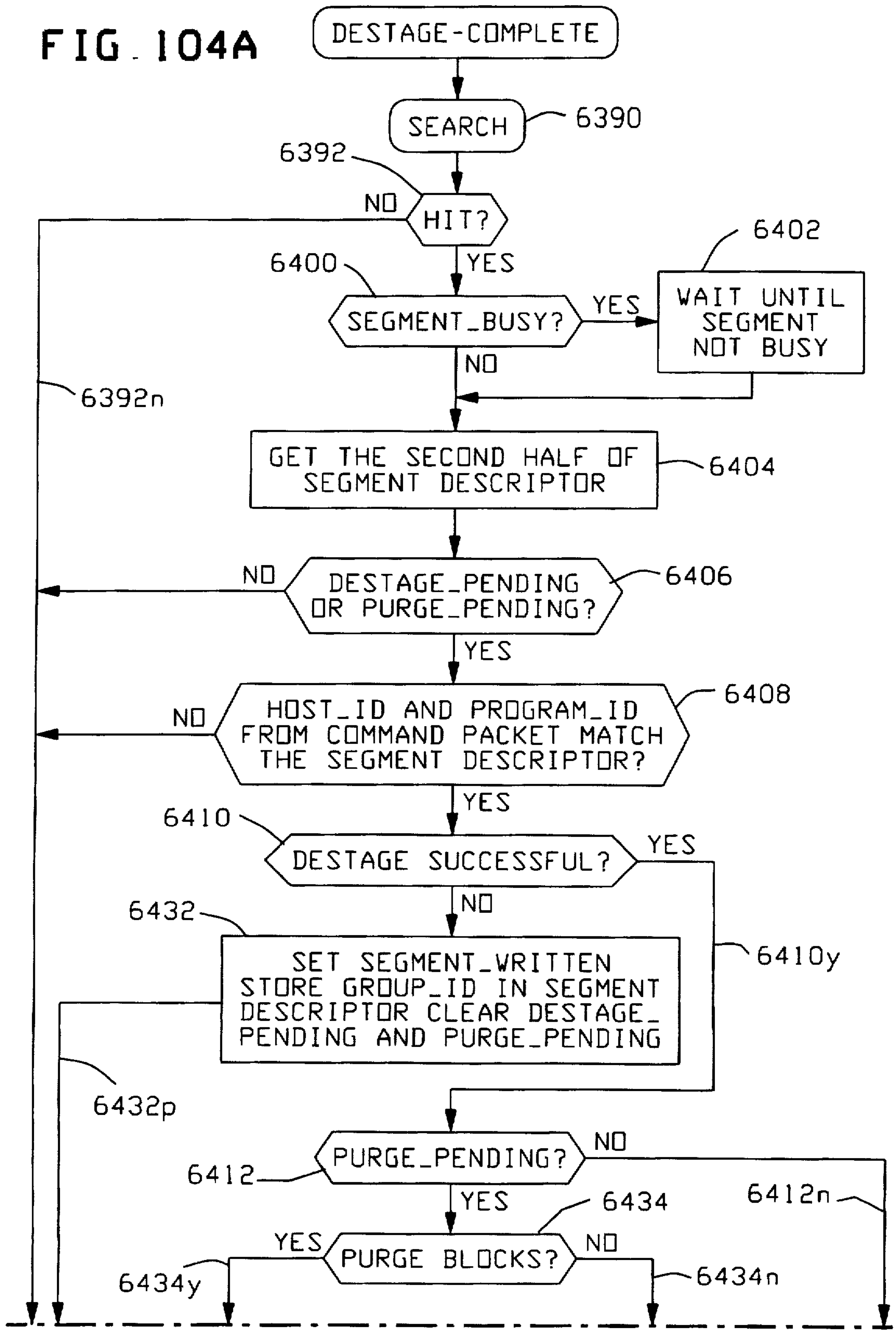
Figure 104B:
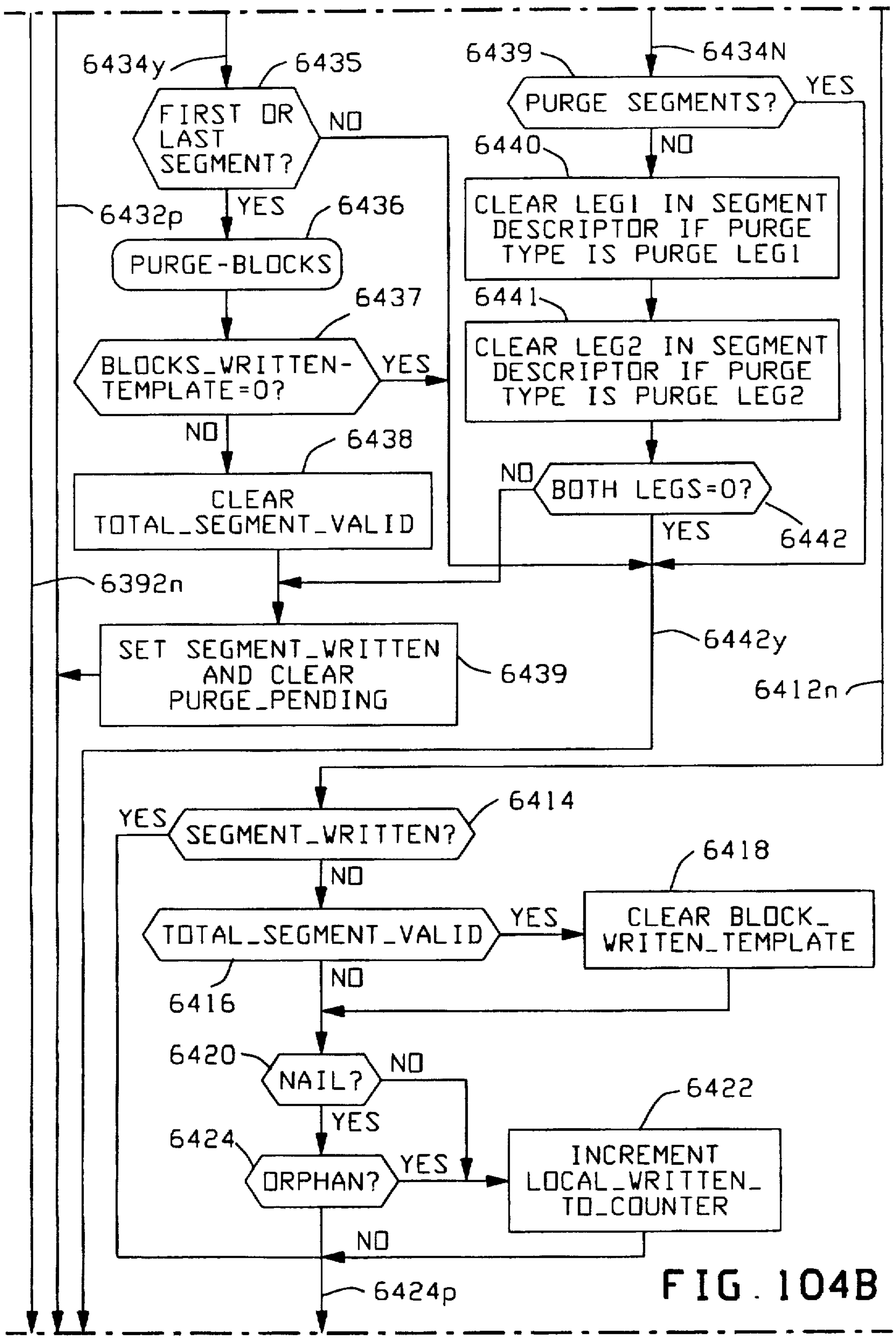
Figure 104C:
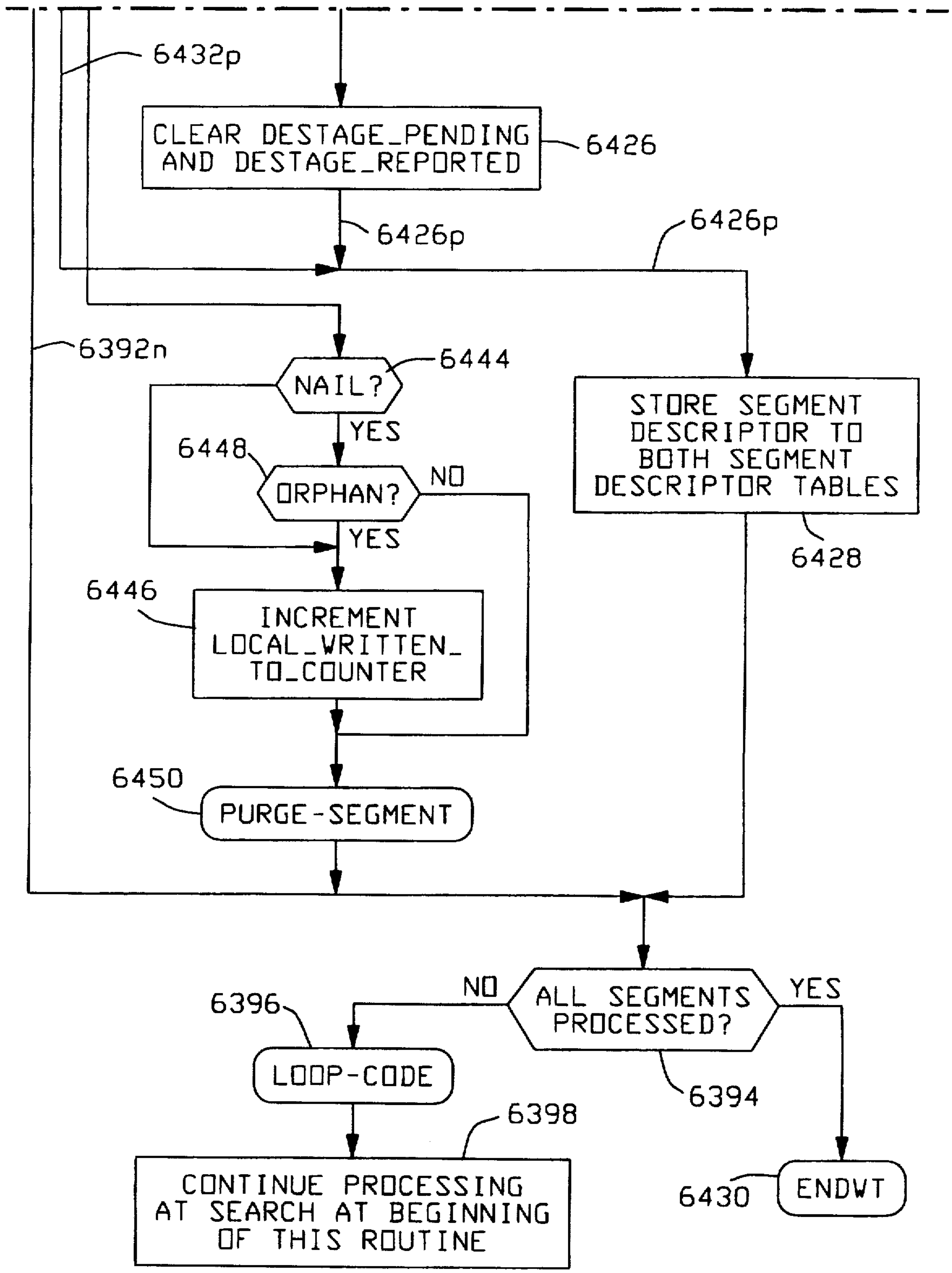
Figure 105:
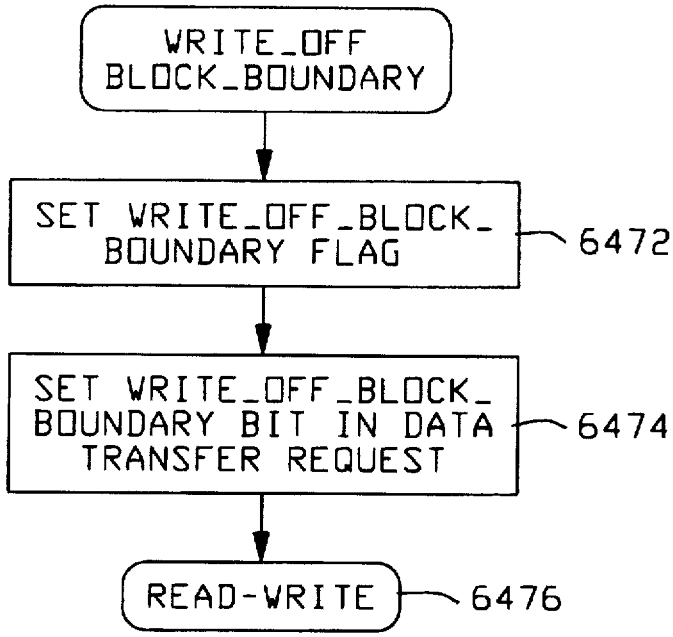
Figure 106:
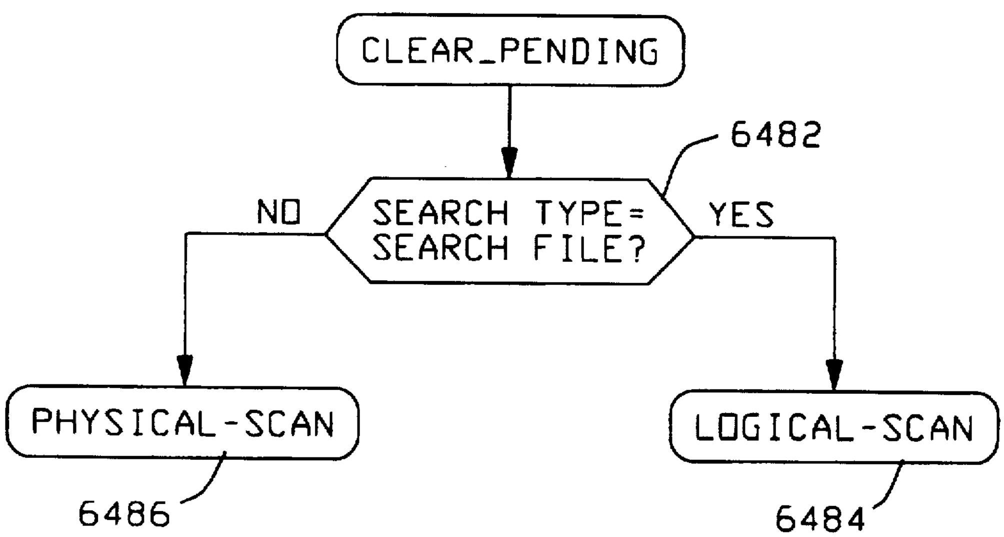
Figure 107:
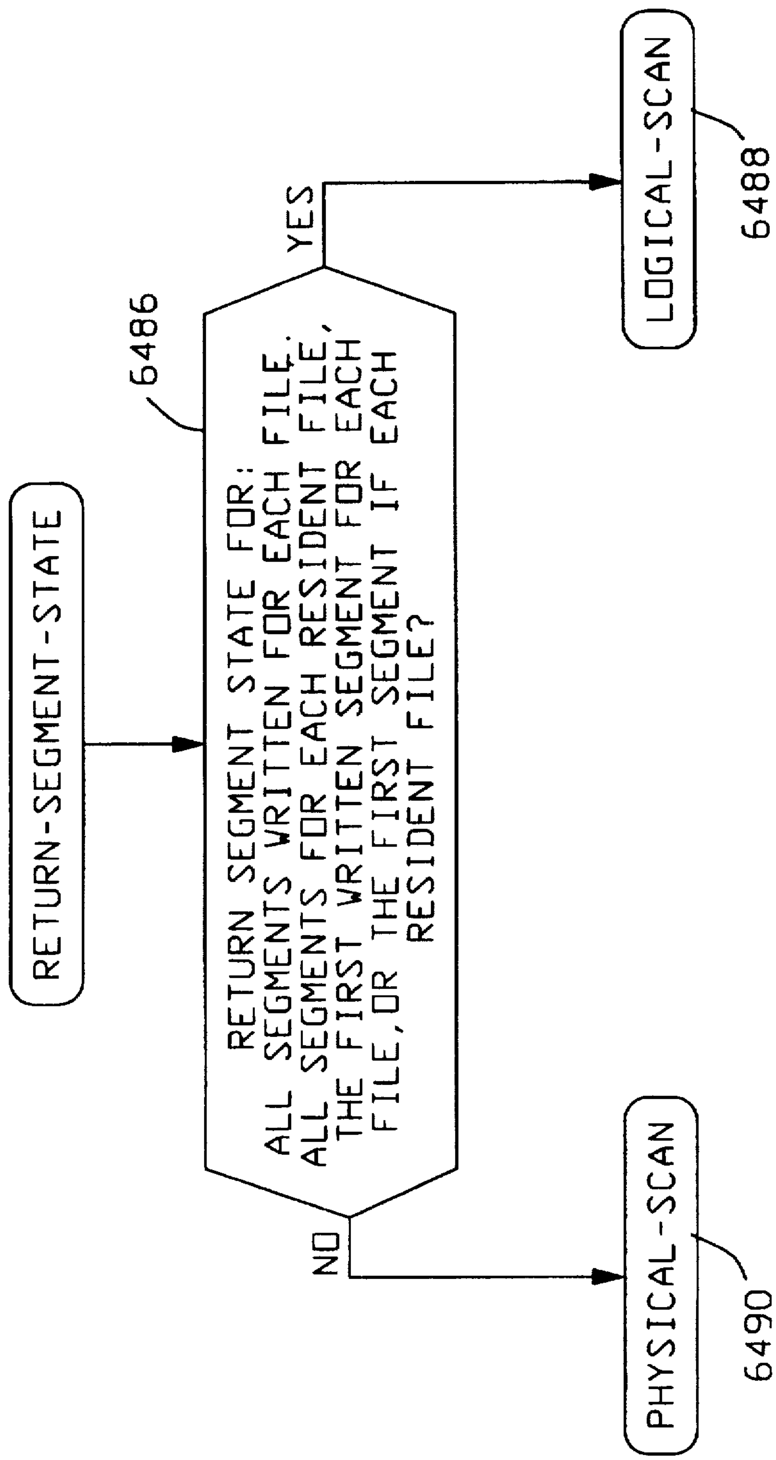
Figure 108:
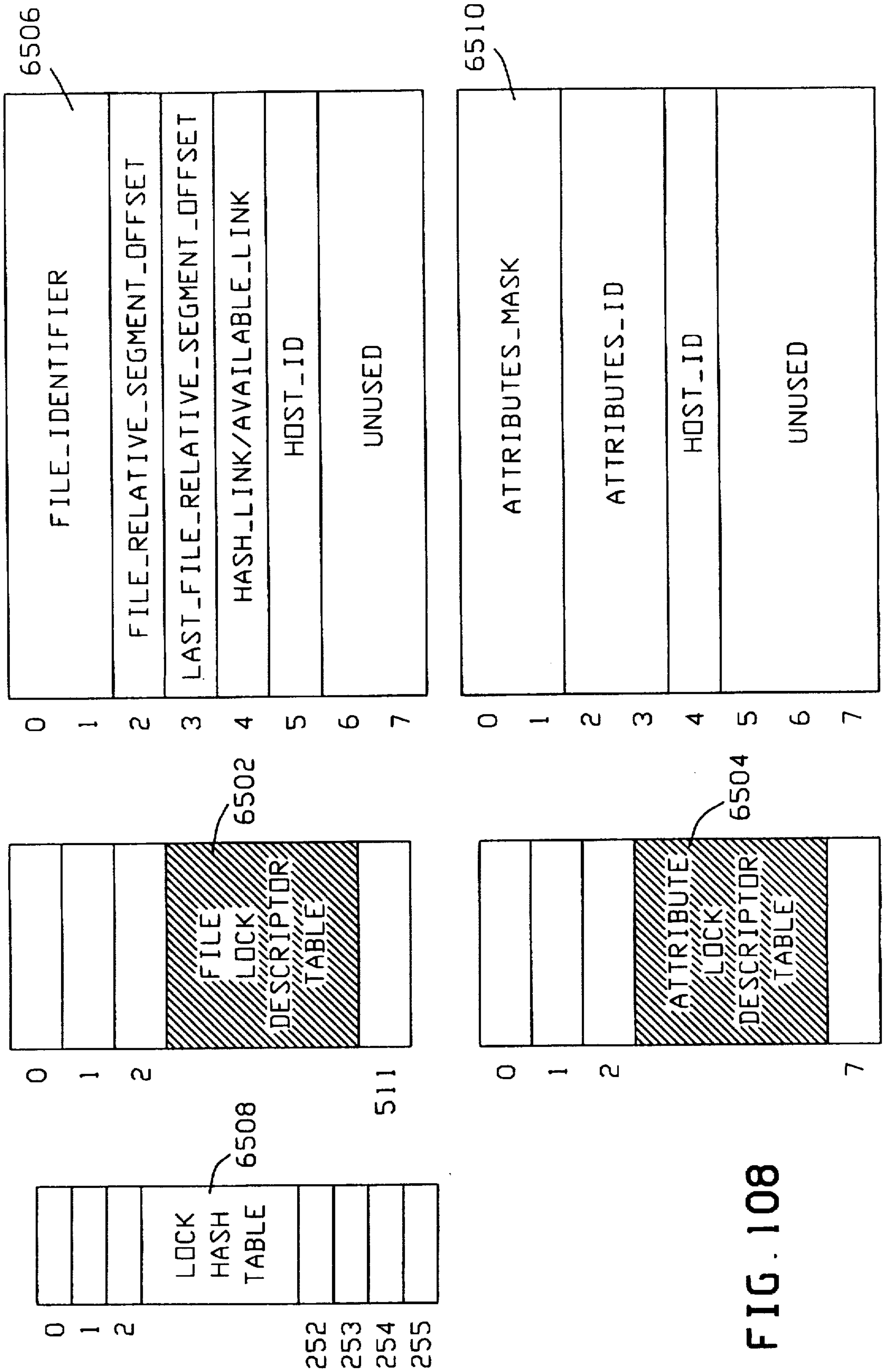
Figure 113:
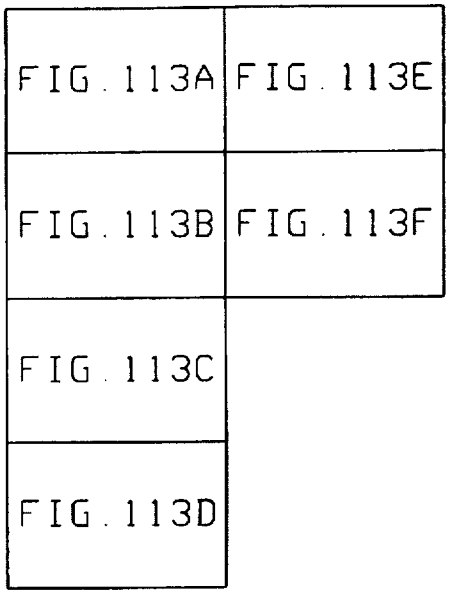
Figure 114:
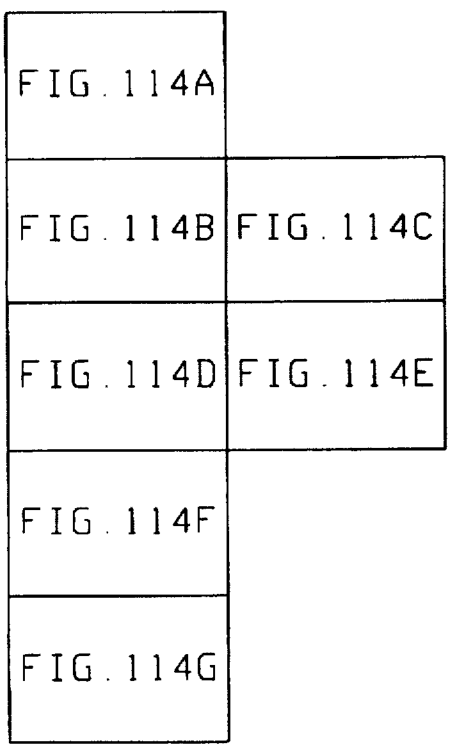
Figure 109:
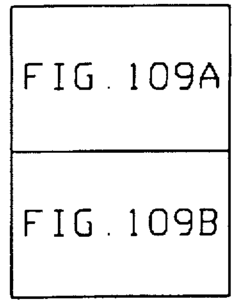
Figure 111:
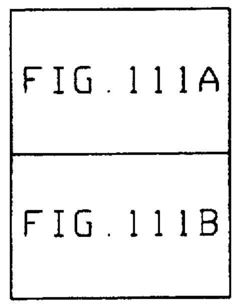
Figure 116:
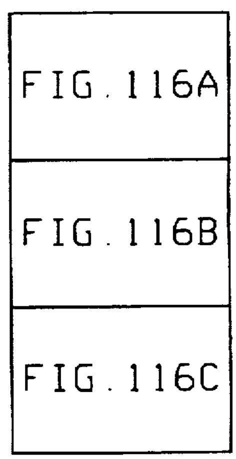
Figure 109A:
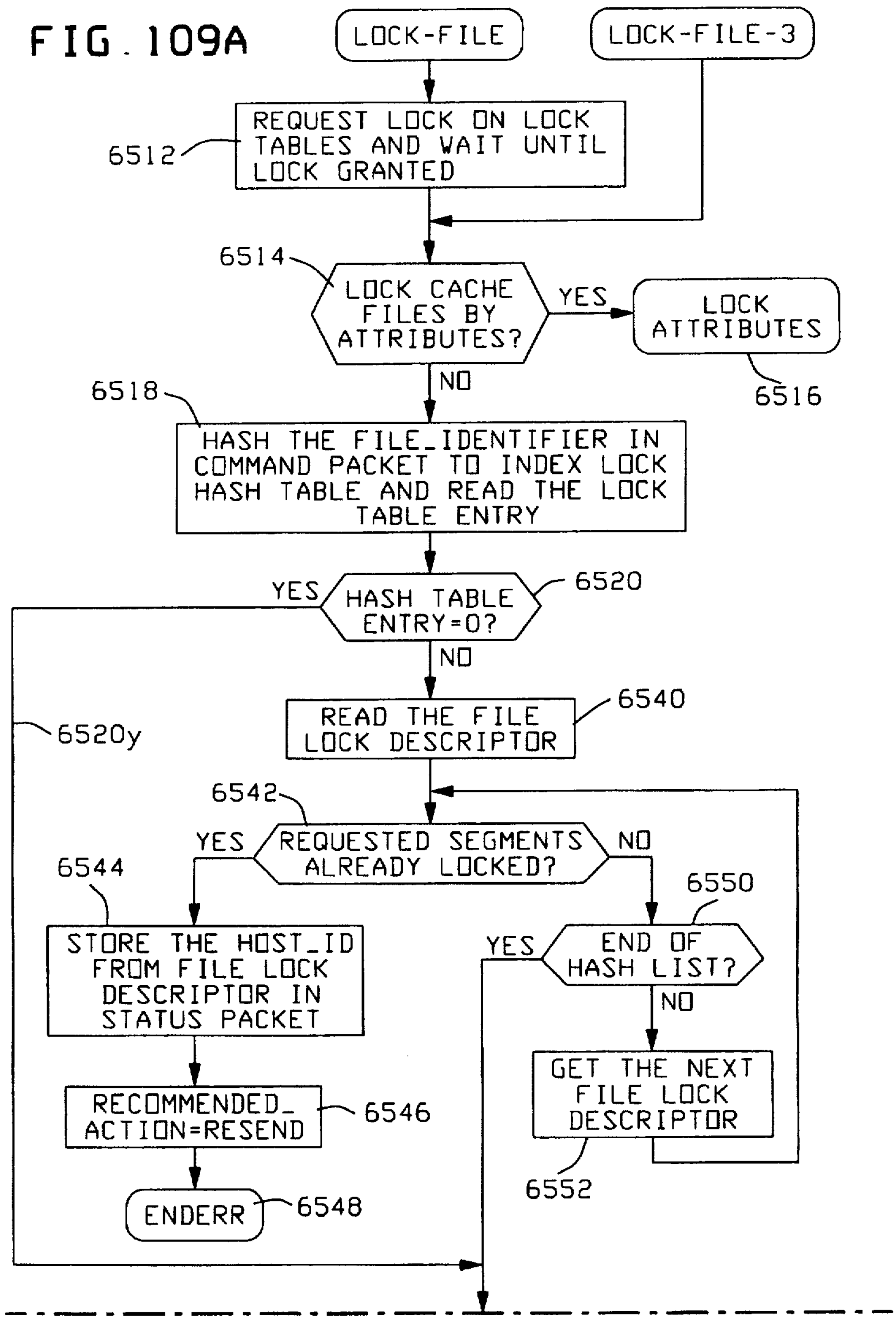
Figure 109B:
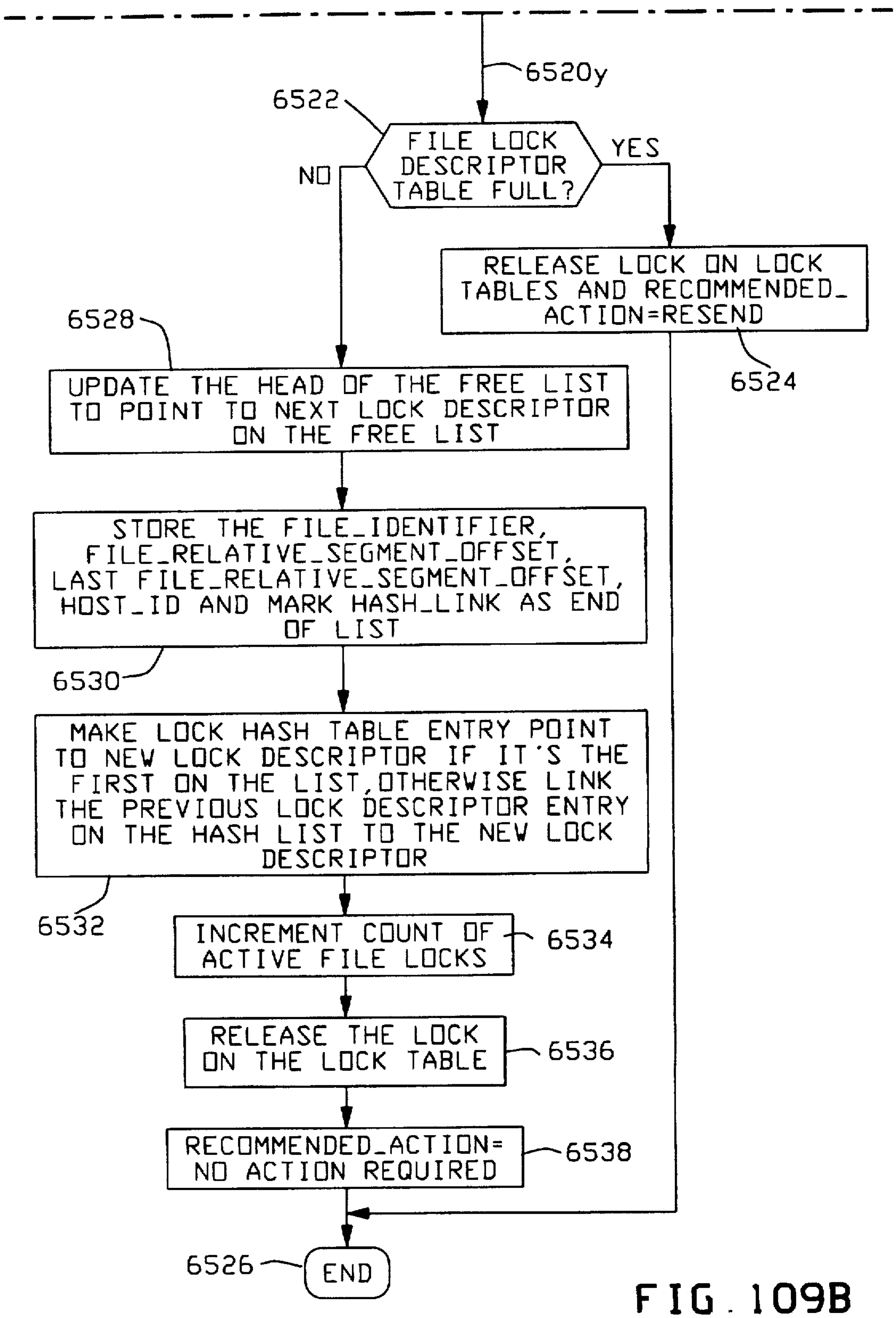
Figure 110:
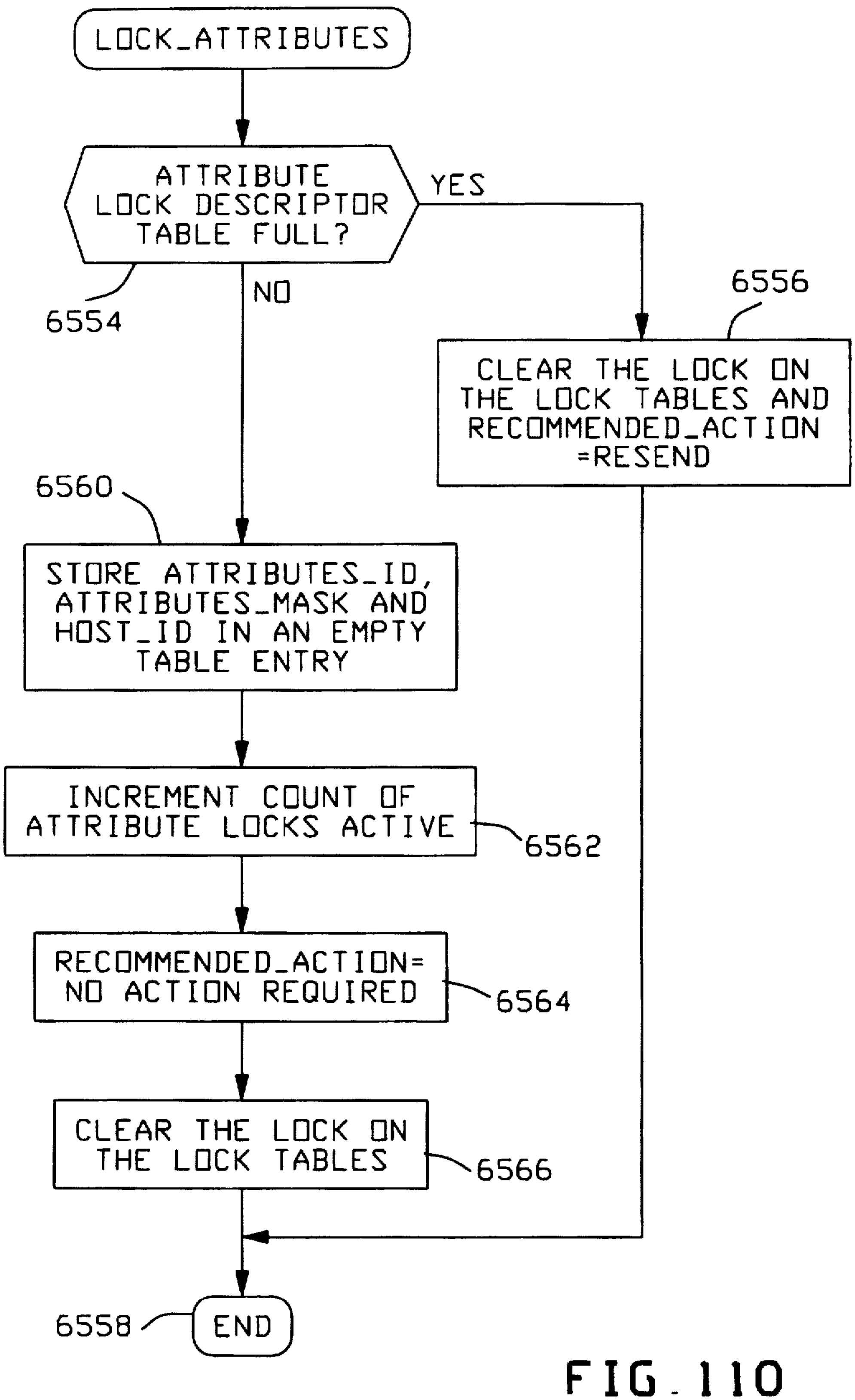
Figure 111A:
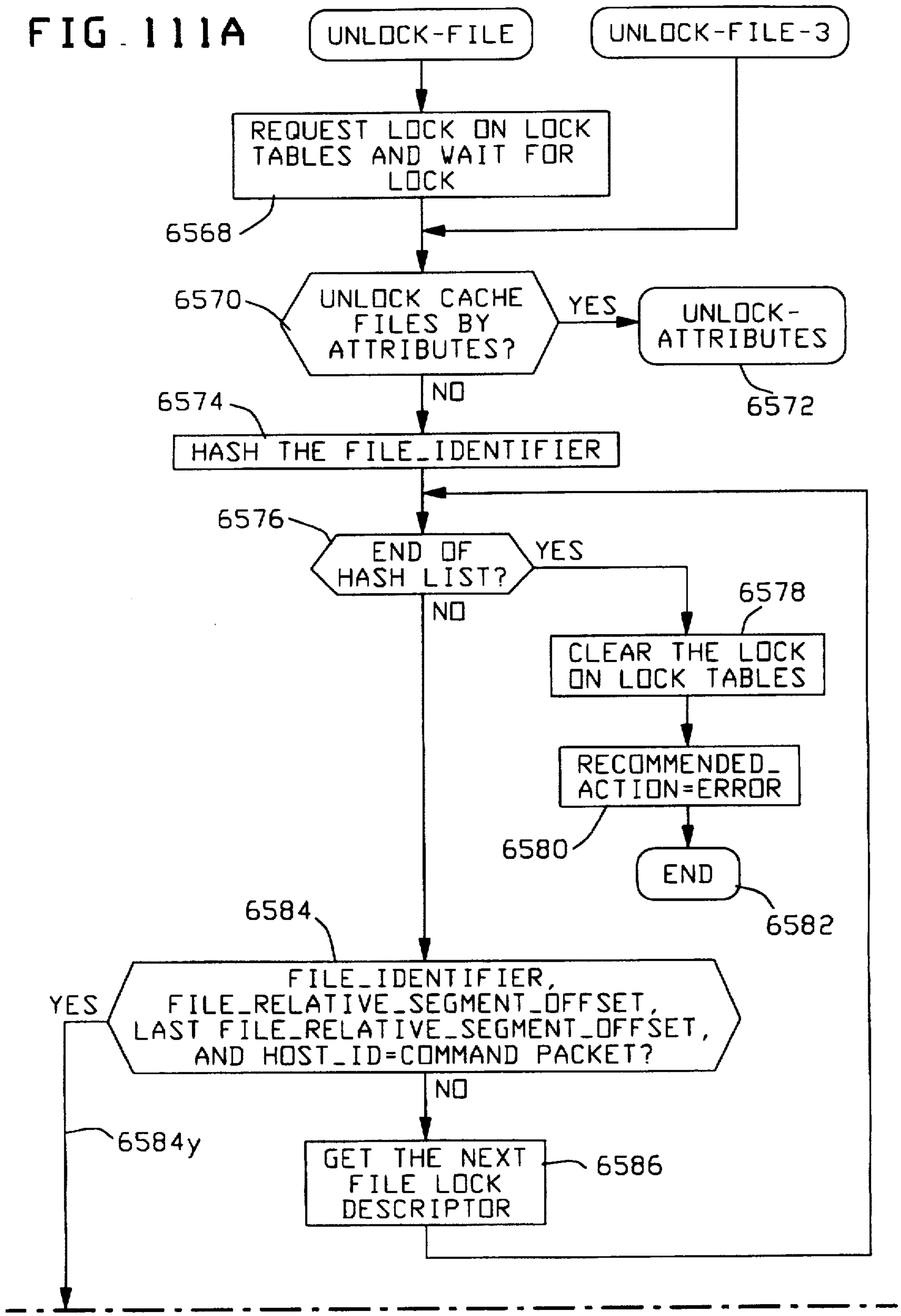
Figure 111B:
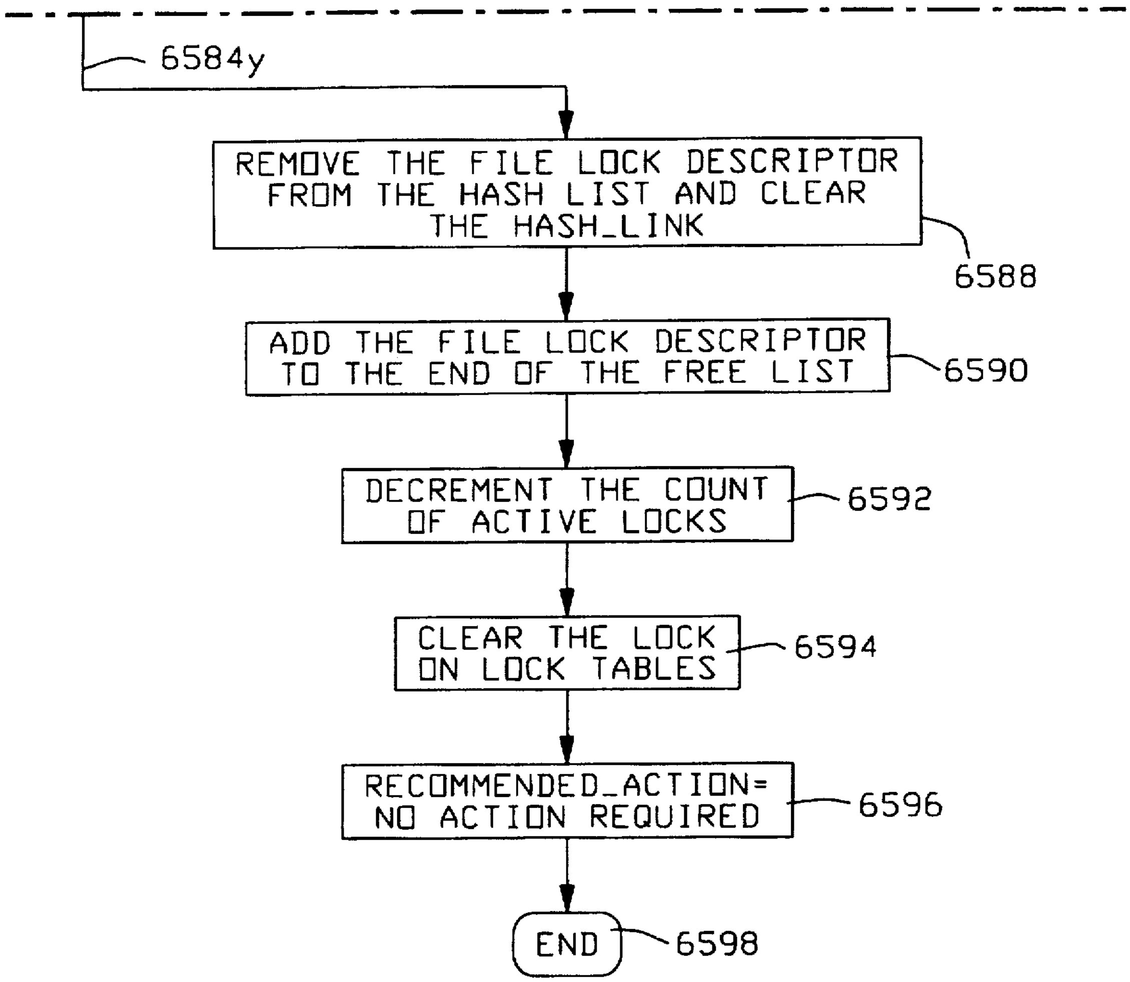
Figure 112:
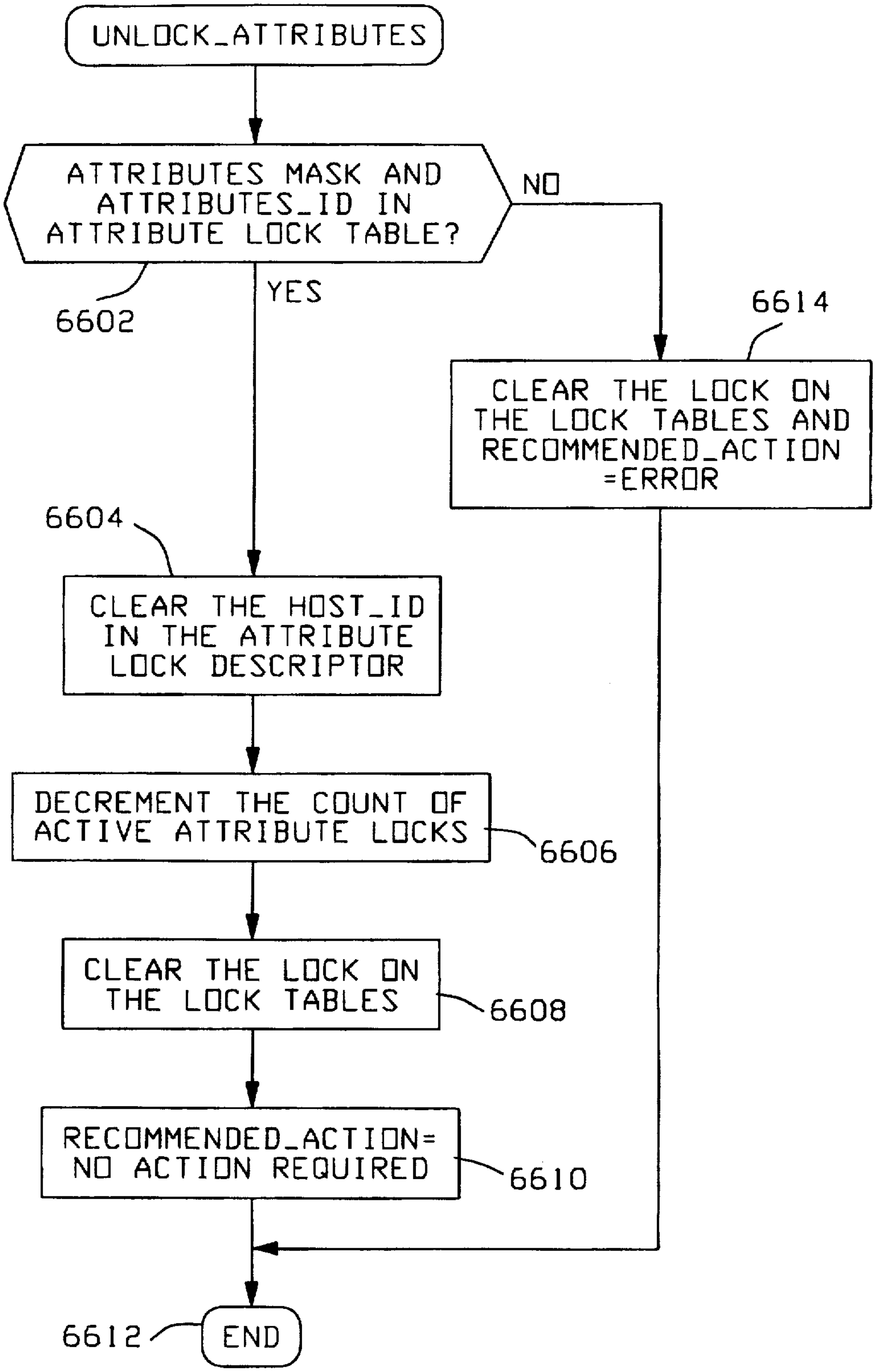
Figure 115:
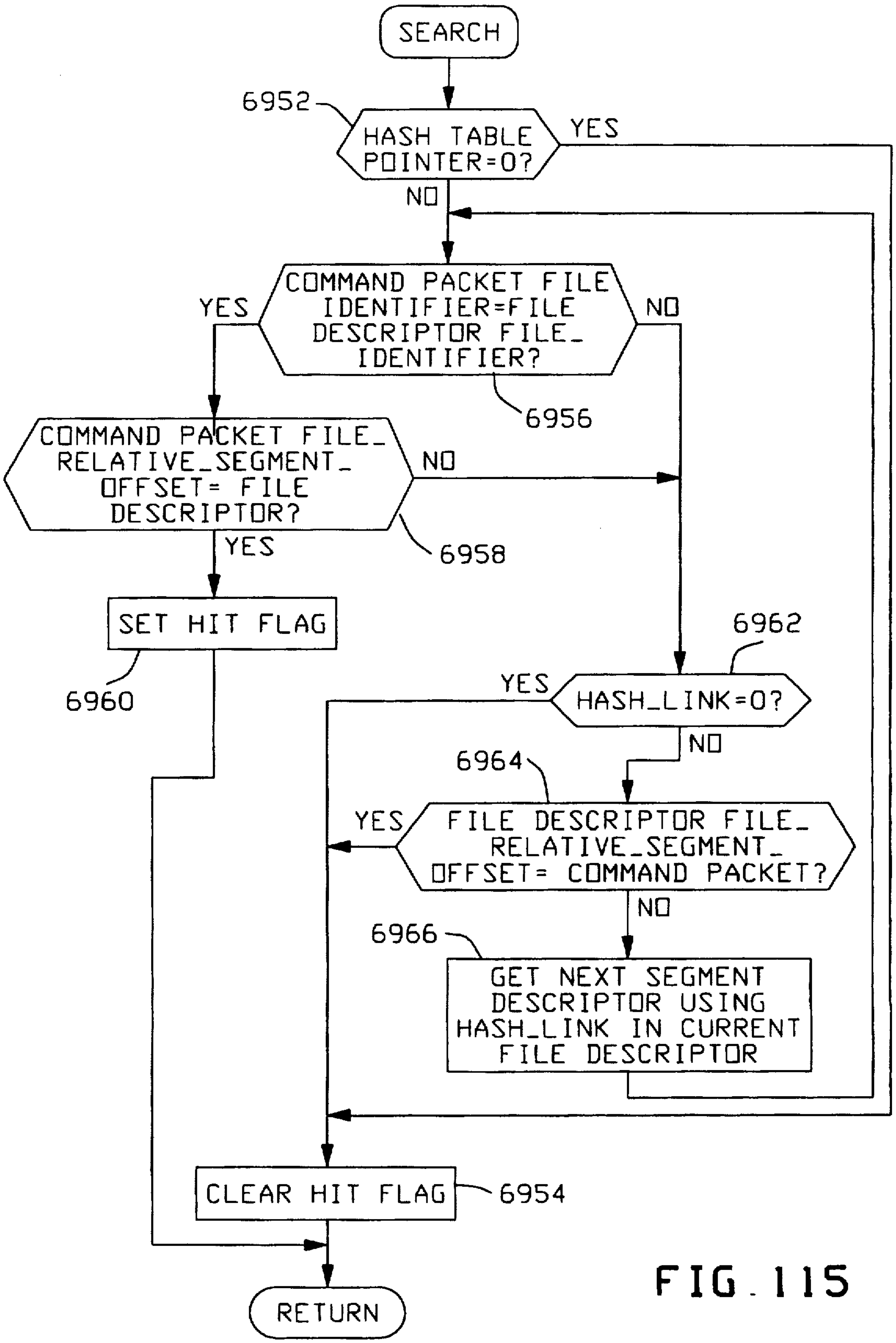
Figure 116A:
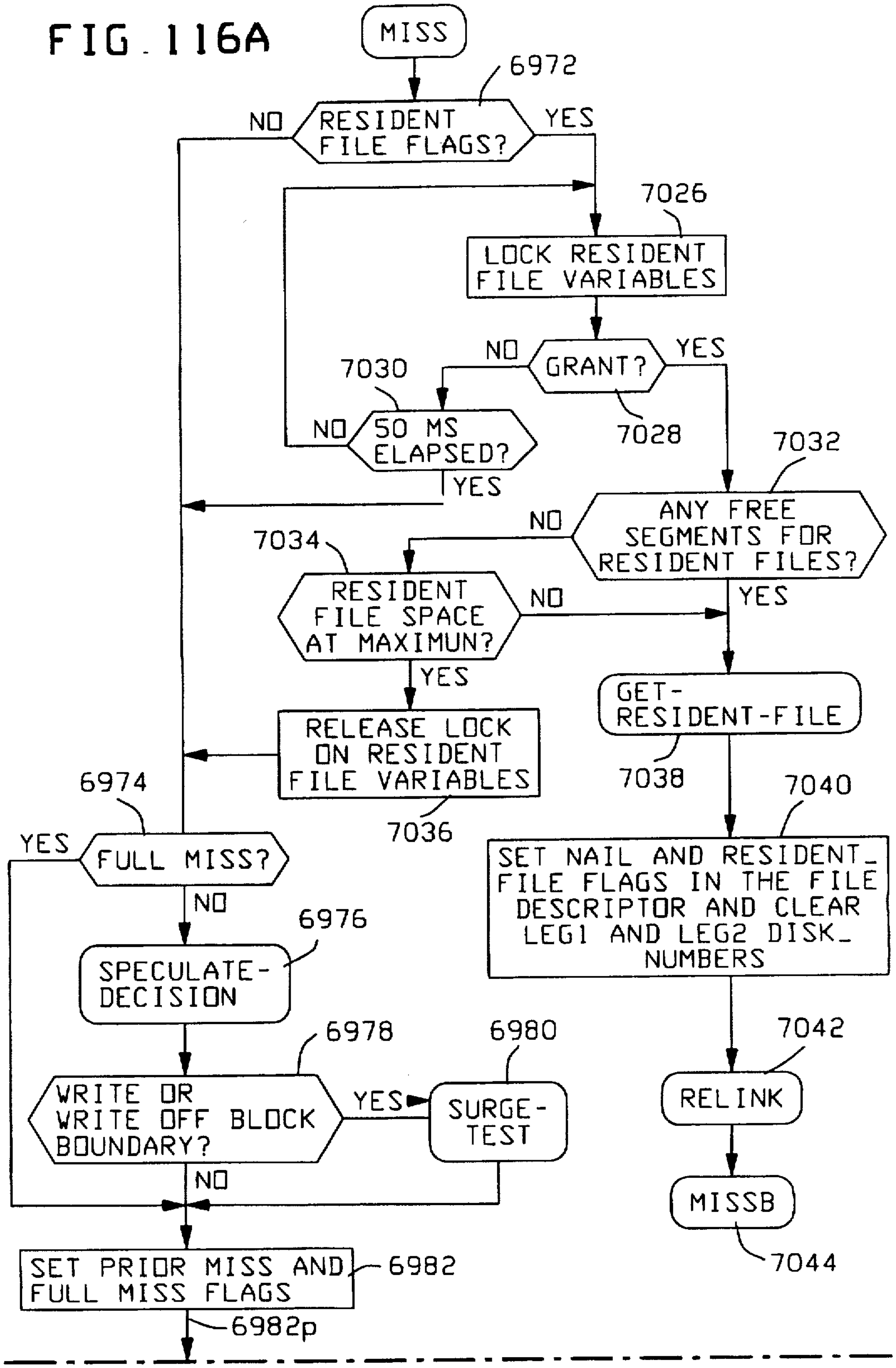
Figure 116B:
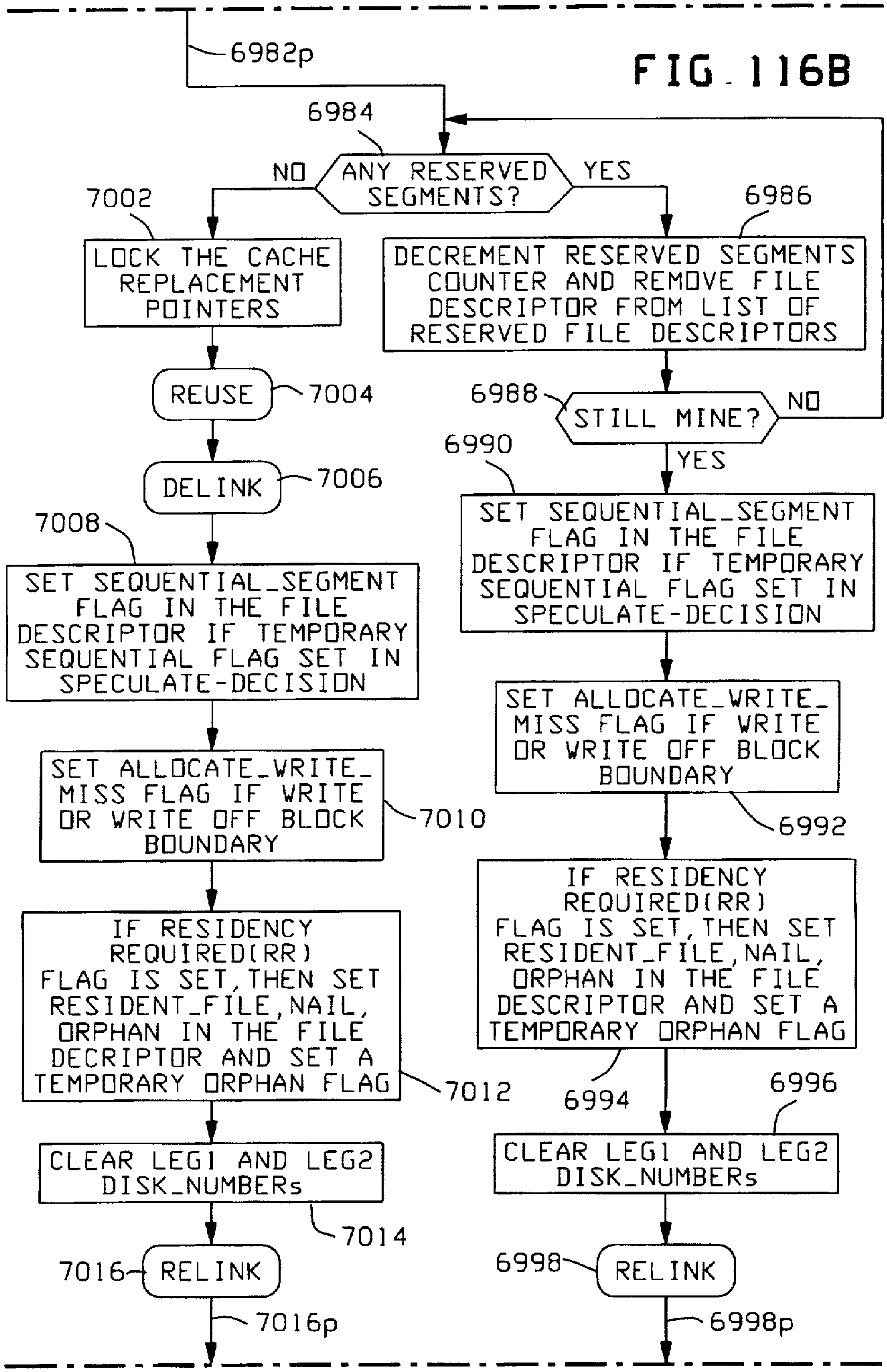
Figure 116C:
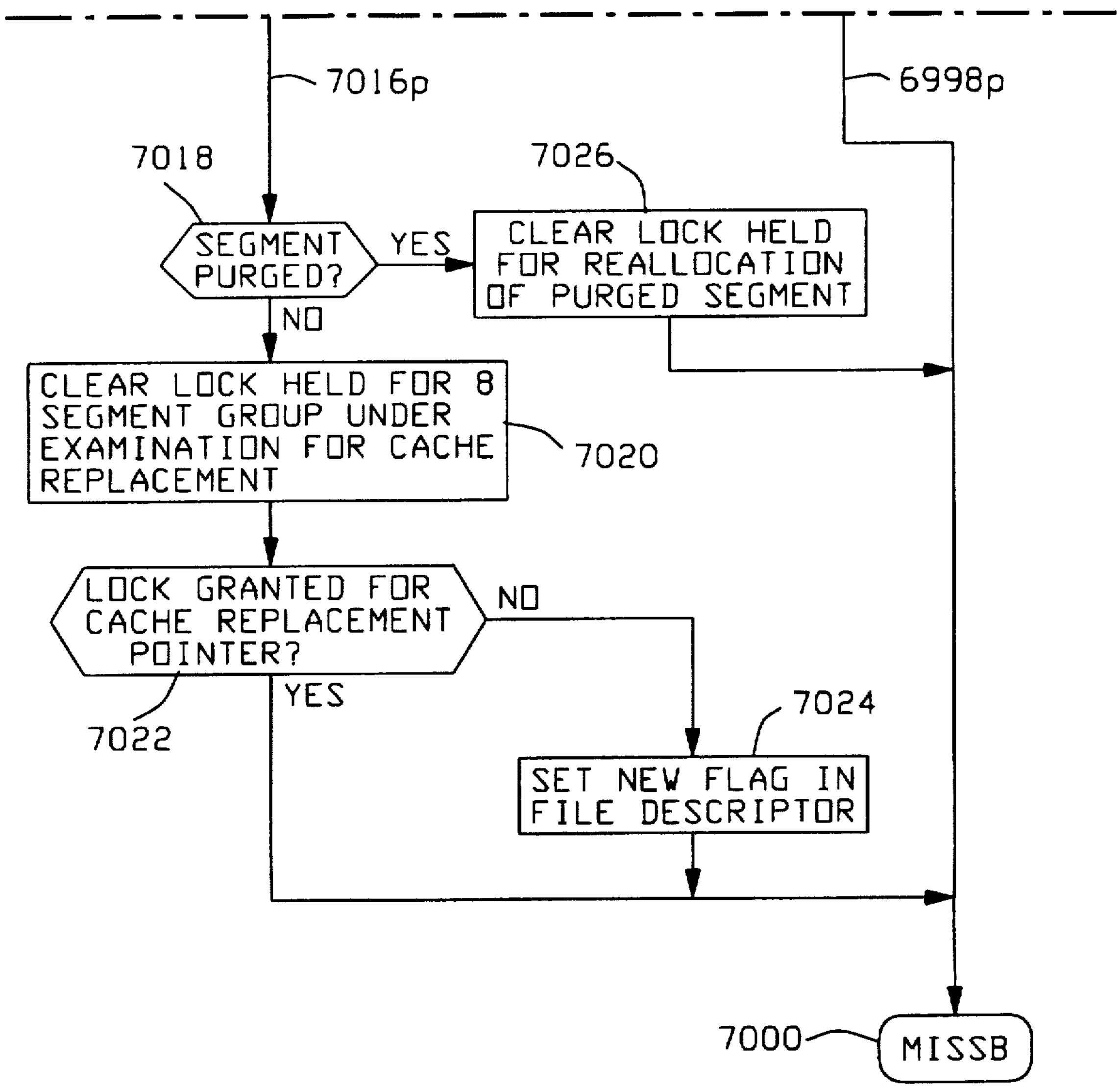
Figure 117:
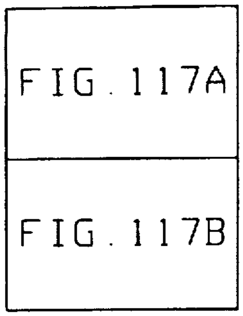
Figure 120:
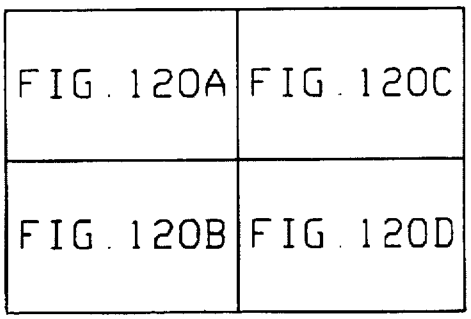
Figure 124:
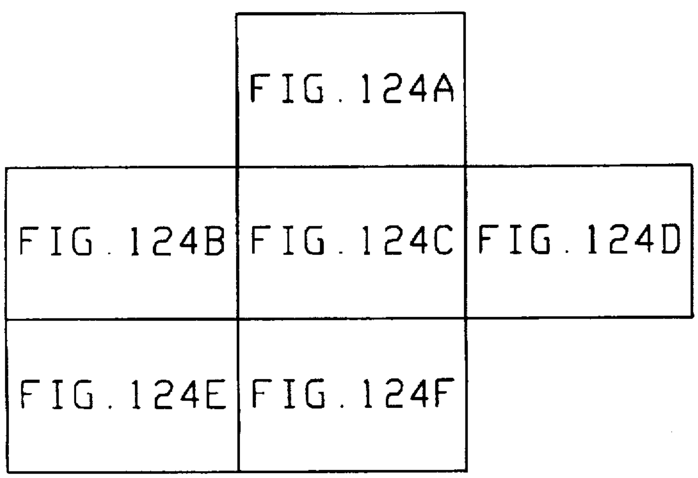
Figure 126:
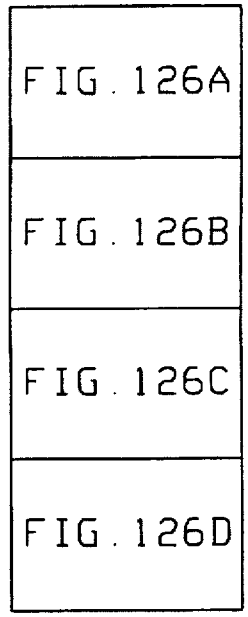
Figure 130:
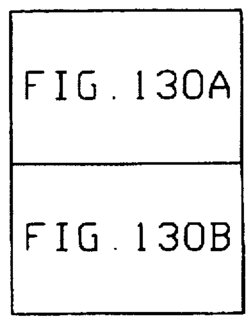
Figure 132:
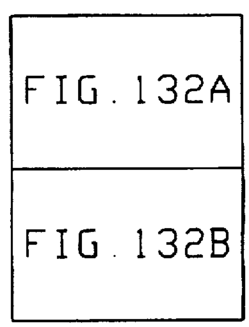
Figure 117A:
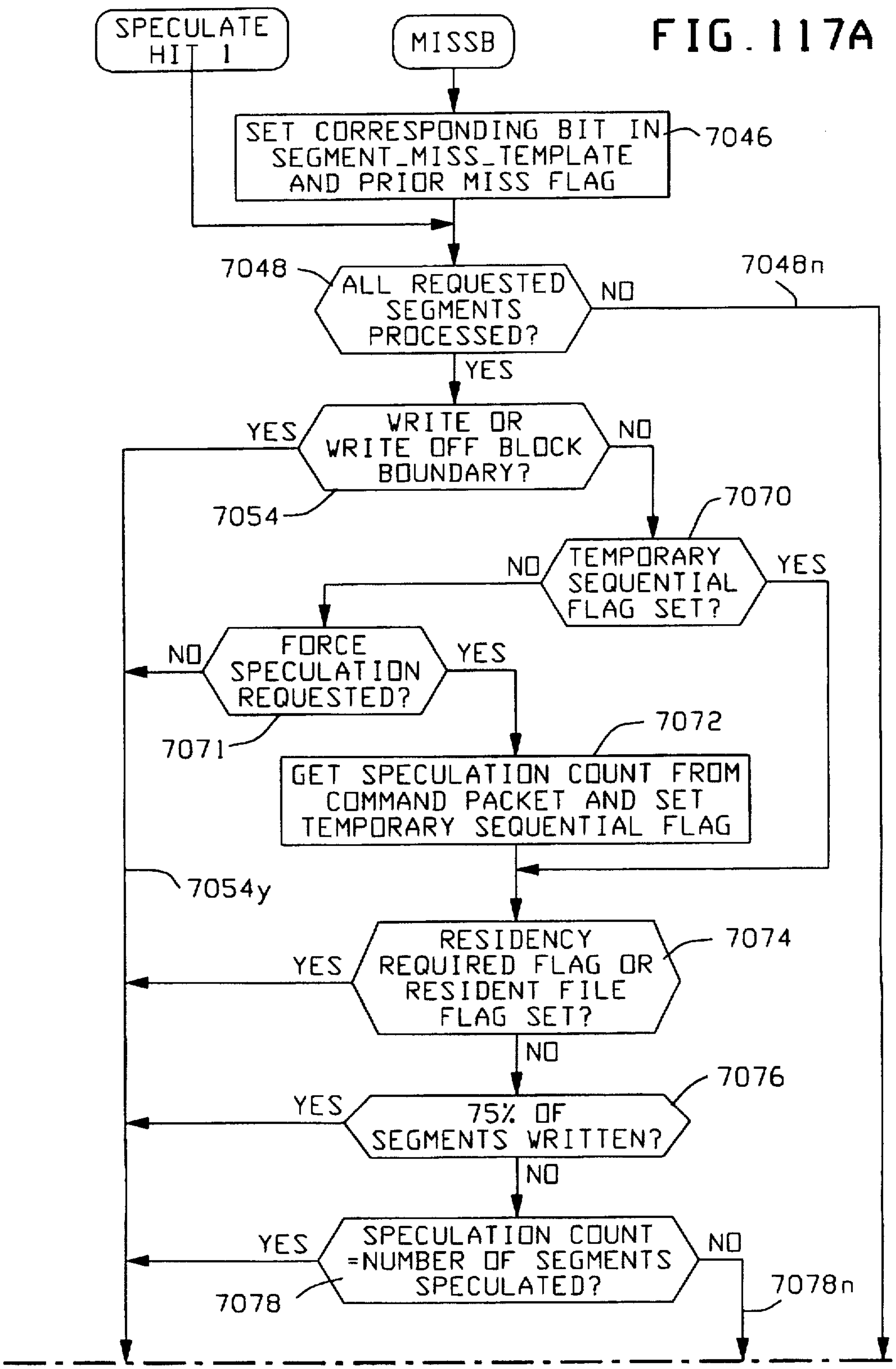
Figure 117B:
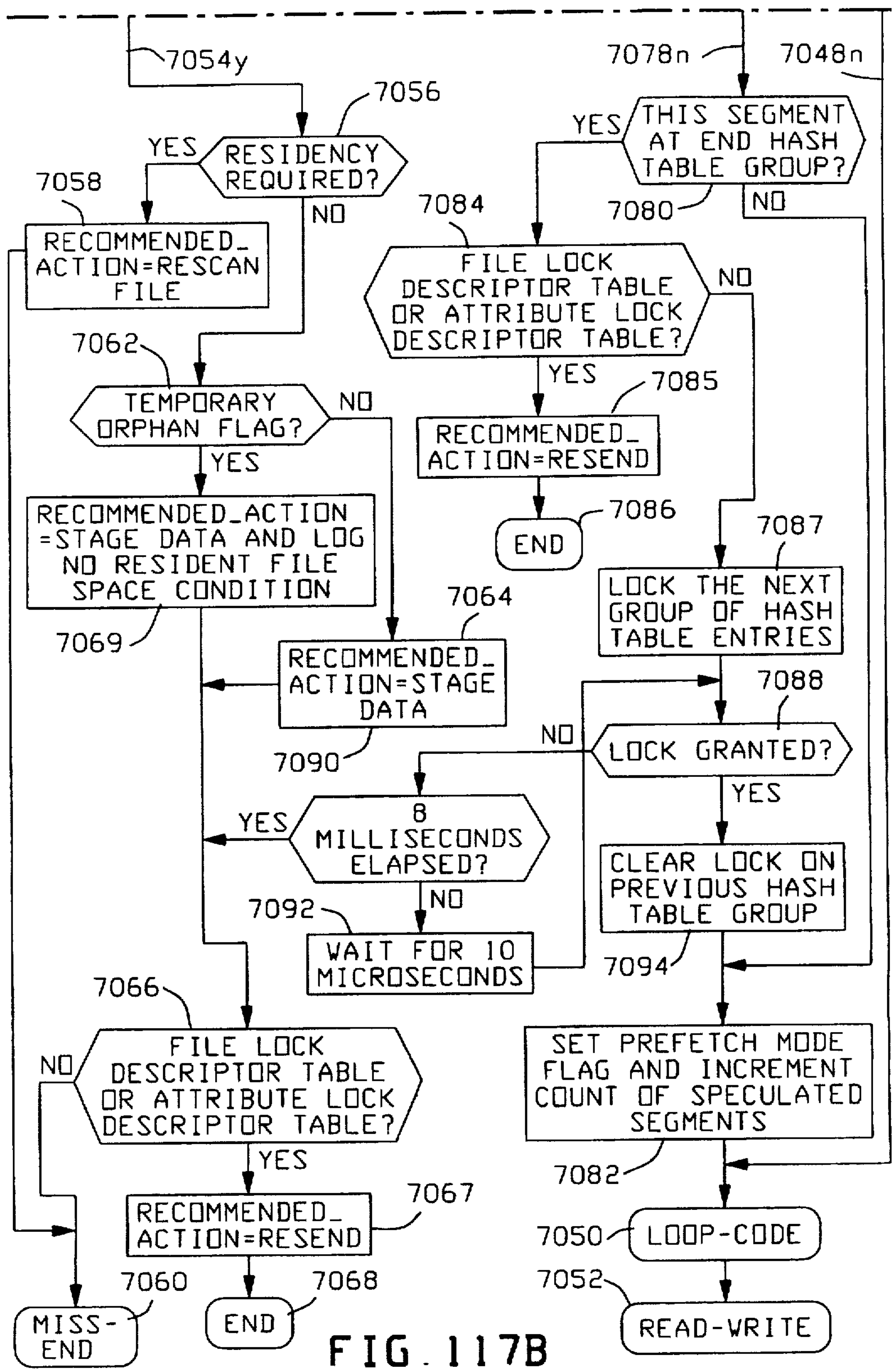
Figure 118:
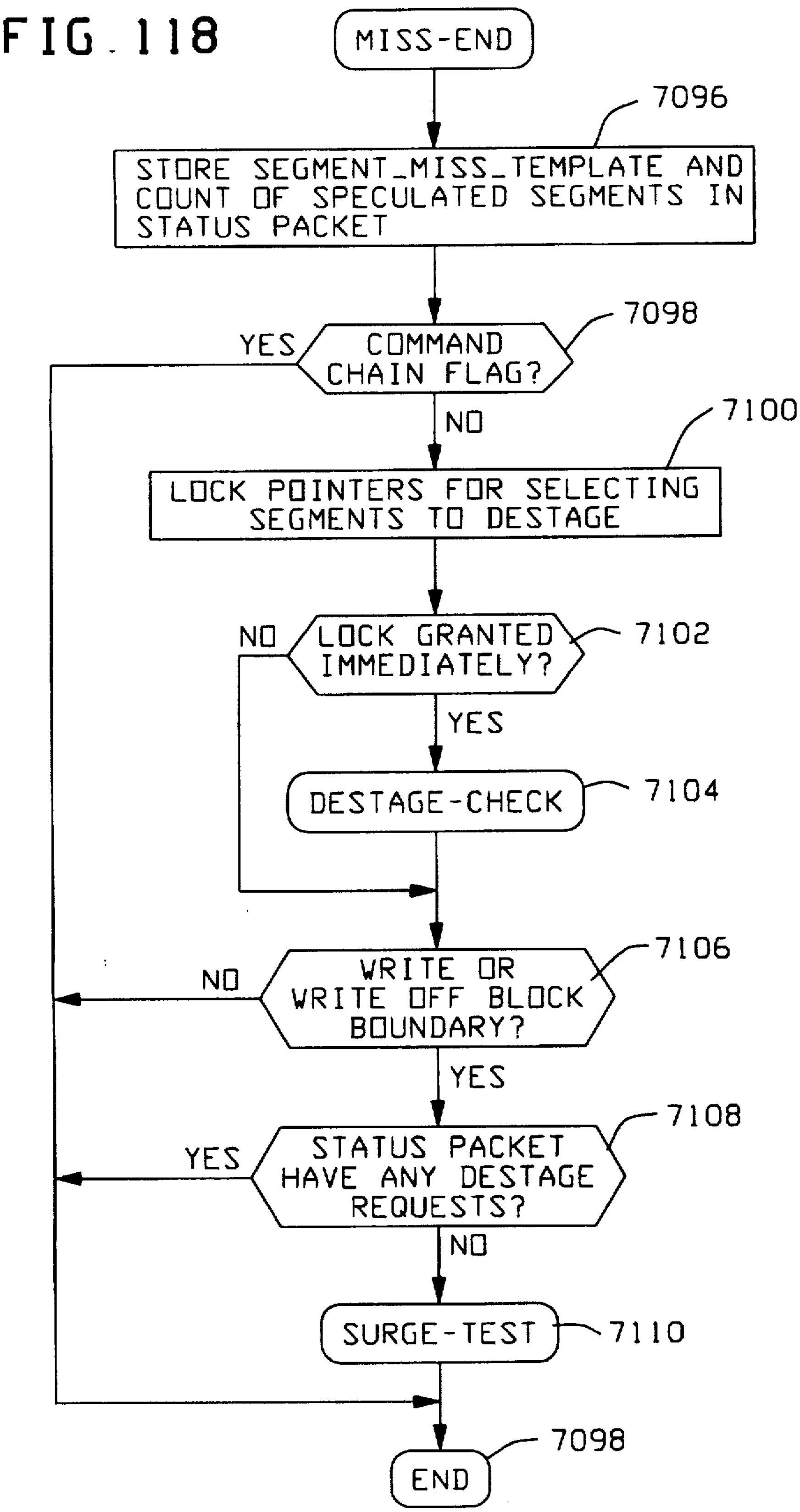
Figure 119:
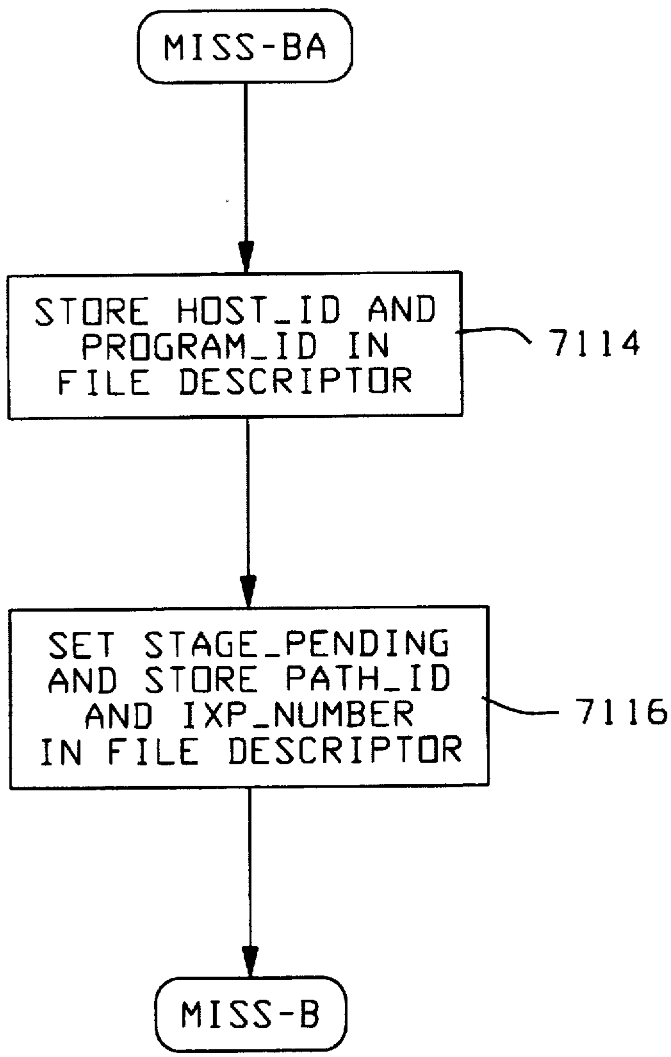
Figure 120A:
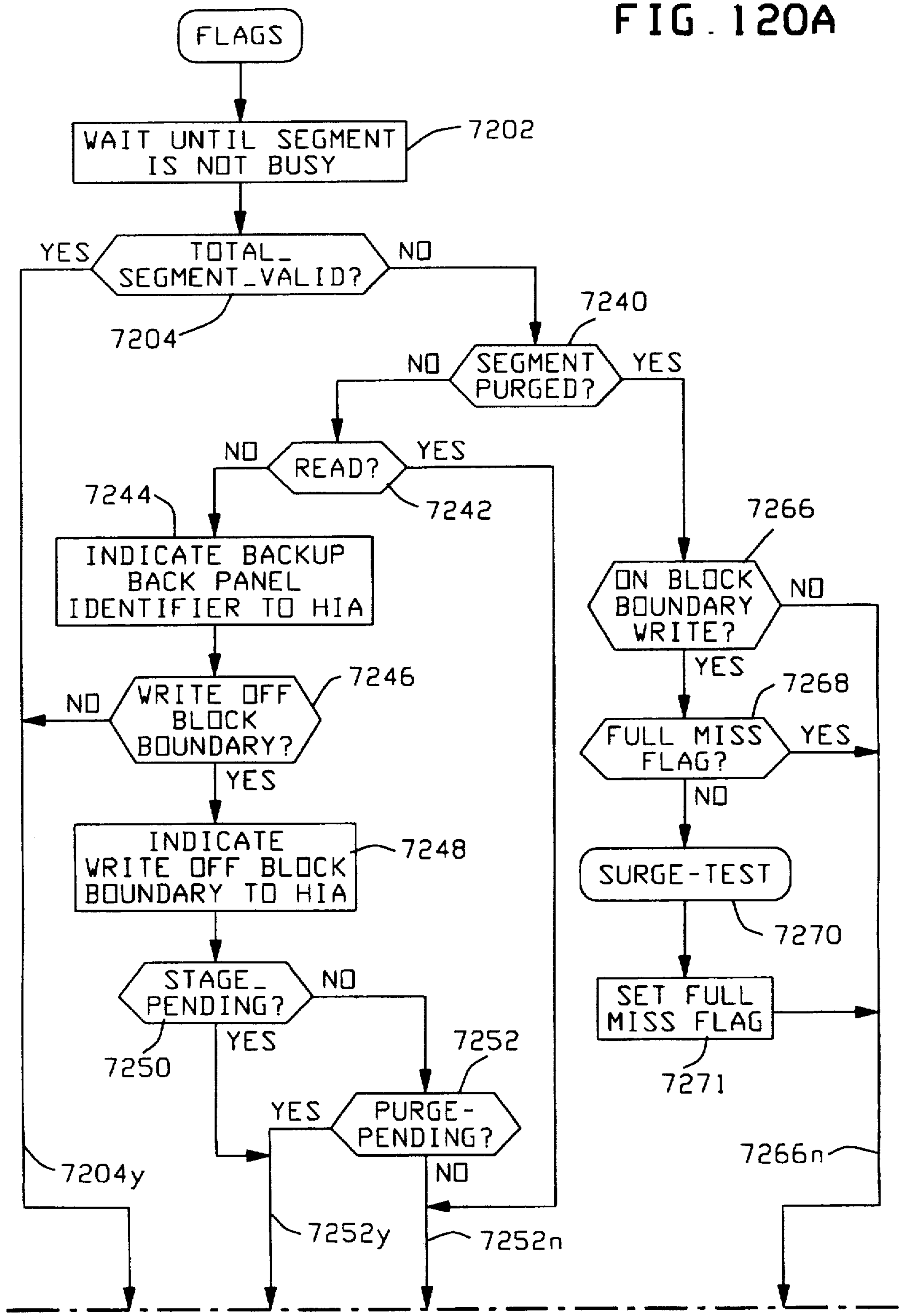
Figure 120B:
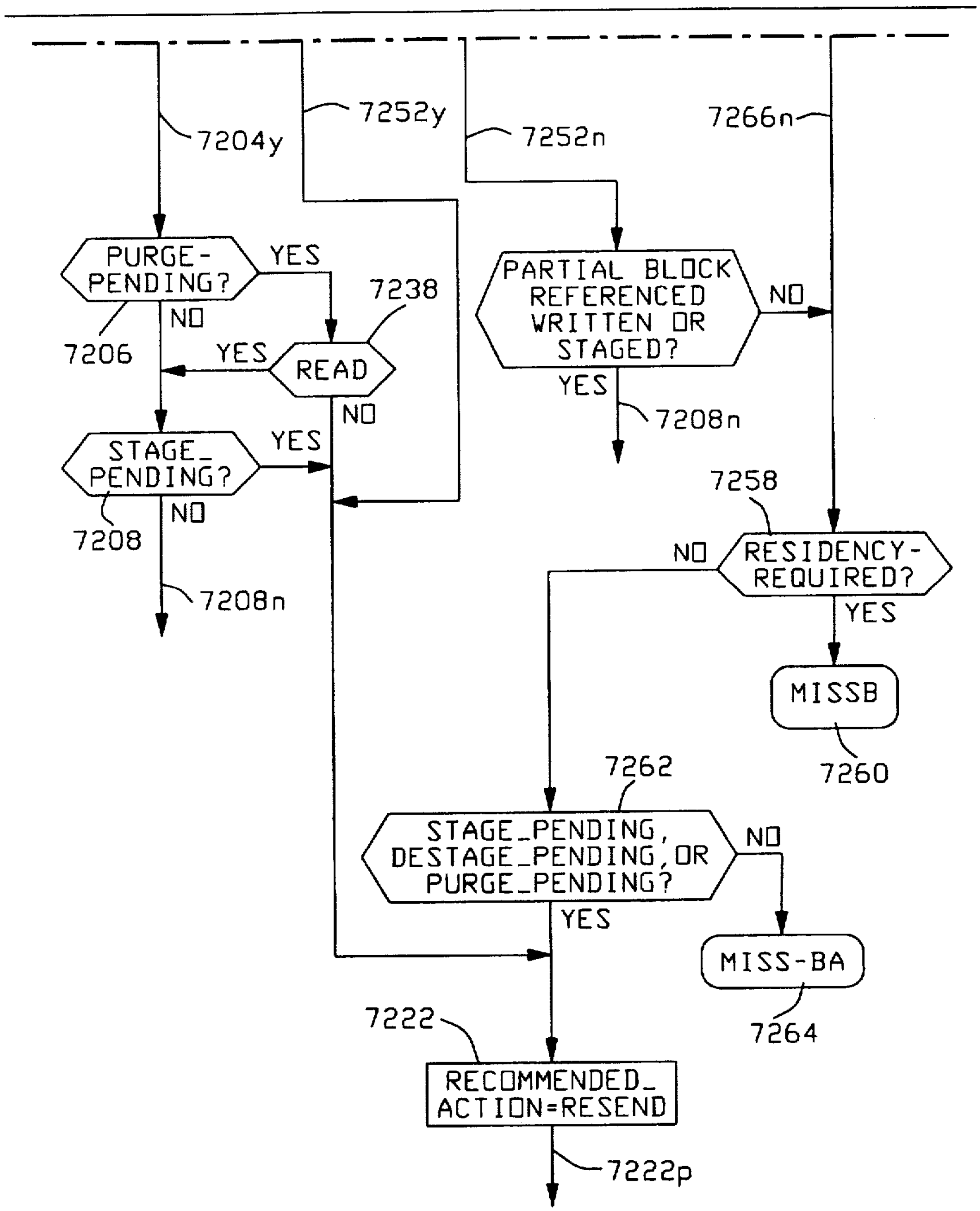
Figure 120C:
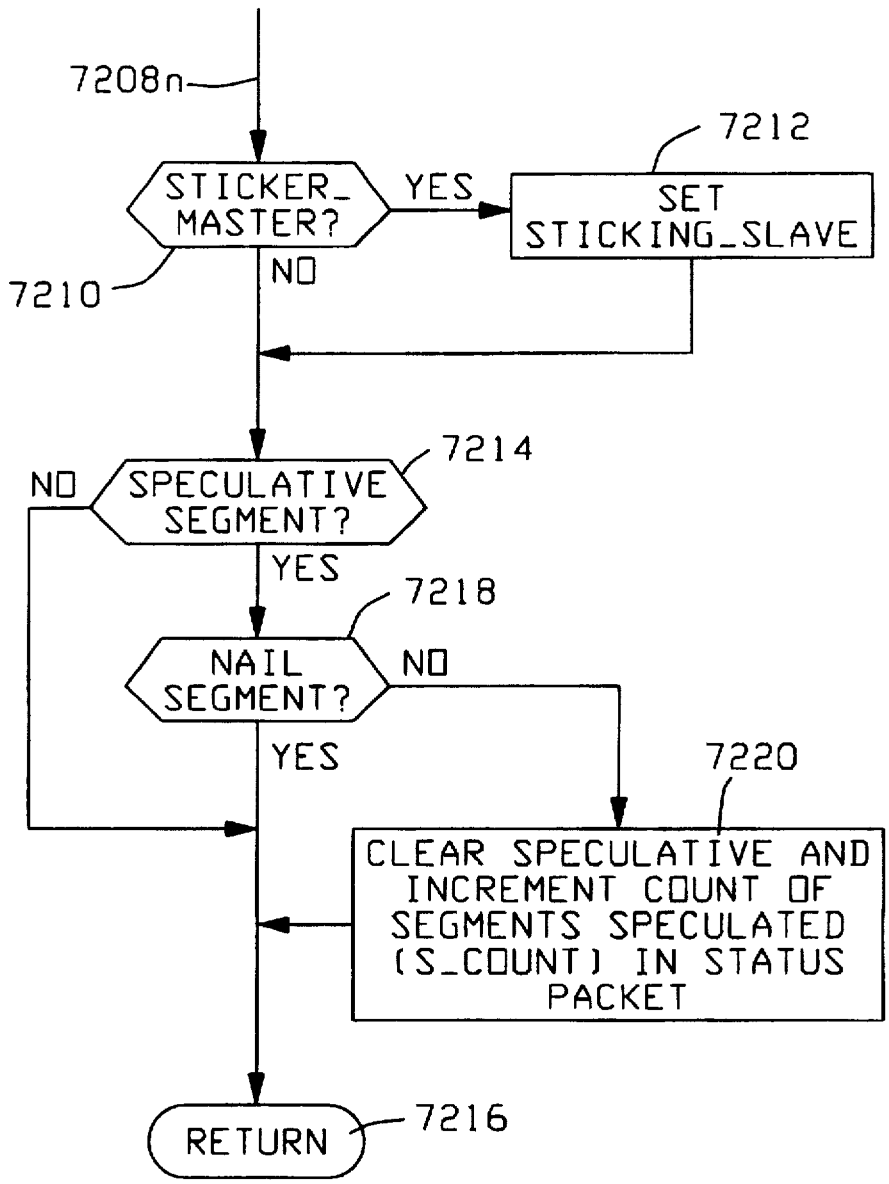
Figure 120D:
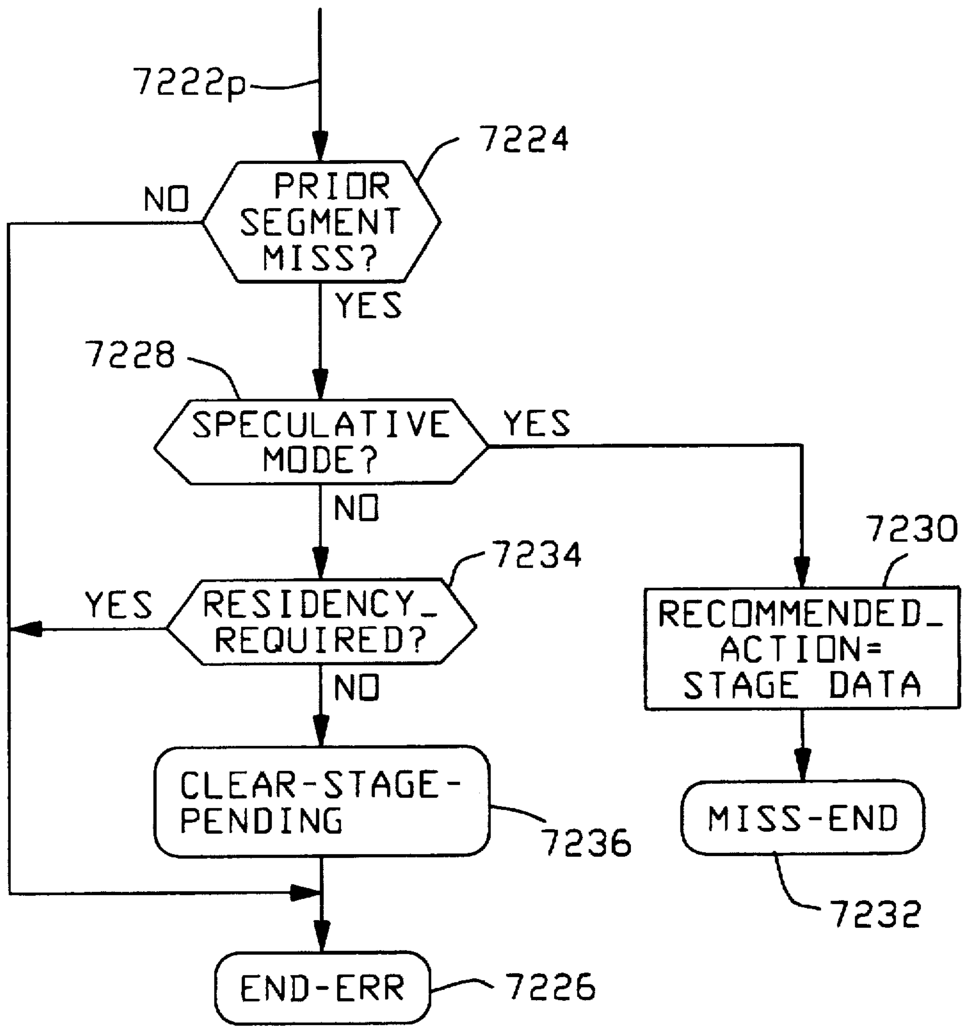
Figure 121:
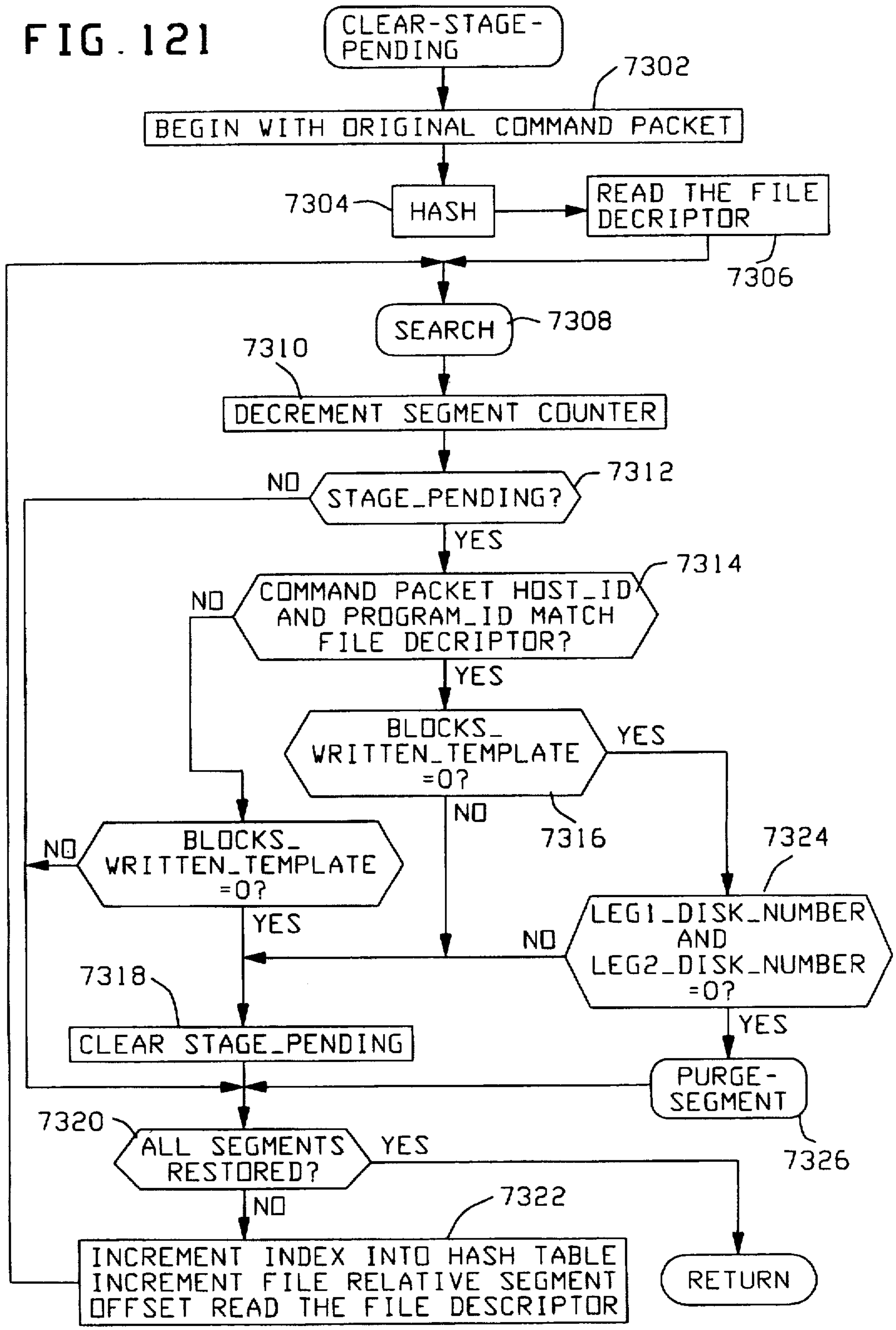
Figure 122:
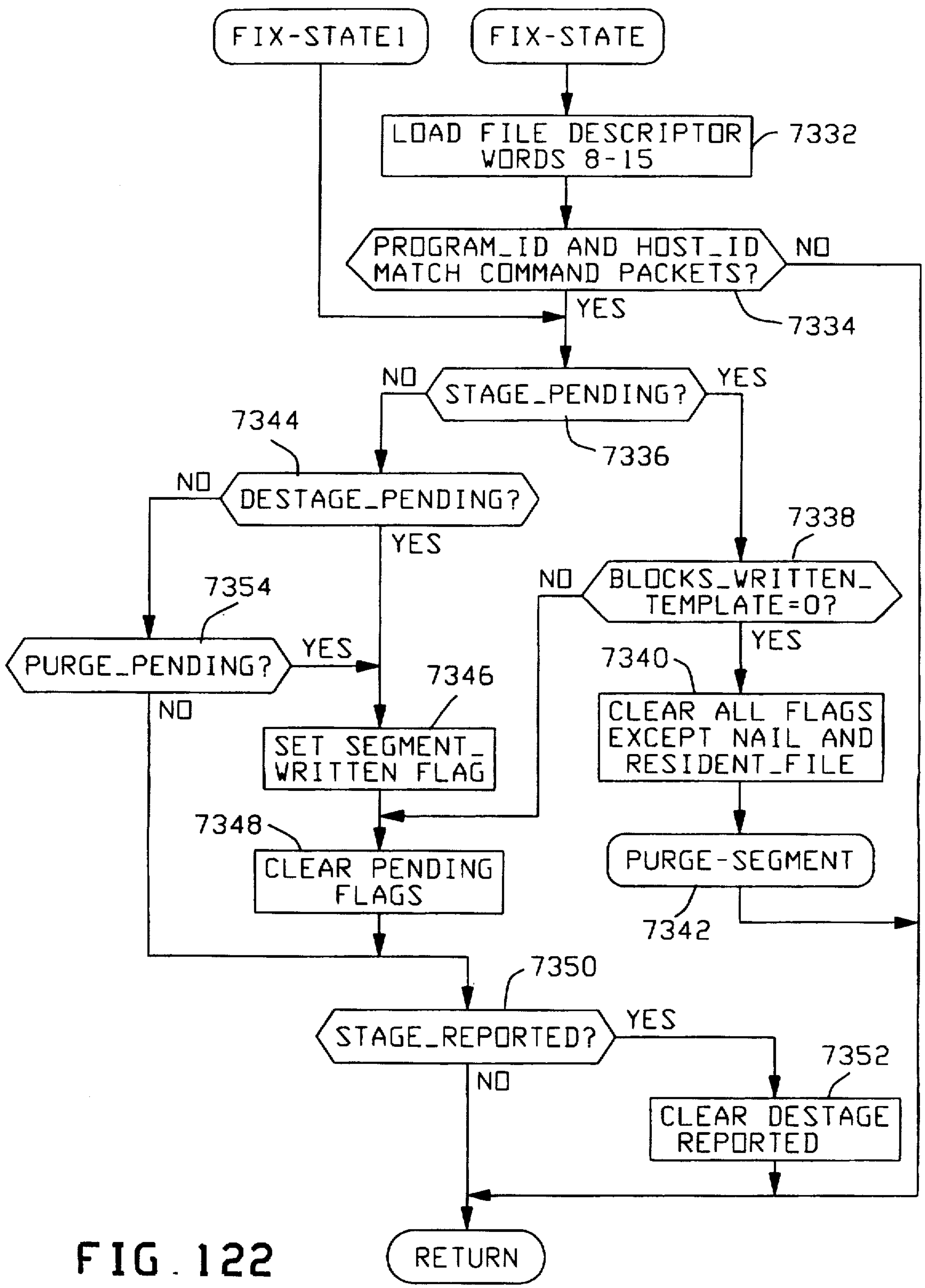
Figure 123:
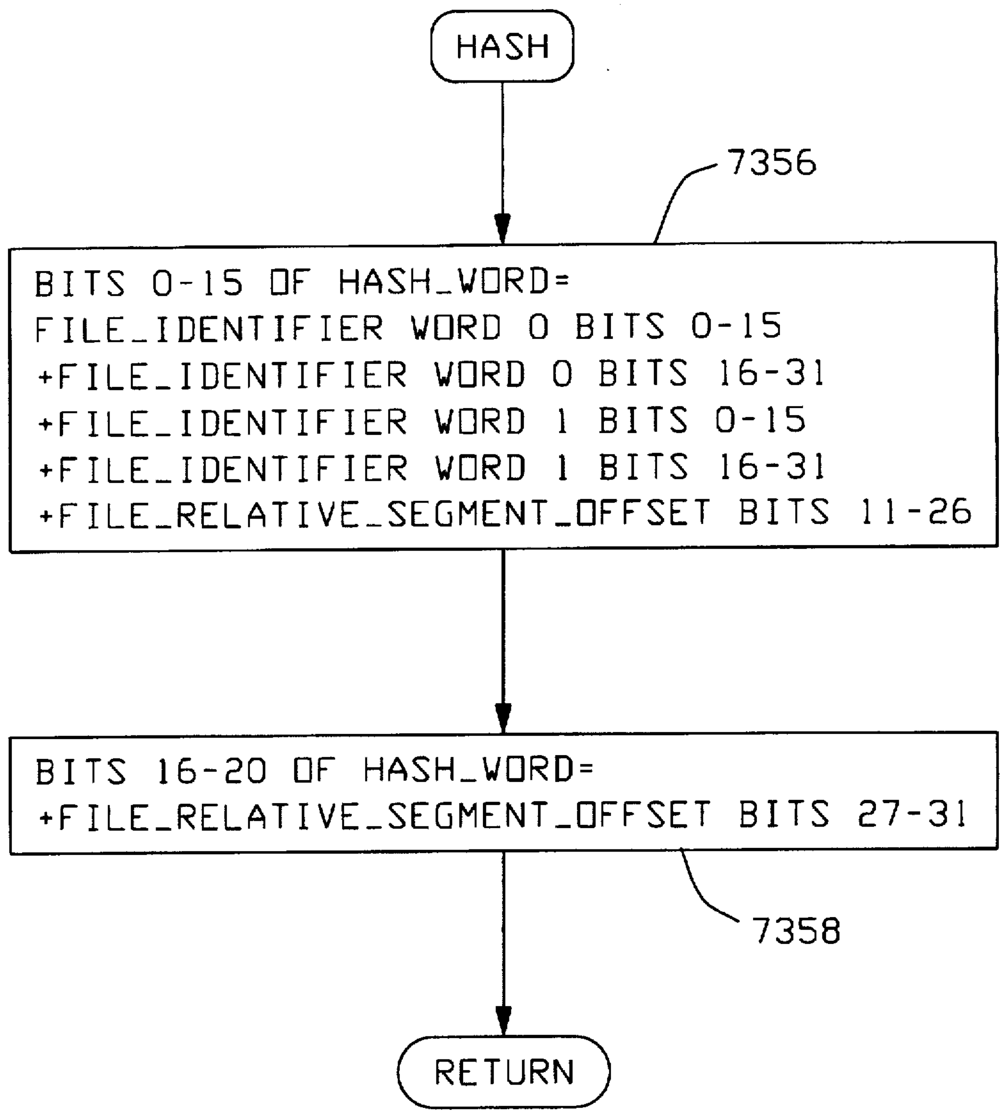
Figure 124A:
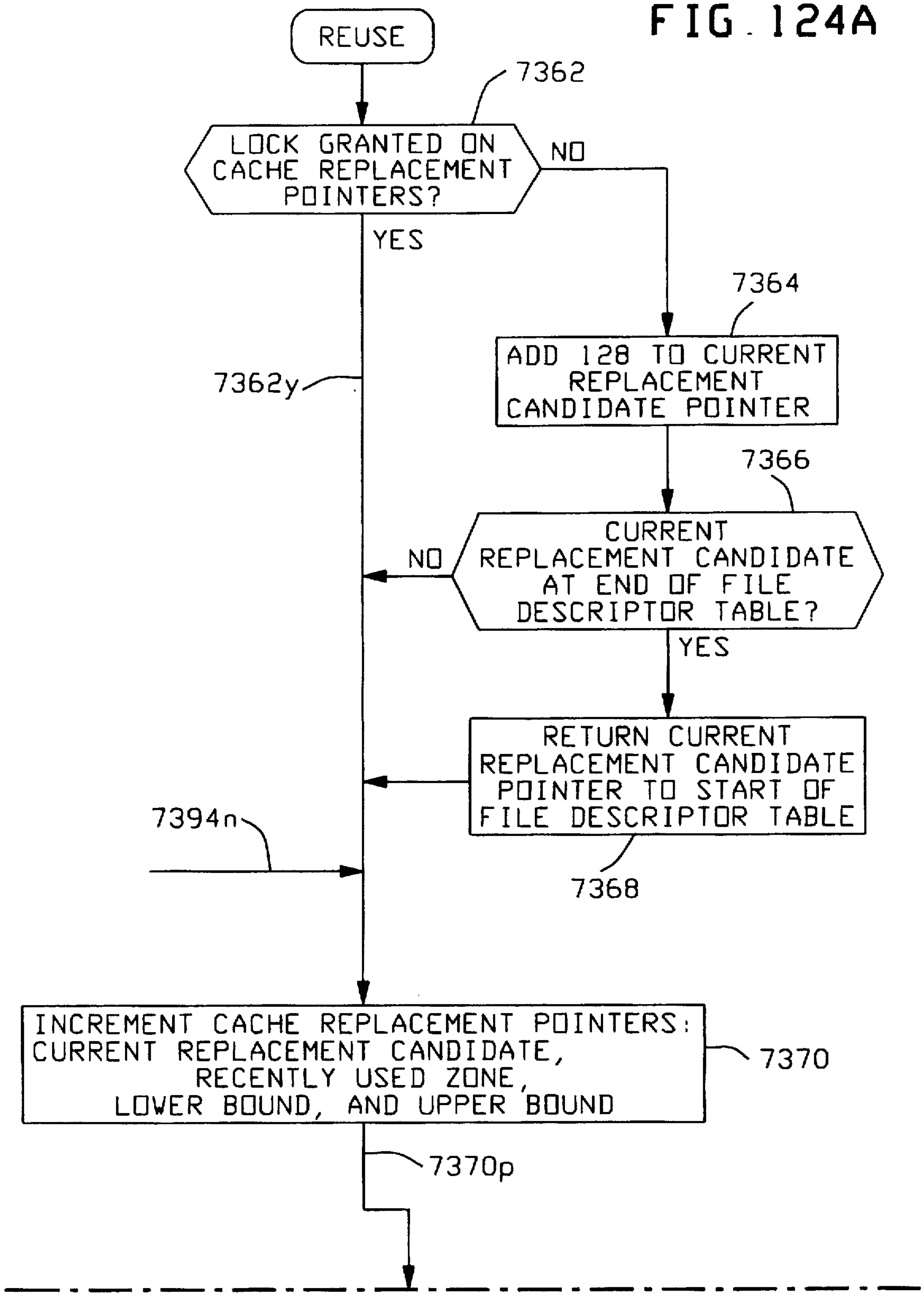
Figure 124B:
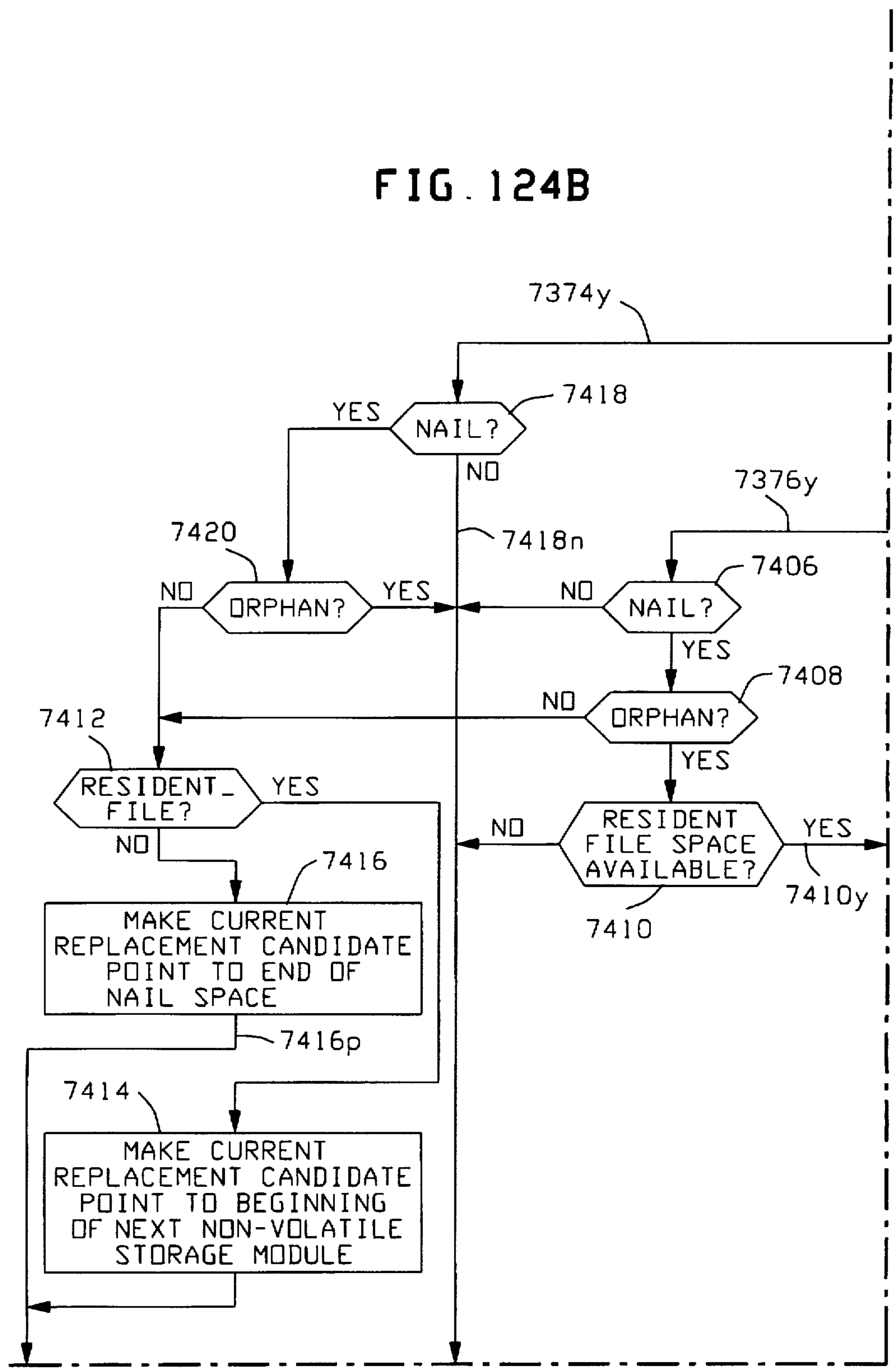
Figure 124C:
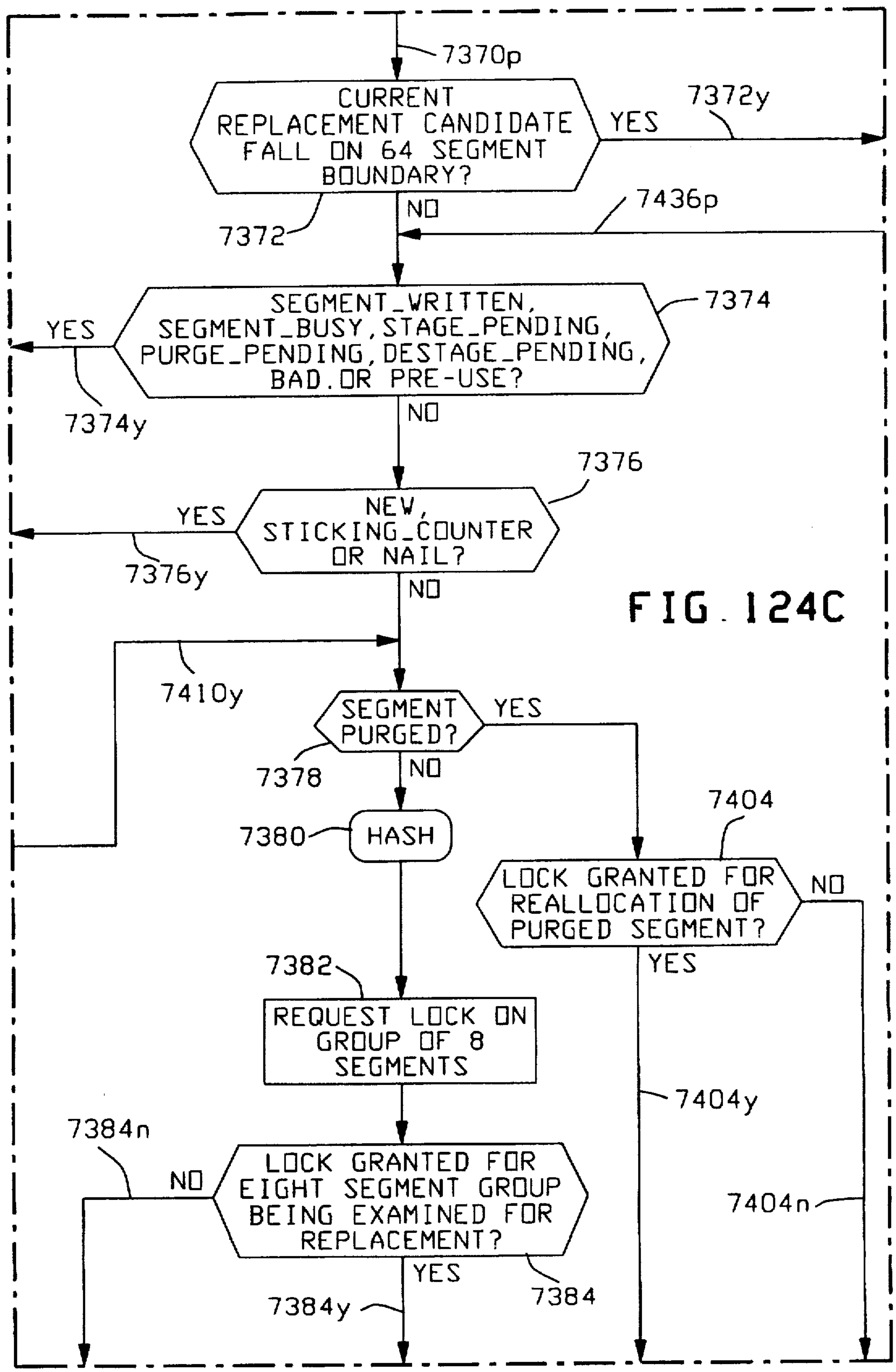
Figure 124D:
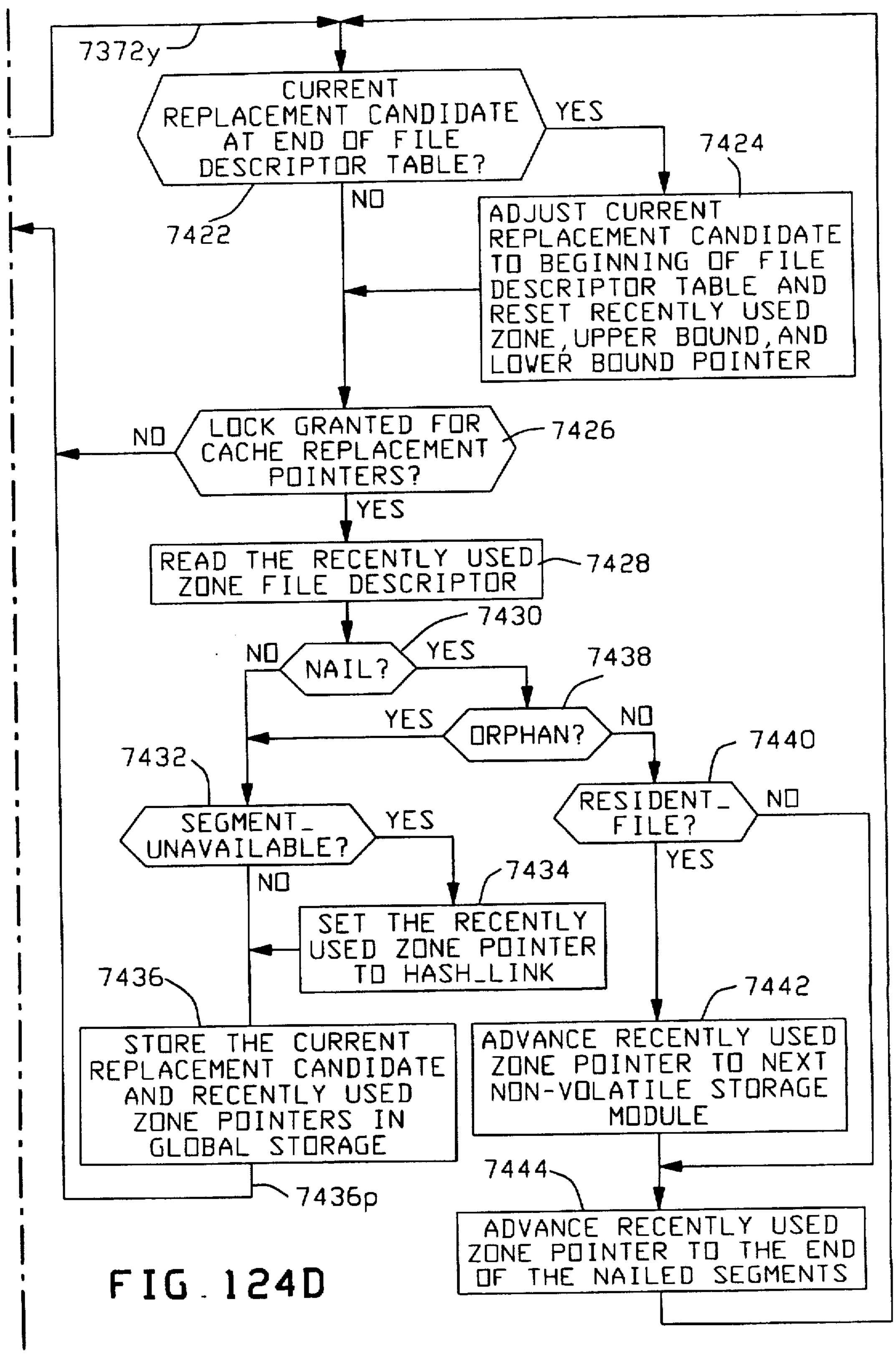
Figure 124E:
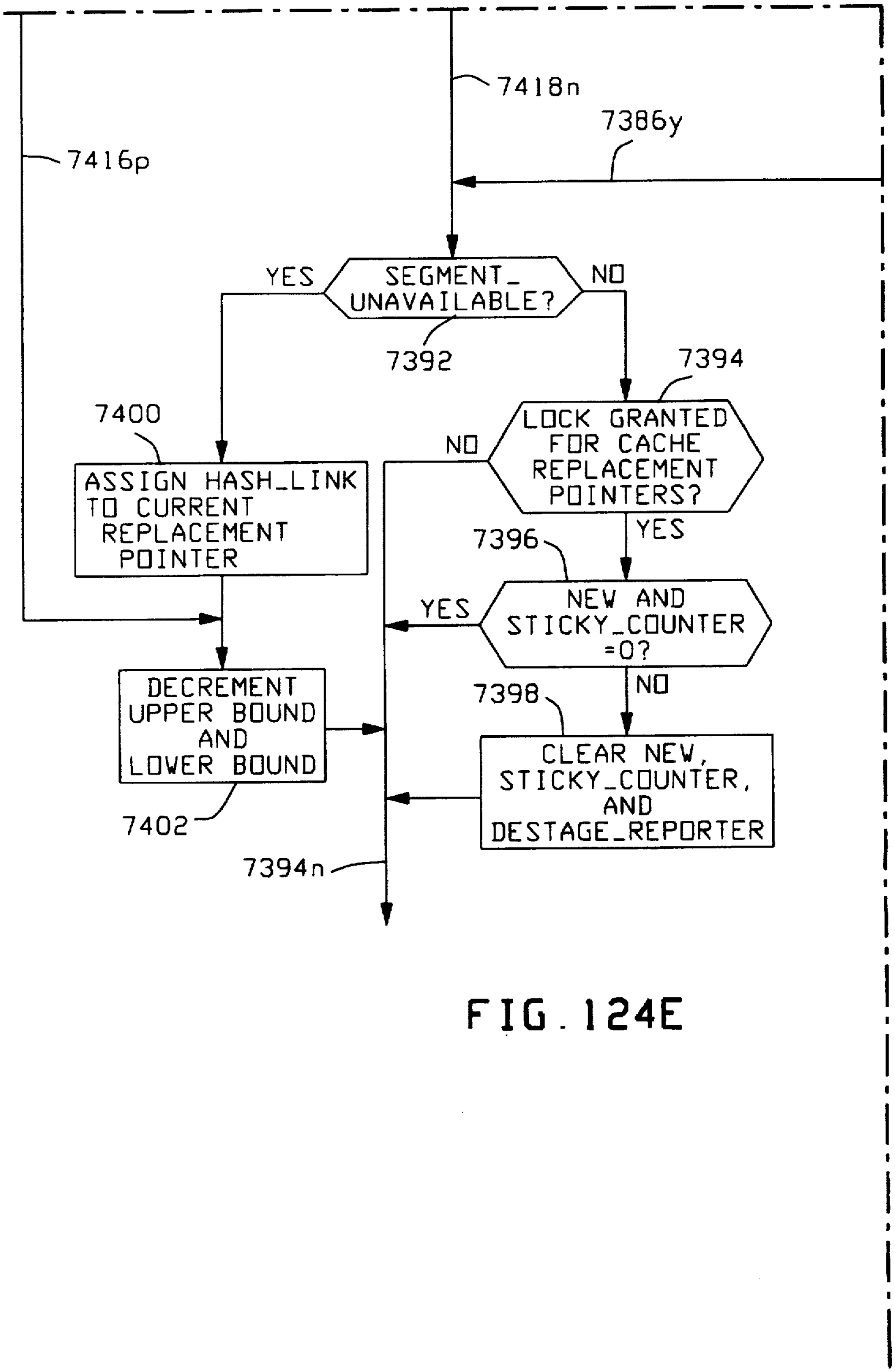
Figure 124F:
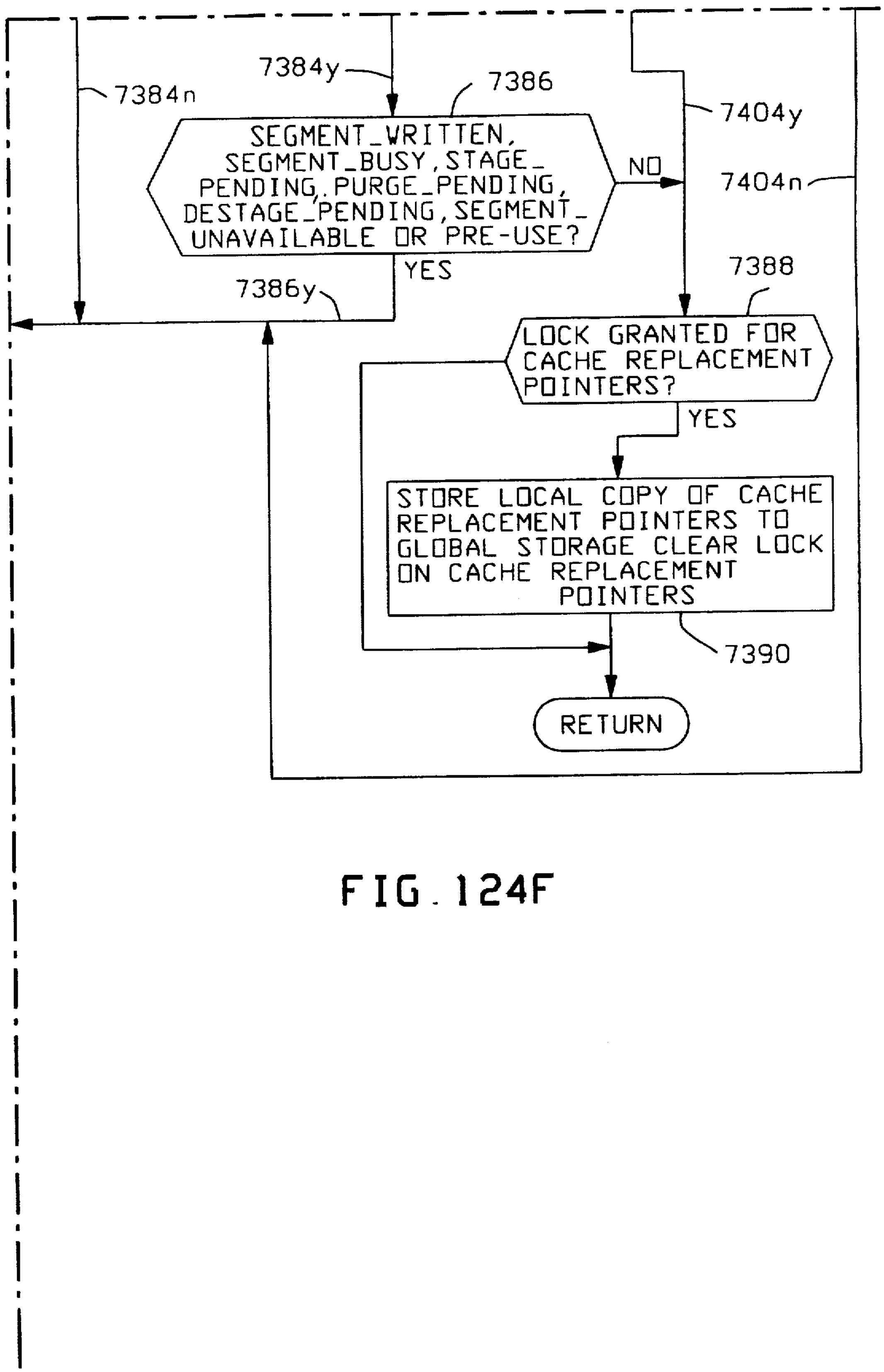
Figure 125:
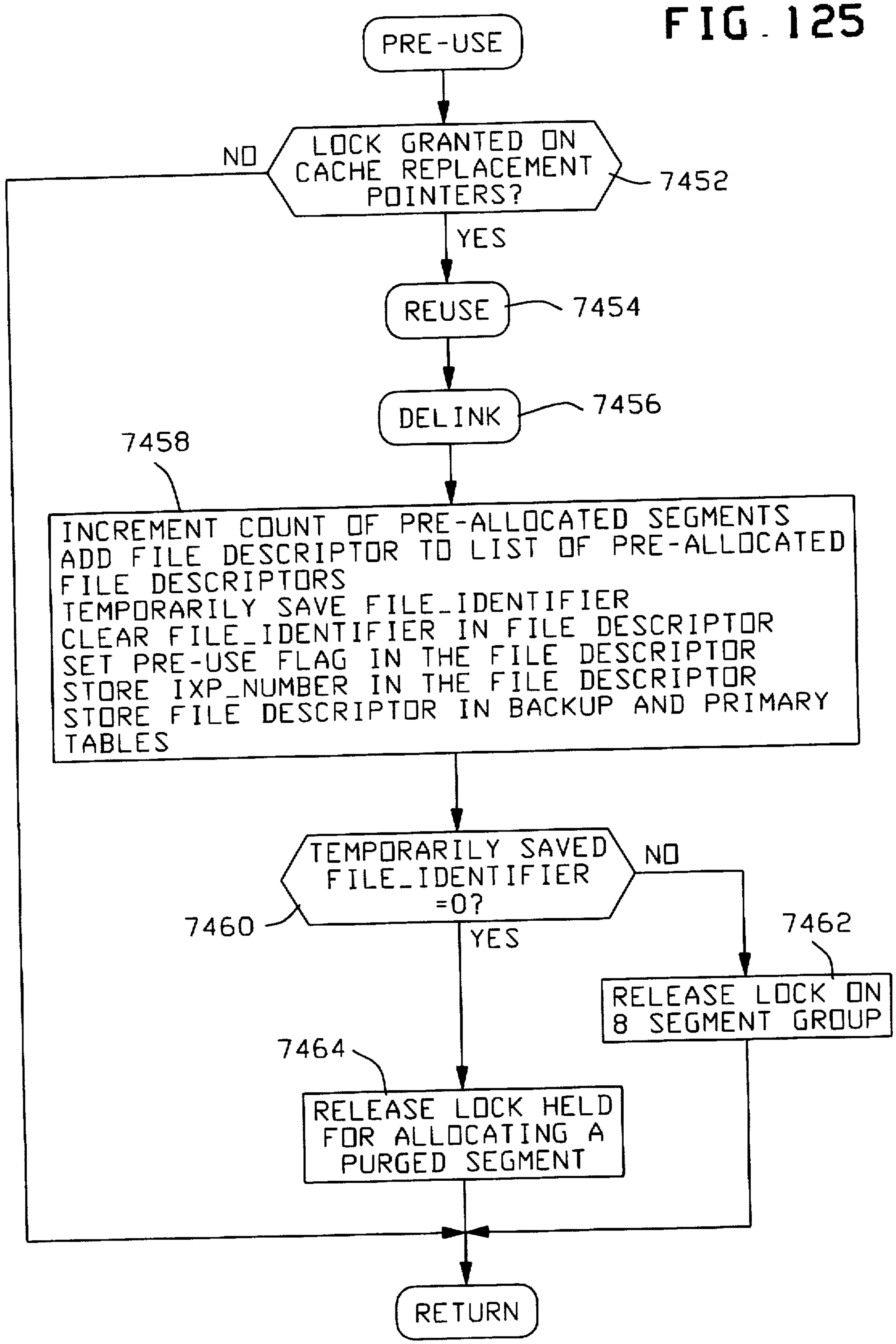
Figure 126A:
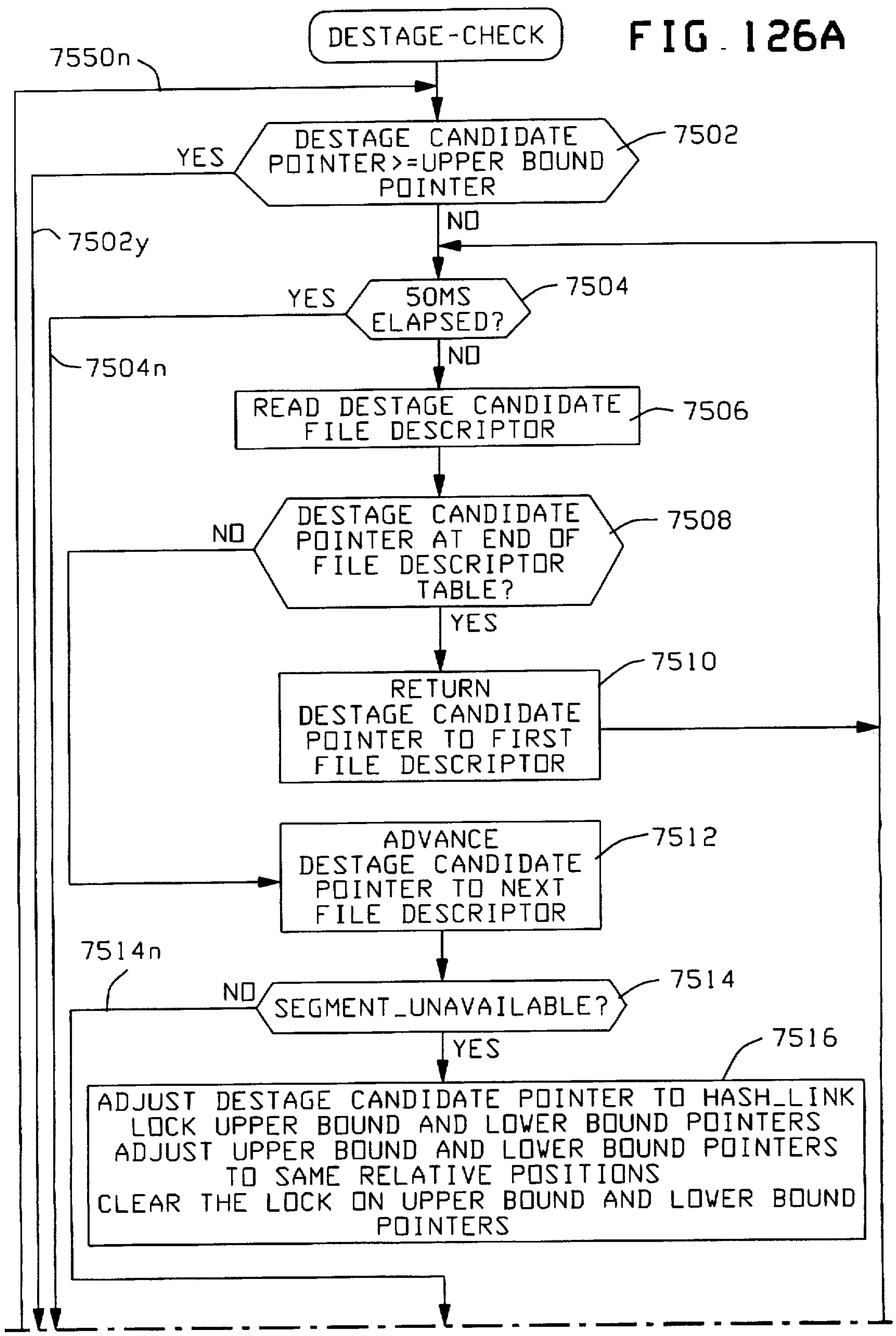
Figure 126B:
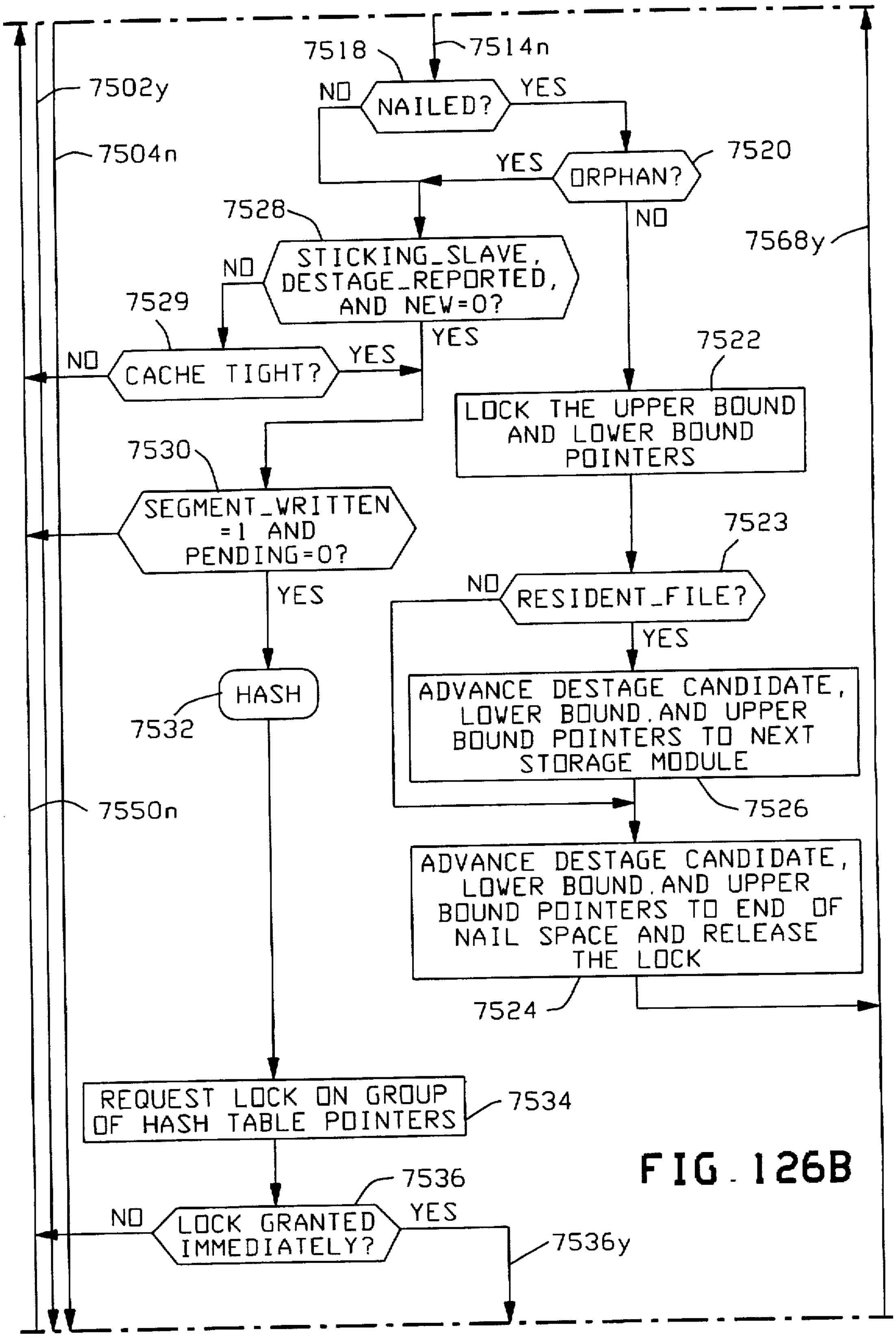
Figure 126C:
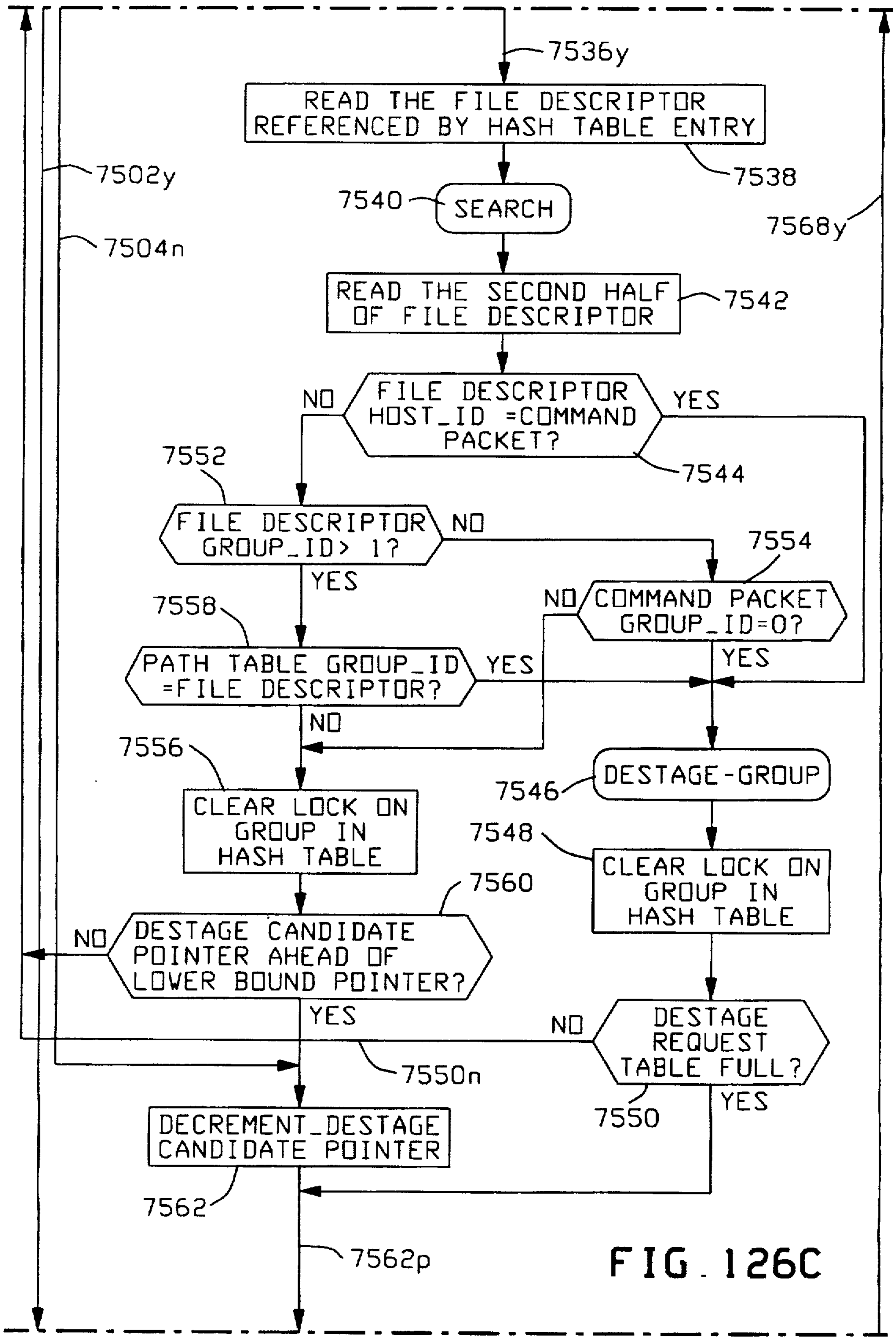
Figure 126D:
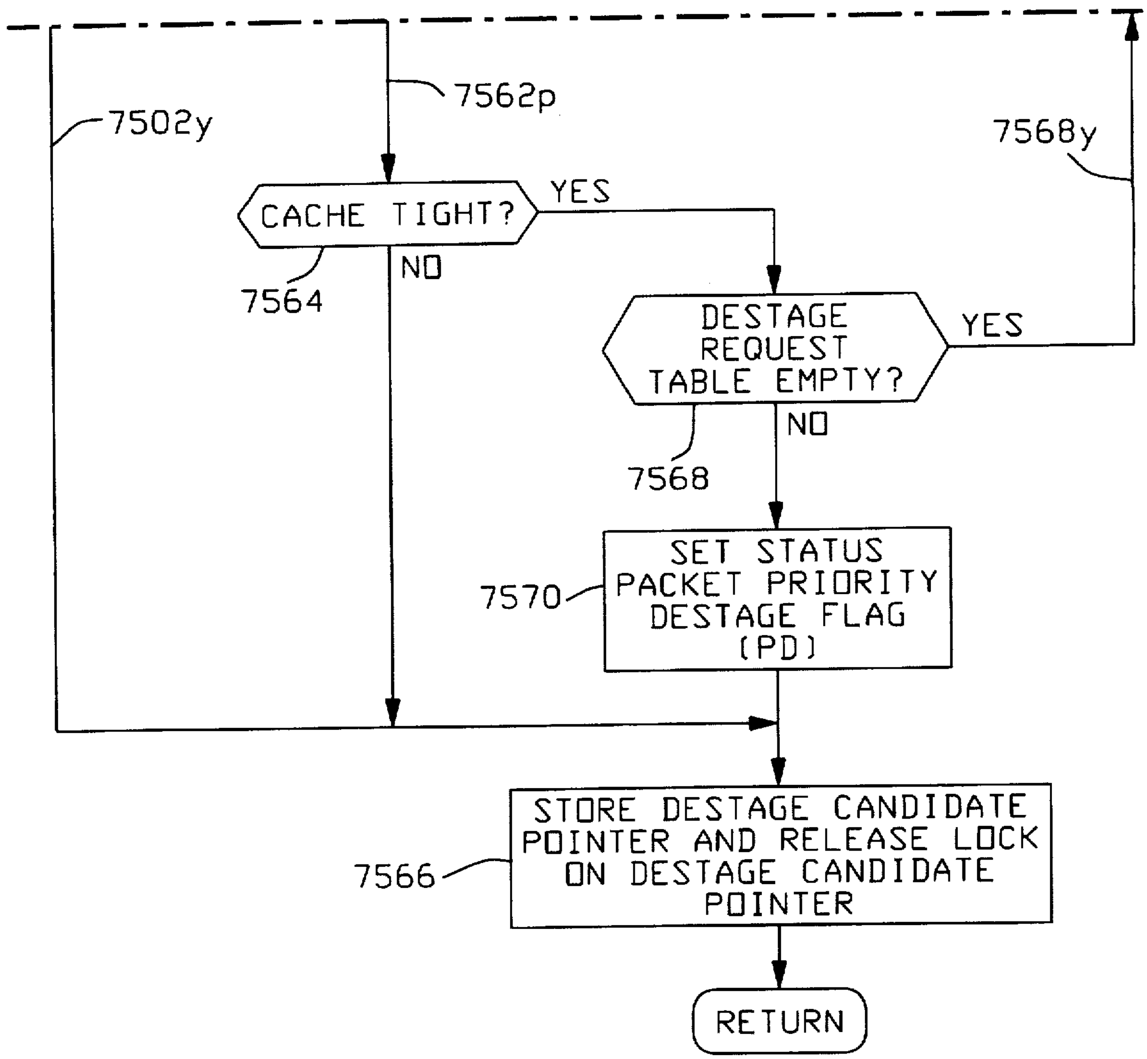
Figure 127:
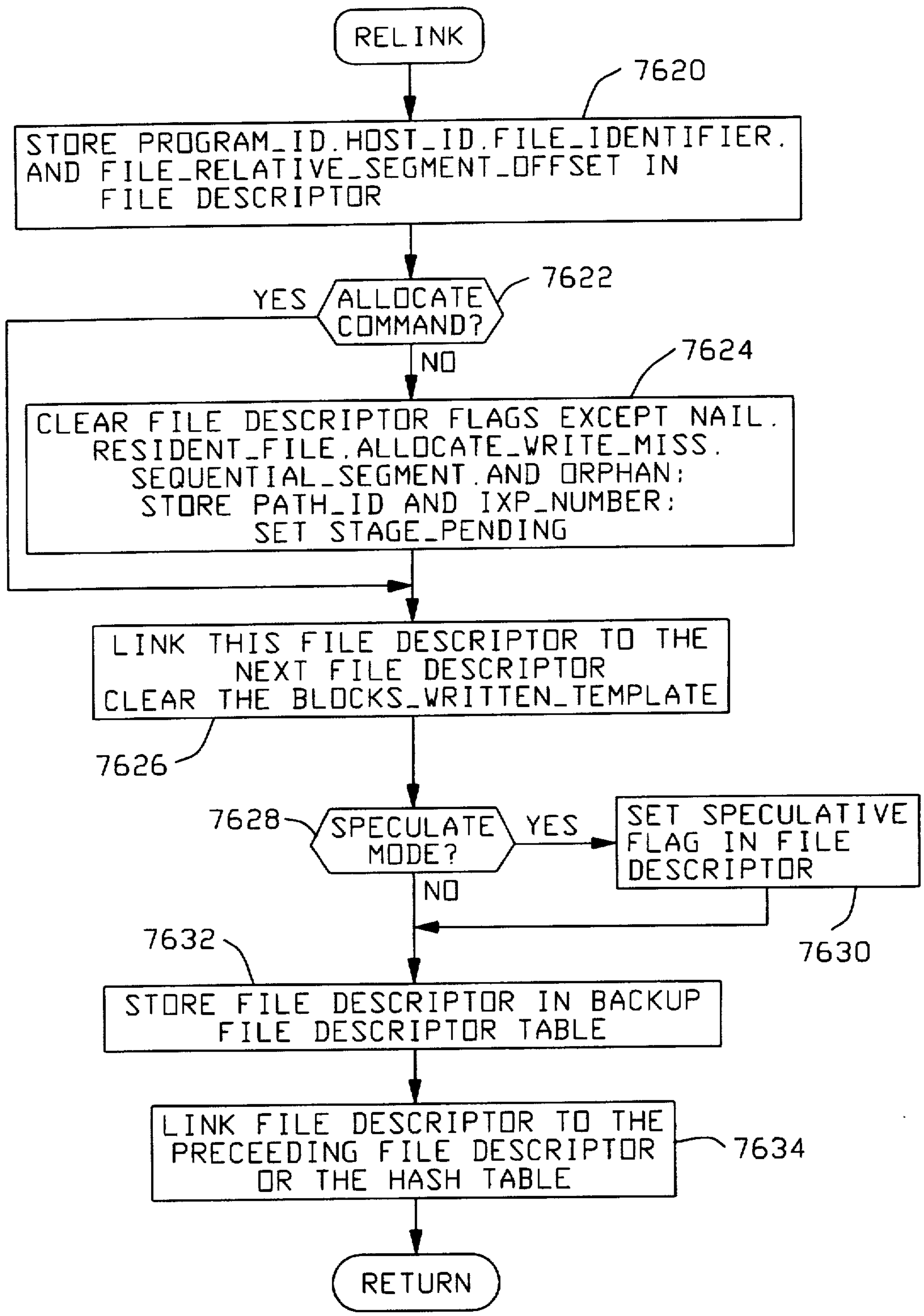
Figure 128:
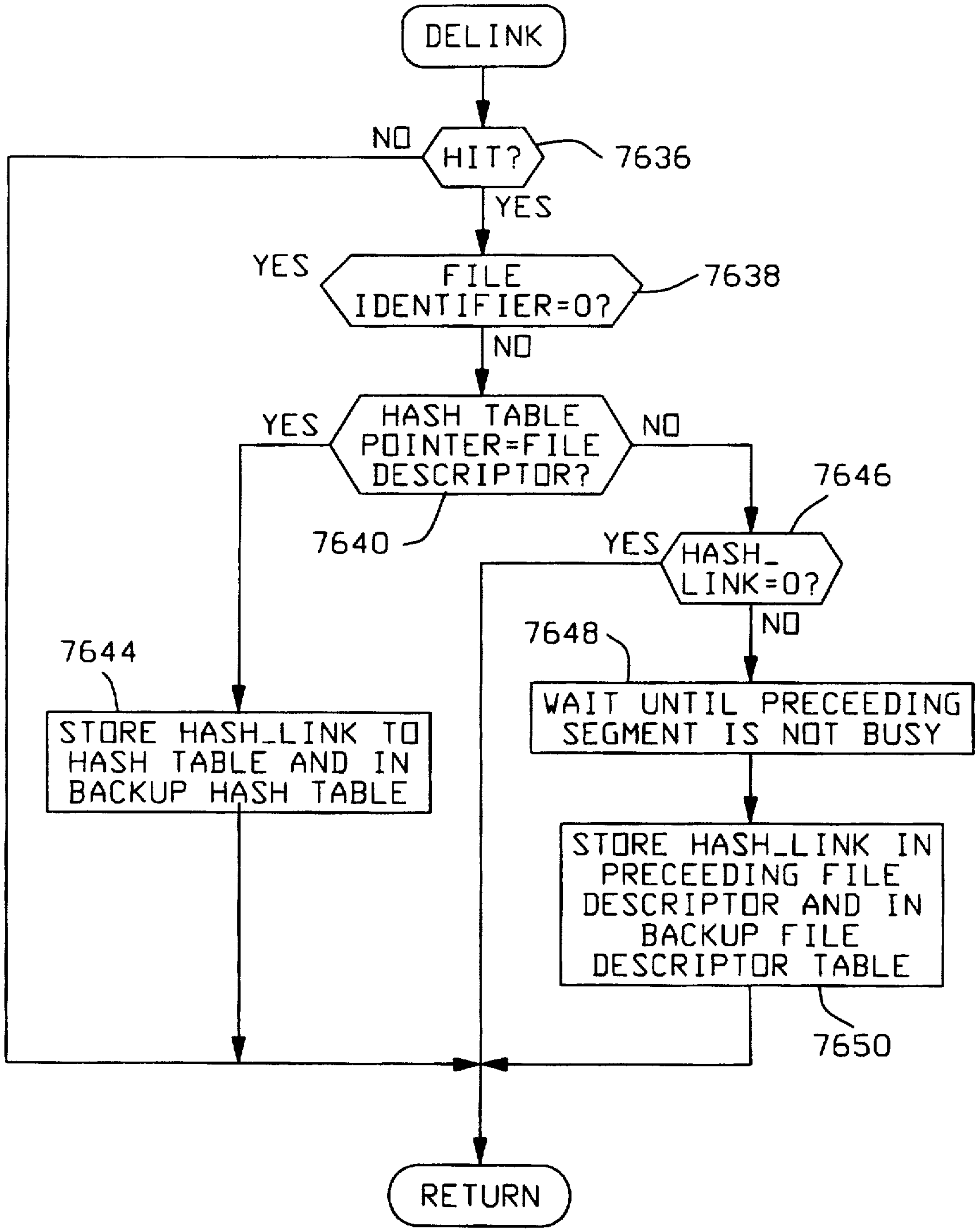
Figure 129:
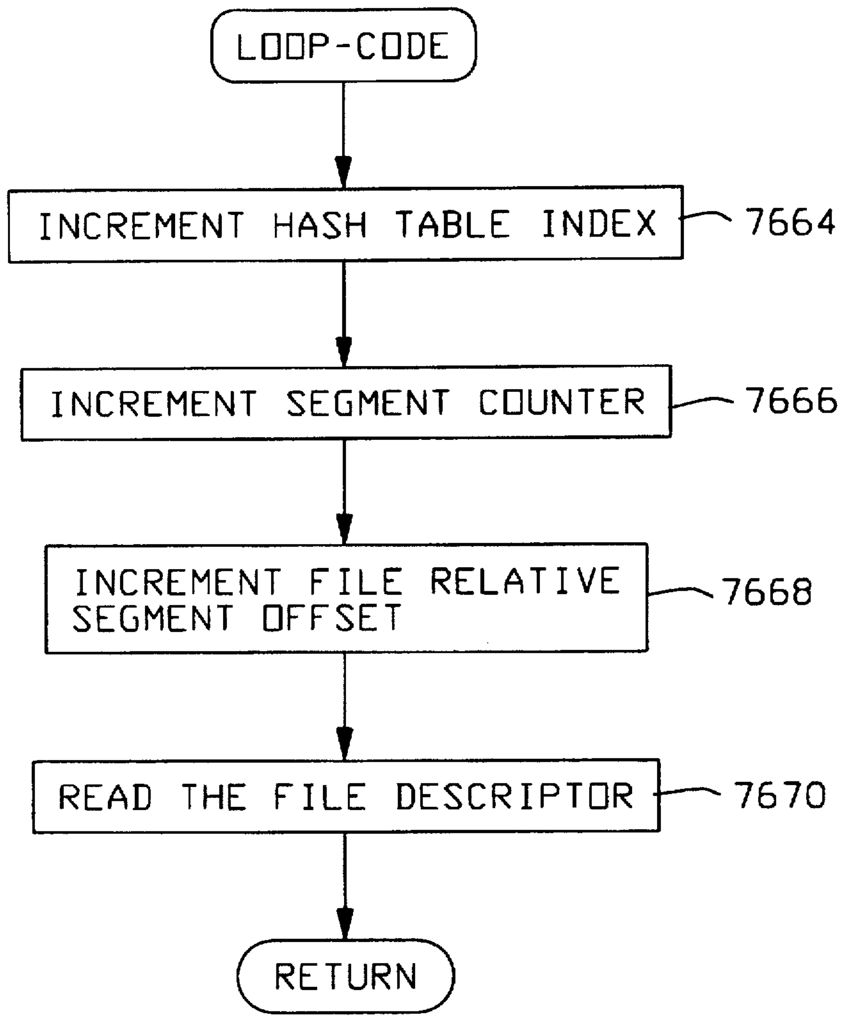
Figure 130A:
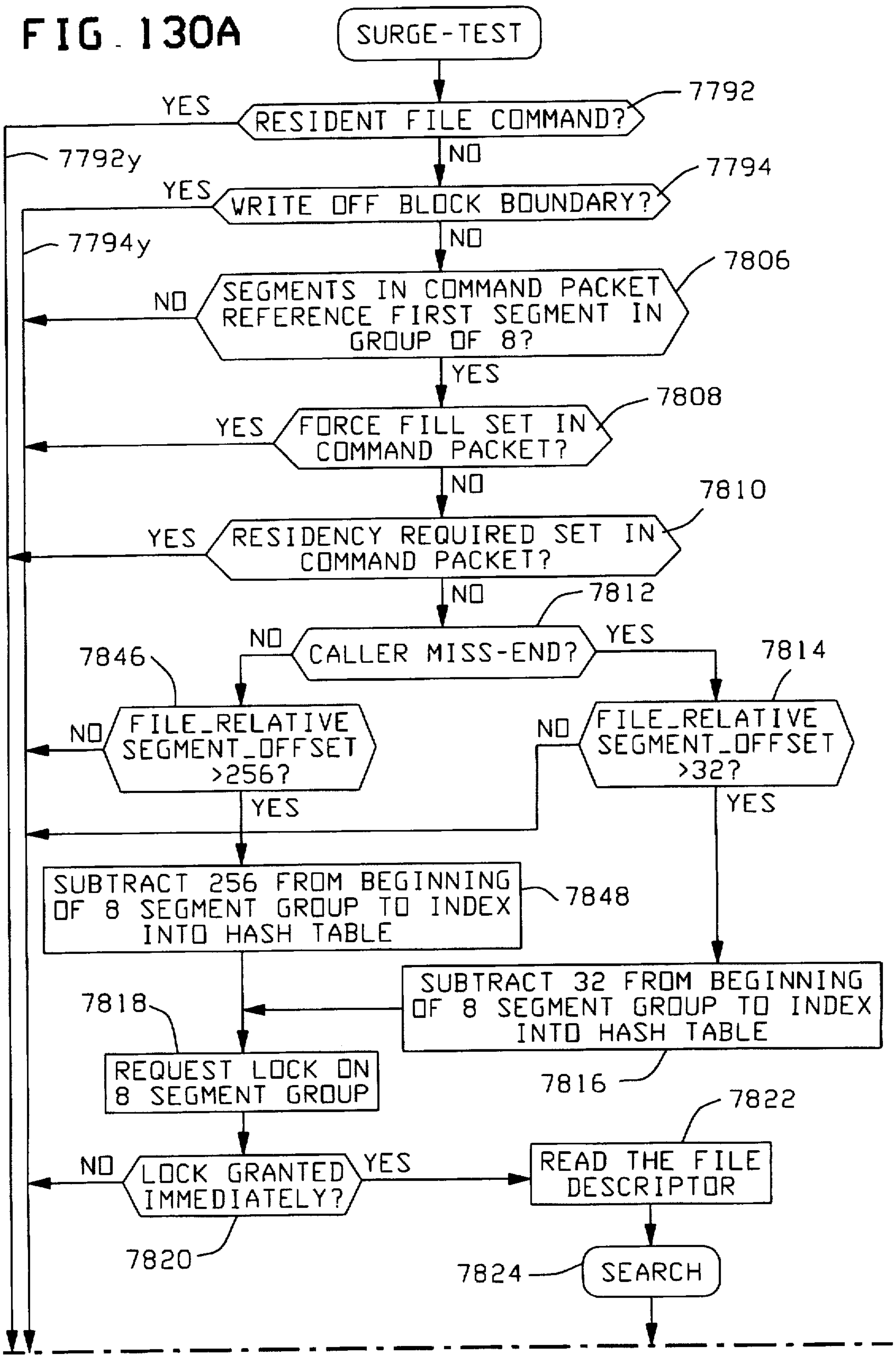
Figure 130B:
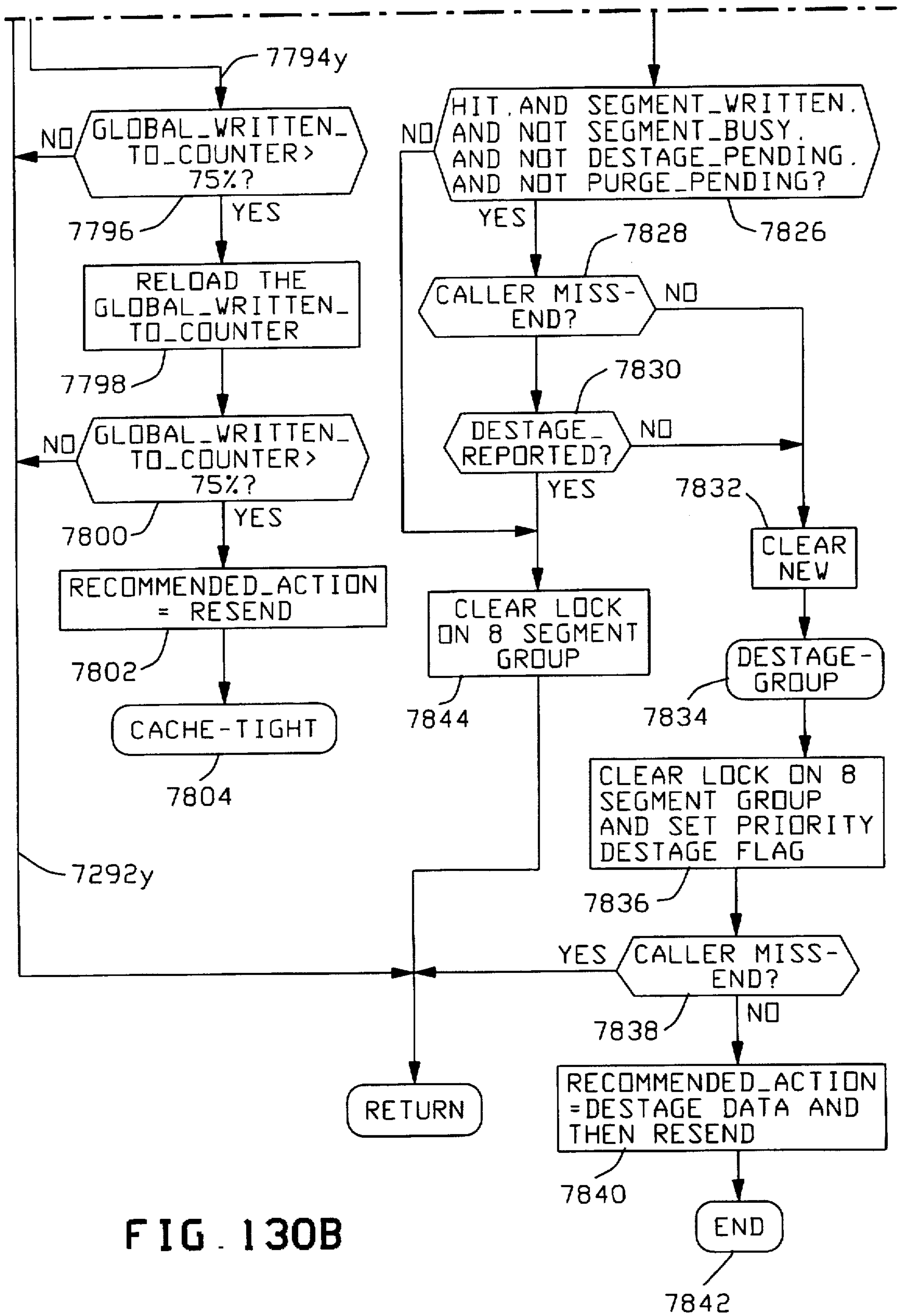
Figure 131:
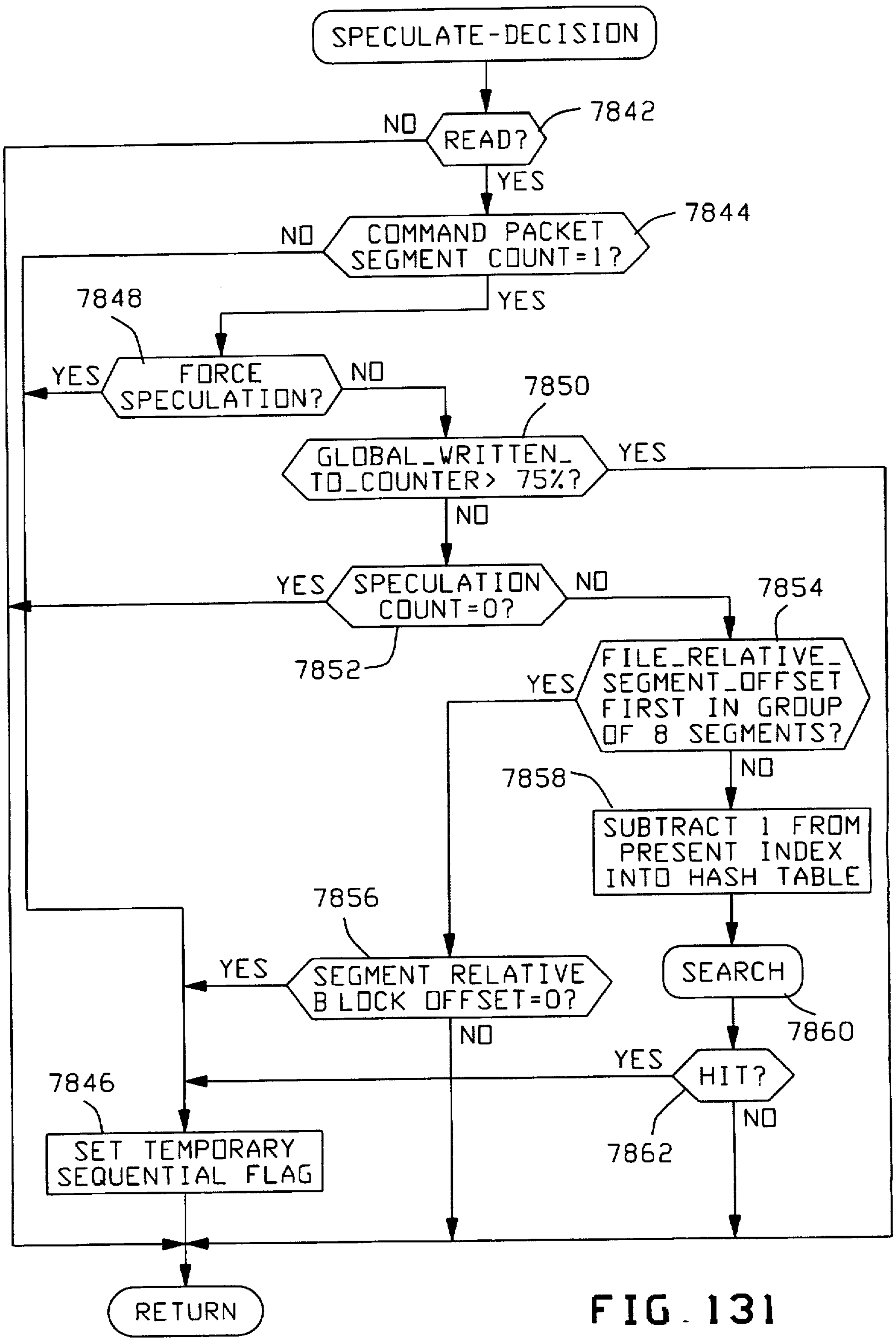
Figure 132A:
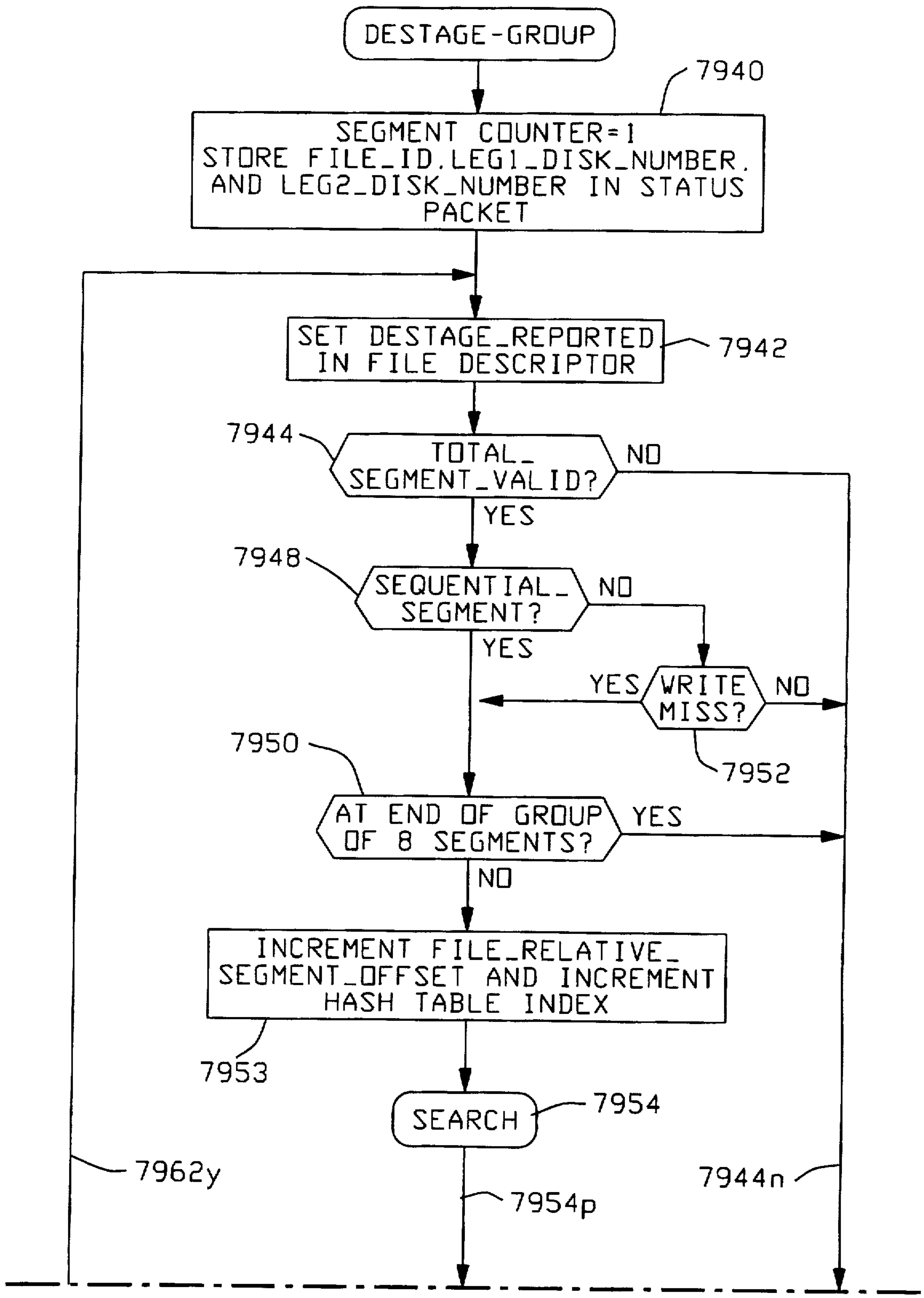
Figure 132B:
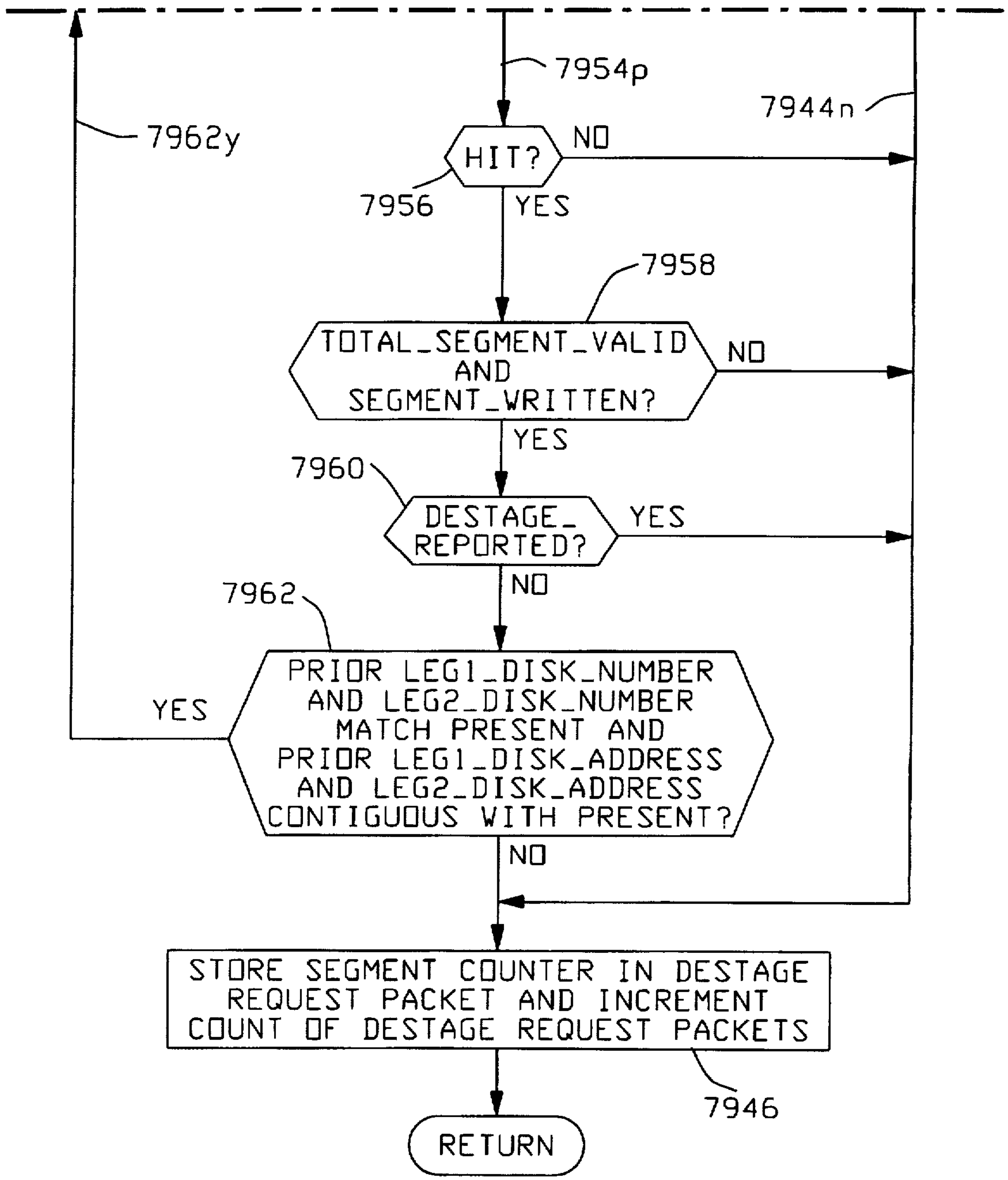
Figure 133:
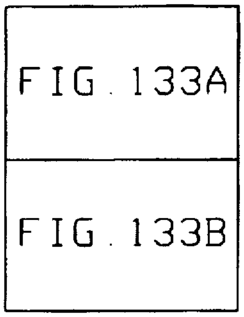
Figure 142:
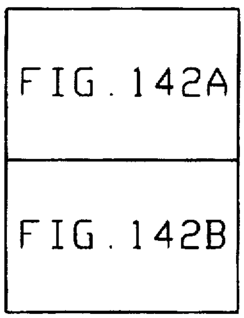
Figure 144:
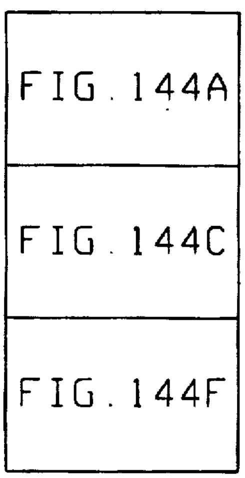
Figure 139:
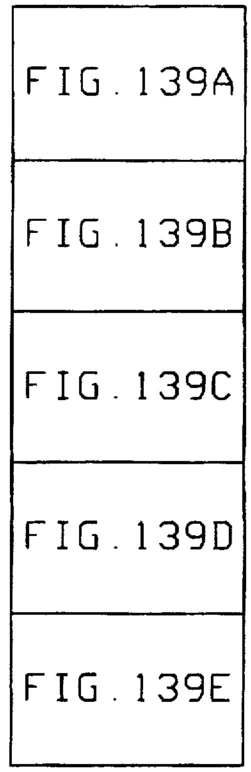
Figure 148:
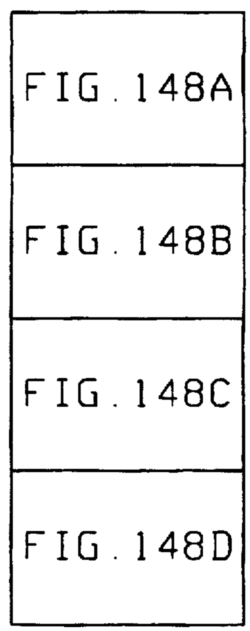
Figure 133A:
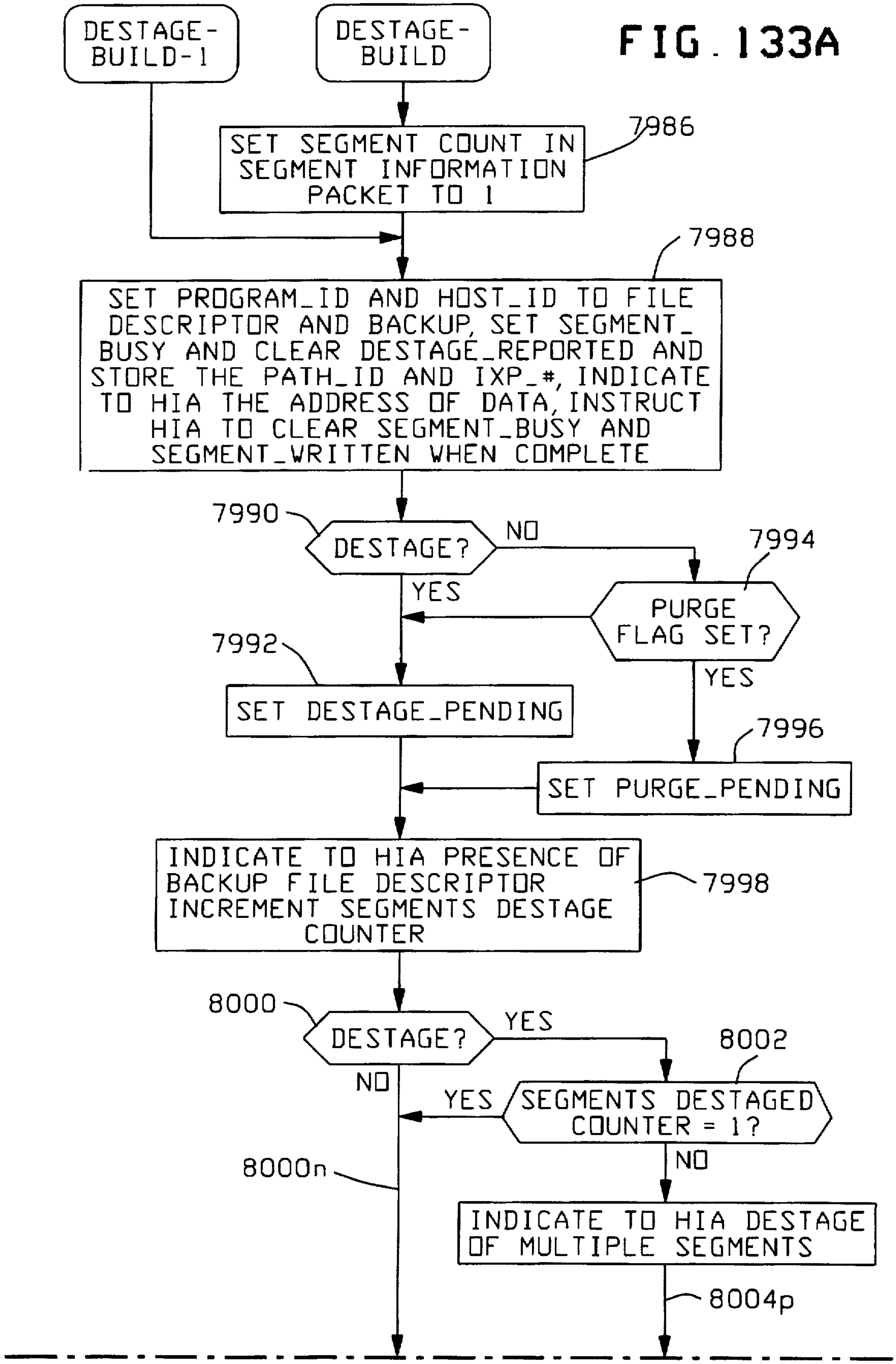
Figure 133B:
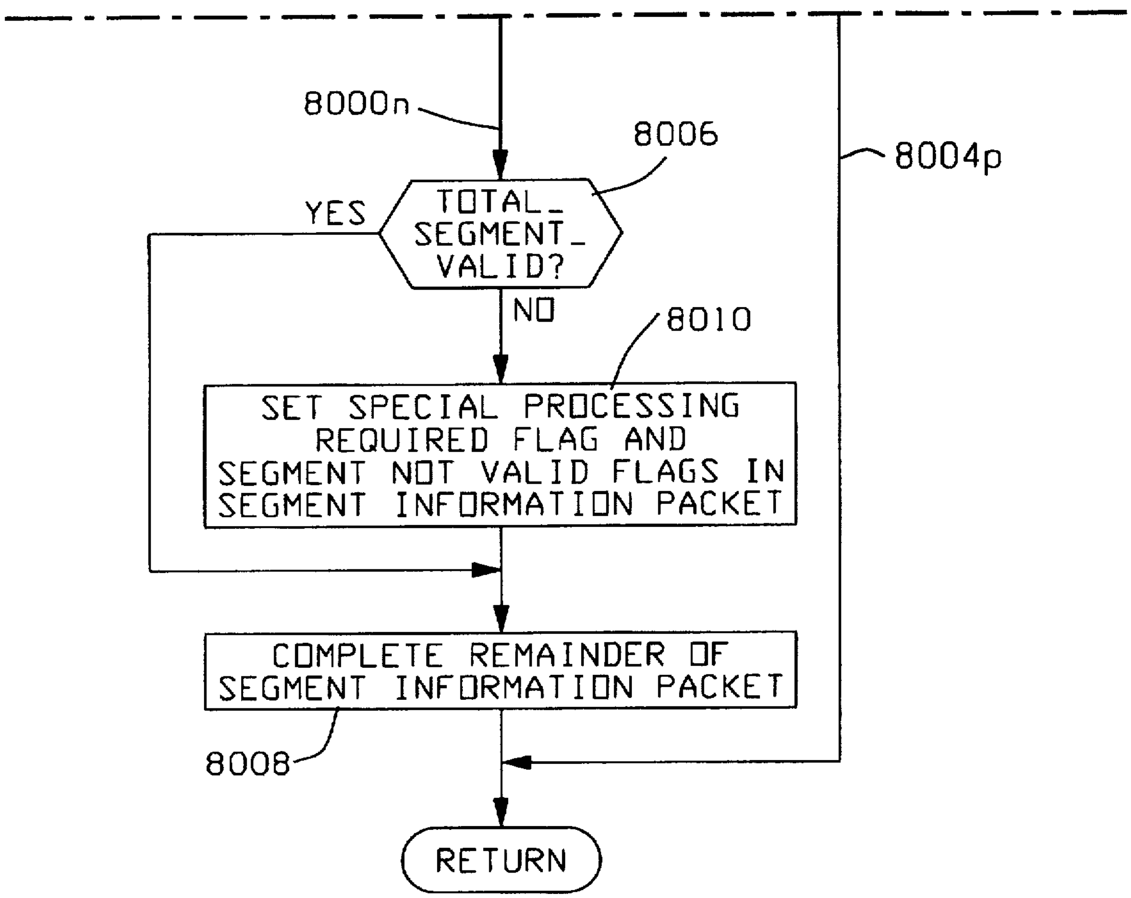
Figure 134:
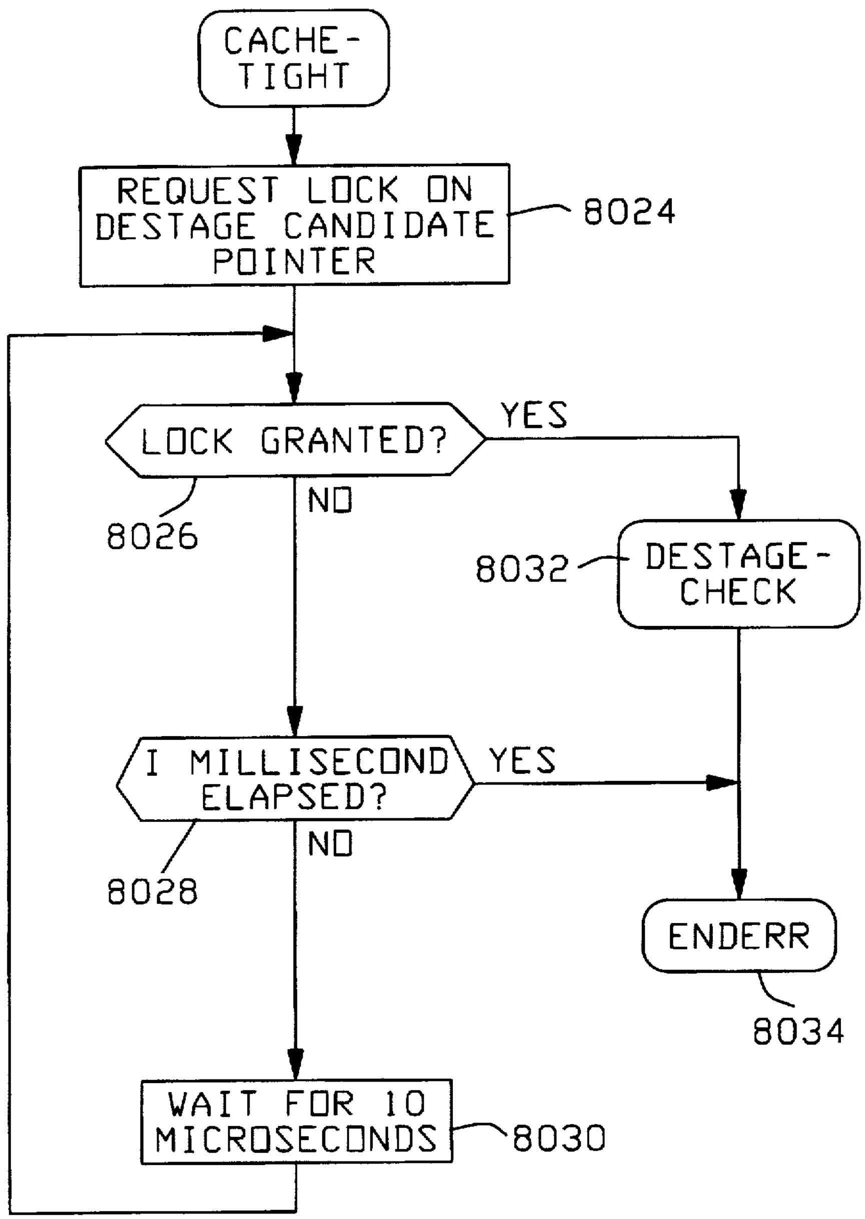
Figure 135:
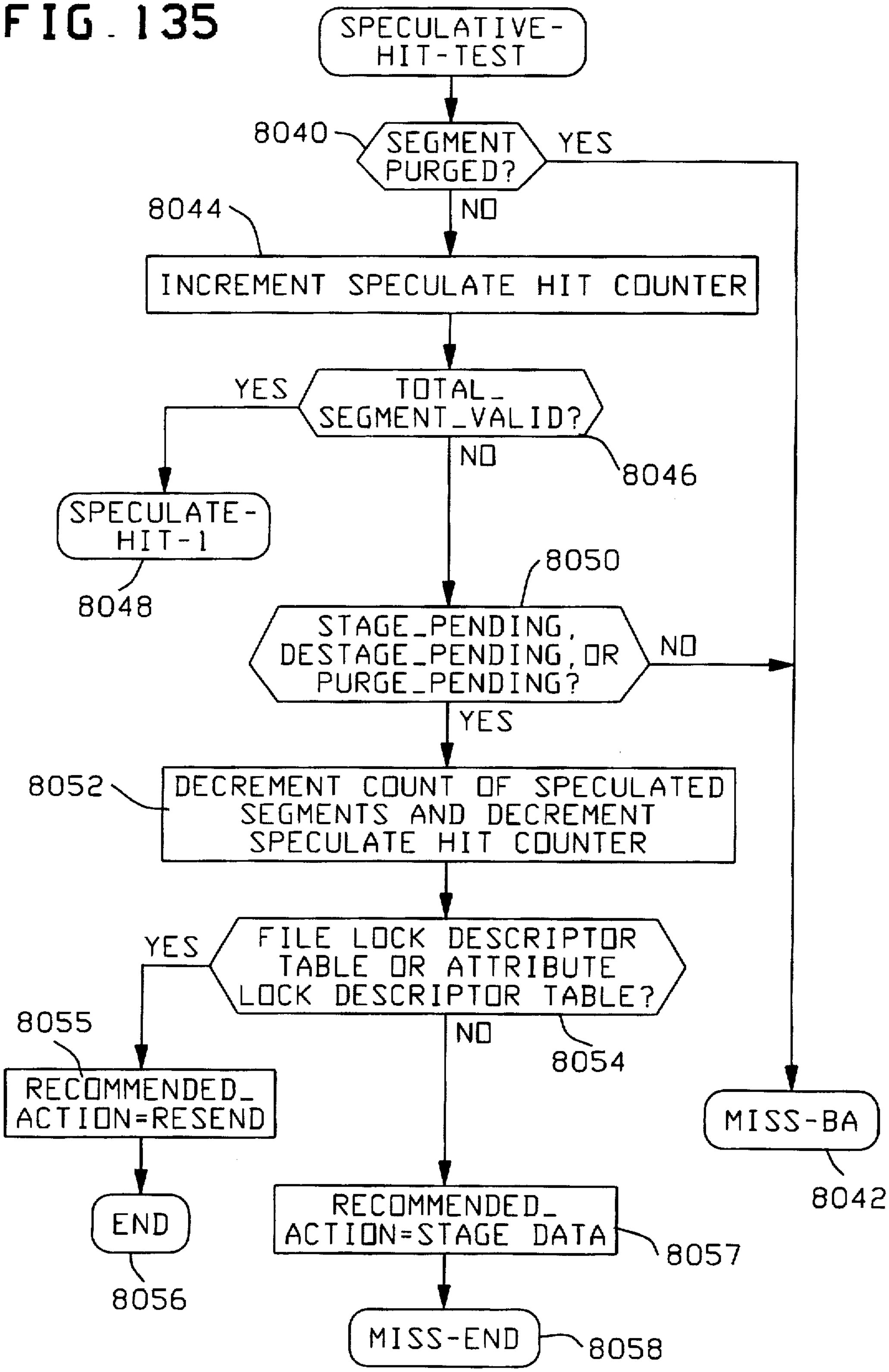
Figure 136:
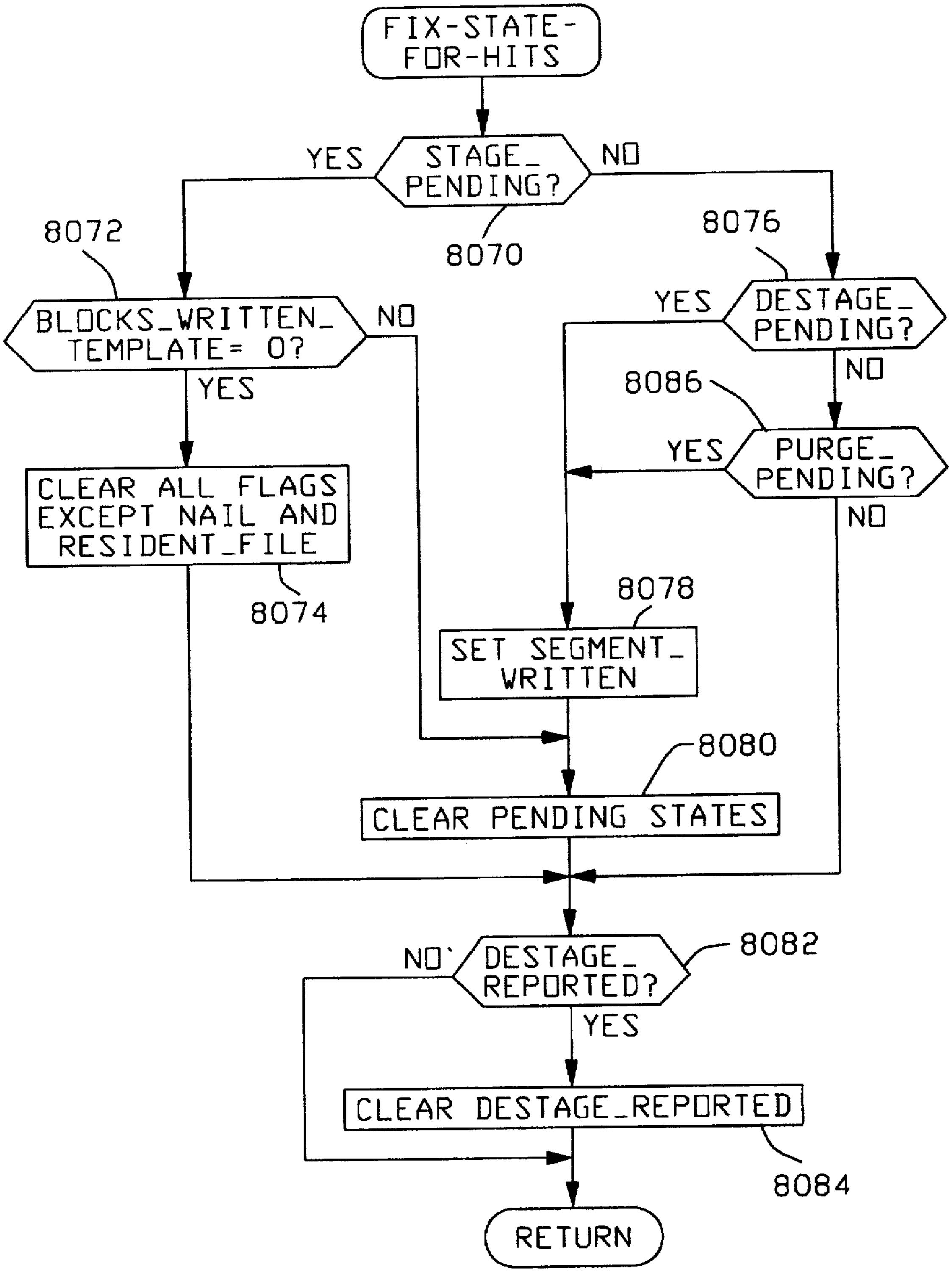
Figure 137:
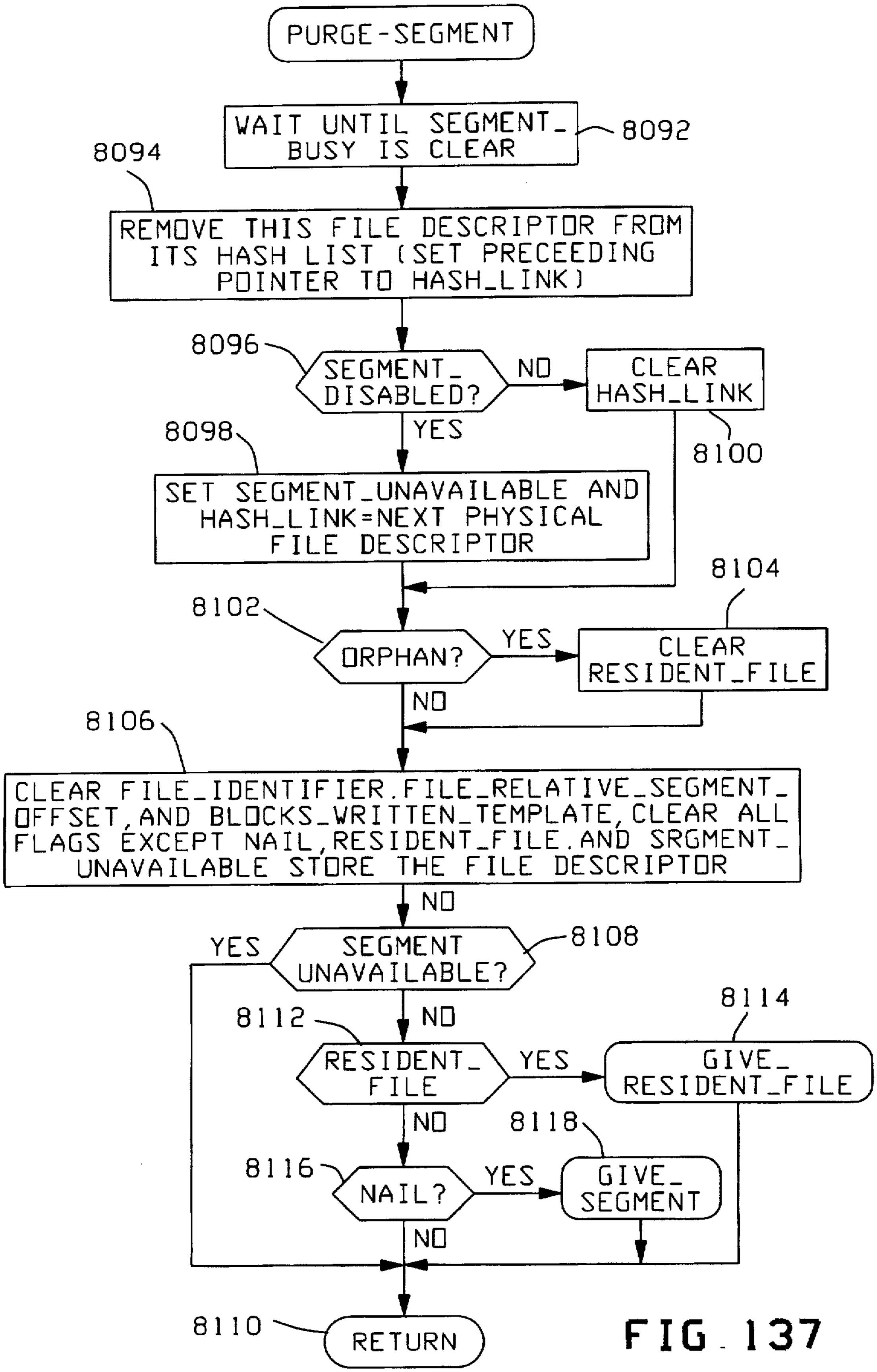
Figure 138:
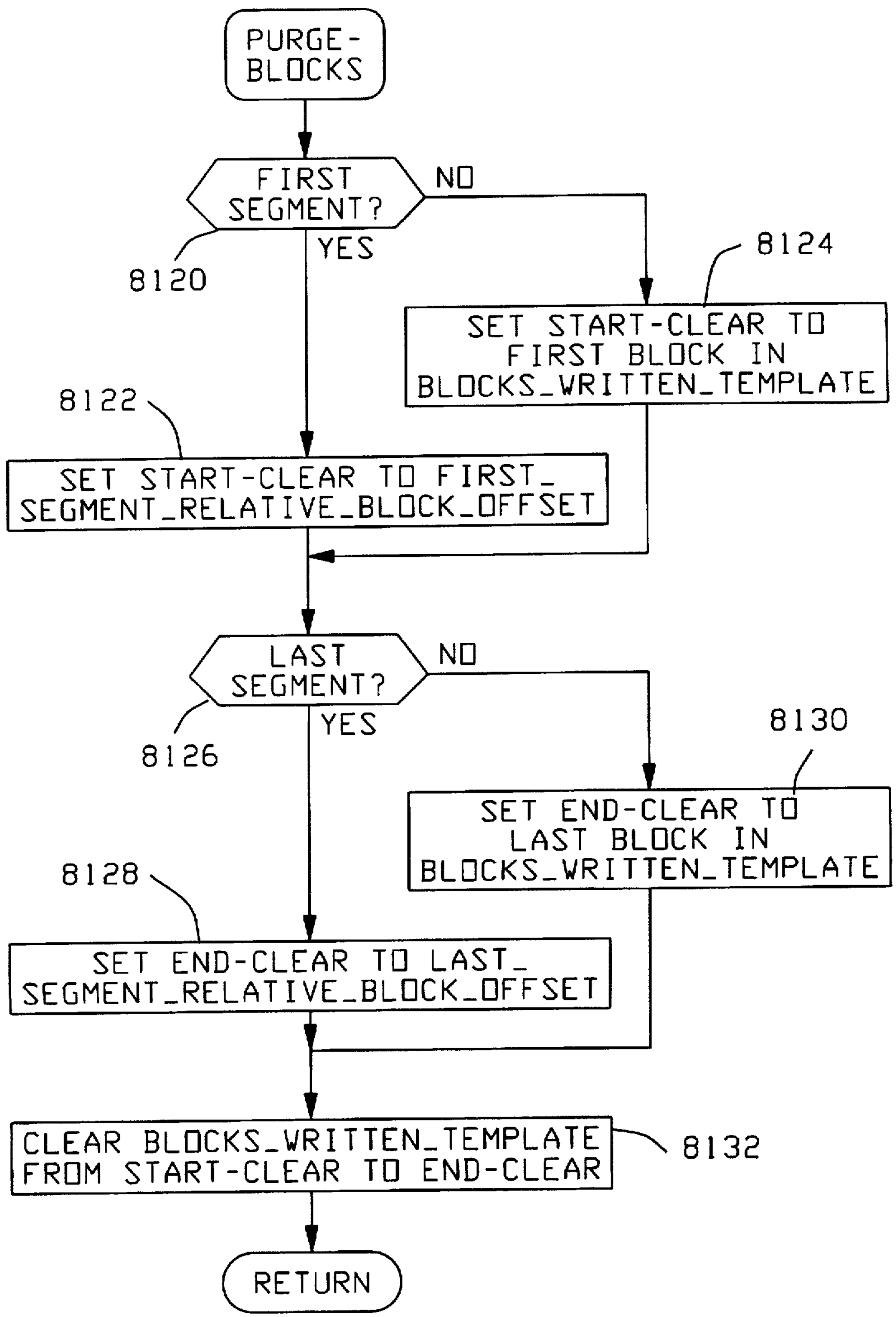
Figure 139A:
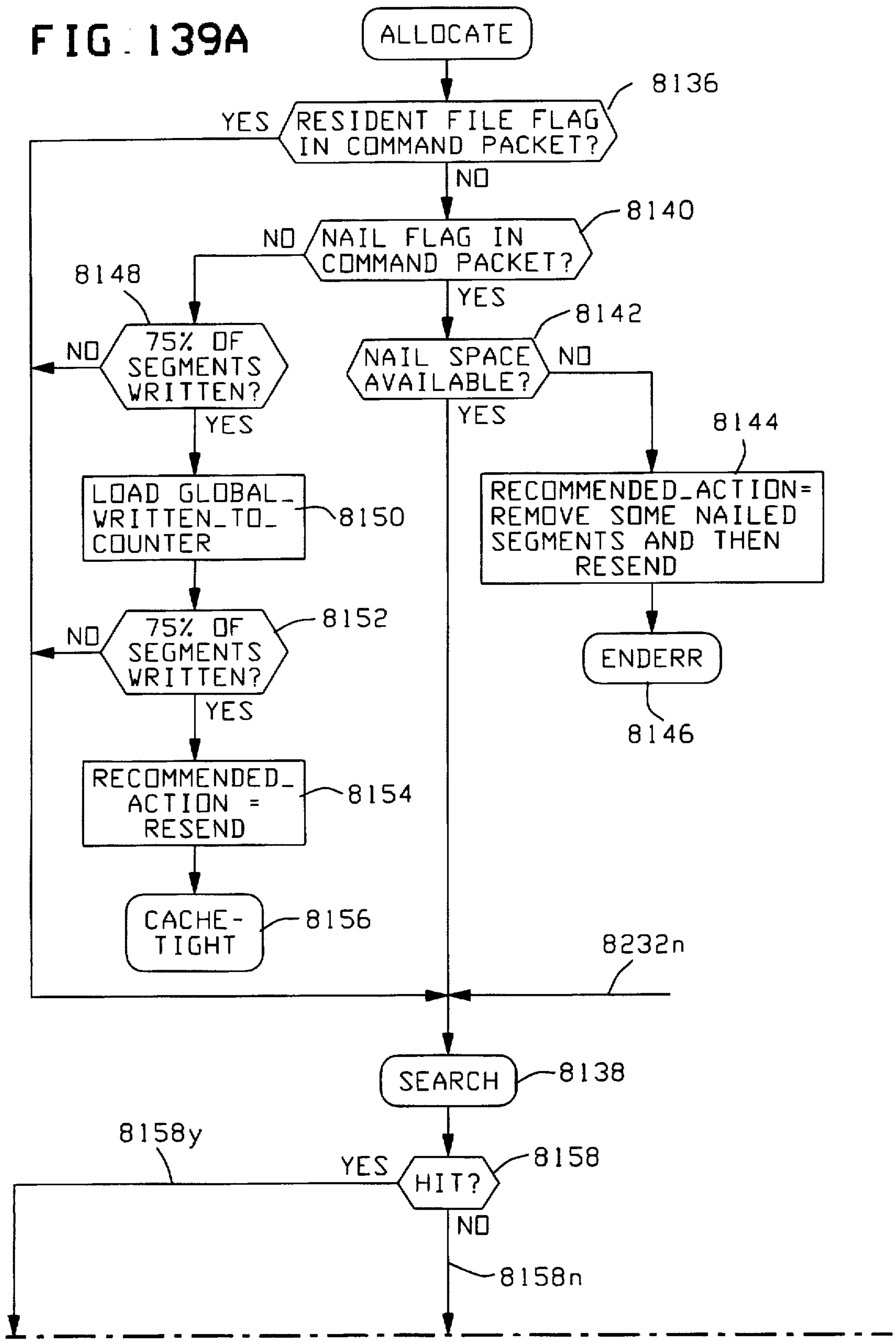
Figure 139B:
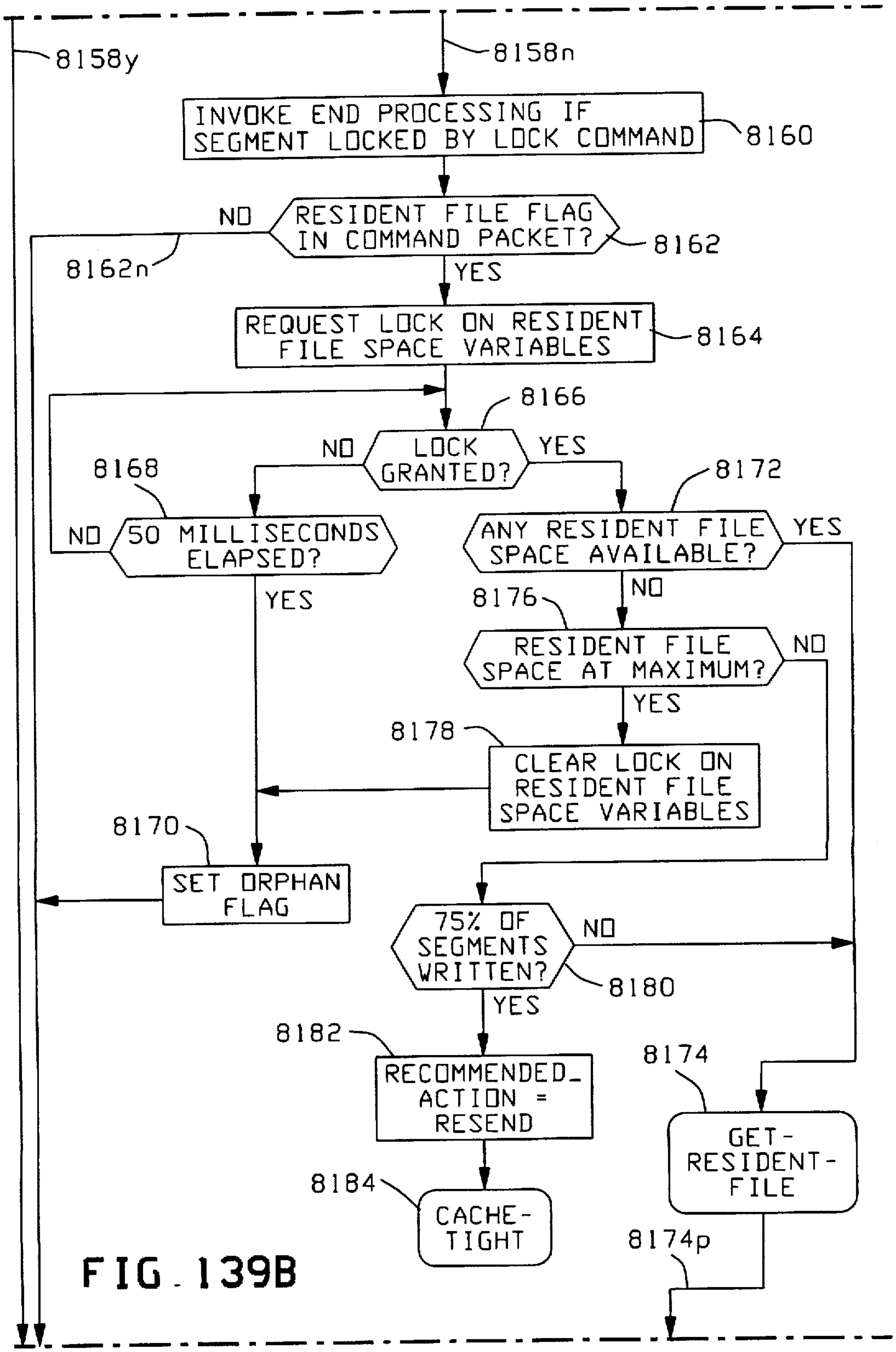
Figure 139C:
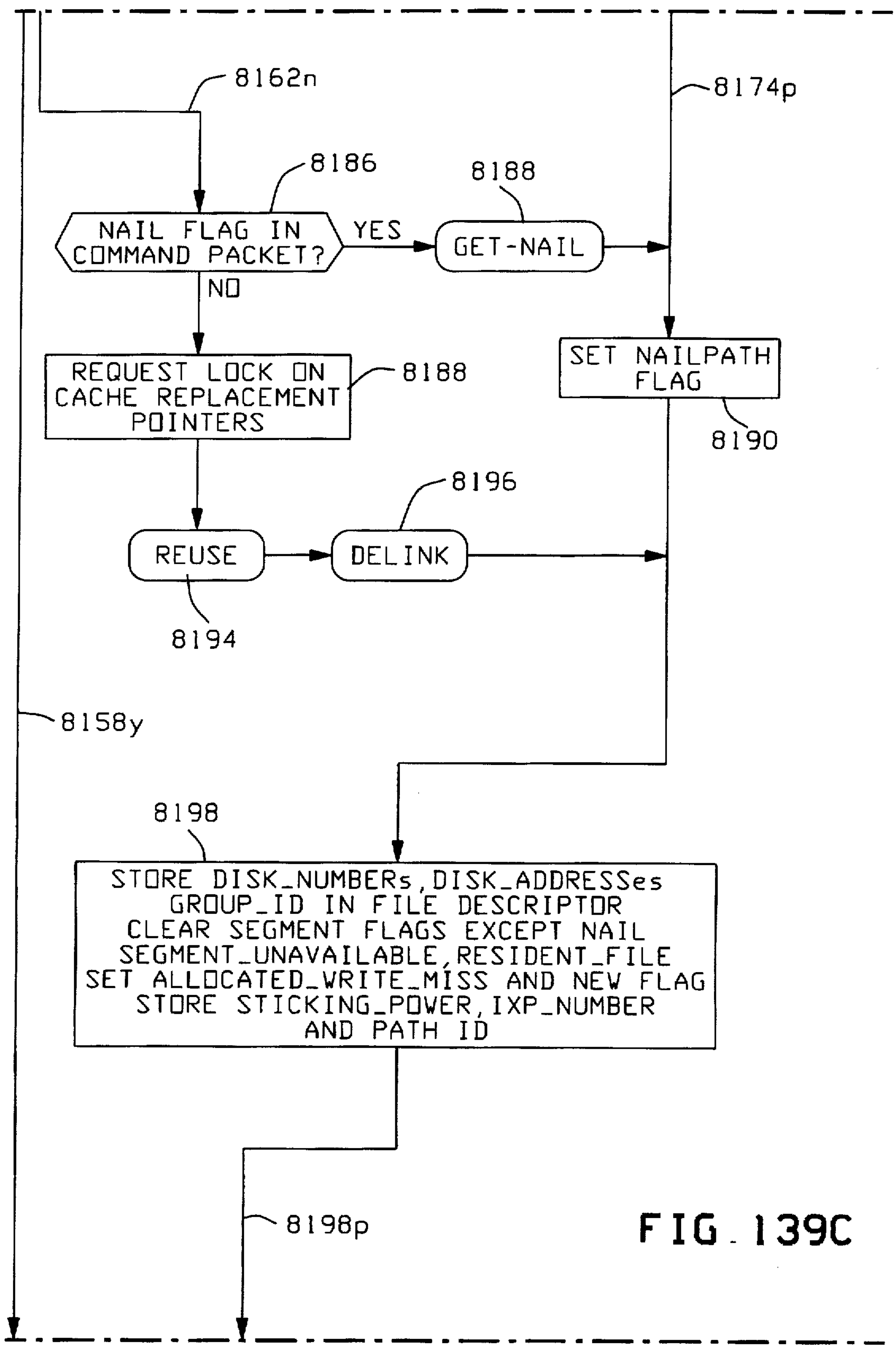
Figure 139D:
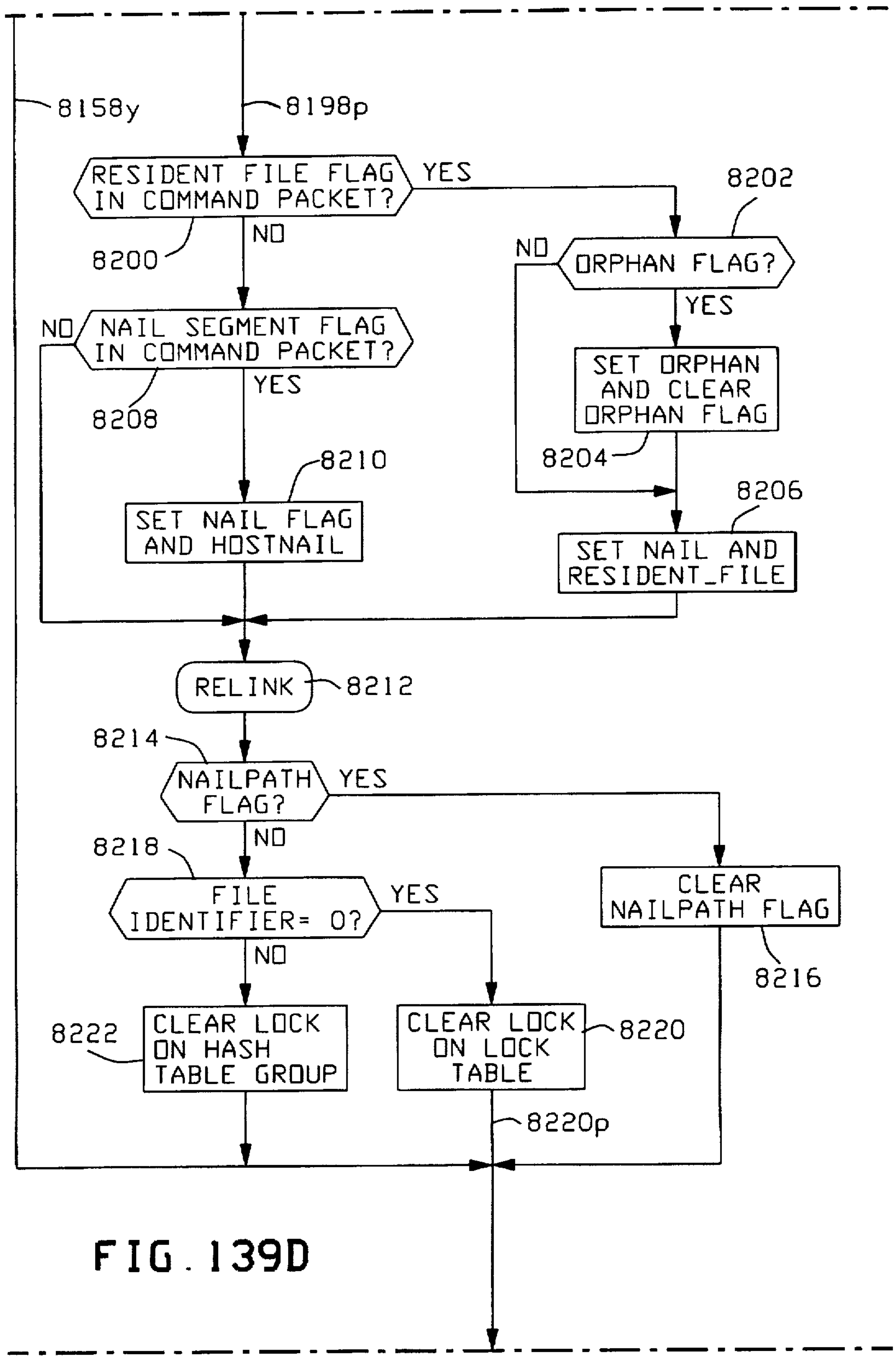
Figure 139E:
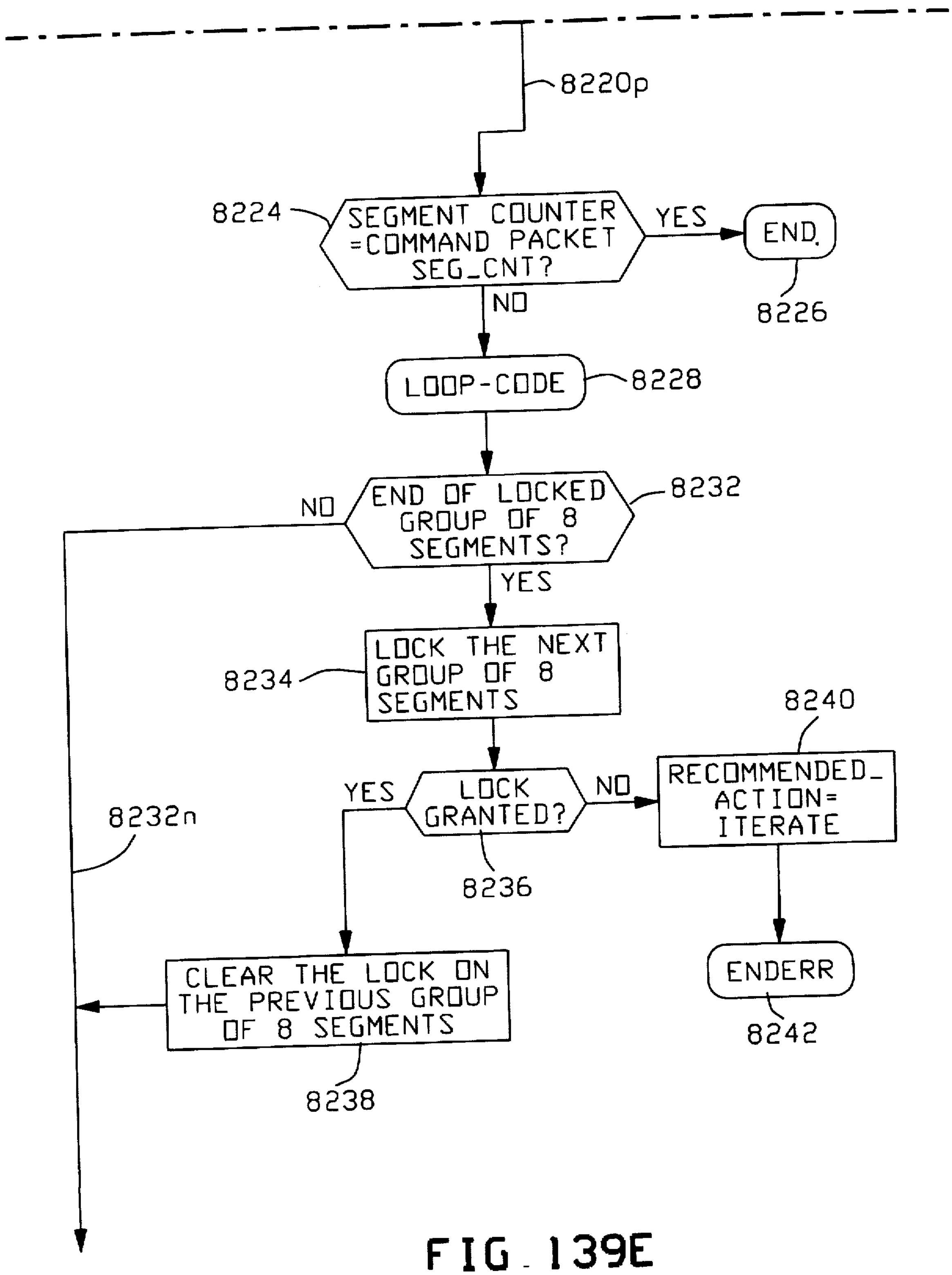
Figure 140:
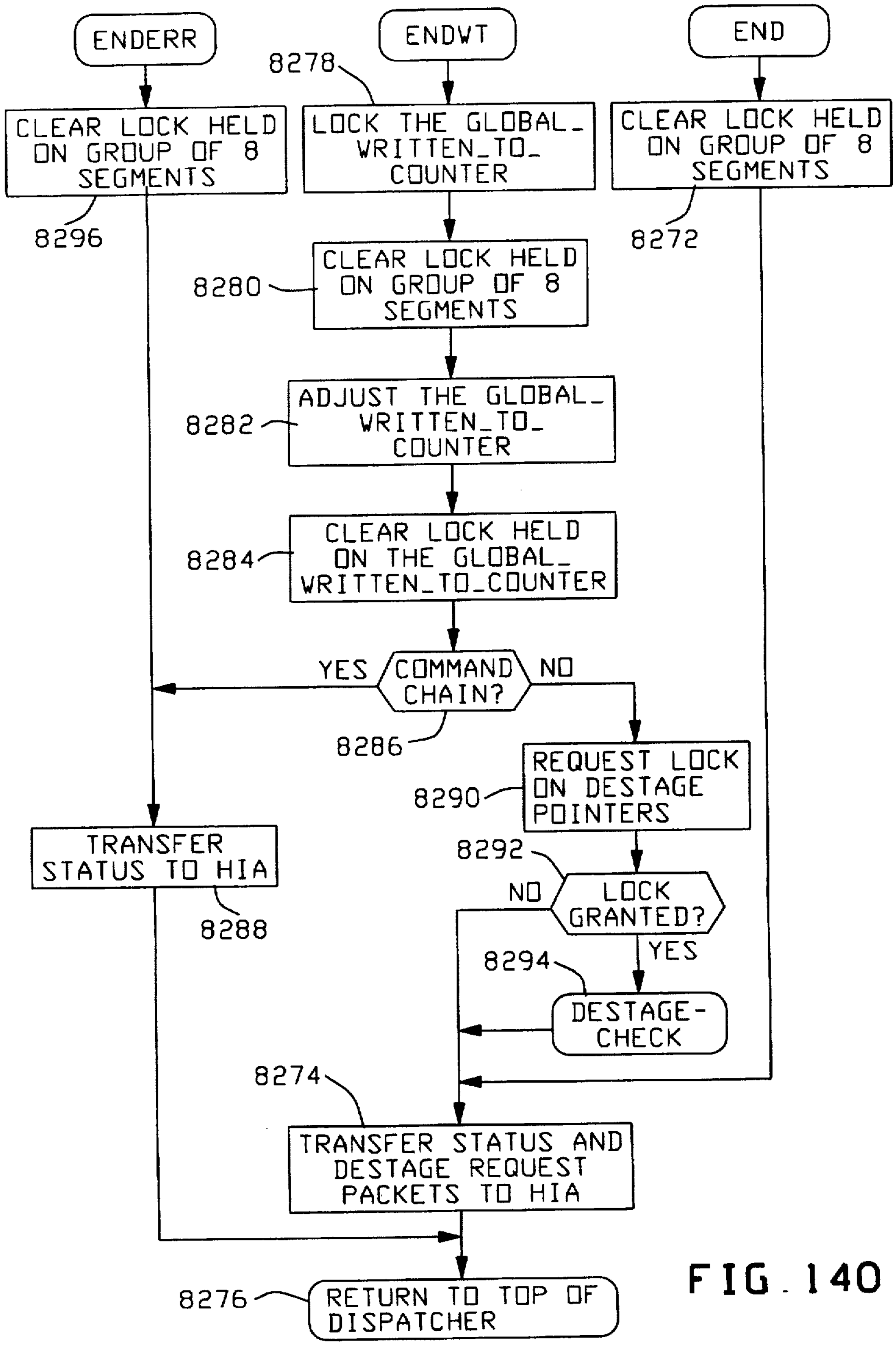
Figure 141:
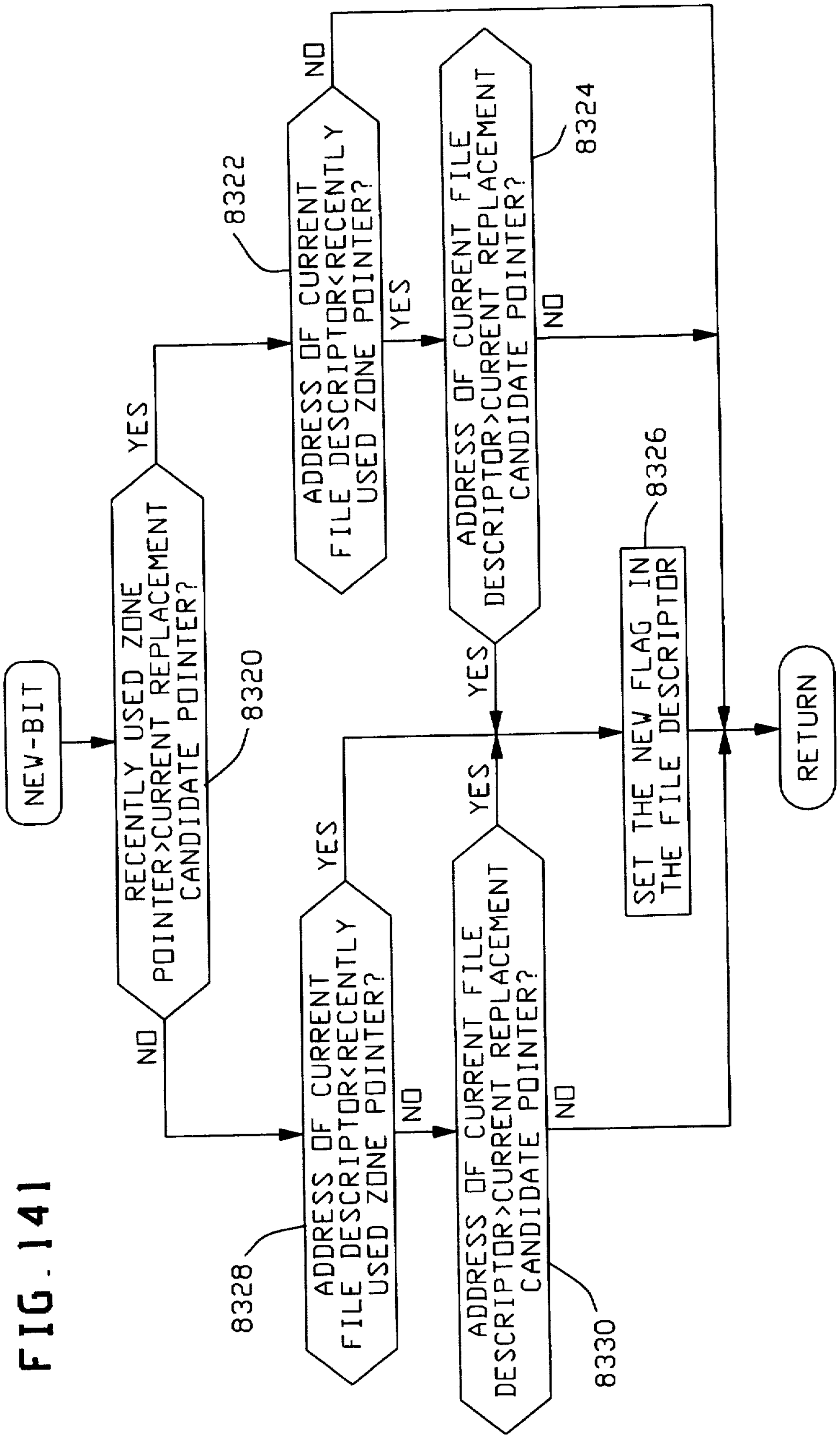
Figure 142A:
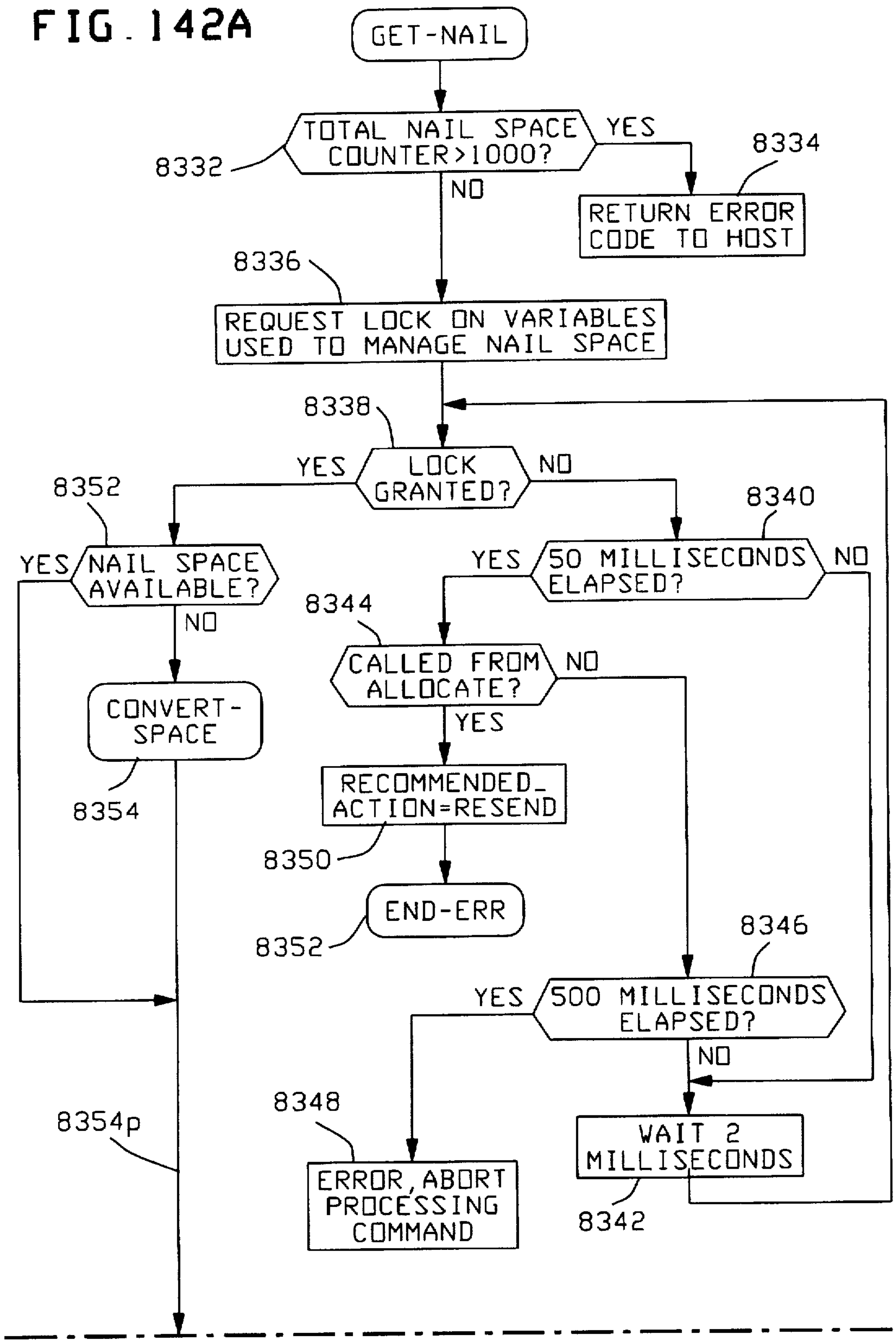
Figure 142B:
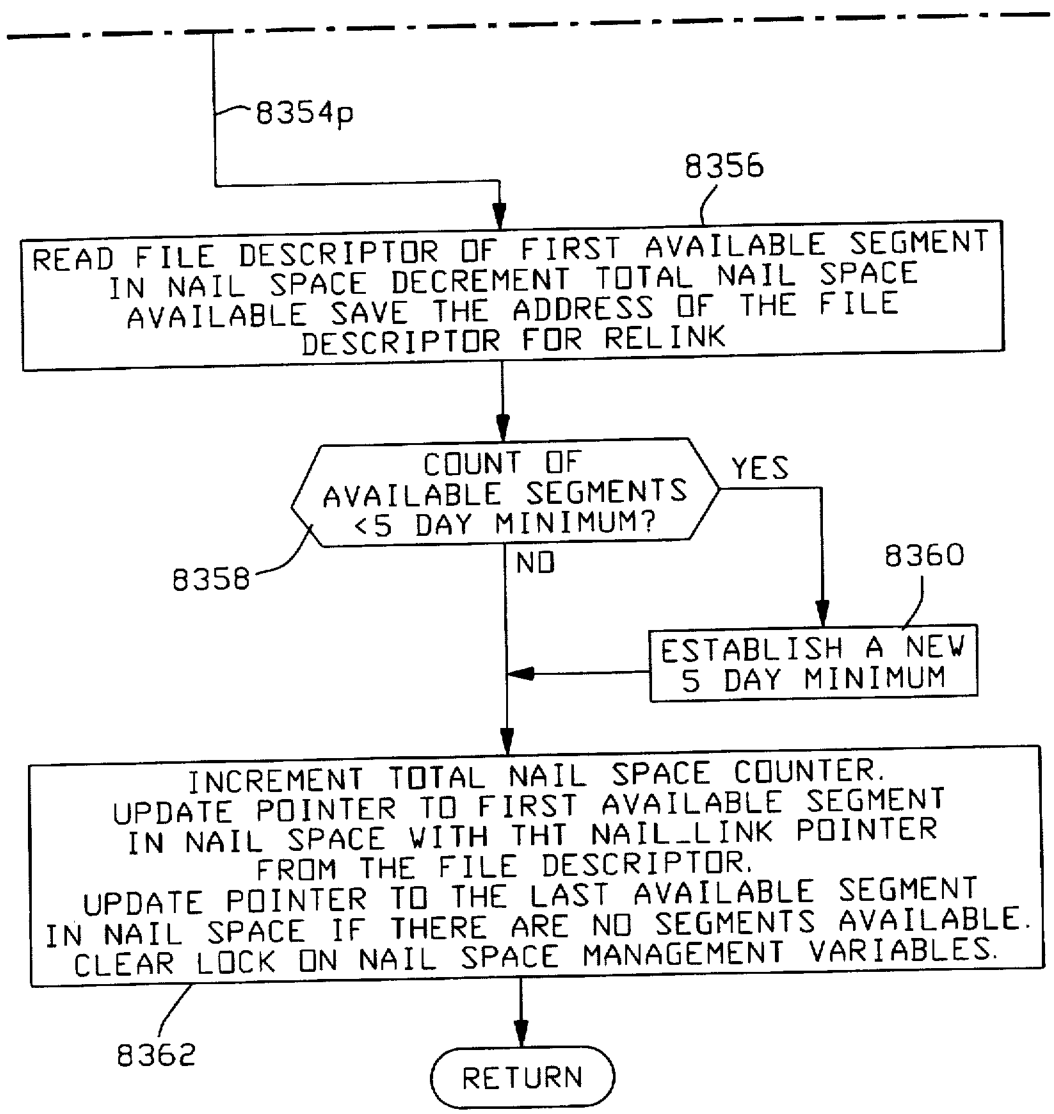
Figure 143:
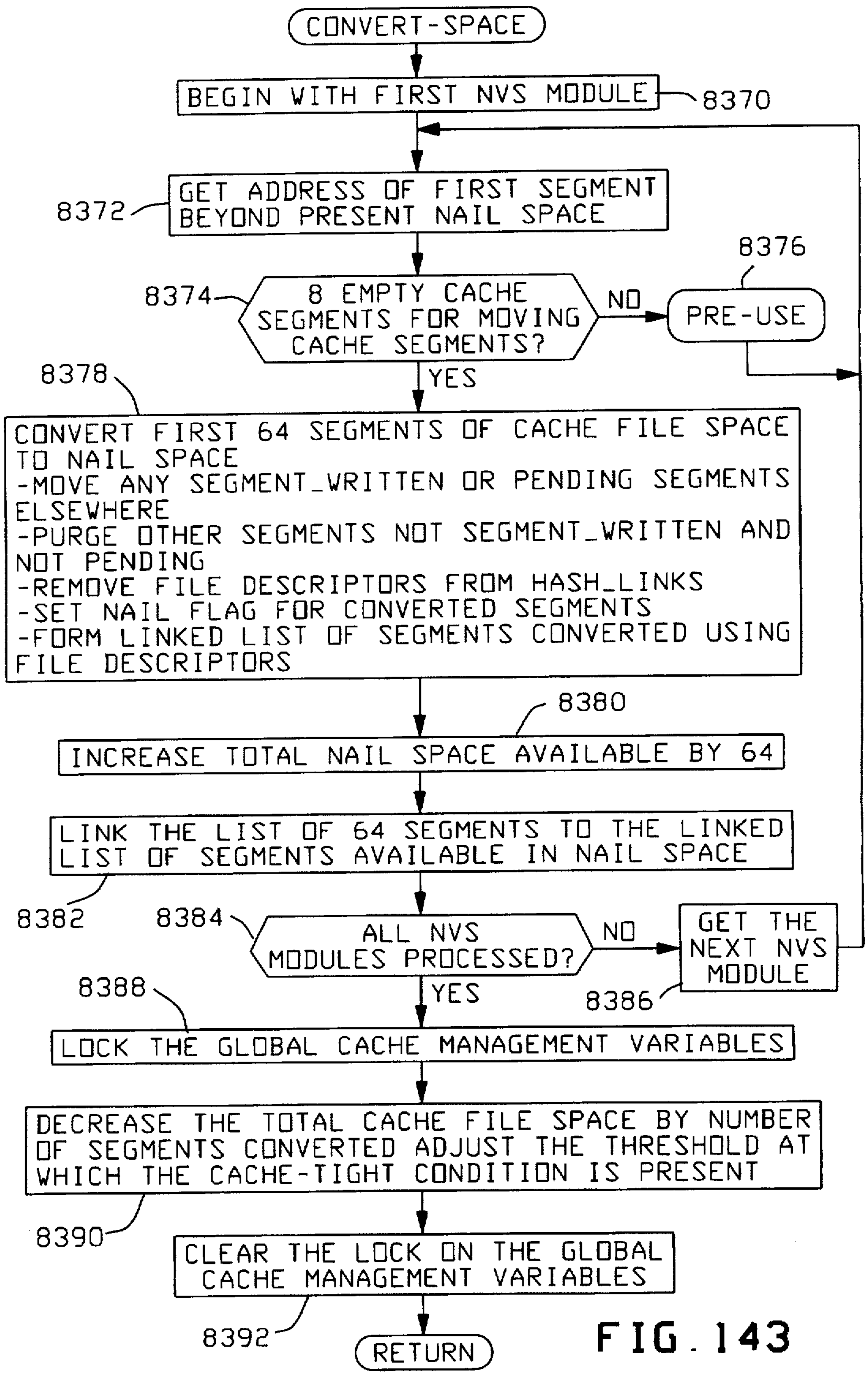
Figure 144A:
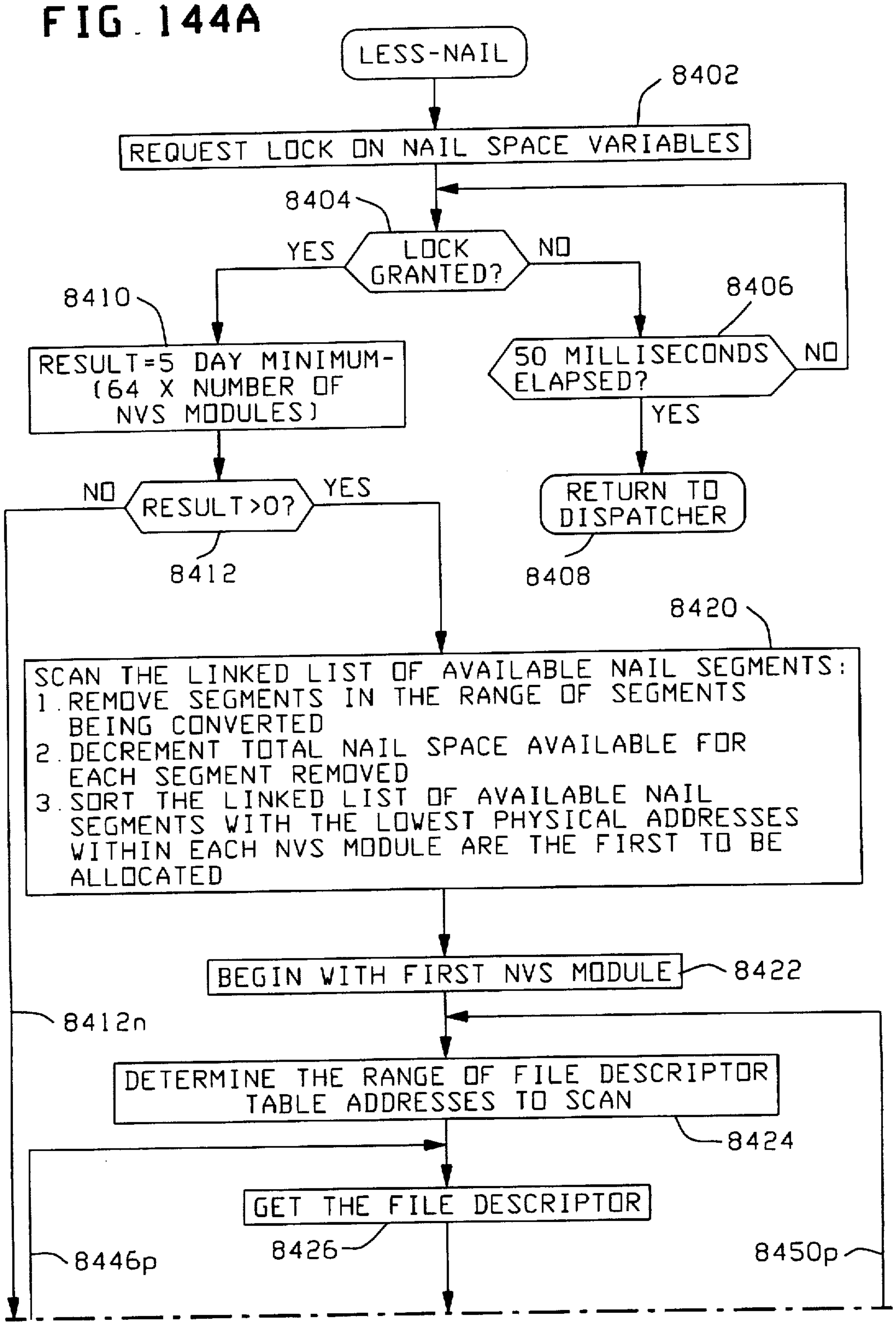
Figure 144B:
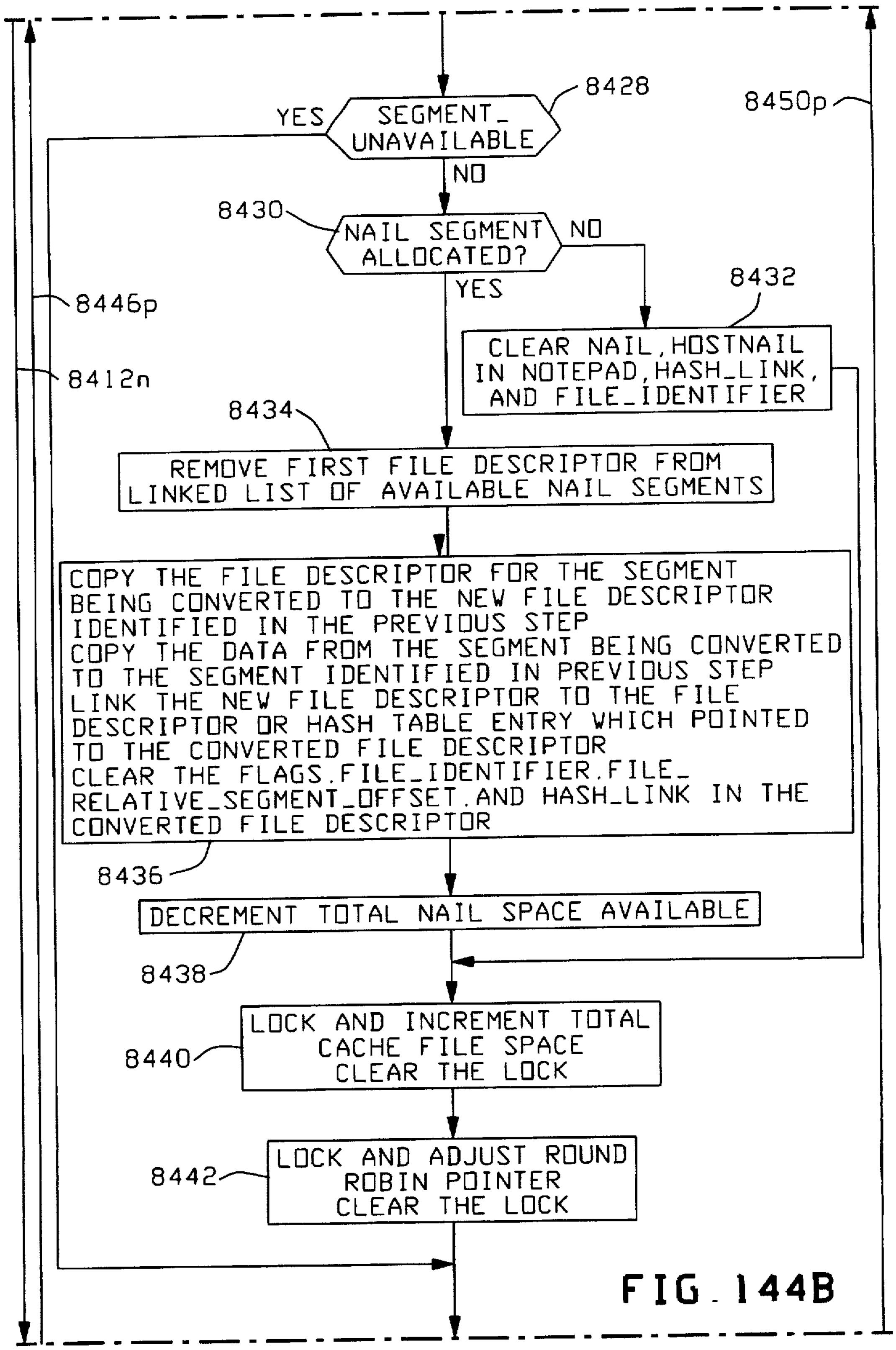
Figure 144C:
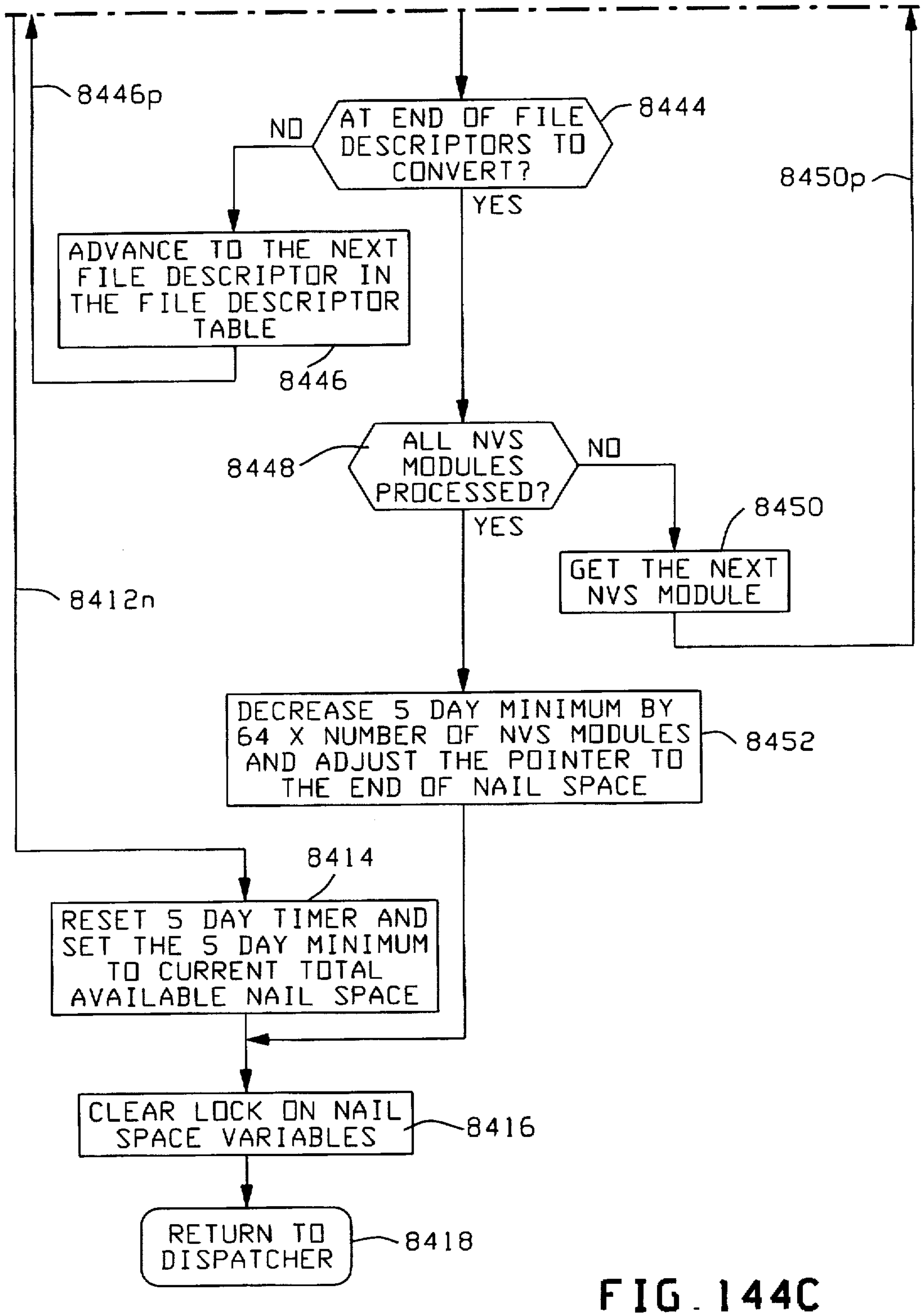
Figure 145:
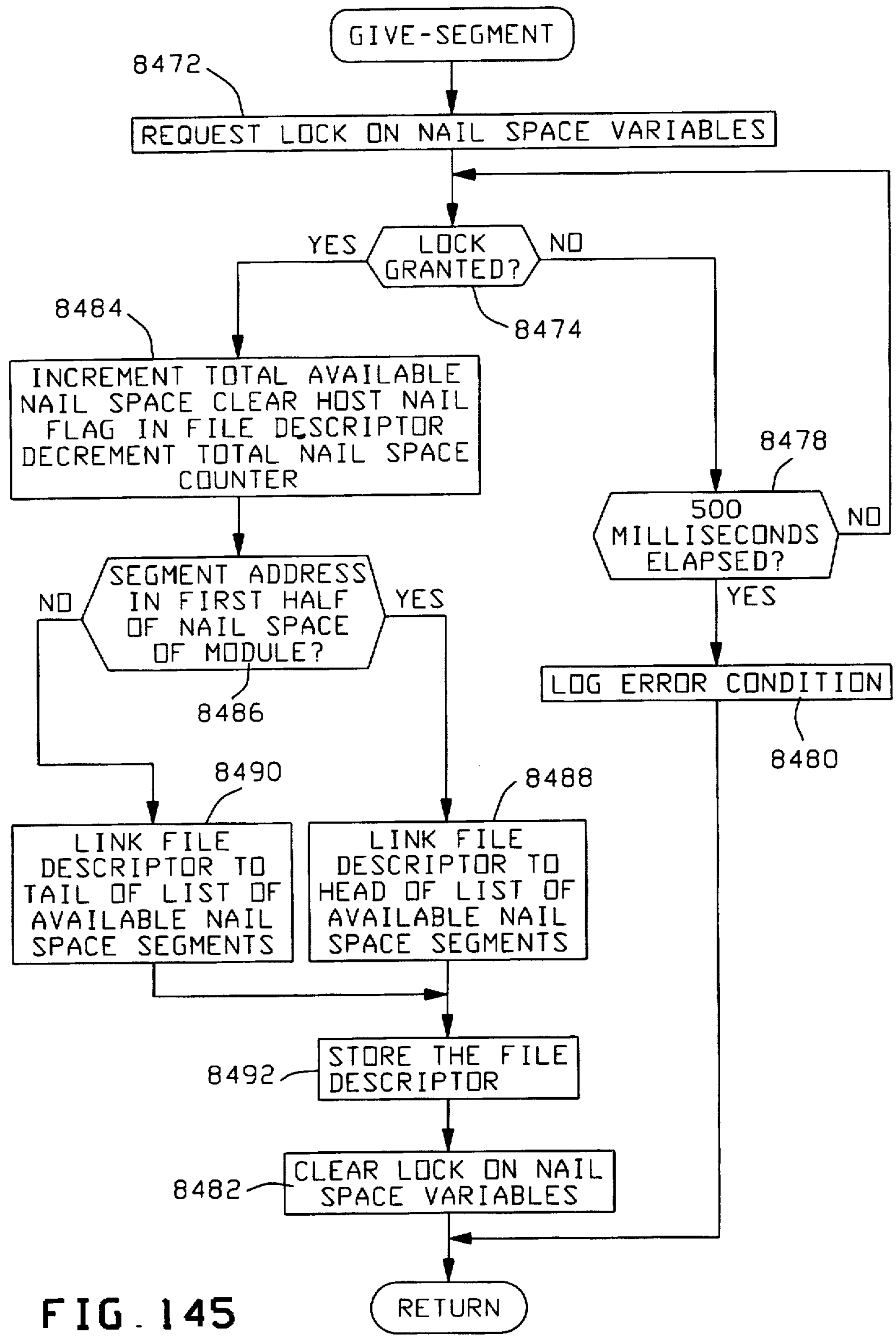
Figure 146:
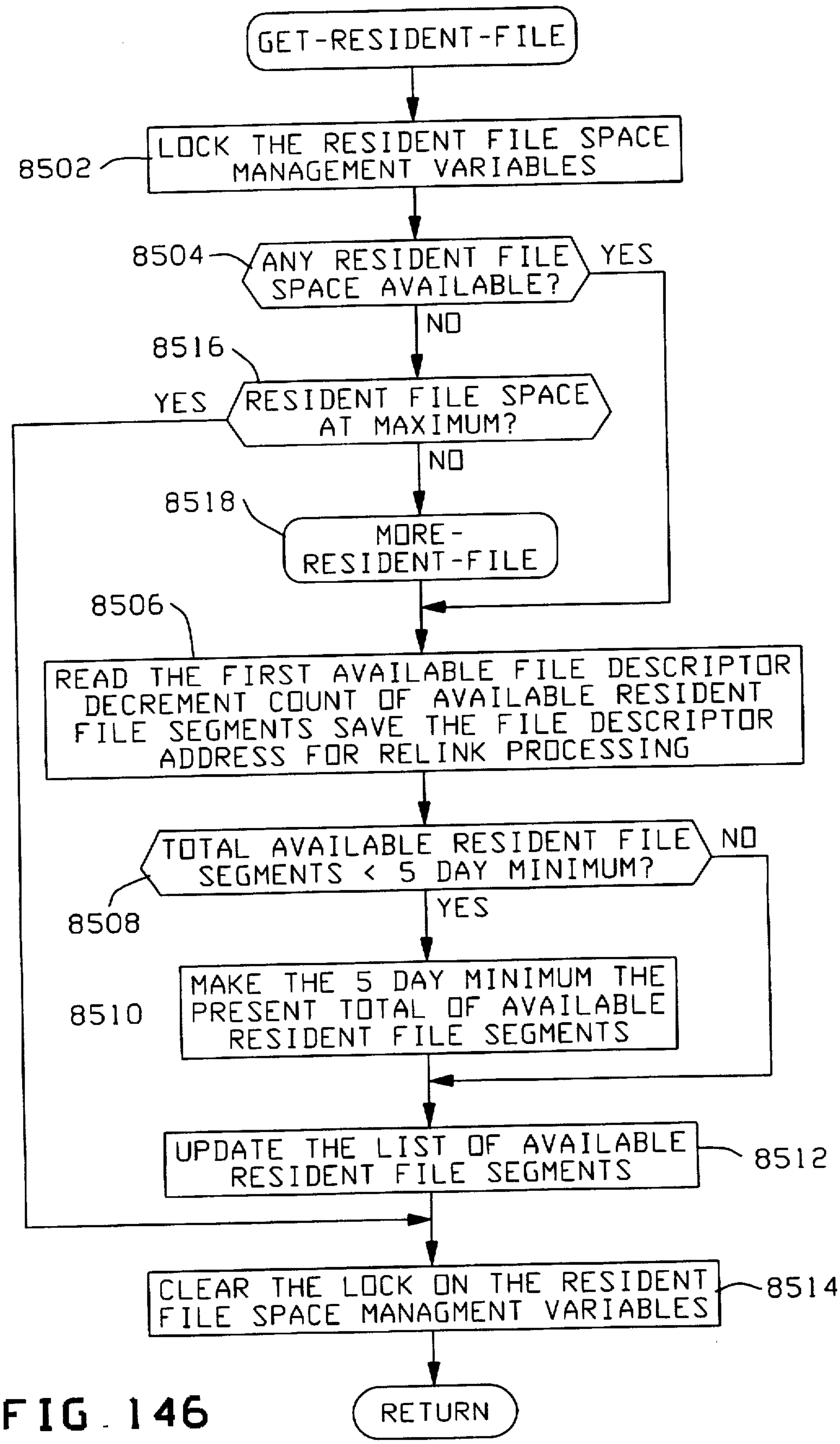
Figure 147:
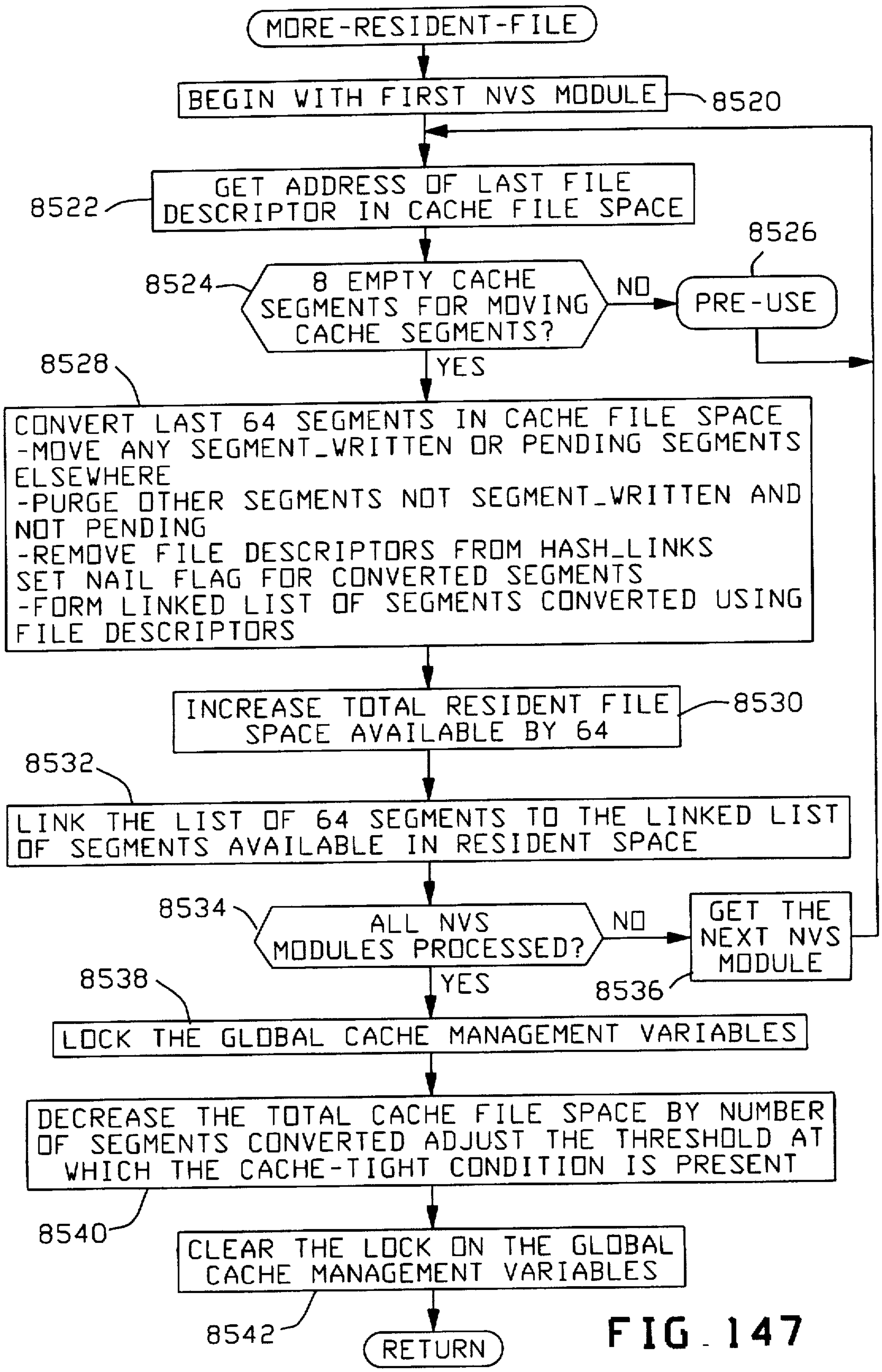
Figure 148A:
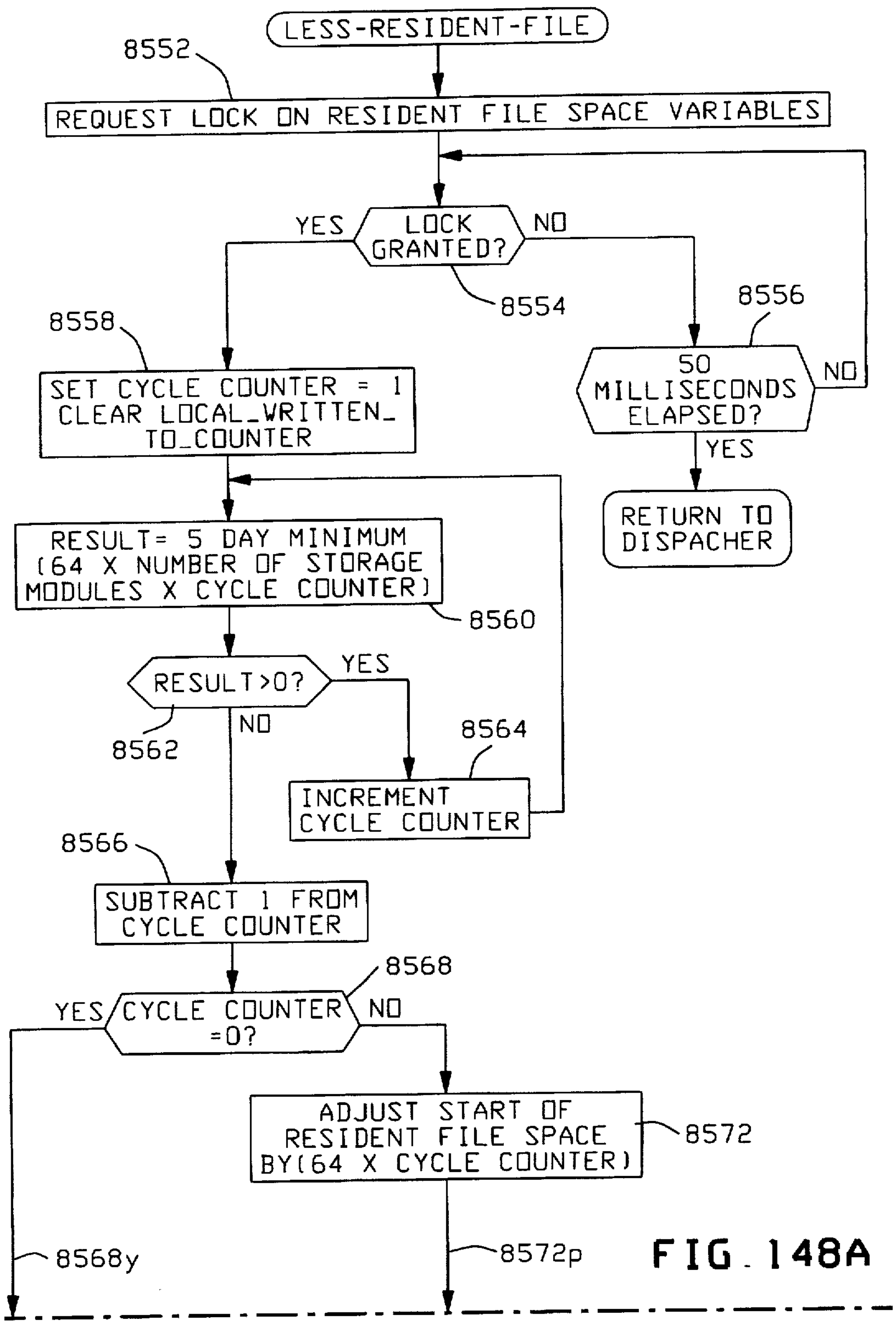
Figure 148B:
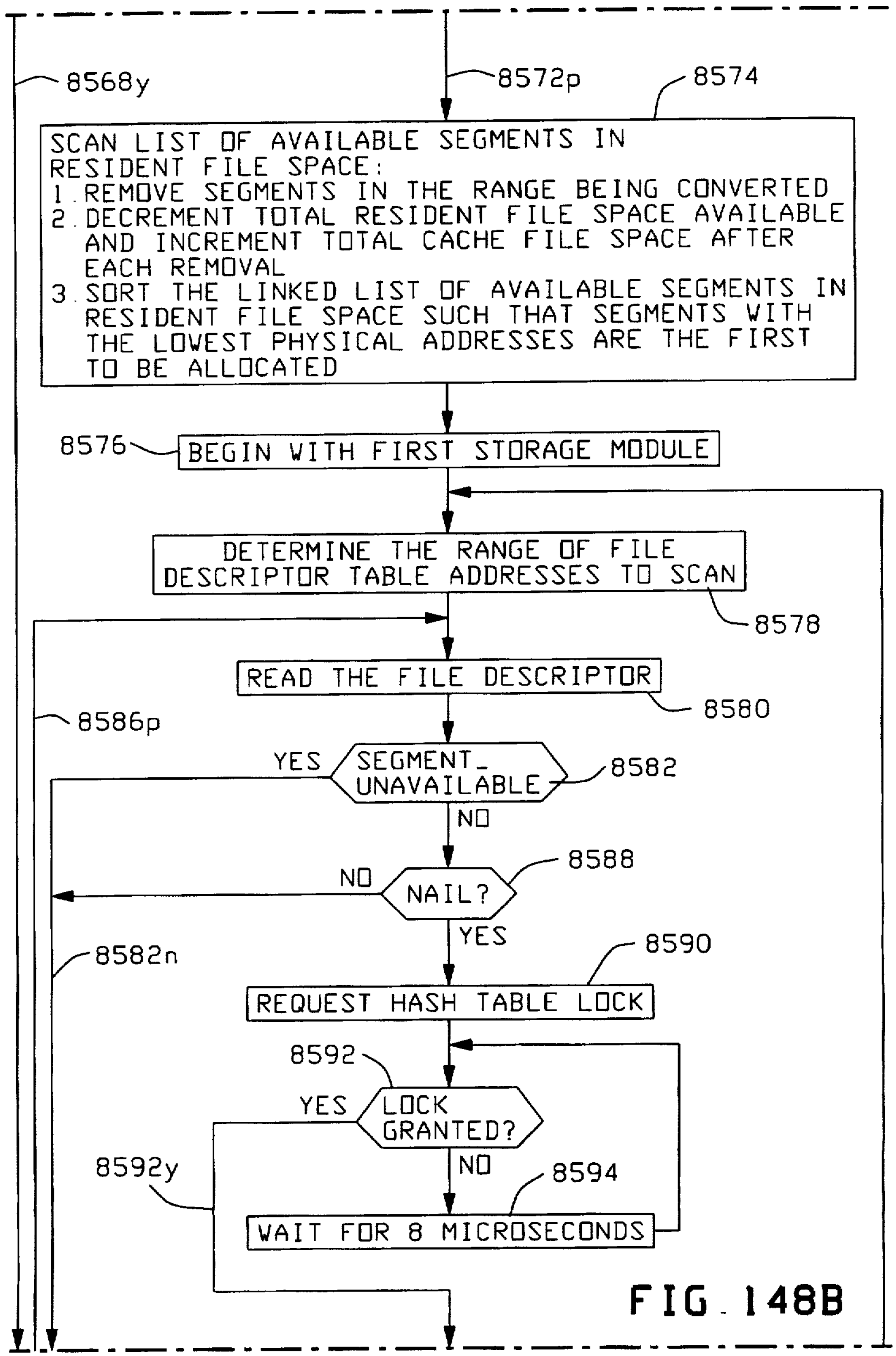
Figure 148C:
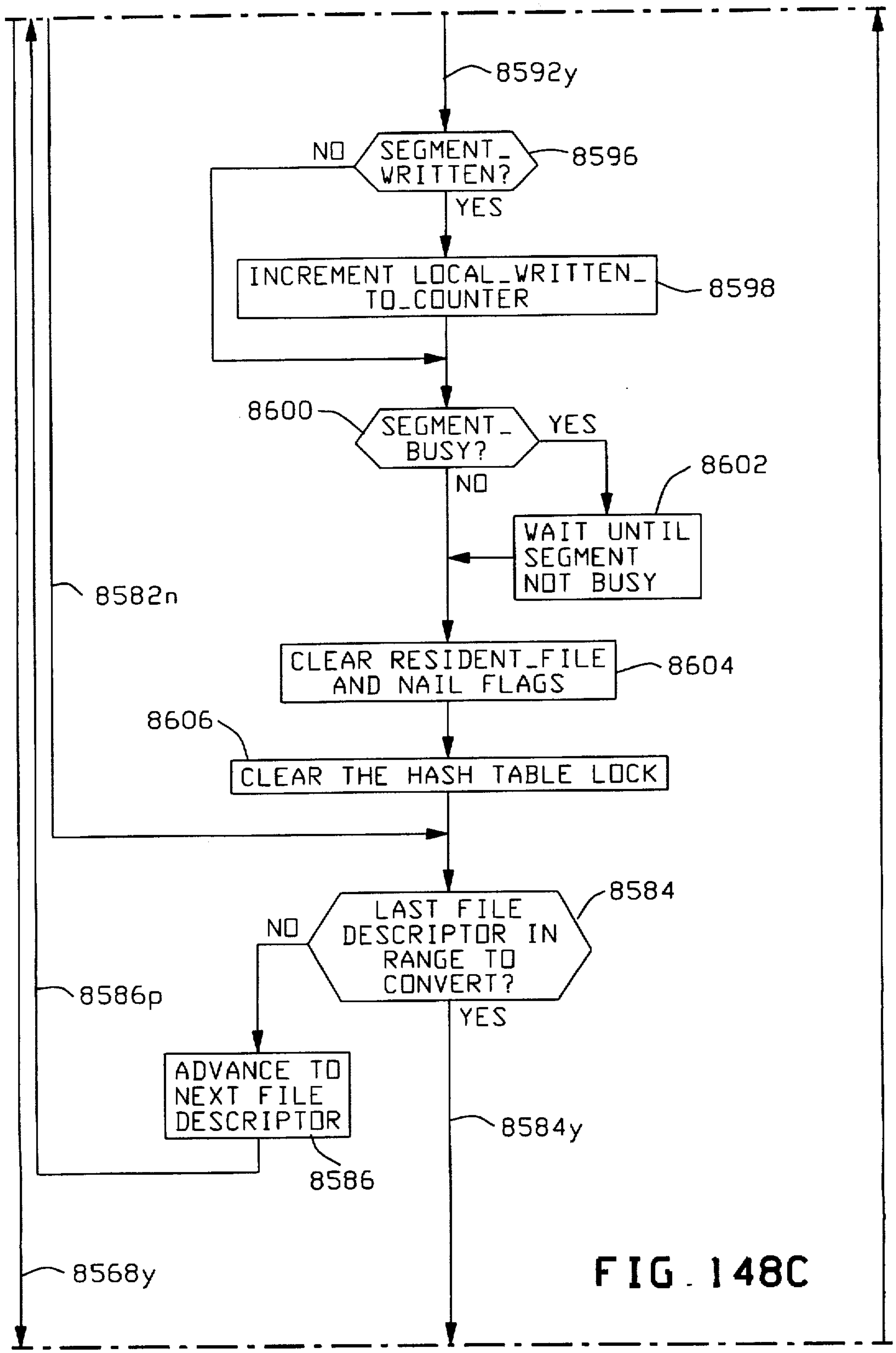
Figure 148D:
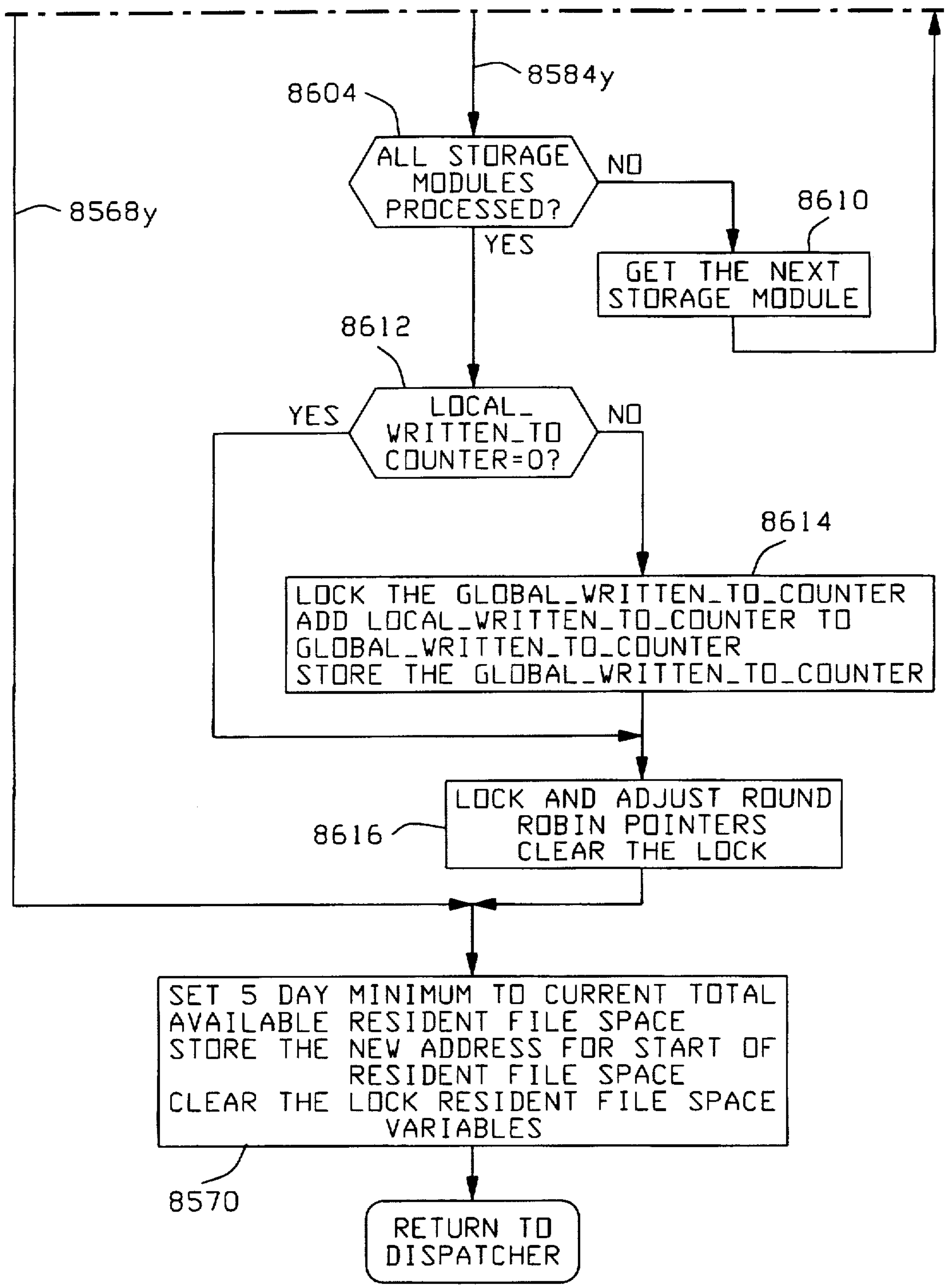
Figure 149:
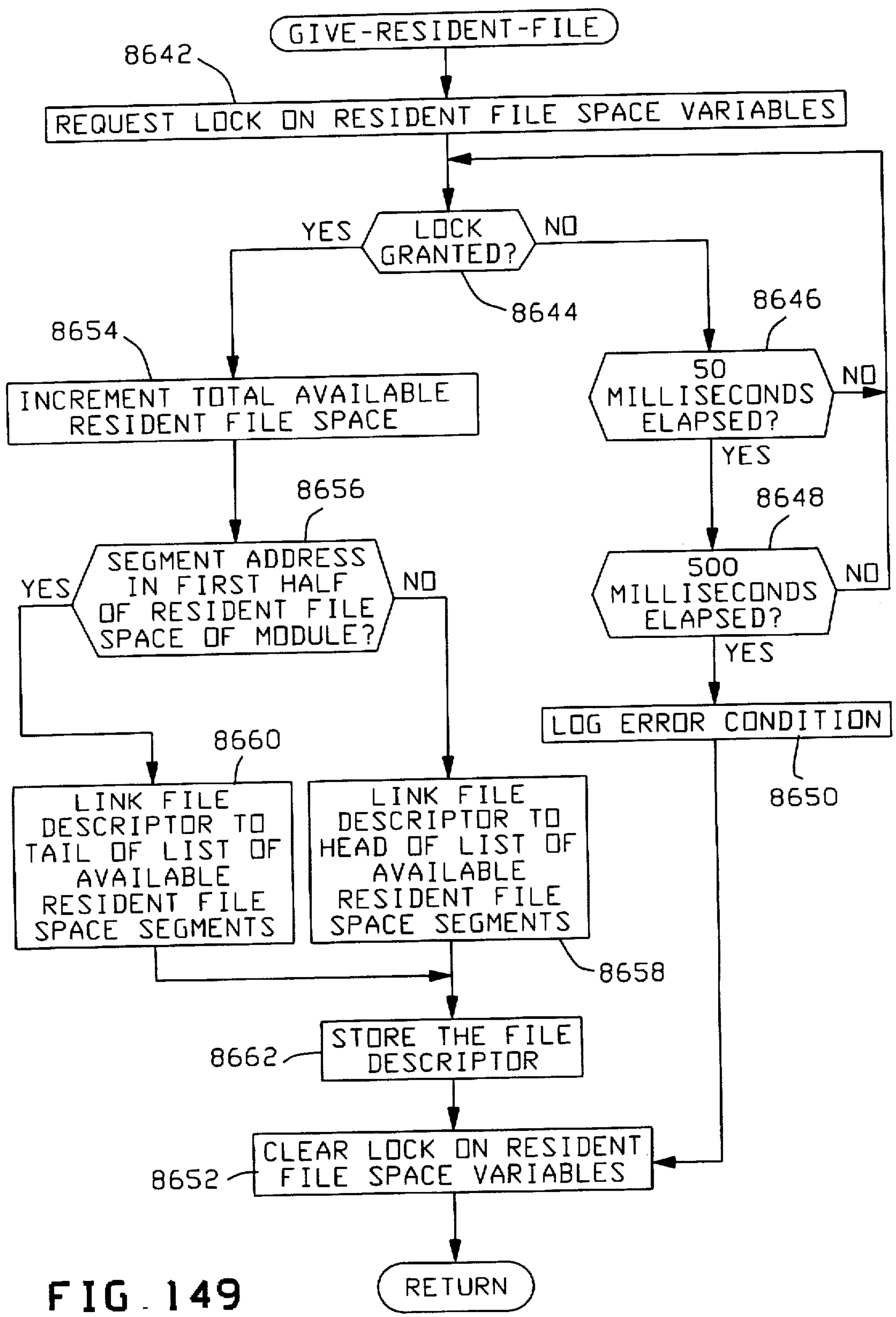

FIGS. 100A and 100B contain a flowchart of the COMMAND BRANCH processing;

FIGS. 101A, 101B, 101C, and 101D contain a flowchart of the READ-WRITE routine;

FIGS. 102A, 102B, 102C, and 102D contain a flowchart of the processing performed for STAGE commands;

FIGS. 103A and 103B contain a flowchart describing the processing performed by the Outboard File Cache for a DESTAGE command;

FIGS. 104A, 104B, and 104C contain a flowchart of the processing performed by the Outboard File Cache in processing a DESTAGE COMPLETE command;

FIG. 105 contains a flowchart of the processing done by the Outboard File Cache for a WRITE OFF BLOCK BOUNDARY command;

FIG. 106 contains a flowchart of the processing performed by the Outboard File Cache for a CLEAR PENDING command;

FIG. 107 contains a flowchart of the processing performed by the Outboard File Cache for a RETURN SEGMENT STATE command;

FIG. 108 illustrates lock tables used for coordinating file locks as used in the LOCK CACHE FILE, LOCK CACHE FILES BY ATTRIBUTES, UNLOCK CACHE FILE, and UNLOCK CACHE FILES BY ATTRIBUTES commands;

FIGS. 109A and 109B contain a flow chart of the processing performed for the LOCK CACHE FILE and LOCK CACHE FILES BY ATTRIBUTES commands;

FIG. 110 contains a flowchart of the processing performed for processing LOCK CACHE FILES BY ATTRIBUTES commands;

FIGS. 111A and 111B contain a flowchart of the processing performed for the UNLOCK CACHE FILE and UNLOCK CACHE FILES BY ATTRIBUTES commands;

FIG. 112 contains a flowchart of the processing performed for an UNLOCK CACHE FILES BY ATTRIBUTES command;

FIGS. 113A, 113B, 113C, 113D, 113E, and 113F contain a flowchart of the LOGICAL-SCAN processing performed by the Outboard File Cache in processing the DESTAGE, DESTAGE AND PURGE FILE, MODIFY File Descriptor, CLEAR PENDING, and RETURN SEGMENT STATE commands;

FIGS. 114A, 114B, 114C, 114D, 114E, 114F, and 114G illustrate the flowchart for the PHYSICAL-SCAN processing performed by the Outboard File Cache;

FIG. 115 illustrates the flowchart for SEARCH processing;

FIGS. 116A, 116B, and 116C contain a flowchart of the processing performed when access to a segment is requested and the segment is not present in the Outboard File Cache;

FIGS. 117A and 117B contain a flowchart of the processing performed upon invocation of the MISS-B and SPECULATE-HIT-1 processing;

FIG. 118 contains a flowchart of the MISS-END processing;

FIG. 119 contains a flowchart of the MISS-BA processing;

FIGS. 120A, 120B, 120C, and 120D contain a flowchart of FLAGS processing which tests the flags in the File Descriptor when a segment hit occurs;

FIG. 121 contains a flowchart of CLEAR-STAGE-PENDING processing which clears the STAGE_PENDING state for segments which have been placed in a STAGE_PENDING as a result of processing a READ, WRITE, or WRITE OFF BLOCK BOUNDARY command;

FIG. 122 contains a flowchart of the processing performed for both FIX-STATE and FIX-STATE-1;

FIG. 123 contains a flowchart of the HASH function;

FIGS. 124A, 124B, 124C, 124D, 124E, and 124F contain a flowchart of REUSE processing which selects a segment in the cache for allocation;

FIG. 125 contains a flowchart of the PRE-USE processing which reserves a segment for an Index Processor;

FIGS. 126A, 126B, 126C, and 126D contain a flowchart of the DESTAGE-CHECK processing which identifies segments for destaging and creates Destage Request Packets;

FIG. 127 contains a flow chart of RELINK processing which links a File Descriptor into a hash list of File Descriptors;

FIG. 128 contains a flowchart of the DELINK processing to remove a File Descriptor from a hash list;

FIG. 129 contains a flowchart of the processing performed in iterating many of the processing loops described herein;

FIGS. 130A and 130B contain a flowchart of the processing for detecting whether a file is surging;

FIG. 131 contains a flowchart illustrating the SPECULATE-DECISION processing which determines whether more segments should be staged than were identified in the Command Packet;

FIGS. 132A and 132B contain a flowchart of the DESTAGE-GROUP processing which gathers a group of segments to be included in a Destage Request Packet;

FIGS. 133A and 133B contain a flowchart of the DESTAGE-BUILD processing which forms a Segment Information Packet to return to a Host for destaging segments;

FIG. 134 contains a flowchart of CACHE-TIGHT processing for gathering segments destage when a cache-tight condition is detected;

FIG. 135 contains a flowchart for SPECULATIVE-HIT-TEST PROCESSING;

FIG. 136 contains a flowchart of the FIX-STATE-FOR-HITS processing;

FIG. 137 contains a flowchart of the processing performed in purging a segment from the Outboard File Cache;

FIG. 138 contains a flowchart of the PURGE-BLOCKS processing to purge selected blocks from a segment in the Outboard File Cache;

FIGS. 139A–E contain a flowchart of the processing for the ALLOCATE command;

FIG. 140 contains a flowchart for the ENDERR, ENDWT, and END processing which completes processing of a Command Packet;

FIG. 141 contains a flowchart of NEW-BIT processing which tests whether the NEW flag in a File Descriptor should be set for the segment in process;

FIGS. 142A and 142B contain a flowchart of GET-NAIL processing which locates an available segment in Nail Space for allocation;

FIG. 143 contains a flowchart of CONVERT-SPACE processing which reapportions Cache File Space and Nail Space;

FIGS. 144A, 144B, and 144C contain a flowchart for LESS-NAIL processing which converts 64 segments at the end of Nail Space in each Storage Module to Cache File Space;

FIG. 145 contains a flowchart for GIVE-SEGMENT processing which returns an allocated nailed segment to the linked list of available segments in Nail Space;

FIG. 146 contains a flowchart illustrating the processing for GET-RESIDENT-FILE;

FIG. 147 contains a flowchart of MORE-RESIDENT-FILE processing which reapportions Cache File Space and Resident File Space;

FIGS. 148A–D contain a flowchart of LESS-RESIDENT-FILE processing which reapportions File Space between Resident File Space and Cache File Space; and FIG. 149 contains a flowchart for GIVE-RESIDENT-FILE processing which returns an allocated segment in Resident File Space to the linked list of available segments in Resident File Space.

IV. DESCRIPTION OF THE PREFERRED EMBODIMENT

A. Host Data Processing System

Figure 1:
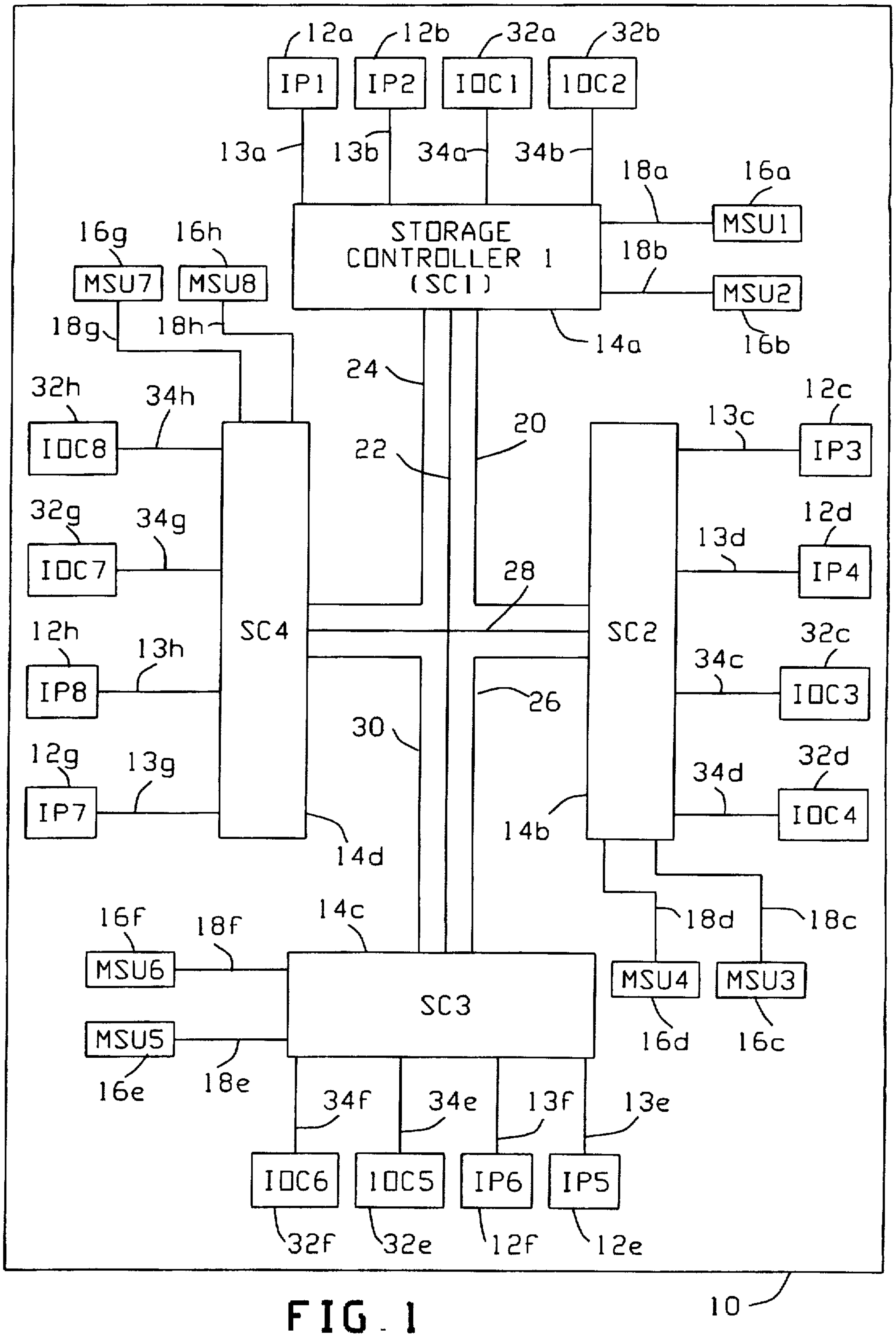
FIG. 1 shows an exemplary data processing system, or "host", with which the present invention could be used.

FIG. 1 shows an exemplary data processing system, or "host", with which the present invention could be used. The Host 10 architecture is that of the 2200/900 Series data processing system which is commercially available from the Unisys Corporation.

The Instruction Processors (IPs) 12 are the basic instruction execution units of the system. Each IP includes a first level cache (not shown) having a section for instructions and a section for operands. The Ips 12 are functional to call instructions from memory, execute the instructions and store the results, and in general, perform data manipulation.

Each of the IPs 12 is directly coupled via Cables 13 to a Storage Controller (SC) 14. The maximum configuration for the 2200/900 data processing system includes four SCs 14, each SC having two directly coupled IPs 12. The SCs 14 provide logic and interconnects which provide access to Main Storage Units (MSUs) 16. The MSUs comprise the main random access memory of the Host 10. Each SC 14 controls access to two directly coupled MSUs 16. Cables 18 couple the MSUs to their respective SCs 14.

The SCs 14 contain interconnect logic that ties all IPs 12 together in a tightly coupled system. SC1 is coupled to SC2 via Cable 20; SC1 is coupled to SC3 via Cable 22; SC1 is coupled to SC4 via Cable 24; SC2 is coupled to SC3 via Cable 26; SC2 is coupled to SC4 via Cable 28; and SC3 is coupled to SC4 via Cable 30. Each IP 12 can address every MSU 16 of Host 10. For example, the SC intercoupling allows IP6 to have access to the addressable memory of MSU8. A memory request originating in IP6 is first sent to SC3; SC3 sends the memory request to SC4; SC4 provides access to the portion of addressable memory; and if requested, SC4 returns data to SC3 which in turn forwards the data to IP6.

Each of the SCs 14 also provide interfaces for two Input/Output Complexes (IOCs) 32. Cables 34 couple each of the IOCs 32 to their respective SCs 14. Each of the IOCs 32 may contain multiple Input/Output Processors (IOPs not shown). The IOPs read data from the MSUs 16 for writing to peripheral devices, and read data from peripheral devices for writing to the MSUs 16. Peripheral devices may include printers, tape drives, disk drives, network communication processors, etc.

The 2200 Series data processing architecture allows a Host 10 to be logically partitioned into one or more independent operating environments. Each independent operating environment is referred to as a partition. A partition has its own operating system software which manages the allocation of resources within the partition. Because a partition has its own operating system, it may be also referred to as a Host. Using Host 10 as an example, it could be partitioned into four Hosts: a first host having the resources accompanying SC1, a second host having the resources accompanying SC2, a third host having the resources accompanying SC3, and a fourth host having the resources accompanying SC4.

Figure 2:
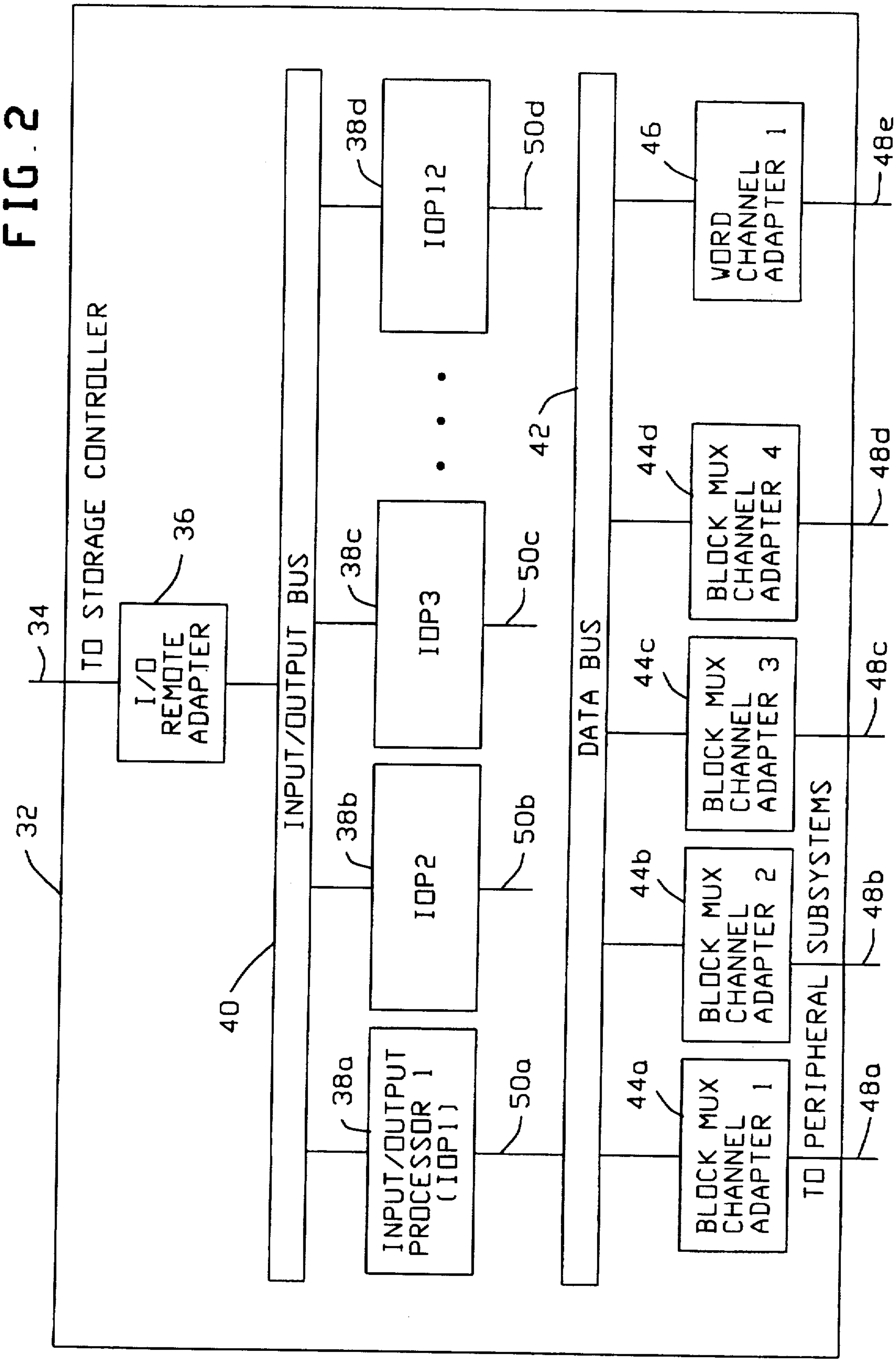
FIG. 2 shows the architecture of an Input/Output Complex of the exemplary Host.

FIG. 2 shows the architecture of an Input/Output Complex of the exemplary Host. Input/Output Remote Adapter (IRA) 36 is a non-intelligent adapter which transfers data and messages between an SC 14 and an IOP 38 via an Input/Output Bus 40. The IRA 36 occupies one physical drop out of the thirteen available on Input/Output Bus 40 and has the highest priority of any unit connected to Input/Output Bus 40. IRA 36 does not participate in any rotational priority operations and can gain access to the Input/Output Bus 26 through the normal request process even when other units coupled to the Input/Output Bus are operating in a rotational priority mode.

The Input/Output Bus 40 provides the communication path and protocol to transfer data between the attached units. The Input/Output Bus 40 can accommodate twelve Input/Output Processors 38. It will be recognized that bus architectures are well known in the prior art and a further discussion of the Input/Output Bus shown is not necessary for the purposes of the present invention.

The IOPs 38 are microprocessor controlled units that control the initiation, data transfer, and termination sequences associated with software generated I/O channel programs. Initiation and termination sequences are executed by the microprocessor and data transfer is controlled by hard-wired logic. Each IOP 38 is coupled to a Data Bus 42, which in turn has available slots for up to four Block Mux Channel Adapters 44 and a Word Channel Adapter 46. Channel Adapters 44 and 46 are coupled to their respective peripheral subsystems via Cables 48. While not shown, it should be understood that each of IOP2, IOP3, . . . , and IOP12 is coupled to its associated Data Bus. The 11 Data Buses which are not shown, provide connections for additional Channel Adapters. Lines 50 represent the coupling between IOP2, IOP3, . . . , and IOP12 and their associated Data Buses.

B. Prior Art Data Storage Hierarchy

Figure 3:
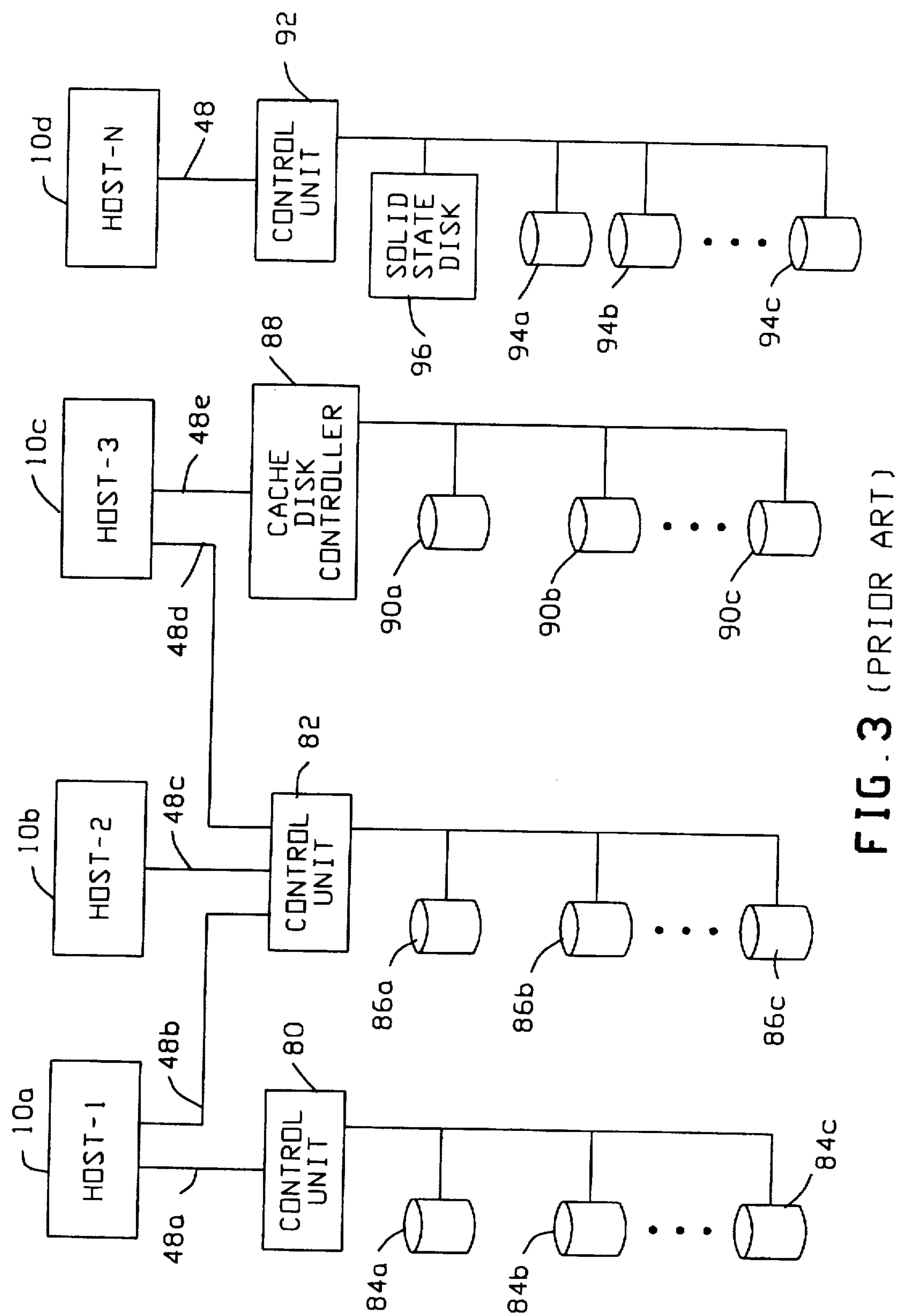
FIG. 3 is a block diagram of a plurality of Hosts coupled to a variety of prior art disk subsystem configurations.

FIG. 3 is a block diagram of a plurality of Hosts coupled to a variety of prior art disk subsystem configurations. FIG. 3 serves to illustrate the hierarchical relationship between the configurations. Each Host 10 is coupled to one or more of the Control Units 80, 82, 88, or 92 by Line 48. Host-1 is coupled to Control Units 80 and 82. Control Unit 80 provides access to Magnetic Disks 84, and Control Unit 82 provides access to Magnetic Disks 86. If application software on Host-1 requests access to a file stored on Magnetic Disks 84 or 86, operating system software is required to find: (1) the Disk 84 or 86 on which the file is stored; (2) which Control Unit 80 or 82 provides access to the disk; (3) the IOP 38 to which the Control Unit is coupled; and (4) the Input/Output Bus 40 to which the IOP 38 is coupled. Once the necessary information is determined, a control program can be constructed and sent along the identified data path to access the file. File data may be buffered in the Main Storage 16 of Host-1 to enhance the access rate for file data; however, the file data must be destaged to Disks 84 to protect against data loss.

Control Unit 82 is coupled to and shared by Host-1, Host-2, and Host-3. Each of the coupled Hosts can access data stored on Disks 86. A Multi-Host File Sharing (MHFS) system, which is commercially available from Unisys Corporation, allows application software on Host-1, Host-2, and Host-3 to share file data stored on Disks 86 and coordinates locking files or portions thereof.

Host-3 is coupled to Cache Disk Controller 88. Cache Disk Controller 88 provides access to Disks 90 and buffers portions of Disks 90. The cache storage that Cache Disk Controller 88 uses to buffer Disks 90 resides within the Cache Disk Controller 88. Operation of the Cache Disk Controller 88 is transparent to application and system software on Host-3. The cache storage is allocated to all application and system software having access to files stored on Disks 90 on a first-come first-served basis.

Control Unit 92 is coupled to Host-n and controls access to Disks 94 and a Solid State Disk 96. The Solid State Disk 96 resides at the Disk 94 level of the data storage hierarchy and provides access to data stored therein at electronic rather than the electromechanical speed of the Disks 94. In order to gain access to data stored on Solid State Disk 96, the data path on which the disk resides must be constructed in the same manner as discussed above for Disks 84.

C. File Cache System Overview

Figure 4:
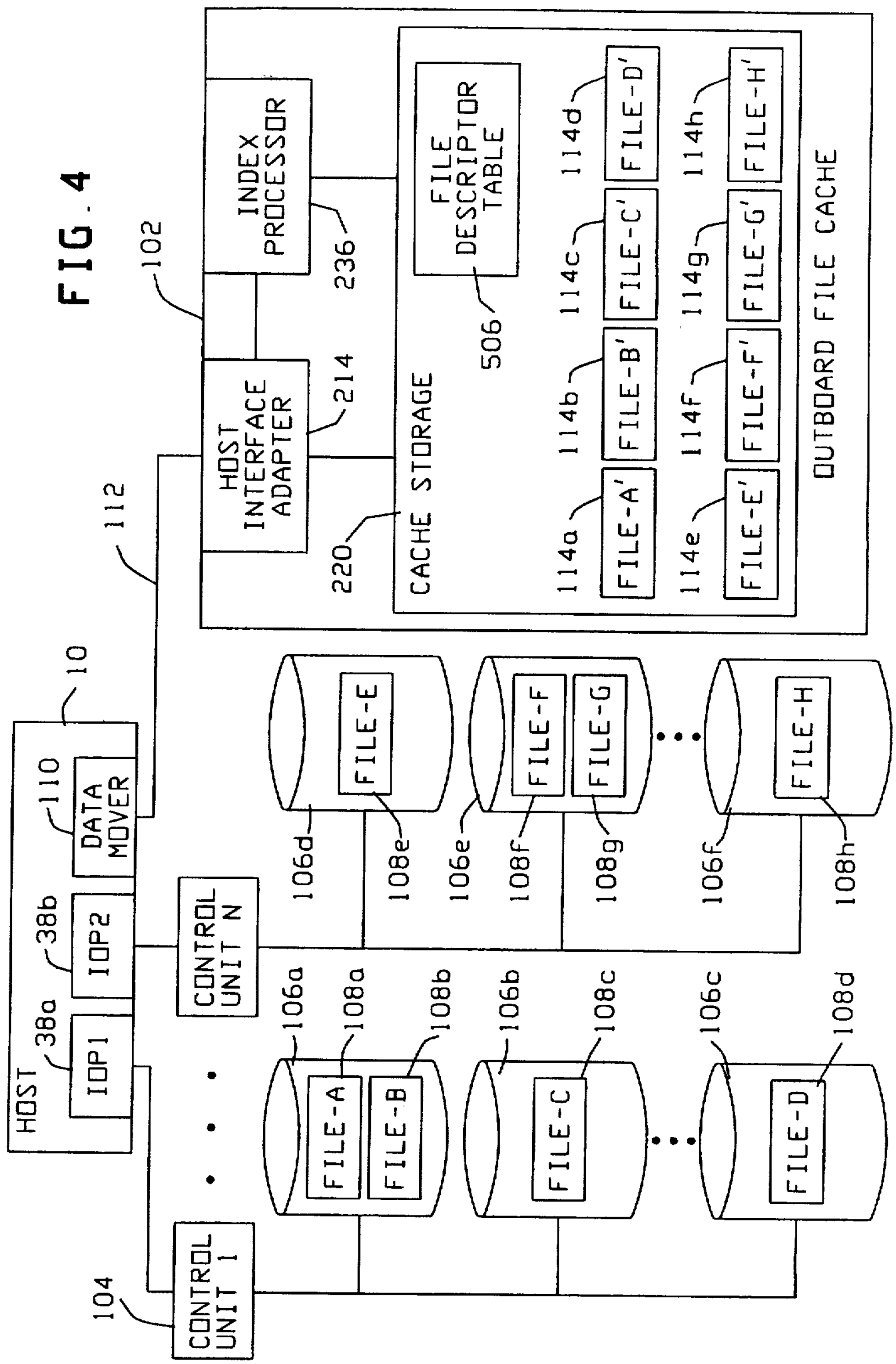
FIG. 4 illustrates an Outboard File Cache in a data storage hierarchy.

FIG. 4 illustrates an Outboard File Cache in a data storage hierarchy. A plurality of Control Units 104 are coupled to Host 10 via IOPs 38 for providing access to Disks 106. Application and system software executing on Host 10 reads data from and writes data to Files **108*a–h*. While Files 108*a–h* are depicted as blocks it should be understood that the data is not necessarily stored contiguously in Disks 106**. The Disks provide mass storage for retaining the Files. In the storage hierarchy, disks would fall into the category of secondary storage, with primary storage being the main memory of a Host.

Outboard File Cache 102 provides cache storage for Files **108*a–h* with resiliency against data loss which is comparable to Disks 108. A Data Mover 110 is coupled to the Input/Output Bus 40 in the Host and provides a functionality which is similar to the IOPs 38. The Data Mover provides a Fiber Optic Link 112 to the Outboard File Cache. An or part of Files 108 may be stored in the Outboard File Cache 102 depending upon the storage capacity of the Outboard File Cache 102, and the size and number of Files 108** selected to be cached.

The portion of Files **108*a–h* that are stored in the Outboard File Cache 102 are shown as blocks 114*a–h*. The cached portion of Files 108 are labeled File-A', File-B', File-H' for discussion purposes. File-A' 114*a* is the portion of File-A that is stored in Outboard File Cache 102, File-B' 114*b* is the portion of File-B that is stored in Outboard File Cache 102, etc. The Outboard File Cache at this level of the storage hierarchy allows references to cached files to be immediately directed to the Outboard File Cache 102** for processing, in contrast with a non-cached file where an I/O channel program must be constructed to access the proper disk and the request and data must flow through a possibly lengthy data path.

Figure 5:
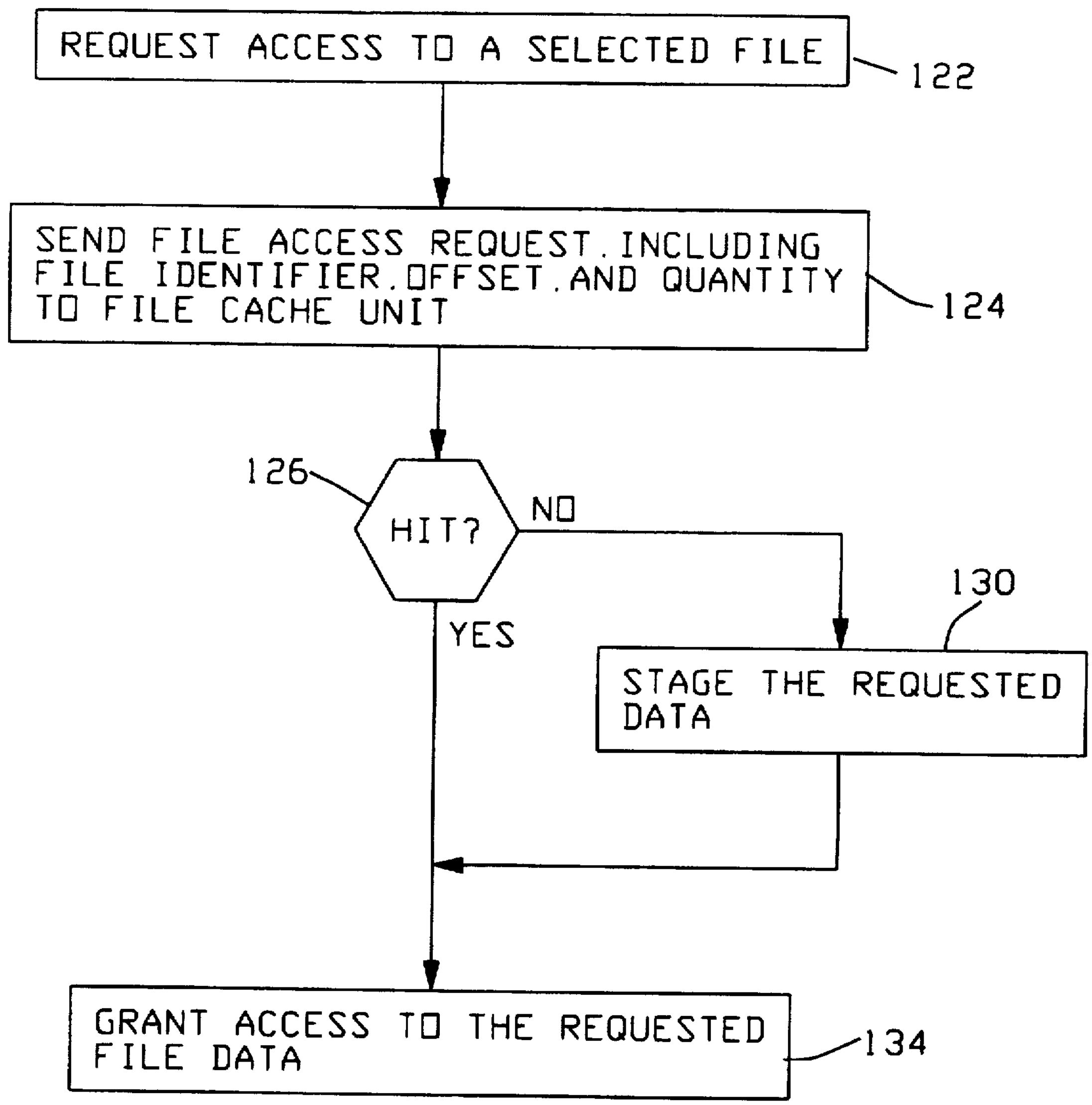
FIG. 5 shows the overall file processing within the data storage hierarchy shown in FIG. 4.

FIG. 5 shows the overall file processing within the data storage hierarchy shown in FIG. 4. The processing begins at Step 122 where a software application executing on Host 10 requests access to a selected file. The access request may involve either reading data from or writing data to the selected file.

A file access command is sent to the Outboard File Cache 102 at Step 124. Included in the file access command are a file identifier which specifies the file on which the operation is to be performed, an offset from the beginning of the file which specifies precisely where in the file the operation is to begin, and the quantity of data which is to be read from or written to the file. At Decision Step 126, the Outboard File Cache determines whether the referenced data is present in the Outboard File Cache 102 based on the file identifier, offset, and quantity. If the referenced data is not in the Outboard File Cache 102, Control Path 128 is followed to Step 130.

Step 130 involves staging the data from the appropriate Disk 106 to the Outboard File Cache 102. Staging the data involves reading the required data from Disk 106 and then storing the data in the Outboard File Cache. Subsequent references to the staged data normally will not result in a miss, and the data can be accessed in the Outboard File Cache. If Decision Step 126 finds that the referenced data is in Outboard File Cache 102, Control Path 132 is followed to Step 134 where access is granted to the referenced data.

1. Functional Block Diagram

Figure 6:
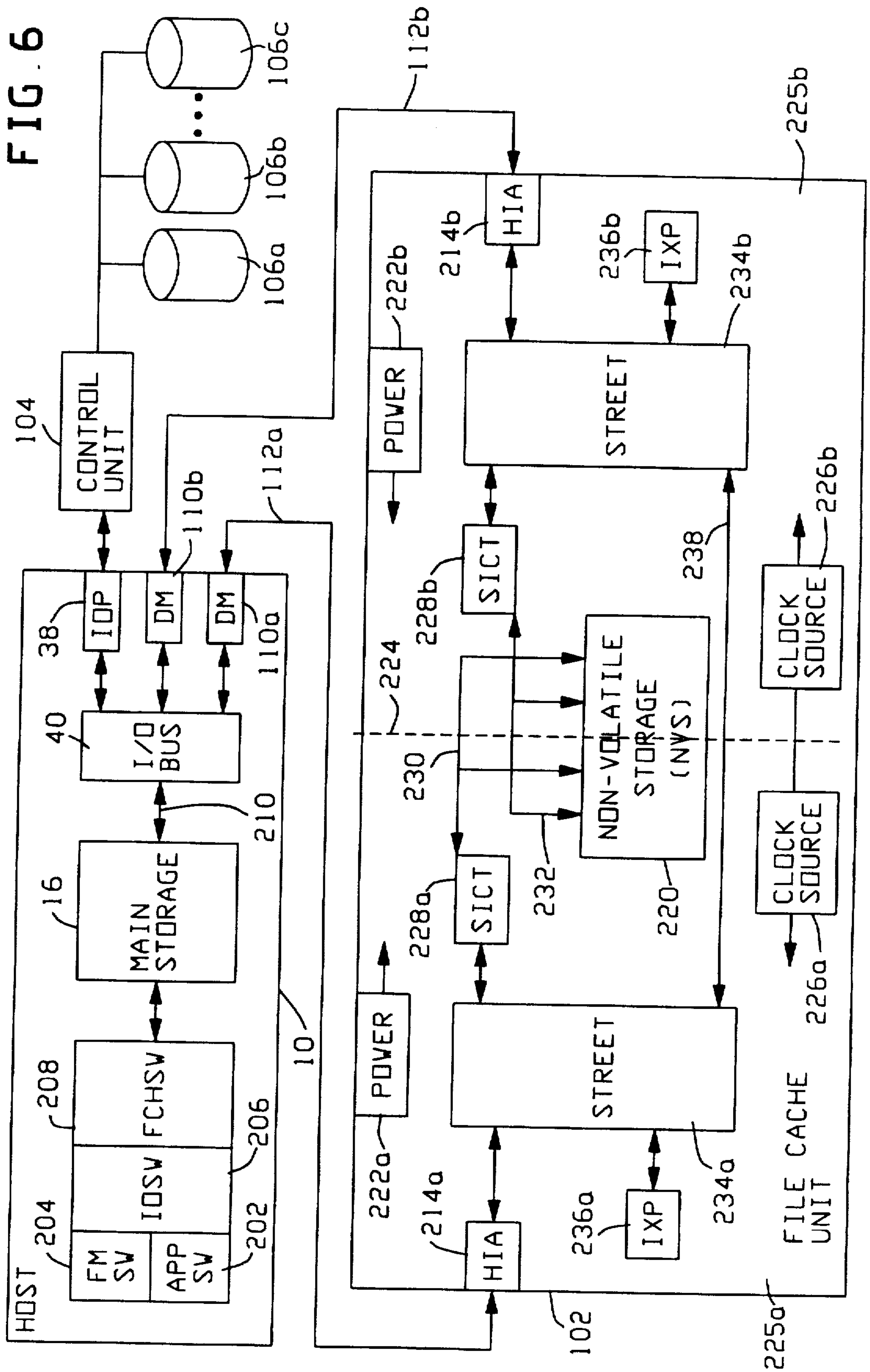
FIG. 6 is a functional block diagram of the hardware and software components of the preferred embodiment of the outboard file cache system.

FIG. 6 is a functional block diagram of the hardware and software components of the preferred embodiment of the outboard file cache system. The overall system is comprised of hardware and software elements in both the Host 10 and Outboard File Cache 102. The software on Host 10 is shown by blocks 202, 204, 206, and 208. The blocks are joined to signify the interrelationships and software interfaces between the software elements.

Application Software 202 provides data processing functionality to end users and includes applications such as bank transaction processing and airline reservations systems. Data bases maintained by Application Software 202 may be stored in one or more the exemplary Files 108 as shown in FIG. 4. File Management Software 204, Input/Output Software 206, and File Cache Handler Software 208 are all part of the operating system (not shown). In general File Management Software 204 provides overall management of file control structures, and in particular handles the creating, deleting, opening, and closing of files.

Input/Output Software 206 provides the software interface to each of the various I/O devices coupled to the Host 10. The I/O devices may include network communication processors, magnetic disks, printers, magnetic tapes, and optical disks. Input/Output Software 206 builds channel programs, provides the channel programs to the appropriate IOP 38, and returns control to the requesting program at the appropriate time.

File Cache Handler Software 208 coordinates the overall processing for cached files. In general, File Cache Handler Software 208 provides the operating system level interface to the Outboard File Cache 102, stages file data from Disks 106 to the Outboard File Cache 102, and destages file data from the Outboard File Cache 102 to Disks 106. The File Cache Handler Software 208 provides file data and file access commands to the hardware interface to the Outboard File Cache 102 via Main Storage 16. Main Storage 16 is coupled to the Input/Output Bus 40 by Line 210. Line 210 logically represents the Storage Controller 14 and Input/Output Remote Adapter 36 of FIGS. 1 and 2.

A Data Mover (DM) 110*a* provides the hardware interface to the Outboard File Cache 102. While two DMs 110*a* and 110*b* are shown, the system does not require two DMs for normal operations. A configuration with two DMs provides fault tolerant operation; that is, if DM 110*a* fails, DM 110*b* is available to process file requests. Each of the DMs is coupled to the Input/Output Bus 40 of Host 10. File Cache Handler Software 208 distributes file access commands among each of the DMs coupled to Input/Output Bus 40. If DM 110*a* fails, file access commands queued to DM 110*a* can be redistributed to DM 110*b*.

The DMs 110*a* and 110*b* provide functionality which is similar to the IOPs 38 of FIG. 2, that is to read data from and write data to a peripheral device. The DMs can read from and write to Main Storage 16 without the aid of IPs 12. The DMs coordinate the processing of file access commands between File Cache Handler Software 208 and the Outboard File Cache 102 and move file data between Main Storage 16 and the Outboard File Cache 102. Each of the DMs is coupled to a Host Interface Adapter (HIA) 214 logic section within the Outboard File Cache 102. DM 110*a* is coupled to HIA 214*a* by a pair of fiber optic cables shown as Line 112*a*, and DM 110*b* is coupled to HIA 214*b* by a second pair of fiber optic cables shown as Line 112*b*.

The Outboard File Cache 102 is configured with redundant power, redundant clocking, redundant storage, redundant storage access paths, and redundant processors for processing file access commands, all of which cooperate to provide a fault tolerant architecture for storing file data. The Outboard File Cache 102 is powered by dual Power Supplies 222*a* and 222*b*. The portion of the Outboard File Cache 102 to the left of dashed line 224 is powered by Power Supply 222*a* and is referred to as Power Domain 225*a*, and the portion of the Outboard File Cache 102 to the right of dashed line 224 is powered by Power Supply 222*b* and is referred to as Power Domain 225*b*. Each of Power Supplies 222*a* and 222*b* has a dedicated battery and generator backup to protect against loss of the input power source.

Two separately powered Clock Sources 226*a* and 226*b* provide timing signals to all the logic sections of Outboard File Cache 102. Clock Source 226*a* provides timing to the logic sections within Power Domain 225*a* and Clock Source 226*b* provides timing to the logic sections within Power Domain 225*b*. Redundant oscillators within each Clock Source provide protection against the failure of one, and Clock Sources A and B are synchronized for consistent timing across Power Domains A and B.

Non-Volatile Storage (NVS) section 220 includes multiple DRAM storage modules and provides the cache memory. Half of the storage modules are within Power Domain 225*a* and the other half are within Power Domain 225*b*. The data contained within the storage modules in Power Domain 225*b* reflects the data stored in storage modules within Power Domain 225*a*. NVS 220 thereby provides for redundant storage of file data and the control structures used by the Outboard File Cache 102. The redundant storage organization provides for both single and multiple bit error detection and correction.

The portion of NVS 220 within each of the Power Domains 226*a* and 226*b* is coupled to two Storage Interface Controllers (SICTs) 228*a* and 228*b*. While only two SICT are shown in FIG. 6, each half of NVS 220 is addressable by up to four SICT. Line 230 represents the coupling between SICT 228*a* and the portion of NVS 220 within each of Power Domains 225*a* and 225*b*. Similarly, Line 232 represents the coupling between SICT 228*b* and NVS 220.

Read and write requests for NVS 220 are sent to the SICTs 228*a* and 228*b* via Street Networks 234*a* and 234*b*. The Street Network provides the data transfer and interprocessor communication between the major logic sections within the Outboard File Cache 102. The Street Network is built to provide multiple requesters (HIAs 214*a* and 214*b* or Index Processors 236*a* and 236*b*) with high bandwidth access to NVS 220, as well as multiple paths for redundant access. Crossover 238 provides a path whereby NVS 220 requests may be sent from Street 234*a* to Street 234*b*, or visa versa, if a SICT is unavailable. For example, if SICT 228*a* fails, NVS requests sent from requesters (HIAs and IXPs)

are sent to Street 234*b* via Crossover 238, whereby NVS 220 access is provided by SICT 228*b*.

The HIAs 214*a* and 214*b* provide functionality in the Outboard File Cache 102 which is similar to the functionality provided by the DMs 110*a* and 110*b* on the Host 10. In particular, the HIAs receive file access commands sent from the DM and provide general cache access control such as writing file data sent from the Host to Non-Volatile Storage (NVS) 220 and reading file data from NVS and sending it to the Host. The HLAs also contain the logic for sending and receiving data over fiber optic Cables 112*a* and 112*b*.

Index Processors (IXPs) 236*a* and 236*b* manage allocation and cache replacement for the storage space available in NVS 220, service file data access commands sent from Host 10, and generally provides for overall file cache management The IXPs contain microcode control for detecting whether the file data referenced in a file data access command is present in the cache memory, and for managing and coordinating access to the cache memory. The functionality provided by an IXP will be discussed in greater detail later in this specification.

2. Data Flow

FIGS. 7A, 7B, and 7C contain a data flow diagram illustrating the flow of data between each of the major functional components of the file cache system. Each of the blocks represents a major logic section, a software component, or a storage section of the file cache system. Within each of the blocks are data structures which are shown as labelled online storage symbols and circles representing processing performed by the component. Although the circles represent the processing performed, they are not intended to illustrate the flow of control. The directional lines represent the flow of data between processing circles and data structures and are labelled according to the data being transferred. FIGS. 8 through 15 show the information contained within the data structures referenced in FIG. 7. Each of FIGS. 8 through 15 will be discussed as it is encountered in the discussion of FIG. 7.

File access commands begin with application software on the Host 10 (not shown in FIG. 7) requesting input or output services (I/O) for a selected file. I/O requests for cached files are processed by the File Cache Handler Software 208. Data flow Line 300 shows the input of an I/O request to File Cache Handler Software 208. I/O requests are sent from the Host 10 to the Outboard File Cache 102 in Command Packets. At Process Node 302 the File Cache Handler Software 208 builds a Command Packet (CP) for the specified I/O request and stores the Command Packet in a Command Packet Data Structure 304. Line 306 represents storing the I/O request information in the Command Packet Data Structure 304.

a. Command Packet

FIG. 8 shows the general layout of a Command Packet and the information contained therein. The Command Packet 452 contains information that describes one of the available Outboard File Cache commands (read, write, stage, destage, etc.). Each of the commands is identified and discussed later in this specification. FIG. 8 shows only the command information which is common to all Command Packets for the various command types.

A Command Packet can have from 4 to 67 36-bit words, depending upon the command type. Words 0 and 1, bits 12 through 23 of Word 3, and Words 4 through n of the Command Packet, respectively referenced by 452*a*, 452*b*, and 452*c*, are dependent upon the command type.

The file cache system permits Command Packets to be chained together. That is, a first Command Packet 452 may point to a second Command Packet, and the second Command Packet may point to a third Command Packet, and so on. The NEXT_COMMAND_PACKET 452*d* is used for chaining the Command Packets together. It contains the address of the next Command Packet in the command chain. If the CCF 452*e* (Command Chain Flag) is set, then NEXT_COMMAND_PACKET contains the address of the next Command Packet in the command chain. A chain of commands is also referred to as a "program." If CCF is clear, then no Command Packets follow the Command Packet in the command chain. The CCF is stored at Bit 5 of Word 3 in the Command Packet.

The LENGTH 452*f* of the Command Packet, that is the number of words in the Command Packet following Word 3, is stored in bits 6 through 11 of Word 3. Bits 24 through 35 of Word 3 contain COMMAND_CODE 452*f* which indicates the operation to be performed by the Outboard File Cache. Bits 0-4 of Word 3 and referenced by 452*g* are reserved.

Processing Node 308 in FIG. 7 enqueues a Program Initiation Packet (PIP) in a Program Initiation Queue (PIQ) 310. Line 312 represents the flow of Program Initiation Packet information to the Program Initiation Queue 310. The Command Packet (CP) Address from Node 302 is used in enqueuing a PIP. The CP Address supplied to Node 308 is shown by Line 309.

b. Program Initiation Queue

FIG. 9 illustrates the Program Initiation Queue. The Program Initiation Queue 310 may contain up to 32 Program Initiation Packets (PIPs), respectively referenced 456-1, 456-2, 456-3, . . . , 456-32. The Program Initiation Queue may be larger or smaller depending upon implementation chosen. Once the Program Initiation Queue is filled with Program Initiation Packets, further queuing is performed to handle the overflow.

FIG. 10 shows the information contained in and the format of a Program Initiation Packet. VF (Valid Flag) 456*a* is stored in bit 0 of Word 0 of the Program Initiation Packet 456. VF indicates whether the information in the Program Initiation Queue 310 entry is valid.

Bits 1 through 35 of Word 0 and Bits 0 through 3 of Word 1 are reserved for future use and are respectively referenced in FIG. 10 by 456*b* and 456*c*. The PROGRAM_ID 456*d* is stored in bits 4 through 35 of Word 1. The PROGRAM_ID uniquely identifies the program being submitted to the Outboard File Cache 102. The PROGRAM_ID is used to associate the status returned from the Outboard File Cache 102 with the program to which it applies.

Word 2 of the Program Initiation Packet 456 contains the COMMAND_PACKET_ADDRESS 456*e* which is the real address of the first Command Packet 452 in a command chain or a single Command Packet. Word 3 contains the NEXT_SP_ADDRESS 456*f*. The NEXT_SP_ADDRESS is the real address in Main Storage 16 of an area where the Outboard File Cache 102 can write status information.

After the Outboard File Cache 102 has processed a command, the status of the command is reported back to the Host 10 in a Program Status Packet (PSP). Line 314 shows the flow of a Program Status Packet from the Data Mover (DM) 110 to an entry in the Status Packet Queue (SPQ) 316. The format of the Status Packet Queue 316 and the Program Status Packet is described next, followed by further discussion of Command Packet processing.

c. Status Packet Queue and Program Status Packet

FIGS. 11 and 12 respectively illustrate the Status Packet Queue and the format and information contained in a Program Status Packet. The number of Program Status Packets 460 in the Status Packet Queue 316 is equal to the number of programs queued in the Program Initiation Queue and are respectively referenced 460-1, 460-2, 460-3, . . . , 460-n. Generally, the content and format of a Program Status Packet is as follows:

| Word | Bit | Definition |
|---|---|---|
| 0 | 0–5 | Valid Flag (VF) 460a indicates whether the Program Status Packet contains valid status information. If VF=0, then the Program Status Packet does not contain valid status information. If the VF=1, then the Program Status Packet does contain valid status information. |
| 0 | 6–17 | Reserved as referenced by 460b. |
| 0 | 18–35 | UPI_NUMBER 460c is the Universal Processor Interrupt (UPI) number associated with the Outboard File Cache interface. |
| 1 | 0–3 | Reserved as reference by 460d. |
| 1 | 4–35 | PROGRAM_ID 460e is a value which indentifies the Command Packet (or Command Packet Chain) which is associated with the Program Status Packet. If NO_PROGRAM in the FLAGS field is set, PROGRAM_ID is reserved. Every Outboard File Cache program issued by a Host has an associated PROGRAM_ID which is unique within the Host. When status is returned to the Host, PROGRAM_ID is used to relate the status to the program to which it applies. Note that PROGRAM_ID applies to all commands within a single program. A status is associated with a command in a command chain by using the COMMAND_PACKET_ADDRESS. The portion of the File Cache Handler that builds and initiates Outboard File Cache programs generates the PROGRAM_ID. |
| 2 | 0–35 | COMMAND_PACKET_ADDRESS 406f is a value which contains the real address of the Command Packet to which the status applies. When a chain of commands is submitted to the Outboard File Cache 102 for processing, the Command Packet Address will point to the Command Packet which caused an error. If all the Command Packets in the command chain were processed without error, then the Command Packet Address points to the last Command Packet in the command chain. |
| 3 | 3–35 | HARDWARE_DEPENDENT_STATUS-1 460g is an address within Main Storage 16 which was referenced and an error was detected. The File Cache Handler Software 208 takes the RECOMMENDED_ACTION. |
| 4 | 0–35 | This word is reserved and is beyond the scope of this invention. |
| 5 | 0–11 | RECOMMENDED_ACTION 460i is the processing that should be performed by the File Cache Handler Software 208 upon receiving a Program Status Packet. |
| 5 | 12–23 | REASON 460j indicates the condition that caused the particular status to be returned. |
| 5 | 24–29 | COUNT 460k is the recommended number of times that the File Cache Handler Software 208 should retry when responding to the status in the Program Status Packet. For example, if the RECOMMENDED_ACTION returned is Resend, then the Count indicates the number of times which the File Cache Handler Software 208 should resend the Command Packet. If NO_PROGRAM in the FLAGS field is not set and the RECOMMENDED_ACTION does not equal "no action required", this field specifies the number of times the command specified by the Command Packet pointed to by COMMAND_PACKET_ADDRESS should be retried. Retries apply only to that command and not to any other commands in a command chain. All retries use the same Outboard File Cache Interface to which the original command was directed. If NO_PROGRAM in the FLAGS field is not set and RECOMMENDED_ACTION equals "no action required", COUNT must be equal to 0. If NO_PROGRAM in the FLAGS field is set, this field is reserved. |
| 5 | 30–35 | FLAGS 4601 is a set of bits that relay ancillary information. |
| 5 | 30 | PRIORITY_DESTAGE indicates whether priority destage is required. If PRIORITY_DESTAGE is set, then the Destage Request Packets in the Destage Request Table (see the READ Status Packet) refer to segments that must be destaged as soon as possible. If NO_PROGRAM is set or DESTAGE_REQUEST_PACKETS is not set, PRIORITY_DESTAGE must equal 0. |
| 5 | 31 | DESTAGE_REQUEST_PACKETS is a flag which indicates whether the Destage Request Table exists (see the READ Status Packet). If NO_PROGRAM is set, or the status applies to an invalid command, or the status applies to a non-I/O command, then this flag must be 0. |
| 5 | 32 | TERMINATED_POLLING is a flag which indicates that a Program Initiation Queue is no longer being polled. |
| 5 | 33 | Reserved. |
| 5 | 34 | NO_PROGRAM is a flag which indicates whether the status is associated with a Command Packet. If NO_PROGRAM is set, then the status is not associated with a Command Packet. If TERMINATED_POLLING is set, NO_PROGRAM must also be set. If the Program Status Packet is returned via the Status Packet Queue, NO_PROGRAM must equal 0. This flag is beyond the scope of this invention. |
| 5 | 35 | Reserved and is beyond the scope of this invention. |
| 6 | 0–35 | STATISTICS 460m is a set of codes which indicate how successful the Outboard File Cache 208 has been in avoiding destaging file data, speculating upon the future file access commands, and the time the Outboard File Cache 208 spent in processing the Command Packet(s). |
| 7 | 0–11 | RECOVERY_TIME is used to indicate to a Host 10 that the Outboard File Cache 102 is in the process of performing a set of actions to recover from an internal fault condition. The nature of the fault recovery prohibit the Outboard File Cache from responding to any commands received from a Host. When a command is received, it is not processed by the Outboard File Cache and is returned to the sending Host with a RECOMMENDED_ACTION equal to "Resend." RECOVERY_TIME is only used when the NO_PROGRAM flag is not set and the RECOMMENDED_ACTION is Resend. The value contained in RECOVERY_TIME provides the number of six second intervals required to complete the necessary recovery actions. |
| 7 | 12–35 | See Words 8–127 |
| 8–127 | | These words contain information which is dependent upon the particular command in the Command Packet which is associated with the Program Status Packet. Words 7–119, referenced by 460n depend upon NO_PROGRAM and COMMAND_CODE (see the READ Status Packet), and words 120 through 127 are reserved for future use as referenced by 460o. |

The discussion now returns to Command Packet processing as shown in FIG. 7. Before the enqueue Processing Node 308 writes an entry in the Program Initiation Queue 310, it first obtains the address of an available Program Status Packet 460 from the Status Packet Queue 316, as shown by Line 318. If the Valid Flag 460*a* in the Program Status Packet is 0, then the Program Status Packet is available for status reporting. The address of the Program Status Packet is stored in NEXT_SP_ADDRESS 456*e* in the Program Initiation Packet 456 in the Program Initiation Queue 310.

The Data Mover 110 continually monitors the Program Initiation Queue 310 for the presence of Command Packets 452 to process as shown by the Monitor and Retrieve Processing Node 320. A pointer to an entry in the Program Initiation Queue 310 is used for monitoring the Program Initiation Queue. If the VF 456*a* for the Program Initiation Packet 456 referenced by the pointer is equal to 1, then the Program Initiation Packet is valid and a Command Packet is available. If the VF equals 0, then the Program Initiation Packet is invalid which means there is no Command Packet available for processing; the same Program Initiation Packet is monitored until the VF is set. Line 322 represents the reading of a Program Initiation Packet from the Program Initiation Queue.

Where the VF 456*a* in the PIP is set, the Program Initiation Queue 310 pointer is advanced to the next entry in the queue, and the next entry is thereafter monitored. The Program Initiation Packet 456 with the VF set is then used to retrieve the Command Packet 452. The COMMAND_PACKET_ADDRESS 456*e* in the Program Initiation Packet is used to read the Command Packet from the Command Packet Data Structure 304 as indicated by Line 324.

The information in the Command Packet 456 is then written to one of the Activity Control Block (ACB) Buffers 326 which is local to the Data Mover 110, as indicated by data flow Line 328. There are three buffers used by the Data Mover 110 to manage Command Packets. Each of the ACB Buffers is described in greater detail in the discussion for the Data Mover. The Buffers are large enough for 16 entries, which allows for a maximum 16 Command Packets to be "active." When there are 16 active commands, the Data Mover 110 suspends monitoring the Program Initiation Queue 310 until one of the 16 commands is complete. In general, the ACB Buffers hold Command Packets and assorted control codes for the transfer of data between the Data Mover 110 and Main Storage 16.

After a Command Packet is written to the ACB Buffers 326, the Send Processing Node 332 reads the Command Packet 452 from the appropriate ACB Buffer as shown by data flow Line 332. The Command Packet is then sent via the Fiber Optic Cable 216 to the Host Interface Adapter 214 as shown by data flow Line 334. The Receive Processing Node receives the Command Packet and enters the Command Packet into the HIA ACB Buffer 338 as indicated by data flow Line 340.

FIG. 13 illustrates the HIA ACB Buffer. The HIA ACB Buffer 338 has 16 entries, respectively referenced 338-1 through 338-16, for managing activities. Each entry in the HIA ACB Buffer contains a Command Packet and Status Information associated with the Command Packet. Associated with each entry in the HIA ACB Buffer is an ACB Number. ACB Number 1 references the first entry 338-1 in the HIA ACB Buffer, ACB Number 2 references the second entry 338-2, . . . , and ACB Number 16 references the sixteenth entry 338-16.

The Monitor and Put Processing Node 342 monitors the HIA ACB Buffer 338 for the arrival of Command Packets. When a Command Packet arrives in the HIA ACB Buffer 338, the ACB Number associated with the HIA ACB Buffer entry is read as indicated by data flow Line 344. Processing Node 342 then puts an Activity Queue (AQ) Entry in the Activity Queue as shown by data flow Line 348. An entry in the Activity Queue 346 indicates to the Index Processor 236 that there is a Command Packet available for processing.

FIG. 14 illustrates Activity Queue, and FIG. 15 shows the information contained in each Activity Queue Entry. The Activity Queue 346 may contain up to n Activity Queue Entries, referenced in FIG. 14 as 347-1, 347-2, 347-3,. . . , 347-n. Word 0 of an Activity Queue Entry contains a MESSAGE CODE 347*a* an ACBID 347*b*, a HIA UID 347*c*, and a HIA BPID 347*d*. Word 1 of the Activity Queue Entry contains a MESSAGE 347*e*. Each of these fields will be discussed in greater detail in the discussions relating to the Host Interface Adapter and Index Processor. But briefly, the MESSAGE CODE indicates the type of operation to be performed by the Index Processor 236. For an operation type indicating a new entry has been made in the HIA ACB Buffer 338, the ACBID indicates the ACB Number of the entry in the HIA ACB Buffer where the Command Packet information resides. The HIA Identifier field indicates the particular Host Interface Adapter 214 which put the Activity Queue Entry in the Activity Queue 346. In the interest of clarity, the description of the HIA BPID and the MESSAGE fields will be reserved for later sections of the specification.

The Monitor and Request Processing Node 350 in the Index Processor 236 monitors the Activity Queue 346 for Activity Queue Entries. When an entry is added to the Activity Queue, Processing Node 350 reads the ACB Entry from the Activity Queue 346 as indicated by data flow Line 352. Based upon the information in the Activity Queue Entry, Processing Node 350 sends an ACB Request to the HIA 214 as shown by data flow Line 354. The ACB Request contains the ACB Number from the Activity Queue Entry.

Send Processing Node 356 takes the Command Packet from the entry in the HIA ACB Buffer 338 which is associated with the ACB Number specified in the ACB Request and sends the Command Packet to the Process Node 358 of Index Processor 236. Data flow Lines 360 and 362 show the flow of a Command Packet from the HIA ACB Buffer 338 to the Process Node 358.

Process Node 358 decodes the command contained in the Command Packet and references the Control Structures 364 which contain information for managing the available storage space in NVS 220 and referencing Cached Files 366 stored therein. For file access commands, File Information is read from the Control Structures 364 as shown by data flow Line 368. Based upon the File Information and the decoded command, Process Node 358 initiates the appropriate processing. For the rest of this discussion for FIG. 7 assume that either a read or write request was contained in the Command Packet, and the referenced file data is present in Cached Files 366.

Two pieces of information are returned to the HIA 214 from the Process Node 358: a Status and Address as indicated by data flow Lines 370 and 372. Both pieces of information are tagged with the ACB Number so that the Status and Address information are stored in the appropriate entry in the HIA ACB Buffer 338.

Read and Send Processing Node 374 and Receive and Write Processing Node 376 control the flow of data between the Data Mover 110 and the NVS 220. Processing Node 374 is active when file data is read from Cached Files 336, and Processing Node 376 is active when file data is being written to Cached Files 366. For both Processing Nodes 374 and 376, Data Transfer Parameters are read from an entry in the HIA ACB Buffer 338 as respectively shown by data flow Lines 378 and 380. The Data Transfer Parameters indicate the address within NVS 220 where the operation is to begin and the number of words to be transferred.

Read and Send Processing Node 374 sends a Reconnect Message to the Data Mover 110 as shown by data flow Line 382. The Reconnect Processing Node 384 on the Data Mover 110 receives the Reconnect Message and supplies the ACB Number in the Reconnect Message to Receive and Write Processing Node 386. Data flow Line 388 shows the ACB Number flowing from Processing Node 384 to Receive and Write Processing Node 386.

Receive and Write Processing Node 386 retrieves the Data Transfer Parameters from the appropriate ACB Buffer 326 as referenced by the ACB Number. Data flow Line 390 illustrates the Data Transfer Parameters retrieved by Processing Node 386 from ACB Buffers 326. The Data Transfer Parameters indicate the location in Application Storage 392 where the file data is to be written. As File Data is received by Processing Node 386, as shown by data flow Line 394, it is written to Application Storage 392. Data flow Line 396 shows the File Data flowing to Application Storage 392. In Host Interface Adapter 214, the Read and Send Processing Node 374 reads the referenced File Data from Cached Files 366 as illustrated by data flow Line 398.

As previously stated, Receive and Write Processing Node 376 writes file data to Cached Files 366. File Data is shown as being written to Cached Files 366 by data flow Line 400. The transfer of File Data from the Data Mover 110 to the Host Interface Adapter 214 is initiated by the Receive and Write Processing Node 376 by sending a Reconnect Message. Data flow Line 402 shows the Reconnect Message. The Reconnect Message contains an ACB Number which is forwarded to Read and Send Processing Node 404. The ACB Number is shown at Line 406. Read and Send Processing Node 404 obtains the Data Transfer Parameters from the appropriate ACB Buffer 326 as referenced by the ACB Number. Data flow Line 408 shows the Data Transfer Parameters. The Data Transfer Parameters indicate the real address in Main Storage 16 where the file data to transfer resides. Processing Node 404 reads the referenced File Data from Application Storage 392 as shown by data flow Line 410. Data flow Line 412 shows File Data being sent by Processing Node 404 in the Data Mover 110 to the Receive and Write Processing Node 376 in the Host Interface Adapter 214. The File Data is then written to Cached Files 366.

For each of Processing Nodes 374 and 376, when the respective data transfer tasks are complete, a Status is written to the appropriate entry in the HIA ACB Buffer 338. Data flow Lines 414 and 416 respectively show the writing of the Status for Processing Nodes 374 and 376.

Return Status Processing Node 418 reads the Program Status Packet from the HIA ACB Buffer 338 when an activity completes and sends the Program Status Packet to the Write Status Processing Node 420 on the Data Mover 110. Processing Node 420 writes the Program Status Packet to the appropriate entry in one of the ACB Buffers 326. Data flow Lines 422, 424, and 426 illustrate the flow of a Program Status Packet from the HIA ACB Buffer 338 to the ACB Buffers 326 on the Data Mover 110.

Once the Data Mover 110 has received a Program Status Packet in its ACB Buffers 326, the Program Status Packet can be returned to the File Cache Handler Software 208. Return Status Processing Node 428 reads the Program Status Packet from ACB Buffers 326. The Program Status Packet is then written to an available entry in the Status Packet Queue 316. The entry in the Status Packet Queue to which the Program Status Packet is written is selected from a queue of pointers to available entries in the Status Packet Queue 316. The File Cache Handler Software reads the Status from the entry in the Status Packet Queue 316 and returns the appropriate status to the application software from which the I/O request originated. Processing Node 430 and data flow Lines 432 and 434 illustrate the status reporting.

3. File Space Management

This section provides an overview of the logical organization and maintenance of storage space in the Outboard File Cache 102. The preferred embodiment for this invention is predicated upon the file management and input/output systems associated with the OS1100 and OS2200 operating systems from Unisys Corporation. Those skilled in the art will recognize that this invention could be adapted to the file management systems associated with other operating systems without departing from the spirit of this invention.

FIG. 16 illustrates the file space available in the Outboard File Cache. The File Space 502 is logically organized in Segments 503-0, 503-1, 503-2, . . . , 503-(n-1), wherein each Segment contains 1792 words. The number of Segments available varies according to the amount of RAM storage configured in the Outboard File Cache 102. A segment has the same logical format as a logical track, which is the basic unit of storage allocation in the 1100/2200 file system.

FIG. 17 shows the logical organization of a single Segment. Each Segment 503 contains 64 blocks, numbered consecutively from 0 to 63 and respectively referenced 504-0, 504-1, 504-2, . . . , 504-63. FIG. 18 shows the logical composition of a Block. Each block is comprised of 28 words, numbered consecutively from 0 to 27 and respectively referenced 506-0, 506-1, 506-2, . . . , 506-27.

A Segment 503 may either be assigned or unassigned. Assigned means that the segment is directly associated with a specific track on a Disk 106 which belongs to a particular file and contains data which belongs to that file. An unassigned segment is not associated with any track or file. When the Outboard File Cache 102 is first started, all segments in the File Space 502 are unassigned. A Segment's transition from unassigned to assigned is initiated by Host 10 software and occurs when an appropriate command is sent to the Outboard File Cache 102. The transition from an assigned state to an unassigned state (hereafter referred to as "deassignment") is jointly controlled by the Host 10 and the Outboard File Cache 102. Any of the following three events may cause a Segment to be deassigned.

First, a Host 10 may send a command to the Outboard File Cache 102 which specifies that the Segment 503 is to be purged. Purged means that the identified Segment 503 should no longer be associated with the identified file. The segment may thereafter be used for storing segments of other files.

Second, File Space 502 in the Outboard File Cache 102 may be in short supply. The segment may be required to be assigned or "allocated" to a different file. The particular Segment 503 chosen depends upon the cache segment replacement algorithm implemented in the Outboard File Cache 102.

Third, the Outboard File Cache 102 may detect that a hardware condition has rendered the RAM space occupied by the segment unusable. The segment is deassigned and is thereafter unavailable for future assignment.

Deassignment of a segment may require that the data contained in the segment be copied to the Disk 106 and track with which it is associated. For example, if a segment to be deassigned contains data that does not also exist in the track with which it is directly associated, the track may need to be made current with the data contained in the segment. The data transfer is called destaging.

If the need to deassign a segment is detected and initiated by Host 10 software, the requirement to destage a segment is also determined by Host 10 software. The Outboard File Cache 102 may also initiate the deassignment of a segment, and the decision whether the segment must also be destaged is made according to the following rule: If the segment contains data that is not in its associated track, the segment must be destaged before it can be deassigned. This is initiated by sending a destage request from the Outboard File Cache 102 to the Host 10. The Host 10 responds by transferring the data in the identified segment(s) from the Outboard File Cache 102 to Disk 106. When the Host 10 has completed destaging the segment(s), the Outboard File Cache 102 may deassign the segment(s). If the segment and its associated track contain identical data, then no destaging is required and the Outboard File Cache 102 may unilaterally deassign the segment.

FIG. 19 shows the logical division between Cache File Space, Nail Space, and Resident File Space in the File Space of the Outboard File Cache. The proportion of segments allocated between Cache File Space 522, Nail Space 523, and Resident File Space 524 varies according to runtime requirements. Cache File Space is allocated segment by segment to files. As demand for Cache File Space increases, allocation of segments is managed according to a cache replacement algorithm. Segments in Resident File Space are assigned to tracks of files which are to remain in File Space for an extended period of time. For example, Resident File Space may be used for files which are accessed frequently and for data which is recovery critical. The segments in Resident File Space are not eligible for replacement by the cache replacement algorithm for Cache File Space. An overview of Cache File Space management and Resident File Space management is provided in the following paragraphs.

A segment in Cache File Space 522 may either be "nailed" or "unnailed." A nailed segment is one that is permanently stored in the Outboard File Cache 102. A nailed segment remains in Cache File Space until it is purged by a Host 10. The Outboard File Cache never initiates deassignment and destaging of a nailed segment because there is no disk space backing up a nailed segment. Nailed segments are used where Host software determines that certain segments must be in cache when accessed and should not be eligible for cache replacement, such as for recovery files. Nailed segments can only reside in Cache File Space but are not allowed to consume all of Cache File Space. The desired maximum number of nailed segments is 1000.

An unnailed segment will remain in Cache File Space 522 until any one of the following occurs:

1. The unnailed segment is purged by Host 10 software.
2. The Outboard File Cache 102 detects that the RAM occupied by the segment is unusable.
3. The Cache File Space replacement algorithm determines that the segment should be assigned to another track.
4. The Outboard File Cache determines that the segment should be removed from Cache File Space and made part of the Resident File Space 524.

Resident File Space 524 is comprised of segments which are associated with tracks of files. Once a segment in Resident File Space is assigned to a track, it will remain assigned until any one of the following occurs:

1. The segment is purged by a Host 10.
2. The Outboard File Cache 102 detects that the RAM occupied by the segment is unusable.
3. The Outboard File Cache 102 determines that the demand for Resident File Space relative to the demand for Cache File Space 522 is such that the segment should be deassigned so that it can be reallocated to Cache File Space.

Allocation of segments in Resident File Space 524 is done on a first-come first-served basis. Once all Resident File Space segments have been allocated, a segment in Cache File Space 522 is allocated. A segment in Cache File Space which is allocated to a file which has other segments in Resident File Space, is subject to the Cache File Space cache replacement algorithm. Therefore, Host 10 software which requests Resident File Space must monitor the availability and usage of Resident File Space.

FIG. 20 illustrates the File Descriptor Table. The File Descriptor Table 506 is stored and maintained by the Outboard File Cache 102 and contains information for allocation and referencing each of the segments in the File Space 502. There are n File Descriptors in the File Descriptor Table, numbered consecutively from 0 to n-1 and respectively referenced 508-0, 508-1, 508-2, . . . , 508-(n-1).

FIG. 21 shows the information contained in a File Descriptor. Each File Descriptor 508 has 16 32-bit words. The content and format of a File Descriptor is as follows:

| Word | Bit | Definition |
|---|---|---|
| 0 | 0–3 | These bits are reserved. |
| 0 | 4–7 | IXP_# identifies the last IXP which updated this File Descriptor. This flag is useful for troubleshooting. |
| 0 | 8–15 | The PATH_ID indicates the Host Interface Adapter 214 that is in the process of destaging, purging, or staging the segment. |
| 0 | 16–31 | SEGMENT FLAGS are used to indicate various characteristics of the Segment 503 referenced by the File Descriptor 508. The flags include the following: SEGMENT_WRITTEN is set when the Segment has been updated via a write command since the segment was assigned. This flag is cleared when the Segment is destaged. TOTAL_SEGMENT_VALID is set when all blocks within a Segment are valid. A segment is valid when each block in the segment contains the most recent copy of the user's data. SEGMENT_DISABLED identifies when a hardware error was discovered for the associated segment. SPECULATIVE/ORPHAN is a context sensitive flag. If the RESIDENT_FILE flag is set, then this flag indicates whether the segment is an orphan segment. If the RESIDENT_FILE flag is not set, this flag indicates whether the segment was speculatively allocated. SEGMENT_UNAVAILABLE is used to indicate whether the segment referenced by the File Descriptor is eligible for cache replacement (reassignment). If the flag is set, then cache replacement algorithm does not consider the referenced Segment for reassignment. When this flag is set, the HASH_LINK points to the next segment available for cache replacement SEGMENT_BUSY is used to indicate whether a read or write operation is in progress for the referenced Segment. The flag is set when a command is decoded, and remains set until the BLOCKS_WRITTEN_TEMPLATE has been updated. PURGE_PENDING is used to indicate that a PURGE command found the referenced Segment had been updated, and is presently waiting for the Segment to be destaged before purging the segment. DESTAGE_PENDING is used to indicate that a DESTAGE command is in process. The flag is set when a DESTAGE command is decoded and cleared when the corresponding DESTAGE COMPLETE command is decoded. STAGE_PENDING is used to indicate that a READ or WRITE command resulted in a miss condition, the Segment has been assigned, and the Segment is busy until the data has been written to the Segment. ALLOCATED_WRITE_MISS this flag indicates that the segment was assigned by either an ALLOCATE command or a WRITE command. SEQUENTIAL_SEGMENT is set when multiple Segments are staged together or where the Segment immediately preceding the Segment is a Segment with the same FILE_IDENTIFIER. The flag |

-continued

| Word | Bit | Definition |
|---|---|---|
| | | is used for determining which Segments should be destaged as a group. RESIDENT_FILE indicates whether the segment belongs to a Resident File. STICKING_MASTER indicates whether the Host 10 has specified that the Segment should have a longer lifetime in the cache than Segments whose STICKING_MASTER flag is not set. NAIL is set when a Segment is not eligible for reassignment. The Index Processor 236 sets the NAIL flag for a segment for segments which are Nailed and segments which belong to Resident files. HOSTNAIL is set when a Segment in Nail Space has been created by the ALLOCATE command. PRE-USE is set by an IXP 236 to prevent another IXP from using the Segment. This flag indicates that an IXP has reserved the segment so that the segment is immediately available for assignment by the IXP. |
| 1–2 | | FILE_IDENTIFIER identifies the File 106 to which the Segment is assigned. |
| 3 | | FILE_RELATIVE_SEGMENT_OFFSET indicates the location of the Segment relative to the first Segment in the file. |
| 4 | | HASH_LINK / BADPTR / NAIL_LINK is the pointer to the next File Descriptor in a linked list of File Descriptors. If the SEGMENT_UNAVAILABLE flag is set, the value in this field is used as the BADPTR, which is a pointer to the next Segment whose BAD_OR_UNAVAILABLE_AREA is not set. If the NAIL flag is set, then the value in this field is used as the NAIL_LINK which points to the next File Descriptor for a nailed Segment. |
| 5 | 0–20 | DATA_POINTER is the physical address in NVS 220 where the Segment is stored. It is fixed at initialization and always points to the same segment. |
| 5 | 21–27 | FLAG ANNEX contains more flags which indicate characteristics of the Segment 503 referenced by the File Descriptor 508. The flags include the following: STICKING_SLAVE is used to indicate the number of times the round robin cache replacement processing should exclude the referenced segment from consideration for replacement. DESTAGE_REPORTED is used to ensure that the IXP does not make more than one request for the Segment to be destaged. NEW is set if the Segment is within K Segments from selection for reassignment by the cache replacement algorithm. K is equal to one-half the number of Segments available in Cache File Space 522. NOTEPAD is a flag which has multiple uses. These uses will become apparent in the detailed discussion of the IXP processing. |
| 5 | 28–31 | BPID is the Back Panel Identifier associated with the NVS 220 in which the Segment is located. |
| 6–7 | | BLOCKS_WRITTEN_TEMPLATE contains one bit for each block in the segment. If a bit is set, it indicates that at some time after the segment was last destaged, the corresponding block was updated. Bit 0 of Word 6 corresponds to Block 504-0 of a Segment 503, Bit 1 of Word 6 corresponds to Block 504-1 of Segment 503, . . . , Bit 31 of Word 6 corresponds to Block 504-31 of Segment 503, Bit 0 of Word 7 corresponds to Block 504-32 of Segment 503, . . . , and Bit 31 of Word 7 corresponds to Block 504-63 of Segment 503. |
| 8 | 0–7 | HOST_ID is a value identifying the Host 10 that is in the process of destaging, purging, or staging the segment. |
| 8 | 8–15 | GROUP_ID indicates the group of Hosts 10 that are able to destage the segment. In particular, the Group Identifier is the group of Hosts 10 that have direct access to the Disks 106 identified by the LEG1_DISK_NUMBER and LEG2_DISK_NUMBER. The group of Hosts 10 identified by the Group Identifier is called a "destage group." There are three types of destage groups: local, shared, and global. If the Group Identifier equals 0, then the segment belongs to the global destage group; if the Group Identifier equals 1, then the segment belongs to a local destage group; and if 2 <= Group Identifier <= 255, then the segment belongs to a shared destage group. The number of local destage groups is equal to the number of Hosts 10 which are coupled to the Outboard File Cache 102. There are 255 possible local destage groups. A segment which is assigned to a local destage group can only be destaged by the Host 10 to which that local destage group is assigned. Note that if GROUP_ID = 1, the HOST_ID contained in the FILE_IDENTIFIER must not equal zero and must specify a connected Host 10 that is able to destage the segment. Otherwise, an error state has occurred. There are 254 possible shared destage groups. The set of Hosts 10 contained in a shared destage group is defined by the Host 10 software. The particular Hosts 10 contained in each shared destage group is dependent upon the Hosts 10 which are coupled to the Outboard File Cache 102, the Disks 106 which are shared between the Hosts 10, and the particular files shared among the Hosts 10. |
| 8 | 16–23 | FILE_SESSION is used for recovery purposes when a Host fails unexpectedly. This field is beyond the scope of this invention. |
| 8 | 24–31 | HOST_SESSION is Host Session Number in which the segment was assigned to a file belonging to the Host. The Host Session Number is used for recovery purposes when a Host fails unexpectedly. This field is beyond the scope of this invention. |
| 9 | 0–31 | LEG1_DISK_NUMBER identifies the first disk on which the segment is stored. "Leg" refers to the I/O Path on which the disk resides. |
| 10 | 0–31 | LEG2_DISK_NUMBER identifies the second disk on which the segment is stored. |
| 11 | | LEG1_DISK_ADDRESS specifies the address on the leg-1 disk at which the segment is stored. |
| 12 | | LEG2_DISK_ADDRESS specifies the address on the leg-2 disk at which the segment is stored. |
| 13–14 | | These words are unused. |
| 15 | | PROGRAM_ID identifies the Outboard File Cache program issued by a Host 10 that is in the process of destaging, purging, or staging the segment. |

4. Major Component Overview

This section provides an overview of each of the major functional components of the File Cache System. The general architecture and processing for each component is discussed, as well as an overview of the interfaces between components.

a. Host Software

The two main software components of the File Cache System are the Input/Output Software 206 and the File Cache Handler Software 208. Input/Output (I/O) Software provides the interface between Application Software 202 and the device specific software associated with each peripheral device coupled to a Host 10.

(1) Input/Output Software

FIG. 22 is a flow chart of the general processing the I/O Software performs for file requests from Application Software. The I/O Software is invoked with a operating system call which includes various I/O request parameters. Step 602 processes the input I/O request parameters. Included in the I/O request parameters is a file-identifier and a file-portion-indicator together which reference the portion of the file for which access is requested. Step 604 locates the entry in the system file descriptor table for the file having the specified File Identifer. The file descriptor table contains the type, the device on which the file is stored, and various other information for each file known to the operating system.

A cache indicator flag in the file descriptor table is used to identify when a file is cached by the File Cache System. If the cache indicator flag is set, Decision Step 606 forces Control Path 608 which leads to Step 610. Step 610 passes the I/O request parameters and control to the File Cache Handler Software 208 for further processing. If the cache indicator flag is not set, Decision Step 606 forces Control Path 612 to Decision Step 614. Decision Step 614 check whether the I/O request parameters specify that the file should be cached. If Decision Step 614 is positive, then Control Path 616 is followed to Step 618 where the cache indicator flag in the file descriptor table is set. Processing then proceeds to Step 610 which was discussed above. If the I/O request parameters do not indicate that a file should be cached, then Control Path 620 is followed to Step 622. Step 622 performs the necessary I/O processing for files which are not cached.

(2) File Cache Handler Software

FIG. 23 shows a flow chart of the FILE CACHE INTERFACE processing performed by the File Cache Handler Software. Decision Step 650 tests whether the I/O request entails a read operation which calls for reading a large amount of data from a Disk 106. For long reads, staging the data to the Outboard File Cache 102 may be inefficient, in which case Cache bypass processing is invoked at Step 651. Cache bypass processing involves the same processing which would be involved when and Outboard File Cache is not part of the data processing system.

Step 652 builds a Command Packet according to the I/O request parameters which were passed from the I/O Software 206. The various types of Command Packets are discussed later in this specification.

Step 654 selects a Program Initiation Queue (PIQ) to which a Program Initiation Packet (PIP) 456 should be queued. As was shown in FIG. 6, one or more Data Movers 110 can be coupled to the Input/Output Bus 40 of a Host 10. For each Data Mover (or "file cache unit interface"), a separate PIQ is maintained. In this manner the processing load for sending Command Packets to the Outboard File Cache 102 is distributed across multiple Data Movers 110. The selection of a PIQ is based upon the number of PIPs in the PIQ. The PIQ with the fewest active PIPs is selected to receive the PIP. If the selected Program Initiation Queue is full (indicating that all are full), then Decision Step 656 forces Control Path 658 to Step 660. At Step 660 an entry is made in an overflow queue for the specified Command Packet. When the PIQ is no longer full, processing proceeds to Step 662 for making a PIP. Likewise, if Decision Step 656 determines that the PIQ is not full, Control Path 664 is followed to Step 662.

Step 662 initializes the PIP with the address of the CP built at Step 652. Next, Step 666 retrieves a Status Packet (SP) from the Status Packet Queue (SPQ), and Step 668 initializes the PIP with the address of the SP. The address is used by the Data Mover 110 to return SP information upon completion of a command. The SP address supplied in the PIP will not necessarily be used in reporting status back on the Command Packet associated with the PIP. The SP address is merely a pointer to an available SP where status can be reported. The COMMAND_PACKET_ADDRESS in the Program Status Packet is used to associate the Status Packet with the appropriate Command Packet. After the necessary information has been entered in the PIP, the valid flag for the entry is set to indicate that the PIP references a Command Packet which is ready for processing.

Step 670 waits for a Status Packet to be returned before continuing. When a Status Packet is returned, the status information is returned to the I/O Software 206 as shown by Step 672, and control is then returned to the I/O Software.

FIG. 24 shows a flow chart of the general processing for detecting when the processing of a Command Packet (or a chain) is complete. A Global Completion Flag and a Local Completion Flag are set by the Data Mover 110 after a Program Status Packet is written to Host Main Storage 16. A single Local Completion Flag is associated with each Program Initiation Queue and Status Packet Queue. When the File Cache Handler Software 208 detects that the Global Completion Flag is set, the Local Completion Flags are tested. If any of the Local Completion Flags are set, then the first Program Status Packet in the associated Status Packet Queue is retrieved and the status processed. The completion flags are continuously monitored for status processing.

Decision Step 702 checks whether the Global Completion Flag is set. Until the Global Completion Flag is set, no processing of Outboard File Cache status information is performed. After the Global Completion Flag has been set, processing proceeds to Step 704 where the Global Completion Flag is cleared. This allows the Data Mover to set the Global Completion Flag for the next Program Status Packet it returns. Step 706 gets the first Local Completion Flag.

If the Local Completion Flag is not set, the Decision Step 708 directs control to Decision Step 710. Decision Step 710 checks whether there are any more Local Completion Flags to check. If there are, then Decision Step 710 directs control Step 712 which gets the next Local Completion Flag. After Step 712, the Local Completion Flag is checked at Decision Step 708. If all the Local Completion Flags have been checked, then Decision Step 710 returns control to Decision Step 702 for monitoring the Global Completion Flag.

If the Local Completion Flag is set, then a Program Status Packet has been returned for one of the commands referenced in the Program Initiation Queue which is associated with the Local Completion Flag. Decision Step 708 directs control to Step 714 where the Local Completion Flag is set. Step 714 clears the Local Completion Flag and proceeds to Step 716.

Step 716 retrieves the first Program Status Packet from the Status Packet Queue which is associated with the Local Completion Flag. Decision Step 718 checks the Valid Flag contained within the Program Status Packet is set. If the Valid Flag is not set, control is directed to Decision Step 710 because the Program Status Packet referenced does not contain valid data. If the Valid Flag is set, then control is directed to Step 720 for Status Processing. The particular status processing performed depends upon the particular command associated with the Program Status Packet, and the RECOMMENDED_ACTION code in the Program Status Packet. After Status Processing is complete, Step 722 retrieves the next Program Status Packet from the Status Packet Queue and returns control to Decision Step 718.

b. Data Mover (DM) and Host Interface Adapter (HIA)

FIGS. 25A and 25B respectively show the components of a Data Mover (DM) and Host Interface Adapter (HIA). FIG. 25A shows the components of a Data Mover 110. The architecture of the DM as an instance of a Microsequencer Bus Controller System shows that there are two Microsequencer Bus Controllers (uSBCs) 5002, 5004 connected to a Control Store (CS) 5006 via Lines 5008, 5010. The uSBC 0 5002 and uSBC 1 5004 are Reduced Instruction Set (RISC) microprocessors that control various special purpose gate arrays called Stations over the Micro Bus 5012. The Micro Bus 5012 is a bidirectional communications bus. The uSBCs support an instruction set with seven basic instructions in it. The instructions are of fixed length and specify either one or two operands only. The internal circuitry of the uSBCs is "hard-wired", i.e., it is not microprogrammed. The results from operations performed by uSBC 1 5004 are transferred to uSBC 0 5002 for error detection purposes over Line 5014. The Control Store 5006, consisting of seven static random access memories (SRAMs), is used to store an instruction stream that the uSBCs execute in parallel.

The I/O-Bus Controller (I/OBCT) Station 5016 handles I/O-Bus 40 arbitration and controls data transfers between other DM Stations and the I/O-Bus 40. There are two DM Stations to transfer data to the I/O-Bus 40 and two DM Stations to transfer data from the I/O-Bus. The I/O-Bus Write (I/OBWR) 0 5018 and I/OBWR 1 5020 Stations receive data from the I/O-Bus 40 via Lines 5022 and 5024, respectively. The I/O-Bus Read (I/OBRD) 0 5026 and I/OBRD 1 5028 Stations send data to the I/O-Bus 40 via Lines 5030 and 5032 respectively. The I/OBCT 5016 controls the access by these DM Stations to the I/O-Bus 40 over an interface (not shown) separate from the Micro Bus. Data is passed from I/OBWR 0 5018 and I/OBWR 1 5020 via Lines 5034 and 5036 to the Send Frame Transfer Facility (SEND FXFA) gate array 5038. The SEND FXFA 5038 packages the data into transmission packets called frames, which are passed over Line 5040 to the Light Pipe Frame Control (LPFC) gate array 5042. The LPFC 5042 sends the frame over Lines 5044 and 5046 to dual PLAYER+Physical Layer Controllers, consisting of PLAYER+0 5048 and PLAYER+1 5050, which are commercially available from National Semiconductor Corporation. The PLAYER+0 5048 and PLAYER+1 5050 transmit frames over Fiber Optic Links 5052 and 5054 to the HIA 214.

When the HIA 214 sends frames to the DM 110, PLAYER+0 5048 and PLAYER+1 5050 receive the frames over Fiber Optic Links 5056 and 5058. The PLAYER+0 5048 component forwards its frame over Line 5060 to the LPFC 5042. Similarly, the PLAYER+1 5050 component forwards its frame over Line 5062 to the LPFC. The LPFC sends the frames via Line 5064 to the Receive Frame Transfer Facility (REC FXFA) gate array 5066, which unpacks the data and stores it in I/OBRD 0 5026 and I/OBRD 1 5028 via Line 5068. The REC FXFA 5066 sends an acknowledgment for the data transfer to the SEND FXFA 5038 over Line 5072.

FIG. 25B shows the components of a Host Interface Adaptor. The architecture of the HIA 214 as an instance of a Microsequencer Bus Controller System shows that there are two uSBCs 5074, 5076 connected to a Control Store 5078 via Lines 5080, 5082, respectively. The uSBCs 5074, 5076 access the HIA Stations via the Micro Bus 5078. The PLAYER+0 5086 and PLAYER+1 5088 components receive frames over Fiber Optic Links 5052 and 5054, respectively. PLAYER+0 5086 forwards its frame to LPFC 5090 over Line 5092. Similarly, PLAYER+1 5088 forwards its frame to LPFC 5090 over Line 5094. The LPFC 5090 transfers the frames to the Receive Frame Transfer Facility (REC FXFA) 5096 over Line 5098. The REC FXFA 5096 unpacks the frames and stores control information in the Request Status Control Table 0 (RSCT) 5100 and the RSCT 1 5102 Stations via Line 5104. The RSCT 0 and RSCT 1 Stations monitor the data that has been received from the DM 110. The data which was contained in the frame received by the REC FXFA 5096 is sent to the Database Interface (DBIF) Station 5106 over Line 5104. The DBIF 5106 forwards the data over Line 5108 to the Street 234.

Data received by the DBIF 5106 over Line 5110 from the Street 234 is sent to the Send Frame Transfer Facility (SEND FXFA) 5112 via Line 5114. Control information received over Line 5110 from the Street is sent to RSCT 0 5100 and RSCT 1 5102 over Line 5116. The SEND FXFA 5112 takes this data and control information from RSCT 0 5100 and RSCT 1 5102 via Line 5118 and formats a frame for transmission by the LPFC 5090. Acknowledgements from REC FXFA 5096 are received by SEND FXFA 5112 over Line 5120. The frame is forwarded over line 5122 to the LPFC 5090. The LPFC 5090 creates two frames from the frame it received and sends one frame to PLAYER+0 5086 over Line 5124 and the other frame to PLAYER+1 5088 over Line 5126. The frames are then transmitted over the Fiber Optic Links 5056 and 5058 to the DM 110.

The uSBCs 5002, 5004, 5074, 5076 and the Micro Busses 5012, 5084 manipulate data in the system according to a hardware mode pin setting. When the mode pin is set, the Microsequencer Bus Controller System instance is a DM 110 operating on 36-bit data words in communicating with its Stations. When the mode pin is clear, the Microsequencer Bus Controller System is a HIA 214 operating on 32-bit data words in communicating with its Stations.

c. Index Processor (IXP)

The Index Processor (IXP) 236 manages the File Space 502 of the Outboard File Cache 102. The IXP performs the logical to physical address mapping for file access commands, as well a providing overall cache control functions. Cache control functions include tracking which file segments are present in the File Cache and selecting a segment to assigned to a file. The IXP provides for initiating destaging selected segments and manages conflicts for access to the same segment. Protection against one file monopolizing cache is provided, as well as a recovery mechanism in the event that one of the IXPs **236*a* or 236*b* fails. While the IXP does not perform the actual data transfer from NVS 220 to a Host 10**, it does provide for set-up and control of the data transfer activity.

FIG. 26 is a functional block diagram of the Index Processor (IXP). The IXP 236 communicates with the other components of the Outboard File Cache 102 via the Street 234. Interface Line 5802 connects the Master Micro-engine 5804 to the Street. Interface Line 5802 consists of 20 read signal lines. The 20 read signal lines include sixteen data lines, one parity line, one request line, one available line, and one acknowledge line. Similarly, Interface Line 5806 consists of 20 write signal lines. The write signal lines include sixteen data lines, one parity line, one request line, one available line, and one acknowledge line.

The IXP 236 includes two Micro-engines 5804 and 5808. Each Micro-engine operates at a 10 MIP rate and each includes a 32 function ALU for performing arithmetic and logical functions. Each micro-instruction has the ability to read from the respective Local Store 5810 or 5812, execute an ALU cycle, and store the results in the respective Local Store.

The Micro-engines 5804 and 5808 are special purpose RISC microprocessors that interface with the Street 234 via Lines 5802 and 5806, together referenced as 5814. The Micro-engines execute an instruction stream that is stored in the Control Store 5816, a high speed static random access memory (SRAM). The instruction stream is written into the Control Store at system initialization time. The instruction stream is fetched by Master Micro-engine 5804 from the Control Store over Line 5818. The same instruction stream is fetched by the Slave Micro-engine 5808 from the Control Store over Line 5820. The Master and Slave Micro-engines execute the same instructions at the same time but only the Master Micro-engine writes data to the Street via Line 5802. Results of operations performed by the Slave Micro-engine are forwarded over Line 5822 to the Master Micro-engine where they are compared with the results of operations performed by the Master Micro-engine to detect any possible errors or loss of program control.

FIG. 27 is a flow chart of the main processing loop of the IXP 236. Each IXP is assigned a distinct IXP Number. Decision Step 5852 tests whether the IXP 236 performing decision Step 5852 is assigned the lowest IXP Number. Only the IXP with the current lowest IXP Number monitors Nail Space 523 and Resident File Space 524 for purposes of reapportioning File Space 502.

Control is directed to decision Step 5854 if the IXP 236 is the lowest numbered IXP. File Space 502 is reapportioned, if necessary, every five days. Decision Step 5854 tests whether the five day timer has elapsed. Control is directed to Step 5856 to invoke LESS-NAIL processing when the five day timer has elapsed. LESS-NAIL processing converts segments from Nail Space to Cache File Space 522. Similarly, Step 5858 invokes LESS-XRF processing to convert segments from Resident File Space 524 to Cache File Space.

At Step 5860 the IXP obtains an entry from the Activity Queue 346. The IXP retrieving the entry from the Activity Queue must coordinate with any other IXPs which are part of the Outboard File Cache 102 because the Activity Queue is shared amongst all the IXPs. If an entry from the Activity Queue was requested from an earlier iteration of the main processing loop, Step 5860 does not attempt to read another Activity Queue entry.

Step 5862 requests that the HIA 214 send to the IXP 236 the Command Packet 452 corresponding to the entry obtained from the Activity Queue 346. The entry retrieved will indicate the particular HIA 214 from which the Command Packet should be requested. The main processing loop of the IXP does not sit idle while waiting for a Command Packet from the HIA. Therefore, processing continues at decision Step 5864 after a Command Packet is requested from a HIA at Step 5862. Note that Step 5862 will not request another Command Packet if it has already has an outstanding request to a HIA.

Decision Step 5864 tests whether eight segments have been reserved by the IXP 236 for use in the event that a miss condition is detected while processing a command. Each of the IXPs attempts to have eight segments reserved so that when a miss condition is detected the IXP may immediately assign one or more of its reserved segments rather than waiting until a miss has occurred to select segments for assignment. This enhances the rate at which file access commands are honored. If eight segments are already reserved, decision Step 5864 directs control around Step 5866. Step 5866 invokes PREUSE processing to reserve a segment for future use.

Decision Step 5868 tests whether a Command Packet 452 has been received from the HIA 214. If no Command Packet is present to process, control is returned to Step 5860 to obtain an entry form the Activity Queue 346 if necessary. Similarly, Step 5862 only requests a Command Packet from the HIA if one has not already been requested. Control is directed to decision Step 5870 if decision Step 5868 finds that a Command Packet is present for processing.

If the command in the Command Packet 452 is a type that requires searching File Space 502 for referenced segments, decision Step 5870 directs control to Step 5872. Step 5872 invokes HASH processing to find the index in the Hash Table 6000 for the segment addressed by the command. Using the Hash Table entry found at Step 5872, Decision Step 5874 tests whether a lock was granted on the group of eight Hash Table entries which references the first segment referenced by the command. If the lock was not granted, control is directed to Step 5876 where a lock is requested at some later time. Once a lock is granted, Step 5878 reads the File Descriptor 508 from the File Descriptor Table 506. Step 5880 invokes COMMAND-BRANCH processing to decode the command in the Command Packet and invoke the necessary processing for performing the required operations.

d. Storage Interface Controller (SICT)

The Storage Interface Controller (SICT) 228 is the interface control between the Street 234 and the Non-volatile Storage (NVS) 220. The SICT has four basic interfaces, a receiver interface from the Street, transmit interfaces to NVS in each Power Domain 225, receiver interfaces from NVS in each Power Domain, a transmit interface to the Street, and clock and scan/set interfaces.

The first basic function of the SICT is to receive requests from the Street 234, verify their validity, and pass them on to the NVS 220. It must also save packet information so that functional differences can be detected and that status and data can be routed back to the proper requester (either an IXP 236 or a HIA 214).

The second basic function is to receive data from the NVS 220, reassemble it into packets, and transmit the requested data back over the Street 234 to the requester. In the process of receiving data from the NVS arrays the SICT must correct for NVS multiple bit errors, card failures, detect and report error status information, and generate packet headers and checksums.

The third and last basic function is to provide an interface to the NVS 220 for maintenance requests to the storage. Examples include initialization, restoration, and general reading and writing of data.

Write requests received via the Street 234 are sent on to the NVS 220 as interface timing allows. The SICT 228 will buffer a maximum of eight requests if the NVS interface is not immediately available. As the request is being transmitted to the NVS, the requester's identification and location are saved for later use so that data can be returned to the requester. Write requests are normally sent to the NVS in each Power Domain 225. The SICT will wait for an acknowledge from the NVS in each Power Domain before proceeding with the next write request.

Read requests received via the Street 234 are handled in much the same manner as are write requests. The difference is that data read from NVS 220 is returned to the requester via the Street 234.

e. Non-volatile Storage (NVS)

Non-volatile Storage 220 consists of from one to five NVS array cards within each of the Power Domains 225. The two Power Domains always contain the same number of NVS array cards. The data may be stored across one to four of the NVS array cards with a fifth array card which stores a check sum of the data in the other array cards.

Each NVS array card contains a four port 40 bit storage array plus single bit error correction, double bit error detection, data buffering, interface, priority, clock, and maintenance logic. The logic will resolve simultaneous requests from each port while maintaining a maximum band pass of one word every 100 ns. The four port interfaces each consist of a nineteen bit parity protected serial input bus, a four bit parity protected serial read data bus, an error line, and a valid line. Error Correction Codes are generated on the data and address by the NVS gate array for write requests and checked and/or corrected by the NVS gate array during read requests. Each NVS array card includes 320 DRAM storage devices, wherein the capacity of the storage devices is either 4MB, 16MB, or 64MB.

f. Street Interprocessor Network

FIG. 28 is a block diagram to further illustrate the functional components of the Street interprocessor communication and storage access network within the Outboard File Cache. While FIG. 28 illustrates a configuration with four IxPs and HIAs, larger configurations are contemplated and the configuration shown is merely illustrative. The Street spans Power Domains 225*a* and 225*b* and allows IXPs 236 and HIAs 214 to read and write data to and from NVSs 220 by sending requests to the SICTs 228. Additionally, each IXP may communicate with each of the other HIAs. For example, IXP 236*a* may send data packets to HIAs 214*a*, 214*b*, 214*c*, and 214*d*. Likewise, HIAs 214*a*, 214*b*, 214*c*, and 214*d* may send data packets to each of the IXPs 236*a*, 236*b*, 326*c*, and 236*d*.

The Street 234 is implemented using VSLI gate arrays referred to as HUBs. A HUB0 728 (728*a*, 728*b*, 728*c*, and 728*d*) provides an interface to the Street 234 for one IXP 236/HIA 214 pair. The respective interfaces are provided via Lines 5130 and 5814. The IXPs and HIAs send and receive data packets via their associated HUB0.

Each HUB has five interfaces to route data packets. The five interfaces for a HUB0 728 include: an IXP interface, a HIA interface, an Up street interface, a Down street interface, and a HUB1 730 interface. The IXP interface (not explicitly shown) routes data packets to and from and IXP 236 via line 5714. The HIA interface (not explicitly shown) routes data packets to and from HIA 214 via Line 5130.

The Up street interface (not explicitly shown) receives data packets from another HUB0 and routes the data packet via the Up street interface to another HUB0 if necessary. For example, HUB0 728*c* receives data packets on its Up street interface via Line 740. If the data packet is addressed to either IXP 236*c* or HIA 214*c*, the data packet is directed to the respective component. If the data packet is addressed to HIA 214*a* or IXP 236*a*, the data packet is directed by the Up street interface via Line 742 to the Up street interface for HUB0 728*a*. The Down street interface operates in a similar fashion. The HUB1 interface in a HUB0 728 sends and receives data packets to and from a HUB1 730.

The five interfaces for a HUB1 include: a HUB0 interface for sending and receiving data packets from HUB0, a SICT interface for sending and receiving data packets from the SICT, an Up Street interface, a Down Street interface, and a Cross-over interface.

It should be noted that a data packet sent from an IXP or HIA to an SICT is directed along the portion of the Street controlled by HUB0s 728 until the data packet reaches the particular HUB0 which is directly coupled to the HUB1 730 which is directly coupled to the SICT. Whereas a data packet sent from a SICT to either an IXP or HIA is directed along the portion of the Street controlled by HUB1s 730 until the data packet reaches the particular HUB1 which is directly coupled to the HUB0 which provides the Street interface for the IXP or HIA to which the data packet is addressed.

The Cross-over interfaces of the HUB1s 730 provide for data packet re-routing in the event that an error condition prevents transmission of a data packet along the normal Up street or Down street. The Cross-over interfaces of HUB1 730*a* and HUB1 730*b* are coupled via Line 238*a* and the Cross-over interfaces of HUB1 730*c* and HUB1 730*d* are coupled via Line 238*b*. The Cross-over interfaces allow for rerouting of data packets traveling on the portion of the Street 234 controlled by HUB1s 730 and for rerouting of data packets traveling on the portion of the Street controlled by HUB0s 728. For example, a data packet at the Up street interface of HUB0 728*c* which is to be sent to HUB0 728*a* may be redirected to the Up street interface of HUB0 728*d* via HUB1 730*c* and HUB1 730*d* if HUB0 728*a* is unable to receive on its Up street interface a data packet from HUB0 728*c*.

5. Multi-Host Capability

The multi-host capabilities of the File Cache System include sharing the Outboard File Cache 102 among multiple Hosts 10, and sharing selected ones of Files 114*a*–*h* among multiple Hosts. Storage management and locking control processes implemented in the Outboard File Cache 102 provide this functionality.

FIG. 29 is an block diagram illustrating a data processing configuration including a plurality of Hosts coupled to a Outboard File Cache. The exemplary configuration includes three Hosts 10*a*, 10*b*, and 10*c*. Each of the Hosts is coupled to a Control Unit 104, thereby providing access to one or more Disks 106. In the exemplary configuration, Hosts 10*a* and 10*b* share access to one or more Disks designated as 106*a* via Control Unit 104*a*. Host 10*c* has access to one or more Disks designated as 106*b* via Control Unit 104*b*.

It should be understood that while only three Hosts are illustrated, the Outboard File Cache provides up to 64 HIAs 214 thereby yielding a total of 32 redundant Host connections. For each Host, the Outboard File Cache has two available Host Interface Adapters (HIAs) 214. The first HIA provided for a Host resides in Power Domain 225*a*, and the second HIA provided for a Host resides in Power Domain 225*b*. HIAs 214*a* and 214*b* provide access to the Outboard File Cache for Host 10*a*, wherein HIA 214*a* resides in Power Domain 225*a*, and HIA 214*b* resides in Power Domain 225*b*. Fiber Optic Links 112*a* and 112*b* respectively couple HIAs 214*a* and 214*b* to their associated Data Movers (DMs) 110 in the I/O Complex 32. Similarly, HIAs 214*c* and 214*d* are provided for Host 10*b*, wherein Fiber Optic Links 112*c* and 112*d* couple the Host 10*b* to the Outboard File Cache 102. Host 10*c* is coupled to the Outboard File Cache in a similar fashion.

For each HIA 214*a*–*f* included in the exemplary configuration, an IndeX Processor (IXP) 236 is provided. It should be noted that any one of the Index Processors 236*a*–*f* may process commands sent through any one of the HIAs 214*a*–*f*. When an additional HIA is provided in the Outboard File Cache 102, an additional IXP is also added to provide extra processing capacity. Thus, any one of the IXPs 214*a*–*f* may interact with anyone of the HIAs 214*a*–*f*. For example, an Command Packet 452 may be sent from Host 10*a* via Fiber Optic Link 112*a* and HIA 214*a*, and then processed by IXP 236*f*.

Cache storage in the Outboard File Cache 102 is provided the Storage Interface ConTrollers (SICTs) and Non-Volatile Storage modules (NVS) as represented by blocks 732*a*, 732*b*, and 732*c*. Each of blocks 732*a*–*c* represent a pair of SICTs (shown as 228*a* and 228*b* in FIG. 6) and a Non-Volatile Storage Module (shown as 220 in FIG. 6). Memory management functionality is provided by IXPs 236*a*–*f*.

Streets 234*a* and 234*b* provide interprocessor communication facilities between HIAs 214*a*–*f* and IXPs 236*a*–*f*, as well as data transfer capabilities between the Storage 732*a*–*c* and the HIAs and IXPs. For each HIA-IXP pair in the configuration, there is an associated Crossover 238*a*–*c* for routing data and requests.

D. File Cache Handler Software Detailed Description

This portion of the specification describes the File Cache Handler Software 208 in terms of the commands sent to the Outboard File Cache 102 for processing. Some of the commands are initiated when Application Software 202 references a file and an I/O request is generated by I/O Software 206, and others of the commands are used and generated by the File Cache Handler Software 208 in responding to status' returned from the Outboard File Cache 102. Each of the commands has command specific information which must be sent to the Outboard File Cache 102. As discussed earlier, a Command Packet is used to send command information to the Outboard File Cache 102.

The following discussion is organized in the following manner. The description begins with an overview of data transfer operations. Following the data transfer overview, the Command Packets involved in effecting the data transfer are described. Along with the description of each Command Packet, the associated Program Status Packet which is returned from the Outboard File Cache 102 is also described. Descriptions of the processing performed as a result of the status' are also provided. The processing performed by the Outboard File Cache 102 for each command is explained in the "Index Processor Detailed Description" below.

1. Data Transfer

A data transfer operation involves transferring data residing in Host 10 Main Storage 16 to the Outboard File Cache 102 or transferring data residing in the Outboard File Cache 102 to a Host 10. If the data transfer is from the Outboard File Cache 102 to a Host 10, it is generically called a "read" operation. If the data transfer is from a Host 10 to the Outboard File Cache 102, it is generically called a "write" operation. Although the READ and WRITE commands are respectively used to effect read and write operations, the specific commands should not be confused with the generic operations. Read and write operations may be performed by other commands.

2. Host Local Buffers and Outboard File Cache Buffer

"Buffer" refers to the logical structure in which data resides in either Main Storage 16 or Outboard File Cache 102. A buffer always contains an integral number of words, wherein each word contains 36 bits. If a buffer resides in Host 10 Main Storage 16, it is referred to as a "Host Local Buffer." A buffer in the Outboard File Cache 102 is called an "Cache Buffer." Host Local Buffers contain an integral number of words, and Cache Buffers contain an integral number of Blocks, wherein each block contains 28 words.

A data transfer operation is initiated by sending the appropriate data transfer command to the Outboard File Cache 102. A data transfer command may specify one Cache Buffer and one or more Host Local Buffers. This provides the ability to gather together multiple non-contiguous Host Local Buffers and write them into a single Cache Buffer ("gather write"). This also provides the capability to read a single Cache Buffer 102 and scatter it into multiple non-contiguous Host Local Buffers ("scatter read").

The number of words transferred is always equal to the number of words in the Cache Buffer referenced by the particular data transfer command. Therefore, the number of words transferred is always an integral multiple of 28. Data is transferred sequentially to or from the Cache Buffer beginning with the first word in the first block of the Cache Buffer and ending with the last word within the last block.

3. DATA_DESCRIPTOR_WORD and Data Chain

The parameters passed to the Outboard File Cache 102 include a Cache Buffer location, a block count, and a DATA_DESCRIPTOR_WORD. The Cache Buffer location parameter indicates the location in Outboard File Cache memory where reading or writing is to begin. Its actual value will depend upon the specific command initiating the data transfer. The block count parameter specifies the number of blocks contained in the Cache Buffer. The DDW contains the first DDW in the data chain.

FIGS. 30 and 31 illustrate the relationship between Host Local Buffers, a Cache Buffer, and a Data Chain. FIG. 30 illustrates the relationship in the context of a read operation, and FIG. 31 illustrates the relationship in the context of a write operation. In FIG. 30, a Data Chain 802 consists of a set of DDWs, respectively referenced as 802-1, 802-2, 803-3, . . . , 802-n. As shown in FIGS. 32 and 33, the implementation of a Data Chain 802 involves a linked list of Data Chain Packets (DCPs) 862-1 through 862-m. Therefore, a DDW may point to a DCP 862 or a Host Local Buffer. DDWs which do not point to DCPs are referred to as "Non-pointer" DDWs in FIG. 30.

Each of the Non-pointer DDWs in the Data Chain 802 points to one of the Host Local Buffers. For example, the first Non-pointer DDW 802-1 points to the first Host Buffer 806-1 as indicated by line 804-1. DDW 802-1 also specifies the number of words to transfer from the Cache Buffer 808 to the first Host Buffer 806-1. Line 809-1 illustrates the flow of data from the referenced portion of the Cache Buffer 808, as shown by block 808-1, to the first Host Buffer 806-1. Note that the particular command effecting the data transfer will indicate the appropriate Cache Buffer 808.

In processing a Data Chain 802, the Outboard File Cache 102 maintains a Cache Buffer Pointer for transferring data. The Cache Buffer Pointer points to the current location in the Cache Buffer 808 at which data is being transferred. As each word is transferred to or from the Cache Buffer 808, the Cache Buffer Pointer is updated to point to the next word in the Cache Buffer 808.

After completing the data transfer of the number of words specified in the first DDW 804-1, the second DDW 802-2 is processed. DDWs may also specify that some words in the Cache Buffer 808 should be skipped, as illustrated by DDW 802-2. To skip data, the DDW includes a Skip Data flag and the number of words in the Cache Buffer 808 to skip. If m words are specified to be skipped, the Cache Buffer Pointer is incremented by m, and the m words are not transferred to a Host Local Buffer 806-2. Block 808-2 in the Cache Buffer 808 represents the m words which were skipped.

Processing of DDWs 802 continues in this manner until all of the DDWs in the Data Chain 802 have been processed.

FIG. 31 illustrates the relationship between a Data Chain, Host Local Buffers, and a Cache Buffer in the context of a write operation. The first Non-pointer DDW 832-1 points to the First Host Buffer 834-1 as shown by line 836-1. The First Host Buffer 834-1 holds the data which is to be written to Cache Buffer 836. Block 838-1 in Cache Buffer 838 represents where the data stored in Host Buffer 834-1 will be written. The transfer of data from Host Buffer 834-1 to Cache Buffer 838 is shown by line 840-1. A Cache Buffer Pointer is updated as each word from a Host Local Buffer 834 is transferred to the Cache Buffer 838. Each DDW 832 in the Data Chain 802 is processed in succession and processing of the Data Chain is complete when the contents of the Last Host Buffer 834-n has been transferred to the corresponding section 838-n in the Cache Buffer.

FIGS. 32, 33, and 34 respectively illustrate the implementation of the Data Chain, Data Chain Packet, and Data Descriptor Word. FIG. 32 illustrates the Data Chain 802. The pointer to first DCP 862-1 is stored in the DDW 864 in the Command Packet 452. The number of DCPs in the Data Chain varies according to the amount of non-contiguous data to be transferred. The Last DDW 866-1 in each DCP 862-1 points to the next DCP as shown by line 868-1. The Last DCP 862-m contains the final set of DDWs to process. The Last DDW 866-x in the Last DCP 862-m does not point to another DCP, but does point to a Host Buffer 806 or 834.

FIG. 33 illustrates the format of a Data Chain Packet (DCP) 862. The DCP contains a set of DDWs, respectively referenced 870-1, . . . , 870-??, as explained above. Two words of storage are required for a DDW. There are a maximum of 16 DDWs per DCP.

FIG. 34 shows the format and content of a DATA_DESCRIPTOR_WORD. The following table explains each of the fields in a DATA_DESCRIPTOR_WORD 870:

| Word | Bit | Definition |
|---|---|---|
| 0 | 0–17 | WORD_COUNT 870a is the number of words that will be transferred to or from the Outboard File Cache 102. If the DDW's DAC field specifies anything other than data chain pointer, WORD_COUNT is non-zero. If DAC 870c specifies a data chain pointer, WORD_COUNT is ignored. |
| 0 | 18 | DC 870b is the Data Chain Flag. If DC=0, then data chaining is not in effect. If DC=1, then data chaining is in effect. The DC in the DDW which is contained in a Command Packet is always equal to 0. Other than the DDW contained in a Command Packet, if DAC specifies data chain pointer, the DC is ignored. |
| 0 | 19–21 | DAC 870c is the Data Address Control which indicates how the ADDRESS field is interpreted. DAC=0 indicates that the data address is to be incremented in performing the data transfer. The ADDRESS contains the real address of the first word of a Host Local Buffer. DAC=1 indicates that the data address is to be decremented in performing the data transfer. ADDRESS contains the real address of the last word of a Host Local Buffer. DAC=2 indicates that ADDRESS contains the real address of a Host Local Buffer consisting of a single word and that no incrementing or decrementing of the ADDRESS takes place when the word is transferred. DAC=3 indicates that the contents of ADDRESS is ignored. That is, no data transfer takes place and words in the Cache Buffer are skipped according to the number specified by WORD_COUNT. DAC=3 does not apply to write operations. This is the Skip Data flag referenced earlier DAC=4 indicates that the ADDRESS contains the real address of the next DDW in the data chain. This type of DDW is also called a "pointer DDW". A pointer DDW cannot point to another pointer DDW. |
| 0 | 22–35 | Is referenced as 870d and is reserved. |
| 1 | 0–35 | ADDRESS 870e indicates the real address of a word in host local memory. See the description of the DAC field for an explanation of how the ADDRESS may be interpreted. |

4. Status Processing

FIGS. 35A and 35B illustrate the general status processing which is invoked from the Completion Monitor processing. This section describes the general status processing and the particular RECOMMENDED_ACTIONS which may be returned from the Outboard File Cache 102. The following RECOMMENDED_ACTIONS may be returned from the Outboard File Cache 102:

No Action Required—indicates that processing of the command was performed without error and the Host 10 is not required to take any special action.

Destage Data and then Resend—indicates that a burst of sequential writes to the same file has been detected which could cause excessive destage queuing to a single disk. The data identified in the Destage Request Packet should be destaged and the original command resent.

Iterate—indicates that the command completed part but not all of its required processing. After the required processing associated with the Status Packet is complete, the Command Packet is updated with the appropriate parameter and resent to the Outboard File Cache. For some commands, such as CLEAR PENDING, every segment in the Outboard File Cache must be searched. Because this is a lengthy process, it may be broken up into smaller pieces with the Iterate RECOMMENDED_ACTION.

Purge Disabled Segments and then Resend—indicates that a destage command encountered one or more disabled segments. The disabled segments should be purged and then the destage process resumed.

Resend—indicates that a temporary condition exists which prevents the command from being processed and the Command Packet should be resent Send CLEAR PENDING Followed by Original Command—indicates that segments addressed by a STAGE BLOCKS, or STAGE WITHOUT DATA command are not assigned in the Outboard File Cache 102. This may occur when the original WRITE or WRITE OFF BLOCK BOUNDARY command causes the segments to be placed in a STAGE PENDING state and before the appropriate STAGE command arrived, the segments were reassigned to a different file. This could occur if Cache File Space 502 becomes tight.

Stage Data—indicates that one or more segments addressed by a command are not resident in the Outboard File Cache 102 (a miss condition was detected), and the data should be read from disk and written to the Outboard File Cache 102.

Stage Data and Log No Resident File Space Condition—indicates that a command referenced a file in Resident File Space 524 and a miss condition was detected. Some or all of the missing segments were allocated in Cache File Space 522. This status may also be returned from the Outboard File Cache in response to a WRITE command. The processing associated with this RECOMMENDED_ACTION is described in the WRITE Status Processing Section.

Down File Cache Interface—indicates that the interface associated with a particular Program Initiation Queue is not available for transferring data to or from the Outboard File Cache, and the Program Initiation Queue and Status Packet Queue associated with the interface should no longer be used.

Down Outboard File Cache—indicates that the Outboard File Cache is unusable.

Processing begins with Decision Step 902 checking whether there are any Destage Request Packets to process. This is accomplished by testing the DESTAGE_REQUEST_PACKETS flag 4601 in the Status Packet. If it is set, processing proceeds to Step 904. At Step 904, the DESTAGE_REQUEST_PACKET_COUNT **894*b* in the Status Packet is used to determine the number of Destage Request Packets 896. For each of the Destage Request Packets in the Status Packet, an entry is made in an input queue for the Destage Process. The Destage Process recognizes the PRIORITY_DESTAGE flag and gives the destage request priority. The Destage Process manages destaging segments referenced by the queued Destage Request Packets from Outboard File Cache 102 to Disks 106**.

After enqueuing any Destage Request Packets, processing proceeds to Decision Step 906. There is a test for each of the possible RECOMMENDED_ACTIONS returned from the Outboard File Cache 102. Decision Step 906 determines whether the RECOMMENDED_ACTION is "No Action Required." The "No Action Required" RECOMMENDED_ACTION may be returned in response to any of the different types of Command Packets and indicates that a normal completion status may be returned to the requester. If RECOMMENDED_ACTION ="No Action Required," then control is followed to Step 908. Step 908 returns a status to the File Cache Interface processing which is waiting for the status. Processing then proceeds to Step 910. The Status Packet is returned to the Status Packet Queue at Step 910 so that it can be used by a subsequent command. Control Path 910p is followed to Step 912 to return control to Completion Monitor processing.

Decision Step 914 tests whether the RECOMMENDED_ACTION in the Program Status Packet is equal to "Destage Data and then Resend." The "Destage Data and then Resend" RECOMMENDED_ACTION is only returned in response to a WRITE command. The "Destage Data and then Resend" RECOMMENDED_ACTION is returned from the Outboard File Cache 102 when it has detected a burst of sequential writes to the same file. The burst of sequential writes could cause excessive destage queuing to a single disk. The File Cache Handler Software 208 must destage the data identified in the Destage Request Packets and then resend the command. If the RECOMMENDED_ACTION is equal to "Destage Data and then Resend," then processing proceeds to Step 916 for invoking Resend processing. Any necessary destaging was handled at Step 904, so the only remaining processing for this RECOMMENDED_ACTION is to resend the command to the Outboard File Cache 102.

Decision Step 918 determines whether the RECOMMENDED_ACTION is equal to "Iterate." The "Iterate" RECOMMENDED_ACTION is returned in response to any of the following commands: CLEAR PENDING, DESTAGE AND PURGE DISK, DESTAGE AND PURGE FILE, DESTAGE AND PURGE FILES BY ATTRIBUTES, PURGE DISK, PURGE FILE, PURGE FILES BY ATTRIBUTES, and RETURN SEGMENT STATE. The Iterate RECOMMENDED_ACTION is returned when the Outboard File Cache could not process all the requested segments at one time. Generally, the command is resent with updated parameters addressing the segments not yet processed. If the RECOMMENDED_ACTION= "Iterate," then processing proceeds to Step 920. Step 920 returns the Status Packet and control to the processing which resulted in the Iterate. The particular processing performed depends upon the command for which it was returned (CLEAR PENDING, DESTAGE AND PURGE DISK, DESTAGE AND PURGE FILE, DESTAGE AND PURGE FILES BY ATTRIBUTES, and RETURN SEGMENT STATE).

Decision Step 922 checks whether the RECOMMENDED_ACTION is equal to "Purge Disabled Segments and then Resend." "Purge Disabled Segments and then Resend" is returned in response to any of the following commands: DESTAGE, DESTAGE AND PURGE DISK, DESTAGE AND PURGE FILE, and DESTAGE AND PURGE FILES BY ATTRIBUTES. This RECOMMENDED_ACTION is returned from the Outboard File Cache when it has detected that the identified segments in cache are no longer addressable. The Host 10 must take the appropriate actions if this occurs. If the RECOMMENDED_ACTION="Purge Disabled Segments and then Resend," then processing proceeds to Step 924 for Purge Disabled Segments and then Resend processing.

Decision Step 930 checks whether the RECOMMENDED_ACTION="Resend." "Resend" may be returned from the Outboard File Cache in response to any one of the following commands: ALLOCATE, LOCK CACHE FILE, LOCK CACHE FILES BY ATTRIBUTES, MODIFY File Descriptor, READ, STAGE BLOCKS, WRITE, or WRITE OFF BLOCK BOUNDARY. The Resend RECOMMENDED_ACTION indicates that the Outboard File Cache could not process the command at the time it was sent because of a conflict. The Host 10 should resend the original command to the Outboard File Cache 102. If the RECOMMENDED_ACTION is "Resend," then processing proceeds to Step 932 for Resend processing.

Decision Step 934 tests whether the RECOMMENDED_ACTION="Send CLEAR PENDING Followed by Original Command." This RECOMMENDED_ACTION may be returned in response to either the STAGE BLOCKS or the STAGE WITHOUT DATA command. This RECOMMENDED_ACTION may not be returned in response to a STAGE SEGMENTS command because STAGE SEGMENTS may only address segments which are not in a pending state, whereas the STAGE BLOCKS and STAGE WITHOUT DATA commands may reference segments in a pending state. When this RECOMMENDED_ACTION is returned, processing proceeds to Step 936 for Send CLEAR PENDING Following by the Original Command processing.

Decision Step 938 checks whether the RECOMMENDED_ACTION="Stage Data." "Stage Data" may be returned from the Outboard File Cache 102 in response to either the READ, WRITE, or WRITE OFF BLOCK BOUNDARY command. If this RECOMMENDED_ACTION is detected, processing proceeds to Step 940 for Stage Data processing.

Decision Step 942 tests whether the RECOMMENDED_ACTION="Stage Data and Log No Resident File Space Condition." This RECOMMENDED_ACTION may be returned in response to either the READ, WRITE, or WRITE OFF BLOCK BOUNDARY command. This RECOMMENDED_ACTION is returned to indicate that Resident File Space 524 is full and the segments addressed by the command were allocated as Cache File Space 522. The desired performance level expected for resident files may be adversely impacted if this RECOMMENDED_ACTION is returned. If this RECOMMENDED_ACTION is detected, processing proceeds to Step 944 for Stage Data and Log No Resident File Space Condition processing.

Decision Step 946 tests whether the RECOMMENDED_ACTION="Down File Cache Interface." This RECOMMENDED_ACTION may be returned in response to any command. Step 948 invokes Down File Cache Interface processing if this RECOMMENDED_ACTION is detected.

Decision Step 950 tests whether the RECOMMENDED_ACTION="Down Outboard File Cache." This RECOMMENDED_ACTION may be returned in response to any command. If Down Outboard File Cache is detected, Step 952 invokes Down Outboard File Cache processing for removing recoverable data from the Outboard File Cache and removing the Outboard File Cache from the operating system configuration.

FIG. 36 is a flowchart showing the processing which occurs when the "Resend" RECOMMENDED_ACTION is returned from the Outboard File Cache. If the RECOVERY_TIME specified in the Status Packet is greater than 0, then Decision 1098 forces control to Step 1100. Step 1100 suspends processing until the number of six second intervals indicated by RECOVERY_TIME has elapsed. Processing continues when the necessary recovery time has elapsed.

Step 1102 selects a Program Initiation Queue (PIQ) 310 to which a Program Initiation Packet (PIP) 456 should be queued. The selection of a PIQ is based upon the number of PIPs in the PIQ. The PIQ with the fewest active PIPs is selected to receive the PIP. If the selected PIQ is full, then decision Step 1104 forces Control Path 1104y to Step 1106. Step 1106 makes an entry for the specified Command Packet is made in an overflow queue. When a PIQ is no longer full, the entry is dequeued from the overflow queue and entered in the available PIQ. Processing proceeds to Step 1108 for making a PIP. If Decision Step 1104 finds that the PIQ is not full, Control Path 1104n is followed directly to Step 1108.

Step 1110 initializes the PIP 456 with the address of the Command Packet 452 which is to be resent. Next, Step 1110 retrieves a Status Packet (SP) 460 from the Status Packet Queue (SPQ) 316, and Step 1112 initializes the PIP with the address of the SP. After the necessary information has been entered in the PIP, Step 1114 sets the Valid Flag (VF) 456a for the entry to indicate that the PIP references a Command Packet which is ready for processing. Step 1116 releases the Status Packet 460 to the Status Packet Queue 316.

FIG. 37 is a flowchart of the Purge Disabled Segments and then Resend processing. This processing is performed when the corresponding RECOMMENDED_ACTION is returned from the Outboard File Cache when it has detected that the identified segments in cache are no longer addressable. The first step is to send one or more RETURN SEGMENT STATE commands to the Outboard File Cache as indicated by Step 1140. The purpose of the RETURN SEGMENT STATE commands is to obtain the state of the segments belonging to each file addressed by the command for which this RECOMMENDED_ACTION was returned. As will be recalled, this RECOMMENDED_ACTION may be returned for any of the following commands: DESTAGE, DESTAGE AND PURGE DISK, DESTAGE AND PURGE FILE, and DESTAGE AND PURGE FILES BY ATTRIBUTES. Depending on the command, more than one file may be referenced.

For each of the Segment State Packets 2110 returned in response to the RETURN SEGMENT STATE command, the Disabled Flag (DF) is tested. For each of the segments whose Disabled Flag is set and whose Segment Valid Flag (SVF) is cleared, a bad spot is identified in the file control table of the associated file, as indicated by Step 1142. Those segments whose Segment Valid Flag is set do not need to be marked as bad because the corresponding segment on the Disk is valid. A subsequent reference to a segment marked as bad will not be honored and an error status will be returned to the routine referencing the bad segment.

Decision Step 1144 tests whether the RECOMMENDED_ACTION=Iterate. If so, there are more segments to process and control Path 1144y is followed to Step 1146. Step 1146 updates the CURRENT_SEGMENT_POINTER in the Command Packet (See the CLEAR PENDING Command Packet 1654) with the RESTART_SEGMENT_POINTER returned in the Status Packet. The Status Packet returned is released to the Status Packet Queue 316 at Step 1148 and processing continues at Step 1140.

When all segments have been processed, decision Step 1144 will find that the RECOMMENDED_ACTION does not equal Iterate. Control Path 1144n is followed to Step 1148. Step 1150 invokes File Cache Interface processing with the necessary parameters for a PURGE command. The type of PURGE command used depends upon the command for which the Purge Disabled Segments and then Resend RECOMMENDED_ACTION was returned. The particular PURGE parameters can be obtained from the original Command Packet which caused this RECOMMENDED_ACTION. After the PURGE operation is complete, decision Step 1152 checks whether any segments were marked bad at Step 1142. If segments were marked bad, then Step 1154 releases the Status Packet and Step 1156 returns an error status to the routine which sent the original command. Otherwise, the original Command Packet is resent by invoking Resend processing at Step 1158.

FIG. 38 is a flowchart of the Send CLEAR PENDING Followed by Original Command processing. When this RECOMMENDED_ACTION is returned, the Host 10 should clear the Pending states for the segments it addressed in the original STAGE command and resend the original STAGE command.

Step 1190 is performed to send a CLEAR PENDING command to the Outboard File Cache 102. The CLEAR PENDING command is used to remove the segments addressed by the command (either the STAGE BLOCKS or STAGE WITHOUT DATA command) from a Stage Pending state. The segments addressed by the CLEAR PENDING command are the same as those addressed by the original STAGE BLOCKS or STAGE WITHOUT DATA commands.

The RECOMMENDED_ACTION returned from the CLEAR PENDING command is checked at decision Step 1192. If there are more segments to process, then the RECOMMENDED_ACTION will equal Iterate and Step 1194 updates the CURRENT_SEGMENT_POINTER in the CLEAR PENDING Command Packet 1654 with the RESTART_SEGMENT_POINTER in the CLEAR PENDING Status Packet 1656. The CLEAR PENDING Status Packet 1656 is released to the Status Packet Queue 316 and processing continues at Step 1190.

Once all segments have been processed, the RECOMMENDED_ACTION returned will not equal Iterate and control Path 1192n is followed to Step 1198. Step 1198 obtains the original Command Packet which caused the "Send CLEAR PENDING. . . " RECOMMENDED_ACTION as referenced by the Status Packet. The Command Packet can be referenced by the COMMAND_PACKET_ADDRESS contained in the Status Packet. The original Command Packet is then provided to Resend processing for resending the Command Packet, as indicated by Step 1200. Control is then returned to Status Processing.

FIG. 39 is a flowchart showing the processing which occurs when the "Stage Data" RECOMMENDED_ACTION is returned from the Outboard File Cache. This RECOMMENDED_ACTION indicates that a miss occurred and that data must be read from disk and staged to the Outboard File Cache 102. Stage Data processing stages the appropriate file data from disk storage to the Outboard File Cache. There are two main paths of processing, one for staging a segment of file data and another for staging selected blocks of file data.

The first processing performed in response to Stage Data is to identify the segments addressed which are not in cache. Step 1202 identifies the misses which are identified in the SEGMENT_MISS_TEMPLATE which is returned along with the RECOMMENDED_ACTION in the Status Packet. The particular disk numbers and disk addresses of the segments not in cache are determined by searching the operating system file control table. After gathering the disk numbers and addresses, processing continues to decision Step 1204.

Decision Step 1204 determines the type of command which caused the miss condition. For READ and WRITE OFF BLOCK BOUNDARY commands, control Path 1204n is followed. Control Path 1204y is taken for a WRITE command. For READ commands, the segment must be read from disk because the referenced segment(s) were not in cache. For WRITE OFF BLOCK BOUNDARY commands, selected segment(s) must be read from disk to obtain the remainder of those blocks which are only partially written by the command so that the blocks in cache do not contain bad data along with good data. If the command is a WRITE, the segment(s) not in cache do not need to be read from disk because the data to be written resides on a block boundary and the BLOCKS_WRITTEN_TEMPLATE in the File Descriptor 508 tracks which blocks have been written.

If decision Step 1204 detects a WRITE command, then control Path 1204*y* is followed to Step 1206. Step 1206 invokes the File Cache Interface processing for sending a STAGE BLOCKS command to transfer the specified data from Host Main Storage 16 to Non-Volatile Storage 220. The original program is chained to the STAGE BLOCKS command to service the original request. Step 1207 releases the Status Packet and control is then returned to Status Processing.

Control Path 1204*n* is followed to decision Step 1208 for READ and WRITE OFF BLOCK BOUNDARY commands. Decision Step 1208 tests whether the command is READ or WRITE OFF BLOCK BOUNDARY. Control Path 1208*y* is followed for a READ command and control Path 1208*n* is followed for a WRITE OFF BLOCK BOUNDARY command. For a READ command Step 1210 reads the segments identified at Step 1202 from disk. After the required data has been read from disk, Step 1212 invokes File Cache Interface processing with the appropriate STAGE SEGMENTS parameters for staging the segments to the Outboard File Cache. The original request is chained to the STAGE SEGMENTS command. This program (the command chain of STAGE SEGMENTS and the original command) direct the Outboard File Cache 102 to store the segments identified in the STAGE SEGMENTS command in Non-Volatile Storage 220, and then process the original command. Control is then returned to Status Processing.

If the command is WRITE OFF BLOCK BOUNDARY, control Path 1208*n* is followed to Step 1214. For a WRITE OFF BLOCK BOUNDARY COMMAND, only the first and last segment addressed by the command need to be read from disk (and only if identified in the SEGMENT_MISS_TEMPLATE) and staged to the Outboard File Cache because any segments between the first and last segments addressed will be fully written. Therefore, Step 1214 reads the first and last segments which are referenced by the command if the SEGMENT_MISS_TEMPLATE indicates that they do not reside in cache.

After the necessary segments have been read from Disk, Step 1216 invokes File Cache Interface processing to chain and queue the specified commands. If the first segment referenced in the original command was not in cache, then a STAGE SEGMENTS command is required to stage the first segment from the WRITE OFF BLOCK BOUNDARY command to cache. Otherwise, the STAGE SEGMENTS command is not required for the first segment.

The next command in the command chain is STAGE WITHOUT DATA. The STAGE WITHOUT DATA command is used for this particular scenario of Stage Data processing. In particular, the STAGE WITHOUT DATA command is used to update the File Descriptor 508, with the DISK_NUMBERS and DISK_ADDRESSes in the STAGE WITHOUT DATA command packet, without staging any data to the Outboard File Cache. One or more STAGE WITHOUT DATA commands are used to update File Descriptors for those segments referenced in the WRITE OFF BLOCK BOUNDARY command which were not in cache.

A STAGE SEGMENTS command for the last segment referenced by the original WRITE OFF BLOCK BOUNDARY command is chained to the STAGE WITHOUT DATA commands if the last segment referenced was not in cache. The last command in the chain is the original program having the WRITE OFF BLOCK BOUNDARY command. Control is returned to the Status Processing after Step 1216 completes.

FIG. 40 shows a flowchart of the processing performed when the Stage Data and Log No Resident File Space Condition RECOMMENDED_ACTION is returned from the Outboard File Cache. This RECOMMENDED_ACTION is returned in response to a reference to Resident File Space 524 in which a miss resulted and the current portion of File Space 502 allocated for Resident File Space is full. The file access command will be granted, but the segments assigned to the file will reside in Cache File Space 524 and not Resident File Space. The segments belonging to Resident files which occupy Cache File Space are called orphan segments, or orphans for short. This has the effect of subjecting the orphans to reuse by other files.

Step 1220 invokes the Stage Data processing. After the data has been staged, a message is logged to indicate that segments were allocated as Cache File Space 522 rather than as Resident File Space 524. The message indicates to the user that the desired performance level may not be achieved because the segments requested as Resident will be subject to re-use because they were assigned in Cache File Space 522. After logging the message, control is returned to Status Processing.

FIG. 41 contains a flowchart of the processing performed for the Down File Cache Interface RECOMMENDED_ACTION. Upon receiving this RECOMMENDED_ACTION, the File Cache Interface must ensure that no further programs are queued to the particular interface which has become unavailable and transfer any programs queued in the Program Initiation Queue 310 associated with the unavailable interface to another Program Initiation Queue.

Step 1230 marks the identified File Cache interface as down. This will ensure that no further programs are entered in the associated Program Initiation Queue 310. Step 1232 transfers the Program Initiation Packets 456 from the Program Initiation Queue associated with the unavailable interface to another Program Initiation Queue. Once the Program Initiation Packets have been transferred, Step 1234 releases the Status Packet and control returns to Status Processing.

FIG. 42 contains a flowchart of the processing performed for the Down Outboard File Cache RECOMMENDED_ACTION. Upon receiving this recommended action, a Host should retrieve, to the extent possible, any segments from the Outboard File Cache 102 which have been written and write those segments to Disk 106.

Step 1252 determines the appropriate ATTRIBUTES_MASK and ATTRIBUTES_ID to match all the segments in the Outboard File Cache 102 which belong to files which are local to the Host receiving the Down Outboard File Cache RECOMMENDED_ACTION. Before destaging and purging the segments in cache, a LOCK CACHE FILES BY ATTRIBUTES command is sent to the Outboard File Cache to prevent other Hosts from creating and staging new segments for the affected files. Step 1254 invokes File Cache Interface processing with the parameters for sending the LOCK CACHE FILES BY ATTRIBUTES command.

Step 1256 initiates the destage and purge process by invoking the File Cache Interface with parameters for a DESTAGE AND PURGE FILES BY ATTRIBUTES command. All segments belonging to files which are local to the Host 10 sending the command and which have been written will be destaged and purged. If the RECOMMENDED_ACTION returned from the DESTAGE AND PURGE FILES BY ATTRIBUTES command is Iterate, then decision Step 1258 follows control Path 1258y. Step 1260 updates the CURRENT_SEGMENT_POINTER in the Command Packet 452 with the RESTART_SEGMENT_POINTER from the Status Packet 456. Step 1262 releases the Status Packet and control returns to Step 1256 to process the next set of segments.

When the RECOMMENDED_ACTION is no longer Iterate, control Path 1258n is followed to Step 1264. Step 1264 invokes the File Cache Interface processing with the parameters necessary for a DESTAGE COMPLETE command. The DESTAGE COMPLETE command informs the Outboard File Cache 102 that the DESTAGE AND PURGE FILES BY ATTRIBUTES operation is complete and the state of the segments may be changed to AVAILABLE.

The final operation for DESTAGE AND PURGE FILES BY ATTRIBUTES processing is to send the UNLOCK CACHE FILES BY ATTRIBUTES command to the Outboard File Cache 102. Once again, the attributes specified in UNLOCK Command Packet are the same as those specified in the LOCK Command Packet. Step 1266 invokes the File Cache Interface processing with the parameters required for an UNLOCK CACHE FILES BY ATTRIBUTES Command Packet. After the Outboard File Cache has unlocked the files matching the specified attributes, control is returned to Status Processing.

5. Destage Process

FIGS. 43A and 43B contain a flowchart of the general processing of the Destage Process. The Destage Process is an independent process which runs continually. The process' responsibility is to perform the task of coordinating destaging file segments from the Outboard File Cache 102. The Destage Process handles Destage Request Packets 896 that are returned from the Outboard File Cache. The segments referenced by the Destage Request Packets are read from the Outboard File Cache and written to Disk 106.

The Destage Process begins by initializing its input queue as shown by Step 1502. While not shown, it should be understood that each entry in the Destage Input Queue contains the information that was returned in a Destage Request Packet 896. The Destage Request Packets identifies the one or more segments to be destaged. The Destage Input Queue is monitored for available entries as shown by decision Step 1504. When an entry is detected in the Destage Input Queue, processing proceeds to Step 1506.

Step 1506 obtains the entry at the front of the Destage Input Queue. The entry retrieved contains the parameters necessary for building a DESTAGE Command Packet At Step 1508, an area in Host Main Storage 16 is allocated for temporary storage of the segment(s) to destage. The address of this temporary storage area is provided to the Outboard File Cache 102 in the DATA_DESCRIPTOR_WORD portion of the DESTAGE Command Packet.

Once all the parameters have been gathered, Step 1510 passes the parameters to the File Cache Interface processing for building a DESTAGE Command Packet and sending it to the Outboard File Cache 102. Once the Outboard File Cache has transferred the data from its storage to the Host Main Storage 16, the Destage Process continues its processing.

After the Outboard File Cache 102 has transferred the identified segments to Host Main Storage 16, each segment is checked as to whether it is valid. A segment is valid if it has not been written since the last time it was stored to disk. Otherwise the segment is invalid. The validity of a segment is indicated by the Segment Not Valid (SNV) flag in the Segment Information Packet returned in the DESTAGE Status Packet. Decision Step 1512 checks whether a segment is valid. If it is not, then control Path 1512n is followed to Step 1514 to handle the case where a segment is not valid.

Step 1514 reads from disk those segments returned from the Outboard File Cache which were not valid. Each segment read from disk must be merged with its invalid counterpart which was returned from the Outboard File Cache because a segment may be partially written. That is, only certain ones of the blocks in segment may have the latest data. The BLOCKS_WRITTEN_TEMPLATE in the Segment Information Packet identifies those blocks in a segment which have been written. The written blocks from the File Cache segment are merged with the remaining blocks from the segment read from disk to form the whole segment which is to be written to disk. Step 1516 performs the merging operation and passes control to Step 1518 via control Path 1512y.

Step 1518 performs the necessary operations to write the segments contained in the temporary storage area to the proper disk and disk address.

Decision Step 1520 checks whether the data was successfully written to Disk 106. During the normal course of processing it is expected that the write to disk would be successful. For successful writes, control Path 1520y is followed to Step 1522 for reporting the status of the destage operation back to the Outboard File Cache 102. Step 1522 provides the File Cache Interface processing with the parameters required for a DESTAGE COMPLETE command. The Outboard File Cache may then clear the written flags and destage flags in the File Descriptor 508 to indicate that destaging is not longer required. After the Status Packet associated with the DESTAGE COMPLETE Command Packet is returned to the Destage Process, control Path 1522p is followed to Step 1524 where the temporary storage used for destaging is deallocated. Control then returns to decision Step 1504 to monitor the input queue for more destage requests.

For segments that could not be destaged, the Outboard File Cache 102 must be notified that the segments were not destaged. If the write operation at Step 1518 was not successful, then decision Step 1520 forces control Path 1520n to decision Step 1526. Decision Step 1526 tests whether the file for which the segments were not successfully written to disk is duplexed. If the file is duplexed the data is recovered, otherwise, the data is not. For non-duplexed files, control Path 1526n is followed to Step 1528. Step 1528 invokes the File Cache Interface processing with parameters for the PURGE FILE command. The Outboard File Cache deassigns the segments indicated in the PURGE FILE command from their current file. Step 1530 marks the spots in the file as bad so that subsequent file requests for the bad segments will receive error statuses. Control is then followed to Step 1524.

For duplexed files the lost segments are recovered. Control from decision Step 1526 is passed to Step 1532 via control Path 1526y. Step 1532 invokes File Cache Interface processing with the parameters necessary for a DESTAGE COMPLETE command. In particular, those segments not destaged are identified with the Not Destaged (ND) flag in the DESTAGE COMPLETE Command Packet and are marked as written. The following steps then recover the data by using the duplicate leg of storage.

Step 1534 finds open disk space for storing the segments from the backup leg. The open disk space is identified by a disk number and a disk address. Then Step 1536 copies the corresponding segments from the backup leg to the newly allocated space from Step 1534. Step 1538 then invokes the File Cache Interface processing with the parameters required for a MODIFY File Descriptor Command Packet. The command is used to update the segments in cache with the new disk number and disk address which were found at Step 1534. Processing then proceeds to Step 1524.

6. READ Command

The READ command is used to read data from a file whose data is stored in the Outboard File Cache 102. The READ Command Packet contains the read command and is generated by the File Cache Handler Software 208 in response to a read request originating in Application Software 202 or some component of the Host 10 operating system. If the I/O Software 206 passes the read request parameters (file-identifier, file-portion-indicator, and a DDW) to the File Cache Handler Software 208 for further processing.

a. READ Command Packet

FIG. 44 shows the format of a READ Command Packet 1600. The following table explains each of the fields:

| Word | Bit | Definition |
|---|---|---|
| 0–1 | | DATA_DESCRIPTOR_WORD is described by DATA_DESCRIPTOR_WORD in FIG. 34. |
| 2 | | NEXT_COMMAND_PACKET is the real address of the next Command Packet in a Command Packet Chain. |
| 3 | 0–3 | These bits are reserved. |
| 3 | 5 | CCF is the Command Chain Flag. CCF=0 indicates that command chaining is not in effect, and CCF=1 indicates that command chaining is in effect. |
| 3 | 6–11 | LENGTH is the number of words contained in the Command Packet starting with word 4. |
| 3 | 12–23 | BLOCK_COUNT is the number of blocks to be read from the Outboard File Cache 102. |
| 3 | 24–35 | COMMAND_CODE indicates the command that the Outboard File Cache 102 should execute, in this case a READ. |
| 4–5 | | FILE_IDENTIFIER indicates the file from which the data is to be read. See FIG. 45. |
| 6 | | FILE_RELATIVE_SEGMENT_OFFSET is the first segment, relative to the beginning of the file, that is addressed by the command. The FILE_RELATIVE_SEGMENT_OFFSET is equal to the logical track number of the segment. |
| 7 | 0–3 | These bits are reserved. |
| 7 | 4 | FS is the Force Speculation flag which indicates whether the Outboard File Cache 102, upon detecting a miss, should attempt to speculate and allocate another segment. If FS=0, then speculation is optional, and if FS=1 then speculation is required. When either RR or XF is set, or SC equals 0, FS is ignored. |
| 7 | 5 | RR is the Residency Required flag which indicates whether all data referenced by the command should be in Resident File Space 524. If RR=0, then residency is not required, and if RR=1, then residency is required. If RR=1 and any of the following conditions are true, then no segments are allocated or placed in a stage pending state and the command is terminated with an appropriate status. The conditions are:<br>a) any segment referenced by the command is not resident; or<br>b) any block referenced by the command is not valid. |
| 7 | 6 | XF is the Outboard File Cache Resident File flag. See the ALLOCATE Command Packet for further explanation. If RR=1, then XF is ignored. |
| 7 | 7–11 | SC is the Speculation Count. If the Outboard File Cache 102 detects a miss, SC indicates the number of segments that should be speculatively allocated. If either of RR or XF is set, then SC is ignored. |
| 7 | 12–23 | These bits are reserved. |
| 7 | 24–29 | SRBO is the Segment Relative Block Offset. This is the first block, relative to the beginning of the first segment, that is referenced by to the command. |
| 7 | 30–35 | SEG_CNT is the number of segments that are referenced by the command. |

b. FILE_IDENTIFIER

FIG. 45 shows the content and format of the FILE_IDENTIFIER 1602 contained in a Command Packet. The following table explains each of the fields:

| Word | Bit | Definition |
|---|---|---|
| 0 | 0–3 | These bits are reserved. |
| 0 | 4–9 | This field is beyond the scope of this invention. |
| 0 | 10–17 | HOST_ID indicates a Host 10. If H=0, HOST_ID indicates whether the file is shared by multiple Hosts 10, or local to a single Host 10. If local to single Host, the HOST_ID indicates to which Host 10 the file is local. If HOST_ID=0, then the file is shared. If HOST_ID > 0, then the file is local to the Host 10 indicated by the HOST_ID. |
| 0 | 18–35 | This field is beyond the scope of this invention. |
| 1 | 0–3 | These bits are reserved. |
| 1 | 4 | H is the Hardware flag. This flag differentiates between FILE_IDENTIFIERs generated by the File Cache Handler Software 208, and those generated by the Outboard File Cache 102. If H=0, the FILE_IDENTIFIER was generated by File Cache Handler Software 208, and if H=1, the FILE_IDENTIFIER was generated by the Outboard File Cache 102. |
| 1 | 5-35 | This field is beyond the scope of this invention. |

c. READ Status Packet

FIG. 46 shows the content and format of the READ Status Packet 1604. The following table explains each of the fields:

| Word | Bit | Definition |
|---|---|---|
| 0–4 | | See the Program Status Packet 460. |
| 5 | 0–11 | The valid RECOMMENDED_ACTIONS for a READ command are: "Down File Cache Interface," "Rescan File", "Resend", "Return Status to User", "Stage Data", or "Stage Data and Log No Resident File Space Condition." |
| 5 | 12–35 | See the Program Status Packet 460. |
| 6 | | See the Program Status Packet 460. |
| 7 | 0–17 | These bits are reserved. |
| 7 | 18-35 | DESTAGE_REQUEST_PACKET_COUNT is the number of Destage Request Packets in the Destage Request Table. If the DESTAGE_REQUEST_PACKETS bit in the FLAGS field is not set, this field is ignored. |
| 8 | 0–17 | These bits are reserved. |
| 8 | 18–35 | SEGMENT_MISS_TEMPLATE is defined as follows:<br>If the status is associated with a READ, WRITE, OR WRITE OFF BLOCK BOUNDARY, command and RECOMMENDED_ACTION equals either "rescan file", "allocate space", "return status to user", "stage data" "stage data and log not resident file space condition", or "stage non-speculated data", this field indicates which of the segments addressed by the command were either not resident or contain invalid data. Each bit in the template maps to one of the segments. Bit 18 corresponds to the 1st segment addressed by the command, i.e., the segment specified by the command's FILE_RELATIVE_SEGMENT_OFFSET. Bit 19 |

-continued

| Word | Bit | Definition |
|---|---|---|
| | | correspond to the second segment addressed by the command, and so forth up to bit 35 which corresponds to the eighteenth segment addressed by the command. If a bit is set, the corresponding segment was addressed by the command and contains invalid data. If a bit is not set, either the corresponding segment was not addressed by the command or it was resident and does not contain invalid data. If the status is associated with a READ, WRITE, or WRITE OFF BLOCK BOUNDARY command and RECOMMENDED_ACTION does not equal either "rescan file", "allocate space", "return status to user", "stage data", "stage data and log no resident file space condition", or "stage non-speculated data", this field is ignored. If the status is not associated with a READ, WRITE, or WRITE OFF BLOCK BOUNDARY command, this field is reserved. |
| 9 | | This word is reserved. |
| 10 | 0–29 | These bits are reserved. |
| 10 | 30–35 | S_COUNT is the number of segments speculated by a READ command. This value specifies the number of segments identified in SEGMENT_MISS_TEMPLATE that were allocated for speculation. If none of the segments identified in SEGMENT_MISS_TEMPLATE were allocated for speculation, S_COUNT must equal 0. S_COUNT must be less than or equal to 31. If the status is associated with a READ command and RECOMMENDED_ACTION does not equal "stage data", this field is ignored. If the Status is not associated with a READ command, this field is ignored. |
| | 11–34 | Destage Request Table contains up to six Destage Request Packets 1606. If the DESTAGE_REQUEST_PACKETS bit in the FLAGS field is not set or DESTAGE_REQUEST_PACKET_COUNT equals 0, the Destage Request Table is ignored. |
| | 35–127 | These words are reserved. |

d. Destage Request Packet

FIG. 47 illustrates the format and content of a Destage Request Packet 1606. The following table explains each of the fields:

| Word | Bit | Definition |
|---|---|---|
| 0–1 | | See FILE IDENTIFIER 1602. |
| 2 | | FILE_RELATIVE_SEGMENT_OFFSET is the first segment, relative to the beginning of the file, that is to be destaged. |
| 3 | 0–29 | These bits are reserved. |
| 3 | 30–35 | SEG_CNT is the number of segments described by the Destage Request Packet. SEG_CNT must be less than or equal to 8. If SEG_CNT=0, then nothing id to be destaged and the Destage Request Packet should be ignored. If SEG_CNT is greater than 0, then at the time the Destage Request Packet was built by the Outboard File Cache 102, all segments described by the packet were "written", that is they contained data which had not been destaged to disk. SEG_CNT greater than 1 indicates that at the time the Destage Request Packet was built by the Outboard File Cache 102, all segments described by the packet were valid, not disabled, logically contiguous in the file specified by the FILE_IDENTIFIER, and physically contiguous on the disks specified by LEG1_DISK_NUMBER and LEG2_DISK_NUMBER. |
| 4 | 0–3 | These bits are reserved. |
| 4 | 4–35 | LEG1_DISK_NUMBER identifies the first disk on which the segment resides. |
| 5 | 0–3 | These bits are reserved. |
| 5 | 4–35 | LEG2_DISK_NUMBER identifies the second disk on which the segment resides. |

7. ALLOCATE Command

The ALLOCATE command directs the Outboard File Cache 102 to allocate the segments addressed in the ALLOCATE Command Packet that are not resident in the Outboard File Cache 102 and mark their state as AVAILABLE. The ALLOCATE command can be used to speculatively allocate cache storage in the Outboard File Cache 102 before there is an attempt to reference that segment. For example, if the Input/Output Software 206 detects that writes to a file are occurring sequentially, that is data is always being written to the end of the file, the cache segments can be allocated for future writes. Speculatively allocating cache segments minimizes misses and saves passes through a file's control table. The ALLOCATE command is also the means by which nailed segments and segments in Resident File Space 524 are allocated.

a. ALLOCATE Command Packet

FIG. 48 illustrates the format and content of a ALLOCATE Command Packet 1650. The following table explains each of the fields:

| Word | Bit | Definition |
|---|---|---|
| 0–1 | | These words are reserved. |
| 2 | | See the Command Packet 452. |
| 3 | 0–3 | These bits are reserved. |
| 3 | 4–11 | See the Command Packet 452. |
| 3 | 12–23 | These bits are reserved. |
| 3 | 24-35 | See the Command Packet 452. |
| 4–6 | | See the READ Command Packet 1600. |
| 7 | 0–4 | These bits are reserved. |
| 7 | 5 | NF is the Nail Flag. This flag indicates that the segments allocated by the command are to be nailed. If NF=0, then the segments are not to be nailed. If NF=1, then the segments should be nailed. |
| 7 | 6 | XF is the Resident File flag. This flag indicates that the segments addressed by the command belong to a Resident File. If XF=0, then the file is not a Resident File. If XF=1, then the file is a Resident File. |
| 7 | 8 | CSPF is the Cache Sticking Power Flag. The Cache Sticking Power Flag is used to indicate that the segment is to have a longer lifetime in the Cache File Space 522. Segments whose Cache Sticking Power Flags are not set are reassigned by the cache replacement algorithm before the segments whose Cache Sticking Power Flags are set. If CSPF=0, then the segments staged by the command do not have sticking power. IF CSPF=1, the segments staged by the command have sticking power. |
| 7 | 8–15 | These bits are reserved. |
| 7 | 16–23 | See the File Descriptor 508 for a description of the GROUP_ID. |
| 7 | 24–29 | These bits are reserved. |
| 7 | 30–35 | See the READ Command Packet 1600. |
| 8–11 | | These words contain the Leg-1 and Leg-2 disk numbers and disk addresses to assign to the File Descriptor. |

b. ALLOCATE Status Packet

FIG. 49 illustrates the format and content of a ALLOCATE Status Packet 1652. The following table explains each of the fields:

| Word | Bit | Definition |
|---|---|---|
| 0–4 | | See the Program Status Packet 460. |
| 5 | 0–11 | The valid RECOMMENDED_ACTIONS for an ALLOCATE command are: "No Action Required," "Resend", and "Return Status to User." |
| 5 | 12–35 | See the Program Status Packet 460. |
| 6 | | See the Program Status Packet 460. |
| 7 | 0–17 | These bits are reserved. |
| 7 | 18–35 | See the READ Status Packet 1604. |
| 8–10 | | These words are reserved. |
| 11–127 | | See the READ Status Packet 1602. |

8. CLEAR PENDING Command

The CLEAR PENDING command is used when a Host 10 has determined that data associated with one or more segments involved in a miss cannot be staged, in addition to its use for status processing as described above. The following conditions would cause a Host 10 to issue a CLEAR PENDING command:

a) A READ command resulted in a miss status and some or all of the data that was to be read maps to space within the file that has not yet been allocated.

b) A READ command resulted in a miss status and some or all of the data that was to be read maps into space that is beyond the file's highest word that has been written.

c) A WRITE command resulted in a miss status and some or all of the data that was to be written is beyond the highest logical track that can be allocated to the file.

d) A READ or WRITE command resulted in a miss status and some or all of the data that was to be transferred maps onto a disk that can no longer be accessed by the Host 10.

e) A READ or WRITE command resulted in a miss status and some or all of the data that was to be transferred maps onto a disk that is being purged from the Outboard File Cache 102.

f) A READ or WRITE command resulted in a miss status and some or all of the data that was to be transferred maps onto a portion of the file that is being purged from the Outboard File Cache.

Based on the type of search specified by the command, either a file (or portion thereof) or all the File Space will be searched. For segments that satisfy the following criteria:

(1) the segment is in a pending state;

(2) the segment's HOST_ID is equal to the HOST_ID in the Command Packet; and (3) the segment's PROGRAM_ID is equal to the PROGRAM_ID in the Command Packet.

If the segment's state is equal to DESTAGE_PENDING or PURGE_PENDING, the SEGMENT_WRITTEN flag 508e is set and its state indicator is made AVAILABLE. If the segment is STAGE_PENDING and the BLOCKS_WRITTEN template equals zero, the segment is purged; if the segment is STAGE_PENDING and the BLOCKS_WRITTEN template is not equal to zero, the segment's state indicator is made AVAILABLE.

FIG. 50 is a flowchart illustrating the processing in which the CLEAR PENDING command may be used. Step 1654 involves detecting a condition that requires PENDING states to be cleared. The particular conditions which may cause this condition were discussed in the preceding paragraphs. Once the condition has been detected, File Cache Interface processing is invoked at Step 1656. The particular parameters supplied in the Command Packet will depend upon the file addressed, the particular segments in question, and the condition which required PENDING states to be cleared.

If there are more segments left to process, then the RECOMMENDED_ACTION returned in the CLEAR PENDING Status Packet 1654 will equal Iterate. Decision Step 1658 will force control path 1658y to Step 1660. Step 1660 updates the CURRENT_SEGMENT_POINTER in the CLEAR PENDING Command Packet with the RESTART_SEGMENT_POINTER from the Status Packet. Step 1662 releases the Status Packet to the Status Packet Queue 316 and processing continues at Step 1656. When all segments have been processed, the RECOMMENDED_ACTION will not equal Iterate and control is returned to the processing which detected that a CLEAR PENDING operation was required.

a. CLEAR PENDING Command Packet

FIG. 51 illustrates the information and format of the CLEAR PENDING Command Packet 1666. The following table explains each of the fields:

| Word | Bit | Definition |
|---|---|---|
| 0–1 | | These words are reserved. |
| 2 | | See the READ Command Packet. |
| 3 | 0–11 | See the READ Command Packet. |
| 3 | 12 | ST is the Search Type. If ST=0, then search type is file, otherwise if ST=1, then search type is Outboard File Cache. When the search type indicates search file, the Outboard File Cache checks every segment in which is addressed by the command. When the search type indicates search the Outboard File Cache, the Outboard File Cache checks every segment stored in the Outboard File Cache. |
| 3 | 13–15 | These bits are reserved. |
| 3 | 16–23 | HOST_ID indicates the Host 10 that left the segments(s) in a Stage Pending state. Host software may have determined the proper value for this field on its own or may obtain the value with the RETURN SEGMENT STATE command. |
| 3 | 24–35 | See the Command Packet 452. |
| 4–5 | | See the FILE_IDENTIFIER 1602. |
| 6 | | See the READ Command Packet. Note that if the command is directed at a particular part of a file, the FILE_RELATIVE_SEGMENT_OFFSET must specify the first logical track within the part of the file to which the command is directed. If the command is directed at an entire file, then the FILE_RELATIVE_SEGMENT_OFFSET must equal zero. |
| 7 | | LAST_FILE_RELATIVE_SEGMENT_OFFSET is the last segment relative to the start of the file, that is addressed by the command. LAST_FILE_RELATIVE_SEGMENT_OFFSET must specify the last logical track within the part of the file to which the command is directed if the ST is file and the command is not directed at the entire file. If the command is directed at an entire file, then LAST_FILE_RELATIVE_SEGMENT_OFFSET must equal the highest logical track written in the file. |
| 8 | | CURRENT_SEGMENT_POINTER is a parameter which is passed to the Outboard File Cache 102 on each iteration of the command. It is used by the Outboard File Cache to locate the first segment that is to be processed by the command. If the ST is file and the command is not an iteration, then the CURRENT_SEGMENT_POINTER must equal the FILE_RELATIVE_SEGMENT_OFFSET. If the ST is Outboard File Cache and the command is not an iteration of a previous command, the CURRENT_SEGMENT_POINTER must equal zero. If the RECOMMENDED_ACTION in a CLEAR PENDING Status Packet is "Iterate", then this field is assigned the RESTART_SEGMENT_POINTER from the Status Packet. |

-continued

| Word | Bit | Definition |
|---|---|---|
| 9 | 0–3 | These bits are reserved. |
| 9 | 4–35 | PROGRAM_IDENTIFIER is a value identifying the program that left the segments in a pending state. |

b. CLEAR PENDING Status Packet

FIG. 52 illustrates the information and format of the CLEAR PENDING Status Packet 1668. The following table explains each of the fields:

| Word | Bit | Definition |
|---|---|---|
| 0–4 | | See the Status Packet 460. |
| 5 | 0–11 | The RECOMMENDED_ACTIONS returned in response to a CLEAR PENDING command include: "Iterate," and "No Action Required." |
| 5 | 12–35 | See the Status Packet 460. |
| 6 | | See the Status Packet 460. |
| 7 | | See the READ Status Packet 1604. |
| 8 | | This word is reserved. |
| 9 | 0–3 | Reserved. |
| 9 | 4–35 | RESTART_SEGMENT_POINTER contains the value which is used as the CURRENT_SEGMENT_POINTER in the next CLEAR PENDING Command Packet that is sent to the Outboard File Cache 102. If the RECOMMENDED_ACTION in the Status Packet does not equal "Iterate," then this field is ignored. |
| 10 | | Reserved. |
| 11–127 | | See the READ Status Packet. |

9. DESTAGE Command

Typically, a request to destage segments of a file originates in the Outboard File Cache. Before the Outboard File Cache makes a segment available for re-use, it requests that the Host 10 destage the segment if it has been written. The Host 10 responds by performing the processing indicated in the Destage Process of FIG. 43.

a. DESTAGE Command Packet

FIG. 53 shows the format of a DESTAGE Command Packet 1670. The following table explains each of the fields in the DESTAGE Command Packet:

| Word | Bit | Definition |
|---|---|---|
| 0–7 | | See the READ Command Packet 1600. |

b. DESTAGE Status Packet

FIG. 54 shows the format of a DESTAGE Status Packet 1660. The following table explains each of the fields:

| Word | Bit | Definition |
|---|---|---|
| 0–4 | | See the Status Packet 460. |
| 5 | 0–11 | The possible RECOMMENDED_ACTIONs returned in response to a DESTAGE command include: "No Action Required," "Down File Cache Interface," and "Purge Disabled Segments and then Resend." |
| 5 | 12–35 | See the Status Packet 460. |
| 6 | | See the Status Packet 460. |
| 7 | | See the READ Status Packet 1602. |
| 8 | 0–3 | These bits are reserved. |
| 8 | 4–17 | The PACKETS_RETURNED_COUNT is the number of Segment Information Packets 1674 returned in the Segment Information Table (Words 35–114). This field is only used when the Status Packet is associated with a DESTAGE, DESTAGE AND PURGE DISK, DESTAGE AND PURGE FILE, DESTAGE AND PURGE FILES BY ATTRIBUTES, or a RETURN SEGMENT STATE command. |
| 8 | 18–36 | These bits are reserved. |
| 9–34 | | See the READ Command Packet 1600. |
| 35–114 | | The Segment Information Table may contain up to eight Segment Information Packets. If the Status Packet is associated with a DESTAGE, DESTAGE AND PURGE DISK, DESTAGE AND PURGE FILE, DESTAGE AND PURGE FILES BY ATTRIBUTES command, then the Segment Information Table contains Segment Information Packets. If the Status Packet is associated with a RETURN SEGMENT STATE COMMAND, the Segment Information Table contains Segment State Packets 2110. If the status is not associated with a DESTAGE, DESTAGE AND PURGE DISK, DESTAGE AND PURGE FILE, DESTAGE AND PURGE FILES BY ATTRIBUTES, or RETURN SEGMENT STATE command, the Segment Information Table is ignored. |
| 115–127 | | These words are reserved. |

c. Segment Information Packet

FIG. 55 shows the format of a Segment Information Packet 1674. The following table explains each of the fields:

| Word | Bit | Definition |
|---|---|---|
| 0–1 | | See FILE_IDENTIFIER 1602. |
| 2 | | The FILE_RELATIVE_SEGMENT_OFFSET is the offset of the first segment described by the Segment Information Packet relative to the first segment of the file. |
| 3 | 0–23 | These bits are reserved. |
| 4 | 24–29 | The FLAGS field contains a set of flags which provide further information about the segments defined by the packet. The set of flags include the following: SPR is the Special Processing Required Flag. If this flag is set, the single segment described by the packet requires special processing by the Host 10. If SEG_CNT > 1, then SPR must equal zero. If SEG_CNT = 1 and SNV = 0 = SDF, then SPR must equal zero. If SEG_CNT = 1 and either SNV = 1 or SDF = 1, then SPR must equal 1. This flag allows host software to check one flag instead of having to check several flags for infrequent conditions. SNV is the Segment Not Valid flag. If this flag is set, one or more blocks within the single segment described by this packet contain invalid data. If SEG_CNT > 1, then SNV must equal zero. SDF is the Segment Disabled Flag. If this flag is set, the single segment described by this packet has been disabled by the Outboard File Cache 102. The data contained in the segment may be corrupt. If SEG_CNT > 1, then SDF must equal zero. |
| 3 | 30–35 | SEG_CNT is the number of segments described by this Segment Information Packet. SEG_CNT must he greater than zero. If SEG_CNT > 1, then all segments described by the packet are valid, logically contiguous in the file, and physically contiguous on the disks specified by LEG1_DISK_NUMBER and LEG2_DISK_NUMBER. |
| 4 | 0–3 | These bits are reserved. |
| 4 | 4–35 | LOW_ORDER_WRITTEN_TO_TEMPLATE indicates which of the first 32 blocks of a segment (blocks 0–31) have been written. Each bit in the template maps to one of the first 32 blocks. Bit 4 of word 4 corresponds to the first block, bit 5 of word 4 corresponds to the second block, and so forth. If a bit is set, then the corresponding block has been written, otherwise, the block has not been written. If SEG_CNT = 1, then the |

-continued

| Word | Bit | Definition |
|---|---|---|
| | | LOW_ORDER_WRITTEN_TO_TEMPLATE contains valid information, otherwise it is ignored. |
| 5 | 0–3 | These bits are reserved. |
| 5 | 4–35 | HIGH_ORDER_WRITTEN_TO_TEMPLATE indicates which of the second 32 blocks of a segment (blocks 32–63) have been written. Bit 4 of word 5 corresponds to the thirty-third block, bit 5 of word 5 corresponds to the thirty-fourth block, and so forth. If a bit is set, then the corresponding block has been written, otherwise, the block has not been written. If SEG_CNT = 1, then the HIGH_ORDER_WRITTEN_TO_TEMPLATE contains valid information, otherwise it is ignored. |
| 6–9 | | See the READ Command Packet 1600. |

10. DESTAGE COMPLETE Command

The DESTAGE COMPLETE command is sent to the Outboard File Cache 102 when the Host 10 has completed a destage operation. A DESTAGE COMPLETE command is sent by the Host to the Outboard File Cache upon completion of a DESTAGE, DESTAGE AND PURGE DISK, DESTAGE AND PURGE FILE, or a DESTAGE AND PURGE FILE BY ATTRIBUTES command. The Outboard File Cache 102 will change the state of the identified segments from DESTAGE PENDING to AVAILABLE.

a. DESTAGE COMPLETE Command Packet

FIG. 56 shows the format of a DESTAGE COMPLETE Command Packet 1676. The following table explains each of the fields in the DESTAGE COMPLETE Command Packet:

| Word | Bit | Definition |
|---|---|---|
| 0–1 | | These words are reserved. |
| 2 | | See the READ Command Packet 1600. |
| 3 | 0–11 | See the READ Command Packet 1600. |
| 3 | 12–17 | FSRBO is the First Segment Relative Block Offset. This is the number of the first block, relative to the segment referenced by FILE_RELATIVE_SEGMENT_OFFSET, that is to be purged. If PT does not specify purge blocks or ND is set, the FSRBO is ignored. |
| 3 | 18–23 | LSRBO is the Last Segment Relative Block Offset. This is the number of the last block, relative to the segment referenced by FILE_RELATIVE_BLOCK_OFFSET + SEG_CNT − 1 (the last segment referenced by the command), that is to be purged. If PT does not specify purge blocks or ND is set, the LSRBO is ignored. |
| 3 | 24–35 | See the READ Command Packet 1600. |
| 4–6 | | See the READ Command Packet 1600. |
| 7 | 0–3 | These bits are reserved. |
| 7 | 4–5 | PT is the Purge Type. If data or control information is to be purged, that is, all segments addressed by the command are in a purge pending state, PT indicates the type of purge to be performed. Host software determines whether it is purging part of a segment or the entire segment and further determines whether leg repair is taking place on a duplexed file<br>If PT=0, then the type of purge is purge segments.<br>If PT=1, then the type of purge is purge blocks.<br>If PT=2, then the type of purge is purge leg 1.<br>If PT=3, then the type of purge is purge leg 2.<br>If ND=1, then PT is ignored. |
| 7 | 6 | ND is the Not Destaged flag. This flag indicates whether or not the segments addressed by the command were successfully destaged. If the segments addressed by the command were not successfully destaged, they are marked as written and the state of the segments is changed to AVAILABLE. If ND=0, then the segments were successfully destaged. If ND=1, then the segments were not successfully destaged. |
| 7 | 7–15 | These bits are reserved. |
| 7 | 16–23 | See the (GROUP_ID 508g in the File Descriptor 508 for a description of this field. |
| 7 | 24–29 | These bits are reserved. |
| 7 | 30–35 | See the READ Command Packet 1600. |
| 8 | | This word is reserved. |
| 9 | 0–3 | These bits are reserved. |
| 9 | 4–35 | PROGRAM_IDENTIFIER identifies the program that left the segments in a DESTAGE PENDING state. This field references the particular program (or command chain) which initiated the destage operation. It is generated from the virtual address of the operating system structure that describes the program. |

b. DESTAGE COMPLETE Status Packet

FIG. 57 shows the format of a DESTAGE COMPLETE Status Packet 1678. The following table explains each of the fields in the DESTAGE COMPLETE Status Packet:

| Word | Bit | Definition |
|---|---|---|
| 0–4 | | See the Status Packet 460. |
| 5 | 0–11 | The only RECOMMENDED_ACTION returned in response to a DESTAGE COMPLETE command is "No Action Required." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See the READ Status Packet 1602. |

11. DESTAGE AND PURGE DISK Command

The DESTAGE AND PURGE DISK command is used to destage all data associated with a Disk 106 that resides in the Outboard File Cache 102 but does not reside on the Disk. This command may also be used to purge all data in the Outboard File Cache that is associated with a particular Disk. The Outboard File Cache 102 searches its File Space 502 for segments associated with the Disk identified in the Command Packet. For each segment found, if the purge flag in the Command Packet is set, and the segment has been written, it is destaged and placed in a purge pending state, otherwise it is purged. If the purge flag in the Command Packet is not set and the segment has been written, it is destaged and placed in a destage pending state, otherwise no further processing is performed on the segment.

FIG. 58 contains a flowchart which describes the process in which the DESTAGE AND PURGE DISK command may be used. At Step 1680, a Host 10 detects that a DESTAGE AND PURGE DISK operation is necessary. This processing may be necessary when a disk is removed from a normal operational status by the operating system.

Step 1682 sends a destage-and-purge message to each Host 10 which is coupled to the Outboard File Cache 102. The purpose of this message is to notify the other Hosts which have access to the identified disk that a destage and purge operation is required. Therefore, the other Hosts must take the appropriate actions.

Upon receipt of a destage-and-purge message, the receiving Hosts suspend any further staging of segments associated with the identified Disk 106 as indicated by Step 1684. In addition, any staging activity for the identified Disk which is currently in progress is allowed to finish before proceeding to the next Step 1686. When the receiving Hosts have completed their staging activities, each sends a response message to the sending Host which indicates that the destage and purge operation may proceed. After all the receiving Hosts have responded to the destage-and-purge message, the Host initiating the destage and purge operation continues its processing as indicated by Step 1688.

The File Cache Interface routine is invoked at Step 1690 with the required parameters. If the Outboard File Cache 102 has more segments to process, the Iterate RECOMMENDED_ACTION is returned in the DESTAGE AND PURGE DISK Status Packet. Decision Step 1692 tests for Iterate. If the RECOMMENDED_ACTION equals Iterate, then Step 1694 updates the CURRENT_SEGMENT_POINTER in the DESTAGE AND PURGE DISK Command Packet with the RESTART_SEGMENT_POINTER from the Status Packet. Step 1696 releases the Status Packet and processing continues at Step 1690. Once all segments have been processed, the RECOMMENDED_ACTION will not equal Iterate and normal input/output processing will continue at Step 1698.

a. DESTAGE AND PURGE DISK Command Packet

FIG. 59 shows the format of a DESTAGE AND PURGE DISK Command Packet 1702. The following table explains each of the fields in the Command Packet:

| Word | Bit | Definition |
|---|---|---|
| 0–3 | | See the READ Command Packet 1600. |
| 4 | 0–3 | These bits are reserved. |
| 4 | 4–35 | DISK_NUMBER is the disk identifier used by the operating system. |
| 5–7 | | These words are reserved. |
| 8 | | CURRENT_SEGMENT_POINTER is used by the Outboard File Cache 102 to locate the first segment that is to be processed by the command. CURRENT_SEGMENT_POINTER is 0 when the Command Packet is first sent to the Outboard File Cache. If the RECOMMENDED_ACTION in the Status Packet is "Iterate," the CURRENT_SEGMENT_POINTER is assigned the RESTART_SEGMENT_POINTER from the Status Packet. |
| 9 | 0–4 | These bits are reserved. |
| 9 | 5 | P is the Purge flag. If the purge flag is set, segments matching the specified DISK_NUMBER that are not destaged are purged. Segments that are destaged are subsequently purged by the DESTAGE COMPLETE command. If the purge flag is not set, then no segments are purged. |
| 9 | 6–11 | D_CNT is the maximum number of segments that can be destaged. D_CNT must be greater than one and less than or equal to 8. D_CNT provides a mechanism that allows Host software to control an minimize the amount of buffer space that must be reserved for transferring cache segments to the Host. |
| 9 | 12–35 | These bits are reserved. |

b. DESTAGE AND PURGE DISK Status Packet

FIG. 60 shows the format of a DESTAGE AND PURGE DISK Status Packet 1704. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a DESTAGE AND PURGE DISK command include: "No Action Required," "Down File Cache Interface," "Iterate," and "Purge Disabled Segments and then Resend." |
| 5 | 12–35 | See the Status Packet 460. |
| 6 | | See the Status Packet 460. |
| 7 | | See the READ Status Packet 1604. |
| 8 | | See the DESTAGE Status Packet 1660. |
| 9–127 | | See the CLEAR PENDING Status Packet 1656. |

12. DESTAGE AND PURGE FILE Command

The DESTAGE AND PURGE FILE command is used to destage and optionally purge from cache selected segments of a file that resides in the Outboard File Cache 102 but does not reside on Disk 106. The command also provides for the optional purging of segments of the file from cache. If the command specifies purge and the segment in cache has been written, the segment is destaged and placed in a PURGE PENDING state, otherwise it is purged. If the command does not specify purge, and the segment has been written, the segment is destaged and placed in a DESTAGE PENDING state.

FIG. 61 contains a flowchart which describes the process in which the DESTAGE AND PURGE FILE command may be used. At Step 1706, a Host 10 detects that a DESTAGE AND PURGE FILE operation is necessary. This processing may be necessary when a file is removed from cache mode, that is, it is no longer to be cached in the Outboard File Cache 102.

The DESTAGE AND PURGE FILE operation first requires that the file for which segments will be destaged and purged is locked. This will ensure that no new segments for the part of the file that is affected can be created in the Outboard File Cache 102. Therefore, Step 1708 invokes the File Cache Interface processing with the parameters for sending a LOCK CACHE FILE command to the Outboard File Cache. After the LOCK CACHE FILE command has completed normally, the DESTAGE AND PURGE FILE command may be issued.

Step 1710 invokes the File Cache Interface processing for sending a DESTAGE AND PURGE FILE Command Packet to the Outboard File Cache. The particular parameters for the Command Packet are those which were gathered at Step 1706. If the RECOMMENDED_ACTION returned from the DESTAGE AND PURGE FILE command is Iterate, then decision Step 1712 follows control Path **1712*y*. Step 1714 updates the CURRENT_SEGMENT_POINTER in the Command Packet 452 with the RESTART_SEGMENT_POINTER from the Status Packet 456. Step 1716 releases the Status Packet and control returns to Step 1710** to process the next set of segments.

When the RECOMMENDED_ACTION is no longer Iterate, control Path **1712*n* is followed to Step 1718. Step 1718 invokes the File Cache Interface processing with the parameters necessary for a DESTAGE COMPLETE command. The DESTAGE COMPLETE command informs the Outboard File Cache 102** that the DESTAGE AND PURGE FILE operation is complete and the state of the segments may be changed to AVAILABLE.

The final operation for DESTAGE AND PURGE FILE processing is to send the UNLOCK CACHE FILE command to the Outboard File Cache 102. This is accomplished at Step 1720 by invoking the File Cache Interface processing with the parameters required for an UNLOCK CACHE FILE Command Packet. After the Outboard File Cache has unlocked the specified file, normal input/output processing is resumed at Step 1722.

a. DESTAGE AND PURGE FILE Command Packet

FIG. 62 shows the format of a DESTAGE AND PURGE FILE Command Packet 1732. The following table explains each of the fields in the Command Packet:

| Word | Bit | Definition |
|---|---|---|
| 0–6 | | See the READ Command Packet 1600. |
| 7–8 | | See the CLEAR PENDING Command Packet 1254. |
| 9 | | See the DESTAGE AND PURGE DISK Command Packet 1702. |

b. DESTAGE AND PURGE FILE Status Packet

FIG. 63 shows the format of a DESTAGE AND PURGE FILE Status Packet 1734. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a DESTAGE AND PURGE FILE command include: "No Action Required," "Down File Cache Interface," "Iterate," and "Purge Disabled Segments and then Resend." |
| 5 | 12–35 | See the Status Packet 460. |
| 6 | | See the Status Packet 460. |
| 7 | | See the READ Status Packet 1602. |
| 8 | | See the DESTAGE Status Packet 1660. |
| 9–127 | | See the CLEAR PENDING Status Packet 1656. |

13. DESTAGE AND PURGE FILES BY ATTRIBUTES Command

The DESTAGE AND PURGE FILES BY ATTRIBUTES command is used to destage and optionally purge segments of files that share one or more attributes, whereby the segments belonging to these files which reside in cache and do not reside on Disk 106 are destaged. The Outboard File Cache 102 searches File Space 502 for segments whose FILE_ID matches the attributes specified in the Command Packet. The possible attributes include: all files local to a selected Host, all shared files, all temporary files, all catalogued files, and all files belonging to a selected application program. If the purge flag in the Command Packet is set and the segment has been written, it is destaged and placed in a PURGE PENDING stage, otherwise no processing is performed on the segment. If the purge flag in the Command Packet is not set and the segment has been written, it is destaged and place in a DESTAGE PENDING state, otherwise no processing is performed on the segment. FIG. 42 can be referenced as to how the DESTAGE AND PURGE FILES BY ATTRIBUTES command may be used.

a. DESTAGE AND PURGE FILES BY ATTRIBUTES Command Packet

FIG. 64 shows the format of a DESTAGE AND PURGE FILES BY ATTRIBUTES Command Packet 1760. The following table explains each of the fields in the Command Packet:

| Word | Bit | Definition |
|---|---|---|
| 0–3 | | See the READ Command Packet 1600. |
| 4–5 | | ATTRIBUTES_MASK is a value that is logically ANDed with the FILE_ID in a File Descriptor 508. |
| 6–7 | | ATTRIBUTES_ID is a value that is compared with the result of ANDing the ATTRIBUTES_MASK with a FILE_ID in a File Descriptor. If the ATTRIBUTES_ID matches the result of the AND, then the segment is a candidate for the operation specified in the Command Packet. |
| 8 | | See the CLEAR PENDING Command Packet 1254. |
| 9 | 0–3 | These bits are reserved. |

-continued

| Word | Bit | Definition |
|---|---|---|
| 9 | 4 | B is the Bypass flag. This flag indicates that segments that cannot be destaged are to be bypassed. Examples of segments that cannot be destaged include, but are not limited to, segments in a PENDING state or segments that have the directory recovery in progress flag set. If B=0, then the segments are not bypassed; if B=1, the segments are bypassed. |
| 9 | 5–35 | See the DESTAGE AND PURGE DISK Command Packet 1702. |

b. DESTAGE AND PURGE FILES BY ATTRIBUTES Status Packet

FIG. 65 shows the format of a DESTAGE AND PURGE FILES BY ATTRIBUTES Status Packet 1762. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a DESTAGE AND PURGE FILES BY ATTRIBUTES command include: "No Action Required," "Down File Cache Interface," "Iterate," and "Purge Disabled Segments and then Resend." |
| 5 | 12–35 | See the Status Packet 460. |
| 6 | | See the Status Packet 460. |
| 7 | | See the READ Status Packet 1602. |
| 8 | | See the DESTAGE Status Packet 1660. |
| 9–127 | | See the CLEAR PENDING Status Packet 1656. |

14. LOCK CACHE FILE Command

The LOCK CACHE FILE command is used to prevent the creation of segments and staging of data to segments by a Host 10 which does not own the lock. Access to segments within the range of those indicated in the LOCK CACHE FILE command is restricted. The lock generated by the command is called a "file lock" and only inhibits commands that result in a miss condition within the range of the segments that have been locked by the command. For as long as the file lock exists, access to the segments within the range of the locks is affected as follows:

(1) if the command does not encounter a miss condition, it functions as it would if the lock did not exist; and (2) if the command results in a miss condition, it terminates with a Resend RECOMMENDED_ACTION and a REASON equal to "Locked."

a. LOCK CACHE FILE Command Packet

FIG. 66 shows the format of a LOCK CACHE FILE Command Packet 1764. The following table explains each of the fields in the Command Packet:

| Word | Bit | Definition |
|---|---|---|
| 0–1 | | These words are reserved. |
| 2–5 | | See the READ Command Packet 1600. |
| 6 | | FILE_RELATIVE_SEGMENT_OFFSET identifies the first segment of the file that is to be locked. FILE_RELATIVE_SEGMENT_OFFSET should equal 0 if the entire file is to be locked. |
| 7 | | LAST_FILE_RELATIVE_SEGMENT_OFFSET identifies the last segment in the file that is to be locked. If the entire file is to be locked, then LAST_FILE_RELATIVE_SEGMENT_OFFSET must specify the highest logical track written in the file. |

b. LOCK CACHE FILE Status Packet

FIG. 67 shows the format of a LOCK CACHE FILE Status Packet 1766. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a LOCK CACHE FILE command include: "No Action Required," and "Resend." |
| 5 | 12–35 | See the Status Packet 460. |
| 6 | | See the Status Packet 460. |
| 7 | 0–9 | These bits are reserved. |
| 7 | 10–17 | HOST_ID identifies the Host 10 that owns the conflicting lock if the RECOMMENDED_ACTION is Resend and the REASON is Conflict Exists. |
| 8–10 | | These words are reserved. |
| 11–127 | | See the READ Status Packet 1602. |

15. LOCK CACHE FILES BY ATTRIBUTES Command

The LOCK CACHE FILE BY ATTRIBUTES command is used to prevent the creation of segments and staging of data to the files matching the attributes specified in the Command Packet by a Host 10 which does not own the lock. Access to segments to those files indicated in the LOCK CACHE FILES BY ATTRIBUTES command is restricted. The lock generated by the command is called an "attribute lock" and inhibits commands that result in a miss condition for the files that have been locked by the command. For as long as the attributes lock exists, access to the locked files is affected as follows:

(1) if the command does not encounter a miss condition, it functions as it would if the lock did not exist; and (2) if the command results in a miss condition, it terminates with a Resend RECOMMENDED_ACTION and a REASON equal to "Locked."

a. LOCK CACHE FILES BY ATTRIBUTES Command Packet

FIG. 68 shows the format of a LOCK CACHE FILES BY ATTRIBUTES Command Packet 1768. The following table explains each of the fields in the Command Packet:

| Word | Bit | Definition |
|---|---|---|
| 0–1 | | These words are reserved. |
| 2–7 | | See the DESTAGE AND PURGE FILES BY ATTRIBUTES Command Packet 1760. |

b. LOCK CACHE FILES BY ATTRIBUTES Status Packet

FIG. 69 shows the format of a LOCK CACHE FILES BY ATTRIBUTES Status Packet 1770. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a LOCK CACHE FILES BY ATTRIBUTES command include: "No Action Required," and "Resend." |
| 5 | 12–35 | See the Status Packet 460. |
| 6 | | See the Status Packet 460. |
| 7 | | See the READ Status Packet 1602. |

-continued

| Word | Bit | Definition |
|---|---|---|
| 8–10 | | These words are reserved. |
| 11–127 | | See the CLEAR PENDING Status Packet 1656. |

16. MODIFY File Descriptor Command

The MODIFY File Descriptor command is used to change the information contained in one or more File Descriptors 508. The MODIFY File Descriptor command may be used to change the disk numbers and disk addresses for selected segments. The command may also be used to update the destage group to which the selected segments belong.

a. MODIFY File Descriptor Command Packet

FIG. 70 shows the format of a MODIFY File Descriptor Command Packet 1772. The following table explains each of the fields in the Command Packet:

| Word | Bit | Definition |
|---|---|---|
| 0–1 | | These words are reserved. |
| 2 | | See the Command Packet 452. |
| 3 | 0–3 | These bits are reserved. |
| 3 | 4–11 | See the Command Packet 452. |
| 3 | 12–23 | These bits are reserved. |
| 3 | 24–35 | See the Command Packet 452. |
| 4–6 | | See the READ Command Packet 1600. |
| 7 | 0–4 | These bits are reserved. |
| 7 | 5 | RC is the Recovery Complete flag. This flag is beyond the scope of this invention. |
| 7 | 6 | LG1 is the Leg-1 flag. If LG1=1, then the disk numbers and addresses for LEG1 in the File Descriptor should be modified as indicated by the Command Packet, unless RC=1. |
| 7 | 7 | LG2 is the Leg-2 flag. If LG2=1, then the disk numbers and addressed for LEG2 in the File Descriptor should be modified as indicated by the Command Packet, unless RC=1. |
| 7 | 8–35 | See the DESTAGE COMPLETE Command Packet 1664. |
| 8–11 | | These words contain the Leg-1 and Leg-2 disk numbers and disk addresses to assign to the File Descriptor. |

b. MODIFY File Descriptor Status Packet

FIG. 71 illustrates the format and content of a MODIFY File Descriptor Status Packet 1774. The following table explains each of the fields:

| Word | Bit | Definition |
|---|---|---|
| 0–4 | | See the Status Packet 460. |
| 5 | 0–11 | The possible RECOMMENDED_ACTIONs returned in response to a MODIFY File Descriptor command include: "No Action Required," and "Resend." |
| 5 | 12-35 | See the Status Packet 460. |
| 6 | | See the Status Packet 460. |
| 7–127 | | See the READ Status Packet 1604. |

17. PURGE DISK Command

The PURGE DISK command is used to purge all segments in the Outboard File Cache 102 which are assigned to the Disk 106 specified by the command. The Outboard File Cache will search its File Space 502 looking for segments associated with the specified Disk. For each segment found, if the segment is associated with only one disk, it is purged; if the segment is associated with more than one disk, zero is assigned to the disk number (in the File Descriptor 508) that corresponds to the Disk specified in the command.

FIG. 72 contains a flowchart showing the processing in which the PURGE DISK command may be used. At Step 1776, a Host 10 detects that all data in cache which is associated with a particular Disk 106 should be purged. One scenario giving rise to this event would be where the Disk is removed from an operational state. Any segments associated with the Disk should be removed from cache because they are no longer accessible on the inoperative Disk.

Step 1778 sends a purge-disk message to the other Hosts 10 which are coupled to the Outboard File Cache 102. The Hosts to which the message is sent are referred to as the "responding Hosts", and the Host which initiated the purge operation will be referred to as the "initiating Host." The purge-disk message is used to inform the responding Hosts that the segments belonging to the specified disk will be purged from cache. Before the initiating Host can continue with the purge operation, it must wait for the responding Hosts to complete any staging activities associated with the specified disk. Step 1780 indicates that the responding Hosts wait for completion of any staging which is associated with the specified disk and is in progress. The responding Hosts also suspend any further I/O with the specified disk.

Step 1782 specifies that each responding Host sends a response message to the initiating Host when it has completed all the staging activities associated with the specified disk and that all I/O to the disk has been stopped. Once the initiating Host has received responses from all the responding Hosts, it may continue with the purge processing as indicated by Step 1784. At Step 1786, File Cache Interface processing is invoked with the parameters for sending a PURGE DISK Command Packet to the Outboard File Cache 102. If the RECOMMENDED_ACTION returned from the PURGE DISK command is Iterate, then decision Step 1788 follows control Path 1788y. Step 1790 updates the CURRENT_SEGMENT_POINTER in the Command Packet 452 with the RESTART_SEGMENT_POINTER from the Status Packet 456. Step 1792 releases the Status Packet and control returns to Step 1786 to process the next set of segments.

When the RECOMMENDED_ACTION is no longer Iterate, control Path 1788y is followed to Step 1794 where normal input/output processing continues.

a. PURGE DISK Command Packet

FIG. 73 shows the format of a PURGE DISK Command Packet 1802. The following table explains each of the fields in the Command Packet:

| Word | Bit | Definition |
|---|---|---|
| 0–3 | | See the READ Command Packet 1600. |
| 4 | 0–3 | These bits are reserved. |
| 4 | 4–35 | DISK_NUMBER is the disk identifier used by the operating system. |
| 5–7 | | These words are reserved. |
| 8 | | CURRENT_SEGMENT_POINTER is used by the Outboard File Cache 102 to locate the first segment that is to be processed by the command. CURRENT_SEGMENT_POINTER is 0 when the Command Packet is first sent to the Outboard File Cache. If the RECOMMENDED_ACTION in the Status Packet is "Iterate," the CURRENT_SEGMENT_POINTER is assigned the RESTART_SEGMENT_POINTER from the Status Packet. |

b. PURGE DISK Status Packet

FIG. 74 shows the format of a PURGE DISK Status Packet 1804. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a PURGE DISK command include: "No Action Required," and "Iterate." |
| 5 | 12–35 | See the Status Packet 460. |
| 6 | | See the Status Packet 460. |
| 7 | | See the READ Status Packet 1602. |
| 8 | | This word is reserved. |
| 9–127 | | See the CLEAR PENDING Status Packet 1656. |

18. PURGE FILE Command

The PURGE FILE command may be used to purge from cache an entire file, selected segments of a file, selected blocks within a file, a leg of a file, or part of a leg of a file.

FIG. 75 contains a flowchart which describes the process in which the PURGE FILE command may be used. At Step 1806, a Host 10 detects that a PURGE FILE operation is necessary. The conditions that give rise to this event may include deletion of all or part of a file.

The PURGE FILE operation first requires that the file on which the purge operation will occur is locked. This will ensure that no new segments for the part of the file that is affected can be created in the Outboard File Cache 102. Therefore, Step 1808 invokes the File Cache Interface processing with the parameters for sending a LOCK CACHE FILE command to the Outboard File Cache. After the LOCK CACHE FILE command has completed normally, the PURGE FILE command may be issued.

Step 1810 invokes the File Cache Interface processing for sending a PURGE FILE Command Packet to the Outboard File Cache. The particular parameters for the Command Packet are those which were gathered at Step 1806. If the RECOMMENDED_ACTION returned from the PURGE FILE command is Iterate, then decision Step follows control Path 1812y. Step 1814 updates the CURRENT_SEGMENT_POINTER in the Command Packet 452 with the RESTART_SEGMENT_POINTER from the Status Packet 456. Step 1816 releases the Status Packet and control returns to Step 1810 to process the next set of segments.

When the RECOMMENDED_ACTION is no longer Iterate, control Path 1812n is followed to Step 1818. Step 1818 invokes the File Cache Interface processing with the parameters necessary for an UNLOCK CACHE FILE Command Packet. After the Outboard File Cache has unlocked the specified file, normal input/output processing is resumed at Step 1820.

a. PURGE FILE Command Packet

FIG. 76 shows the format of a PURGE FILE Command Packet 1820. The following table explains each of the fields in the Command Packet:

| Word | Bit | Definition |
|---|---|---|
| 0–2 | | See the READ Command Packet 1600. |
| 3 | 0–11 | See the READ Command Packet 1600. |
| 3 | 12–17 | FSRBO is the First Segment Relative Block Offset. This is the number of the first block (relative to the segment specified by FILE_RELATIVE_SEGMENT_OFFSET) that is to be purged. |
| 3 | 18–23 | LSRBO is the Last Segment Relative Block Offset. This is the number of the last block (relative to the segment specified by LAST_FILE_RELATIVE_SEGMENT_OFFSET) that is to be purged. If PT does not specify purge blocks, |

-continued

| Word | Bit | Definition |
|---|---|---|
| | | LSRBO is ignored. |
| 3 | 24–35 | See Command Packet 452. |
| 4–6 | | See READ Command Packet 1600. |
| 7–8 | | See the CLEAR PENDING Command Packet 1254. |
| 9 | 0–3 | These bits are reserved. |
| 9 | 4–5 | PT is the Purge Type. Purge Type is the type of purge to be performed: segment, blocks, leg-1, or leg-2. If PT = 0, the Purge Type is purge segments; if PT = 1, the Purge Type is purge blocks; if PT = 2, the Purge Type is purge leg-1; and if PT = 3, the Purge Type is purge leg-2. |
| 9 | 6–35 | These bits are reserved. |

b. PURGE FILE Status Packet

FIG. 77 shows the format of a PURGE FILE Status Packet 1822. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a PURGE FILE command include "No Action Required," and "Iterate." |
| 5 | 12–35 | See the Status Packet 460. |
| 6 | | See the Status Packet 460. |
| 7 | | See the READ Status Packet 1602. |
| 8 | | This word is reserved. |
| 9–127 | | See the CLEAR PENDING Status Packet 1656. |

19. PURGE FILES BY ATTRIBUTES Command

The PURGE FILES BY ATTRIBUTES command may be used to purge from cache all segments with the attributes specified in the Command Packet. The following paragraphs describe the capabilities provided by this command and the scenarios giving rise to the identified capabilities.

This command may be used by a Host 10 to purge all segments associated with files which are local to the Host. A local file is a file that can be accessed by only one Host. This command may be used when a Host has stopped processing and will probably not resume processing.

The PURGE FILES BY ATTRIBUTES command may be used by a Host 10 to purge segments associated with files which are local to a different Host. A scenario which may necessitate this type of use is where the other Host has suffered a catastrophic failure and cannot purge its own segments. A Host which is still operational may be used to clear from cache those segments belonging to the failed Host.

The PURGE FILES BY ATTRIBUTES command may be used to purge all segments associated with any temporary files. If an application program has opened any files which it has designated as temporary, and the application terminates without removing its temporary files, this command may be used to purge the segments in cache which are associated with the temporary files.

FIG. 78 is a flowchart showing the processing in which the PURGE FILES BY ATTRIBUTES command may be used. Step 1824 detects that selected files which sharing one or more attributes should be purged. This detection Step 1824 is part of the scenarios which were described in the preceding paragraphs. The particular scenario in which this command is used dictates the attributes and other parameters used in the Command Packet.

Before the desired files can be purge, they must be locked so that no new segments for the files affected by the command can be created in the Outboard File Cache 102. Step 1826 invokes the File Cache Interface processing to send a LOCK CACHE FILES BY ATTRIBUTES command to the Outboard File Cache. The parameters used in the LOCK CACHE FILES BY ATTRIBUTES command reference the same files for which the PURGE FILES BY ATTRIBUTES command will be issued.

After the specified files have been locked by the Outboard File Cache, Step 1828 invokes the File Cache Interface processing for sending the PURGE FILES BY ATTRIBUTES command. The parameters used in the Command Packet are those detected at Step 1824. If the RECOMMENDED_ACTION returned from the PURGE FILES BY ATTRIBUTES command is Iterate, then decision Step 1830 follows control Path 1830*y*. Step 1832 updates the CURRENT_SEGMENT_POINTER in the Command Packet 452 with the RESTART_SEGMENT_POINTER from the Status Packet 456. Step 1834 releases the Status Packet and control returns to Step 1828 to process the next set of segments.

When the RECOMMENDED_ACTION is no longer Iterate, control Path 1830*n* is followed to Step 1836. Step 1836 invokes the File Cache Interface processing with the parameters required for an UNLOCK CACHE FILES BY ATTRIBUTES command. The files referenced by the UNLOCK command are the same as those referenced by the LOCK and PURGE commands sent respectively at Steps 1826 and 1828. After the files have been unlocked, normal input/output processing may resume as indicated at Step 1838.

a. PURGE FILES BY ATTRIBUTES Command Packet

FIG. 79 shows the format of a PURGE FILES BY ATTRIBUTES Command Packet 1850. The following table explains each of the fields in the Command Packet:

| Word | Bit | Definition |
|---|---|---|
| 0–3 | | See the READ Command Packet 1600. |
| 4–8 | | See the DESTAGE AND PURGE FILES BY ATTRIBUTES Command Packet 1760. |
| 9 | 0–3 | These bits are reserved. |
| 9 | 4–11 | HOST_ID identifies the Host 10 for which recovery is complete. If the Purge Non-Recovered Local (PNRL) segments flag and the Local Recovery Complete (LRC) flag equal zero, then the HOST_ID is ignored. |
| 9 | 12–30 | These bits are reserved. |
| 9 | 31 | PNRL is the Purge Non-Recovered Local segments flag. This flag indicates whether any segment within the File Space 502 for which the following conditions are true is to be purged: (1) the directory recovery in progress flag is set; and (2) the HOST_ID in the Command Packet is equal to the host identifier portion of the FILE_IDENTIFIER in the File Descriptor 508; and (3) the FILE_IDENTIFIER in the File Descriptor matches the attributes specified in the Command Packet. If PNRL = 0, then non-recovered local segments are not purged, and if PNRL = 1, then non-recovered local segments are purged. |
| 9 | 32 | PNRS is the Purge Non-Recovered Shared segments flag. This flag indicates whether any segment in File Space 502 for which the following conditions are true is to be purged: (1) the directory recovery in progress flag in the File Descriptor is set; and (2) the HOST_ID in the Command Packet matches the host identifier portion of the FILE_IDENTIFIER in the File Descriptor; and (3) the FILE_IDENTIFIER in the File Descriptor matches the attributes specified in the |

-continued

| Word | Bit | Definition |
|---|---|---|
| | | Command Packet. If PNRS = 0, then the non-recovered shared segments are not purged, and if PNRS = 1, the non-recovered shared segments are purged, |
| 9 | 33 | LRC is the Local Recovery Complete flag. This flag indicates whether the process required to recover the local directory specified by HOST_ID has been completed. If LRC = 0, local recovery is not completed, and if LRC = 1, the local recovery is complete. Note, fields and conditions relating to recovery of segments are beyond the scope of this invention. |
| 9 | 34 | SRC is the Shared Recovery Complete flag. This flag indicates whether the process required to recover the shared directory has been completed. If SRC = 0, shared recovery is not complete, and if SRC = 1, shared recovery is complete. |
| 9 | 35 | CP is the Clear Pendings flag. This flag indicates whether any segment in File Space 502 for which the following conditions are true is to be removed from a PENDING state: (1) the segment's state is DESTAGE PENDING, PURGE PENDING, or STAGE PENDING; and (2) the HOST_RECOVERY_IN_PROGRESS flag which corresponds to the Host identified by the HOST_ID is set; and (3) the segment was placed in a PENDING state before the most recent RECOVERY HOST command that satisfies the following conditions was processed by the Outboard File Cache 102: (a) the RECOVER HOST command did not have its probe flag set; and (b) the RECOVER HOST command had its Recover Host And Local Directory flag set; and (c) the HOST_ID in the RECOVER HOST command is equal to the host identifier portion of the FILE_IDENTIFIER in the File Descriptor 508. If CP = 0, the PENDING states are not cleared, and if CP = 1, the PENDING states are cleared. |

b. PURGE FILES BY ATTRIBUTES Status Packet

FIG. 80 shows the format of a PURGE FILES BY ATTRIBUTES Status Packet 1854. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a PURGE FILES BY ATTRIBUTES command include: "No Action Required," and "Iterate." |
| 5 | 12–35 | See the Status Packet 460. |
| 6 | | See the Status Packet 460. |
| 7 | | See the READ Status Packet 1602. |
| 8 | | This word is reserved. |
| 9–127 | | See the CLEAR PENDING Status Packet 1656. |

20. RETURN SEGMENT STATE Command

The RETURN SEGMENT STATE command is used to provide the Host 10 with the Segment State Packets which contain the information describing the state of selected segment in File Space 502. The command may be used to determine what data contained in a file, or a part of a file, resides in File Space 502, but not on Disk 106. This information can be used to bypass the Outboard File Cache 102 on long reads. The command may also be used to determine whether any data associated with a particular file or disk resides in File Space, or whether any data associated with a particular file or disk resides in File Space and has not been destaged to Disk.

a. RETURN SEGMENT STATE Command Packet

FIG. 81 shows the format of a RETURN SEGMENT STATE Command Packet 2106. The following table explains each of the fields in the Command Packet:

| Word | Bit | Definition |
|---|---|---|
| 0–1 | | These words are reserved. |
| 2 | | See Command Packet 452. |
| 3 | 0–4 | These bits are reserved. |
| 3 | 5–11 | See Command Packet 452. |
| 3 | 12–17 | These bits are reserved. |
| 3 | 18–23 | SEG_TYPE is the type of segments for which Segment State Packets 2110 are to be returned. If SEG_TYPE = 0, then Segment State Packets are returned for all segments which have their SEGMENT_WRITTEN flag set and which match the FILE_IDENTIFIER and SEGMENT_OFFSET parameters in the Command Packet. If SEG_TYPE = 1, then Segment State Packets are returned for all segments which match the FILE_IDENTIFIER and SEGMENT_OFFSET parameters in the Command Packet. If SEG_TYPE = 2, then one Segment State Packet is returned for the first segment whose SEGMENT_WRITTEN flag is set and which matches the FILE_IDENTIFIER and SEGMENT_OFFSET parameters in the Command Packet. If SEG_TYPE = 3, then one Segment State Packet is returned for the first segment which matches the FILE_IDENTIFIER and SEGMENT_OFFSET parameters in the Command Packet. If SEG_TYPE = 4, then one Segment State Packet is returned for the first segment found in the Outboard File Cache whose SEGMENT_WRITTEN flag is set, and which matches the DISK_NUMBER parameter in the Command Packet If SEG_TYPE = 5, then one Segment State Packet is returned for the first segment found in the Outboard File Cache which matches the DISK_NUMBER parameter in the Command Packet. If SEG_TYPE = 6, then one Segment State Packet is returned for the segment which matches the FILE_IDENTIFIER and CURRENT_SEGMENT_POINTER parameters in the Command Packet. |
| 3 | 24–35 | See Command Packet 452. |
| 4–6 | | See the READ Command Packet 1600. |
| 7–8 | | See the CLEAR PENDING Command Packet 1254. |
| 9 | 0–3 | These bits are reserved. |
| 9 | 4–35 | DISK_NUMBER is the disk identifier used by the operating system to identify the Disk 106 on which the segment is stored. DISK_NUMBER is ignored by the Outboard File Cache unless SEG_TYPE = 4 or SEG_TYPE = 5. |

b. RETURN SEGMENT STATE Status Packet

FIG. 82 shows the format of a RETURN SEGMENT STATE Status Packet 2108. The following table explains each of the fields in the Status Packet:

| Word | Bit | Definition |
|---|---|---|
| 0–4 | | See the Status Packet 460. |
| 5 | 0–11 | The possible RECOMMENDED_ACTIONs returned in response to a RETURN SEGMENT STATE command include: "No Action Required," and "Iterate." |
| 5 | 12–35 | See the Status Packet 460. |
| 6 | | See the Status Packet 460. |
| 7 | | See the READ Status Packet 1602. |
| 8 | | See the DESTAGE Status Packet 1660. |

-continued

| Word | Bit | Definition |
|---|---|---|
| 9 | | See the CLEAR PENDING Status Packet 1656. |
| 10–127 | | See the DESTAGE Status Packet 1660. |

c. Segment State Packet

FIG. 83 shows the format of a Segment State Packet 2110. Segment State Packets are returned in the Segment Information Table portion of a RETURN SEGMENT STATE Status Packet 2108. A Segment State Packet contains information which describes the current state of a segment residing in the Outboard File Cache 102. The following table explains each of the fields in the Status Packet:

| Word | Bit | Definition |
|---|---|---|
| 0–1 | | See File Identifier 1602. |
| 2 | | See the READ Command Packet 1600. |
| 3 | 0–3 | These bits are reserved. |
| 3 | 4–11 | HOST_ID identifies the Host 10 whose operations put the identified segment in a PENDING state. Unless the SEGMENT_STATE in the File Descriptor 508 is STAGE PENDING, DESTAGE PENDING, or PURGE PENDING, the contents of this field is undefined. |
| 3 | 12–23 | PATH_ID is an value, internal to the Outboard File Cache 102, that identifies the physical path through which data was transferred to or from the segment. |
| 3 | 24–29 | STATE is the state of the segment as indicated in the File Descriptor 508.<br>STATE = 0 indicates that the segment is AVAILABLE.<br>STATE = 1 indicates that the state is STAGE PENDING.<br>STATE = 2 indicates that the state is DESTAGE PENDING.<br>STATE = 3 is reserved.<br>STATE = 4 indicates that the state is PURGE PENDING. |
| 3 | 30–35 | SVF is the Segment Valid Flag. If SVF = 0, then the TOTAL_SEGMENT_VALID flag in the File Descriptor 508 is not set. If SVF = 1, then the TOTAL_SEGMENT_VALID flag in the File Descriptor 508 is set |
| 4–5 | | See the Segment Information Packet 1662. |
| 6 | 0–3 | These bits are reserved. |
| 6 | 4–35 | PROGRAM_IDENTIFIER identifies the program which most recently caused the identified segment to be placed in a PENDING state: Unless the STATE indicates STAGE PENDING, DESTAGE PENDING, or PURGE PENDING, the content of this field is ignored. |
| 7 | 0–32 | These bits are reserved. |
| 7 | 33 | DR is the Directory Recovery in progress flag. if DR = 1, then the segment belongs to a directory that is currently in the process of being recovered. Otherwise DR = 0. Note, recovery flags are beyond the scope of this invention. |
| 7 | 34 | RS is the Resident file Space flag. If RS = 1, then the segment is in Resident File Space 524. Otherwise RS = 0. |
| 7 | 35 | DF is the Disabled Flag. If DF = 1, the SEGMENT_DISABLED flag in the File Descriptor was found to be set. Otherwise, DF = 0. |
| 8–9 | | These words are reserved. |

21. STAGE BLOCKS Command

The STAGE BLOCKS command is used to stage one or more Blocks 504 from a Host Buffer 834 to the Outboard File Cache 102. The command is only used to stage data from a Host Buffer to the Outboard File Cache in response to a miss from a WRITE command, that is a Stage Data RECOMMENDED_ACTION in a WRITE Status Packet. This command is never used to stage data from a DISK 106 to the Outboard File Cache. For staging data from Disk to the Outboard File Cache see the STAGE SEGMENTS command.

This command provides the functionality that allows a Host 10 to avoid reading data from a Disk 106 before writing the desired data to the file. This command is particularly useful where selected Blocks 504 within a segment of a file are being written.

a. STAGE BLOCKS Command Packet

FIG. 84 illustrates the information and format of the STAGE BLOCKS Command Packet 2112. The following table explains each of the fields:

| Word | Bit | Definition |
|---|---|---|
| 0–1 | | See the Data Descriptor Word 870. |
| 2 | | See the Command Packet 452. |
| 3 | 0–11 | See the Command Packet 452 |
| 3 | 12–23 | BLOCK_COUNT is the number of Blocks 504 to be written to the Outboard File Cache 102. |
| 3 | 24–35 | See the Command Packet 452. |
| 4–6 | | See the READ Command Packet 1600. |
| 7 | 0–6 | These bits are reserved. |
| 7 | 7 | See the ALLOCATE Command Packet 1650. |
| 7 | 8–15 | HOST_ID identifies the Host 10 that caused the segments to be placed in a STAGE PENDING state. |
| 7 | 16–23 | See the GROUP_ID in the File Descriptor 508. |
| 7 | 24–29 | SRBO is the Segment Relative Block Offset. This is the first block, relative to the beginning of the first segment, that is addressed by the command. |
| 7 | 30–35 | SEG_CNT is the number of segment that is addressed by the command. |
| 8–12 | 0–3 | These bits are reserved. |
| 8 | 4–35 | LEG1_DISK_NUMBER is the number of the disk that is associated with the leg1 copy of the segments that are staged by the command. |
| 9 | 4–35 | LEG2_DISK_NUMBER is the number of the disk that is associated with the leg2 copy of the segments that are staged by the command. |
| 10 | 4–35 | LEG1_DISK_ADDRESS specifies the first segment's location on the leg1 disk. LEG1_DISK_ADDRESS contains the disk relative logical track offset (relative to the start of the disk identified by the LEG1_DISK_NUMBER) for the first segment addressed by the command. |
| 11 | 4–35 | LEG2_DISK_ADDRESS specifies the first segments location on the leg2 disk. LEG2_DISK_ADDRESS contains the disk relative logical track offset (relative to the start of the disk identified by the LEG2_DISK_NUMBER) for the first segment addressed by the command. |
| 12 | 4–35 | PROGRAM_IDENTIFIER is the PROGRAM_ID of the command packet which caused the segment to be placed in a STAGE PENDING state. This value is supplied in the Status Packet returned from the Outboard File cache 102. |

b. STAGE BLOCKS Status Packet

FIG. 85 illustrates the information and format of the STAGE BLOCKS Status Packet 2114. The following table explains each of the fields:

| Word | Bit | Definition |
|---|---|---|
| 0–4 | | See the Status Packet 460. |
| 5 | 0–11 | The possible RECOMMENDED_ACTIONs returned in response to a STAGE BLOCKS command include: "No Action Required," "Down File Cache Interface," "Resend," and "Send Clear Pending Followed by Original Command." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See READ Status Packet 1604. |

22. STAGE SEGMENTS Command

The STAGE SEGMENTS command is used in staging segments of data from a Disk 106 to the Outboard File Cache 102. The command is only used in staging data from a Disk, and is never used in staging data directly from a Host Buffer 834. If either a READ or WRITE OFF BLOCK BOUNDARY command results in a Stage Data RECOMMENDED_ACTION, the STAGE SEGMENTS command is used in staging the data from Disk.

a. STAGE SEGMENTS Command Packet

FIG. 86 illustrates the information and format of the STAGE SEGMENTS Command Packet 2116. The following table explains each of the fields:

| Word | Bit | Definition |
|---|---|---|
| 0–1 | | See the Data Descriptor Word 870. |
| 2 | | See the Command Packet 452. |
| 3 | 0–11 | See the Command Packet 452 |
| 3 | 12–23 | See the STAGE BLOCKS Command Packet 2112. |
| 3 | 24–35 | See the Command Packet 452. |
| 4–6 | | See the READ Command Packet 1600. |
| 7 | 0–23 | See the STAGE BLOCKS Command Packet 2112. |
| 7 | 24–29 | These bits are reserved. |
| 7 | 30–35 | SEG_CNT is the number of segment addressed by this command. |
| 8–12 | | See the STAGE BLOCKS Command Packet 2112. |

b. STAGE SEGMENTS Status Packet

FIG. 87 illustrates the information and format of the STAGE SEGMENTS Status Packet 2118. The following table explains each of the fields:

| Word | Bit | Definition |
|---|---|---|
| 0–4 | | See the Status Packet 460. |
| 5 | 0–11 | The possible RECOMMENDED_ACTIONs returned in response to a STAGE SEGMENTS command include: "No Action Required," "Down File Cache Interface." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See READ Status Packet 1604. |

23. STAGE WITHOUT DATA Command

The STAGE WITHOUT DATA is used in responding to a Stage Data RECOMMENDED_ACTION. If one or more segments referenced by a WRITE OFF BLOCK BOUNDARY command are not in cache, then the STAGE WITHOUT DATA command may be used to update File Descriptors 508 for the missed segments without staging any data to the Outboard File Cache 102. The File Descriptors, for those segment addressed by the command that are STAGE PENDING are updated with the appropriate information from the STAGE WITHOUT DATA Command Packet. The segments are then made AVAILABLE.

a. STAGE WITHOUT DATA Command Packet

FIG. 88 illustrates the information and format of the STAGE WITHOUT DATA Command Packet 2120. The following table explains each of the fields:

| Word | Bit | Definition |
|---|---|---|
| 0–1 | | These words are reserved. |
| 2 | | See the Command Packet 452. |
| 3 | 0–11 | See the Command Packet 452 |
| 3 | 12–23 | BLOCK_COUNT is the number of Blocks 504 to be written to the Outboard File Cache 102. |
| 3 | 24–35 | See the Command Packet 452. |

-continued

| Word | Bit | Definition |
|---|---|---|
| 4–6 | | See the READ Command Packet 1600. |
| 7 | 0–6 | These bits are reserved. |
| 7 | 7 | See the ALLOCATE Command Packet 1650. |
| 7 | 8–15 | HOST_ID identifies the Host 10 that caused the segments to be placed in a STAGE PENDING state. |
| 7 | 16–23 | See the GROUP_ID in the File Descriptor 508. |
| 7 | 24–29 | These bits are reserved. |
| 7 | 30–35 | SEG_CNT is the number of segment that is addressed by the command. |
| 8–12 | | See the STAGE BLOCKS Command Packet 2112. |

b. STAGE WITHOUT DATA Status Packet

FIG. 89 illustrates the information and format of the STAGE WITHOUT DATA Status Packet 2122. The following table explains each of the fields:

| Word | Bit | Definition |
|---|---|---|
| 0–4 | | See the Status Packet 460. |
| 5 | 0–11 | The possible RECOMMENDED_ACTIONs returned in response to a STAGE WITHOUT DATA command include: "No Action Required," and "Send Clear Pending Followed by Original Command." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See READ Status Packet 1604. |

24. UNLOCK CACHE FILE Command

The UNLOCK CACHE FILE command is used to release a file lock that was created by a LOCK CACHE FILE command. The command may be use to unlock files in both Cache File Space 522 and Resident File Space 524.

a. UNLOCK CACHE FILE Command Packet

FIG. 90 shows the format of a UNLOCK CACHE FILE Command Packet 2124. The following table explains each of the fields in the Command Packet:

| Word | Bit | Definition |
|---|---|---|
| 0–1 | | These words are reserved. |
| 2 | | See the Command Packet 452. |
| 3 | 0–11 | See the Command Packet 452. |
| 3 | 12–23 | These bits are reserved. |
| 3 | 24–35 | See the Command Packet 452. |
| 4–6 | | See the READ Command Packet 1600. |
| 7 | | See the CLEAR PENDING Command Packet 1254. |

b. UNLOCK CACHE FILE Status Packet

FIG. 91 shows the format of a UNLOCK CACHE FILE Status Packet 2126. The following table explains each of the fields in the Status Packet:

| Word | Bit | Definition |
|---|---|---|
| 0–4 | | See the Status Packet 460. |
| 5 | 0–11 | The RECOMMENDED_ACTION returned in response to a UNLOCK CACHE FILE command "No Action Required." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See READ Status Packet 1604. |

25. UNLOCK CACHE FILES BY ATTRIBUTES Command

The UNLOCK CACHE FILES BY ATTRIBUTES command releases an attributes lock that was created by a corresponding LOCK CACHE FILES BY ATTRIBUTES command. The UNLOCK CACHE FILES BY ATTRIBUTES may be applied to files in both Cache File Space 522 and Resident File Space 524.

a. UNLOCK CACHE FILES BY ATTRIBUTES Command Packet

FIG. 92 shows the format of a UNLOCK CACHE FILES BY ATTRIBUTES Command Packet 2128. The following table explains each of the fields in the Command Packet:

| Word | Bit | Definition |
|---|---|---|
| 0–1 | | These words are reserved. |
| 2 | | See the Command Packet 452. |
| 3 | 0–11 | See the Command Packet 452. |
| 3 | 12–23 | These bits are reserved. |
| 3 | 24–35 | See the Command Packet 452. |
| 4–7 | | See the DESTAGE AND PURGE FILES BY ATTRIBUTES Command Packet 1760. |

b. UNLOCK CACHE FILES BY ATTRIBUTES Status Packet

FIG. 93 shows the format of a UNLOCK CACHE FILES BY ATTRIBUTES Status Packet 2130. The following table explains each of the fields in the Status Packet:

| Word | Bit | Definition |
|---|---|---|
| 0–4 | | See the Status Packet 460. |
| 5 | 0–11 | The RECOMMENDED_ACTION returned in response to a UNLOCK CACHE FILES BY ATTRIBUTES command "No Action Required." |
| 5 | 12–35 | See the Status Packet 460. |
| 6 | | See the Status Packet 460. |
| 7 | | See the READ Status Packet 1604. |
| 8–10 | | These words are reserved. |
| 11–127 | | See READ Status Packet 1604. |

26. WRITE Command

The WRITE command is used to write data to a file which is stored in the Outboard File Cache 102. In particular, this command is used to write data into a file where the first word written is the first word of a block and the last word written is the last word of a block. The WRITE OFF BLOCK BOUNDARY command is used when either the first word to be written is not the first word of a block or the last word to be written is not the last word of a block.

a. WRITE Command Packet

FIG. 94 shows the format and content of a WRITE Command Packet 2132. The following table describes each of the fields contained in the WRITE Command Packet:

| Word | Bit | Definition |
|---|---|---|
| 0–1 | | See the Data Descriptor Word 870. |
| 2 | | See the Command Packet 452. |
| 3 | 0–11 | See the Command Packet 452. |
| 3 | 12–23 | BLOCK_COUNT is the number of blocks to be written to the Outboard File Cache 102. |
| 3 | 24–35 | See the Command Packet 452. |
| 4–6 | | See the READ Command Packet 1600. |
| 7 | 0–3 | These bits are reserved. |
| 7 | 4 | FF is the Force Fill flag. If a miss condition is encountered and FF is set, bypass the sequential write check. |

-continued

| Word | Bit | Definition |
|---|---|---|
| 7 | 5–6 | See the READ Command Packet 1600. |
| 7 | 7–23 | These bits are reserved. |
| | 24–35 | See the READ Command Packet 1600. |

b. WRITE Status Packet

FIG. 95 shows the content and format of a WRITE Status Packet 2134. The following table explains each of the fields in the Status Packet:

| Word | Bit | Definition |
|---|---|---|
| 0–4 | | See the Program Status Packet 460. |
| 5 | 0–11 | The valid RECOMMENDED_ACTIONS for a WRITE command are: "Destage Data and then Resend," "Down File Cache Interface," "Rescan File," "Resend", "Return Status to User", "Stage Data", "Stage Data and Log No Resident File Space Condition." |
| 5 | 12–35 | See the Program Status Packet 460. |
| 6 | | See the Program Status Packet 460. |
| 7–8 | | See the READ Status Packet 1604. |
| 9–10 | | These words are reserved. |
| 11–127 | | See the READ Status packet 1604. |

27. WRITE OFF BLOCK BOUNDARY Command

The WRITE OFF BLOCK BOUNDARY command is used to write data to a file where the first word to be written is the first word of a block and/or the last word to be written is not the last word of a block.

a. WRITE OFF BLOCK BOUNDARY Command Packet

FIG. 96 shows the format and content of a WRITE OFF BLOCK BOUNDARY Command Packet 2136. The following table describes each of the fields contained in the WRITE OFF BLOCK BOUNDARY Command Packet:

| Word | Bit | Definition |
|---|---|---|
| 0–1 | | See the Data Descriptor Word 870. |
| 2 | | See the Command Packet 452. |
| 3 | 0–11 | See the Command Packet 452. |
| 3 | 12–23 | BLOCK_COUNT is the number of blocks to be written to the Outboard File Cache 102. |
| 3 | 24–35 | See the Command Packet 452. |
| 4–6 | | See the READ Command Packet 1600. |
| 7 | 0–4 | These bits are reserved. |
| 7 | 5–6 | See the READ Command Packet 1600. |
| 7 | 7–23 | These bits are reserved. |
| 7 | 24–35 | See the READ Command Packet 1600. |
| 8 | 0–23 | These bits are reserved. |
| 8 | 24–29 | BRWO is the Block Relative Write Offset. BRWO is the fist word within the first block addressed by the command that is to be written. |
| 8 | 30–35 | LBRWO is the Last Block Relative Write Offset. LBRWO is the last word within the last block addressed by the command that is to be written. |

b. WRITE OFF BLOCK BOUNDARY Status Packet

FIG. 97 shows the content and format of a WRITE OFF BLOCK BOUNDARY Status Packet 2138. The following table explains each of the fields in the Status Packet:

| Word | Bit | Definition |
|---|---|---|
| 0–4 | | See the Program Status Packet 460. |
| 5 | 0–11 | The valid RECOMMENDED_ACTIONS for a WRITE OFF BLOCK BOUNDARY command are: |

-continued

| Word | Bit | Definition |
|---|---|---|
| | | "Down File Cache Interface," "Rescan File," "Resend", "Return Status to User", "Stage Data", or "Stage Data and Log No Resident File Space Condition." |
| 5 | 12–35 | See the Program Status Packet 460. |
| 6 | | See the Program Status Packet 460. |
| 7–8 | | See the READ Status Packet 1604. |
| 9–10 | | These words are reserved. |
| 11–127 | | See the READ Status packet 1604. |

E. Index Processor (IXP) Detailed Description

1. Data Structures

This section describes the data structures used by the Index Processor 236 in referencing the segments of file data stored in the Outboard File Cache 102. There is a one-to-one correspondence between the available segments in File Space 502 and the File Descriptors 508 in the File Descriptor Table 506.

FIG. 98 illustrates logical block diagrams of the Hash Table, the File Descriptor Table, and File Space. There are n cache segments available in File Space 502, numbered consecutively as 0, 1, 2, . . . , n–2, n–1. There are also n File Descriptors in the File Descriptor Table 506. The Hash Table 6000 is the structure that makes the File Space 502 fully associative. That is, a segment in the File Space 502 can be allocated without sensitivity to its physical address.

The Hash Table 6000 contains 8n entries. Each entry is available to point to one of the File Descriptors in the File Descriptor Table 506. At system start-up time, the pointers in the Hash Table 6000 are null. An entry in the Hash Table is made to point to a File Descriptor when a segment in File Space 502 is assigned to a particular segment of a file. HASH processing can be referenced for the details on the Hash function.

Entries in the Hash Table are locked in groups of eight. Therefore, when a File Descriptor is to be updated, the group of eight pointers in the Hash Table to which the pointer referencing the File Descriptor to be updated belongs is locked. The lock mechanism is required when the Outboard File Cache is configured with multiple Index Processors 236 and each is managing the File Descriptor Table.

File access commands, which are made via the Command Packets described earlier in this specification, are hashed to an entry in the Hash Table 6000. If the entry is null, then the referenced segment is not present in cache; if the entry points to a File Descriptor, then the File Descriptor is compared to the particular segment requested in the Command Packet. If the file access command matches the File Descriptor, then the referenced segment can found at the physical address (DATA_POINTER) contained in the File Descriptor 508. The HASH_LINK in the File Descriptor is used for resolving collisions between file access commands.

Various pointers are maintained for overall cache management and in particular, for assigning, deassigning, and destaging segments in File Space 502. The pointers of interest in this preferred embodiment are the REPLACEMENT CANDIDATE, DESTAGE CANDIDATE, LOWER-BOUND, UPPER-BOUND, and RECENTLY USED ZONE.

The REPLACEMENT CANDIDATE points to the File Descriptor 508 which references the first segment to be considered for assignment when a file access command references a file segment not present in File Space 502. The REPLACEMENT CANDIDATE proceeds in an incremental fashion around the File Descriptor Table 506. When File Descriptor n–1 is reached, REPLACEMENT CANDIDATE returns to File Descriptor 0. For illustrative purposes, REPLACEMENT CANDIDATE is shown as pointing to File Descriptor i.

The DESTAGE CANDIDATE points to a File Descriptor 508 which references a segment in File Space 502 which is the segment being considered for destaging. If the segment has been written, a request may be made to destage the segment, depending upon how recently the segment was written. If the segment was recently written, the segment will not be destaged, if the segment has been written, but not recently, a destage request will be made. Note that when multiple Hosts 10 have access to the Outboard File Cache, an additional test is performed to determine whether the Host 10 which submitted the cache command has access to the Disk 106 to which the Destage Candidate segment is to be destaged.

The DESTAGE CANDIDATE proceeds approximately ½n entries ahead of REPLACEMENT CANDIDATE in the File Descriptor Table 506. For illustrative purposes, DESTAGE CANDIDATE is shown as pointing to File Descriptor ½n+i.

The LOWER-BOUND and UPPER-BOUND defines the bounds in the File Descriptor Table 506 within which the DESTAGE CANDIDATE is kept. The segment referenced by the DESTAGE CANDIDATE may not be eligible for destaging because it may be assigned to a Host 10 which is different from the Host which sent the Command Packet in process. Because the destage requests are made in the Program Status Packet returned to the Host which sent the Command Packet, the destage request must reference segments to be destaged to a Disk 106 to which the Host which sent the cache command has access. The DESTAGE CANDIDATE is allowed to roam between the LOWER-BOUND pointer and the UPPER-BOUND pointer in search of segments to destage. For illustrative purposes, the LOWER-BOUND pointer is shown as pointing to File Descriptor ½n+i–32, and the UPPER-BOUND pointer is shown as pointing to File Descriptor ½n+i+32. As the REPLACEMENT CANDIDATE is incremented, each of the LOWER-BOUND and UPPER-BOUND pointer is also incremented. LOWER-BOUND and UPPER-BOUND also return to File Descriptor 0 after reaching File Descriptor n–1.

A Recently Used Zone is used in the round-robin cache replacement scheme described herein. It is desirable to not reassign a segment which has been recently referenced because that segment is likely to be referenced again. Astage operation is saved if the segment which was not reassigned is referenced subsequent to it having been considered for reassignment The RECENTLY USED ZONE, along with the NEW flag in the File Descriptor 508, is used to mark segments which have been referenced recently. If a segment is referenced and it is within the Recently Used Zone, the NEW flag in the referenced segment's File Descriptor is set When the REPLACEMENT CANDIDATE eventually points to the referenced segment, the referenced segment win not be reassigned because it was recently referenced. The NEW flag will be cleared when the CURRENT REPLACEMENT CANDIDATE is advanced. The boundaries of the Recently Used Zone are defined by the REPLACEMENT CANDIDATE and the RECENTLY USED ZONE pointer which is 3n/4+i segments beyond the REPLACEMENT CANDIDATE pointer.

For the purposes of the discussion contained herein, it is assumed that the LOWER-BOUND, DESTAGE CANDIDATE, UPPER-BOUND, and RECENTLY USED ZONE pointers are always logically "ahead" of the REPLACEMENT CANDIDATE even though the REPLACEMENT CANDIDATE may reference a File Descriptor 508 which is physically ahead of the above pointers in the File Descriptor Table 506. Those skilled in the art will recognize that special checks are necessary when the REPLACEMENT CANDIDATE is physically ahead of the above pointers.

Exclusive access to the HASH_LINKs, File Descriptors 508, and segments is governed by test-and-set cells associated with entries in the Hash Table 6000. For each group of eight entries in the Hash Table, there is an associated test-and-set cell. Exclusive access to a File Descriptor or segment is gained by performing a test-and-set on the test-and-set cell associated with the group of eight entries in the Hash Table by which the File Descriptor or segment is referenced. When a test-and-set cell is set, only limited access is provided to all the File Descriptors and associated segments which are referenced by the group of eight entries in the Hash Table associated with the set test-and-set cell. Throughout this specification, reference may be made to "locking a segment", "locking a group of eight segments", or "locking a group of eight entries in the Hash Table". All should be understood to refer to successfully setting the appropriate test-and-set cell by which a group of eight Hash Table entries are covered.

FIG. 99 illustrates the layout data and control structures of the Outboard File Cache in Non-Volatile Storage (NVS). The exemplary NVS 220 contains four Storage Modules 732*a*, 732*b*, 732*c*, and 732*d*, labeled Module 0, Module 1, Module 2, and Module 3 respectively. While four Modules are shown, more or fewer than four Modules could be used for storing the data and control structures.

Each of the Modules 732 is divided into blocks identifying the use for which the portion of storage is allocated. The size of each of the blocks is not intended to suggest the amount of storage allocated for the identified use. Rather the intent is to illustrate where the data and control structures are stored relative to one another.

The first part of Module 0 is used for Nail Space 523. Nail Space is used for storing segments which have been designated as nailed. As discussed earlier, the Outboard File Cache 102 never initiates deassignment and destaging of a nailed segment except for certain error conditions. Cache File Space 522 in Module 0 resides after the Nail Space and Resident File Space 524 resides after the Cache File Space.

The backup Hash Table 6000 and backup Activity Queue 346 reside in the first portion of Module 1. The primary File Descriptor Table 506 is assigned to the second portion of Module 1 followed by Nail Space 523, Cache File Space 522, and Resident File Space 524. In Module 2, the primary Hash Table and primary Activity Queue reside in the first portion. The backup File Descriptor Table is allocated to the portion of Module 2 following the primary Hash Table and Activity Queue, and Nail Space, Cache File Space, and Resident File Space are assigned to the remaining portions. Module 3 is similar to Module 0.

2. Index Processor Processing a. COMMAND BRANCH

FIGS. 100A and 100B contain a flowchart of the COMMAND BRANCH processing. COMMAND BRANCH processing is invoked from the main dispatcher processing loop of the Index Processor 236 and tests for the specific command specified in the Command Packet 452. Processing then proceeds to the command specific processing for the designated command.

Decision Step 6004 tests whether the command in the Command Packet 452 is either a READ or WRITE command. If the test is positive, control is followed to Step 6006. Step 6006 invokes the READ-WRITE routine which determines where in Non-volatile Storage 220 the specified data resides. After completing processing of the READ or WRITE command, control Path 6006*p* is followed to return control to the Dispatcher routine.

If the test at Decision Step 6004 fails, processing proceeds to decision Step 6008. Decision Step 6008 tests for the STAGE WITHOUT DATA, STAGE BLOCKS, or STAGE SEGMENTS commands. For each of these commands, processing proceeds to Step 6010 which invokes the STAGE routine. The STAGE routine performs the set-up operations required for staging data. After the STAGE routine is complete, control is returned to the Dispatcher routine.

For commands which are other than STAGE, processing continues at decision Step 6012. The Command Packet 452 is tested for the presence of a DESTAGE command at decision Step 6012. For a DESTAGE command, the DESTAGE routine is invoked at Step 6014. The DESTAGE routine performs the set-up operations for destaging data. Upon completion of the DESTAGE routine, control is returned to the Dispatcher routine.

If the command is not a DESTAGE command, control is passed to decision Step 6016. Step 6016 tests whether the command is DESTAGE COMPLETE. If so, the DESTAGE COMPLETE routine is invoked at Step 6018. The DESTAGE COMPLETE routine performs the final operations for destage processing. Control is returned to the Dispatcher routine when the DESTAGE COMPLETE routine has finished its processing.

Processing continues to decision Step 6020 if the test at decision Step 6016 fails. Decision Step 6020 tests whether the command is WRITE OFF BLOCK BOUNDARY. If the test is positive, the WRITE OFF BLOCK BOUNDARY routine is invoked at Step 6022. The WRITE OFF BLOCK BOUNDARY routine performs the set-up processing required for the WRITE OFF BLOCK BOUNDARY command and branches to READ-WRITE processing.

If the command is not WRITE OFF BLOCK BOUNDARY, processing continues at decision Step 6024. Decision Step 6024 tests for the CLEAR PENDING command. The CLEAR PENDING routine is invoked at Step 6026 if the test is positive and control is returned to the Dispatcher routine upon completion. The CLEAR PENDING routine removes from a pending state those segments addressed in the Command Packet 452.

Processing continues at decision Step 6028 if the test at decision Step 6024 fails. Decision Step 6028 tests for the LOCK CACHE FILE and LOCK CACHE FILES BY ATTRIBUTES commands. For either command, the LOCK FILE routine is invoked at Step 6030. The LOCK FILE routine locks the files indicated in the Command Packet 452. Control is returned to the Dispatcher routine after the LOCK FILE routine is complete.

Upon failure of the test at decision Step 6028, processing proceeds to decision Step 6032. The Command Packet 452 is tested for the presence of the UNLOCK CACHE FILE and UNLOCK CACHE FILES BY ATTRIBUTES commands at decision Step 6032. If either command is specified in the Command Packet, the UNLOCK FILE routine is invoked at Step 6034. The UNLOCK FILE routine removes the files specified in the Command Packet from a locked state. Upon completion, control is returned to the Dispatcher routine.

If the test at decision Step 6032 fails, processing continues at decision Step 6036. Decision Step 6036 tests for the MODIFY File Descriptor, PURGE FILE, and the DESTAGE AND PURGE FILE commands. For each of these commands, the LOGICAL COMMANDS routine is invoked. The LOGICAL COMMANDS routine searches a range of segments within the requested file. The designated operation is performed against each segment found. Control is returned to the Dispatcher routine upon completion of the LOGICAL COMMANDS routine.

Processing proceeds to decision Step 6040 if the test at decision Step 6036 fails. The PURGE FILES BY ATTRIBUTES, PURGE DISK, DESTAGE AND PURGE DISK, and DESTAGE AND PURGE FILES BY ATTRIBUTES commands are detected at decision Step 6040. If any of the commands is detected, the PHYSICAL SCAN routine is invoked at Step 6042. The PHYSICAL SCAN routine searches the entire File Descriptor Table 502 for any segments satisfying the search argument in the Command Packet. The designated operation is performed against each segment found. Control is returned to the Dispatcher routine upon completion of the PHYSICAL SCAN routine.

If the test at decision Step 6040 fails, processing continues at decision Step 6044. Step 6044 tests for the RETURN SEGMENT STATE command in the Command Packet 452. If the RETURN SEGMENT STATE command is detected, the RETURN SEGMENT STATE routine is invoked at Step 6046. The RETURN SEGMENT STATE routine returns the File Descriptors 508 for the segments specified in the Command Packet 452. After control is returned from the RETURN SEGMENT STATE command, control is returned to the Dispatcher routine.

Processing continues at decision Step 6048 if the test at Step 6044 fails. The presence of the ALLOCATE command in the Command Packet 452 is tested at decision Step 6048. If the command is ALLOCATE, ALLOCATE processing is invoked at Step 6050 to allocate one or more segments. Control is returned to DISPATCHER processing upon completion of the ALLOCATE. While not shown in the FIG., those skilled in the art will recognized that if the command in the Command Packet 452 is not a recognized command, an error status may be returned to the Host 10 from which the Command Packet was sent.

b. READ-WRITE Routine

FIGS. 101A, 101B, 101C, and 101D contain a flowchart of the READ-WRITE routine. The READ-WRITE routine processes READ and WRITE commands sent from the Host 10. The READ-WRITE routine performs the set-up operations required for the Host Interface Adapter 214 to transfer data between the Host 10 and the Non-volatile Storage 220. Processing begins with calling the SEARCH routine at Step 6122. The SEARCH routine checks whether the segment referenced in the Command Packet is present in File Space 502. If it is, the HIT_FLAG is set. After the SEARCH routine returns, processing proceeds to decision Step 6124.

If the HIT_FLAG was set, then decision Step 6124 directs control to Step 6126 where the NEW-BIT routine is invoked. This routine checks whether the segment being referenced falls between the RECENTLY USED ZONE and the REPLACEMENT CANDIDATE discussed above. If it is behind the RECENTLY USED ZONE and ahead of the REPLACEMENT CANDIDATE, then the NEW_BIT in the File Descriptor 508 is set. Setting the NEW bit removes the segment from consideration for reassignment on this cycle of the round robin processing.

After NEW-BIT processing, the processing proceeds to decision Step 6132. Decision Step 6132 checks whether any of the Group-1 flags are set. The Group-1 flags are set. The Group-1 flags are stored in the File Descriptor 508 and include SEGMENT_BUSY, STAGE_PENDING, DESTAGE_PENDING, PURGE_PENDING, TOTAL_SEGMENT_VALID, SPECULATIVE, STICKY_COUNTER, and SEGMENT_DISABLED. If any of the Group-1 flags are set, then processing proceeds to the FLAGS routine as shown by Step 6134 and then to decision Step 6136. Otherwise, processing proceeds directly to decision Step 6136.

The FLAGS routine exits the main line processing because some flag in the File Descriptor 508 is set which will not allow normal hit processing to proceed. For example, the segment may be in a STAGE PENDING state, in which case the Resend RECOMMENDED_ACTION is returned to the Host 10. The FLAGS processing will be considered in greater detail in its accompanying flowchart.

Decision Step 6136 checks whether the PRIOR_MISS flag is set. The PRIOR_MISS flag is set when one of the earlier segments referenced by the command resulted in a miss. When the PRIOR_MISS flag is set, the READ-WRITE processing is forced in to a processing mode wherein the SEGMENT_MISS_TEMPLATE continues to be developed. No file data is transferred back to the Host 10 where some of the segments referenced by the command are not present in File Space 502, therefore, a data transfer packet need not be sent to the Host Interface Adapter 214.

If PRIOR_MISS is not set, then control is followed to Step 6138 where information is added to the data transfer request packet which is sent from the Index Processor 236 to the Host Interface Adapter 204. The data transfer request packet identifies the data in Non-volatile Storage to be transferred or the area in Non-volatile Storage to which data is to be written. The data transfer request packet contains a segment information portion for each segment referenced by the file access command. In particular, the address in Non-Volatile Storage 220 where the segment to transfer is located, an address in NVS which is a pointer to the flags field in the File Descriptor 508, and the IXP identifier are loaded in the segment information portion of the data transfer request packet. After the transfer is complete, the HIA clears the SEGMENT_BUSY flag in the File Descriptor 508 using this packet. After the HIA completes the data transfer, the FLAGS word from the data transfer packet is written to NVS by the HIA. Step 6140 increments a counter to the next segment information portion in the data transfer request packet.

Processing proceeds to decision Step 6142 to test whether the command is a READ command. If the command is not a READ command, control path **6142*n* is followed to Decision Step 6144. Path 6142*n* is described after path 6142*y*. If the command is a READ command, control Path 6142*y* is followed to Decision Step 6146. Decision Step 6146 checks whether the number of segments referenced by the Command Packet is equal to one. If more than one segment is referenced by the command, then control Path 6146*n* is followed to control Path 6178*p* for processing more segments. Otherwise, control Path 6146*y* is followed to Step 6148**.

Step 6148 sets the SEGMENT_BUSY flag in the File Descriptor 508 for the segment being referenced. After the segment is marked as busy, the data transfer request packet is sent to the Host Interface Adapter 204 from which the Command Packet was sent as shown by Step 6150.

Decision Step 6152 checks whether the LOCAL_WRITTEN_TO_COUNTER is equal to zero. The LOCAL_WRITTEN_TO_COUNTER contains the number of segments referenced by the command which will are becoming different from the copy of the segment on the disk.

If the LOCAL_WRITTEN_TO_COUNTER is equal to zero, then processing proceeds directly to the END routine of Step 6154 via control Path 6152*y*. Otherwise, control Path 6152*n* is followed to Step 6156 where the GLOBAL_WRITTEN_TO_COUNTER is updated by adding the LOCAL_WRITTEN_TO_COUNTER to it. The GLOBAL_WRITTEN_TO_COUNTER is shared among all the Index Processors 236, and is used to determine the urgency with which segments should be destaged from Non-Volatile Storage. The closer that the GLOBAL_WRITTEN_TO_COUNTER comes to the total number of segments available for storage, the more important it becomes to destage segments which have been written. The END routine at Step 6154 attaches the destage requests to the Program Status Packet 460 and returns control to the COMMAND-BRANCH routine.

The description now returns to control Path 6142*n* for processing WRITE commands. The processing performed for WRITE commands is used to track the proportion of File Space 502 which is occupied by segments which have been written, and take the appropriate actions. Decision Step 6144 tests whether the segment being referenced is either nailed or belongs to a resident file. This is done by testing the NAIL flag in the File Descriptor 508. If the segment is either nailed or belongs to a Resident file, then control Path 6144*y* is followed to decision Step 6158. Decision Step 6158 tests whether the segment is an Orphan. An orphaned segments is segment belonging to a Resident File which was stored in Cache File Space 522. Once all the allotted segments in Resident File Space 524 have been assigned, Cache File Space is used to store segments of Resident files. If the segment is not an orphan, the processing proceeds to control Path 6142*y*.

If the segment is not nailed or does not belong to a Resident file, then control Path 6144*n* is followed to decision Step 6160, or if the segment is nailed and is an orphan, processing proceeds also proceeds to decision Step 6160. Decision Step 6160 tests whether the SEGMENT_WRITTEN flag in the File Descriptor 508 is set. If the SEGMENT_WRITTEN flag is already set, then the WRITTEN_TO counters do not need to be incremented, and processing proceeds to control Path 6142*y*. If the segment has not yet been written, then control is followed to decision Step 6162.

Decision Step 6162 tests whether the WRITTEN_TO_COUNTER, which is local to the Index Processor 236, is greater than 90% of Cache File Space 522. If the WRITTEN_TO_COUNTER is less than 90% of Cache File Space, the control Path 6162*n* is followed to Step 6164. Step 6164 increments the LOCAL_WRITTEN_TO_COUNTER, and processing proceeds to Step 6166.

Step 6166 sets the STANDBY flag in the data transfer packet which is sent to the Host Interface Adapter 204. The STANDBY flag indicates that the copy of the File Descriptor Table 506 which is kept in a second Non-Volatile Storage 220 module should be updated with the same information that is to be stored in the main File Descriptor Table. Step 6166 also updates the Backpanel ID portion of the data transfer packet. The data transfer packet is updated with the Backpanel ID of the Backpanel having the Non-Volatile Storage 220 module in which the copy of the File Descriptor Table is stored. Both the main File Descriptor Table and the copy are stored at the same physical address within each of the Non-Volatile Storage 220 modules. Processing then proceeds to control Path 6142*y*.

If the LOCAL_WRITTEN_TO_COUNTER exceeds 90% of Cache File Space 522, then control Path 6160*y* is followed to Step 6168. Step 6168 reads the GLOBAL_WRITTEN_TO_COUNTER. A global counter must be kept because there are multiple Index Processors 236 writing to Cache File Space. At decision Step 6170, the GLOBAL_WRITTEN_TO_COUNTER is tested to see whether it exceeds 90% of Cache File Space. If it does not, control Path 6170*n* is followed to control Path 6162*n*. Otherwise, control is followed to Step 6172.

Step 6172 assigns "Resend" to the RECOMMENDED_ACTION in the Program Status Packet 460. Step 6174 invokes the CACHE-TIGHT routine for handling the case where too many segments in Cache File Space 522 are written. The CACHE-TIGHT routine initiates destaging of segments so that the write request can be honored.

The discussion now returns to decision Step 6124. If the result of the search is not a hit, processing proceeds to decision Step 6176. If the Residency Required (RR) flag in the Command Packet is not set, decision Step 6176 directs the processing to Step 6178 where the MISS routine is invoked. The MISS routine allocates a segment and makes its state STAGE PENDING, and sets up the SEGMENT_MISS_TEMPLATE which is returned to the Host 10 in a Program Status Packet 460. The MISS routine returns control to the beginning of the READ-WRITE routine. If the Residency Required flag is set, then processing proceeds to Step 6180.

Step 6180 sets the PRIOR_MISS flag and also sets the appropriate bit in the SEGMENT_MISS_TEMPLATE. Control Path 6180*p* is followed to decision Step 6182. Decision Step 6182 tests whether there are more segments referenced in the Command Packet by comparing the SEG_CTR (the number of segments processed thus far) with the segment count (SEG_CNT) in the Command Packet. If there are segments remaining to be processed, then processing proceeds to Step 6184 where the LOOP-CODE routine is performed. LOOP-CODE increments SET_CTR and the FILE_RELATIVE_SEGMENT_OFFSET so that the next requested segment can be processed. Processing then follows control Path 6184*p* which returns control to Step 6122 to search and process the next requested segment.

If decision Step 6182 finds that there are more segments to process, then processing proceeds to decision Step 6186. Step 6186 tests whether the PRIOR_MISS flag was set. If so, then the SPECULATE-HIT1 routine is called at Step 6188. The SPECULATE-HIT1 routine and returns control to the COMMAND-BRANCH routine. If PRIOR_MISS was not set, then processing proceeds to Step 6150 which was described above.

c. STAGE Routine

FIGS. 102A, 102B, 102C, and 102D contain a flowchart of the processing performed for STAGE commands. In general, STAGE processing involves searching for one or more segments to assign to the segments specified in the Command Packet, storing the necessary information in the associated File Descriptors, and sending a data transfer request to the Host Interface Adapter 204 which indicates the address in Non-Volatile Storage 220 where the data is to be written. STAGE processing will be described by first discussing main path processing, and then returning and picking up miscellaneous processing branches at the end.

Processing begins by invoking the SEARCH routine as indicated by Step 6220. The SEARCH routine checks whether the segment referenced in the Command Packet is present in File Space 522. If the segment is present, the HIT_FLAG is set. Decision Step 6222 checks whether the segment was found by testing the HIT_FLAG. If the HIT_FLAG is set, then control Path 6222*y* is followed to decision Step 6224. Decision Step 6224 tests whether the state of the segment located in File Space is SEGMENT_DISABLED. If the state of the segment is not equal to SEGMENT_DISABLED, then processing proceeds to decision Step 6226. Step 6226 tests whether the segment stage is equal to SEGMENT_BUSY. If the segment is not busy, then processing proceeds to decision Step 6230. Step 6230 tests whether the segment stage is equal to STAGE_PENDING.

If the state of the segment is STAGE_PENDING, the processing proceeds to decision Step 6232. The segment located would normally have its state set to STAGE_PENDING due to miss processing in response to a prior READ or WRITE command. Decision Step 6232 tests whether the PROGRAM_ID and HOST_ID in the Command Packet are equal to their respective counterparts in the File Descriptor. During the normal course of processing, they would be equal, having been set in processing of the command which caused the miss. Control Path 6232*y* is followed to Step 6234.

Step 6234 copies the DISK_NUMBERs, DISK_ADDRESSes, and GROUP_ID from the Command Packet 1252 to the File Descriptor 508. Decision Step 6236 tests whether there is a standby File Descriptor Table 506. The Standby flag is set at system initialization if there is more than one Non-Volatile Storage 220 module. If there is, Step 6238 stores the information referenced in Step 6234 into the duplicate File Descriptor Table. Otherwise, control Path 6236*n* is followed to Step 6240.

If the Cache Sticking Power Flag (CSPF) in the Command Packet 1252 is set, then the SICKY_COUNTER flag in the File Descriptor 508 is set at Step 6240. When the cache replacement algorithm passes over a segment whose STICKY_COUNTER flag is set, the STICKY_COUNTER is cleared. When the STICKY_SLAVE counter is cleared, the associated segment is once against eligible for reassignment. Those skilled in the art will recognize that if the STICKY_COUNTER was implemented with more than one bit, the counter could be decremented with each pass of the cache replacement algorithm. When the counter reached zero, the associated segment would be eligible for cache replacement.

Decision Step 6242 tests whether the command in the Command Packet is equal to STAGE WITHOUT DATA. If the command is not a STAGE WITHOUT DATA command, then processing continues with Step 6244. Step 6244 stores the identifier for the Host Interface Adapter 204 to which the data transfer request will be sent and the Index Processor 236 identifier for the Index Processor sending the data transfer request in the data transfer request. The identifiers are stored in the request for the purpose of routing the request in the Street 234. In addition, Step 6244 sets the SEGMENT_BUSY flag in the File Descriptor 508, after which, processing proceeds to decision Step 6246.

Decision Step 6246 tests whether the command is STAGE SEGMENT. The extra processing associated with the STAGE BLOCKS command is shown by control Path 6246*n*. STAGE SEGMENT processing is illustrated by control Path 6246*y*. For a STAGE SEGMENT command, step 6248 sets the Segment Valid flag in the data transfer request which is sent to the Host Interface Adapter 204. After the Host Interface Adapter has successfully stored the segment in Non-Volatile Storage, the Segment Valid Flag is written to the TOTAL_SEGMENT_VALID flag in the File Descriptor 508 by the Host Interface Adapter. The TOTAL_SEGMENT_VALID flag indicates that all blocks within the segment are valid. Control path 6248*p* is followed to decision Step 6250.

Decision Step 6250 checks whether there is a duplicate File Descriptor Table 506 by testing the Standby flag. If the answer is yes, then Step 6252 sets a standby flag in the data transfer request that is sent to the Host Interface Adapter 204. Otherwise, control proceeds directly to Step 6254.

Step 6254 stores the address in Non-Volatile Storage 220 at which the Host Interface Adapter 204 is to store the data, the BLOCKS_WRITTEN_TEMPLATE from the File Descriptor 508, and the address in Non-Volatile Storage of the SEGMENT FLAGS in the File Descriptor. The BLOCKS_WRITTEN_TEMPLATE is used by the Host Interface Adapter when it processes a STAGE BLOCKS command. The address of the SEGMENT FLAGS is provided to the Host Interface Adapter so that the SEGMENT_BUSY flag within the File Descriptor can be cleared after the Host Interface Adapter has completed the data transfer. Step 6256 stores a flag-word to the data transfer request, wherein the flag-word is stored by the Host Interface Adapter into the SEGMENT FLAGS in the File Descriptor and the SEGMENT_BUSY flag in the File Descriptor is effectively cleared.

Decision Step 6258 checks whether all segments indicated in the Command Packet have been processed. This is done by comparing the segment count (SEG_CNT) in the Command Packet with the number of segments processed. When all segments have been processed, control Path 6258*y* is followed to decision Step 6260. If step 6260 finds that the command is STAGE SEGMENT, then Step 6262 sets a STAGE SEGMENT flag in the data transfer request. This flag indicates to the Host Interface Adapter the type of data transfer command it is processing. For non-STAGE SEGMENT commands, processing proceeds directly to Step 6264.

Step 6264 sends one or more data transfer requests to the Host Interface Adapter 204. For commands which reference multiple segments, a data transfer request for each segment is included in the total request sent to the Host Interface Adapter. Step 6266 increments the GLOBAL_WRITTEN_TO_COUNTER by the number of segments which were written by the command contained in the Command Packet. Those skilled in the art will recognize that a locking mechanism must be used to ensure that the GLOBAL_WRITTEN_TO_COUNTER is incremented and decremented properly if there are multiple Index Processors 236 affecting the value of the GLOBAL_WRITTEN_TO_COUNTER. Therefore, part of Step 6266 involves a "test-and-set" type operation on a flag associated with the GLOBAL_WRITTEN_TO_COUNTER.

After updating the GLOBAL_WRITTEN_TO_COUNTER, the END routine is invoked at Step 6268. The END routine attaches the destage requests to the Program Status Packet 460 and returns control to the COMMAND-BRANCH routine.

If Step 6258 finds that there are more segments to process, then control Path 6258*n* is followed to Step 6270. Step 6270 invokes LOOP-CODE processing which increments the file relative segment offset and segment counter, and retrieves the next File Descriptor 508 from the File Descriptor Table 506. Step 6272 increments the LEG1_DISK_ADDRESS and LEG2_DISK_ADDRESS which will be stored in the File Descriptor for the next segment processed. Step 6274 returns control to Step 6220 in the STAGE routine for processing the next segment requested in the Command Packet.

If the command is not STAGE SEGMENT, that is the command is a STAGE BLOCKS, Step 6246 forces control Path 6246*n* to decision Step 6276. Because STAGE BLOCKS is used for user data being created in the Host 10, there is no copy as yet on disk. Therefore, segments created by STAGE BLOCKS must be flagged as newly written. Step 6276 checks whether the SEGMENT_WRITTEN flag within the File Descriptor 508 is set. If the segment has been written, then control Path 6276y is followed to 6250. Otherwise, control Path 6276n is followed to decision Step 6278. Step 6278 checks whether the segment is nailed by testing the NAIL flag in the File Descriptor. If the segment is nailed, decision Step 6280 checks whether the segment is an orphan by testing the ORPHAN flag in the File Descriptor. Otherwise, Step 6280 is skipped. If the segment is nailed and is an orphan segment, then the LOCAL_WRITTEN_TO_COUNTER is incremented at Step 6282 and processing proceeds to decision Step 6250. Note that the count of written segments is being kept only for Cache File Space 522 and not for Nail Space 523 or Resident File Space 524.

For a STAGE WITHOUT DATA command, decision Step 6242 forces control Path 6242y to Step 6284 instead of control Path 6242n. Step 6284 clears the STAGE_PENDING flag in the File Descriptor and sets the appropriate miss flag in the Status Packet. Step 6286 clears the SEGMENT_BUSY flag in the File Descriptor because the STAGE WITHOUT DATA command does not write data to a segment in cache. If there is a standby File Descriptor Table 506, then SEGMENT_BUSY flag in the duplicate File Descriptor is also cleared.

After processing Steps 6284 and 6286 have been completed, decision Step 6288 checks whether all the segments have been processed by comparing the number of segments processed thus far to the number of segments specified (SEG_CNT) in the Command Packet. If all segments have been processed, then the END routine is invoked at Step 6290. Otherwise, control Path 6288n is followed to Step 6270. Step 6270 was discussed above.

The remaining discussion of the STAGE routine involves handling of exception conditions. If the HIT_FLAG in decision Step 6222 indicates that the specified segment is not in cache, then control Path 6222n is followed to Step 6292. If the segment in process is not in cache as expected, the condition may be due to the segment being assigned to a different file. The STAGE request must be resubmitted from the Host 10 and reprocessed because the entire request could not be honored. Step 6292 makes the RECOMMENDED_ACTION in the Program Status Packet "Send Clear Pending Followed by Original Command." Processing then proceeds to Step 6294 which invokes the Back-out Busy processing.

Figure 102A:
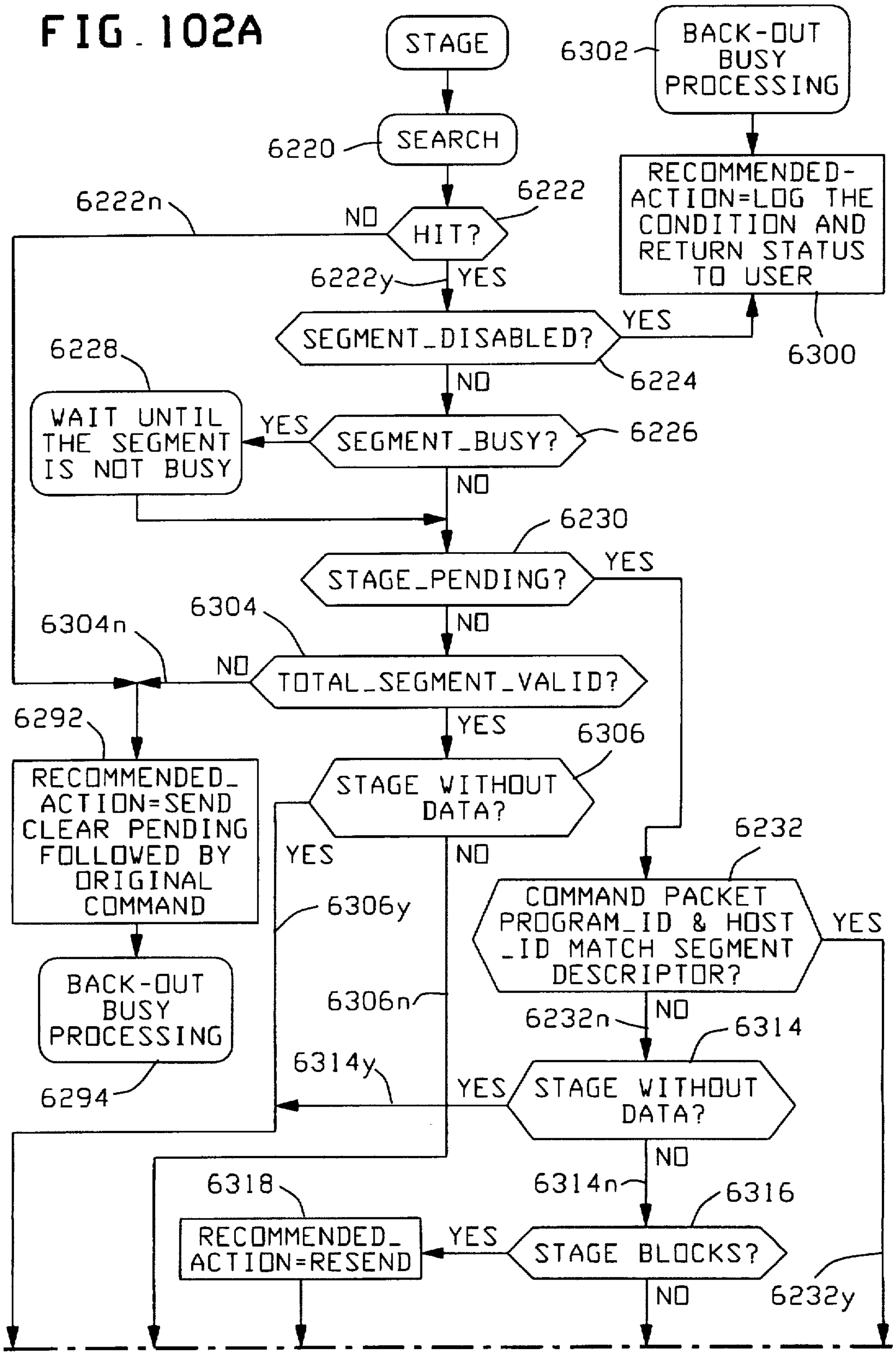
Figure 102B:
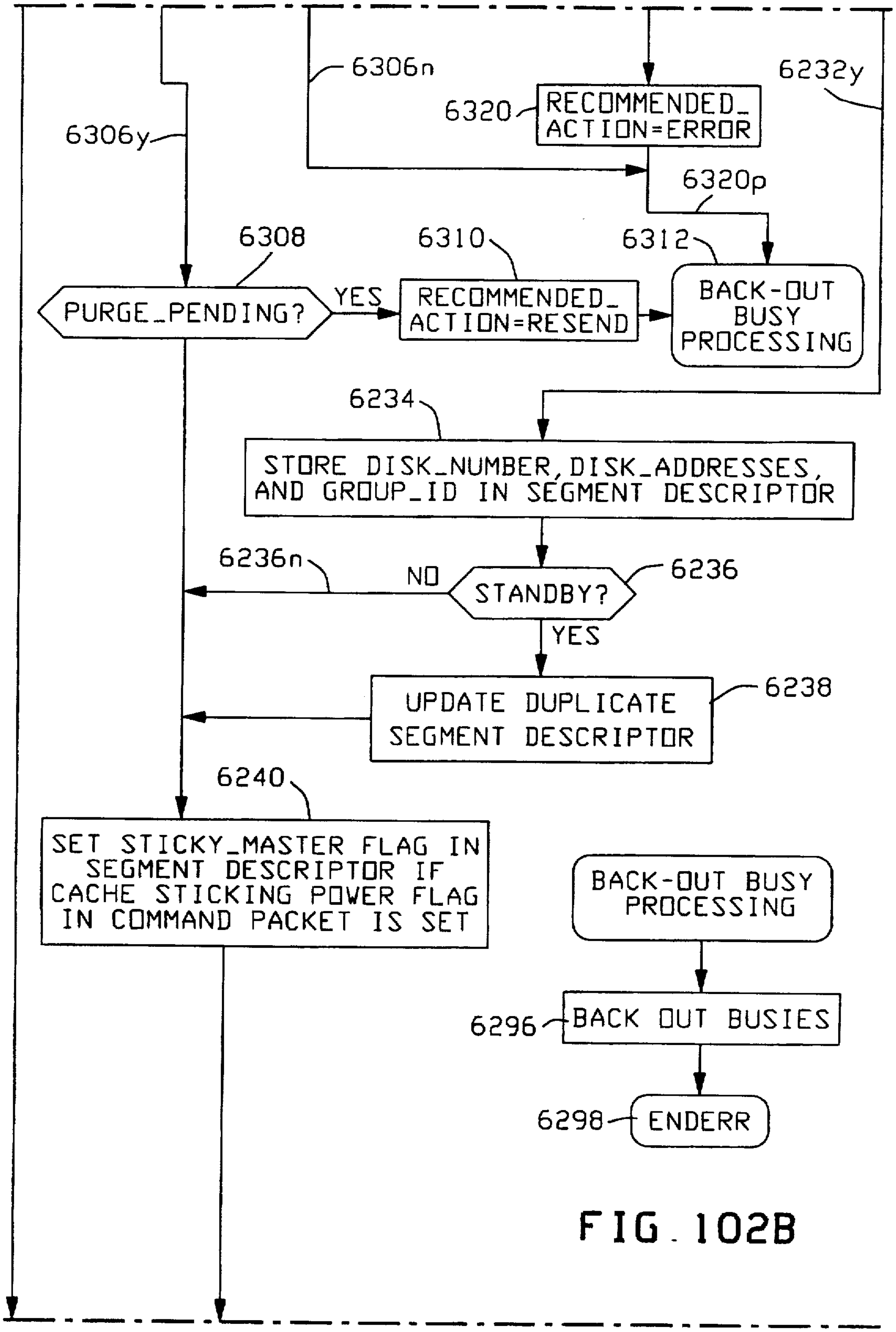
Figure 102C:
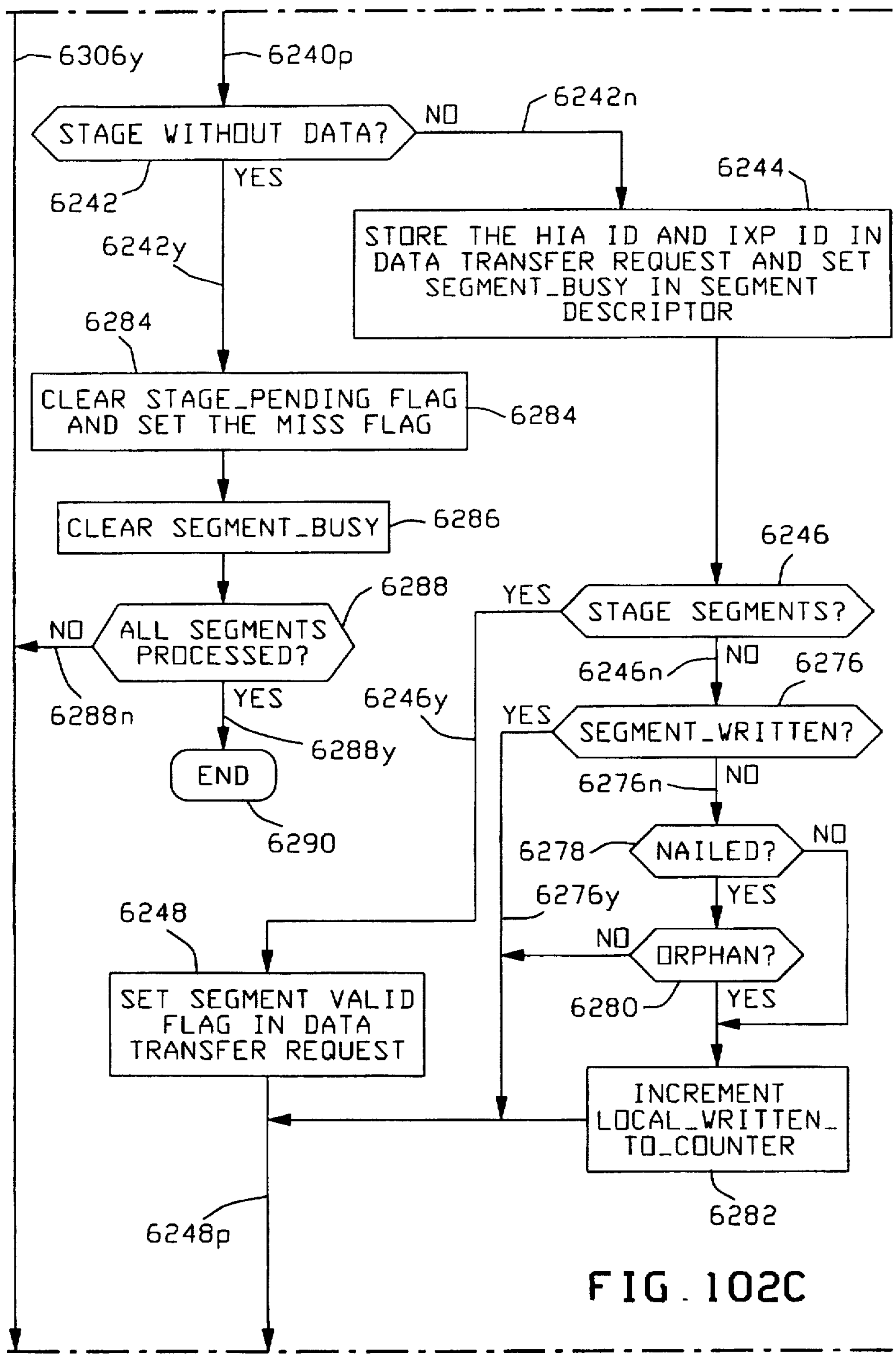
Figure 102D:
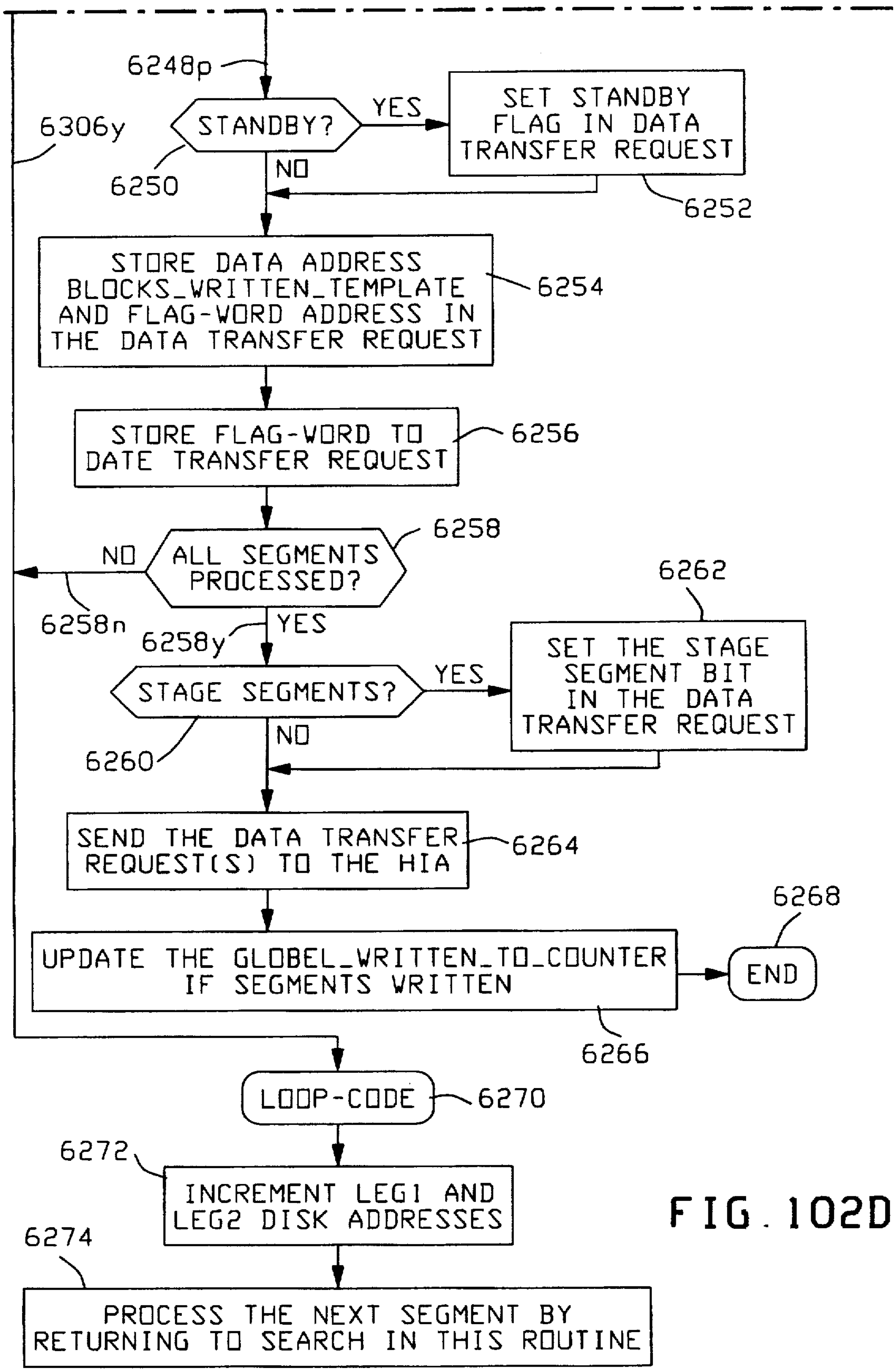

Back-out Busy processing is illustrated in the flowchart fragment shown in FIG. 102B. Step 6296 indicates that the SEGMENT_BUSY flags in the File Descriptors 508 associated with all the segments referenced by the Command Packet should be cleared. The ENDERR routine is then invoked at Step 6298. The ENDERR routine does not set up destage requests in the Program Status Packet 460 as does the END routine, but does return control to the COMMAND-BRANCH routine.

If decision Step 6224 finds that the segment located by the SEARCH routine has been disabled, then Step 6300 makes the RECOMMENDED_ACTION in the Program Status Packet "Log the Condition and Return Status to User." This holds the suspect segment until an ensuing destage operation can flag the segment in the Host's master file directory. Back-out Busy processing is then performed at Step 6302.

If decision Step 6226 finds that the SEGMENT_BUSY flag in the File Descriptor 508 is set, then Step 6228 invokes the WAIT routine to wait until the SEGMENT_BUSY flag is cleared before continuing. SEGMENT_BUSY is not normally a possibility in this processing, except in the case where data is being staged into a partially written segment.

At decision Step 6230, the expected state of the segment in process is STAGE_PENDING because a prior READ or WRITE command place the segment in a STAGE_PENDING state. The segment may have been reassigned to a different file before the processing associated with a READ or WRITE miss could complete. This event may be encountered if there is a shortage in available Cache File Space 522. If the state of the segment is no longer STAGE_PENDING, the processing proceeds to decision Step 6304.

Decision Step 6304 checks whether the segment has been written by testing the TOTAL_SEGMENT_VALID flag in the File Descriptor. If the segment has been written, then control Path 6304n is followed to Step 6292 to clear the pending states of those other segments referenced in the Command Packet, and clearing the SEGMENT_BUSY flags. If the segment has not been written, then the request in the Command Packet may still be honored and control Path 6304y is followed to decision Step 6306.

Decision Step 6306 tests whether the command in the Command Packet is STAGE WITHOUT DATA. For a STAGE WITHOUT DATA command, control Path 6306y is followed to 6270. The request in the Command Packet may still be honored because the STAGE WITHOUT DATA command does not involve writing a segment to the Outboard File Cache 102. During the course of normal processing, the STAGE WITHOUT DATA command is not used. If the command is not STAGE WITHOUT DATA, then processing follows control Path 6306n to decision Step 6308. Decision step 6308 checks whether the state of the segment is equal to PURGE_PENDING. If the PURGE_PENDING flag in the File Descriptor 508 is not set, then control Path 6308n is followed to Step 6240. If the PURGE_PENDING flag in the File Descriptor is set, then "Resend" is assigned to the RECOMMENDED_ACTION in the Command Packet at Step 6310 and Back-out Busy processing is invoked at Step 6312.

If decision Step 6232 finds that the PROGRAM_ID and HOST_ID in the Command Packet do not match the PROGRAM_ID and HOST_ID in the File Descriptor 508, then control Path 6232n is followed to decision Step 6314. Step 6314 tests whether the command is STAGE WITHOUT DATA. If so, the condition detected at decision Step 6232 can be ignored and control Path 6314y is followed to Step 6270. Otherwise, control Path 6314n is followed to decision Step 6316.

Decision Step 6316 tests whether the command is STAGE BLOCKS. If it is, then the RECOMMENDED_ACTION in the Program Status Packet is assigned "Resend" at Step 6318, and the Back-out Busy processing is invoked at Step 6312. If the command is STAGE SEGMENTS as detected at decision Step 6316, then an error condition has occurred and an Error is assigned to the RECOMMENDED_ACTION at Step 6320.

d. DESTAGE Routine

FIGS. 103A and 103B contain a flowchart describing the processing performed by the Outboard File Cache for a DESTAGE command. The DESTAGE routine performs the set-up operations required for destaging one or more segments from the Outboard File Cache to Disk 106.

Step 6350 clears the destage counter in the packet which will be returned to the Host Interface Adapter 214. The destage counter in the HIA packet tracks the number of segments that the Host Interface Adapter may proceed to transfer to the Host 10. The DESTAGE Command Packet 1670 indicates the segments to be destaged. The SEARCH routine is invoked at Step 6352 for locating a segment specified by the Command Packet in Non-volatile Storage 220. Decision Step 6354 tests whether the search was successful. For unsuccessful searches, control follows control Path 6354n, and for successful searchers, control Path 6354y is followed to decision Step 6356. Once a miss is encountered (test 6354 fails), further processing of segments specified by the DESTAGE command is aborted. Control Path 6354n is followed to decision Step 6358.

Decision Step 6358 tests whether any segments were identified in the DESTAGE routine for destage. If the destage counter is 0, then no segments were identified for destage and processing proceeds to Step 6360. Step 6360 clears the destage counter in the packet returned to the Host Interface Adapter 214 to signal that no segments should be transferred to the Host 10. On the other hand, if decision Step 6358 finds that the destage counter indicates that the DESTAGE routine did identify segments for destaging, then Step 6362 sets the destage counter in the Host Interface Adapter packet to the number of segments identified by the DESTAGE routine. The final Step 6364 is to send the data transfer packet to the Host Interface Adapter so that the data transfer may be performed. Step 6366 invokes the END routine.

Decision Step 6356 tests whether the segment is busy by testing the SEGMENT_BUSY flag in the File Descriptor 508. If the segment is busy, then Step 6368 waits until the segment is no longer busy before allowing processing to continue. Once the segment is found not to be busy, processing continues to decision Step 6370. If decision Step 6370 finds that the state of the segment is pending, then processing follows control Path 6354n as discussed above. Otherwise, control is passed to decision Step 6372.

If a segment has not been written, no destaging is required. Decision Step 6372 checks whether the segment under examination has been written by testing the SEGMENT_WRITTEN flag in the File Descriptor 508. If a segment for which destage is requested is found to not have been written, control follows control Path 6354n as discussed above. Otherwise, processing continues at decision Step 6374.

Decision Step 6374 tests whether the number of segments specified by the DESTAGE command is equal to one. The control path followed where more than one segment is requested to be destaged checks that each successive segment found for destaging is contiguous on Disk 106. When a segment is encountered which is not contiguous with the previous segment processed, control Path 6354n is followed as discussed above. The particular processing for multi-segment destage requests proceeds to decision Step 6376. Decision Step 6376 tests whether the segment under examination is the first segment processed. If so, control Path 6376y is followed to Step 6378. Otherwise control Path 6376n is followed to decision Step 6380. If the current segment resides on the same disk as the previous segment and the current segment is contiguous with the previous segment, processing proceeds to Step 6378. Otherwise, control Path 6354n is followed as discussed above. Step 6378 saves the disk numbers and disk addresses of the current segment for comparison on the next iteration of the loop. Control is then followed to Step 6382.

If decision Step 6374 finds that destage is requested for only one segment to process, or if there is more than one segment requested and the continuity has been verified, Step 6382 invokes the DESTAGE BUILD routine. The DESTAGE BUILD routine sets the state of the segment in the File Descriptor 508 to DESTAGE PENDING. The state of the segment will remain DESTAGE PENDING until a corresponding DESTAGE COMPLETE command is processed. In addition, the DESTAGE BUILD routine updates the Segment Information Packet 1662 with the number of segments to destage.

Decision Step checks whether the each block of the current segment contains valid data. If so, then processing proceeds to decision Step 6386. If there are still segments specified in the DESTAGE Command Packet which remain to be processed, processing proceeds to Step 6388. Step 6388 invokes the LOOP-CODE routine which increments the disk addresses for the next iteration of the loop. Step directs that the next iteration of the loop be performed beginning at the SEARCH routine invoked at Step 6352. If decision Step 6384 finds that not all of the blocks in a segment are valid, or decision Step 6386 finds that all requested segments have been processed, the DESTAGE routine completes its processing beginning at decision Step 6358 as discussed above.

e. DESTAGE COMPLETE Processing

FIGS. 104A, 104B, and 104C contain a flowchart of the processing performed by the Outboard File Cache in processing a DESTAGE COMPLETE command. The DESTAGE COMPLETE command indicates to the Outboard File Cache that the Host 10 has completed its processing of segments for which it issued a DESTAGE command. The Outboard File Cache removes the appropriate segments from the DESTAGE_PENDING state and purges them if required.

The SEARCH routine is invoked at Step 6390 for locating each segment specified in the DESTAGE COMPLETE Command Packet 1664. Decision Step 6392 tests whether the segment was found in the File Descriptor Table 506. If not, control Path 6392n is followed to decision Step 6394. Decision Step 6394 checks whether all the segments specified in the DESTAGE COMPLETE Command Packet have been processed. If there are more segments to processing the LOOP-CODE routine is invoked at Step 6396. The LOOP-CODE processing which increments the file relative segment offset, increments the number of segments processed, increments the Hash Table 6000 address, and reads the File Descriptor Table as addressed by the Hash Table address for the next iteration of the processing loop. Processing continues with the next iteration of the processing loop Step 6390 as indicated by Step 6398.

Once a hit is detected at decision Step 6392, decision Step 6400 checks whether the segment is busy by testing the SEGMENT_BUSY flag in the File Descriptor 508. If the segment is busy, processing is suspended until the segment becomes available as indicated by Step 6402. When the segment is not busy, Step 6404 reads the second portion of the File Descriptor 508. It is worth noting that each File Descriptor is stored in two different areas. The most frequently referenced portion of the File Descriptor is stored in a first area in Non-volatile Storage, and the less frequently referenced portion of the File Descriptor is stored in a second area in Non-volatile Storage. The division of the File Descriptors is done for performance purposes. The first eight words of each File Descriptor are referenced on most every File Cache operation, and the second eight words are less frequently referenced. Therefore the first eight words of each File Descriptor are stored in the first area and the second eight words of each File Descriptor are stored in the second area.

Decision Step 6406 tests whether the state of the segment as indicated by the File Descriptor 508 is either DESTAGE_

PENDING or PURGE_PENDING. If it is not, then control Path **6392*n* is followed as discussed above. Otherwise, processing proceeds to decision Step 6408 to check whether the HOST_ID and PROGRAM_ID in the Command Packet 1664 match that of the File Descriptor 508. If they do not match, processing proceeds to control Path 6392*n*** as described above.

If both tests 6406 and 6408 are successful, then decision Step 6410 tests whether the Host 10 was successful in destaging the segments indicated in the Command Packet 1664. The success or failure of the Host 10 in destaging the segment to Disk 106 is indicated by the Not Destaged (ND) flag in the DESTAGE COMPLETE Command Packet. If the Host succeeded in destaging the segments, then control Path **6410*y* is followed to decision Step 6412**.

If the state of the segment is not PURGE_PENDING, control Path **6412*n* directs processing to decision Step 6414. The processing steps conditioned upon Step 6414 relate to whether the segment was written since the time the DESTAGE command was initiated. If the segment has not been written, then control Path 6414*n* leads to decision Step 6416. The TOTAL_SEGMENT_VALID flag is tested to determine whether all the blocks in the segment contain data staged from Disk. If so, Step 6418 clears the BLOCKS_WRITTEN_TEMPLATE in the File Descriptor 508** to indicate that all blocks are valid and no blocks have been written.

If the entire segment is not valid, the BLOCKS_WRITTEN_TEMPLATE remains unchanged and processing proceeds to decision Step 6420. If the segment is not nailed as indicated by the NAIL flag in the File Descriptor 508, Step 6422 increments the LOCAL_WRITTEN_TO_COUNTER. The LOCAL_WRITTEN_TO_COUNTER is used to count the number of segments processed by this routine which were successfully destaged and not since written. This counter is then subtracted from the GLOBAL_WRITTEN_TO_COUNTER to keep the global counter of written segments up-to-date.

For nailed segments, decision Step tests whether the segment is an orphan by testing the ORPHAN flag in the File Descriptor 508. It is undesirable for nailed segments which are not orphans to influence the cache replacement algorithm. Therefore, the LOCAL_WRITTEN_TO_COUNTER is not incremented unless the nailed segment is also an orphan as indicated by decision Step 6424.

Step 6426 clears the DESTAGE_PENDING and DESTAGE_REPORTED flags in the File Descriptor 508 to indicate that the DESTAGE operation is complete. The updated File Descriptor is stored in both the main File Descriptor Table 506 and the backup File Descriptor Table at Step 6428. Once all segments indicated in the Command Packet 1664 have been processed, the ENDWT routine is invoked at Step 6430 to update the GLOBAL_WRITTEN_TO_COUNTER and return a status to the Host 10.

Returning to decision Step 6410, if the Host 10 was unsuccessful in destaging the identified segments, then the SEGMENT_WRITTEN flag in the File Descriptor 508 must be reset and the pending flags must be cleared. Step 6432 sets the SEGMENT_WRITTEN flag, stores the GROUP_ID from the command packet, and clears the DESTAGE_PENDING and PURGE_PENDING flags in the File Descriptor. Control then follows control Path **6432*p* to control Path 6426*p*** as described above.

At decision Step 6412, if the state of the segment as indicated by the File Descriptor 508 is PURGE_PENDING, then the present DESTAGE COMPLETE command was sent to complete a PURGE command and the File Descriptor must be updated accordingly. If the Purge Type (PT) in the DESTAGE COMPLETE Command Packet 1664 is purge blocks, then decision Step 6434 directs processing to proceed along control Path **6434*y* to decision Step 6435. Decision Step 6435 tests whether the current segment under examination is either the first or the last segment having a block to be purged. For both the first and last segments, the PURGE-BLOCKs processing is invoked at Step 6436 to purge only the blocks identified in the Command Packet. If there are blocks in the first or last segment which remain written after the purge is complete, then decision Step 6437 directs control to Step 6438 where the TOTAL_SEGMENT_VALID is cleared. Step 6436 sets the SEGMENT_WRITTEN flag and clears the PURGE_PENDING flag in the File Descriptor. Processing then proceeds along control Path 6432*p* as described above. If decision Step 6435 finds that the segment in process is neither the first nor the last segment, then processing proceeds to control Path 6442*y*** as discussed below.

If decision Step 6434 does not detect Purge Type of purge blocks, then control Path **6434*n* is followed to decision Step 6439. If the Purge Type is purge segments, control is directed to control Path 6442*y*. If the Purge Type indicated in the DESTAGE COMPLETE Command Packet 1664 is Purge Leg 1, then the LEG1_DISK_NUMBER and LEG1_DISK_ADDRESS fields in the File Descriptor are cleared at Step 6441. Similarly, if the Purge Type is Purge Leg 2, then the LEG2_DISK_NUMBER and LEG2_DISK_ADDRESS fields in the File Descriptor are cleared. Decision Step 6442 tests whether both legs in the File Descriptor were cleared. If not, then processing proceeds to Step 6439 as discussed above. This path is involved in purging the segment as soon as its copies on Leg-1 and Leg-2** have been destaged. Because one or both could not be successfully destaged at this time, the SEGMENT_WRITTEN flag is set again.

Processing follows control Path **6442*y* to decision Step 6444. If the segment is not nailed as indicated by the NAIL flag in the File Descriptor 508, Step 6446** increments the LOCAL_WRITTEN_TO_COUNTER. The LOCAL_WRITTEN_TO_COUNTER is used to count the number of segments processed by this routine which were successfully destaged and not since written. This counter is then subtracted from the GLOBAL_WRITTEN_TO_COUNTER to keep the global counter of written segments up-to-date.

For nailed segments, decision Step tests whether the segment is an orphan by testing the ORPHAN flag in the File Descriptor 508. It is undesirable for nailed segments which are not orphans to influence the cache replacement algorithm. Therefore, the LOCAL_WRITTEN_TO_COUNTER is not incremented unless the nailed segment is also an orphan as indicated by decision Step 6448.

Step 6450 invokes the PURGE routine. The PURGE routine adjusts the HASH_LINKs in the appropriate File Descriptors 508 and clears the other fields in the File Descriptor.

f. WRITE OFF BLOCK BOUNDARY Processing

FIG. 105 contains a flowchart of the processing done by the Outboard File Cache for a WRITE OFF BLOCK BOUNDARY command. The processing required for a WRITE OFF BLOCK BOUNDARY command is similar to that done for READ and WRITE commands. Therefore, the same READ-WRITE routine is used with flags set to indicate that a WRITE OFF BLOCK BOUNDARY command is in process. The processing illustrated simply sets two flags which are used later in the processing of the command. Step 6472 sets the WRITE_OFF_BLOCK_BOUNDARY flag which is referenced later in the READ-WRITE routine, and Step 6474 sets a WRITE_OFF_BLOCK_BOUNDARY bit in the data transfer request packet which will be sent to the Host Interface Adapter 214. The READ-WRITE routine is invoked at Step 6476 to complete the remainder of processing required for the WRITE OFF BLOCK BOUNDARY command.

g. CLEAR PENDING Processing

FIG. 106 contains a flowchart of the processing performed by the Outboard File Cache for a CLEAR PENDING command. The segments for which the pending states will be cleared are selected according to the Search Type (ST) in the CLEAR PENDING Command Packet 1254. Decision Step 6482 tests the Search Type specified in the Command Packet. If the Search Type is search file, then the LOGICAL-SCAN routine is invoked at Step 6484.

FIG. 107 contains a flowchart of the processing performed by the Outboard File Cache for a RETURN SEGMENT STATE command. The determination of the segments for which the Segment State Packets 2110 are returned is based upon the SEG_TYPE field in the RETURN SEGMENT STATE Command Packet 2106. If the SEG_TYPE is 0, 1, 2, or 3, the LOGICAL-SCAN processing is invoked at Step 6488. For SEG_TYPEs 4, 5, and 6, the PHYSICAL-SCAN processing is invoked at Step 6490. See the discussion of the RETURN SEGMENT STATE command for a description of the different SEG_TYPEs.

h. Lock Tables

FIG. 108 illustrates lock tables used for coordinating file locks as used in the LOCK CACHE FILE, LOCK CACHE FILES BY ATTRIBUTES, UNLOCK CACHE FILE, and UNLOCK CACHE FILES BY ATTRIBUTES commands. Two tables are used for coordinating file locks: the File Lock Descriptor Table 6502 and the Attribute Lock Descriptor Table 6504. The File Lock Descriptor Table is updated by the LOCK CACHE FILE and UNLOCK CACHE FILE commands and the Attribute Lock Descriptor Table is updated by the LOCK CACHE FILES BY ATTRIBUTES and UNLOCK CACHE FILES BY ATTRIBUTES commands.

The File Lock Descriptor Table 6502 contains 512 File Lock Descriptors 6502. Each File Lock Descriptor contains a FILE_IDENTIFIER in words 0 and 1. The FILE_IDENTIFIER is the same as the FILE_IDENTIFIER of the LOCK CACHE FILE Command Packet 1764. Words 2 and 3 of the File Lock Descriptor identify the range of segments to which the lock applies. The FILE_RELATIVE_SEGMENT_OFFSET of word 2 is first segment in the range of segments locked and is the same as the FILE_RELATIVE_SEGMENT_OFFSET specified in the LOCK CACHE FILE Command Packet. The LAST_FILE_RELATIVE_SEGMENT_OFFSET of word 3 is the last segment in the range of segments and is the same as the LAST_FILE_RELATIVE_SEGMENT_OFFSET of the LOCK CACHE FILE Command Packet.

Word 4 of the File Lock Descriptor 6506 may contain a link to the next File Lock Descriptor. A linked list of the File Lock Descriptors not is use (the "free list") is maintained for allocating the available File Lock Descriptors to incoming LOCK CACHE FILE commands. A File Lock Descriptor may also be part of linked list of File Lock Descriptors for which the FILE_IDENTIFIERs hash to the same entry in the Lock Hash Table, in which case word 4 is used as a HASH_LINK.

Entries in the File Lock Descriptor Table 6502 are referenced via the Lock Hash Table 6508. The Lock Hash Table has 256 entries available for referencing entries in the File Lock Descriptor Table. A hash function is performed on the FILE_IDENTIFIER in a Command Packet to index the Lock Hash Table.

The HOST_ID specified in a LOCK CACHE FILE Command Packet 1764 is stored in Word 5 of the File Lock Descriptor 6506. Words 6 and 7 of the File Lock Descriptor are unused.

The Attribute Lock Descriptor Table 6504 may contain up to eight Attribute Lock Descriptors 6510. Words 0 and 1 of the Attribute Lock Descriptor contain the ATTRIBUTES_MASK specified in the LOCK CACHE FILES BY ATTRIBUTES Command Packet 1768, words 2 and 3 contain the ATTRIBUTES_ID specified in the Command Packet 1768, and word 4 contains the HOST_ID from the Command Packet. Words 5, 6, and 7 are unused.

i. LOCK CACHE FILE Processing

FIGS. 109A and 109B contain a flow chart of the processing performed for the LOCK CACHE FILE and LOCK CACHE FILES BY ATTRIBUTES commands. Step 6512 requests a lock to obtain exclusive access to the Lock Hash Table 6508, File Lock Descriptor Table 6502, Attribute Lock Descriptor Table 6504, and other associated pointers and counters. Processing resumes once the lock is granted. While not shown, it will be understood by those skilled in the art that the wait should not be should not be allowed to continue indefinitely and that some error recovery actions should be taken.

After the lock is granted, decision Step 6514 tests whether the command is LOCK CACHE FILES BY ATTRIBUTES. For LOCK CACHE FILES BY ATTRIBUTES commands, Step 6516 invokes the LOCK-ATTRIBUTES processing. Otherwise, control is directed to Step 6518 to process the LOCK CACHE FILE command. Step 6518 hashes the FILE_IDENTIFIER in the Command Packet 1764 to obtain an index into the Lock Hash Table 6508. After the indexed entry from the Lock Hash Table is read, decision Step 6520 tests whether the entry points to a File Lock Descriptor. If the Hash Table entry is 0 (it does not point to a File Lock Descriptor), then control Path 6520y is followed to decision Step 6522. Decision Step 6522 tests whether the File Lock Descriptor Table 6502 is full. If the test is positive, then Step 6524 releases the lock on the lock tables and sets the RECOMMENDED_ACTION in the Status Packet 1766 to Resend. Step 6526 invokes the END processing.

If the File Lock Descriptor Table 6502 is not full, then control is directed to Step 6528. Step 6528 updates the head of the list of available File Lock Descriptors 6506 to point to the next File Lock Descriptor on the free list (using the AVAILABLE_LINK). Step 6530 stores the contents of the Command Packet 1764 to the File Lock Descriptor and updates the HASH_LINK to indicate that the File Lock Descriptor is the end of the hash list. Step 6532 links the File Lock Descriptor 6506 to the Lock Hash Table 6508 entry if the File Lock Descriptor is the first File Lock Descriptor on the hash list. Otherwise, the previous File Lock Descriptor is linked to the new File Lock Descriptor via the HASH_LINK in the previous File Lock Descriptor. The number of active file locks is incremented at Step 6534 and Step 6536 releases the lock held on the lock tables and the associated counters and pointers. Step 6538 makes the RECOMMENDED_ACTION in the Status Packet 1766 No Action Required.

If Step 6520 detects that the Lock Hash Table 6508 points to a File Lock Descriptor 6506, then an available File Lock Descriptor 508 must be added to the hash list. Step 6540 reads the File Lock Descriptor pointed to by the Lock Hash Table entry. If decision Step 6542 detects that the range of segments specified in the Command Packet 1764 intersects the range of segments indicated in the File Lock Descriptor, then control is directed to Step 6544 where the HOST_ID from the File Lock Descriptor is stored in the Status Packet 1766. Step 6546 stores the Resend RECOMMENDED_ACTION in the Status Packet 1766 and Step 6548 invokes the END-ERR processing.

Step 6542 directs control to decision Step 6550 if the ranges of segments do not intersect. Decision Step 6550 test whether the File Lock Descriptor is at the end of the hash list. If it is not, Step 6552 gets the next File Lock Descriptor and processing continues at decision Step 6542. If the File Lock Descriptor is at the end of the hash list, then control is directed to Step 6522 to add a new File Lock Descriptor to the hash list as discussed above.

FIG. 110 contains a flowchart of the processing performed for processing LOCK CACHE FILES BY ATTRIBUTES commands. Decision Step tests whether the Attribute Lock Descriptor Table 6504 is full. If the table is full, Step clears the lock held on the lock tables and the associated counters and pointers and makes the RECOMMENDED_ACTION in the Status Packet 1770 Resend. Step 6558 invokes END processing to return the Status Packet to the Host 10.

If the Attribute Lock Descriptor Table 6504 is not full, then control is directed to Step 6560 where the ATTRIBUTES_ID, ATTRIBUTES_MASK, and HOST_ID from the Command Packet 1768 in an empty entry in the Attribute Lock Descriptor Table. Step 6562 increments the count of the number of active attribute locks, Step 6564 makes the RECOMMENDED_ACTION in the Status packet 1770 No Action Required, and Step 6566 releases the lock held on the lock tables and the associated counters and pointers.

j. UNLOCK CACHE FILE Processing

FIGS. 111A and 111B contain a flowchart of the processing performed for the UNLOCK CACHE FILE and UNLOCK CACHE FILES BY ATTRIBUTES commands. Step 6568 requests a lock on the lock tables and the associated counters and pointers. Processing continues once the lock is granted. While not shown, it will be understood by those skilled in the art that the wait should not be should not be allowed to continue indefinitely and that some error recovery actions should be taken. Decision Step 6570 tests whether the command is UNLOCK CACHE FILES BY ATTRIBUTES. If yes, the UNLOCK-ATTRIBUTES processing is invoked at Step 6572. Otherwise, the FILE_IDENTIFIER in the Command Packet 2124 is hashed to an entry in the Lock Hash Table 6508.

Decision Step 6576 tests whether the end of the hash list has been encountered. If the end of the hash list has been encountered and no File Lock Descriptor 6506 was found which matched the Command Packet 2124, then control is directed to Step 6578 to clear the lock on the lock tables. The RECOMMENDED_ACTION is set to Error at Step 6580 and END processing is invoked at Step 6582.

If decision Step 6576 finds that there are more File Lock Descriptors in the hash list, then decision Step 6584 tests whether the FILE_IDENTIFIER, FILE_RELATIVE_SEGMENT_OFFSET, LAST_FILE_RELATIVE_SEGMENT_OFFSET, and HOST_ID in the File Lock Descriptor are equal to those specified in the Command Packet 2124. If they are not equal, Step 6586 gets the next File Lock Descriptor (as referenced by HASH_LINK) and processing continues at Step 6576 as discussed above. If decision Step 6584 detects a match, control is directed to Step 6588 via control Path 6584*y*.

Step 6588 removes the File Lock Descriptor from the hash list and marks the AVAILABLE_LINK as the end of the free list by clearing the HASH_LINK. The File Lock Descriptor is then added to the end of the free list and the number of active file locks is decremented respectively at Steps 6590 and 6592. Step 6594 releases the lock held on the lock tables and the associated counters and pointers. The RECOMMENDED_ACTION in the Status Packet 2126 is set to No Action Required at Step 6596 and END processing is invoked at Step 6598.

FIG. 112 contains a flowchart of the processing performed for an UNLOCK CACHE FILES BY ATTRIBUTES command. If the ATTRIBUTES_MASK and ATTRIBUTES_ID specified in the UNLOCK CACHE FILES BY ATTRIBUTES Command Packet 2128 are equal to any of the Attribute Lock Descriptors 6510, then decision Step 6602 directs control to Step 6604 where the HOST_ID in the Attribute Lock Descriptor is cleared to indicate that the Attribute Lock Descriptor is no longer in use. Step 6606 decrements the count of the number of active attribute locks and Step 6608 clears the lock held on the lock tables. The RECOMMENDED_ACTION is set to No Action Required at Step 6610 and Step 6612 invokes END processing.

If the test of decision Step 6602 fails, then Step 6614 clears the lock held on the lock tables and sets the RECOMMENDED_ACTION to Error.

k. LOGICAL-SCAN Processing

FIGS. 113A, 113B, 113C, 113D, 113E, and 113F contain a flowchart of the LOGICAL-SCAN processing performed by the Outboard File Cache in processing the DESTAGE, DESTAGE AND PURGE FILE, MODIFY File Descriptor, CLEAR PENDING, and RETURN SEGMENT STATE commands. The LOGICAL-SCAN processing searches the file for the segments specified in the Command Packet 452 and performs the operation for the particular command.

Step 6622 initially invokes the SEARCH processing for locating the first segment specified in the Command Packet 452. Decision Step 6624 tests whether the SEARCH processing was successful in locating the identified segment. If the segment was found, then decision Step 6626 tests whether the segment is busy by testing the SEGMENT_BUSY flag in the File Descriptor 508. If the segment is busy, Step 6628 suspends further processing until the segment is no longer busy.

Decision Step 6630 tests whether the command specified in the Command Packet 452 is RETURN SEGMENT STATE. If it is, then the processing which is specific to the RETURN SEGMENT STATE command is invoked at Step 6632. RETURN SEGMENT STATE processing builds the Segment State Packet 2110 for the current segment. When RETURN SEGMENT STATE processing is complete, control proceeds along control Path 6624*n*.

The Command Packet 452 is tested for the MODIFY File Descriptor command at decision Step 6634. For a MODIFY File Descriptor command the MODIFY File Descriptor processing of Step 6636 is invoked to update the File Descriptor 508. After the File Descriptor is updated, processing proceeds along control Path 6624*n*.

Decision Step 6638 tests for the CLEAR PENDING command. The CLEAR PENDING command causes Step 6640 to clear any PENDING states found in the File Descriptor 508. After the PENDING states are cleared, processing proceeds along control Path 6624*n*. If decision Step 6638 finds that the command is not CLEAR PENDING, then decision Step 6642 tests whether the state of the segment in process is DESTAGE_PENDING, STAGE_PENDING, or PURGE_PENDING, in which case, Step 6644 assigns the Iterate RECOMMENDED_ACTION to the Status Packet 460 and processing follows control Path 6624*n*.

If the command in the Command Packet is a PURGE FILE command, then decision Step 6646 directs the processing to Step 6648. Step 6648 clears the LEG1_DISK_NUMBER and LEG1_DISK_ADDRESS in the File Descriptor 508 if the LG1 flag in the PURGE FILE Command Packet is set. Similarly, the LEG2_DISK_NUMBER and LEG2_DISK_ADDRESS in the File Descriptor 508 if the LG2 flag in the PURGE FILE Command Packet is set. Decision Step 6652 checks whether the Purge Type (PT) in the Command Packet is purge segment, or both legs in the File Descriptor have been cleared. If neither of the conditions in Step 6652 are found to be true, then the Purge Type is purge blocks and control is directed to decision Step 6654. Decision Step 6654 tests whether the SEGMENT_WRITTEN flag in the File Descriptor is set. If the segment has been written, then processing proceeds to decision Step 6656 for testing whether the current segment is either the first or last segment addressed by the command. For the first and last segments, the BLOCK-PURGE processing is invoked to clear the appropriate bits in the BLOCKS_WRITTEN_TEMPLATE in the File Descriptor. Decision Step 6660 tests whether any of the Blocks 504 in the current segment have been written by testing the BLOCKS_WRITTEN_TEMPLATE. If there are blocks remaining in the current segment which have been written, then Step 6662 clears the TOTAL_SEGMENT_VALID flag in the File Descriptor. After Step 6662, processing proceeds along control Path 6624*n*. If Step 6660 finds that none of the blocks have been written, then control is directed to control Path 6652*y*.

Decision Step 6664 tests the SEGMENT_WRITTEN flag in the File Descriptor 508. If the flag is set, then decision Step 6666 checks whether the NAIL flag in the File Descriptor is set. If the NAIL flag is not set, then control proceeds directly to Step 6668 where the LOCAL_WRITTEN_TO_COUNTER is incremented. The LOCAL_WRITTEN_TO_COUNTER is later subtracted from the GLOBAL_WRITTEN_TO_COUNTER for purposes of monitoring cache usage. If the segment is nailed, decision Step 6670 tests whether the nailed segment is an orphan by checking the ORPHAN flag in the File Descriptor. For nailed segments which are not orphans, the cache usage monitoring is not affected and control is followed to Step 6672 where the PURGE processing is invoked to clean up HASH_LINKs and clear the File Descriptor.

If decision Step 6646 finds that the command is not PURGE, then control is directed to decision Step 6674. If the SEGMENT_WRITTEN flag is set, then Step 6676 is invoked to build a Destage Request Packet 1606. If the segment has not been written, then decision Step 6678 tests whether the Purge flag (see the DESTAGE AND PURGE FILES BY ATTRIBUTES Command Packet 1760) in the Command Packet is set. If the Purge flag is set, processing proceeds to Step 6672 as discussed above. Otherwise, control is directed to Step 6680.

Step 6680 increments the current File Relative Segment Offset and Hash Table pointer for the next iteration of the processing loop. The Hash Table pointer points to an entry in the Hash Table 6000. Processing proceeds to decision Test 6682 for checking whether the command is MODIFY File Descriptor. For a MODIFY File Descriptor command, Step 6684 increments the LEG1_DISK_ADDRESS, the LEG2_DISK_ADDRESS, and the counter of the number of segments processed for the next iteration of the processing loop.

If the test at decision Step 6682 fails, control is directed to decision Step 6686. If a DESTAGE command is detected, processing proceeds to Step 6688. Decision Step 6688 tests whether the number of destage packets built is equal to the number requested in the Command Packet 452. If the test is positive, then decision Step 6690 tests whether the all the segments requested in the Command Packet have been processed. Where there are more segments to process, the RECOMMENDED_ACTION in the Status Packet 460 is set to Iterate at Step 6692 and the lock on the eight segment group is cleared at Step 6694. Control is then directed to decision Step 6696.

If all segments requested in the Command Packet 452 have been processed, then decision Step 6690 directs control to Step 6698 where the RECOMMENDED_ACTION is set to No Action Required. Processing is then directed to Step 6694 as discussed above.

Where decision Step 6686 does not detect a DESTAGE command or decision Step 6688 finds that not all of the requested destage packets have been built, control is directed to decision Step 6700 to test for the RETURN SEGMENT STATE command. For a RETURN SEGMENT STATE COMMAND, decision Step 6702 tests whether the Segment Information Table in the RETURN SEGMENT STATE Status Packet 2108 is full. If the test is positive, control is directed to decision Step 6690 as discussed above. Otherwise, control is directed to decision Step 6704 to test whether all the segments requested in the RETURN SEGMENT STATE Command Packet 2106 have been processed. Once all segments have been processed, Step 6698 is performed as discussed above. If there are more segments to process, decision Step 6706 tests the segment type (SEG_TYPE) specified by the RETURN SEGMENT STATE command. For the SEG_TYPE flagged by the values 2 or 3 and if the first segment has been processed, control is directed to Step 6698 as discussed above. For other SEG_TYPEs specified by the RETURN SEGMENT STATE command, processing is directed to control Path 6708*n* as discussed below.

For commands other than RETURN SEGMENT STATE, as determined at decision Step 6700, control is directed to decision Step 6708. Decision Step 6708 tests whether all segments requested in the Command Packet 452 have been processed. Once all segments have been processed, processing proceeds to Step 6698 as discussed above. Where there remain segments to process, control is directed to decision Step 6710. Step 6710 tests whether the next segment to process is within the group of 8 segments which are currently locked. If the test of Step 6710 is positive, Step 6712 reads the File Descriptor 508 for the next segment from the File Descriptor Table 506. Processing then proceeds along control Path 6720 which returns control to SEARCH processing of Step 6622. If decision Step 6710 detects that the next segment to process is not within the current group of 8 locked segments, then processing is directed to Step 6714.

Step 6714 clears the lock on the current group of 8 locked segments. Decision Step 6716 tests whether 50 milliseconds have elapsed since the time when processing of the Command Packet 452 first commenced. If the allotted time has not elapsed, then Step 6718 requests a lock in the next group of 8 segments in which the next segment to process resides. Decision Step 6720 detects when the lock is granted. Once the lock granted, control Path 6720*y* returns control to Step 6722 to search for the next segment. Otherwise, decision Step tests whether a 2 millisecond timer has elapsed. If 2 milliseconds have not elapsed since the time that the lock of Step 6718 was requested, then control is directed to decision Step 6720 to once again test whether the lock has been granted. If 2 milliseconds have elapsed, then control is directed to Step 6724 where the RECOMMENDED_ ACTION in the Status Packet 460 is set to Iterate.

If decision Step 6716 detects that the time expended processing the command has exceeded 50 milliseconds, then control is directed along Path 6716y to Step 6724. After the RECOMMENDED_ACTION is set to Iterate, decision Step 6696 tests whether the command is RETURN SEGMENT STATE. If the test is positive, Step 6726 builds a Segment State Packet and sends it to the Host Interface Adapter 214. This is performed in addition to Step 6632 because of a limitation in the size of the transfer packet to the HIA. Step 6728 stores the segment counter in the PACKETS_RETURNED_COUNT field, and stores the current File Relative Segment Offset in the RESTART_ SEGMENT_POINTER in the Status Packet 460. Decision Step 6730 tests whether the GLOBAL_WRITTEN_TO_ COUNTER should be adjusted to account for segments for which the SEGMENT_WRITTEN flag was cleared. If the LOCAL_WRITTEN_TO_COUNTER is equal to 0, then no adjustment is necessary and the END processing is invoked at Step 6732. Otherwise, the END-WRITTEN-TO processing is invoked at Step 6734.

For commands other than RETURN SEGMENT STATE, decision Step 6696 directs control to decision Step 6736. Decision Step 6736 tests whether any destage packets were built. If not, processing proceeds to Step 6728 as discussed above. If there are destage packets to process, Step 6738 is performed to build a Segment Information Packet 1662 and sent to the Host Interface Adapter 214 to store in the Status Packet 460. Step 6740 sends a data transfer request packet to the Host Interface Adapter to transfer the specified segment from Non-volatile Storage 220 to the Host 10. If decision Step 6742 finds that any of the segments for which destage is requested are disabled (SEGMENT_DISABLED flag in the File Descriptor), then Step 6744 sets the RECOMMENDED_ACTION in the Status Packet 460 to Purge Disabled Segments and Resend. If no disabled segments were detected, control is directed to Step 6728 as discussed above.

Figure 113A:
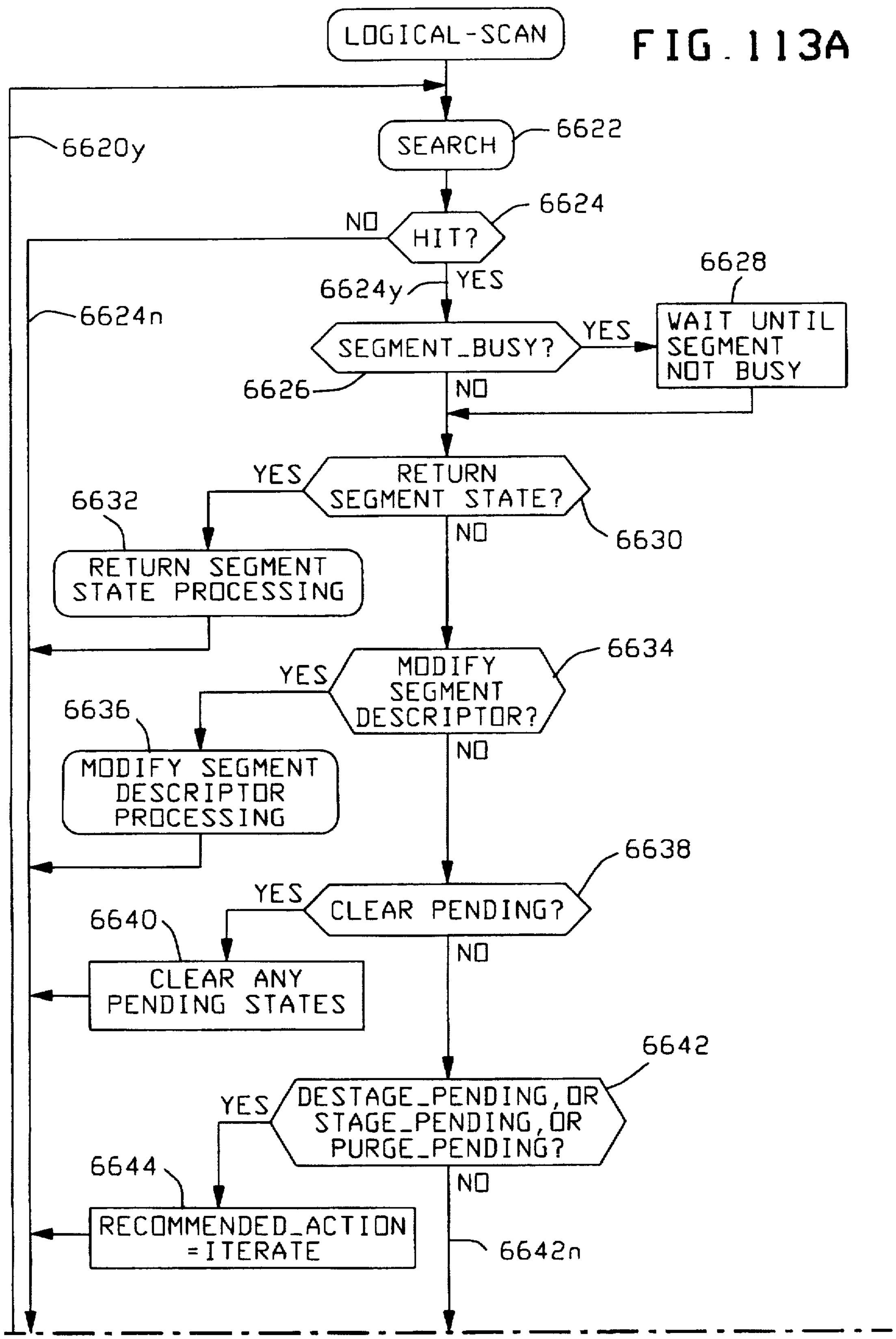
Figure 113B:
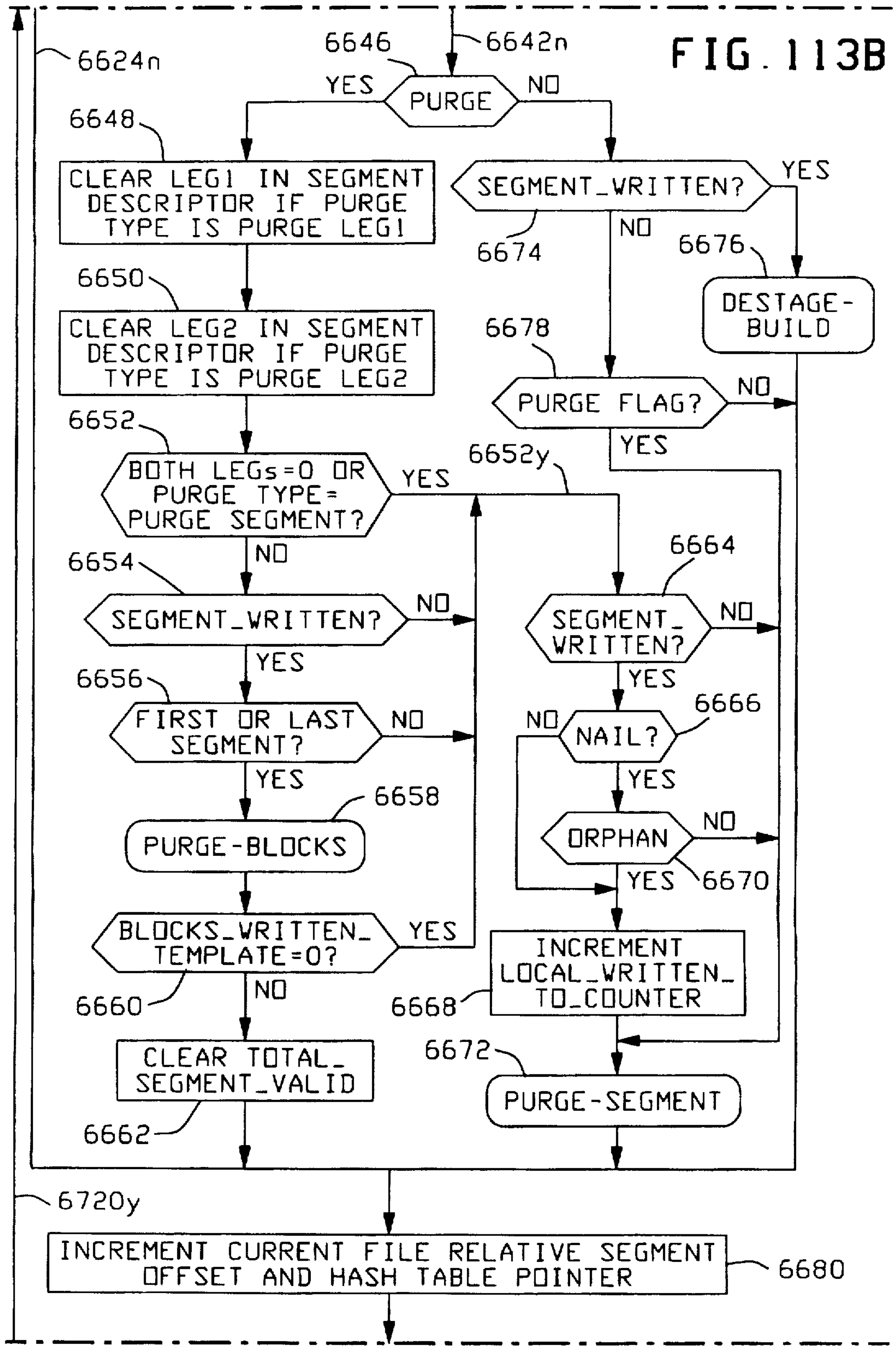
Figure 113C:
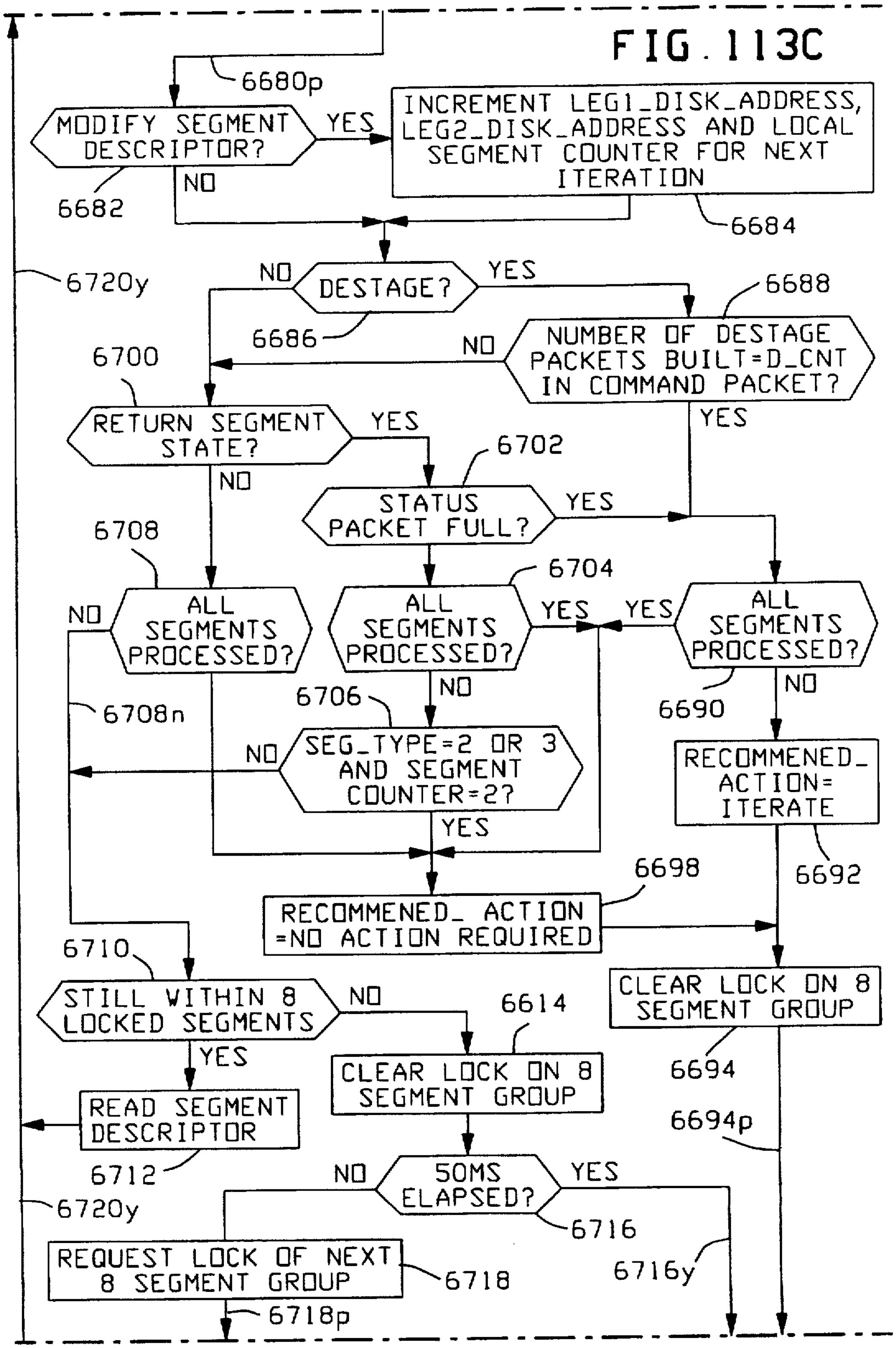
Figure 113D:
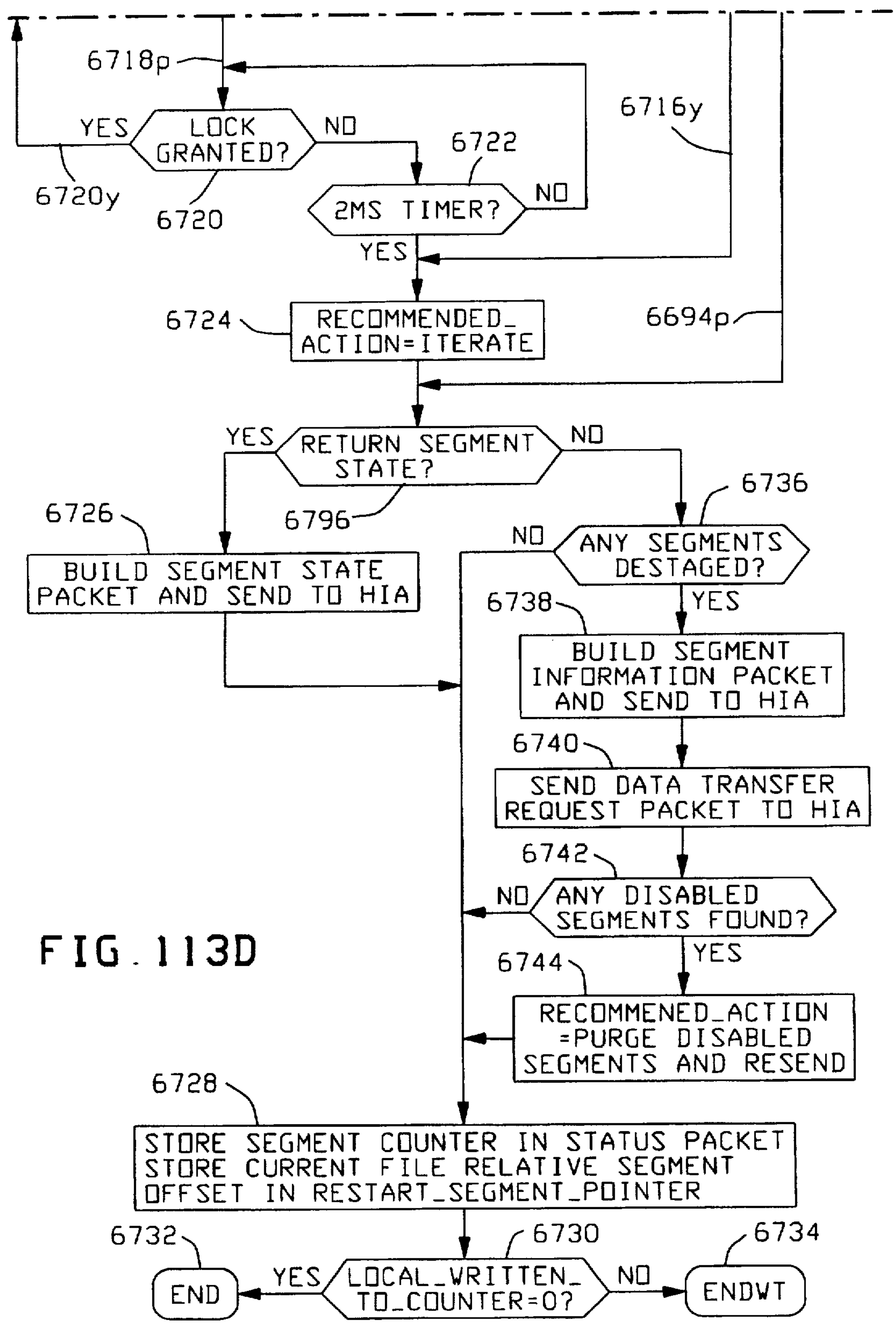
Figure 113E:
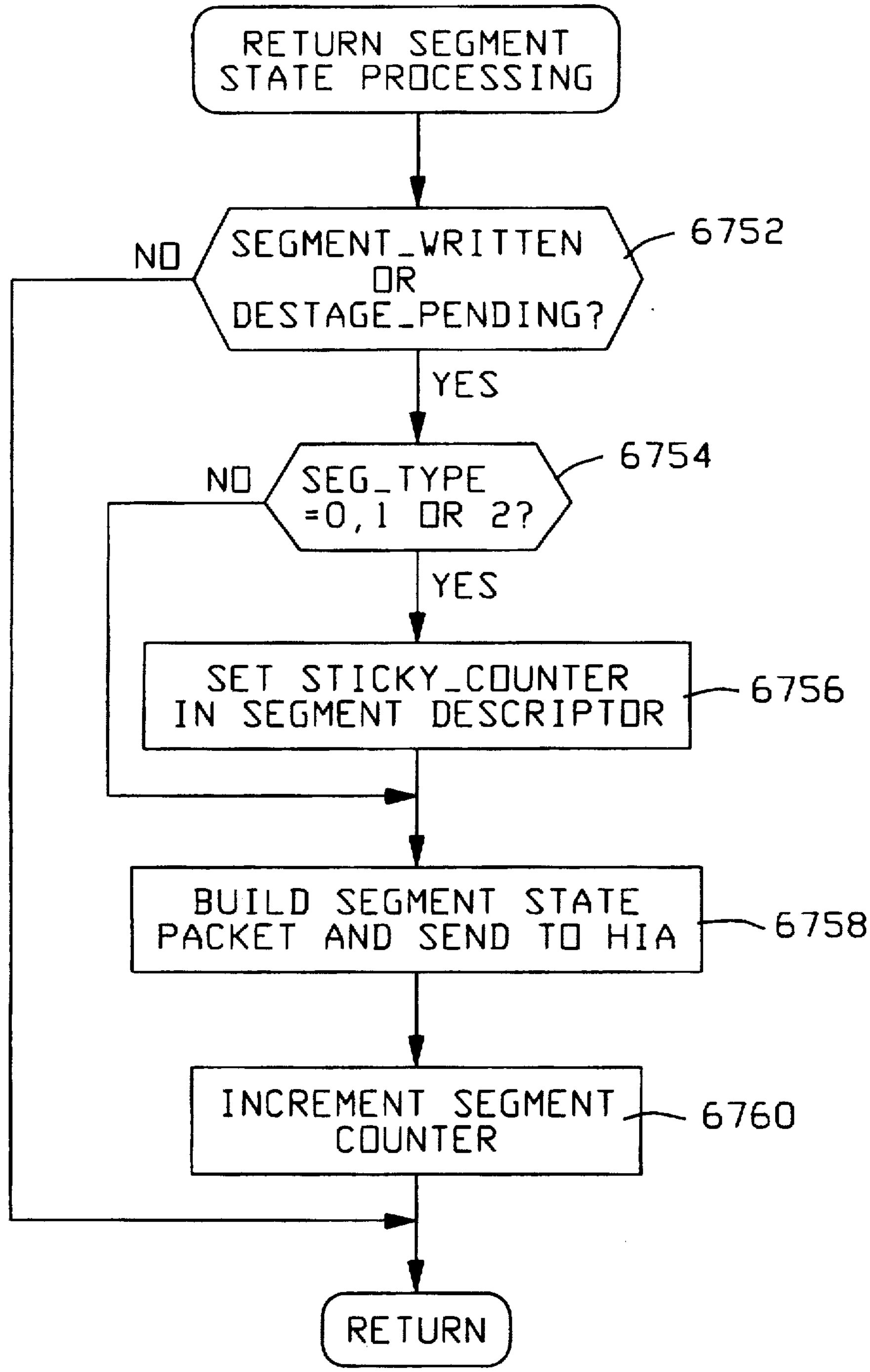

FIG. 113E contains a flowchart of the processing performed for RETURN SEGMENT STATE processing of Step 6632. Where neither the SEGMENT_WRITTEN flag nor the DESTAGE_PENDING flag in the File Descriptor 508 are set, processing returns to control Path 6624n. If decision Step 6752 detects that either the SEGMENT_WRITTEN or DESTAGE_PENDING flag is set in the File Descriptor 508, then control is directed to decision Step 6754. If the segment type as specified in the SEG_TYPE field in the RETURN SEGMENT STATE Command Packet 2106 is equal to 0, 1, or 2, then the STICKY_COUNTER in the File Descriptor is set at Step 6756. Step 6758 builds a Segment State Packet and sends it to the HIA for sending to the Host 10 in the RETURN SEGMENT STATE Status Packet 2108. Step 6760 increments the segment counter and processing returns to control Path 6624n.

Figure 113F:
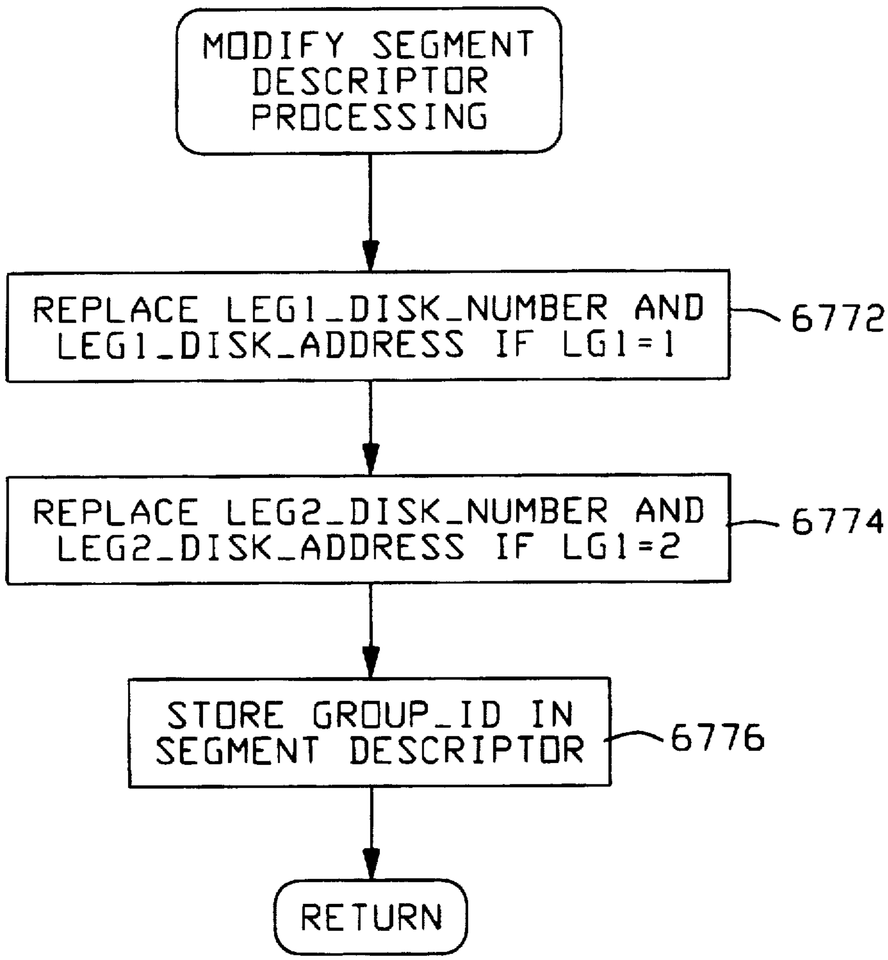

FIG. 113F illustrates a flowchart for the processing performed for MODIFY File Descriptor processing of Step 6636. If the LG1 flag in the MODIFY File Descriptor Command Packet 1772 is set, then Step 6772 replaces the LEG1_DISK_NUMBER and LEG1_DISK_ADDRESS in the File Descriptor 508 with the corresponding parameters provided in the Command Packet 1722. Similarly, if the LG2 flag in the Command Packet is set, the LEG2_DISK_ NUMBER and LEG2_DISK_ADDRESS are replaced with the corresponding parameters from the Command Packet. Step 6776 stores the GROUP_ID from the Command Packet in the File Descriptor and control is returned to control Path 6624n.

FIGS. 114A, 114B, 114C, 114D, 114E, 114F, and 114G illustrate the flowchart for the PHYSICAL-SCAN processing performed by the Outboard File Cache. The PHYSICAL-SCAN processing may be performed for the RETURN SEGMENT STATE, CLEAR PENDING, DESTAGE AND PURGE DISK, DESTAGE AND PURGE FILES BY ATTRIBUTES, PURGE FILES BY ATTRIBUTES, and PURGE DISK commands. The PHYSICAL-SCAN processing starts with the first File Descriptor 508 in the File Descriptor Table 506 and processes each referenced segment according to specific command.

Step 6792 retrieves the pointer from the Command Packet which addresses the File Descriptor Table 506. The CURRENT_SEGMENT_POINTER contains this value. Decision Step 6796 tests the type of command specified in the Command Packet 452. If the command does not require masking (not DESTAGE AND PURGE FILES BY ATTRIBUTES or PURGE FILES BY ATTRIBUTES), then processing is directed to Step 6798. The last eight words of the current File Descriptor 508 are loaded at Step 6798. Decision Step 6800 tests whether the command is CLEAR PENDING. If the HOST_ID and PROGRAM_ID in the File Descriptor 508 match those provided in the Command Packet, then processing proceeds to control Path 6802n to prepare for the next iteration of the main processing loop. Otherwise, control is directed to Step 6806 where the first eight words of the File Descriptor are loaded. Decision Step 6808 tests whether the segment has been purged (its FILE_ IDENTIFIER=0) or the segment is unavailable for storing cache data (it may be used for other purposes). If the segment is not purged and is not marked as unavailable, then processing proceeds to decision Step 6810.

For each matching segment discovered, two iterations of the main processing loop are performed. The first iteration of the loop discovers the matching segment, and the second iteration performs the desired operation after locking the appropriate block of 8 segments. The Second pass flag indicates whether the first or second iteration for a segment is being performed. Taking the case where the segment is initially discovered, Step 6812 invokes HASH processing to locate the group of eight segments in which the segment to be locked resides. Step 6814 locks the group of eight segments. If the eight segments could not be locked in two milliseconds, then decision Step 6816 directs processing to control Path 6816n where an Iterate RECOMMENDED_ ACTION is returned to the sending Host 10. Otherwise, Step 6820 sets the second pass flag and control is returned to the top of the processing loop via control Path 6820p.

On the second iteration of the main loop for a matching segment, decision Step 6810 directs control to decision Step 6822. Decision Step 6822 tests whether the SEGMENT_ BUSY flag is set in the File Descriptor 508. If it is, then Step 6824 suspends further processing until the segment is no longer busy. Once the segment is no longer busy, processing proceeds to decision Step 6826 which tests for the RETURN SEGMENT STATE COMMAND. If the command is other than RETURN SEGMENT STATE, then control is directed to decision Step 6828 where a test is made for the CLEAR PENDING command. If a CLEAR PENDING command is found, the FIX-STATE processing of Step 6830 repairs the state of the segment according to the conditions set forth in its flowchart. Control is then directed to control Path 6802n to prepare for the next iteration of the main processing loop.

Figure 114A:
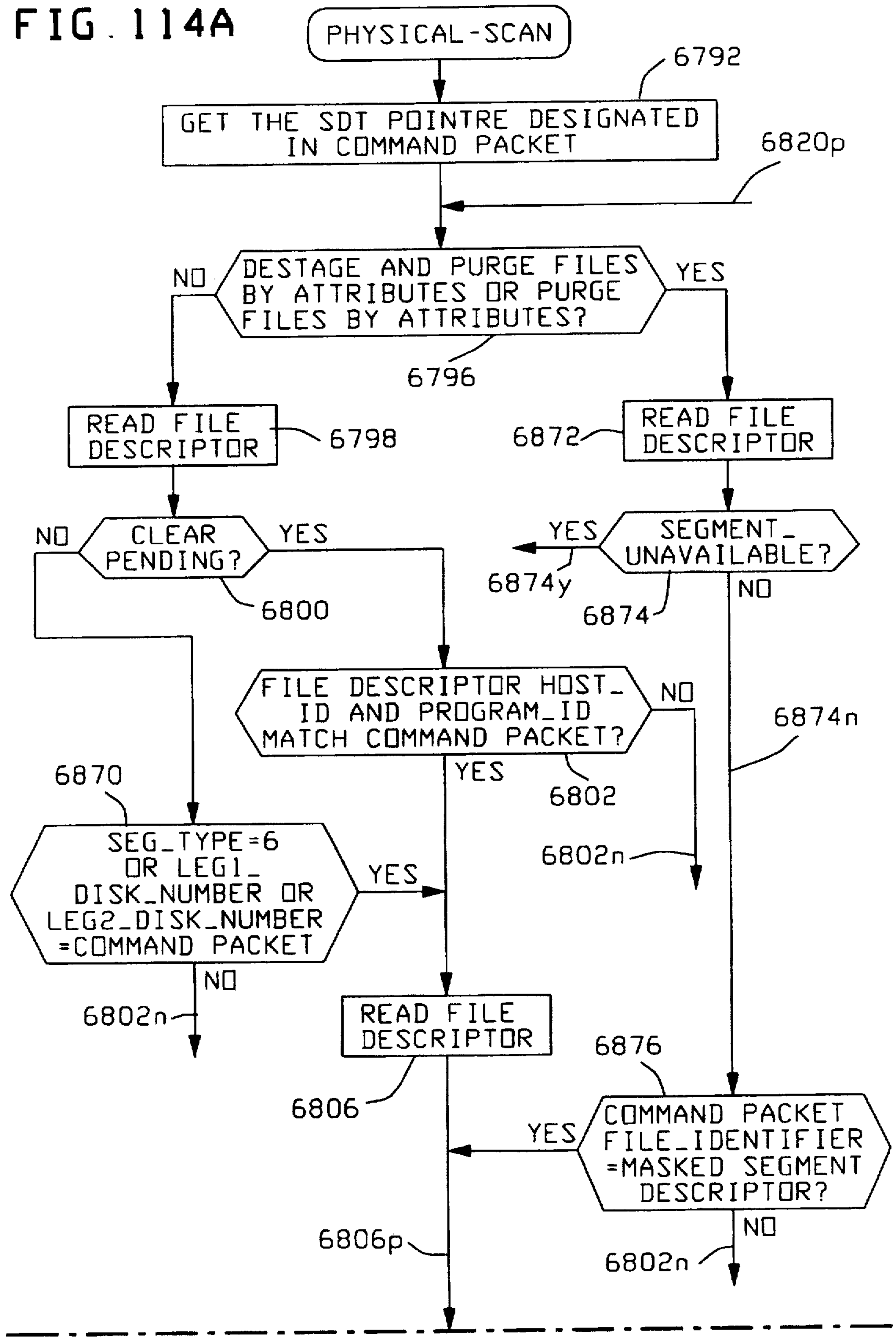
Figure 114B:
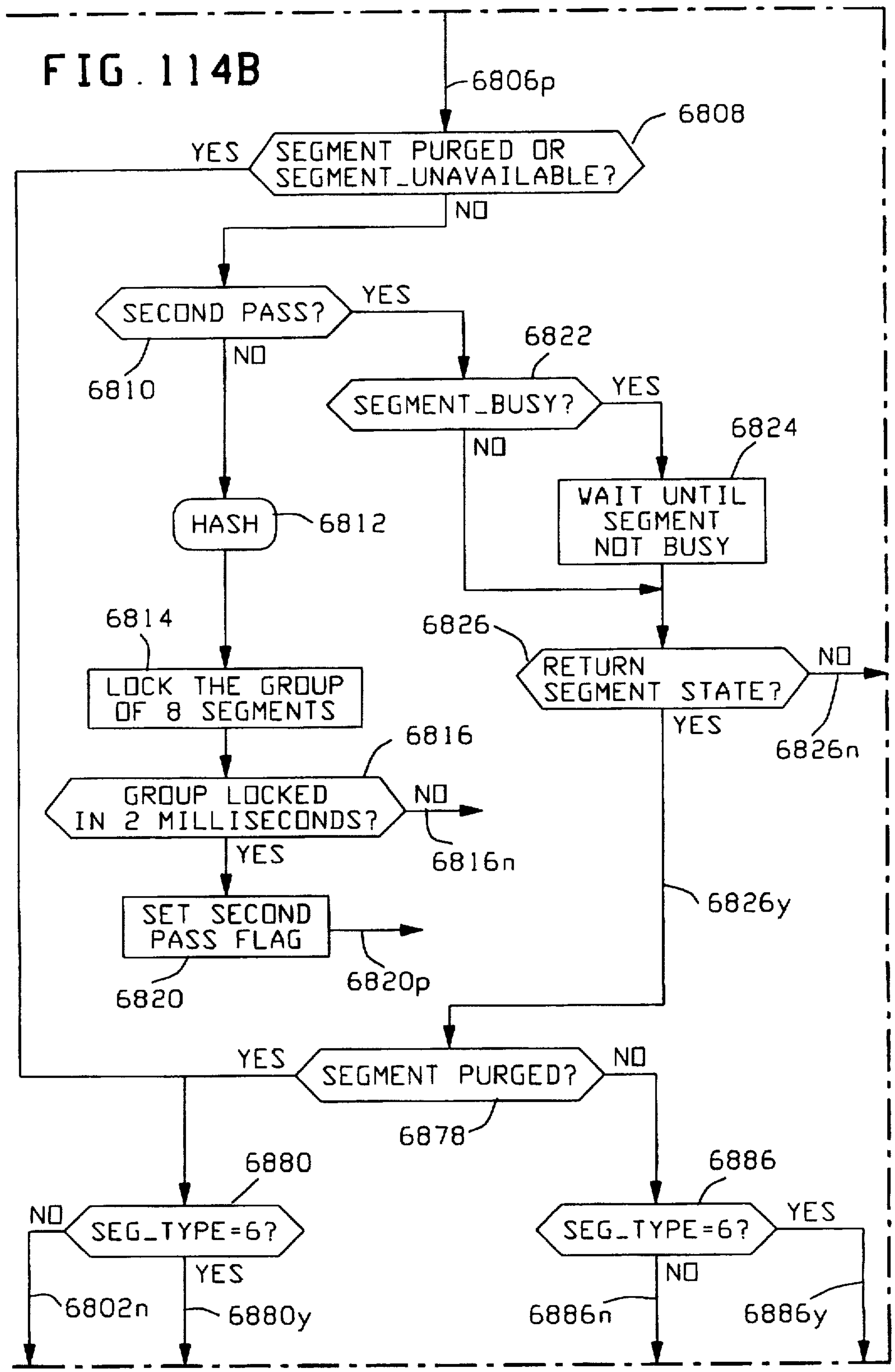
Figure 114C:
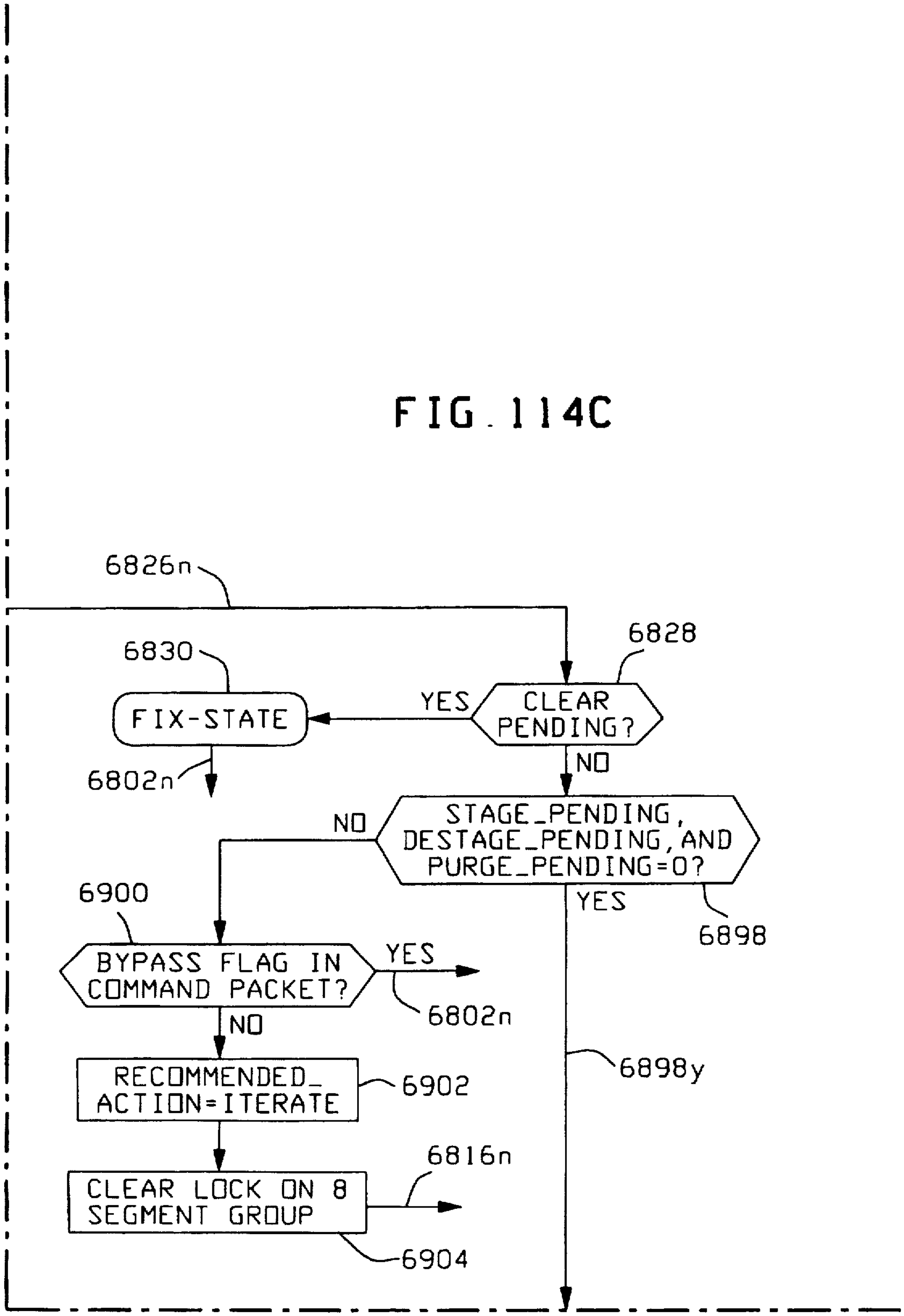
Figure 114D:
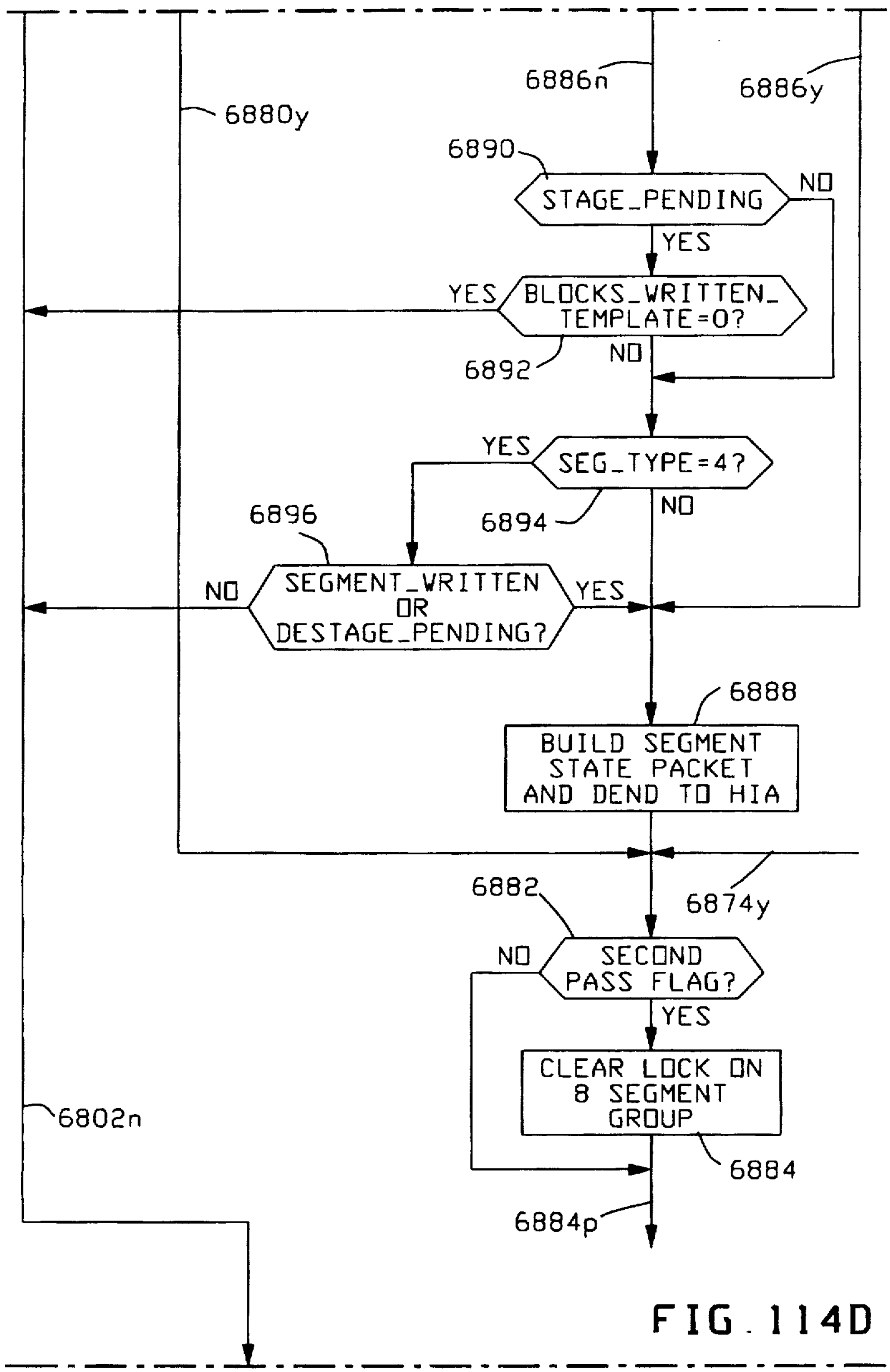
Figure 114E:
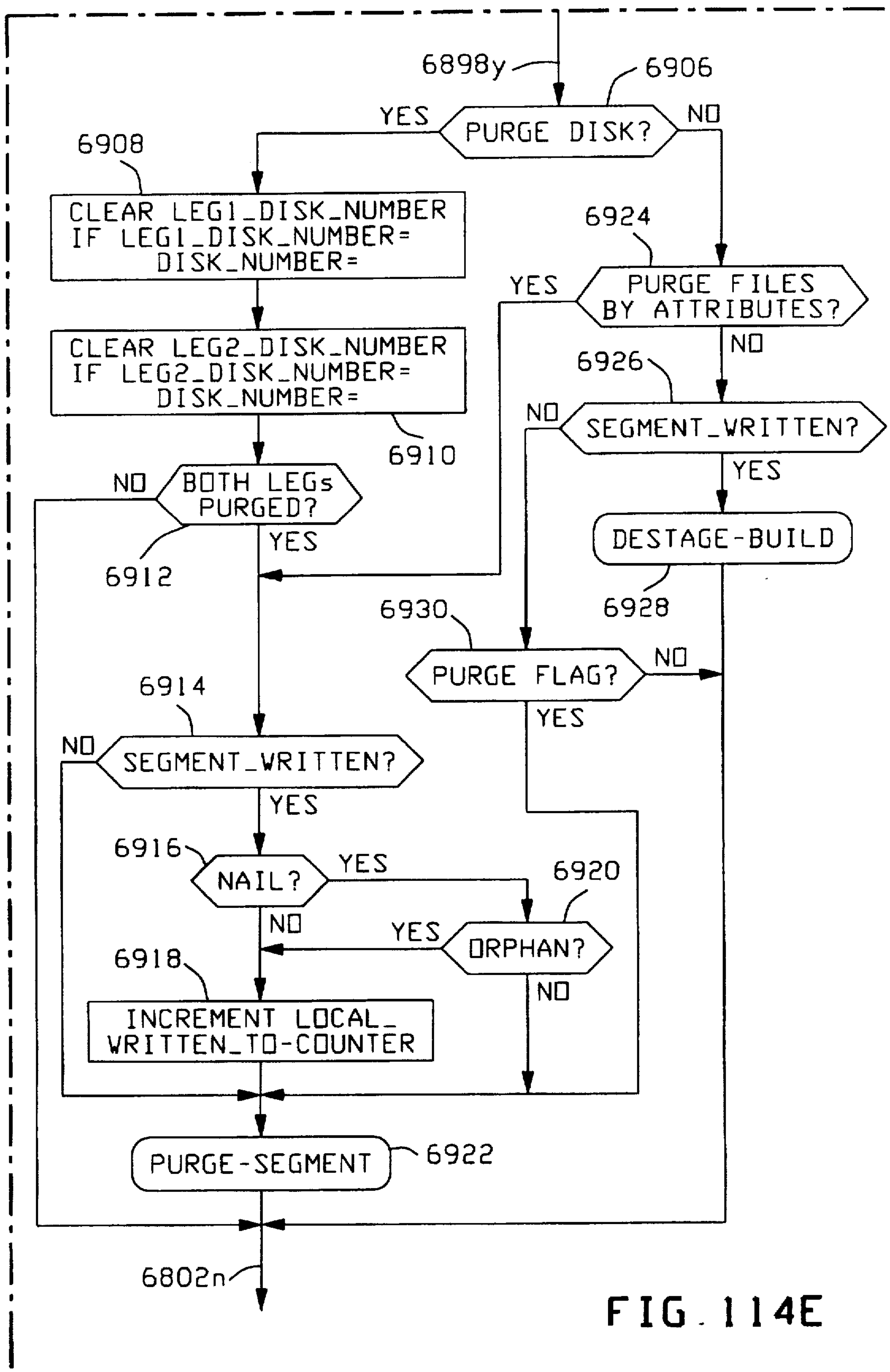
Figure 114F:
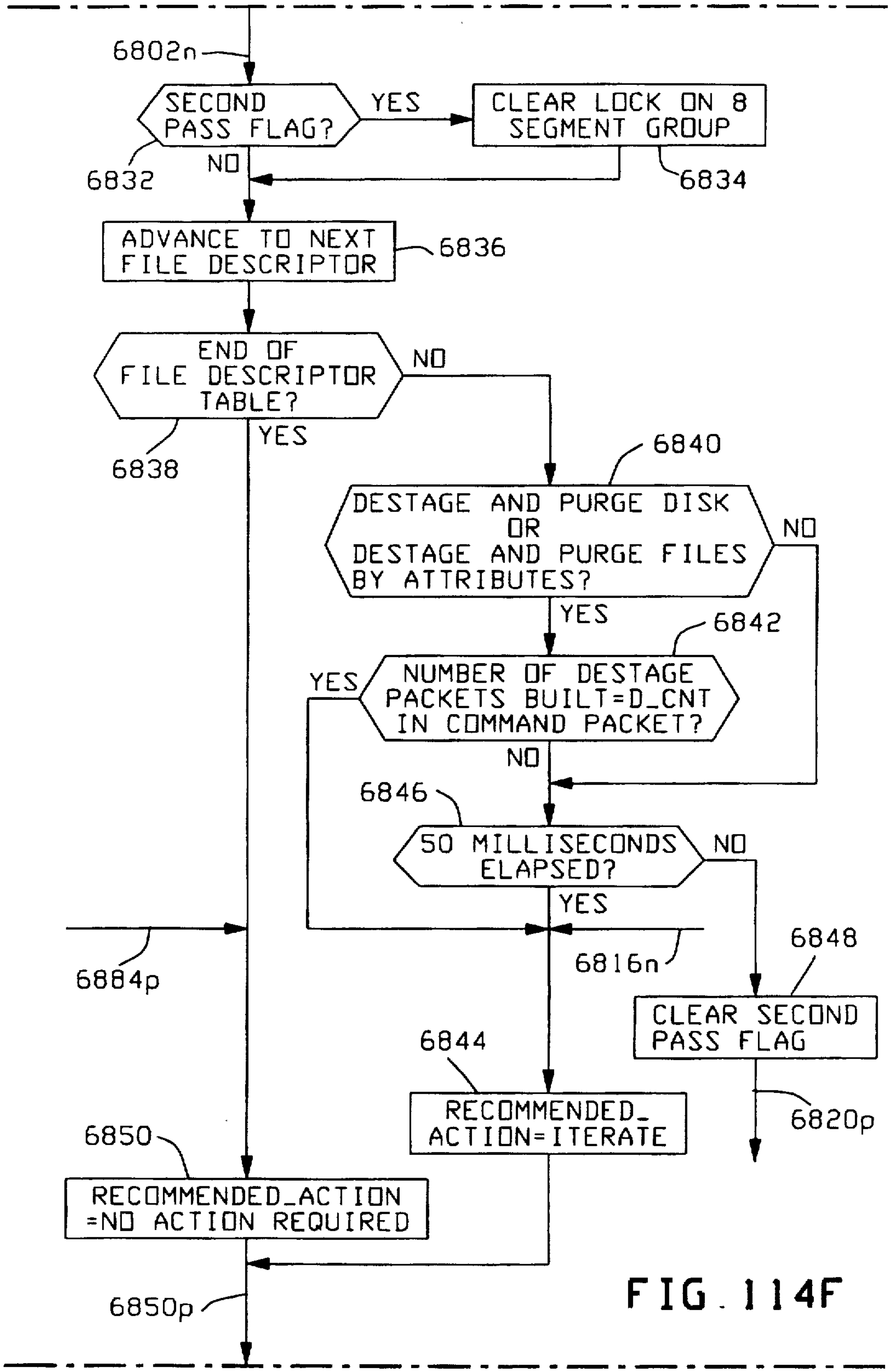
Figure 114G:
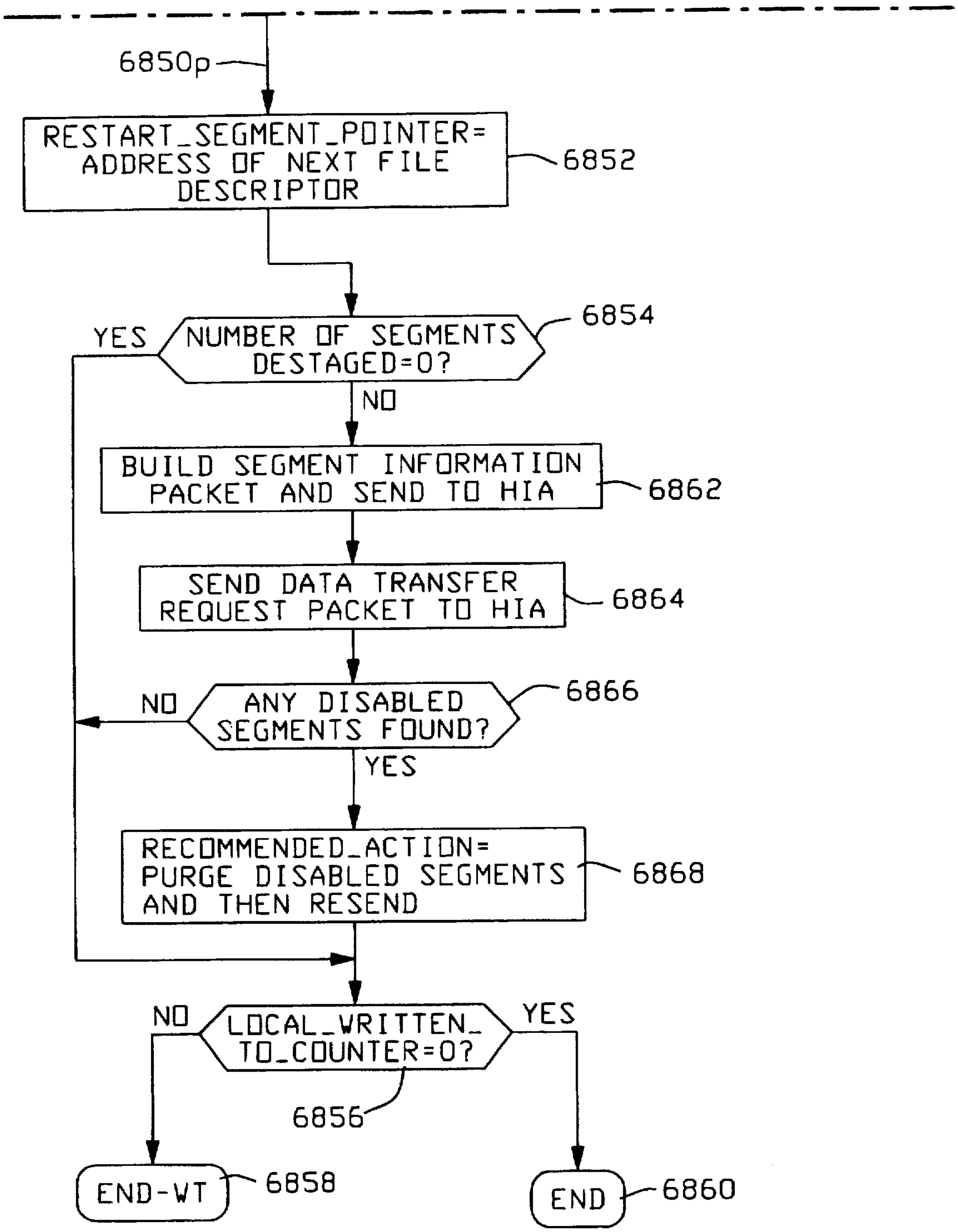

The discussion now turns to FIG. 114F where control Path **6802*n* directs control to decision Step 6832. Decision Step 6832 tests whether the this is the second iteration through the main processing loop for a selected segment. At this point, the lock on the group of eight segments can be cleared if the test is positive because the second iteration for the segment is complete. Step 6834** clears the lock.

Step 6836 advances the pointer to the next File Descriptor for the next iteration of the main processing loop. Decision Step 6838 tests whether the pointer has advanced beyond the end of the File Descriptor Table 506. If all segments in the Outboard File Cache 102 have not been processed, then control is directed to decision Step 6840. Decision Step 6840 tests whether the command is DESTAGE AND PURGE DISK or DESTAGE AND PURGE FILES BY ATTRIBUTES. If the command requires destaging segments and decision Step 6842 finds that the number of destage packets built is equal to the D_CNT specified in the Command Packet 1702, then control is directed to Step 6844 where the RECOMMENDED_ACTION is set to Iterate. If the command does not require destaging segments or if more destage packets can be built, then control is directed to decision Step 6846. Decision Step 6846 tests whether 50 milliseconds have elapsed since processing of the Command Packet began. If the allotted time has elapsed, then processing proceeds to Step 6844. Otherwise, the second pass flag is cleared at Step 6848 so that the first iteration of the main processing loop may be performed for the next File Descriptor. Control is then directed back to the beginning of the main processing loop via control path **6820*p***.

Once decision Step 6838 detects that all File Descriptors 508 have been processed, control is directed to Step 6850 where the RECOMMENDED_ACTION is set to No Action Required. If the allotted time has elapsed for the Command Packet as determined by decision Step 6846, the RECOMMENDED_ACTION Iterate is returned to the Host which sent the command so that the Outboard File Cache 102 can continue processing other commands. The address of the next File Descriptor is saved in the RESTART_SEGMENT_POINTER field in the Status Packet 460 and is used by Host in the CURRENT_SEGMENT_POINTER field in the next Command Packet when the RECOMMENDED_ACTION is equal to Iterate.

Decision Step 6854 tests whether any segments were identified to destage. If not, processing proceeds directly to decision Step 6856. If the GLOBAL_WRITTEN_TO_COUNT requires adjustment as a result of the PHYSICAL-SCAN processing, control is directed to Step 6858 where the END-WT routine is invoked to adjust the GLOBAL_WRITTEN_TO_COUNTER. Otherwise, the END processing is invoked at Step 6860.

If there were segments identified to destage, then control is directed to Step 6862. Step 6862 builds Segment Information Packets 1662 for each of the segments to be destaged. Each of the Segment Information Packets is sent to the Host Interface Adapter for including in the Status Packet 460 to be returned to the Host. Step 6864 sends a data transfer request to the Host Interface Adapter. The data transfer request identifies the segments in Non-volatile Storage 220 which are to be read and sent to the Host. Decision Step 6866 tests whether the Host Interface Adapter found any segment which it could not read. If no disabled segments were found, then control is followed to decision Step 6856 as discussed above. Otherwise, Step 6868 assigns the Purge Disabled Segments and then Resend RECOMMENDED_ACTION to the Status Packet. Processing then proceeds to decision Step 6856 as described above.

The discussion returns now to decision Step 6800 which tests whether the command is CLEAR PENDING. For non-CLEAR PENDING commands, control is directed to decision Step 6870. If the SEG_TYPE specified in the Command Packet 452 is equal to 6, or either the LEG1_DISK_NUMBER or LEG2_DISK_NUMBER in the File Descriptor 508 is equal to the corresponding field in the Command Packet, then processing proceeds to Step 6806 as discussed above. If the test fails, control is directed to Step 6832 via control Path **6802*n***.

If decision Step 6796 detects either the DESTAGE AND PURGE FILES BY ATTRIBUTES or the PURGE FILES BY ATTRIBUTES command, the first eight words of the File Descriptor are loaded as shown by Step 6872. Decision Step 6874 checks whether the SEGMENT_UNAVAILABLE flag in the File Descriptor 508 is set. If the flag is not set, control is directed to decision Step 6876 where the Command Packet FILE_IDENTIFIER is compared with the File Descriptor FILE_IDENTIFIER after applying the ATTRIBUTES_MASK in the Command Packet to the File Descriptor. If the values are equal, then processing proceeds to decision Step 6808 as discussed above. If the FILE_IDENTIFIERs are not equal, control is directed to Step 6832 as discussed above.

The particular processing for a RETURN SEGMENT STATE command begins at decision Step 6826 where the command is detected. Decision Step 6878 checks whether the segment has been purged by testing whether the FILE_IDENTIFIER in the File Descriptor 508 is equal to zero. If the segment has been purged and decision Step 6880 finds that the SEG_TYPE in the Command Packet is not equal to 6, then control is directed to Step 6832 as discussed above. If the SEG_TYPE is equal to 6, then processing proceeds to decision Step 6882. If decision Step 6882 finds that it is the second pass through the processing loop for the current segment, then Step 6884 clears the lock on the group of eight segments of which the current segment is a part. Control is then directed to Step 6850 as discussed above.

If decision Step 6878 finds that the segment has not been purged, and decision Step 6886 finds that the SEG_TYPE in the Command Packet 453 is equal to 6, then control is directed to Step 6888. Step 6888 builds a Segment State Packet 2110 and sends it to the Host Interface Adapter 214. The Host Interface Adapter returns a group of Segment State Packets to the Host 10 in the RETURN SEGMENT STATE Status Packet 2108. Processing continues at Step 6882 as discussed above.

Decision Step 6886 directs control to decision Step 6890 if the SEG_TYPE in the Command Packet is other than 6. If the state of the segment is STAGE_PENDING and decision Step 6892 finds that none of the blocks in the segment have been written, processing is directed to Step 6832 as discussed above. If the segment state is other than STAGE_PENDING or some of the blocks in the segment are valid, then control is directed to decision Step 6894. If the SEG_TYPE is not equal to 4, then processing proceeds to Step 6888 as discussed above. Otherwise, control is directed to decision Step 6896. Control is directed to Step 6832 if decision Step 6896 finds that the segment has neither been written nor its state is DESTAGE_PENDING. For the case where either the segment has been written or is in a DESTAGE_PENDING state, control is directed to Step 6888 as discussed above.

For the DESTAGE and PURGE commands decision Step 6828 directs control to decision Step 6898. If the segment state is STAGE_PENDING, DESTAGE_PENDING, or PURGE_PENDING, control is directed to decision Step 6900. If the Bypass flag in the Command Packet 1760 indicates that segments in a PENDING state are to be bypassed, then control is directed to Step 6732 as discussed above. Otherwise, Step 6902 sets the RECOMMENDED_ACTION in the Status Packet 460 to Iterate, Step 6904 clears the lock on the group of eight segments of which the current segment is a part, and control is directed to Step 6744 as discussed above.

If decision Step 6898 finds that the segment is not in a PENDING state, control is directed to decision Step 6906. Processing proceeds to Step 6908 if decision Step 6806 detects a PURGE DISK command. Step 6908 clears the LEG1_DISK_NUMBER in the File Descriptor 508 if it is equal to the DISK_NUMBER specified in the PURGE DISK Command Packet 1802. Similarly, Step 6910 clears the LEG2_DISK_NUMBER in the File Descriptor 508 if it is equal to the DISK_NUMBER specified in the PURGE DISK Command Packet. If both disk legs have been purged, i.e., LEG1_DISK_NUMBER=LEG2_DISK_NUMBER=0, then the PURGE processing must be performed and the GLOBAL_WRITTEN_TO_COUNTER may require adjustment. Decision Step 6914 tests whether the SEGMENT_WRITTEN flag in the File Descriptor is set. If the segment has been written and decision Step 6916 finds that the segment is not a Nailed segment, Step 6918 increments the LOCAL_WRITTEN_TO_COUNTER which is later subtracted from the GLOBAL_WRITTEN_TO_COUNTER. If the segment is a Nailed segment and decision Step 6920 finds that the File Descriptor indicates that the segment is an Orphan, Step 6918 increments the LOCAL_WRITTEN_TO_COUNTER. If the Nailed segment is not an Orphan or if the segment was not written, control proceeds to Step 6922 which invokes PURGE processing to clean up HASH_LINKs and clear the File Descriptor. Processing then continues at Step 6832 as discussed above.

If decision Step 6906 finds that the command is other than PURGE DISK and decision Step 6924 determines that the command is PURGE FILES BY ATTRIBUTES, then control is directed to decision Step 6914 as discussed above. If decision Step 6924 fails (the command is DESTAGE AND PURGE DISK or DESTAGE AND PURGE FILES BY ATTRIBUTES), processing proceeds to Step 6926 to determine whether the segment has been written. If the SEGMENT_WRITTEN flag is set, then Step 6928 is invoked to build a Destage Request Packet 1606. If the segment has not been written, then decision Step 6930 tests whether the Purge flag (see the DESTAGE AND PURGE FILES BY ATTRIBUTES Command Packet 1760) in the Command Packet is set. If the Purge flag is set, processing proceeds to Step 6922 as discussed above. Otherwise, control is directed to Step 6832.

FIG. 115 illustrates the flowchart for SEARCH processing. The SEARCH processing entails traversing the HASH_LINKs in the File Descriptor Table 506 in search of the requested segment. When this processing is invoked, the FILE_IDENTIFIER in the Command Packet 452 has been hashed to an entry in the Hash Table 6000. The predetermined entry is the point at which the search begins.

If decision Step 6952 finds that the entry in the Hash Table is equal to 0, then there requested segment is not in the Outboard File Cache and control is directed to Step 6954 where the Hit flag is cleared to signal a miss condition. Processing control is then returned to the point at which the SEARCH processing was invoked.

Decision Step 6952 directs control to decision Step 6956 if the Hash Table 6000 entry is non-zero. Decision Step 6956 tests whether the FILE_IDENTIFIER in the Command Packet 452 is equal to the FILE_IDENTIFIER in the File Descriptor 508 to which the Hash Table entry points. If the FILE_IDENTIFIERS match, then decision Step 6958 tests whether the FILE_RELATIVE_SEGMENT_OFFSETs also match. If the FILE_RELATIVE_SEGMENT_OFFSET are equal, then the requested segment has been located and Step 6960 sets the Hit flag to indicate as such. Control is then returned to the point at which the SEARCH processing was invoked.

If the FILE_RELATIVE_SEGMENT_OFFSETS are not equal, then control is directed to decision Step 6962 to begin traversal of the HASH_LINKs. If the HASH_LINK in the current File Descriptor 508 is equal to 0, then the end of the HASH_LINKs has been encountered and control is directed to Step 6954 as discussed above. If the HASH_LINK is non-zero, then control is directed to decision Step 6964. Decision Step 6964 tests whether the FILE_RELATIVE_SEGMENT_OFFSET in the File Descriptor is greater than the FILE_RELATIVE_SEGMENT_OFFSET in the Command Packet. Because the File Descriptors are inserted in the HASH_LINKS in order of ascending FILE_RELATIVE_SEGMENT_OFFSETs, a miss condition can be detected once the FILE_RELATIVE_SEGMENT_OFFSET in the File Descriptor exceeds that of the Command Packet. If the test of decision Step 6964 is positive, control is directed to Step 6954 as discussed above. Otherwise, processing proceeds to Step 6966 which retrieves the File Descriptor referenced by the HASH_LINK in the current File Descriptor. The retrieved File Descriptor then becomes the current File Descriptor for the next iteration of the processing loop. Processing of the next (now current) File Descriptor continues at Step 6956 as discussed above.

FIGS. 116A, 116B, and 116C contain a flowchart of the processing performed when access to a segment is requested and the segment is not present in the Outboard File Cache. The MISS processing performs the preprocessing required for allocating a segment in File Space 502.

Special processing is required for allocating Resident File Space 524, therefore, decision Step 6972 tests whether the Resident File flag (XF) in the Command Packet 1600 is set. The typical scenario is a request for access to a non-resident file, so that case will be discussed first. If the Resident File flag is not set, processing proceeds to decision Step 6974. Decision Step 6974 tests a flag which was set when a segment for which access had been requested had no blocks present in Cache File Space 522. That is, a segment that was not a hit was previously encountered. Note that a partial miss exists when a segment exists but has some blocks missing. Processing Steps 6972 through 6980 are performed only the first time that MISS processing is performed for a group of segments specified in a Command Packet. If this is the first time that MISS has been invoked from READ-WRITE processing (decision Step 6974 fails), then SPECULATE-DECISION processing is invoked at Step 6876. SPECULATE-DECISION processing determines whether it is appropriate to speculatively reserve segments in Cache File Space 522. That is should the segments be allocated before they are explicitly referenced in a Command Packet. Decision Step 6978 tests whether the command is WRITE or WRITE OFF BLOCK BOUNDARY. The SURGE-TEST processing is invoked at Step 6980 to test whether a single file from monopolizing the available Cache File Space. Control is followed to Step 6982 to set the local prior-miss and full-miss flags. Processing then proceeds to decision Step 6984.

Decision Step 6984 tests the number of Reserved segments. The number of Reserved segments is the number of segments which have been reserved by the Index Processor 236. Each IXP performs its own pre-allocation of segments while waiting for a command to process to save having to allocate a segment in the midst of command processing. Identification of the segments which have been reserved is provided by maintaining a list of File Descriptors associated with the respective segments. If there is at least one segment which has been reserved, control is directed to Step 6986 where the number of Reserved segments is decremented and a File Descriptor 508 is removed from the list of reserved File Descriptors.

Decision Step 6988 tests whether the reserved segment has not been assigned to a different IXP. If the test fails, control returns to Step 6984 as discussed above. Otherwise, processing proceeds to Step 6990. If the temporary-sequential-flag was set in SPECULATE-DECISION processing, then the SEQUENTIAL_SEGMENT flag in the File Descriptor 508 is set to indicate that the logical segment preceding the current segment is present in the Outboard File Cache 102. Step 6992 sets the ALLOCATE_WRITE_MISS flag in the File Descriptor if the command is either WRITE or WRITE OFF BLOCK BOUNDARY. If the Residency Required (RR) flag in the Command Packet 1600 is set, then the RESIDENT_FILE, NAIL, ORPHAN flags in the File Descriptor are set and a temporary orphan flag is set for use in MISS-B processing. Step 6996 clears the LEG1_DISK_NUMBER and LEG2_DISK_NUMBER in the File Descriptor and RELINK processing is invoked at Step 6998. RELINK processing links the File Descriptor into a hash list referenced by the Hash Table 6000. MISSB processing is invoked at Step 7000.

If decision Step 6984 finds that there are no reserved segments, then a segment in the cache must be allocated for the request and control is directed to Step 7002. Step 7002 requests a lock on the pointers and variables used in the cache replacement algorithm so that the requesting IXP 236 may gain exclusive access to the pointers and variables. The lock is required because there may be multiple IXPs simultaneously seeking allocation of a segment. The REUSE processing is invoked at Step 7004 to select a segment for allocation. The File Descriptor associated with the selected segment is removed from the hash list by the DELINK processing of Step 7006. Steps 7008, 7010, 7012, 7014, and 7016 are respectively the same as Steps 6990–6992 which have been described above.

If the segment from Step 7004 was not a purged segment (its FILE_IDENTIFIER is not equal to 0), then decision Step 7018 directs control to Step 7020. Step 7020 clears the lock held on the eight segment group which is under examination for cache replacement. If a lock was granted for the pointers and variables used for cache replacement, then control is directed to Step 7000. Otherwise, Step 7024 sets the NEW flag in the File Descriptor so that the segment will not be allocated during cache replacement until the REPLACEMENT CANDIDATE pointer cycles around the File Descriptor Table 506. As is made apparent in the RE-USE processing, an IXP 236 need not have obtained a lock on the cache replacement pointers and variables in order to allocate a segment. If the replacement pointers are already in use by a first IXP, a second IXP may allocate a segment which is ahead of the REPLACEMENT CANDIDATE pointer, and for this reason, the NEW bit is set to ensure that the segment allocated by the second IXP will not be reallocated until the REPLACEMENT CANDIDATE pointer cycles through the File Descriptor Table.

If decision Step 6972 finds that the Resident File (XF) flag in the Command Packet 1600 is set, then Step requests a lock used for exclusive access to the variables used in processing Resident File Space 524. Decision Step 7028 tests whether the lock was granted. If not, decision Step 7030 tests whether 50 millisecond has elapsed since processing of the current command began. When 50 milliseconds have elapsed and no lock has been granted, control is directed to decision Step 6974 as discussed above.

Once a lock is granted, decision Step 7032 tests whether there are any segments available on the list of free segments (segments available for allocation) for resident files. If there are no free segments remaining and decision Step 7034 finds that Resident File Space 524 usage is at its maximum, Step 7036 releases the lock held on the variables used in managing Resident File Space. If there are segments remaining on the list of segments available for resident files or usage of Resident File Space is not at its maximum, then Step 7038 invokes GET-RESIDENT-FILE processing to allocate a segment for Resident File Space.

Step 7040 sets the NAIL and RESIDENT_FILE flags and clears LEG1_DISK_NUMBER and LEG2_DISK_NUMBER in the allocated File Descriptor. RELINK processing is invoked at Step 7042 to link the File Descriptor into the Hash Table 6000, and MISS-B processing is invoked at Step 7044.

FIGS. 117A and 117B contain a flowchart of the processing performed upon invocation of the MISS-B and SPECULATE-HIT-1 processing. Step 7046 sets the bit in the SEGMENT_MISS_TEMPLATE in the Status Packet 1604 which corresponds to the current segment in process. Decision Step 7048 tests whether all segments requested in the Command Packet 1600 have been processed by comparing the count of the number of segments processed against the SEG_CNT in the Command Packet 1600. If there are segments still to be processed, then control is directed to Step 7050 via control Path 7048*n*. Step 7050 invokes LOOP-CODE to prepare for processing the next segment requested in the Command Packet. Step 7052 then returns control to the beginning of READ-WRITE processing.

If there are more segments to process, control is directed to decision Step 7054 which test for the WRITE and WRITE OFF BLOCK BOUNDARY commands. For the WRITE commands, control Path 7054*y* is followed to decision Step 7056 where the Residency Required (RR) flag in the Command Packet 2132. If residency is required for the segments, the RECOMMENDED_ACTION in the Status Packet 460 is set to Rescan File at Step 7058 and MISS-END processing is invoked at Step 7060. If the segment is not required to be resident and decision Step 7062 finds that the Temporary orphan flag is not set, then Step 7064 sets the RECOMMENDED_ACTION in the Status Packet to Stage Data. Decision Step 7066 makes one final check as to whether a segment in process is referenced in a LOCK command. If the segment in process is covered by either an entry in the File Lock Descriptor Table 6502 or the Attribute Lock Descriptor Table 6504, control is directed to Step 7067 where the RECOMMENDED_ACTION is set to Resend and Step 7068 invokes END processing. Otherwise, control is directed to Step 7060 as described above. If the Temporary orphan flag is set, then decision Step 7062 directs control to Step 7069 where the RECOMMENDED_ACTION is set to Stage Data and Log No Resident File Space Condition. Processing then proceeds to Step 7066 as discussed above.

For a READ command, decision Step 7054 directs control to decision Step 7070. If the Temporary sequential flag is not set, and decision Step 7071 finds that the Force Speculation (FS) in the Command Packet 1600 is not set, control proceeds along Path 7054*y* as discussed above. Control is directed to Step 7072 to read the Speculation Count (SC) and set the Temporary sequential flag if Force Speculation is requested. On the next invocation of MISS-B from the READ-WRITE, decision Step 7068 directs control to decision Step 7074.

Decision Step 7074 tests whether either the Residency Required flag (RR) or the Resident File flag (XF) is set. If either flag is set, control is directed to Path 7054*y* as discussed above. Otherwise, control is directed to decision Step 7076 to test whether the total number of segments written in Cache File Space 522 is greater than 75% of the total number of segments available in Cache File Space. Once this maximum is exceeded, processing proceeds to Path 7054*y* as discussed above. If the maximum has not been reached, decision Step 7078 compares the Speculation Count (SC) in the Command Packet 1600 to the number of segments which have been speculatively allocated at this point in the processing. If the number of segments requested Speculation Count have been speculatively allocated, then control proceeds to Path 7054*y* as discussed above. Otherwise, control is directed to decision Step 7080.

If the current segment in process is not the last segment in its group of eight segments, decision Step 7080 directs processing to Step 7082 where the local prefetch mode flag is set and the count of the number of segments speculatively allocated is incremented. Step 7050 is executed as described above. If the current segment in process is the last segment in its group of eight Hash Table 6000 entries, decision Step 7084 tests whether the segment has been referenced in a LOCK command. If the segment is locked (as indicated by the File Lock Descriptor Table 6502 or the Attribute Lock Descriptor Table 6504), Step 7085 sets the RECOMMENDED_ACTION to Resend and END processing is invoked at Step 7086.

If decision Step 7084 finds that the segment has not been locked, then Step 7087 requests a lock for exclusive use of the next group of eight segments. If the requested lock has not been granted, decision Step 7088 directs control to decision Step 7090 to test whether 8 milliseconds have elapsed since the lock on the next group of eight segments was requested. If 8 milliseconds have elapsed, then processing proceeds to Step 7064 as discussed above. Otherwise, Step 7092 suspends processing for 10 microseconds and returns control to Step 7086. Once the lock has been granted, Step 7094 clears the lock held on the previous group of eight segments and processing proceeds to Step 7082 as described above.

FIG. 118 contains a flowchart of the MISS-END processing. Step 7096 stores the SEGMENT_MISS_TEMPLATE and the number of the segments which were speculatively allocated in the Status Packet 460. If the Command Chain flag (CCF) in the Command Packet 452 is set, then control is directed to Step 7098 where the END processing is invoked.

If the Command Chain flag is not set, Step 7100 requests a lock on the pointers used in selecting one or more segments to destage. If the lock is not granted immediately, decision Step 7102 directs control to decision Step 7106. Otherwise, Step 7104 invokes DESTAGE-CHECK processing to select one or more segments to request that the Host 10 destage. Decision Step 7106 tests whether the command is WRITE or WRITE OFF BLOCK BOUNDARY. For a READ command, control is directed to Step 7098. For the WRITE commands, decision Step 7108 checks whether there are any destage requests in the Status Packet. If there are destage requests in the Status Packet, then processing proceeds to END processing. If there are no Destage Request Packets, then SURGE-TEST is invoked at Step 7110 to determine whether a file is surging and add Destage Request Packets to the Status Packet.

FIG. 119 contains a flowchart of the MISS-BA processing. Step 7114 stores the HOST_ID and PROGRAM_ID from the Command Packet 452 in the File Descriptor 508. Step 7116 sets the STAGE_PENDING flag and stores the PATH_ID and IXP_NUMBER in the File Descriptor. MISS-B is invoked at Step 7118.

FIGS. 120A, 120B, 120C, and 120D contain a flowchart of FLAGS processing which tests the flags in the File Descriptor when a segment hit occurs. Step 7202 tests the SEGMENT_BUSY flag in the File Descriptor 508 and suspends processing until the segment is no longer busy. If all the blocks in the segment have been staged or written, decision Step 7204 directs control to decision Step 7206. If decision Steps 7206 and 7208 respectively find that the segment state is neither PURGE_PENDING nor STAGE_PENDING, control is directed to decision Step 7210.

If the STICKING_MASTER flag in the File Descriptor 508 is set, Step 7212 sets the STICKING_SLAVE flag in the File Descriptor so that the segment will not be considered for cache replacement for two round robin cycles. Decision Step 7214 directs control to Step 7216 to return control to the processing from which FLAGS was invoked if the segment in process was not allocated speculatively as indicated by the SPECULATIVE flag in the File Descriptor. Control is directed to decision Step 7218 if the segment was speculatively allocated. If the segment is speculative and is a nailed segment, control is returned to the processing from which FLAGS was invoked. Otherwise, Step 7220 clears the SPECULATIVE flag in the File Descriptor and increments the count of segments speculated in processing this command. Control is then returned as discussed above.

Decision Step 7208 directs control to Step 7222 if the segment state is STAGE_PENDING and all blocks in the segment have been written. Step 7222 sets the RECOMMENDED_ACTION in the Status Packet 460 to Resend. If the current segment is the first segment requested in the Command Packet 452 which resulted in a miss, decision Step 7224 directs control to Step 7226. Step 7226 invokes END-ERR processing to return the status to the Host 10. Control is directed to decision Step 7228 if a prior segment resulted in a miss.

If processing is in speculative mode as determined during SPECULATE-DECISION processing, then decision Step 7228 directs control to Step 7230 to set the RECOMMENDED_ACTION in the Status Packet 460 to Stage Data. Step 7232 invokes MISS-END processing to gather destage requests and return a status to the Host 10. Decision Step 7228 directs control to decision Step 7234 if the processing is not in speculative mode. If decision Step 7234 finds that the Command Packet 452 indicates that the segment is required to be resident in cache space before this command arrived, control is directed to Step 7226 as discussed above. If the segment is not required to be previously resident, then Step 7236 invokes CLEAR-STAGE-PENDING processing to clear the STAGE_PENDING segment state for the segments which were made STAGE_PENDING by the present command.

Decision Step 7206 directs control to decision Step 7238 if the state of the segment in process is PURGE_PENDING. If the command is READ, decision Step 7238 directs control to decision Step 7208 as discussed above. Otherwise, processing proceeds to Step 7222 as previously described.

Special processing is required when the segment in process results in a hit and not all of the blocks of the segment have been written. Decision Step 7204 directs control to decision Step 7240 if the TOTAL_SEGMENT_VALID flag in the File Descriptor 508 is not set. If the segment in process has not been purged, its SEGMENT FLAGS will not have been cleared and control is directed to decision Step 7242. Control is directed to Step 7244 if the command is other than READ and the backpanel identifier of the backpanel in which the backup File Descriptor Table 506 is stored is provided to the HIA 214.

If the command is WRITE, decision Step 7246 fails and control is directed to decision Step 7206 as described above. Control is directed to Step 7248 for a WRITE OFF BLOCK BOUNDARY COMMAND. Step 7248 indicates to the HIA 214 that the command is WRITE OFF BLOCK BOUNDARY and processing proceeds to decision Step 7250 to test the state of the segment. If the segment state is STAGE_PENDING, control is directed to Step 7222 as discussed above. Otherwise, decision Step 7252 tests the PURGE_PENDING flag in the File Descriptor 508. If the segment is PURGE_PENDING, processing proceeds to Step 7222 as described above.

If decision Step 7242 detects that the command is a READ, or the command is WRITE OFF BLOCK BOUNDARY and the segment is neither STAGE_PENDING nor PURGE_PENDING, control is directed to decision Step 7256. If the segment in process contains either the first or last block requested and the block has been written or staged, decision Step 7256 directs control to Step 7210 as described above. If the first or last block has not been written or staged, the segment must be staged and control is directed to decision Step 7258.

If the Command Packet 452 indicates that the segment must have been resident in cache prior to this command, Step 7260 invokes MISSB processing. If the Residency Required (RR) flag is not set and decision Step 7262 finds the state of the segment is neither STAGE_PENDING, DESTAGE_PENDING, nor PURGE_PENDING, MISSBA processing is invoked at Step 7264. Processing proceeds to Step 7222 if the segment is in a PENDING state.

Decision Step 7240 directs control to decision Step 7266 if the segment in process has been purged. If the command is a WRITE or WRITE OFF BLOCK BOUNDARY and the data to be written for the segment in process all falls a block boundary, decision Step 7266 directs control to decision Step 7268. Decision Step 7268 tests whether the Full Miss flag has been set. If the flag has not yet been set, then Step 7270 invokes SURGE-TEST processing to check whether the file to which the requested segments belong is surging, and Step 7271 sets the Full Miss flag. Processing then proceeds to Step 7258 as described above. If the write does not fall on block boundary or a full segment miss has not yet been encountered, decision Steps 7266 and 7268 respectively direct control to Step 7258.

FIG. 121 contains a flowchart of CLEAR-STAGE-PENDING processing which clears the STAGE_PENDING state for segments which have been placed in a STAGE_PENDING as a result of processing a READ, WRITE, or WRITE OFF BLOCK BOUNDARY command. Processing begins with the original parameters as set forth in the Command Packet 452. The parameters in the Command Packet are hashed to an entry in the Hash Table 6000 by invoking HASH processing at Step 7304. Step 7306 reads the File Descriptor 508 referenced by the entry in the Hash Table. SEARCH is invoked at Step 7308 to find the specific File Descriptor in its hash list. The count of segments processed is decremented at Step 7310.

If the state of the segment is STAGE_PENDING, decision Step 7312 directs control to decision Step 7314. Decision Step 7314 compares the HOST_ID and PROGRAM_ID in the Command Packet 452 to the HOST_ID and PROGRAM_ID in the File Descriptor 508. Control is directed to decision Step 7316 if the fields match. Decision Step 7316 tests whether any blocks in the segment have been written. If none of the blocks in the segment have been written, the BLOCKS_WRITTEN_TEMPLATE will equal zero and control is directed to Step 7318 where the STAGE_PENDING state of the File Descriptor is cleared. Decision Step 7320 tests whether all segments which were placed in a STAGE_PENDING state have been restored. If all segments have been restored, control is returned to the processing from which CLEAR-STAGE-PENDING was invoked. Otherwise, control is directed to Step 7322 to prepare for processing the next segment. Step 7322 increments the index into the Hash Table 6000, increments the file relative segment offset, and reads the File Descriptor referenced by the updated index into the Hash Table. Control is returned to Step 7308 at the top of the processing loop.

If the HOST_ID and PROGRAM_ID of the Command Packet 452 match the File Descriptor and none of the blocks in the segment have been written, decision Step 7316 directs control to decision Step 7324. Decision Step 7324 tests whether both the LEG1_DISK_NUMBER and LEG2_DISK_NUMBER in the File Descriptor are equal to zero. If so, Step 7326 invokes PURGE-SEGMENT to purge the segment and control is thereafter directed to Step 7320 as discussed above. If decision Step 7324 finds that either the LEG1_DISK_NUMBER or LEG2_DISK_NUMBER are not equal to zero, control is directed to Step 7318.

Control is directed to decision Step 7320 by decision Step 7312 if the segment in process is not in a STAGE_PENDING state.

FIG. 122 contains a flowchart of the processing performed for both FIX-STATE and FIX-STATE-1. The FIX-STATE processing clears the segment state in a File Descriptor 508 in processing a CLEAR PENDING command. Step 7332 loads the first eight words of the current File Descriptor. If the PROGRAM_ID and HOST_ID in the File Descriptor do not match those in the Command Packet, then decision Step 7334 directs control to return to the processing from which FIX-STATE was invoked. Otherwise, control is followed to decision Step 7336 to test whether the segment state is STAGE_PENDING. If the state is STAGE_PENDING, and if decision Step 7338 finds that no blocks in the segment have been written, then Step 7340 clears all flags except the NAIL and RESIDENT_FILE flags (IS THIS BECAUSE THESE ARE USED TO DESIGNATE THAT THIS PARTICULAR SEGMENT IS PART OF RESIDENT FILE SPACE OR NAIL SPACE?). Step 7342 invokes the PURGE-SEGMENT processing to clear the other fields in the File Descriptor and control returns to the processing from which FIX-STATE was invoked.

If the segment state is not STAGE_PENDING and instead is DESTAGE PENDING, then decision Step 7344 directs control to Step 7346 to set the SEGMENT_WRITTEN flag because the destage operation was canceled. Step 7348 clears any other PENDING flags in the File Descriptor. If the DESTAGE_REPORTED flag is also set, decision Step 7350 directs control to Step 7352 where the same flag is cleared. Control is then returned to the processing from which the FIX-STATE processing was invoked.

Decision Step 7344 directs control to decision Step 7354 if the segment state is not DESTAGE_PENDING. If the segment state is PURGE_PENDING, processing proceeds to Step 7346 as described above. Otherwise, control is directed to decision Step 7350.

FIG. 123 contains a flowchart of the HASH function. The HASH function manipulates the contents of the FILE_IDENTIFIER in a Command Packet 452 to produce an index (HASH_WORD) into the Hash Table 6000. Bits 0–15 of the HASH_WORD are obtained by adding: bits 0–15 of word 0 of the FILE_IDENTIFIER 1602, bits 16–31 of word 0 of the FILE_IDENTIFIER, bits 0–15 of word 1 of the FILE_IDENTIFIER, bits 16–31 of word 1 of the FILE_IDENTIFIER, and bits 11–26 of the FILE_RELATIVE_SEGMENT_OFFSET. Bits 16–20 of the HASH_WORD are the same as the last four bits of the FILE_RELATIVE_SEGMENT_OFFSET.

FIGS. 124A, 124B, 124C, 124D, 124E, and 124F contain a flowchart of REUSE processing which selects a segment in the cache for allocation. REUSE processing steps through the File Descriptor Table 506 searching for an appropriate segment to which to stage data. Decision Step 7362 tests whether a lock was granted on the pointers and variables used by the cache replacement method embodied herein. Because there may be multiple IXPs 214 simultaneously seeking allocation of a segment, while one of the IXPs is manipulating the global cache replacement pointers, the other IXPs are excluded from adjusting the global pointers. However, to enhance system performance, if one of the IXPs has a lock on the cache replacement pointers, the other IXPs are allowed to jump ahead of the REPLACEMENT CANDIDATE segment held by the one IXP to examine other segments for possible allocation.

Decision Step 7632 tests whether a lock was granted on the cache replacement pointers. If some other IXP 214 already has locked the pointers, control is directed to Step 7364. The IXP which was denied the lock jumps 128 segments ahead in the File Descriptor Table 506 by adding 128 to the REPLACEMENT CANDIDATE. If the REPLACEMENT CANDIDATE points to the last File Descriptor 508 in the File Descriptor Table, decision Step 7366 directs control to Step 7368 where the REPLACEMENT CANDIDATE is returned to the beginning of the File Descriptor Table.

Processing proceeds to Step 7370 after the REPLACEMENT CANDIDATE has been adjusted as required. Step 7370 increments the cache replacement pointers. The incremented cache replacement pointers include the CURRENT REPLACEMENT CANDIDATE, RECENTLY USED ZONE, LOWER BOUND, and UPPER BOUND pointers.

The processing tests to determine whether to adjust the cache replacement pointers are only performed if the REPLACEMENT CANDIDATE segment falls on a 64 segment boundary to benefit processing performance. This is allowed because the available Cache File Space is a multiple of 64 segments. Those skilled in the art will recognize that greater and lesser multiples could be used as required by the particular implementation. When the REPLACEMENT CANDIDATE is not a segment which falls on a 64 segment boundary, decision Step 7372 directs control to decision Step 7374.

Decision Step 7374 performs a test to determine whether the REPLACEMENT CANDIDATE segment should be allocated. If none of the following flags are set: SEGMENT_WRITTEN, SEGMENT_BUSY, STAGE_PENDING, PURGE_PENDING, DESTAGE_PENDING, BAD, or PRE-USE, the segment may be eligible for allocation and control is directed to decision Step 7376. Decision Step 7376 test whether STICKING_SLAVE, NEW, or NAIL flags are set in the File Descriptor 508 of the REPLACEMENT CANDIDATE. If none of the flags are set, the segment remains eligible for allocation and control is directed to decision Step 7378.

If the REPLACEMENT CANDIDATE segment has not been purged (its FILE_IDENTIFIER is not equal to 0), decision Step 7378 directs control to Step 7380 where HASH processing is invoked to determine the Hash Table 6000 entry for the REPLACEMENT CANDIDATE segment. A lock for exclusive access is requested for the group of segments identified by the group of eight Hash Table entries as indicated by Step 7382. If the lock is not granted, decision Step 7384 directs control to examine another segment for allocation. Otherwise, control is directed to Decision Step 7386 to make a final check before committing to allocation of the segment. If none of the following flags are set: SEGMENT_WRITTEN, SEGMENT_BUSY, STAGE_PENDING, PURGE_PENDING, DESTAGE_PENDING, BAD, or PRE-USE, the segment is still eligible for allocation and control is directed to decision Step 7388. Updating of the global cache replacement pointers is conditional upon the IXP 214 having been granted the corresponding lock. Therefore, decision Step 7388 tests whether the lock was granted. If the lock was granted, the local copy of the pointers are stored back to the global pointer storage area and the lock on the pointers is cleared at Step 7390. Control is then returned to the processing from which REUSE was invoked.

If at decision Step 7386 the segment is not eligible for allocation, control is directed to decision Step 7392. If the SEGMENT_UNAVAILABLE flag is not set, decision Step 7394 tests whether the lock on the cache replacement pointers was granted. Control returns to control Path **7362*y* if the lock was not granted. If the lock was granted, the NEW, STICKING_COUNTER, and DESTAGE_REPORTED values in the File Descriptor 508 are cleared as indicated by Steps 7396 and 7398. Control then returns to control Path 7362*y*** to examine the next File Descriptor. Note that in an alternative embodiment, the STICKING_COUNTER could be decremented, whereby a variable cache replacement priority level would result. In the exemplary embodiment, the STICKING_COUNTER is a flag. This results in a segment having its STICKING_COUNTER set not being subject to cache replacement for at least one round robin cycle. If multiple bits were used to implement the STICKING_COUNTER, selected segments could be removed from consideration for cache replacement for multiple round robin cycles.

If the segment belongs to other than Cache File Space, the SEGMENT_UNAVAILABLE flag will be set and decision Step 7392 directs control to Step 7400. Step 7400 advances the REPLACEMENT CANDIDATE pointer to the File Descriptor 508 referenced by the HASH_LINK in the current File Descriptor. The UPPER BOUND and LOWER BOUND destage pointers are decremented at Step 7402 and processing continues at control Path **7362*y***.

Special processing is required for purged segments because the FILE_IDENTIFIER in the File Descriptor cannot be hashed to an entry in the Hash Table 6000 and a group of eight Hash Table entries thereafter locked. If decision Step 7378 finds that the segment has been purged, control is directed to decision Step 7404. Decision Step 7404 tests whether a lock was granted which prevented all IXPs 214 other than the IXP holding the lock from allocating a purged segment. If such lock was granted, then processing proceeds to decision Step 7388 as described above. When the lock is not granted, processing proceeds to decision Step 7392 as described above.

When decision Step 7376 finds that either the NEW, STICKING_COUNTER, or NAIL flags in the File Descriptor are set, control is directed to decision Step 7406 to test whether the NAIL flag is set. Control is directed to decision Step 7410 if the segment is a nailed segment and an orphan as shown by Steps 7406 and 7408. If decision Step 7410 finds that there is no Resident File Space 524 available, control is directed to decision Step 7392 as described above. Control is directed to decision Step 7378 if there is Resident File Space available.

Decision Step 7408 directs control to decision Step 7412 if the segments is nailed and not an orphan. If File Descriptor 508 indicates that the segment is nailed and belongs to a RESIDENT_FILE, then Step 7414 advances the REPLACEMENT CANDIDATE to the beginning of the next Non-Volatile Storage 220 module. Processing then proceed to Step 7402 as described above. If the segment is nailed and does not belong to a RESIDENT_FILE, the REPLACEMENT CANDIDATE is advanced to point to the end of the Nail Space as referenced by the HASH_LINK in the File Descriptor at that location.

If decision Step 7374 finds that the REPLACEMENT CANDIDATE is not eligible for allocation, control is directed to decision Step 7418. The discussion above related to Steps 7406 and 7408 can be referenced for an understanding of Steps 7418 and 7420.

Testing whether it is necessary to adjust the Replacement POINTER to the beginning of the File Descriptor Table is done once every 64 segments as described at decision Step 7372. If the REPLACEMENT CANDIDATE pointer references the last segment in a group of 64 segments, then control is directed to decision Step 7422. Decision Step 7422 tests whether the REPLACEMENT CANDIDATE pointer references a File Descriptor 508 beyond the end of the File Descriptor Table 506. If so, Step 7424 adjusts the REPLACEMENT CANDIDATE pointer to point to the first File Descriptor in the File Descriptor Table and resets the DESTAGE CANDIDATE, UPPER BOUND, and LOWER BOUND pointers are reset to the their initial positions relative to the REPLACEMENT CANDIDATE referencing the first File Descriptor.

If decision Step 7426 finds that a lock was not granted for the cache replacement pointers, control is directed to decision Step 7374 as described above. If the lock was granted, Step 7428 reads the File Descriptor 508 referenced by the RECENTLY USED ZONE pointer. Decision Step 7430 tests whether the RECENTLY USED ZONE segment is nailed. If the segment is not nailed, and decision Step 7432 finds that the SEGMENT_UNAVAILABLE flag is set, then Step 7434 sets the RECENTLY USED ZONE pointer to the HASH_LINK of the current RECENTLY USED ZONE File Descriptor. Decision Step 7432 directs control to Step 7436 if the SEGMENT_UNAVAILABLE flag is not set. The REPLACEMENT CANDIDATE and RECENTLY USED ZONE pointers are stored in global storage so that they may be read by the other IXPs 214 and control is directed to decision Step 7374 via control Path 7436*p*.

A nailed segment detected by decision Step 7430 which is an orphan, as detected by decision Step 7438, is processed as indicated by decision Step 7432. Control is directed to decision Step 7440 for a nailed segment which is not an orphan. If decision Step 7440 detects that the RECENTLY USED ZONE File Descriptor belongs to a RESIDENT_FILE, then Step 7442 advances the RECENTLY USED ZONE pointer to the beginning of the next Non-Volatile Storage 220 module. Step 7444 advances the RECENTLY USED ZONE pointer to the first File Descriptor past the end of the nailed segments. Control then returns to decision Step 7422 as discussed above.

FIG. 125 contains a flowchart of the PRE-USE processing which reserves a segment for an Index Processor. Decision Step 7452 tests whether a lock was granted on the cache replacement pointers. If not, control is returned to the processing from which the PRE-USE processing was invoked. Otherwise, Step 7454 invokes REUSE processing to find a segment to allocate. The segment found in REUSE processing is delinked from its hash list at Step 7456.

Step 7458 increments the count of segments reserved to the IXP 214, adds an entry to the list of segments preallocated to the IXP, temporarily saves the FILE_IDENTIFIER from the reserved segment, clears the FILE_IDENTIFIER field in the File Descriptor 508, sets the PRE-USE flag in the File Descriptor, stores the number of the IXP in the IXP_NUMBER in the File Descriptor, and stores the updated File Descriptor in the primary and backup File Descriptor Tables 506.

Decision Step 7460 tests whether the segment which was reserved was a purged segment by testing the temporarily saved FILE_IDENTIFIER. If the segment was not purged, the lock on the 8 segment group is released at Step 7462 and control is returned to the processing from which PRE-USE was invoked. Step 7464 releases the lock held for allocating a purged segment if the segment allocated was a purged segment. Control is returned to the processing from which PRE-USE was invoked.

FIGS. 126A, 126B, 126C, and 126D contain a flowchart of the DESTAGE-CHECK processing which identifies segments for destaging and creates Destage Request Packets. Note that DESTAGE-CHECK processing is not invoked when a READ command is processed and segments referenced by the READ command are present in the Outboard File Cache 102. Prior invoking DESTAGE-CHECK processing a lock was obtained on the DESTAGE CANDIDATE pointer.

Processing begins at decision Step 7502 where the DESTAGE CANDIDATE pointer is compared to the UPPER BOUND pointer. If the DESTAGE CANDIDATE pointer is within the Destage Zone, that is the DESTAGE CANDIDATE pointer is between the LOWER BOUND pointer and the UPPER BOUND pointer, then control is directed to decision Step 7504. Decision Step 7504 tests whether 50 milliseconds have elapsed since processing of the command began. If 50 milliseconds have not elapsed, then processing proceeds to Step 7506 where the File Descriptor 508 for the Destage Candidate segment is read.

Decision Step 7508 tests whether the DESTAGE CANDIDATE pointer is at the end of the File Descriptor Table 506. When DESTAGE CANDIDATE pointer reaches the end of the File Descriptor Table, Step 7510 returns the DESTAGE CANDIDATE pointer to the first File Descriptor 508 in the File Descriptor Table 506. Processing then returns to decision Step 7504 to examine the first File Descriptor. If the DESTAGE CANDIDATE pointer is not at the end of the File Descriptor Table, control is directed to Step 7512 where the DESTAGE CANDIDATE pointer is advanced to the next File Descriptor in the File Descriptor Table.

If the SEGMENT_UNAVAILABLE flag for the Destage Candidate segment is set, control is directed to Step 7516. Step 7516 adjusts the DESTAGE CANDIDATE, UPPER BOUND, and LOWER BOUND pointers. The DESTAGE CANDIDATE pointer is made to point to the HASH_LINK value in the File Descriptor. In addition, the UPPER BOUND and LOWER BOUND pointers are adjusted such that the predetermined relative positions are maintained between the DESTAGE CANDIDATE, UPPER BOUND, and LOWER BOUND pointers. Control then returns to decision Step 7504 as described above. If the SEGMENT_UNAVAILABLE flag is not set, control directed to decision Step 7518.

If the segment is a nailed segment, the NAIL flag in the File Descriptor 508 will be set and decision Step 7518 will direct control to decision Step 7520. Decision Step 7520 directs control to Step 7522 if the segment is not an orphan. Destaging of nailed segments and segments in Resident File Space is not performed during the normal course of processing. Therefore, the DESTAGE CANDIDATES, LOWER BOUND, and UPPER BOUND pointers are adjusted accordingly. Step 7522 locks the UPPER BOUND and LOWER BOUND pointers. Decision Step 7523 tests whether the segment belongs to a Resident File. Segments belonging to Resident Files have the RESIDENT_FILE flag in their respective File Descriptors set. If the segment does not belong to a Resident File, decision Step 7523 directs control to Step 7524. Step 7524 advances the DESTAGE CANDIDATE and LOWER BOUND pointers to the first File Descriptor beyond Nail Space 523. The UPPER BOUND pointer is made to point to the File Descriptor is 32 File Descriptors beyond the LOWER BOUND pointer in the File Descriptor Table. After releasing the lock on the LOWER BOUND and UPPER BOUND pointers control is returned to decision Step 7504 as described above. Decision Step 7523 directs control to Step 7526 if the segment belongs to an Resident File. Because Resident File Space 524 resides at the end of a storage Module 732, Step 7526 advances the DESTAGE CANDIDATE LOWER BOUND, and UPPER BOUND pointers to the next storage module. Step 7524 advances the pointers beyond the Nail Space 523 which resides at the beginning of each storage module 732.

If the Destage Candidate segment is neither a nailed segment nor a segment which belongs to a Resident File, decision Step 7518 directs control to decision Step 7528. If either the STICKING_SLAVE, DESTAGE_REPORTED, or NEW flag is set, the segment need not be destaged and decision Step 7528 directs control to decision Step 7529. Decision Step 7529 tests whether more than 75% of the segments in Cache File Space 522 have been written and not destaged (cache-tight condition). If the cache-tight condition is detected, control is directed to decision Step 7530 to continue the search for segments to destage. Otherwise, decision Step 7529 returns control to decision Step 7502. Decision Step 7528 direct control to decision Step 7530 if the STICKING_SLAVE, DESTAGE_REPORTED, and NEW flag are all cleared. If either of the segment has not been written or the segment is in any PENDING state, then the segment need not be destaged and decision Step 7530 returns control to decision Step 7502 to begin processing the next segment.

Step 7532 invokes HASH processing to obtain an index into the HASH TABLE 6000 for the Destage Candidate segment. Step 7534 requests a lock on the group of eight pointers in the Hash Table to which the Hash Table index identified at Step 7532 belongs. Decision Step 7536 tests whether the lock requested Step 7534 was immediately granted. If the lock was not granted immediately, control is return to decision Step 7502 to attempt to find another segment to destage. Decision Step 7536 directs control to Step 7538 if the lock was granted immediately. Step 7538 reads the File Descriptor referenced by Hash Table entry. Step 7540 invokes SEARCH processing to locate the File Descriptor of the Destage Candidate segment on the hash list. Step 7542 reads the second half of the File Descriptor so that the flags contained therein may be tested. Processing proceeds to decision Step 7544 to test whether the Host 10 which submitted the Command Packet 452 is capable of destaging the Destage Candidate segment.

Decision Step 7544 compares the HOST_ID in the File Descriptor to the HOST_ID contained in the Command Packet 452. If the HOST_IDs match, decision Step 7544 directs control to Step 7546. Step 7546 invokes DESTAGE-GROUP processing to select a group of segments to destage and build a Destage Request Packet 1606. Processing continues at Step 7548 where the lock on the group of eight entries in the Hash Table 6000 is cleared. Decision Step 7550 tests whether the Destage Request Table in the Status Packet 460 is full. If there is room for more Destage Request Packet 1606 in the Destage Request Table, then decision Step 7550 returns control to decision Step 7502 to search for more segments to destage.

If decision Step 7544 finds that the File Descriptor HOST_ID and the Command Packet HOST_ID do not match, the segment may still be destaged by the Host 10 if the HOST belongs to a group of hosts having access to the Disk 106 on which the segment is stored. Therefore, control is directed to decision Step 7552 to test the GROUP_ID in the File Descriptor. If the segment belongs to either a global or local destage group, that is the GROUP_ID in the File Descriptor is equal to either to zero or one, than decision Step 7552 directs control to decision Step 7554. If decision Step 7554 finds that the GROUP_ID in the Command Packet indicates that the Host belongs to a global destage group, then control is directed Step 7546 as described above. Processing proceeds to Step 7556 if decision Step 7554 finds that the Command Packet GROUP_ID is not equal to zero. Step 7556 clears the lock held on the group of entries in the Hash Table.

Decision Step 7552 directs control to decision Step 7558 if the GROUP_ID in the File Descriptor is equal either to zero or one. Decision Step 7558 tests whether the GROUP_ID in the Path Table is equal to the GROUP_ID in the File Descriptor 508. The Path Table contains an entry for each of the Host Interface Adapters 214 in the Outboard File Cache 102. Each entry in the Path Table contains a GROUP_ID and a corresponding HOST_ID. The HIAs store the HOST_ID and GROUP_ID into the Path Table when they process a start interface command.

If decision Step 7558 finds that the GROUP_ID in the Path Table matches the GROUP_ID in the File Descriptor, control is directed to Step 7546 as described above. Otherwise, control is directed to Step 7556 to clear the lock on the group of entries in the Hash Table.

Decision Step 7560 tests whether the DESTAGE CANDIDATE pointer is ahead of the lower bound of the Destage Zone as determined LOWER BOUND pointer. If the DESTAGE CANDIDATE pointer is not ahead of the LOWER BOUND pointer decision Step 7560 returns control to decision Step 7502 in an attempt to locate a different segment to destage. Otherwise, control is directed Step 7562. Step 7562 decrements the DESTAGE CANDIDATE pointer and processing proceeds to decision Step 7564. If 75% or fewer of the segments in Cache File Space 522 have been written and not destaged, then a cache-tight condition is not present and processing proceeds to Step 7566. Step 7566 stores the DESTAGE CANDIDATE pointer and releases the lock held on the DESTAGE CANDIDATE pointer. Control is then returned the processing from which the DESTAGE-CHECK processing was invoked. If decision Step 7564 detects a cache-tight condition, control is directed to decision Step 7568. If there are no Destage Request Packets 1606 present in the Status Packet 460, then decision Step 7568 returns to control to decision Step 7504 in an attempt to locate more segments to destage. If there were segments identified for destaging, decision Step 7568 directs control to Step 7570 where the PRIORITY_DESTAGE flag in the Status Packet is set. Processing then proceeds to Step 7566 as described above.

FIG. 127 contains a flow chart of RELINK processing which links a File Descriptor into a hash list of File Descriptors. Step 7620 stores the PROGRAM_ID, HOST_ID, FILE_IDENTIFIER, and FILE_RELATIVE_SEGMENT_OFFSET from the Command Packet 452 to the File Descriptor 508. If the command is not ALLOCATE, decision Step 7622 directs control to Step 7624. Otherwise, Step 7624 is skipped. Step 7624 clears all the flags in the File Descriptor except RESIDENT_FILE, ALLOCATE_WRITE_MISS, SEQUENTIAL_SEGMENT, and ORPHAN. Step 7622 further stores the PATH_ID and IXP_NUMBER and sets the STAGE_PENDING flag in the File Descriptor.

Step 7626 links the File Descriptor to the next File Descriptor in the hash list by storing the HASH_LINK from the preceding File Descriptor in the File Descriptor which is being added to the bash list. If there is no preceding File Descriptor, the pointer from the Hash Table entry is stored in the File Descriptor. Step 7626 also clears the BLOCKS_WRITTEN_TEMPLATE in the File Descriptor.

If decision Step 7628 finds that processing is in a speculative mode, then Step 7630 sets the SPECULATIVE flag in the File Descriptor 508. Otherwise, Step 7630 is skipped and processing proceeds to Step 7632 where the File Descriptor is stored in the backup File Descriptor Table. Step 7634 links the File Descriptor to the preceding File Descriptor by storing the address of the File Descriptor in the HASH_LINK of the preceding File Descriptor. If the File Descriptor being added is the first on the hash list, then the address of the File Descriptor is stored in the Hash Table 6000 entry. Control is then returned to the point at which the RELINK processing was invoked.

FIG. 128 contains a flowchart of the DELINK processing to remove a File Descriptor from a hash list. Decision Step 7636 tests whether the result of the SEARCH processing was a hit. If the referenced File Descriptor 508 was not found on a hash list, then control is returned to the processing from which the DELINK processing was invoked. If the segment has been purged, its FILE_IDENTIFIER will be equal to zero and decision Step 7638 will direct control to be returned. When the FILE_IDENTIFIER is not equal to zero, control is directed to decision Step 7640.

Decision Step 7640 tests whether the File Descriptor to be removed from the hash list is the first File Descriptor on the hash list. If it is, Step 7644 stores the HASH_LINK from the File Descriptor being removed in the Hash Table 6000 entry and in the backup Hash Table. Control is then returned as described above.

If the File Descriptor is not the first File Descriptor on the hash list, decision Step 7640 directs control to decision Step 7646. If there are no File Descriptors on the hash list which follow the File Descriptor to be removed, then control is returned as described above. Otherwise, decision Step 7646 directs control to Step 7648 which waits until the BUSY flag in the preceding File Descriptor is not set. Once the preceding File Descriptor is no longer set, Step 7650 stores the HASH_LINK from the File Descriptor being removed in the HASH_LINK of the preceding File Descriptor and in the backup File Descriptor Table. Control is then returned to the processing from which DELINK was invoked.

FIG. 129 contains a flowchart of the processing performed in iterating many of the processing loops described herein. Steps 7664, 7666, 7668, and 7670 respectively Increment the index into the Hash Table 6000, increment the counter of the number of segments processed, increments the FILE_RELATIVE_SEGMENT_OFFSET used in the processing from which the LOOP-CODE was invoked, and reads the next File Descriptor 506 referenced by the Hash Table entry of the incremented index. Control then returns to the processing from which the LOOP-CODE was invoked.

FIGS. 130A and 130B contain a flowchart of the processing for detecting whether a file is surging. A file is surging if new segments are being added to the end of file at an excessive rate. This processing also checks for a cache tight condition which is an excessive number of segments written. SURGE-TEST processing begins at Step 7792 where the Resident File (XF) flag in Command Packet 452 is tested to determine whether the file referenced in the Command Packet is a Resident File. Resident Files are not subject to the same constraints as normal files and are not limited by the SURGE-TEST processing. Thus, for Resident Files control is returned to the processing from which SURGE-TEST processing was invoked. For normal files control is directed to Step 7794 to test whether the command is WRITE OFF BLOCK BOUNDARY. SURGE-TEST processing is bypassed when a WRITE OFF BLOCK BOUNDARY command is detected because it is unlikely that a file is surging when a WRITE OFF BLOCK BOUNDARY command has been issued. Control is directed Step 7796 if a WRITE OFF BLOCK BOUNDARY command is detected.

Decision Step 7996 tests whether more than 75% of the segments in Cache File Space 522 have been written and not destaged (cache-tight condition) according to the local copy of the GLOBAL_WRITTEN_TO_COUNTER. If fewer than 75% of the segments have been written and not destaged, processing proceeds along control Path 7292Y as discussed above. Otherwise, control is directed to Step 7798. Step 7798 loads up-to-date GLOBAL_WRITTEN_TO_COUNTER. The GLOBAL_WRITTEN_TO_COUNTER is reloaded to obtain the actual number of segments in Cache File Space which have been written and not destaged. Processing proceeds to Step 7800 to once again test for the cache-tight condition. If the number of segments in Cache File Space which have been written is less than or equal to 75% of the segments available, then control is directed to Path 7292Y as discussed above. Otherwise, the RECOMMENDED_ACTION is set to Resend at Step 7802 and CACHE-TIGHT processing is invoked at Step 7804. CACHE-TIGHT processing selects segments from Cache File Space for destaging.

If decision Step 7794 finds that the command is not WRITE OFF BLOCK BOUNDARY, control is directed to decision Step 7806. SURGE-TEST processing is only performed if the segments referenced in a Command Packet 452 involve a segment referenced by the first index in a group of eight entries in the Hash Table 6000. Control is directed to decision Step 7796, as described above, if the segments in the Command Packet such a Hash Table entry. If a segment is referenced by the first Hash Table entry in a group of eight entries, control is directed to decision Step 7808. Decision Step 7808 tests whether the Force Fill (FF) flag in the Command Packet is set. The Force Fill flag indicates whether SURGE-TEST processing should be performed. If the Force Fill flag is set, SURGE-TEST processing should not be performed and control is directed to decision Step 7796 as described above. If the Force Fill flag is not set, control is directed to decision Step 7810.

Decision Step 7810 tests the Residency Required (RR) flag in the Command Packet 452. The Residency Required flag indicates that all segments referenced by the Command Packet must be Resident File Space 524. Therefore, control is returned to the processing from which the SURGE-TEST processing was invoked if the Residency Required flag is set If the Residency Required flag is not set control is directed decision Step 7812.

SURGE-TEST processing may be invoked from different control points in the event of a write-miss condition. If the processing from which the SURGE-TEST processing was invoked is MISSED-END processing, control is directed to decision Step 7814. Decision Step 7814 tests whether the FILE_RELATIVE_SEGMENT_OFFSET in the Command Packet 452 is greater than 32. If the current segment in process is not beyond the 32nd segment of the file, the remainder of SURGE-TEST processing need not be performed and control is directed to Step 7796 as described above. If the current segment in process is beyond 32nd segment of the file, further processing is performed to determined whether the file is surging.

Control is directed Step 7816 to obtain a new index into the Hash Table 6000. In particular, 32 is subtracted from the beginning group of eight Hash Table entries which reference the segment in process. Processing proceeds to Step 7818 to request a lock on the group of eight Hash Table entries identified by the new Hash Table index. If the lock is not granted immediately, decision Step 7820 directs control to decision Step 7796 as described above. Otherwise, control is directed to Step 7822 to read the File Descriptor 508 referenced by the new Hash Table entry. Step 7824 invokes SEARCH processing to locate the File Descriptor for the segment whose file relative segment offset precedes the file relative segment offset of the current segment in process by 32. Processing proceeds to decision Step 7826 to test the results of SEARCH processing.

Decision Step 7826 tests whether a segment was located in by SEARCH processing and performs other tests if a segment was located. If a segment was located, as indicated by the HIT flag, and the SEGMENT_WRITTEN flag is set, the SEGMENT_BUSY flag is not set, DESTAGE_PENDING flag is not set, and the PURGE_PENDING flag is not set, then control is directed to decision Step 7828. Decision Step 7828 tests whether the processing from which the SURGE-TEST was invoked is MISSED-END. If the caller was MISS-END and the DESTAGE_REPORTED flag in the File Descriptor is not set, decision Step 7830 directs control to Step 7832. Step 7832 clears the NEW flag in the File Descriptor. Processing proceeds to Step 7834 where DESTAGE-GROUP processing is invoked. DESTAGE-GROUP processing prepares a group of segments for the Host 10 to destage. Step 7836 clears the lock held on the group of eight Hash Table entries and sets the PRIORITY_DESTAGE flag in the Status Packet 460. The Priority Destage flag indicates to the Host 10 that the segments referenced in the Destage Request Packet should be processed immediately. If the processing from which SURGE-TEST was invoked is MISS-END, decision Step 7838 directs that control be returned to MISS-END so that a miss status can be returned to Host. Otherwise, control is directed Step 7840 where the RECOMMENDED_ACTION in the Status Packet is set to Destage Data and then Resend. END processing is invoked at Step 7842 to complete SURGE-TEST processing.

Decision Step 7830 directs control to Step 7844 if the segment has already been reported Host 10 for destaging. Similarly, decision Step 7826 directs control Step 7844 if either SEARCH processing did not find the desired segment or the desired segment was not written, or any of the SEGMENT_BUSY or DESTAGE_PENDING, or PURGE_PENDING flags was set. Step 7844 clears the lock held in the group of eight Hash Table entries before control is returned to the processing from which SURGE-TEST processing was invoked.

If decision Step 7812 finds that the caller was not MISS-END, control is directed to decision Step 7846. Decision Step 7846 tests whether the FILE_RELATIVE_SEGMENT_OFFSET in the Command Packet 542 is greater than 256. If this second surge threshold has not been reached, decision Step 7846 directs control to decision Step 7796 as described above. Otherwise, control is directed to Step 7848. Step 7848 obtains a index into the Hash Table 6000 by subtracting 256 from the beginning of the group of eight Hash Table entries to which the current segment belongs. Processing then continues at Step 7818 as described above.

FIG. 131 contains a flowchart illustrating the SPECULATE-DECISION processing which determines whether more segments should be staged than were identified in the Command Packet. Processing begins at Step 7842 where the command in Command Packet 452 is tested. If the command is other than READ, the remainder of SPECULATE-DECISION processing is not performed and control is returned to the processing from which SPECULATE-DECISION was invoked. Control is directed to decision Step 7844 if the command READ.

Decision Step 7844 tests the number of segments requested in the Command Packet 452. If the segment count (SEG_CNT) is not equal to one, then more than one segment was requested in the Command Packet and control is directed to Step 7846. Step 7846 sets a Temporary Sequential flag which is used in other processing to indicate that additional segments should be staged. Processing then continues where the SPECULATE-DECISION processing was invoked.

If decision Step 7844 finds that the segment count is equal to one, further testing is required to determine whether additional segments should be speculatively staged and control is directed to decision Step 7848. Decision Step 7848 tests whether the Force Speculation (FS) flag in the Command Packet was set. If set, the Force Speculation flag indicates that segments should be speculatively allocated and control is directed Step 7846. Control is directed to decision Step 7850 if the Force Speculation flag is not set.

Decision Step 7850 tests whether more than 75% of the segments Cache File Space 522 have been written. This is accomplished by comparing a local copy of the GLOBAL_WRITTEN_TO_COUNTER to the total number of segments Cache File Space. If the test is positive control is returned to the processing from which SPECULATE-DECISION was invoked. Otherwise, further testing performed to determine whether speculation of additional segments is appropriate.

Decision Step 7852 tests the Speculation Count (SC) Command Packet 452. If the specified number of segments to be speculatively allocated is equal to zero, control is returned to the processing from which SPECULATE-DECISION was invoked. Otherwise, control is directed to decision Step 7854. If the FILE_RELATIVE_SEGMENT_OFFSET specified in the Command Packet references the first segment in a group of eight segment as referenced by Hash Table 6000, and Segment Relative Block Offset (SRBO) is equal to zero as tested at decision Step 7856, control is directed to Step 7846 as described above. Decision Step 7854 directs control to Step 7858 if the FILE_RELATIVE_SEGMENT_OFFSET is not referenced by the first pointer in a group of eight pointers in Hash Table 6000. Step 7858 obtains a new index into the Hash Table by subtracting one from the present index into the Hash Table. This is done to determine whether the segment preceding the segment referenced by FILE_RELATIVE_SEGMENT_OFFSET is present in the Cache File Space. Step 7860 invokes SEARCH processing to locate the preceding segment. If the preceding segment is present Cache File Space decision Step 7862 directs control to Step 7846 where the Temporary Sequential flag is set as described above. If the preceding segment is not present in cache, control is returned to the processing from which SPECULATE-DECISION was invoked.

FIGS. 132A and 132B contain a flowchart of the DESTAGE-GROUP processing which gathers a group of segments to be included in a Destage Request Packet 1606. DESTAGE-GROUP attempts to identify up to eight continuous segments to include in a Destage Request Packet 1606. Processing begins at Step 7940 where a local segment counter is initialized to count the number of segments identified by the Destage Request Packet and the FILE_IDENTIFIER, LEG1_DISK_NUMBER, and LEG2_DISK_NUMBER are stored in the Status Packet 460. Processing proceeds to Step 7942 where the DESTAGE_REPORTED flag File Descriptor 508 is set. Decision Step 7944 tests the TOTAL_SEGMENT_VALID flag in the File Descriptor to determine whether every block in the segment is valid. If the segment is not entirely valid, decision Step 7944 directs control to Step 7946. Step 7946 stores the number of segments identified for destaging in the Destage Request Packet 1606, and increments the number of Destage Request Packets included in the Destage Request Table of the Status Packet 460. Control is then returned to the processing from which the DESTAGE-GROUP processing was invoked.

If decision Step 7944 finds that the entire segment is valid, control is directed decision Step 7948 where the SEQUENTIAL_SEGMENT flag in the File Descriptor 508 is tested. If the current segment has already been identified as a segment which is part of a contiguous group of segments, control is directed to decision Step 7950. Otherwise, control is directed to decision Step 7952 to perform an additional test. Decision Step 7952 tests whether the DESTAGE-GROUP processing was invoked as a result of a miss condition encountered in processing a WRITE command. If the present processing was invoked as a result of a write-missed condition, control is directed to decision Step 7950. Otherwise, control is directed to Step 7946 as described above.

Decision Step 7950 tests whether the present segment is the last segment in a group of eight segments as identified by the Hash Table 6000. Rather than obtaining a lock on the next group of eight segments, if the present segment is at the end of the current group of eight segments, control is directed to Step 7946 to complete the storage of information in the Destage Request Packet 1606. If the present segment is not the last segment in a group of eight segments, control is directed Step 7953. To prepare for processing the next segment, Step 7952 increments the FILE_RELATIVE_SEGMENT_OFFSET and the index into the Hash Table. Step 7954 invokes SEARCH processing to locate the next segment in the hash list. Decision Step 7956 directs control to Step 7946 if the next contiguous segment was not located in the hash list. Otherwise, control is directed decision Step 7958 to test whether the entire segment is valid and has been written. If the TOTAL_SEGMENT_VALID flag and the SEGMENT_WRITTEN flag indicate that either the entire segment is not valid or the segment has not been written, processing proceeds to Step 7946 to complete DESTAGE-GROUP processing. If the entire segment is valid and has been written, control is directed to decision Step 7960.

Decision Step 7960 tests whether the segment in process has already been reported for destaging. If the segment has already been reported for destage, the DESTAGE_REPORTED flag in the File Descriptor will have been set, and control will be directed to Step 7946 as described above. Decision Step 7960 directs control to decision Step 7962 if the present segment has not been reported for destaging. Decision Step 7962 tests whether the current segment in process is contiguous with the prior segment. This is accomplished by comparing the LEG1_DISK_NUMBER and LEG2_DISK_NUMBER of the present segment to that of the prior segment. In addition, the LEG1_DISK_ADDRESS and LEG2_DISK_ADDRESS of the present segment are also compared to that of the prior segment. For the segments to be contiguous the disk numbers of the prior segment and the present segment must be equal and the disk address of the prior segment must be exactly one less the disk address of the present segment. If the present and prior segments are contiguous, decision Step 7962 returns control to Step 7942 in an attempt to locate another contiguous segment. Otherwise, control is directed to Step 7946 to complete DESTAGE-GROUP processing as described above.

FIGS. 133A and 133B contain a flowchart of the DESTAGE-BUILD processing which forms a Segment Information Packet to return to a Host 10 for destaging segments. The processing of FIG. 133 maybe entered from either DESTAGE processing, LOGICAL-SCAN processing or PHYSICAL-SCAN processing. DESTAGE processing invokes the processing of FIG. 133 at DESTAGE-BUILD-1, and LOGICAL-SCAN and PHYSICAL-SCAN invoke the processing of FIG. 133 at DESTAGE-BUILD.

For LOGICAL-SCAN and for PHYSICAL-SCAN processing, Step 7986 sets the segment count in the Segment Information Packet 1674 equal to one. Step 7988 stores the PROGRAM_ID and HOST_ID in the File Descriptor 508 and in the backup File Descriptor. The SEGMENT_BUSY flag is set and the DESTAGE_REPORTED flag is cleared in the File Descriptor. The PATH_ID and IXP_# are also stored in the File Descriptor. The Host Interface Adapter is provided with the address of the data to be destaged and is instructed to clear the SEGMENT_BUSY flag and the SEGMENT_WRITTEN flag when it has completed transfer of the data from the Outboard File Cache to the Host 10.

Decision Step 7990 tests whether the command in the Command Packet 452 is DESTAGE. If the command is DESTAGE, control is directed to Step 7992 where the DESTAGE_PENDING flag in the File Descriptor 508 is set. If the command is other than DESTAGE, decision Step 7990 tests whether the PURGE Flag (PF) is set. Control is directed to Step 7992 if the PURGE Flag is not set, otherwise Step 7996 sets the PURGE_PENDING flag in the File Descriptor. Step 7998 informs the Host Interface Adapter whether a backup File Descriptor is present and increments the segment counter in the Segment Information Packet 1674.

If decision Step 8000 and 8002 respectively find that the command is DESTAGE and the count of the number of segments to destage is no equal to one, Step 8004 indicates to the Host Interface Adaptor 214 that more than one segment will be destaged. Control is then returned to the processing from which the DESTAGE-BUILD processing was invoked. If the command is other than DESTAGE or the number of segments to destage is only one, control is directed to Decision Step 8006.

Decision Step 8006 tests the TOTAL_SEGMENT_VALID flag in File Descriptor 508. If all the Blocks 504 in the Segment 503 contain valid data, control is directed Step 8008 where the remainder of the Segment Information Packet 1674 is written with the appropriate data from the File Descriptor. If there are Blocks in the Segment which do not contain valid data, Step 8010 sets the Special Processing Require (SPR) flag and the Segment Not Valid (SNV) flag in the Segment Information Packet Processing then proceeds to Step 8008 as described above. Control is then returned to the processing from which the DESTAGE-BUILD processing was invoked.

FIG. 134 contains a flowchart of CACHE-TIGHT processing for gathering segments destage when a cache-tight condition is detected. Step 8024 requests a lock on the DESTAGE CANDIDATE pointer. Decision Step 8026 tests whether the lock requested at Step 8024 was granted. If the lock was not granted, Step 8028 and 8030 are performed to wait until the lock is granted. Decision Step 8028 tests whether one millisecond has elapsed since the lock was requested. If one millisecond has not elapsed Step 8030 waits for ten microseconds and returns control to decision Step 8026. Once decision Step 8026 finds that the lock was granted, control is directed Step 8032 which invokes DESTAGE-CHECK processing. DESTAGE-CHECK processing identifies segments to destage. Control is directed to Step 8034 which invokes the ENDERR processing to complete processing of the command.

FIG. 135 contains a flowchart for SPECULATIVE-HIT-TEST PROCESSING. Decision Step 8040 tests whether the segment has been purged. If the segment has been purged, control is directed to Step 8042, where MISS-BA processing is invoked. Otherwise, control is directed to Step 8044 where the speculative hit counter is incremented. If all blocks in the segment being considered for speculative allocation contain valid data, decision Step 8046 directs control Step 8048 where SPECULATE-HIT-1 processing is invoked. SPECULATE-HIT-1 processing continues to search for segments to speculatively allocate. If either the STAGE_PENDING, DESTAGE_PENDING, or PURGE_PENDING flag is set, decision Step 8050 directs control to Step 8052. Step 8052 decrements the count of segments speculatively allocated and the speculate hit counter. The count of speculated segments defines the number of segments considered for speculation. The speculate hit counter identifies the numbers of these segments which are already in cache but may be partially or totally valid. Decision Step 8054 tests whether the segment under consideration is currently locked. Control is directed to Step 8055 where the RECOMMENDED_ACTION is set to Resend and Step 8056 invokes END processing if the segment is locked. Step 8057 sets the RECOMMENDED_ACTION in the Status Packet 460 to Stage Data. MISS-END processing is invoked at Step 8058 to complete the processing of SPECULATIVE-HIT-TEST.

FIG. 136 contains a flowchart of the FIX-STATE-FOR-HITS processing. The FIX-STATE-FOR-HITS processing clears the segment state in a File Descriptor 508. Decision Step 8070 tests whether the segment state is STAGE_PENDING. If the state is STAGE_PENDING, and if decision Step 8072 finds that no blocks in the segment have been written, then Step 8074 clears all flags except the NAIL and RESIDENT_FILE flags which are left in their original state.

If the segment state is not STAGE_PENDING and instead is DESTAGE PENDING, then decision Step 8076 directs control to Step 8078 to set the SEGMENT_WRITTEN flag. Step 8080 clears any other PENDING flags in the File Descriptor. If the DESTAGE_REPORTED flag is also set, decision Step 8082 directs control to Step 8084 where the same flag is cleared. Control is then returned to the processing from which the FIX-STATE processing was invoked.

If the segment state is PURGE_PENDING, decision Step 8086 directs control to Step 8078 as described above. Otherwise, control is directed to decision Step 8082.

FIG. 137 contains a flowchart of the processing performed in purging a segment from the Outboard File Cache. Before the segment is purged, Step 8092 waits until the segment is not busy as indicated by the SEGMENT_BUSY flag in the File Descriptor 508. Once the SEGMENT_BUSY flag is cleared, Step 8094 removes the File Descriptor from its hash list by setting the pointer which points to the File Descriptor to the HASH_LIK in the File Descriptor being purged.

If the SEGMENT_DISABLED flag is set, decision Step 8096 directs control to Step 8098 where the SEGMENT_UNAVAILABLE flag is set and the HASH_LINK in the File Descriptor 508 for the segment being purged is set to the physical address of the next File Descriptor in the File Descriptor Table 506. Control is directed to Step 8100 to clear the HASH_LINK in the File Descriptor for the segment being purged if the SEGMENT_DISABLED flag is not set.

Decision Step 8102 tests whether the segment being purged is an orphan segment. If it is, Step 8104 clears the RESIDENT_FILE flag. Otherwise, control proceeds directly to Step 8106. The FILE_IDENTIFIER, FILE_RELATIVE_SEGMENT_OFFSET, BLOCKS_WRITTEN_TEMPLATE, and all the flags except the NAIL, RESIDENT_FILE, and SEGMENT_UNAVAILABLE are cleared in the File Descriptor for the segment being purged at Step 8106. In addition, the modified File Descriptor is stored in the primary and backup File Descriptor Tables 506.

If the SEGMENT_UNAVAILABLE flag is set, decision Step 8108 directs control to Step 8110 where control is returned to the processing from which the PURGE-SEGMENT processing was invoked. Otherwise, decision Step 8112 tests whether the segment being purged is part of Resident File Space 524 by testing the RESIDENT_FILE flag in the File Descriptor. If it is, Step 8114 invokes GIVE-RESIDENT-FILE processing to return the purged segment to the list of free Resident File segments and control is returned to the processing from which PURGE-SEGMENT was invoked. For a segment not in Resident File Space control is directed to decision Step 8116 to test whether the segment is a nailed segment. Step 8118 returns the segment being purged to the list of free segments available to allocate to requests for nailed segments if the segment is nailed. Control is then returned to the processing from which PURGE-SEGMENT was invoked.

FIG. 138 contains a flowchart of the PURGE-BLOCKS processing to purge selected blocks from a segment in the Outboard File Cache. Selected blocks in a file may be purged as specified in the PURGE FILE Command Packet 1732. PURGE-BLOCKS processing performs a portion of the processing to purge the specified blocks. In processing a PURGE command, segments for the selected file are processed one at a time. Therefore, special processing is required to determine the appropriate blocks to clear which is dependent upon whether the segment in process is the first, middle, or last segment.

If decision Step 8120 finds that the segment being purged is the first segment specified by the PURGE command, then Step 8122 sets a start-clear value to the FIRST_SEGMENT_RELATIVE_BLOCK_OFFSET (FSRBO) in the Command Packet 1732. The start-clear variable is used to designate the block in the segment in process at which clearing of the BLOCKS_WRITTEN_TEMPLATE will begin. Decision Step 8120 directs control to Step 8124 if the segment in process is not the first segment identified in the PURGE request. Step 8124 sets the start-clear value to the first block in the BLOCKS_WRITTEN_TEMPLATE to designate that clearing of the BLOCKS_WRITTEN_TEMPLATE is to begin at the first block (block 0) in the segment. Processing proceeds to decision Step 8126 after the starting point of the first block to clear is determined.

Step 8126 tests whether the segment in process is the last segment identified in the PURGE command. Step 8128 sets a end-clear value to the LAST_SEGMENT_RELATIVE_BLOCK_OFFSET (LSRBO) if the segment in process is the last segment specified in the Command Packet 1732. The end-clear value designates block in the segment at which clearing is to end. If the segment in process is not the last segment, Step 8130 sets the end-clear value to the last block in the segment in process. Processing proceeds to Step 8132 where selected bits in the BLOCKS_WRITTEN_TEMPLATE are cleared. The bits cleared in the BLOCKS_WRITTEN_TEMPLATE are those identified by start-clear through end-clear. Control is returned to the processing from which PURGE-BLOCKS was invoked.

FIGS. 139A–E contain a flowchart of the processing for the ALLOCATE command. The ALLOCATE command preassigns segments according to the parameters specified in the Command Packet 452. Decision Step 8136 tests whether the Resident file flag (XF) in the Command Packet is set. If the command is for allocating segments in Resident File Space 524, control is directed to Step 8138 to search for the requested segment. Otherwise, processing proceeds to decision Step 8140. Decision Step 8040 directs control to decision 8142 if the Nail flag in the Command Packet is set. Decision Step 8142 tests whether there is any Nail Space 523 available. If the allotted Nail Space is all in use, control is directed Step 8144 where the RECOMMENDED_ACTION in the Status Packet 460 is set to Remove Some Nailed Segments and then Resend. Step 8146 invokes ENDERR processing to end the processing of the command. If there is Nail Space available, decision Step 8142 directs control Step 8138.

If neither the Resident file flag (XF) nor the Nail Flag (NF) in the Command Packet 452 is set, control is directed decision Step 8148. If fewer than 75% of the segments in Cache File Space 522 have been written, Step 8148 directs control to Step 8138 to invoke SEARCH processing. Otherwise, control is directed to Step 8150 where the GLOBAL_WRITTEN_TO_COUNTER is reloaded. If the most recent value of GLOBAL_WRITTEN_TO_COUNTER now in hand, decision Step 8152 again checks whether 75% of the segments in Cache File Space have been written. If fewer than 75% of the segments have been written, control is directed Step 8138. Decision Step 8152 directs control Step 8154 if 75% or more of the segments in Cache File Space have been written. Step 8154 sets the RECOMMENDED_ACTION in the Status Packet 460 to Resend, and Step 8156 invokes CACHE-TIGHT processing.

Step 8138 invokes SEARCH processing to determine whether the segment in process is present in the Outboard File Cache 102. Decision Step 8158 tests whether the SEARCH processing was successful in locating the segment. If the requested segments were not found in the Outboard File Cache decision Step 8158 directs control to Step 8160. Step 8160 sets the RECOMMENDED_ACTION to Resend and invokes END processing has been locked by a LOCK command. Processing proceeds to decision Step 8162 to test whether the Resident file flag (XRF) in the Command Packet is set. If the command is for allocation of segments in Resident File Space 524, decision Step 8162 directs control Step 8164 where a lock is requested on the variables used for managing Resident File Space. The variables used to manage Resident File Space include: a pointer to the head of the list of available segments in Resident File Space, a pointer to the tail of the list of segments available in Resident File Space, a counter of a number of segments which are available in Resident File Space, the starting address of segments in Resident File Space, and a count of the lowest number of segments which were available in Resident File Space in the last five stays.

Decision Step 8166 tests whether the lock requested at Step 8164 was granted. If the lock has not been not granted, decision Step 8168 returns control to decision Step 8166 until 50 milliseconds have elapsed since processing of the command first began. If the lock could not be granted control is directed to Step 8170 where a temporary Orphan flag is set so that the segments can be allocated in Cache File Space 522 as an orphan segment. If the lock requested at Step 8164 is granted, control is directed to decision Step 8172 to test whether there is any Resident File Space 524 available to allocate. Step 8174 invokes GET-RESIDENT-FILE processing to reapportion File Space between Cache File Space and Resident File Space and allocate a segment in Resident File Space if decision Step 8172 finds that there is Resident File Space presently available.

If there are no segments on the list of available segments in Resident File Space 524, decision Step 8176 tests whether the amount of File Space 502 allotted to Resident File Space is at the system defined maximum. If so, control is directed to Step 8178 where the lock on the variables used to manage Resident File Space is cleared. Otherwise, control is directed decision Step 8180. Decision Step 8180 tests whether 75% or more of the segments in Cache File Space have been written. Step 8182 sets the RECOMMENDED_ACTION in the Status Packet 462 to Resend, and Step 8184 invokes CACHE-TIGHT processing if 75% or more of the segment Cache File Space have been written. Decision Step 8180 directs control to Step 8174 to allocate a segment of Resident File Space if fewer than 75%. of the segments in Cache File Space have been written.

Control is directed to decision Step 8186 if the segment needs to be allocated as a Nailed segment. If the Nail Flag (NF) in the Command Packet 1650 is set, decision Step 8186 directs control to Step 8188 where the GET-NAIL processing is invoked to allocate a segment in Nail Space 523. Processing then proceeds to Step 8190. Step 8190 sets a temporary Nail path flag to be used later in the processing. If a segment in Cache File Space 522 is to be allocated as a nailed segment, decision Step 8186 directs control Step 8192 while a lock is requested on the cache replacement pointers. Step 8194 invokes REUSE processing to allocate a segment in Cache File Space, and Step 8196 invokes DELINK processing to delink the segment from its hash list.

Processing proceeds to Step 8198 where the File Descriptor 508 for the allocated segment is updated with the appropriate information from the Command Packet and the appropriate flags are either set or cleared. In particular, the LEG1_DISK_NUMBER, LEG2_DISK_NUMBER, LEG1_DISK_ADDRESS, LEG2_DISK_ADDRESS, GROUP_ID, STICKING_POWER, and IXP number from the Command Packet are stored in the File Descriptor. The segment flags in the File Descriptor are cleared, except for the NAIL, SEGMENT_UNAVAILABLE, and RESIDENT_FILE flag, which are left in their present state. The ALLOCATED_WRITE_MISS and NEW flag in the File Descriptor are set.

Decision Step 8200 tests whether the Resident file flag (XF) in the Command Packet is set. If the segment belongs to a Resident file, decision Step 8202 tests whether the segment is an orphan segment. Step 8204 sets the ORPHAN flag in the File Descriptor 508 if the segment is an orphan, otherwise, only the NAIL and RESIDENT_FILE flag in the File Descriptor are set. If the segment does not belong to a Resident File, decision Step 8208 tests the Nail Flag (NF) flag in the Command Packet. If the Command Packet specified a nailed segment, Step 8120 sets the NAIL flag in the File Descriptor. Otherwise, control proceeds directly to Step 8212.

Step 8212 invokes RELINK processing to link the File Descriptor into the hash list. Decision Step 8214 tests whether the temporary Nail Path flag was set. Step 8216 clears the Nail path flag if decision Step 8214 found that the flag was set. Otherwise, decision Step 8218 tests whether the FILE_IDENTIFIER in the allocated File Descriptor is equal to zero. If the segment is not presently assigned to a file, Step 8220 clears the lock held on the segments in the Lock Table. Otherwise, control is directed Step 8222 where the lock on the group of eight Hash Table 6000 entries is cleared.

Processing proceeds to decision Step 8224 to determine whether all segments requested in Command Packet 1650 have been allocated. This is accomplished by comparing the number of segments allocated to the SEG_CNT in the Command Packet. If all the requested segments have been allocated, control is directed to Step 8226 to invoke END processing. Otherwise, Step 8228 invokes LOOP-CODE processing to increment the disk addresses for the next iteration of the ALLOCATE processing loop. If the next segment to process is within the current group of eight Hash Table entries, decision Step 8232 directs control to Step 8138 to process the next segment. Otherwise, control is directed Step 8234 to request a lock on the next group of eight Hash Table entries. Decision Step 8236 tests whether the lock was granted. Control is directed to Step 8238 if the lock was granted, and Step 8238 clears the lock on the previous group of eight Hash Table entries. If a lock is not granted on the next group of eight Hash Table entries, decision Step 8236 directs control to Step 8240 where the RECOMMENDED_ACTION in the Status Packet is set to Iterate. The Status Packet is also updated with the appropriate parameters for processing the ALLOCATE command on the next iteration. Step 8242 invokes ENDERR processing to stop processing of the ALLOCATE command.

FIG. 140 contains a flowchart for the ENDERR, ENDWT, and END processing which completes processing of a Command Packet 452. END processing begins at Step 8272 where the lock held on the group of eight Hash Table 6000 entries is cleared. Step 8274 transfers status information and any Destage Request Packets 1606 to Host Interface Adaptor 214. Control is then return to the top of the DISPATCHER processing at Step 8276.

ENDWT processing is invoked when the GLOBAL_WRITTEN_TO_COUNTER needs to be updated. Step 8278 locks the GLOBAL_WRITTEN_TO_COUNTER. Step 8280 closed the lock held on the group of eight Hash Table 6000 entries, and Step 8282 adjusts the GLOBAL_WRITTEN_TO_COUNTER. The GLOBAL_WRITTEN_TO_COUNTER is adjusted according to the number of segments which have been written or adjusted according to the number for which the SEGMENTS_WRITTEN flag was cleared. Step 8284 clears the lock held on the GLOBAL_WRITTEN_TO_COUNTER.

Processing proceeds to decision Step 8286 where the Command Chain Flag in the Command Packet 452 is tested.

If the Command Packet is part of a command chain, decision Step 8286 directs control to Step 8288. Step 8288 transfer resend information to the Host Interface Adaptor 214. If the Command Packet is part of a command chain a Status Packet is not returned to the Host 10 until either the last Command Packet in the command chain is processed or an error condition is encountered. Decision Step 8286 directs control to Step 8290 when the Command Packet is not part of a command chain.

Step 8290 requests a lock on the DESTAGE CANDIDATE pointer. If decision Step 8292 finds that the lock was not granted immediately, control is directed to Step 8274 as described above. Control is directed to Step 8294 if the lock was granted. Step 8294 invokes DESTAGE-CHECK processing to identify additional segments to destage.

ENDERR processing begins at Step 8296 where the lock on the group of eight Hash Table entries is cleared. Processing then proceeds to Step 8288 as described above.

FIG. 141 contains a flowchart of NEW-BIT processing which tests whether the NEW flag in a File Descriptor should be set for the segment in process. Decision Step 8320 tests whether the RECENTLY USED ZONE pointer is ahead of or behind the REPLACEMENT CANDIDATE pointer. If the RECENTLY USED ZONE pointer is ahead of the REPLACEMENT CANDIDATE pointer, control is directed to decision Step 8322. Decision Steps 8322 and 8324 determine whether the File Descriptor 508 for the current segment is within the Recently Used Zone of segments. If the File Descriptor is outside the Recently Used Zone, control is returned to the processing from which the NEW-BIT processing was invoked. Otherwise, control is directed to Step 8326 which sets the NEW flag in the File Descriptor.

The Recently Used Zone may physically trail the REPLACEMENT CANDIDATE pointer in the File Descriptor Table 506 even though it is always logically ahead of the REPLACEMENT CANDIDATE pointer. Therefore, decision Step 8320 directs control to decision Steps 8328 and 8330 to make the appropriate tests when the Recently Used Zone is physically behind the REPLACEMENT CANDIDATE pointer. If the File Descriptor falls within the Recently Used Zone, control is directed to Step 8326 as discussed above. Otherwise, control is returned to the processing from which NEW-BIT was invoked.

FIGS. 142A and 142B contain a flowchart of GET-NAIL processing which locates an available segment in Nail Space for allocation. Processing begins at decision Step 8332 where the total number of segments of Nail Space 6002 is tested. If the total is greater than 1,000 Step 8334 returns an error code to the Host 10 in processing of that command is avoided, and control is returned to the processing from which GET-NAIL was invoked. Otherwise, control is directed to Step 8336 where a lock is requested for the variables which are used to manage Nail Space.

The variables used to manage Nail Space 523 include: a head pointer to the first segment in a linked list of available segments in Nail Space, a tail pointer to the last segment in the linked list of available segments Nail Space, a count of the total number of segments available in Nail Space, the minimum of the number of segments which were available in Nail Space for the last five days, and the address of the last addressable segment in Nail Space. If the lock is not granted immediately decision Step 8338 directs control to decision Step 8340 to test whether 50 milliseconds have elapsed since processing of the command first began. If 50 milliseconds have not elapsed, control is directed Step 8342 to wait for two milliseconds and processing is returned to decision Step 8338 to again test whether the lock has been granted. If 50 milliseconds have elapsed, control is directed to decision Step 8344 to test whether the GET-NAIL processing was invoked from ALLOCATE processing. Control is directed to Step 8346 if the GET-NAIL processing was not invoked from ALLOCATE processing, and decision Step 8346 tests whether 500 milliseconds have elapsed since processing of the command first began. Step 8348 aborts processing of the command if the error condition of decision Step 8346 is detected, and an error status is returned to the Host 10 which issued the command. If an ALLOCATE command is in process decision Step 8344 directs control to Step 8350 where the RECOMMENDED_ACTION in the Status Packet 462 is set to Resend. Step 8352 invokes ENDERR processing to complete processing of the command.

When decision Step 8338 detects that the requested lock was granted control is directed to decision Step 8352. Decision Step 8352 tests whether there are any segments available in Nail Space 523. If there are not any segments available Step 8354 invokes CONVERT-SPACE processing to convert segments in Cache File Space 522 to Nail Space. Processing continues at Step 8356 where the File Descriptor 508 of the first available segment in Nail Space is claimed for allocation. Step 8356 also decrements the count of segments which are available in Nail Space and saves the address of the File Descriptor for the first available segment in Nail Space which will be used for RELINK processing. Decision Step 8358 compares the count of segments available in Nail Space to the five day minimum number of segments available in Nail Space. If the present count of available segments is less than the five day minimum, control is directed to Step 8360 where a new five day minimum value is established. The new 5 day minimum is set to the present number of available segments in Nail Space. Step 8362 completes GET-NAIL processing by incrementing the total number of segments in Nail Space, updating the head pointer for available segments in Nail Space with the NAIL_LINK pointer from the File Descriptor of the segment just allocated, updating the tail pointer for available segments in Nail Space if there are no more segments available in Nail Space, and clearing the lock on the Nail Space variables. Control is then returned to the processing from which the GET-NAIL processing was invoked.

FIG. 143 contains a flowchart of CONVERT-SPACE processing which reapportions Cache File Space and Nail Space. CONVERT-SPACE processing takes 64 segments from the beginning of Cache File Space in each of the Modules 732 and makes those segments available for Nail Space. Processing begins with the first Module 732 at Step 8370. Step 8372 obtains the address of the first segment in Cache File Space which is beyond the end of Nail Space. Decision Step 8374 tests whether the total number of reserved segments for moving written cache segments elsewhere is eight. If the IXP 236 does not have eight segments reserved decision Step 8374 directs control to Step 8376 where PRE-USE processing is invoked. As described earlier, PRE-USE processing performs cache replacement processing to reserve a segment for allocation by an IXP.

Once eight segments have been reserved for use by the IXP 236, control is directed Step 8378 to convert the first 64 segments of Cache File Space in the present module to Nail Space. Each of the 64 segments in Cache File Space is examined before converting the segments to Nail Space. If the File Descriptor 508 for a segment indicates that the SEGMENT_WRITTEN, STAGE_PENDING, DESTAGE_PENDING, or PURGE_PENDING flag is set, the data for that segment is either moved to one of the segments reserved at Step 8376 or moved to a segment obtained through normal cache replacement processing. The contents of each File Descriptor are also copied to the File Descriptor corresponding to the segment to which the data is copied. The File Descriptor for the segment to which the data is copied is also linked to the Hash Table 6000. PURGE processing is invoked to clear the contents of the File Descriptor for segments converted from Cache File Space to Nail Space when the SEGMENT_WRITTEN flag is not set and the segment is not in a PENDING state. The File Descriptor of the segment being converted is removed from the hash list of which it is a part.

Step 8380 increases the total nail space available by 64. The linked list of File Descriptors for the newly converted segments identified at Step 8378 is linked to the list of segments available in Nail Space at Step 8382. Decision Step 8384 tests whether all storage Modules 732 have been processed. If there are more storage Modules to process, Step 8386 obtains the next Module and control is returned to Step 8372 as described above. Control is directed to Step 8388 once all Modules have been processed.

After Cache File Space 522 has been converted to Nail Space 523, various cache management variables must be updated. Step 8388 first locks the cache management variables which are shared amongst the IXPs 236. Step 8390 decreases the total of number of segments in Cache File Space by the number of segments which were converted to Nail Space. In addition, the threshold at which the cache-tight condition is present is also adjusted. Step 8392 clears the lock held on the global cache management variables before returning control to the processing from which CONVERT-SPACE processing was invoked.

FIGS. 144A, 144B, and 144C contain a flowchart for LESS-NAIL processing which converts 64 segments at the end of Nail Space in each Storage Module to Cache File Space. LESS-NAIL also preforms storage monitoring of the minimum usage of Nail Space. The processing first scans the linked list of available segments in Nail Space for segments to convert, and then scans the File Descriptor Table 506 for segments to convert.

Step 8402 requests a lock for the variables used to manage Nail Space 523. The variables include a pointer to the head of the linked list of available segments in Nail Space, a pointer to the tail of the list, the total nail space available, and the minimum number of segments available in Nail Space over the past five days (5 day minimum). Decision Step 8404 tests whether the lock was granted. If the lock was not granted, decision Step 8406 tests whether 50 milliseconds have elapsed since processing of the command began. Control is directed to decision Step 8404 if 50 milliseconds have not elapsed. Otherwise, control is returned to DISPATCHER processing at Step 8408.

Control is directed to Step 8410 once the lock is granted. Step 8410 and decision Step 8412 determine whether the 5 day minimum is less than or equal to the number of segments to be converted from Nail Space 523. If the 5 day minimum is less than or equal to the number of segments to be converted, no segments are selected for conversion and control is directed to Step 8414. Step 8414 resets the 5 day timer used for proportioning File Space 502 and sets the 5 day minimum to the current total available Nail Space. Step 8416 clears the lock on the Nail Space management variables and control is returned to DISPATCHER processing at Step 8418.

If there are enough segments in Nail Space 523 to convert to Cache File Space 522, decision Step 8412 directs control to Step 8420. Step 8420 scans the linked list of available segments in Nail Space for segments to remove from the list of segments presently not in use. Note that LESS-NAIL processing selects 64 physically contiguous segments from Nail Space in each Storage Module 732 to convert to Cache File Space 522. Each group of 64 segments consists of the last 64 physically addressable segments in Nail Space within a Storage Module. Therefore, each segment in the list of available segments in Nail Space which is within the physical address range of segments being converted is removed from the linked list of available segments in Nail Space.

It should be noted that it is actually the File Descriptors 508 which are removed from the linked list. For each of the segments removed from the list, the total number of segments available in Nail Space is decremented. To minimize the amount data moving which may be required when LESS-NAIL processing is performed, the linked list is ordered from the segment with the lowest physical address within a storage Module to the segment with the highest physical address within a storage Module. This is done so that the lowest addressable segments in Nail Space are allocated first. At system initialization the linked list of available segments in Nail Space for an Outboard File Cache 102 with n storage Modules is as follows: the head of the list points to the first segment in Module 0, the first segment in Module 0 points to the first segment in Module 1, the first segment in Module I points to the first segment in Module 2, . . . , the first segment in Module n-1 points to the first segment in Module n, the first segment in Module n points to the second segment in Module n, the second segment in Module n points to the second segment in Module n-1, the second segment in Module n-1 points to the second segment in Module n-2, . . . , the second segment in Module 1 points to the second segment in Module 0, the second segment in Module 0 points to the third segment in Module 0, the third segment in Module 0 points to the third segment in Module 1, and so on. The linkages between segments is actually maintained by the NAIL_LINK in the associated File Descriptors.

After the list of available segments in Nail Space 523 has been scanned, the File Descriptor Table 506 is scanned. This portion of processing begins with the first storage Module 732 in NVS 220 as shown by Step 8422. Step 8224 determines the range of addresses in the File Descriptor Table for which segments are to be converted. Step 8426 reads a File Descriptor 508.

Decision Step 8428 tests the SEGMENT_UNAVAILABLE flag in the File Descriptor and directs control around the processing for converting the segment if it is unavailable. Otherwise, control is directed to decision Step 8430. If the HOSTNAIL flag of the File Descriptor indicates that the segment has not been allocated (it was on the list of available segments in Nail Space and removed above), control is directed to Step 8432. Step 8432 clears the NAIL, HOSTNAIL, HASH_LINK, and FILE_IDENTIFIER in the File Descriptor. If the segment has not been allocated, control is directed to Step 8434 to convert the nailed segment which has been allocated.

Step 8434 removes the File Descriptor 508 from the head of the list of available segment in Nail Space 523. The selected segment will be the segment to which the data from the segment to be converted will be moved. Step 8436 specifies the necessary steps for converting the selected segment from Nail Space to Cache File Space 522. The File Descriptor for the segment being converted is copied to the File Descriptor selected at Step 8434. The data in the segment being converted is copied to the segment selected at Step 8434. The File Descriptor selected at Step 8434 is linked into the list of which the converted segment was a part, and the FLAGs, FILE_IDENTIFIER, FILE_RELATIVE_SEGMENT_OFFSET, and HASH_LINK are cleared in the segment to be converted to complete the conversion.

Step 8438 decrements the total number of segments available in Nail Space 523. Correspondingly, Step 8440 locks and increments the total number of segments available in Cache File Space 522. Furthermore, Step 8442 locks and adjusts the Recently Used Zone and Destage Zone used in cache replacement processing.

Decision Step 8444 tests whether the processing is at the end of the File Descriptors to convert for the storage Module 732 in process. If there are more File Descriptors to process in the Module, Step 8446 advances to the next File Descriptor and control is returned to Step 8426 as described above. Control is directed to decision Step 8448 if all File Descriptors for the present storage Module have been processed.

Decision Step 8448 tests whether there are any more storage Modules 732 for which segments in Nail Space 523 are to be converted to Cache File Space 522. Control is directed to Step 8450 to obtain the next storage Module if there are more storage Modules to process. Otherwise, control is directed to Step 8452. Step 8452 decreases the 5 day minimum number of segments available in Nail Space by (64 * the number of Modules processed). The pointer to the end of Nail Space is also adjusted to reflect the fact that 64 segments in each module were converted. Processing then proceeds to Step 8416 as described above.

FIG. 145 contains a flowchart for GIVE-SEGMENT processing which returns an allocated nailed segment to the linked list of available segments in Nail Space. Step 8472 requests a lock on the variables used to manage Nail Space 523, and decision Step 8474 tests whether the lock was granted. If the lock was not granted, decision Step 8478 tests whether 500 milliseconds have elapsed since the lock was requested. Control is returned to decision Step 8474 if 500 milliseconds have not elapsed. When 500 milliseconds have elapsed, Step 8480 logs an error status indicating too much time elapsed in returning the segment to available Nail Space, and control is returned to PURGE-SEGMENT processing.

Decision Step 8474 directs control to Step 8484 once the lock has been granted. Step 8484 increments the total number of segments available in Nail Space 523, clears the HOSTNAIL flag in the File Descriptor, and decrements the quantity of Total Nail Space which is currently in use.

Processing proceeds to decision Step 8486 where the physical address of the segment is tested to determine whether it is in the first half or second half of Nail Space 523 within a storage Module 732. If the segment is in the first half of Nail Space in the storage Module, Step 8488 links the File Descriptor 508 to the head of the linked list of available segment in Nail Space by updating the pointer to the head of the list of available segments in Nail space and the NAIL_LINK in the File Descriptor. Otherwise, at Step 8490 the File Descriptor is linked to the tail of the linked list of available segments in Nail Space. This is done so that Nail Space segments in the first half of Nail Space in a storage Module are the first to be allocated and moving of data may be minimized when reapportioning File Space 502 between Nail Space and Cache File Space 522. Step 8492 stores the updated File Descriptor before the lock is cleared at Step 8482 and control is returned to PURGE-SEGMENT.

FIG. 146 contains a flowchart illustrating the processing for GET-RESIDENT-FILE. GET-RESIDENT-FILE processing obtains a segment in Resident File Space 524 for allocation.

Step 8502 locks the variables used to manage Resident File Space 524. These variables include pointers to the head and tail of the linked list of available segments in Resident File Space, the total number of segments available in Resident File Space, and a count of the minimum number of segments available in Resident File Space over the last five days ("5 day minimum").

Decision Step 8504 tests whether there are any segments in Resident File Space 524 which are available for allocation. Control is directed to Step 8506 if there are segments available to allocate. Step 8506 reads the File Descriptor at the head of the linked list of File Descriptors for segments available in Resident File Space. The count of available segments in Resident File Space is decremented and the address of the File Descriptor is saved for RELINK processing.

Decision Step 8508 tests whether the 5 day minimum is greater than the count of available segments in Resident File Space 524. If so, the 5 day minimum is reset to the present count of available segments in Resident File Space at Step 8510. Otherwise, the 5 day minimum is not adjusted and control is directed to Step 8512. Step 8512 removes the File Descriptor for the allocated segment from the linked list and Step 8514 clears the lock held on the variables used to manage Resident File Space before returning control to ALLOCATE processing.

Decision Step 8504 directs control to decision Step 8516 if there are no segments available for allocation in Resident File Space 524. If the number of segments allotted to Resident File Space is already at a maximum, decision Step 8516 directs control to Step 8514 as described above. Otherwise, control is directed to Step 8518 where MORE-RESIDENT-FILE processing is invoked to convert segments from Cache File Space 522 to Resident File Space. After more segments are made available in Resident File Space, processing proceeds to Step 8506 as described above.

FIG. 147 contains a flowchart of MORE-RESIDENT-FILE processing which reapportions Cache File Space and Resident File Space. MORE-RESIDENT_FILE processing takes 64 segments from the end of Cache File Space in each of the Modules 732 and makes those segments available for Resident File Space. Processing begins with the first Module 732 at Step 8520. Step 8522 obtains the address of the last segment in Cache File Space. Decision Step 8524 tests whether the total number of reserved segments is eight. If the IXP 236 does not have eight segments reserved decision Step 8524 directs control to Step 8526 where PRE-USE processing is invoked. As described earlier, PRE-USE processing performs cache replacement processing to reserve segments for movement of written cache segments out of the area being converted to Resident File Space 524.

Once eight segments have been reserved for use by the IXP 236, control is directed Step 8528 to convert the last 64 segments of Cache File Space to Resident File Space. Each of the last 64 segments segment of Cache File Space is examined before converting the segments to Resident File Space. If the File Descriptor 508 for a segment indicates that the SEGMENT_WRITTEN, STAGE_PENDING, DESTAGE_PENDING, or PURGE_PENDING flag is set, the data for that segment is either moved to one of the segments reserved at Step 8526 or moved to a segment obtained through normal cache replacement processing. The contents of each File Descriptor are also copied to the File Descriptor corresponding to the segment to which the data is copied. The File Descriptor for the segment to which the data is copied is also linked to the Hash Table 6000. PURGE processing is invoked to clear the contents of the File Descriptor for segments converted from Cache File Space to Resident File Space when the SEGMENT_WRITTEN flag is not set and the segment is not in a PENDING state. The File Descriptor of the segment being converted is removed from the hash list of which it is a part.

Step 8530 increases the total nail space available by 64. The linked list of File Descriptors for the newly converted segments identified at Step 8378 is linked to the list of segments available in Resident File Space at Step 8532. Decision Step 8534 tests whether all storage Modules 732 have been processed. If there are more storage Modules to process, Step 8536 obtains the next Module and control is returned to Step 8522 as described above. Control is directed to Step 8538 once all Modules have been processed.

After Cache File Space 522 has been converted to Resident File Space 524, various cache management variables must be updated. Step 8538 first locks the cache management variables which are shared amongst the IXPs 236. Step 8540 decreases the total of number of segments in Cache File Space by the number of segments which were converted to Resident File Space. In addition, the threshold at which the cache-tight condition is present is also adjusted. Step 8542 clears the lock held on the global cache management variables before returning control to the processing from which CONVERT-SPACE processing was invoked.

FIGS. 148A–D contain a flowchart of LESS-RESIDENT-FILE processing which reapportions File Space between Resident File Space and Cache File Space. LESS-RESIDENT-FILE also monitors the minimum usage level of Resident File Space. Selected segments which are available in Resident File Space are converted to Cache File Space. LESS-RESIDENT-FILE processing is invoked periodically from the DISPATCHER processing to convert any excess segments in Resident File Space to Cache File Space.

Step 8552 requests a lock on the variables used to manage Resident File Space. These variables include pointers to the head and tail of the linked list of available segments in Resident File Space, the total number of segments available in Resident File Space, and a count of the minimum number of segments available in Resident File Space over the last five days ("5 day minimum"). Decision Step tests whether the lock was granted. If the lock was not granted and 50 milliseconds have elapsed since processing of the command began, decision Step directs that control be returned to the DISPATCHER. Otherwise, control is returned to decision Step 8554 to test whether the lock was granted.

Processing proceeds to Step 8558 once the lock has been granted. Steps 8558 through 8566 determine how many segments to convert from Resident File Space 524 to Cache File Space 522. The number of segments to be converted is a multiple of 64 and is not less than the 5 day minimum number of available segments in Resident File Space. Step 8558 sets a cycle counter to 1 and clears the LOCAL_WRITTEN_TO_COUNTER. Step 8560 calculates a temporary result based on the 5 day minimum less (64 * the number of storage Modules 732 * the cycle counter). If the result is greater than 0, decision Step 8562 directs control to Step 8564 where the cycle counter is incremented and control is returned to Step 8560 for the next iteration of the processing loop. When the result is less than or equal to 0, control is directed to Step 8566 where the cycle counter is adjusted. If the cycle counter is equal to 0, no segments will be converted and decision Step 8568 directs control to Step 8570. Step 8570 establishes a new 5 day minimum, restores the present address of the Start of Resident File Space, and clears the lock on the Resident File Space variables before control is returned to DISPATCHER processing.

Step 8572 advances the address at which Resident File Space 524 starts in a storage Module 732 by 64 segments * the cycle counter. Step 8574 scans the linked list of available segments in Resident File Space for segments to remove from the list and convert to Cache File Space 522. LESS-RESIDENT-FILE processing selects 64 physically contiguous segments from Resident File Space in each Storage Module 732 to convert to Cache File Space 522. Each group of 64 segments consists of the first 64 physically addressable segments in Resident File Space within a storage Module. Therefore, each segment in the list of available segments in Resident File Space which is within the physical address range of segments being converted is removed from the linked list of available segments in Resident File Space.

It should be noted that it is actually the File Descriptors 508 which are removed from the linked list. For each of the segments removed from the list, the total number of segments available in Resident File Space 524 is decremented. The linked list is ordered from the segment with the highest physical address within a storage Module to the segment with the lowest physical address within a storage Module. This is done so that the highest addressable segments in Resident File Space are allocated first. At system initialization the linked list of available segments in Resident File Space for an Outboard File Cache 102 with n storage Modules and each Module having m segments is as follows: the head of the list points to segment m in Module n, segment m in Module n points to segment m in Module n-1, segment m in Module n-1 points to segment m in Module n-2, . . . , segment m in Module 1 points to segment m in Module 0, segment m in Module 0 points to segment m-1 in Module 0, segment m-1 in Module 0 points to segment m-1 in Module 1, segment m-1 in Module 1 points to segment m-1 in Module 2, . . ., segment m-1 in Module n-1 points to segment m-1 in Module n, segment m-1 in Module n points to segment m-2 in Module n, segment m-2 in Module n points to segment m-2 in Module n-1, and so on. The linkages between segments is actually maintained by the NAIL_LINK in the associated File Descriptors.

After the list of available segments has been scanned, the File Descriptor Table 506 is scanned for segments in Resident File Space which have been written and are to be converted. Step 8576 begins with the first storage Module 732. Step 8578 determines the range of File Descriptors 508 in the File Descriptor Table to scan for segments to convert. The File Descriptor for the first segment within a storage Module which is undergoing conversion is read at Step 8580. If the SEGMENT_UNAVAILABLE flag in the File Descriptor is set, decision Step 8582 directs control to decision Step 8584. Decision Step 8584 tests whether the File Descriptor in process is the last in the range undergoing conversion to Cache File Space 522. Step 8586 advances to the next File Descriptor to convert if there are more to process and control returns to decision Step 8580 to read the File Descriptor.

If decision Step 8582 finds the SEGMENT_UNAVAILABLE flag is not set and decision Step 8588 finds that the NAIL flag in the File Descriptor is not set, control is directed to decision Step 8584 as described above. Otherwise, control is directed to Step 8590 where a lock is requested on the group of eight entries in the Hash Table 6000 to which the File Descriptor in process is linked. Decision Step 8592 tests whether the lock was granted. If the lock was not granted, Step 8594 waits for eight microseconds and returns control to decision Step 8592. When the lock has been granted, control is directed to decision Step 8596.

If the segment being converted has been written, Step 8598 increments the LOCAL_WRITTEN_TO_COUNTER so that the GLOBAL_WRITTEN_TO_COUNTER may be adjusted after all the segments have been converted. Decision Step 8600 tests the SEGMENT_BUSY flag in the File Descriptor 508, and Step 8602 waits until the SEGMENT_BUSY flag is cleared before processing continues. Step 8604 clears the RESIDENT_FILE and NAIL flags in the File Descriptor for the segment being converted, and Step 8606 clears the lock on the group of eight Hash Table 6000 entries.

When the last segment in the range of segments undergoing conversion has been converted, decision Step 8584 directs control to decision Step 8608. Decision Step 8608 tests whether all the storage Modules 732 have been processed. Step 8610 obtains the next storage Module if there are more to process and returns control to Step 8578 to determine the range of File Descriptors 508 to process for the current storage Module.

Control is directed to decision Step 8612 once all storage Modules 732 have been processed. Decision Step 8612 tests the LOCAL_WRITTEN_TO_COUNTER. If none of the converted segments had been written, control is directed to Step 8616. Otherwise, Step 8614 updates the GLOBAL_WRITTEN_TO_COUNTER by locking it, and adding to it the LOCAL_WRITTEN_TO_COUNTER, and storing it in the global storage area. Step 8616 locks and adjusts the cache replacement pointers and destage pointers to take into account the number of new allocable segments in Cache File Space 522. Control is returned to DISPATCHER processing after a new 5 day minimum and a new address for the beginning if Resident File Space 524 are established.

FIG. 149 contains a flowchart for GIVE-RESIDENT-FILE processing which returns an allocated segment in Resident File Space to the linked list of available segments in Resident File Space. Step 8642 requests a lock on the variables used to manage Resident File Space, and decision Step 8644 tests whether the lock was granted. If the lock was not granted, decision Step 8646 tests whether 50 milliseconds have elapsed since the lock was requested. Control is returned to decision Step 8644 if 50 milliseconds have not elapsed. Otherwise, decision Step 8648 tests whether 500 milliseconds have elapsed since the command was received. Decision Step 8648 returns control to decision Step 8644 if 500 milliseconds have not elapsed. When 500 milliseconds have elapsed, Step 8650 logs an error status indicating too much time elapsed in returning the segment to available Resident File Space, Step 8652 clears the lock on the Resident File Space variables, and control is returned to PURGE-SEGMENT processing.

Decision Step 8644 directs control to Step 8654 once the lock has been granted. Step 8654 increments the total number of segments available in Resident File Space 524.

Processing proceeds to decision Step 8656 where the physical address of the segment is tested to determine whether it is in the first half or second half of Resident File Space 524 within a storage Module 732. If the segment is in the second half of Resident File Space in the storage Module, Step 8658 links the File Descriptor 508 to the head of the linked list of available segments in Resident File Space by updating the pointer to the head of the list of available segments in Resident File Space and updating the NAIL_LINK in the File Descriptor. Otherwise, at Step 8660 the File Descriptor is linked to the tail of the linked list of available segments in Resident File Space. This is done so that Resident File Space segments in the second half of Resident File Space in a storage Module are the first to be allocated and moving of data may be minimized when reapportioning File Space 502 between Resident File Space and Cache File Space 522. Step 8662 stores the updated File Descriptor before the lock is cleared at Step 8652 and control is returned to PURGE-SEGMENT.

While the preferred embodiment has been discussed in terms of a class of data processing systems which are popularly referred to as mainframes, the present invention could easily be adapted to environments employing mini-computers, as well as microcomputers. In addition, while the specification discloses disks as providing the mass storage for the files to be cached, other media and storage systems could be used for long term storage of the files to be cached. Those skilled in the art will recognize that various minor modifications to the preferred embodiment could be made to suit the needs of any of the alternative embodiments.

Having described the preferred embodiment of the invention in the drawings and accompanying description, those skilled in the art will recognize that various modifications to the exemplary embodiment could be made without departing from the scope and spirit of the claims set forth below:

Appendix

A. Glossary and Acronyms

Application Program—any program executing on the Host data processing system which makes use of the functionality provided by the File Cache System.

AVAILABLE state—is a state in which the segment is available for assignment.

Cache File Space—is that portion of File Space which is devoted to non-resident files. See also Resident File Space.

Command Chain—is a linked list of Command Packets which form a "program" to be executed by the Outboard File Cache.

Command Packet (CP)—is a data structure containing a command and the information necessary for the Outboard File Cache to execute the command.

Data Chain—is a set of DATA_DESCRIPTOR_WORDs.

Data Chain Packet (DCP)—is a packet containing DDWs, and whose last entry contains either pointer to another Data Chain Packet or the last DDW in the Data Chain.

DATA_DESCRIPTOR_WORD (DDW)—specifies the location and length of a Host Local Buffer, or specifies the real address of the next Data Chain Packet in the Data Chain.

Data Mover (DM)—is the functional unit for transferring file data, commands, and status information between a Host and a Host Interface Adapter (HIA).

DESTAGE PENDING state—is given to a segment when the data in the segment is in the process of being destaged to mass storage.

Destaging—is reading file data from File Cache Storage and writing the file data to mass storage.

Duplexing—is a hardware configuration and software feature in which each mass storage device may have an associated backup mass storage device. If a unit specified as duplexed is requested to perform I/O, the writes are automatically done to both mass storage devices. Duplexing reduces vulnerability to mass storage failures.

Input/Output Processor (IOP)—is a input/output processing unit associated with the exemplary data processing system.

Instruction Processor (IP)—is the instruction processing unit or central processing unit of the exemplary data processing system.

File Cache Handler Software—is a portion of operating system software which processing Input/Output requests to the Outboard File Cache.

File Space—is the storage available in the Outboard File Cache 102 for caching file data.

Host Interface Adapter (HIA)—is the functional unit of the Outboard File Cache for transferring file data, commands, and status information between the Outboard File Cache and the Data Mover (DM).

Index Processor (IXP)—is the functional unit of the Outboard File Cache which manages allocation of cache storage, processes cache commands, and generates status information in processing the commands.

Instruction Processor (IP)—is a instruction execution unit of the exemplary data processing system.

Local File—a file is local to a Host if it is stored on a mass storage subsystem which is coupled to the input/output logic section of the Host.

Main Storage Unit (MSU)—is a addressable dynamic random access memory unit of the exemplary data processing system.

Outboard File Cache—is a combination of hardware and software which provides a cache for file data where the cache storage is external to the input/output boundary for a Host.

Program Status Packet (PSP)—is the packet in which a status for a single command or a command chain is reported from the Outboard File Cache to the Host.

Nailed segment—is a segment that has no assigned track in mass storage. A nailed segment remains in Cache File Space until it is purged by a Host. The Outboard File Cache 102 never initiates deassignment and destaging of a nailed segment.

Orphan segment—is a segment belonging to a Resident File which was stored in Cache File Space because Resident File Space is full.

Program—is linked list of Command Packets.

Program Initiation Packet (PIP)—refers to the packet built by the File Cache Interface to reference the first Command Packet specified by an Application Program. "Program in this context refers to the overall task to be performed by the File Cache System as specified in one or more Command Packets".

Program Initiation Queue (PIQ)—is a queue containing PIPs.

Purge—is an operation performed by the Outboard File Cache in which the segment in cache storage which is identified in a Command Packet is disassociated with the file to which the segment is currently assigned.

PURGE PENDING state—is given to a segment when the segment is in the process of being purged.

Resident File Space—is that portion of File Space which is devoted to storing data of files which are not subject to cache replacement Re-use—is the term used to describe the reallocation or reassignment of a segment in Cache File Space, which is already assigned to a segment of a file, to a different file.

Segment State—is the current state of a segment in cache storage. The possible segment states are: AVAILABLE, STAGE PENDING, DESTAGE PENDING, PURGE PENDING.

STAGE PENDING state—is given to a segment when the segment has been assigned and file data is in the process of being staged to the segment.

Staging—is reading file data from mass storage and storing in File Cache Storage.

Storage Controller (SC)—is the logic unit which provides access to the Main Storage Units in the exemplary Host processor.

That which is claimed is:

1. A data processing system comprising:

a host processor for issuing file access commands, wherein each file access command defines an operation to be performed on a selectable one of one or more files and includes a file-identifier referencing one file of said one or more files and a logical offset referencing a selected portion of said one file, said host processor including an input-output logic section which provides an interface for input of data to said host processor and output of data from said host processor;

an outboard file cache coupled to said input-output logic section of said host processor and responsive to said file access commands, wherein said outboard file cache provides cache storage for said one or more files and comprises a cache memory, wherein said cache memory provides random access storage for selectable portions of said one or more files;

a file descriptor table, wherein said file descriptor table provides storage of file-identifiers and offsets which are indicative of portions of said one or more files which are present in said cache memory;

cache detection control interfaced with said file descriptor table and responsive to said file access commands, wherein said cache detection control detects whether said selected portion is present in said cache memory and provides a hit code if said selected portion is present in said cache memory; and cache access control responsive to said hit code and interfaced with said cache memory, wherein said cache access control provides access to said selected portion of said one file if said hit code is provided.

2. The data processing system of claim 1, further comprising:

a secondary storage device responsively coupled to said input-output logic section of said host processor for storing said one or more files;

said cache detection control further provides a miss code if said selectable portion is not present in said cache memory, whereby a miss condition is indicated; and staging means responsive to said miss code for reading said selectable portion from said secondary storage device and writing said selectable portion in said cache memory.

3. The data processing system of claim 2, wherein, said selected portion references one or more segments; and said cache detection control provides a separate miss code for each said one or more segments which is not present in said cache memory.

4. The data processing system of claim 3, wherein, said staging means further comprises address indicator means for providing a device identifier and a device address to said outboard file cache, wherein said device identifier identifies said secondary storage device and said device address indicates the address in said secondary storage device at which each said one or more segments are stored;

said outboard file cache further comprises address storage means responsive to said staging means for storing said device identifier and device address in said file descriptor table;

destage initiation means for detecting when to destage one or more segments from said cache memory and providing a destage request, wherein said destage request specifies said one or more segments to destage;

destage means responsive to said destage request and interfaced with said file descriptor table for reading said one or more segments to destage from said cache memory and writing said one or more segments to destage to said secondary storage device, whereby said file descriptor table provides said device identifier and said device address where said one or more segments are to be written.

5. The data processing system of claim 3, wherein, said secondary storage device includes a first secondary storage device responsively coupled to said input-output logic section of said host processor for storing said one or more files; and a second secondary storage device responsively coupled to said input-output logic section of said host processor for storing a copy of selected ones of said one or more files;

said staging means further comprising address indicator means for providing a first device identifier, first device address, second device identifier, and second device address to said outboard file cache, wherein said first device identifier is indicative of said first secondary storage device, said first device address indicates the address in said first secondary storage device at which each said one or more segments is stored, said second device identifier is indicative of said second secondary storage device, and said second device address indicates the address in said second secondary storage device at which each said one or more segments is stored;

said outboard file cache further comprises address storage means responsive to said staging means for storing said first device identifier, said first device address, said second device identifier, and said second device address in said file descriptor table;

destage initiation means for detecting when to destage one or more segments from said cache memory and providing a destage request, wherein said destage request specifies one or more segments to destage;

destage means responsive to said destage request and interfaced with said file descriptor table for reading said one or more segments to destage from said cache memory and writing said one or more segments to destage to said first secondary storage device and to said second secondary storage device, whereby said file descriptor table provides said first device identifier, said first device address, said second device identifier, and said second device address.

6. The data processing system of claim 1, further comprising:

a secondary storage device responsively coupled to said input-output logic section of said host processor for storing said one or more files;

said host processor further including first initiation queue means for queuing said file access commands;

first initiation queue processing means interfaced with said first initiation queue means for monitoring said first initiation queue means, dequeuing a file access command, and sending said file access command to said outboard file cache.

7. The data processing system of claim 6, further comprising:

second initiation queue means for queuing said file access commands;

said host processor further including command enqueuing means interfaced with said first initiation queue means and said second initiation queue means for selecting either said first initiation queue means or said second initiation queue means and enqueuing a file access command in either said first initiation queue means or said second initiation queue means;

second initiation queue processing means interfaced with said second initiation queue means for monitoring said second initiation queue means, dequeuing a file access command, and sending said file access command to said outboard file cache.

8. The data processing system of claim 1, wherein each file access command further includes a file type which designates whether said one file is a resident file;

wherein said file descriptor table further includes file type designators which are indicative of portions of cache memory in which resident files are stored, whereby said cache memory allocated to said resident files is not eligible for cache replacement;

wherein said cache detection means provides a miss code if said selectable portion is not present in said cache memory;

wherein said outboard file cache further comprises cache replacement control interfaced with said file descriptor table and responsive to said miss code and said file type from a file access command, wherein said cache replacement control selects a portion of said cache memory which is not allocated to a resident file for storing said selectable portion if said miss code is detected and said file type indicates said one file is not a resident file; and resident file storage control interfaced with said file descriptor table and responsive to said miss code and said file type from a file access command, wherein said resident file storage control allocates a portion of said cache memory which is not presently allocated to a resident file for storing said selectable portion if said miss code is detected and said file type indicates said one file is a resident file.

9. The data processing of claim 8, wherein said cache memory comprises:

a first division of storage for storing selected portions of files which are eligible for cache replacement; and a second division of storage for storing selected portions of resident files which are not eligible for cache replacement;

wherein said outboard file cache further comprises apportioning control interfaced with said cache memory and responsive to said resident file storage control, wherein said apportioning control automatically converts a first predetermined amount of storage from said first division to said second division when all of said second division of storage is currently assigned to one or more resident files.

10. The data processing system of claim 9, further comprising:

a storage monitor interfaced with said second division of storage, wherein said storage monitor observes an amount of storage in said second division which is assigned to one or more resident files;

a minimum usage indicator responsive to said storage monitor, wherein said minimum usage indicator stores a periodic minimum of said amount of storage in said second division which is assigned to one or more resident files;

wherein said apportioning control is further interfaced with said minimum usage indicator and automatically converts a second predetermined amount of storage from said second division to said first division when said second division of cache memory falls below said minimum usage indicator.

11. A data processing system comprising:

a first host processor for issuing file access commands, wherein each file access command defines an operation to be performed on a selectable one of one or more files and includes a file-identifier referencing one file of said one or more files and a logical offset referencing a selected portion of said one file, wherein one of said file access commands is a lock command, said first host processor including an input-output logic section which provides an interface for input of data to said first host processor and output of data from said first host processor;

a second host processor for issuing file access commands wherein said one or more files are accessible by each of said first and said second host processor, said second host processor including an input-output logic section which provides an interface for input of data to said second host processor and output of data from said second host processor;

an outboard file cache coupled to said input-output logic section of said first host processor and coupled to said input-output logic section of said second host processor and responsive to said file access commands from said first host processor and said second host processor, wherein said outboard file cache provides cache storage for said one or more files;

said outboard file cache comprising, a cache memory, wherein said cache memory provides random access storage for selectable portions of said one or more files;

a file descriptor table, wherein said file descriptor table provides storage for file-identifiers and offsets which are indicative of portions of said one or more files which are present in said cache memory;

cache detection control interfaced with said file descriptor table and responsive to said file access commands, wherein said cache detection control detects whether said selected portion is present in said cache memory and provides a hit code if said selectable portion is present in said cache memory; and cache access control responsive to said hit code and interfaced with said cache memory, wherein said cache access control provides access to said one or more requested segments if said hit code is provided.

12. The data processing system of claim 11 wherein:

said outboard file cache further comprises activity queue means for queuing file access commands received by said outboard file cache;

said cache detection control comprises first cache detection control interfaced with said file descriptor table and said activity queue means, wherein said first cache detection control reads a file access command from said activity queue means, detects whether said selected portion referenced by said file access command is present in said cache memory, and provides a hit code if said selected portion is present in said cache memory; and second cache detection control interfaced with said file descriptor table and said activity queue means, wherein said second cache detection control reads a file access command from said activity queue means, detects whether said selected portion referenced by said file access command is present in said cache memory, and provides a hit code if said selected portion is present in said cache memory;

said cache access control comprises first cache access control responsive to said hit code, interfaced with said cache memory, and coupled to said first host processor, wherein said first cache access means provides access for said first host processor to said one or more requested segments if said hit code is detected; and second cache access control responsive to said hit code, interfaced with said cache memory, and coupled to said second host processor, wherein said second cache access control provides access for said second host processor to said one or more requested segments if said hit code is detected.

13. The data processing system of claim 12 wherein said outboard file cache further comprises:

lock table means for storing file locks;

means responsive to a file lock command and interfaced with said lock table means for locking a file; and means interfaced with said lock table means and responsive to said miss code for responding to said file access commands and indicating whether said selected portion of said one file is locked if said miss code is detected.

14. A data processing system comprising:

a host processor for issuing file access commands, wherein each file access command defines an operation to be performed on a selectable one of one or more files, said host processor including an input-output logic section which provides an interface for input of data to said host processor and output of data from said host processor, wherein each of said file access commands includes a file-identifier referencing one of said one or more files and an offset referencing a selected portion of said one file;

an outboard file cache coupled to said input-output logic section of said host processor and responsive to said file access commands, wherein said outboard file cache provides cache storage for said one or more files;

said outboard file cache comprising, a cache memory, wherein said cache memory provides random access storage for said one or more files;

a file descriptor table for storage of file-identifiers and offsets which are indicative of portions of said one or more files which are present in said cache memory, wherein said file descriptor table further includes one or more stage-pending indicators for designating when portions of files are being staged;

cache detection control interfaced with said file descriptor table and responsive to said file access commands, where in said cache detection control detects whether said selected portion of said one file is present in said cache memory, provides a hit code if said selected portion is present in said cache memory, provides a miss code if said selected portion is not present in said cache memory, and provides a resend code if a stage-pending indicator indicates that said selected portion is being staged to said cache memory;

cache access control responsive to said hit code and interfaced with said cache memory, wherein said cache access control provides access to said selected portion of said one file if said hit code is provided;

a secondary storage device responsively coupled to said input-output logic section of said host processor for storing said one or more files;

staging means responsive to said miss code for reading said selected portion of said one file from said secondary storage device and writing said selected portion in said cache memory; and resend means responsive to said resend code for resending a file access command if said resend code is provided.

15. The data processing system of claim 14, wherein said staging means further comprises address indicator means for providing a device identifier and a device address to said outboard file cache, wherein said device identifier identifies said secondary storage device and said device address indicates the address in said secondary storage device at which said selected portion of said one file is stored;

said outboard file cache further comprises address storage means responsive to said staging means for storing said device identifier and device address in said file descriptor table;

destage initiation means for detecting when to destage a portion of a file from said cache memory and providing a destage request, wherein said destage request specifies a portion of a file to destage;

destage means responsive to said destage request and interfaced with said file descriptor table for reading said portion of said file to destage from said cache memory and writing said portion of said file to destage to said secondary storage device, whereby said file descriptor table provides said device identifier and said device address where said portion of said file is to be written.

16. In a data processing system including a host processor having one or more instruction processors, primary storage, and an input-output section interfacing with devices external to the host processor, wherein the data processing system further includes one or more secondary storage devices and an outboard file cache, each coupled to the input-output section of the host processor, wherein the data accessible to the host processor is logically grouped into one or more files and the secondary storage devices provide storage for the one or more files, and the files are referenced by providing a file access command to the operating system of the host processor, a method for providing access to a selectable portion of the one or more files of data, comprising the steps of:

issuing a file access command to the outboard file cache, wherein the file access command includes a file-identifier and a file-relative-segment-offset, said file-identifier referencing a selected file, and said file-relative-segment-offset referencing a selected portion of said selected file;

comparing the file access command to file-identifiers and file-relative-segment-offsets stored in the outboard file cache to detect whether said selected portion of said selected file is present in the outboard file cache; and providing access to said selected portion of said selected file if said selected portion is present in the outboard file cache.

17. The method of claim 16, further comprising the steps of:

staging said selected portion of said selected file referenced by the file access command from a secondary storage device to the outboard file cache if said selected portion is not present in the outboard file cache; and storing said file-identifier and said file-relative-segment-offset of said selected portion of said selected file in the outboard file cache to indicate said selected portion of said selected file is present in the outboard file cache.

18. The method of claim 17, further comprising the step of reissuing the file access command to the outboard file cache after said storing step to provide access to said selected portion of said selected file.

19. The method of claim 17, further comprising the steps of:

inhibiting access to said selected portion of said selected file until said staging step is complete.

20. The method of claim 19, further comprising the steps of:

designating said portion of said selected file as stage-pending if said selected portion is not present in the outboard file cache;

designating said selected portion of said selected file available after said staging step.

21. The method of claim 17, wherein said storing step further comprises storing a device identifier for said selected portion of said selected file, wherein said device identifier indicates the secondary storage device and said device address indicates the physical address on the secondary storage device where said selected portion of said selected file is stored;

the method further comprises the steps of selecting a portion of a file in the outboard file cache to destage, wherein said portion of said file to destage contains data which is not present on the secondary storage device which provides storage for said portion of said file to destage;

destaging said portion of said file from said selecting step to secondary storage, whereby said device identifier and said device address in the outboard file cache indicate the secondary storage device and the physical address on the secondary storage device at which said portion of said file is to be destaged.

22. The method of claim 21, wherein said destaging step comprises the steps of:

notifying the host processor when said portion of said file from said selecting step should be destaged;

issuing a destage file access command to the outboard file cache, wherein said destage file access command indicates said portion of said file to destage;

transferring said portion of said file to destage from the outboard file cache to the host processor; and writing said portion of said file in said transferring step to the secondary storage device.

23. The method of claim 16 further comprising the steps of:

issuing a lock file access command to the outboard file cache indicating a selected file to lock;

locking said selected file; and inhibiting access to said selected file from said locking step for subsequently issued file access commands if said subsequently issued file access commands reference said selected file which is locked and said selected file which is locked is not present in the outboard file cache.

24. The method of claim 16 further comprising the steps of:

issuing a lock file access command to the outboard file cache indicating a selected portion of a selected file to lock;

locking said selected portion of said selected file;

inhibiting access to said selected portion of said selected file from said locking step for subsequently issued file access commands if said subsequently issued file access commands reference said selected portion of said selected file which is locked and said selected portion of said selected file which is locked is not present in the outboard file cache.

25. The method of claim 16, wherein said file access command further comprises a file type which designates whether said selected file is a normal file or a resident file;

and further comprising the steps of:

if said file type indicates a normal file and said selected portion of said selected file is not present in the outboard file cache, performing steps (a), (b), and (c);

(a) selecting a first portion of cache memory which is unused or presently assigned to a normal file for assignment to said selected portion of said selected file;

(b) destaging said first portion of cache memory if the file data stored therein has been written; and (c) assigning said first portion of cache memory for storage of said selected portion of said selected file;

if said file type indicates a resident file and said selected portion of said selected file is not present in the outboard file cache, performing steps (d) and (e);

(d) selecting an unused portion of cache memory in the outboard file cache for storing said selected portion of said selected file; and (e) assigning said unused portion of cache memory for storage of said selected portion of said selected file.

26. The method of claim 25, further comprising the steps of:

designating a first division of cache memory in the outboard file cache for storage of selected portions of files which are eligible for cache replacement; and designating a second division of cache memory in the outboard file cache for storage of selected portions of resident files, wherein portions of said second division of cache memory are not eligible for reassignment.

27. The method of claim 26, further comprising the step of automatically converting a first predetermined amount of storage from said first division of cache memory to said second division of cache memory when all of said second division of cache memory is assigned to resident files.

28. The method of claim 26, further comprising the steps of:

monitoring an amount of storage in said second division of cache memory which is assigned to resident files;

establishing a periodic minimum of said amount of storage in said second division which is assigned to resident files;

automatically converting a second predetermined amount of storage from said second division to said first division when the storage used in said second division of cache memory falls below said periodic minimum.

29. The method of claim 27, further comprising the steps of:

monitoring said amount of storage in said second division of cache memory which is assigned to resident files;

establishing a periodic minimum of said amount of storage in said second division which is assigned to resident files;

automatically converting a second predetermined amount of storage from said second division to said first division when storage used in said second division of cache memory falls below said periodic minimum.

30. A cache system responsive to data access commands issued by a host processor in a data processing system, wherein each of the data access commands designates an operation to perform on data addressed by the command and a data type indicating whether the data addressed by the command is resident data or replaceable data, wherein resident data presently stored in the cache is not subject to cache replacement and replaceable data presently stored in the cache is subject to cache replacement, the cache system comprising:

a cache memory;

cache detection control responsive to a data access command, wherein said cache detection control detects whether the data addressed by the data access command is present in said cache memory, provides a hit code if the data addressed by the data access command is present in said cache memory, and provides a miss code if the data addressed by the data access command is not present in said cache memory;

cache access control interfaced with said cache memory and responsive to said hit code, wherein said cache access control provides access to the data addressed by the data access command if said hit code is provided;

cache replacement control responsive to said miss code and the data access command, wherein said cache replacement control selects a portion of said cache memory in which replaceable data is stored for storing the data addressed by the data access command if said miss code is detected and the data type in the data access command is replaceable data; and resident data storage control responsive to said miss code and the data access command, wherein said resident data storage control selects a portion of said cache memory in which is neither resident data nor replaceable data is stored for storing the data addressed by the data access command if said miss code is detected and the data type in the data access command is resident data.

31. The cache system of claim 30, wherein said cache memory comprises a first division of storage for storing replaceable data;

a second division of storage for storing resident data;

wherein said cache system further comprises apportioning control interfaced with said cache memory and responsive to said resident data storage control, wherein said apportioning control automatically converts a first predetermined amount of storage from said first division to said second division when all of said second division is filled with resident data.

32. The cache system of claim 31, further comprising:

a second division storage monitor interfaced with said second division of storage, wherein said second division storage monitor reports said amount of storage in said second division in which resident data is stored;

a minimum usage indicator responsive to said second division storage monitor, wherein said minimum usage indicator stores a periodic minimum of said amount of storage in said second division in which resident data is stored;

wherein said apportioning control is further interfaced with said minimum usage indicator and automatically converts a second predetermined amount of storage from said second division to said first division when usage of storage in said second division of said cache memory falls below said minimum usage indicator.

33. In a cache system responsive to data access commands issued by a host processor in a data processing system, wherein each of the data access commands designates an operation to perform on data addressed by the command and a data type indicating whether the data addressed by the command is resident data or replaceable data, wherein resident data presently stored in the cache is not subject to cache replacement and replaceable data presently stored in the cache is subject to cache replacement, a method of operating the cache system comprising the steps of:

detecting whether the data addressed by a data access command is present in the cache;

providing access to the data addressed by the data access command if the data addressed is present in the cache;

selecting a portion of the cache in which replaceable data is stored for storing the data addressed by the data access command if the data addressed is not present in the cache and the data type in the data access command is replaceable data; and selecting a portion of the cache in which is neither resident data nor replaceable data is stored for storing the data addressed by the data access command if the data addressed is not present in the cache and the data type in the data access command is resident data.

34. The method of claim 33, further comprising the steps of:

designating a first division of the cache for storage of resident data; and designating a second division of the cache for storage of replaceable data.

35. The method of claim 34, further comprising the step of automatically converting a first predetermined amount of storage from said first division to said second division when resident data is stored in all of said second division.

36. The method of claim 35, further comprising the steps of:

monitoring an amount of storage in said second division in which resident data is stored;

establishing a periodic minimum of said amount of storage in said second division in which resident data is stored; and automatically converting a second predetermined amount of storage from said second division to said first division when said amount of storage in said second division in which resident data is stored falls below said periodic minimum.

37. In a cache system responsive to data access commands issued by a host processor in a data processing system, wherein each of the data access commands designates an operation to perform on data addressed by the command and a replacement level indicating a relative priority for which the data addressed by the command is subject to cache replacement once the data addressed by the command is stored in memory of the cache system, a method of operating the cache system comprising the steps of:

detecting whether the data addressed by a data access command is present in the memory of the cache system;

providing access to the data addressed by the data access command if the data addressed is present in the memory of the cache system;

selecting a portion of the memory of the cache system in which data with the lowest replacement level is stored for storing the data addressed by the data access command if the data addressed is not present in the memory of the cache system;

storing the data addressed by the data access command in said portion of the memory of the cache system from said selecting step;

reading the replacement level from the data access command;

associating the replacement level from the data access command with said portion of the memory of the cache system from said selecting step, whereby the data access command provides said replacement level; and decreasing replacement levels associated with portions of the memory of the cache system which are not selected for storing the data addressed by the data access command.

* * * * *